US012277308B2

(12) United States Patent
Soli et al.

(10) Patent No.: US 12,277,308 B2
(45) Date of Patent: Apr. 15, 2025

(54) INTERACTIONS BETWEEN AN INPUT DEVICE AND AN ELECTRONIC DEVICE

(71) Applicant: Apple Inc., Cupertino, CA (US)

(72) Inventors: Christopher D. Soli, San Francisco, CA (US); Marcos Alonso, Oakland, CA (US); Daniel T. Preston, San Jose, CA (US); Jennifer P. Chen, Mountain View, CA (US); Peder Blekken, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/315,251

(22) Filed: May 10, 2023

(65) Prior Publication Data

US 2024/0004532 A1 Jan. 4, 2024

Related U.S. Application Data

(60) Provisional application No. 63/364,488, filed on May 10, 2022.

(51) Int. Cl.
*G06F 3/04842* (2022.01)
*G06F 3/041* (2006.01)
*G06F 3/044* (2006.01)

(52) U.S. Cl.
CPC ........ *G06F 3/04842* (2013.01); *G06F 3/0416* (2013.01); *G06F 3/0441* (2019.05);
(Continued)

(58) Field of Classification Search
CPC .. G06F 3/04842; G06F 3/0416; G06F 3/0441; G06F 3/04812; G06F 3/04883;
(Continued)

(56) References Cited

U.S. PATENT DOCUMENTS 5,155,813 A 10/1992 Donoghue et al.
5,367,353 A 11/1994 Amanuma et al.
(Continued)

FOREIGN PATENT DOCUMENTS

CN 101667100 A 3/2010
CN 103135915 A 6/2013
(Continued)

OTHER PUBLICATIONS

Final Office Action received for U.S. Appl. No. 16/982,532, mailed on Jul. 27, 2023, 20 pages.
(Continued)

*Primary Examiner* — Brent D Castiaux
(74) *Attorney, Agent, or Firm* — Kubota & Basol LLP

(57) ABSTRACT

Some embodiments described in this disclosure are directed to displaying additional controls and/or information when an input device such as a stylus is hovering over a user interface displayed by an electronic device. Some embodiments described in this disclosure are directed to providing feedback about the pose of an input device relative to a surface. Some embodiments of the disclosure are directed to performing contextual actions in response to input provided from an input device. Some embodiments of the disclosure are directed to providing handwritten input for conversion into font-based text using an input device.

45 Claims, 141 Drawing Sheets

(52) U.S. Cl.
CPC .. *G06F 3/0442* (2019.05); *G06F 2203/04101* (2013.01); *G06F 2203/04106* (2013.01)

(58) Field of Classification Search
CPC ......... G06F 3/0488; G06F 2203/04101; G06F 2203/04106; G06F 2203/04108; H04W 4/33; H04W 4/38; H04W 4/70; H04W 12/009; H04W 12/50; H04W 84/12; H04L 12/2809; H04L 12/281; H04L 67/10
See application file for complete search history.

(56) References Cited

U.S. PATENT DOCUMENTS 5,367,453 A 11/1994 Capps et al.
5,956,020 A 9/1999 D'Amico et al.
6,323,846 B1 11/2001 Westerman et al.
6,570,557 B1 5/2003 Westerman et al.
6,611,258 B1 8/2003 Tanaka et al.
6,677,932 B1 1/2004 Westerman
7,028,253 B1 4/2006 Lieberman et al.
7,259,752 B1 8/2007 Simmons
7,489,306 B2 2/2009 Kolmykov-Zotov et al.
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,844,914 B2 11/2010 Andre et al.
7,957,762 B2 6/2011 Herz et al.
8,006,002 B2 8/2011 Kalayjian et al.
8,159,501 B2 4/2012 Rao
8,239,784 B2 8/2012 Hotelling et al.
8,279,180 B2 10/2012 Hotelling et al.
8,379,047 B1 2/2013 Diverdi
8,381,135 B2 2/2013 Hotelling et al.
8,479,122 B2 7/2013 Hotelling et al.
8,493,340 B2 7/2013 Tremblay
8,587,526 B2 11/2013 Engelhardt et al.
8,638,320 B2 1/2014 Harley et al.
8,638,385 B2 1/2014 Bhogal
8,736,575 B2 5/2014 Kasahara et al.
8,847,983 B1 9/2014 Ranganathan
8,910,253 B2 12/2014 Johnson et al.
8,928,635 B2 1/2015 Harley et al.
8,994,698 B2 3/2015 Diverdi et al.
9,058,595 B2 6/2015 Coffman et al.
9,075,464 B2 7/2015 Mankowski et al.
9,223,464 B2 12/2015 Mandre
9,268,997 B2 2/2016 Sheth et al.
9,348,458 B2 5/2016 Hotelling et al.
9,354,728 B2 5/2016 Yilmaz et al.
9,430,141 B1 8/2016 Lu et al.
9,753,556 B2 9/2017 Bernstein et al.
9,933,937 B2 4/2018 Lemay et al.
9,959,037 B2 5/2018 Chaudhri et al.
10,079,786 B2 9/2018 Yamakawa et al.
10,120,561 B2 11/2018 Stewart et al.
10,168,899 B1 1/2019 Feiszli et al.
10,241,627 B2 3/2019 Yoon
10,338,783 B2 7/2019 Barrus et al.
10,338,793 B2 7/2019 Fisher
10,445,703 B1 10/2019 Atkins et al.
10,860,788 B2 12/2020 Foss et al.
11,429,274 B2 8/2022 Missig et al.
2002/0015024 A1 2/2002 Westerman et al.
2002/0048404 A1 4/2002 Fahraeus et al.
2002/0059350 A1 5/2002 Iwema et al.
2002/0107885 A1 8/2002 Brooks et al.
2003/0071850 A1 4/2003 Geidl
2003/0214539 A1 11/2003 Iwema et al.
2004/0070573 A1* 4/2004 Graham ............... G06V 10/987 345/179
2004/0085301 A1 5/2004 Furukawa et al.
2004/0252888 A1 12/2004 Bargeron et al.
2005/0156915 A1 7/2005 Fisher
2005/0183005 A1 8/2005 Denoue et al.
2005/0190059 A1 9/2005 Wehrenberg
2005/0262164 A1 11/2005 Guiheneuf et al.
2006/0010396 A1 1/2006 Beezer et al.
2006/0017692 A1 1/2006 Wehrenberg et al.
2006/0033724 A1 2/2006 Chaudhri et al.
2006/0071910 A1 4/2006 Kim et al.
2006/0092138 A1 5/2006 Kim et al.
2006/0197753 A1 9/2006 Hotelling
2006/0200759 A1 9/2006 Agrawala et al.
2006/0267967 A1 11/2006 Hinckley et al.
2007/0011651 A1 1/2007 Wagner
2007/0097421 A1 5/2007 Sorensen et al.
2007/0157076 A1 7/2007 Lin et al.
2007/0214407 A1 9/2007 Bargeron et al.
2008/0042978 A1 2/2008 Perez-noguera
2008/0094369 A1 4/2008 Ganatra et al.
2008/0201438 A1 8/2008 Mandre
2008/0225007 A1 9/2008 Nakadaira et al.
2008/0228007 A1 9/2008 Hoshino et al.
2009/0073144 A1 3/2009 Chen et al.
2009/0161958 A1 6/2009 Markiewicz et al.
2009/0167728 A1 7/2009 Geaghan et al.
2009/0187860 A1 7/2009 Fleck et al.
2010/0095205 A1 4/2010 Kinoshita
2010/0107099 A1 4/2010 Frazier et al.
2010/0181121 A1 7/2010 Tremblay
2010/0293460 A1 11/2010 Budelli
2010/0306705 A1 12/2010 Nilsson
2011/0012856 A1 1/2011 Maxwell et al.
2011/0050601 A1 3/2011 Son et al.
2011/0140847 A1 6/2011 Schafer et al.
2011/0164376 A1 7/2011 Tabasso et al.
2011/0239146 A1 9/2011 Dutta et al.
2011/0254806 A1 10/2011 Jung et al.
2012/0032925 A1 2/2012 Sekiya
2012/0036927 A1 2/2012 Sanders et al.
2012/0068941 A1 3/2012 Arrasvuori et al.
2012/0169646 A1 7/2012 Berkes et al.
2012/0182271 A1 7/2012 Wu et al.
2012/0206330 A1 8/2012 Cao et al.
2012/0216150 A1 8/2012 Wernecke
2012/0229471 A1 9/2012 Takai
2012/0233270 A1 9/2012 Lee et al.
2012/0242603 A1 9/2012 Engelhardt et al.
2012/0262407 A1 10/2012 Hinckley et al.
2012/0263381 A1 10/2012 Yoshida
2012/0306778 A1 12/2012 Weeldreyer et al.
2012/0306927 A1 12/2012 Lee et al.
2012/0311422 A1 12/2012 Weeldreyer et al.
2012/0311499 A1 12/2012 Dellinger et al.
2013/0046544 A1 2/2013 Kay et al.
2013/0088465 A1 4/2013 Geller et al.
2013/0106731 A1 5/2013 Yilmaz et al.
2013/0106766 A1 5/2013 Yilmaz et al.
2013/0127757 A1 5/2013 Mann et al.
2013/0136377 A1 5/2013 Luo et al.
2013/0167086 A1 6/2013 Kim et al.
2013/0229390 A1 9/2013 Diverdi
2013/0229391 A1 9/2013 Diverdi
2013/0242708 A1 9/2013 Cadiz et al.
2013/0257777 A1 10/2013 Benko et al.
2013/0263027 A1 10/2013 Petschnigg et al.
2013/0300719 A1 11/2013 Wang
2013/0314337 A1 11/2013 Asano
2013/0326582 A1 12/2013 Kruzeniski et al.
2013/0328810 A1 12/2013 Li et al.
2013/0342729 A1 12/2013 Kim et al.
2014/0019855 A1 1/2014 Kim et al.
2014/0022193 A1 1/2014 Kim et al.
2014/0028634 A1 1/2014 Krah et al.
2014/0035845 A1 2/2014 Kameyama
2014/0055427 A1 2/2014 Kim et al.
2014/0059487 A1 2/2014 Baumann et al.
2014/0067965 A1 3/2014 Yamakawa et al.
2014/0068493 A1 3/2014 Moon et al.
2014/0068504 A1 3/2014 Sun et al.

(56) References Cited

U.S. PATENT DOCUMENTS

| | | | | |
|---|---|---|---|---|
| 2014/0081610 | A1 | 3/2014 | Diverdi et al. | |
| 2014/0108004 | A1 | 4/2014 | Sternby et al. | |
| 2014/0108976 | A1 | 4/2014 | Steiner et al. | |
| 2014/0108979 | A1 | 4/2014 | Davidson et al. | |
| 2014/0108989 | A1 | 4/2014 | Bi et al. | |
| 2014/0152589 | A1 | 6/2014 | Komoda et al. | |
| 2014/0187318 | A1 | 7/2014 | Gallizzi et al. | |
| 2014/0194162 | A1 | 7/2014 | Tsudik | |
| 2014/0210097 | A1 | 7/2014 | Chen et al. | |
| 2014/0210730 | A1 | 7/2014 | Mankowski et al. | |
| 2014/0210797 | A1 | 7/2014 | Kreek et al. | |
| 2014/0210979 | A1 | 7/2014 | Richter et al. | |
| 2014/0219564 | A1 | 8/2014 | Demiya | |
| 2014/0245139 | A1 | 8/2014 | Lee et al. | |
| 2014/0253462 | A1 | 9/2014 | Hicks | |
| 2014/0253465 | A1* | 9/2014 | Hicks | G06F 3/0488 345/173 |
| 2014/0253521 | A1 | 9/2014 | Hicks | |
| 2014/0253522 | A1 | 9/2014 | Cueto | |
| 2014/0267064 | A1 | 9/2014 | Lu | |
| 2014/0267078 | A1 | 9/2014 | Kukulski et al. | |
| 2014/0280603 | A1 | 9/2014 | Rideout et al. | |
| 2014/0331187 | A1 | 11/2014 | Hicks et al. | |
| 2014/0334732 | A1 | 11/2014 | Jung et al. | |
| 2014/0337705 | A1 | 11/2014 | Glover et al. | |
| 2014/0340318 | A1 | 11/2014 | Stringer | |
| 2014/0354553 | A1 | 12/2014 | Dai et al. | |
| 2014/0354555 | A1 | 12/2014 | Shahparnia et al. | |
| 2014/0359410 | A1 | 12/2014 | Lee | |
| 2015/0007061 | A1 | 1/2015 | Mandre | |
| 2015/0009155 | A1 | 1/2015 | Tsao et al. | |
| 2015/0029162 | A1 | 1/2015 | Harris et al. | |
| 2015/0058718 | A1 | 2/2015 | Kim et al. | |
| 2015/0058789 | A1 | 2/2015 | Namgung et al. | |
| 2015/0067469 | A1 | 3/2015 | Shuto | |
| 2015/0067483 | A1 | 3/2015 | Demiya et al. | |
| 2015/0069204 | A1 | 3/2015 | Daniels et al. | |
| 2015/0082217 | A1 | 3/2015 | Tumwattana | |
| 2015/0089389 | A1 | 3/2015 | Cohen-zur et al. | |
| 2015/0106714 | A1 | 4/2015 | Jeong et al. | |
| 2015/0109257 | A1 | 4/2015 | Jalali | |
| 2015/0127403 | A1 | 5/2015 | Petty | |
| 2015/0138127 | A1 | 5/2015 | Kurita | |
| 2015/0169069 | A1 | 6/2015 | Lo et al. | |
| 2015/0186348 | A1 | 7/2015 | Hicks et al. | |
| 2015/0205398 | A1 | 7/2015 | Le | |
| 2015/0212692 | A1* | 7/2015 | Hyun | G06F 3/0488 715/719 |
| 2015/0221106 | A1 | 8/2015 | Winnemoeller et al. | |
| 2015/0248235 | A1 | 9/2015 | Offenberg et al. | |
| 2015/0338949 | A1 | 11/2015 | Westerman | |
| 2015/0347987 | A1 | 12/2015 | Ali | |
| 2015/0363035 | A1 | 12/2015 | Hinckley et al. | |
| 2015/0365306 | A1 | 12/2015 | Chaudhri et al. | |
| 2015/0370350 | A1 | 12/2015 | Hunt et al. | |
| 2016/0070686 | A1 | 3/2016 | Yu et al. | |
| 2016/0070688 | A1 | 3/2016 | Yao et al. | |
| 2016/0098186 | A1 | 4/2016 | Sugiura | |
| 2016/0179222 | A1 | 6/2016 | Chang | |
| 2016/0188017 | A1 | 6/2016 | Bell | |
| 2016/0259766 | A1 | 9/2016 | Ivanov et al. | |
| 2016/0299585 | A1 | 10/2016 | Lee et al. | |
| 2016/0349897 | A1 | 12/2016 | Ishikawa | |
| 2016/0364025 | A1 | 12/2016 | Bernstein et al. | |
| 2016/0364026 | A1 | 12/2016 | Bernstein et al. | |
| 2016/0364027 | A1 | 12/2016 | Bernstein et al. | |
| 2016/0364091 | A1 | 12/2016 | Bernstein et al. | |
| 2017/0024178 | A1* | 1/2017 | Jeong | G06F 16/50 |
| 2017/0091153 | A1 | 3/2017 | Thimbleby | |
| 2017/0109032 | A1 | 4/2017 | Mélinand et al. | |
| 2018/0050592 | A1 | 2/2018 | Bouaziz et al. | |
| 2018/0081536 | A1 | 3/2018 | Ueno et al. | |
| 2018/0121074 | A1 | 5/2018 | Peron et al. | |
| 2018/0129391 | A1 | 5/2018 | Files et al. | |
| 2018/0239444 | A1 | 8/2018 | Siddiqui et al. | |
| 2018/0329589 | A1 | 11/2018 | Sonnino et al. | |
| 2018/0335932 | A1 | 11/2018 | Ta | |
| 2018/0349020 | A1 | 12/2018 | Jon et al. | |
| 2019/0212809 | A1 | 7/2019 | Tzou et al. | |
| 2019/0220109 | A1 | 7/2019 | Bernstein et al. | |
| 2019/0220507 | A1 | 7/2019 | Foss et al. | |
| 2019/0324562 | A1 | 10/2019 | Mn et al. | |
| 2019/0339795 | A1 | 11/2019 | Rebeschi et al. | |
| 2019/0354205 | A1 | 11/2019 | Rakshit et al. | |
| 2019/0369754 | A1 | 12/2019 | Roper et al. | |
| 2019/0369755 | A1 | 12/2019 | Roper et al. | |
| 2020/0293125 | A1 | 9/2020 | Bernstein et al. | |
| 2020/0356254 | A1 | 11/2020 | Missig et al. | |
| 2020/0371629 | A1 | 11/2020 | Hauenstein et al. | |
| 2020/0401796 | A1 | 12/2020 | Chateigner | |
| 2021/0049321 | A1 | 2/2021 | Foss et al. | |
| 2021/0349606 | A1 | 11/2021 | Chang et al. | |
| 2021/0349627 | A1 | 11/2021 | Chang et al. | |
| 2022/0197493 | A1 | 6/2022 | Missig et al. | |
| 2023/0017201 | A1 | 1/2023 | Jon et al. | |
| 2024/0329757 | A1 | 10/2024 | Bernstein et al. | |

FOREIGN PATENT DOCUMENTS

| | | | |
|---|---|---|---|
| CN | 103164158 | A | 6/2013 |
| CN | 103853491 | A | 6/2014 |
| CN | 103870028 | A | 6/2014 |
| CN | 104142782 | A | 11/2014 |
| CN | 104298551 | A | 1/2015 |
| CN | 104423820 | A | 3/2015 |
| CN | 104487928 | A | 4/2015 |
| CN | 104487929 | A | 4/2015 |
| CN | 104679379 | A | 6/2015 |
| CN | 108845757 | A | 11/2018 |
| CN | 109791465 | A | 5/2019 |
| EP | 2071436 | A1 | 6/2009 |
| EP | 2325804 | A2 | 5/2011 |
| EP | 2530561 | A2 | 12/2012 |
| EP | 2704408 | A1 | 3/2014 |
| EP | 2778864 | A1 | 9/2014 |
| EP | 2818998 | A1 | 12/2014 |
| EP | 2843917 | A1 | 3/2015 |
| EP | 2912540 | A1 | 9/2015 |
| JP | H09-171378 | A | 6/1997 |
| JP | H09-305306 | A | 11/1997 |
| JP | H11-110119 | A | 4/1999 |
| JP | 2003-296029 | A | 10/2003 |
| JP | 2007-520005 | A | 7/2007 |
| JP | 2008-27082 | A | 2/2008 |
| JP | 2008-70994 | A | 3/2008 |
| JP | 2010-183447 | A | 8/2010 |
| JP | 2012-18644 | A | 1/2012 |
| JP | 2012-238295 | A | 12/2012 |
| JP | 2013-232033 | A | 11/2013 |
| JP | 2014-153865 | A | 8/2014 |
| JP | 2015-49901 | A | 3/2015 |
| JP | 2015-56154 | A | 3/2015 |
| JP | 2015-64882 | A | 4/2015 |
| JP | 2015-88006 | A | 5/2015 |
| JP | 2016-177589 | A | 10/2016 |
| KR | 20090100248 | A | 9/2009 |
| KR | 10-2010-0059343 | A | 6/2010 |
| KR | 20110088594 | A | 8/2011 |
| KR | 10-2012-0092036 | A | 8/2012 |
| KR | 10-2014-0053554 | A | 5/2014 |
| KR | 10-2014-0073225 | A | 6/2014 |
| KR | 10-2014-0124788 | A | 10/2014 |
| KR | 10-2015-0022527 | A | 3/2015 |
| KR | 10-2015-0026022 | A | 3/2015 |
| KR | 10-2015-0026615 | A | 3/2015 |
| KR | 20170139141 | A | 12/2017 |
| TW | 201112040 | A | 4/2011 |
| WO | 2010/119603 | A1 | 10/2010 |
| WO | 2013/169300 | A1 | 11/2013 |
| WO | 2013/169849 | A2 | 11/2013 |
| WO | 2014/034049 | A1 | 3/2014 |
| WO | 2014/105276 | A1 | 7/2014 |

(56) References Cited

FOREIGN PATENT DOCUMENTS

| | | | |
|---|---|---|---|
| WO | 2014/147724 | A1 | 9/2014 |
| WO | 2016/200586 | A1 | 12/2016 |
| WO | 2020/227445 | A1 | 11/2020 |

OTHER PUBLICATIONS

Final Office Action received for U.S. Appl. No. 17/031,678, mailed on Jan. 10, 2022, 30 pages.
Final Office Action received for U.S. Appl. No. 17/031,844, mailed on Aug. 8, 2022, 33 pages.
International Search Report received for PCT Patent Application No. PCT/US2020/031727, mailed on Oct. 8, 2020, 10 pages.
International Search Report received for PCT Patent Application No. PCT/US2021/031866, mailed on Nov. 8, 2021, 7 pages.
Non-Final Office Action received for U.S. Appl. No. 16/868,449, mailed on May 26, 2021, 30 pages.
Non-Final Office Action received for U.S. Appl. No. 16/982,532, mailed on Jan. 4, 2023, 21 pages.
Non-Final Office Action received for U.S. Appl. No. 17/031,678, mailed on Jul. 8, 2021, 26 pages.
Non-Final Office Action received for U.S. Appl. No. 17/031,844, mailed on Dec. 3, 2021, 29 pages.
Notice of Allowance received for U.S. Appl. No. 16/868,449, mailed on Apr. 14, 2022, 8 pages.
Notice of Allowance received for U.S. Appl. No. 16/868,449, mailed on Nov. 3, 2021, 8 pages.
Notice of Allowance received for U.S. Appl. No. 17/031,678, mailed on Sep. 15, 2022, 10 pages.
Notice of Allowance received for U.S. Appl. No. 17/031,678, mailed on Feb. 1, 2023, 8 pages.
Adak et al., "Extraction of Doodles and Drawings from Manuscripts", ICIAP, 17th International Conference, Naples, Italy, Dec. 10, 2013, pp. 515-520.
Fosseide et al., "Character Recognition in the Presence of Occluding Clutter", Proceedings of SPIE, vol. 7247, Retrieved on Aug. 10, 2021, Jan. 18, 2009, 13 pages.
Hou et al., "An Algorithm of Calligraphy Beautification Based on Improved Velocity and Width Model", Computer Engineering and Social Media (CSCESM), 2015 Second International Conference on Computer Science, 2015, pp. 124-127.
Examiner's Answer to Appeal Brief received for U.S. Appl. No. 17/031,844, mailed on Dec. 18, 2023, 14 pages.
International Search Report received for PCT Application No. PCT/US2023/021718, mailed on Nov. 3, 2023, 7 pages.
Notice of Allowance received for U.S. Appl. No. 16/982,532, mailed on Jan. 24, 2024, 8 pages.
Notice of Allowance received for U.S. Appl. No. 16/982,532, mailed on May 8, 2024, 5 pages.
Matsushita et al., "Effect of Text/Non-text Classification for Ink Search Employing String Recognition", IEEE, 2012 10th IAPR International Workshop on Document Analysis Systems, May 7, 2012, pp. 230-234.
Tianxiao, Liu, "Overview of Handwriting Input Technology", CNKI, China Invention and Patent, vol. 12, [retrieved on Jul. 31, 2024], 2016, 5 pages (1 page of English Abstract and 4 pages of Official Copy).
Toshiba Corporation, "Microsoft Windows for Pen Computing users Guide", Version A1, Nov. 9, 1994, pp. 23-27, 70-77 (Official Copy Only). See attached Communication 37 CFR § 1.98(a)(3).
European Search Report received for European Patent Application No. 18716461.1, mailed on Sep. 4, 2020, 5 pages.
Final Office Action received for U.S. Appl. No. 15/978,125, mailed on Mar. 26, 2020, 13 pages.
Final Office Action received for U.S. Appl. No. 15/978,125, mailed on May 13, 2021, 19 pages.
Final Office Action received for U.S. Appl. No. 17/946,374, mailed on Mar. 4, 2024, 20 pages.
International Search Report received for PCT Patent Application No. PCT/US2018/023484, mailed on Jul. 23, 2018, 7 pages.
Invitation to Pay Additional Fees received for PCT Patent Application No. PCT/US2018/023484, mailed on Jun. 1, 2018, 15 pages.
Non-Final Office Action received for U.S. Appl. No. 15/978,125, mailed on Dec. 12, 2019, 11 pages.
Non-Final Office Action received for U.S. Appl. No. 15/978,125, mailed on Jul. 5, 2019, 9 pages.
Non-Final Office Action received for U.S. Appl. No. 15/978,125, mailed on Nov. 3, 2020, 16 pages.
Non-Final Office Action received for U.S. Appl. No. 17/946,374, mailed on Aug. 23, 2023, 18 pages.
Notice of Allowance received for U.S. Appl. No. 15/978,125, mailed on Aug. 9, 2022, 6 pages.
Toshiba Corporation, "Microsoft Windows for Pen Computing users Guide", Version A1, Nov. 9, 1994, pp. 23-27, 70-77 (Machine Translation Submitted). See attached Communication 37 CFR § 1.98(a)(3).
Applicant Initiated Interview Summary received for U.S. Appl. No. 14/862,085, mailed on Mar. 30, 2018, 3 pages.
Corrected Notice of Allowability received for U.S. Appl. No. 17/085,779, mailed on Aug. 5, 2024, 2 pages.
Corrected Notice of Allowability received for U.S. Appl. No. 17/946,374, mailed on Nov. 7, 2024, 9 pages.
European Search Report received for European Patent Application No. 16727905.8, mailed on May 8, 2019, 4 pages.
European Search Report received for European Patent Application No. 19731090.7, mailed on Oct. 14, 2022, 4 pages.
Examiner's Answer to Appeal Brief received for U.S. Appl. No. 16/417,025, mailed on Sep. 6, 2022, 10 pages.
Extended European Search Report received for European Patent Application No. 24152367.9, mailed on Apr. 30, 2024, 15 pages.
Final Office Action received for U.S. Appl. No. 14/862,085, mailed on Sep. 10, 2018, 14 pages.
Final Office Action received for U.S. Appl. No. 16/417,025, mailed on Jan. 21, 2022, 18 pages.
Final Office Action received for U.S. Appl. No. 16/417,025, mailed on May 18, 2021, 16 pages.
Final Office Action received for U.S. Appl. No. 16/417,025, mailed on Oct. 8, 2020, 16 pages.
Final Office Action received for U.S. Appl. No. 16/886,643, mailed on Feb. 6, 2023, 16 pages.
Final Office Action received for U.S. Appl. No. 16/886,643, mailed on Jan. 27, 2022, 14 pages.
Final Office Action received for U.S. Appl. No. 17/085,779, mailed on Apr. 9, 2024, 25 pages.
Final Office Action received for U.S. Appl. No. 17/085,779, mailed on Aug. 7, 2023, 18 pages.
International Search Report received for PCT Patent Application No. PCT/US2016/033588, mailed on Oct. 4, 2016, 6 pages.
International Search Report received for PCT Patent Application No. PCT/US2017/053172, mailed on Mar. 14, 2018, 7 pages.
International Search Report received for PCT Patent Application No. PCT/US2019/034524, mailed on Nov. 18, 2019, 8 pages.
Non-Final Office Action received for U.S. Appl. No. 14/860,320, mailed on Jul. 19, 2016, 10 pages.
Non-Final Office Action received for U.S. Appl. No. 14/862,073, mailed on Oct. 19, 2016, 13 pages.
Non-Final Office Action received for U.S. Appl. No. 14/862,080, mailed on Jun. 22, 2016, 13 pages.
Non-Final Office Action received for U.S. Appl. No. 14/862,085, mailed on Mar. 19, 2018, 12 pages.
Non-Final Office Action received for U.S. Appl. No. 16/333,103, mailed on Mar. 16, 2020, 20 pages.
Non-Final Office Action received for U.S. Appl. No. 16/359,906, mailed on Aug. 21, 2019, 11 pages.
Non-Final Office Action received for U.S. Appl. No. 16/417,025, mailed on Feb. 5, 2021, 15 pages.
Non-Final Office Action received for U.S. Appl. No. 16/417,025, mailed on Jun. 29, 2020, 13 pages.
Non-Final Office Action received for U.S. Appl. No. 16/417,025, mailed on Sep. 2, 2021, 15 pages.

(56) References Cited

OTHER PUBLICATIONS

Non-Final Office Action received for U.S. Appl. No. 16/417,214, mailed on Aug. 6, 2020, 26 pages.
Non-Final Office Action received for U.S. Appl. No. 16/886,643, mailed on Aug. 16, 2022, 18 pages.
Non-Final Office Action received for U.S. Appl. No. 16/886,643, mailed on May 24, 2021, 13 pages.
Non-Final Office Action received for U.S. Appl. No. 17/085,779, mailed on Dec. 28, 2022, 7 pages.
Non-Final Office Action received for U.S. Appl. No. 17/085,779, mailed on Nov. 20, 2023, 25 pages.
Non-Final Office Action received for U.S. Appl. No. 18/424,684, mailed on Aug. 14, 2024, 7 pages.
Notice of Allowance received for U.S. Appl. No. 16/333,103, mailed on Aug. 19, 2020, 10 pages.
Notice of Allowance received for U.S. Appl. No. 16/417,214, mailed on Feb. 25, 2021, 10 pages.
Notice of Allowance received for U.S. Appl. No. 14/860,320, mailed on Dec. 16, 2016, 8 pages.
Notice of Allowance received for U.S. Appl. No. 14/860,320, mailed on Mar. 7, 2016, 10 pages.
Notice of Allowance received for U.S. Appl. No. 14/862,073, mailed on Mar. 6, 2017, 10 pages.
Notice of Allowance received for U.S. Appl. No. 14/862,080, mailed on Dec. 27, 2016, 9 pages.
Notice of Allowance received for U.S. Appl. No. 14/862,085, mailed on Apr. 23, 2019, 5 pages.
Notice of Allowance received for U.S. Appl. No. 14/862,085, mailed on Jan. 9, 2019, 8 pages.
Notice of Allowance received for U.S. Appl. No. 16/359,906, mailed on Feb. 20, 2020, 8 pages.
Notice of Allowance received for U.S. Appl. No. 16/359,906, mailed on Jan. 6, 2020, 8 pages.
Notice of Allowance received for U.S. Appl. No. 16/359,906, mailed on Mar. 26, 2020, 9 pages.
Notice of Allowance received for U.S. Appl. No. 16/417,025, mailed on Aug. 14, 2024, 5 pages.
Notice of Allowance received for U.S. Appl. No. 16/886,643, mailed on Jun. 29, 2023, 8 pages.
Notice of Allowance received for U.S. Appl. No. 16/886,643, mailed on Oct. 12, 2023, 10 pages.
Notice of Allowance received for U.S. Appl. No. 17/085,779, mailed on Jul. 17, 2024, 12 pages.
Notice of Allowance received for U.S. Appl. No. 17/946,374, mailed on Oct. 10, 2024, 17 pages.
Patent Board Decision received for U.S. Appl. No. 16/417,025, mailed on May 7, 2024, 9 pages.
Android and Me, "Samsung Galaxy Note 3 Review", Available Online at: <http://androidandme.com/2013/10-reviews/samsung-galaxy-note-3 review/>, 2013, 14 pages.
Anonymous, "How to Re-map the S-pen Button and Insert/remove to Do Anything on the Device", Available Online at: <https://www.reddit.com/r/galaxynote4/comments/4ju5lh/how_to_remap_the_spen_button_and_insertremove_to/>, [retrieved on Sep. 13, 2024], May 28, 2016, 6 pages.
Bargeron et al., "Reflowing Digital Ink Annotations", Proceedings of the SIGCHI Conference on Human Factors in Computing Systems, 2003,.
Basu Abhiroop, "Samsung Launches Cross-Platform Instant Messaging Service 'ChatON", Available Online at: < https://www.androidpolice.com/2011/08/29/samsung-launches-cross-platform-instant-messaging-service-chaton/>, Aug. 29, 2011, 5 pages.
Christopher W, "ScribMaster Draw and Paint—with Instant Messenger", Available Online at: < http://www.androidpit.com/scribmaster-draw-and-paint>, Oct. 8, 2013, 9 pages.
Color Hunter, "Create and Find Color Palettes Made From Images", Available Online at: < http://www.colorhunter.com>, 2016, 3 pages.
Conroy Kevin, "Digital Document Annotation and Reflow", Theses and Dissertations, University of Maryland at College Park, 2004,.
CSS Drive, "Colors Pallete Generator", Available Online at: <http:www.cssdrive.com/imgaepalette/>, 2011, 2 pages.
Eichner, "IOS Sensors & Core Motion", Available Online at: <http://wwwbruegge.in.turn.de/lehrstuhl_1/home/98-teaching/tutorials/505-sgd-ws13-tutorial-core-motion>, 2016, 12 pages.
Farley, "Make Swatches from Photos in Photoshop", Available Online at: <http://www.sitepoint.com/makeswatches-from-photos-in-photoshop/>, 5 pages.
Google, "Loklok", Available Online at: < http://loklok.co>, 2015, 2 pages.
Hayakawa, "Galaxy Note 3 Perfect Manual", vol. 1, Sotechsha Co. Ltd, Junichi Yanagisawa, May 12, 2015, 9 pages.
Itunes Preview, "Draw Calendar-Fun Scheduling and Events", Fishington Studios, Available Online at: < https://itunes.apple.com/US/app/calendoodle-pen-ink-whiteboard/id815370160?mt=8>, 2014, 3 pages.
Jain, "Samsung Galaxy Note 3 Neo Review: Hidden Goodness", Available Online at: <https://www.mobigyaan.com/samsung-galaxy-not-3-neo-review-2>, Apr. 17, 2014, 48 pages.
Kazmucha, "How to Send Someone a Sketch with Apple Works", Available Online at: <https:/web.archive.org/web/20150525204929/http:ww.www.imore.com/how-sendsome-sketch-apple-watch>, May 7, 2015, 8 pages.
Lee et al., "PhantomPen: Virtualization of Pen Head for Digitial Drawing Free from Hen Occlusion & Visual Parallax", Idea Lab, Department of Industrial Design, KAIST, Republic of Korea, Oct. 7-10, 2012, 10 pages.
Lee et al., "PhantomPen: Virtualization of Pen Head for Digitial Drawing Free from Pen Occlusion & Visual Parallax", YouTube video, Oct. 22, 2012, 2 pages.
Locke Ricky, "Kindle App Tips for iPad", www.slideshare.net, Available online at: <https://www.slideshare.net/RickyLocke/kindle-app-tips-for-ipad>, [Retrieved from Internet on 2017-12-06], Jun. 30, 2013, pp. 1-5.
Locke Ricky, "Kindle App Tips for IPad (Slides)", www.slideshare.net, Available online at: < https://www.slideshare.net/RickyLocke/kindle-app-tips-for-ipad>, [Retrieved from Internet on 2017-12-06], Jun. 30, 2013, pp. 1-57.
Mailchimp Email Marketing, "Pictaculous, A Color Palette Generator", Available Online at: < http://www.pictaculous.com>, 2016, 1 page.
Millward, "LiiHo IM App: A New Way to Chat as You Draw Something and Doodle with Friends", Available Online at: < http://www.techinasia.com/liiho-im-doodling-app/>, Apr. 5, 2012, 6 pages.
Notes Plus, "5th Anniversary", Available Online at: < http://notesplusapp.com>, Apr. 4, 2013, 7 pages.
Perez, "Five Amazing Color Palette Generators", Available Online at: <http://readwrite.com/2008/08/01/five_amazing_color_palette_generators>, Aug. 1, 2008, 3 pages.
Rudling, "Erik Rudling—Intreprenur and Consulltannt in Speling", Available Online at: <http://erikrudling.com/taking-digital-notes-notes-plus-ipad-app-review/>, Jan. 6, 2015, 14 pages.
Schwaller et al., "Improving In-game Gesture Learning with Visual Feedback", arxiv.org, Jun. 22-27, 2014, pp. 643-653.
Seiji et al., "Galaxy Note 3 Perfect Manual", vol. 1, Sotechsha Co. Ltd., Junichi, Yanagisawa, May 12, 2015, 9 pages.
Sutherland et al., "Freeform Digital Ink Annotations in Electronic Documents: a Systematic Mapping Study", Computers & Graphics, vol. 55, No. 2016, 2016, pp. 1-20.
Sutherland et al., "Who Changed My Annotation? An Investigation Into Refitting Freeform Ink Annotations", IEEE Symposium on Visual Languages and Human-Centric Computing (VL/HCC), 2016,.
Wikipedia, "Calendar (application)", Available Online at: <https://en.wikipedia.org/wiki/Calendar_(application)>, Sep. 10, 2002, 5 pages.
Wikipedia, "Comparison of Instant Messaging Clients", Available Online at: <http://en.wikipedia.org/wiki/Comparison_of_instant_messaging_clients>, Mar. 1, 2016, 16 pages.
Windows, "Use A Pen to Draw, Write, or Highlight, Text on A Windows Tablet,", Available Online at: <https://support.office.com/

(56) References Cited

OTHER PUBLICATIONS en-US/article/Use-a-pen-to-draw-write-or-highlight-text-on-a-Windows-tablet-6d76c674-7f4b-414d-b67f-b3ffef6ccf53>, 2016, 8 pages.

* cited by examiner

Figure 9D:
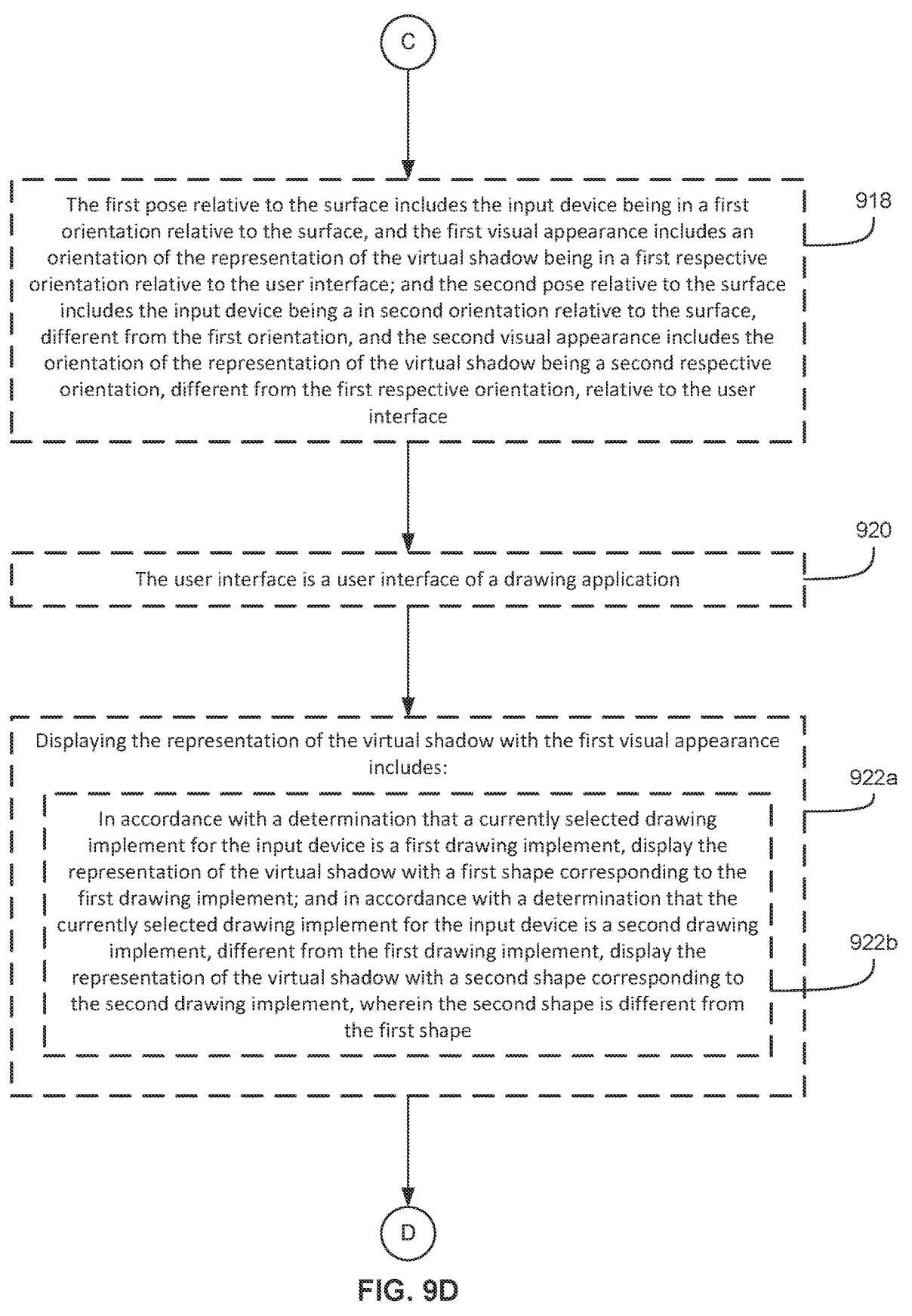

C

918 — The first pose relative to the surface includes the input device being in a first orientation relative to the surface, and the first visual appearance includes an orientation of the representation of the virtual shadow being in a first respective orientation relative to the user interface; and the second pose relative to the surface includes the input device being a in second orientation relative to the surface, different from the first orientation, and the second visual appearance includes the orientation of the representation of the virtual shadow being a second respective orientation, different from the first respective orientation, relative to the user interface 920 — The user interface is a user interface of a drawing application Displaying the representation of the virtual shadow with the first visual appearance includes:

922a / 922b — In accordance with a determination that a currently selected drawing implement for the input device is a first drawing implement, display the representation of the virtual shadow with a first shape corresponding to the first drawing implement; and in accordance with a determination that the currently selected drawing implement for the input device is a second drawing implement, different from the first drawing implement, display the representation of the virtual shadow with a second shape corresponding to the second drawing implement, wherein the second shape is different from the first shape

Figure 9I:
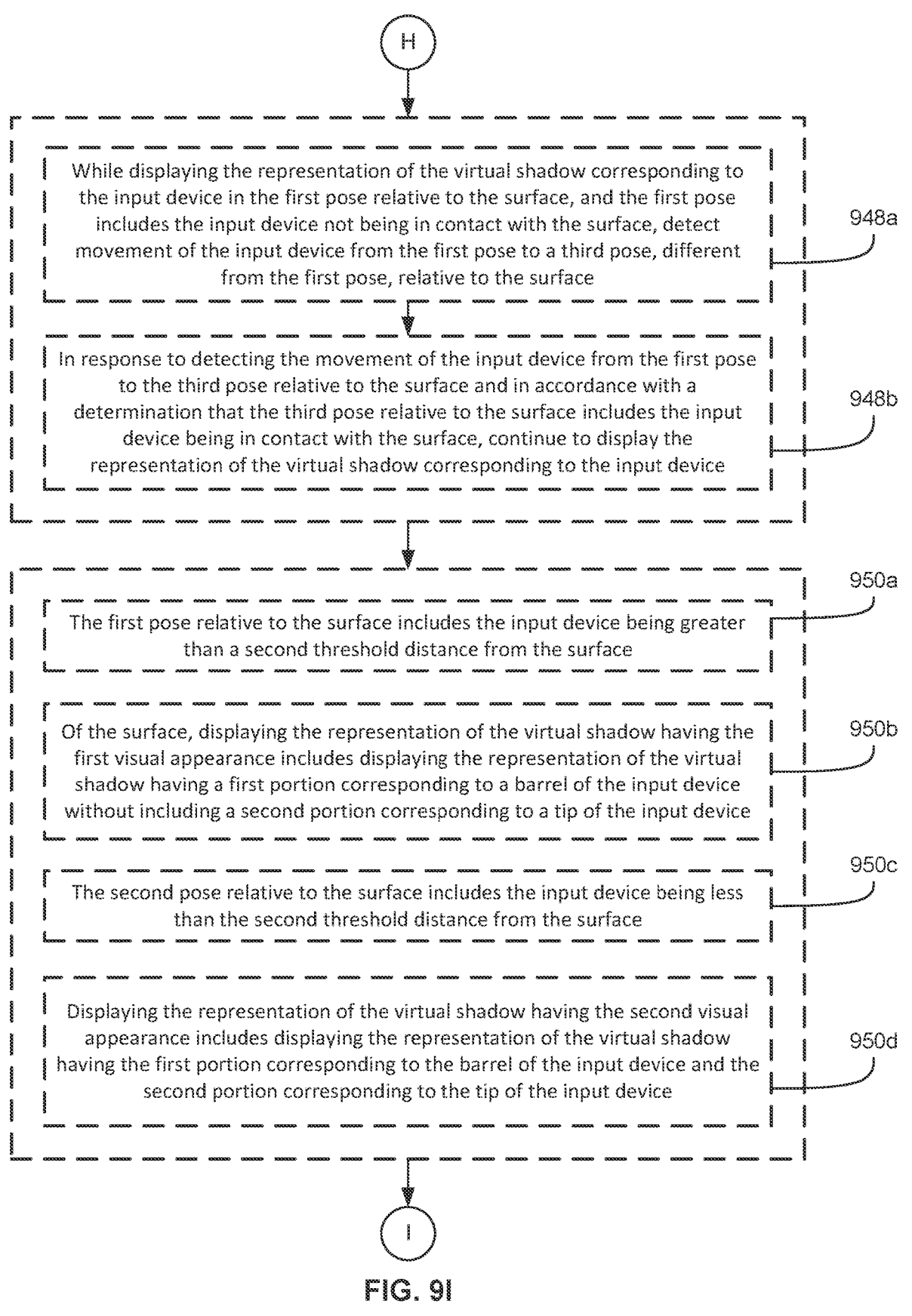

While displaying the representation of the virtual shadow corresponding to the input device in the first pose relative to the surface, and the first pose includes the input device not being in contact with the surface, detect movement of the input device from the first pose to a third pose, different from the first pose, relative to the surface 948a In response to detecting the movement of the input device from the first pose to the third pose relative to the surface and in accordance with a determination that the third pose relative to the surface includes the input device being in contact with the surface, continue to display the representation of the virtual shadow corresponding to the input device 948b The first pose relative to the surface includes the input device being greater than a second threshold distance from the surface 950a Of the surface, displaying the representation of the virtual shadow having the first visual appearance includes displaying the representation of the virtual shadow having a first portion corresponding to a barrel of the input device without including a second portion corresponding to a tip of the input device 950b The second pose relative to the surface includes the input device being less than the second threshold distance from the surface 950c Displaying the representation of the virtual shadow having the second visual appearance includes displaying the representation of the virtual shadow having the first portion corresponding to the barrel of the input device and the second portion corresponding to the tip of the input device 950d

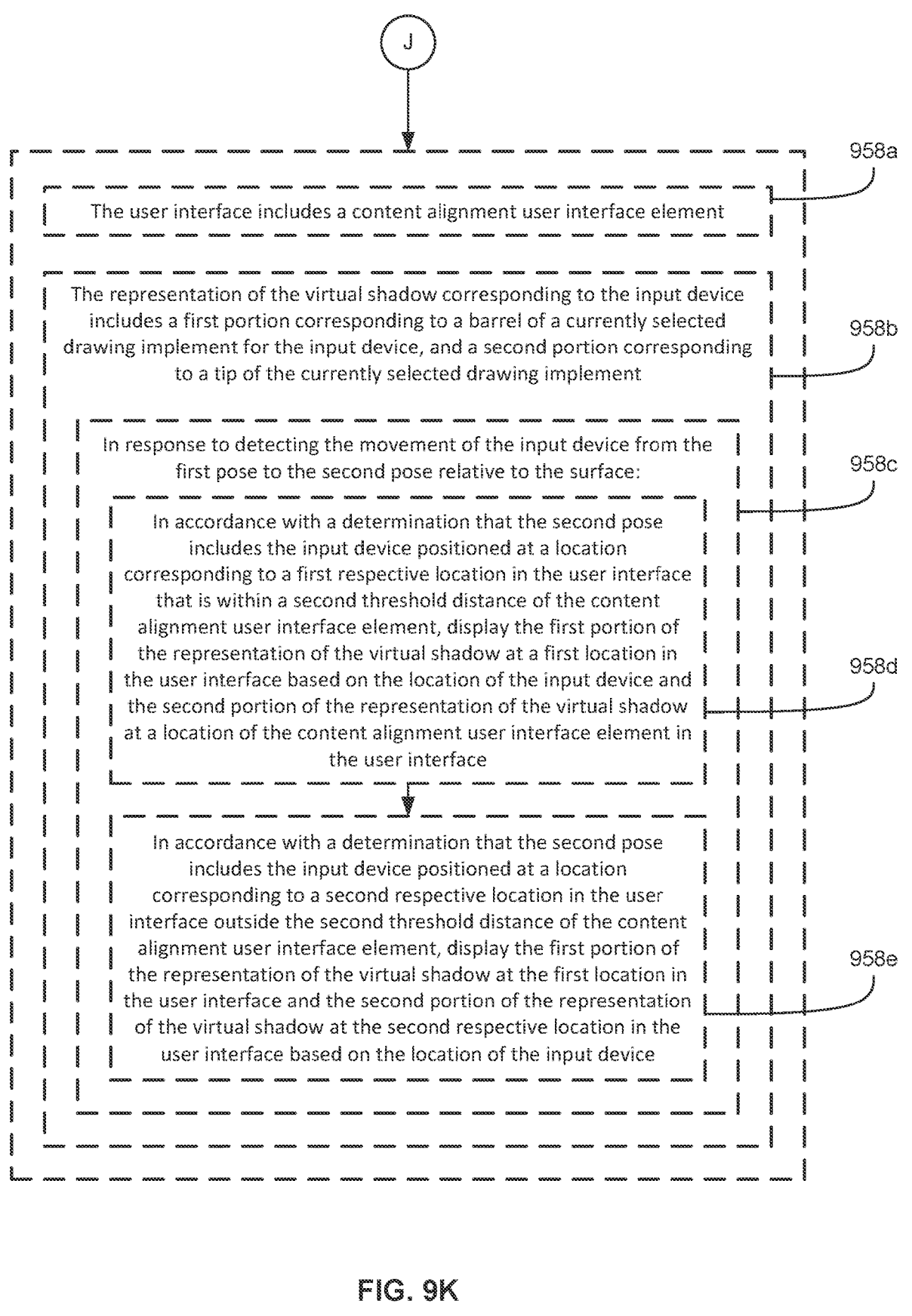

958a
The user interface includes a content alignment user interface element

958b
The representation of the virtual shadow corresponding to the input device includes a first portion corresponding to a barrel of a currently selected drawing implement for the input device, and a second portion corresponding to a tip of the currently selected drawing implement 958c
In response to detecting the movement of the input device from the first pose to the second pose relative to the surface:

958d
In accordance with a determination that the second pose includes the input device positioned at a location corresponding to a first respective location in the user interface that is within a second threshold distance of the content alignment user interface element, display the first portion of the representation of the virtual shadow at a first location in the user interface based on the location of the input device and the second portion of the representation of the virtual shadow at a location of the content alignment user interface element in the user interface 958e
In accordance with a determination that the second pose includes the input device positioned at a location corresponding to a second respective location in the user interface outside the second threshold distance of the content alignment user interface element, display the first portion of the representation of the virtual shadow at the first location in the user interface and the second portion of the representation of the virtual shadow at the second respective location in the user interface based on the location of the input device

FIG. 9K

INTERACTIONS BETWEEN AN INPUT DEVICE AND AN ELECTRONIC DEVICE

CROSS-REFERENCE TO RELATED APPLICATIONS

This application claims the benefit of U.S. Provisional Application No. 63/364,488, filed May 10, 2022, the content of which is incorporated herein by reference in its entirety for all purposes.

FIELD OF THE DISCLOSURE

This relates generally to electronic devices that interact with input devices, and user interactions with such devices.

BACKGROUND

User interaction with electronic devices has increased significantly in recent years. These devices can be devices such as computers, tablet computers, televisions, multimedia devices, mobile devices, and the like.

In some circumstances, users wish to interact with an electronic device with an input device such as a stylus. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to displaying additional controls and/or information when an input device such as a stylus is hovering over a user interface displayed by an electronic device. Some embodiments described in this disclosure are directed to providing feedback about the pose of an input device relative to a surface. Some embodiments of the disclosure are directed to performing contextual actions in response to input provided from an input device. Some embodiments of the disclosure are directed to providing handwritten input for conversion into font-based text using an input device.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 9A-9K are flow diagrams illustrating a method of providing feedback about the pose of an input device relative to a surface in accordance with some embodiments.

DETAILED DESCRIPTION

Figure 1A:
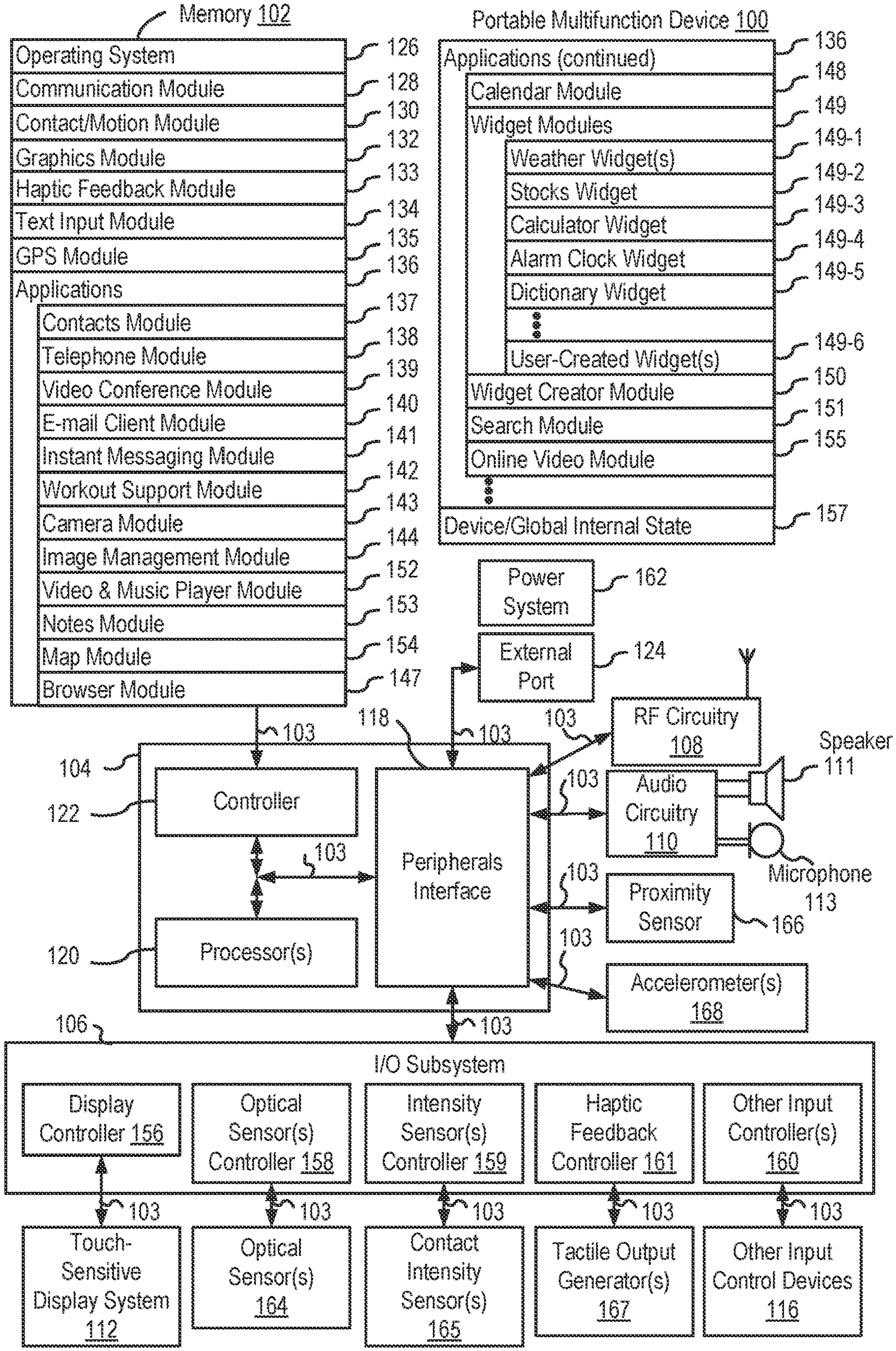
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods for interaction between the electronic device and an input device (e.g., from a stylus or other input device). Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, and/or rocker buttons), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/48,264, "Gestures For Touch Sensitive Input Devices," filed Jan. 31, 2005; (5) U.S. patent application Ser. No. 11/38,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, device 100 is a portable computing system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., an integrated display, and/or touch screen 112). In some embodiments, the display generation component is separate from the computer system (e.g., an external monitor, and/or a projection system). As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
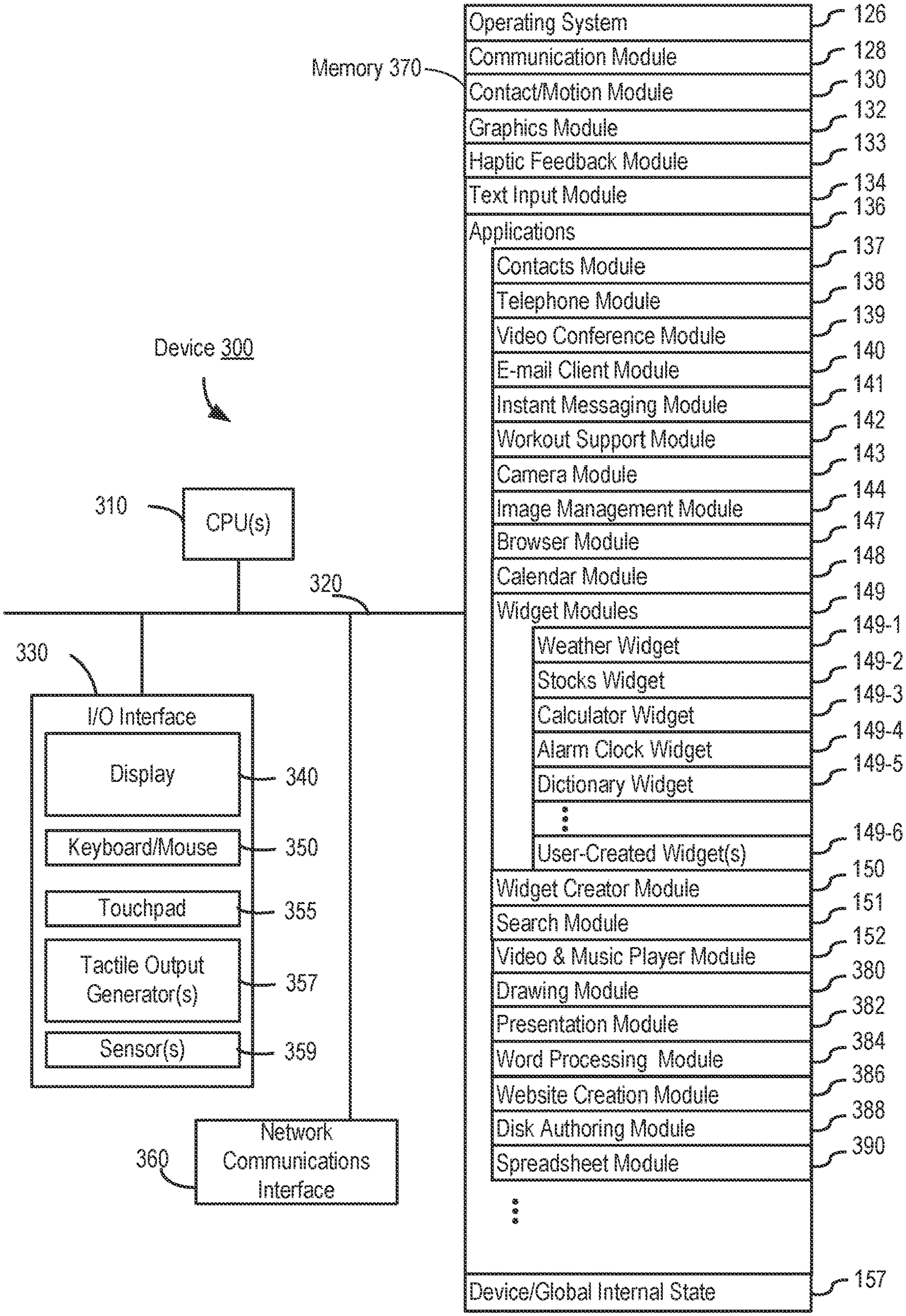
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, and/or power management) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), and/or FIREWIRE) is adapted for coupling directly to other devices or indirectly over a network (e.g., the Internet, and/or wireless LAN). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications, one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, and/or to-do lists) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,67, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
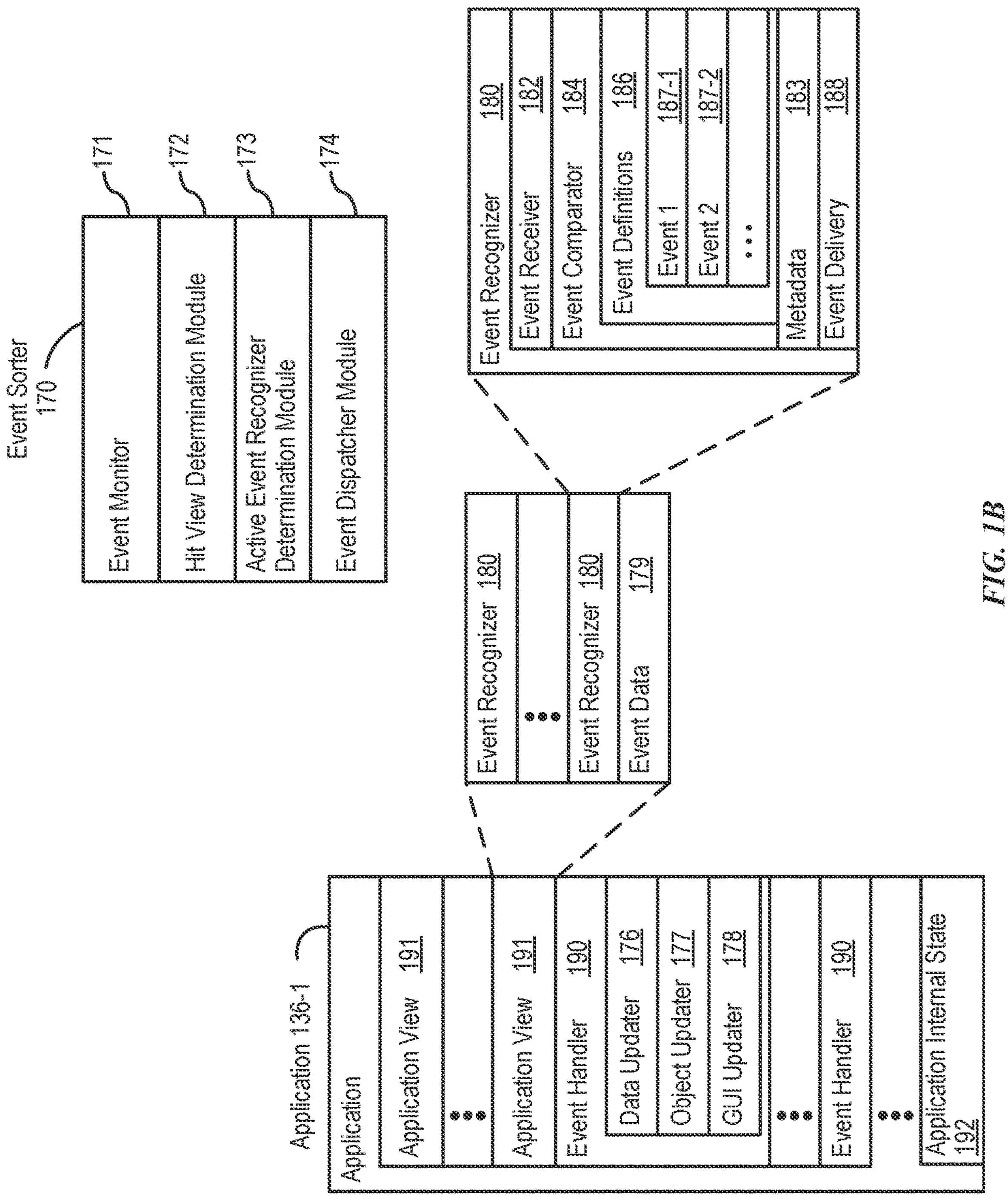
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object.

In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, and/or scrolls on touchpads; pen stylus inputs; movement of the device; oral instructions; detected eye movements; biometric inputs; and/or any combination thereof are optionally utilized as inputs corresponding to sub-events which define an event to be recognized.

Figure 2:
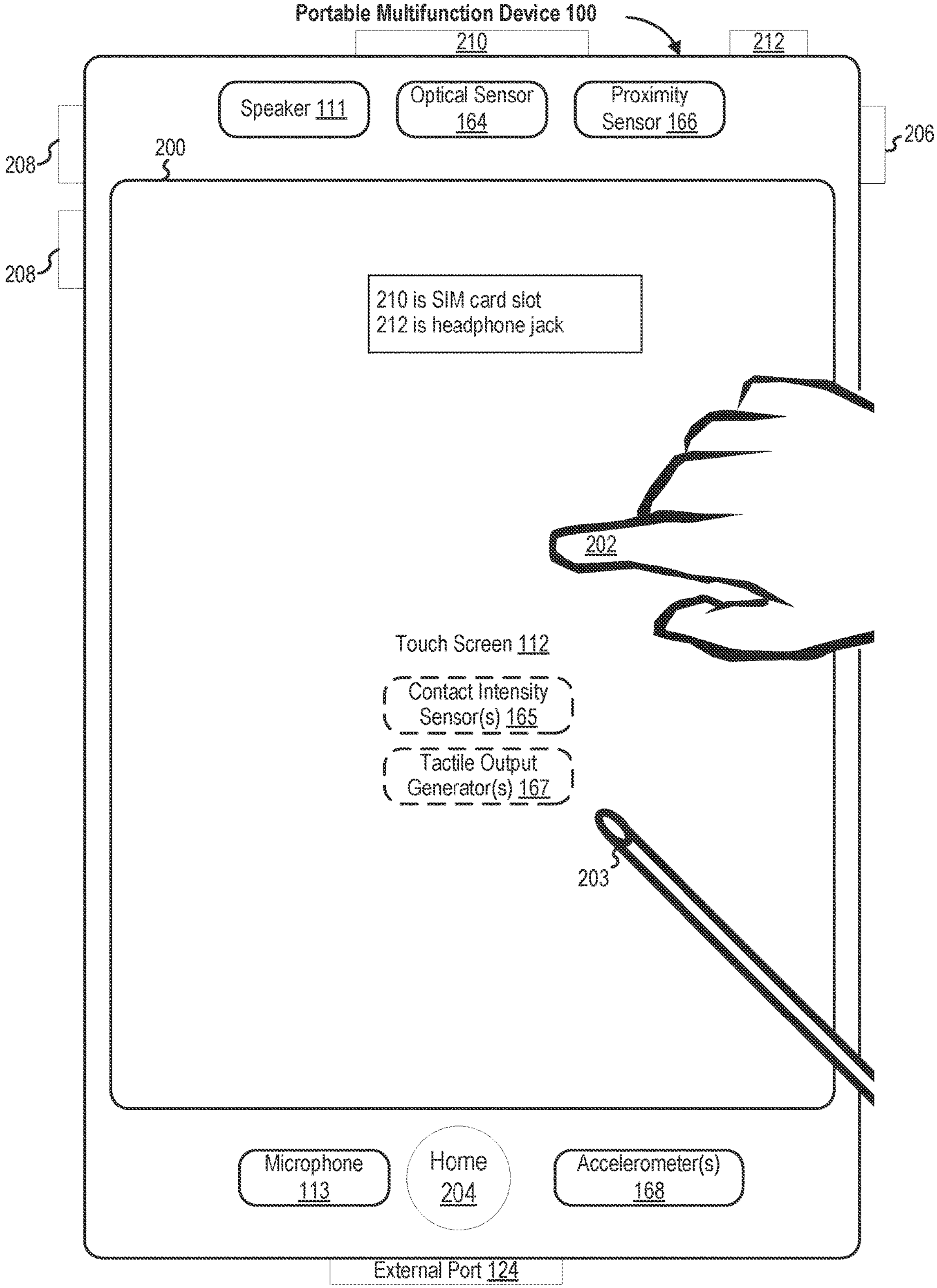
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
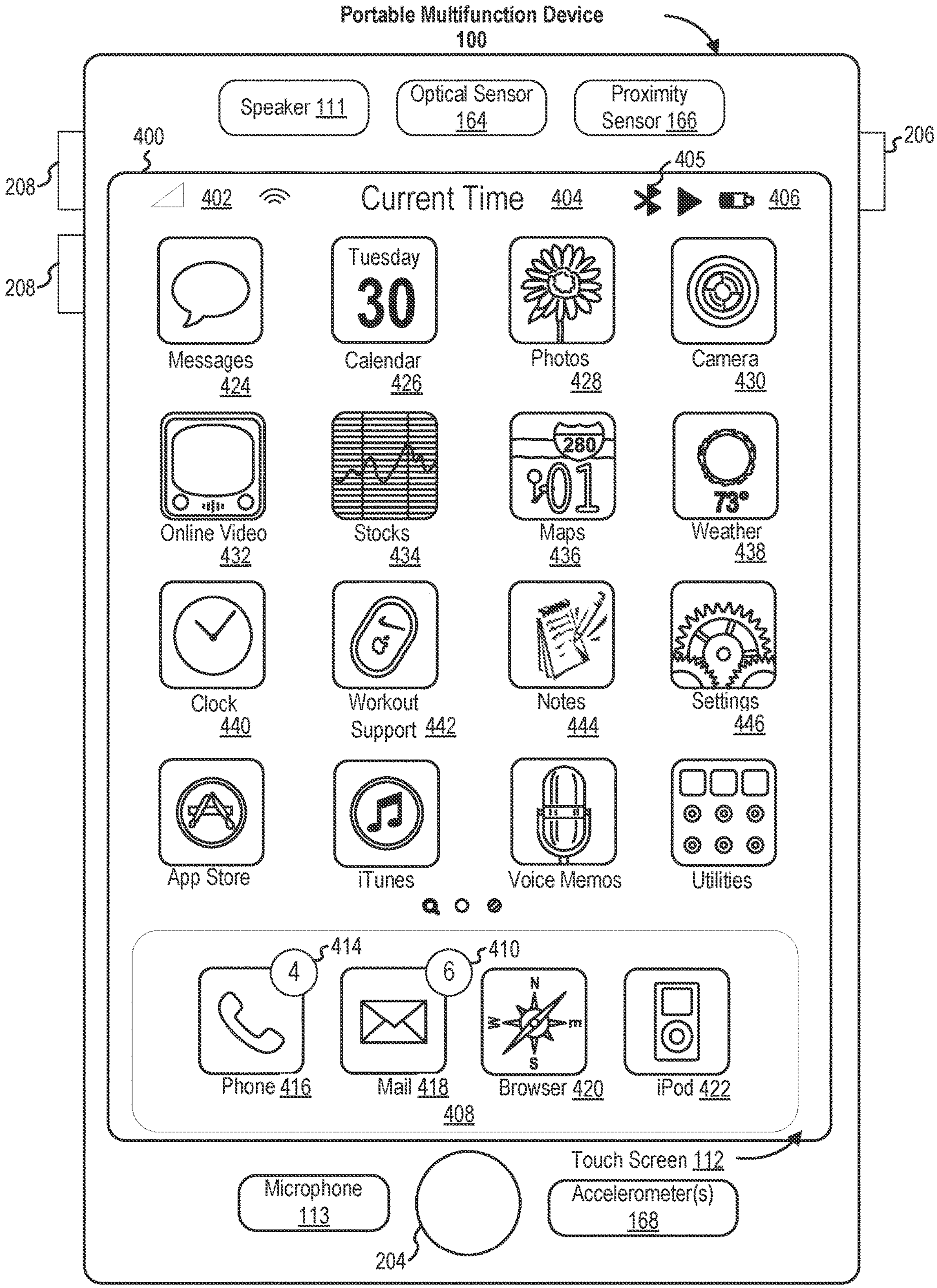
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
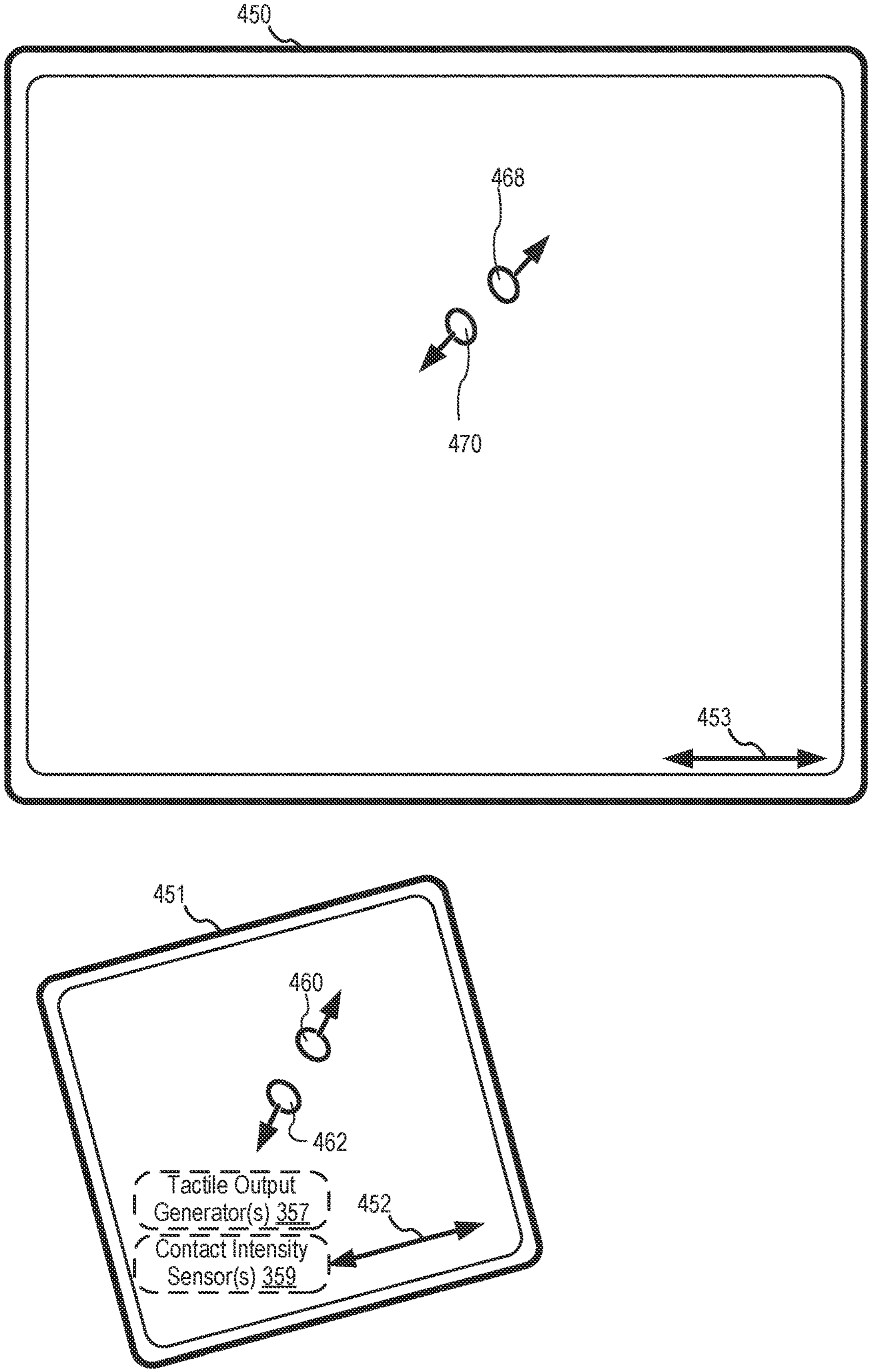
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
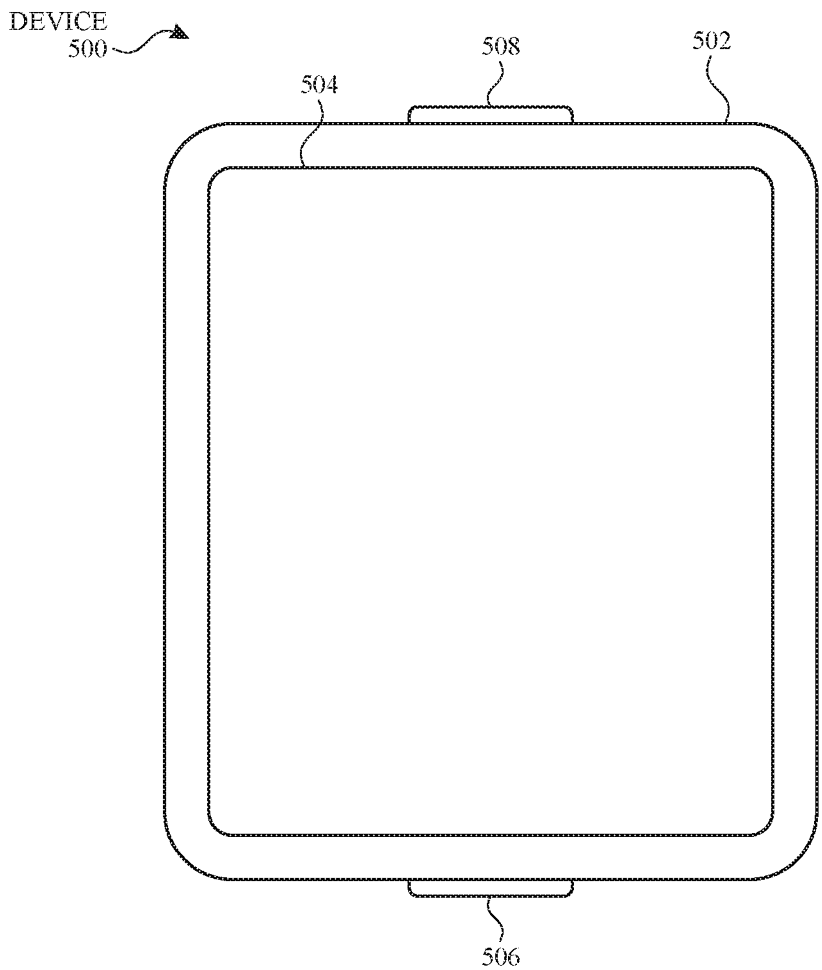
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
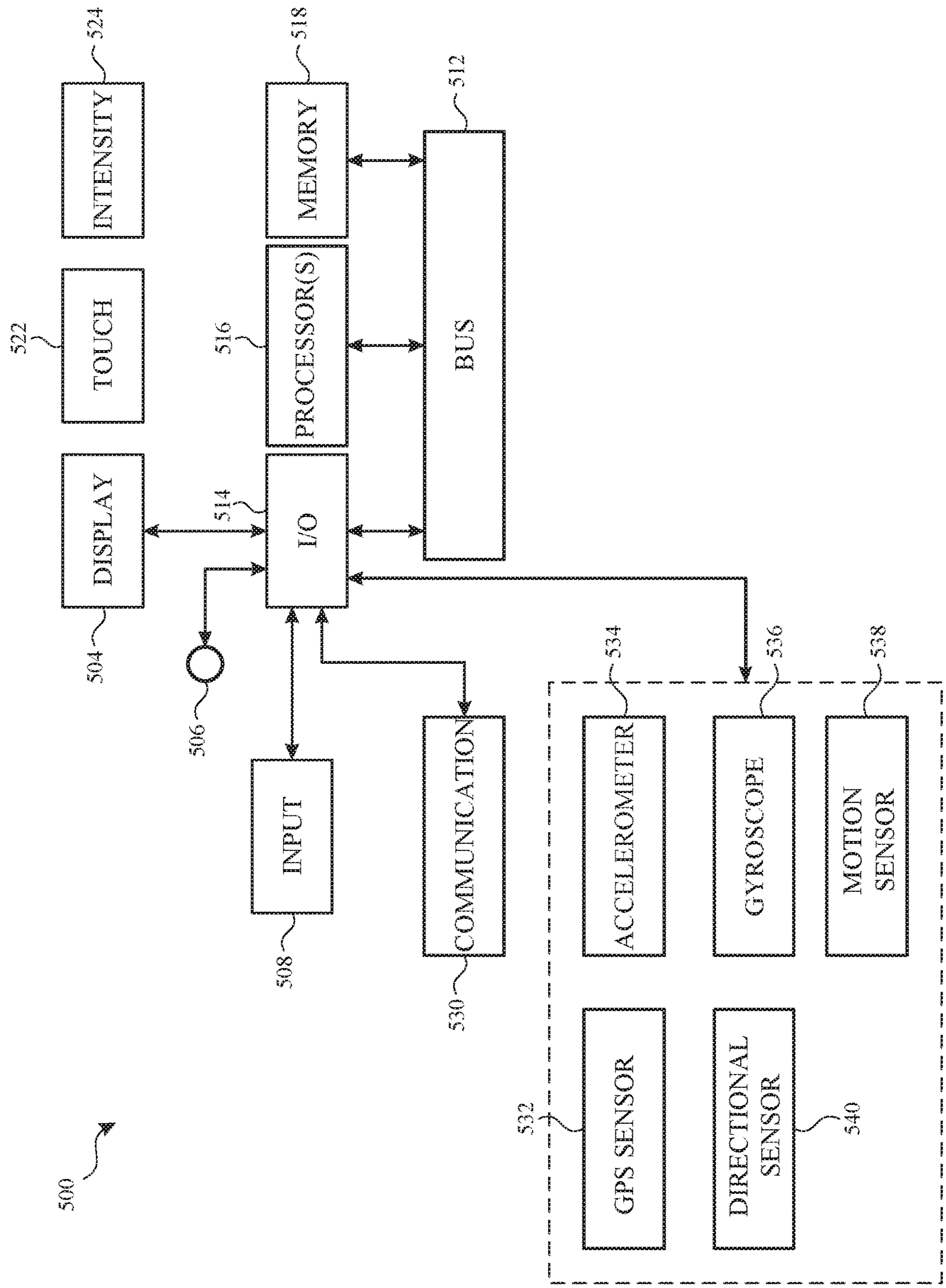
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, and 1300 (FIGS. 7, 9, 11, and 13). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
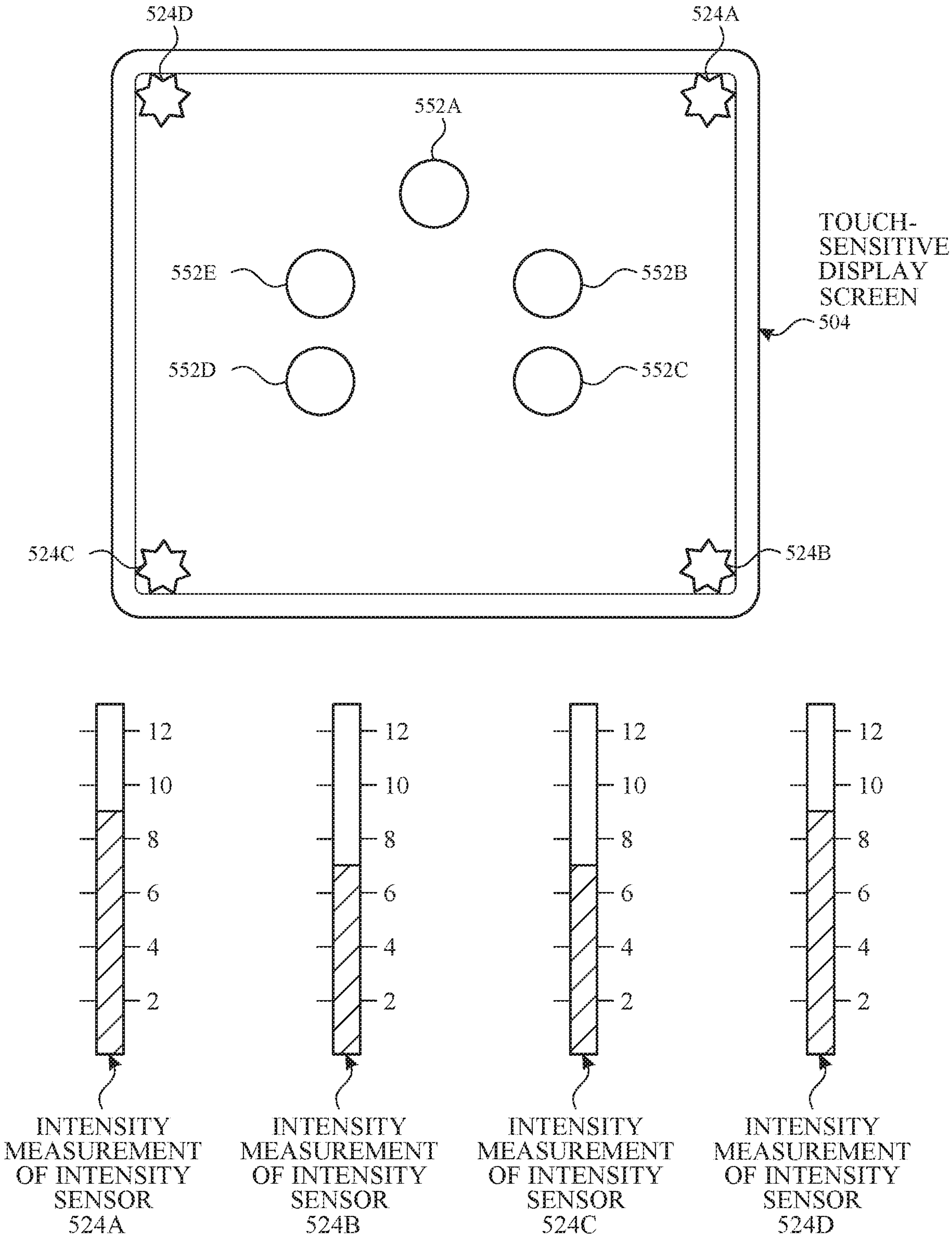
FIGS. 5C-5D illustrate exemplary components of a personal electronic device having a touch-sensitive display and intensity sensors in accordance with some embodiments.
Figure 5D:
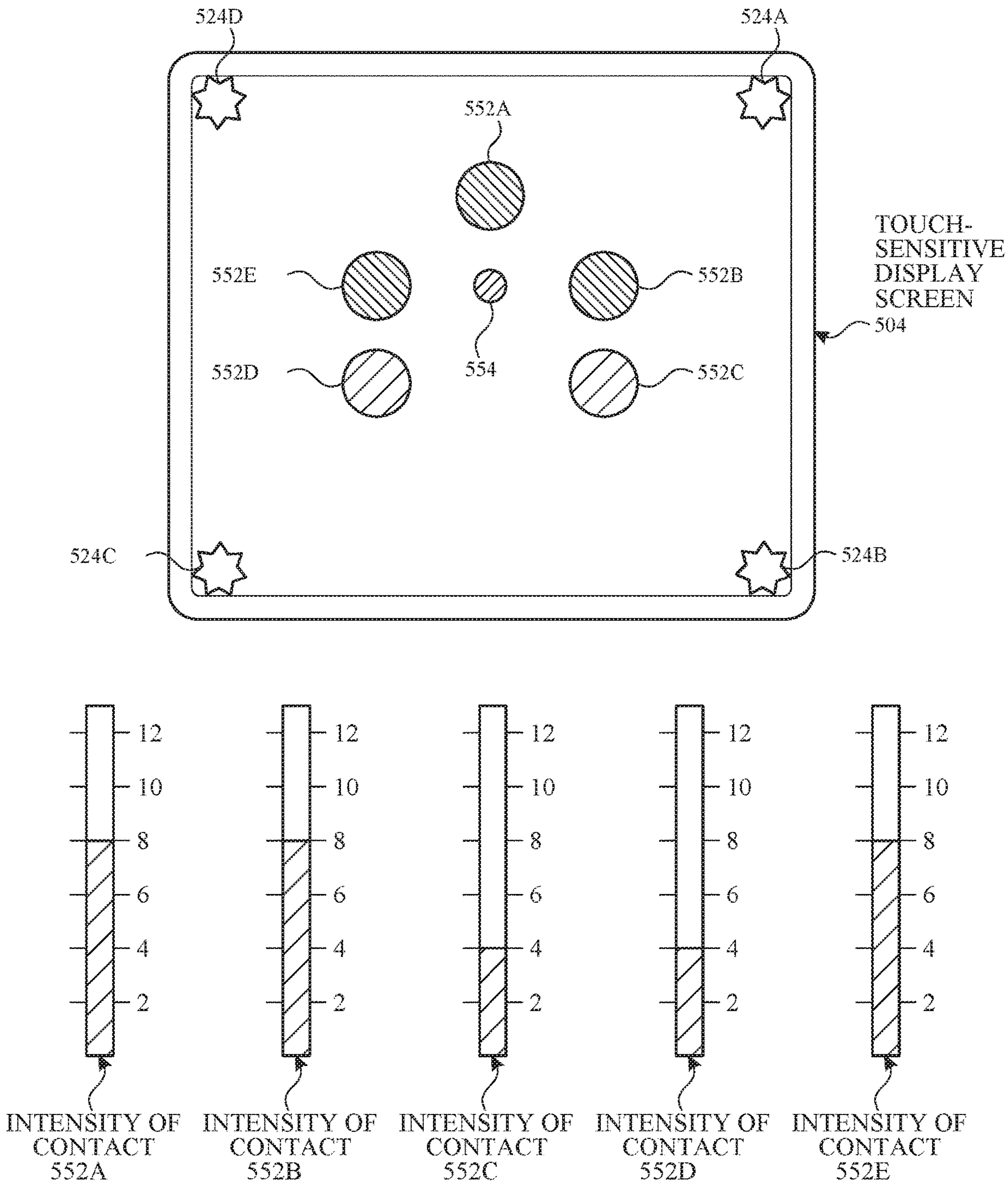

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
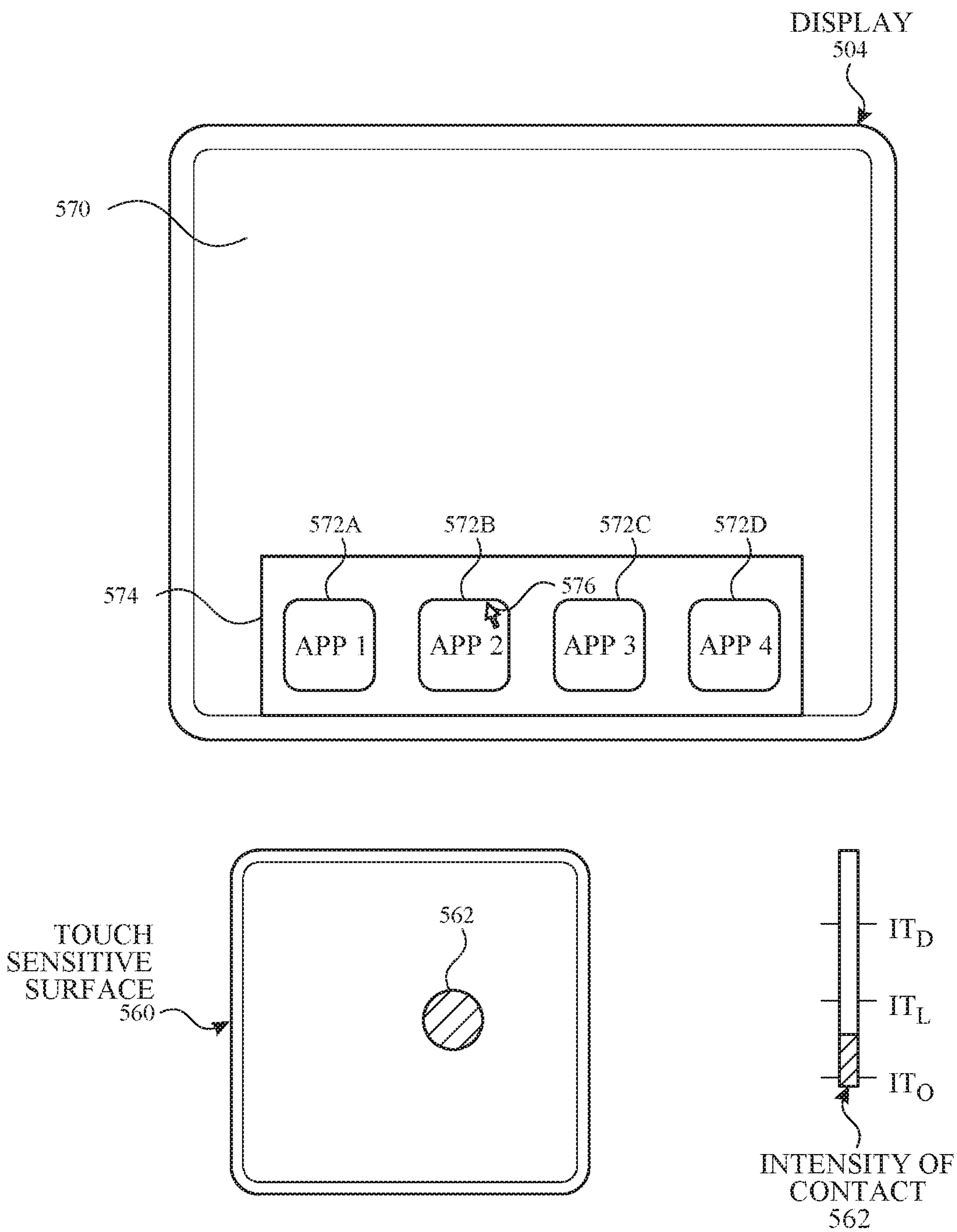
FIGS. 5E-5H illustrate exemplary components and user interfaces of a personal electronic device in accordance with some embodiments.
Figure 5F:
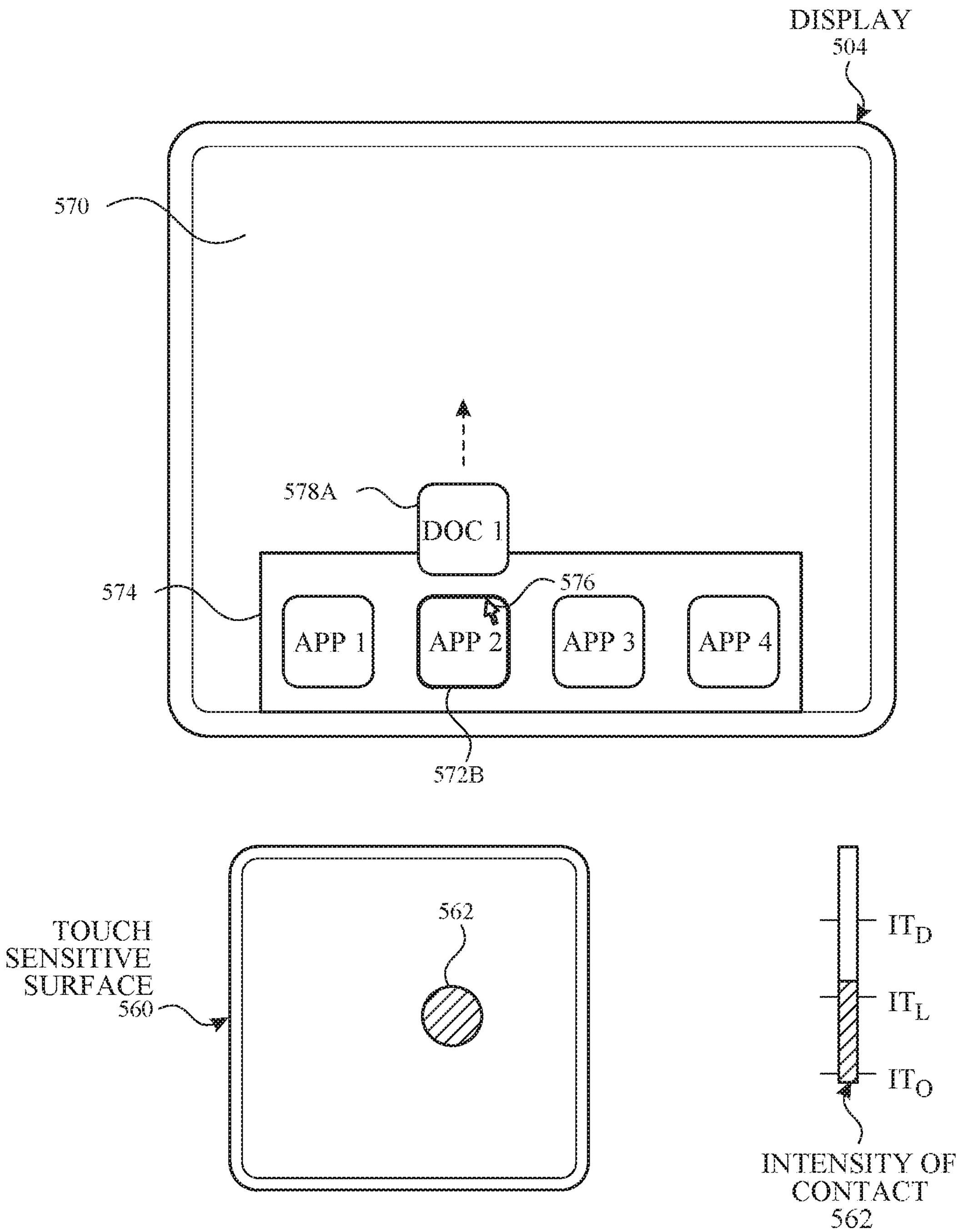
Figure 5G:
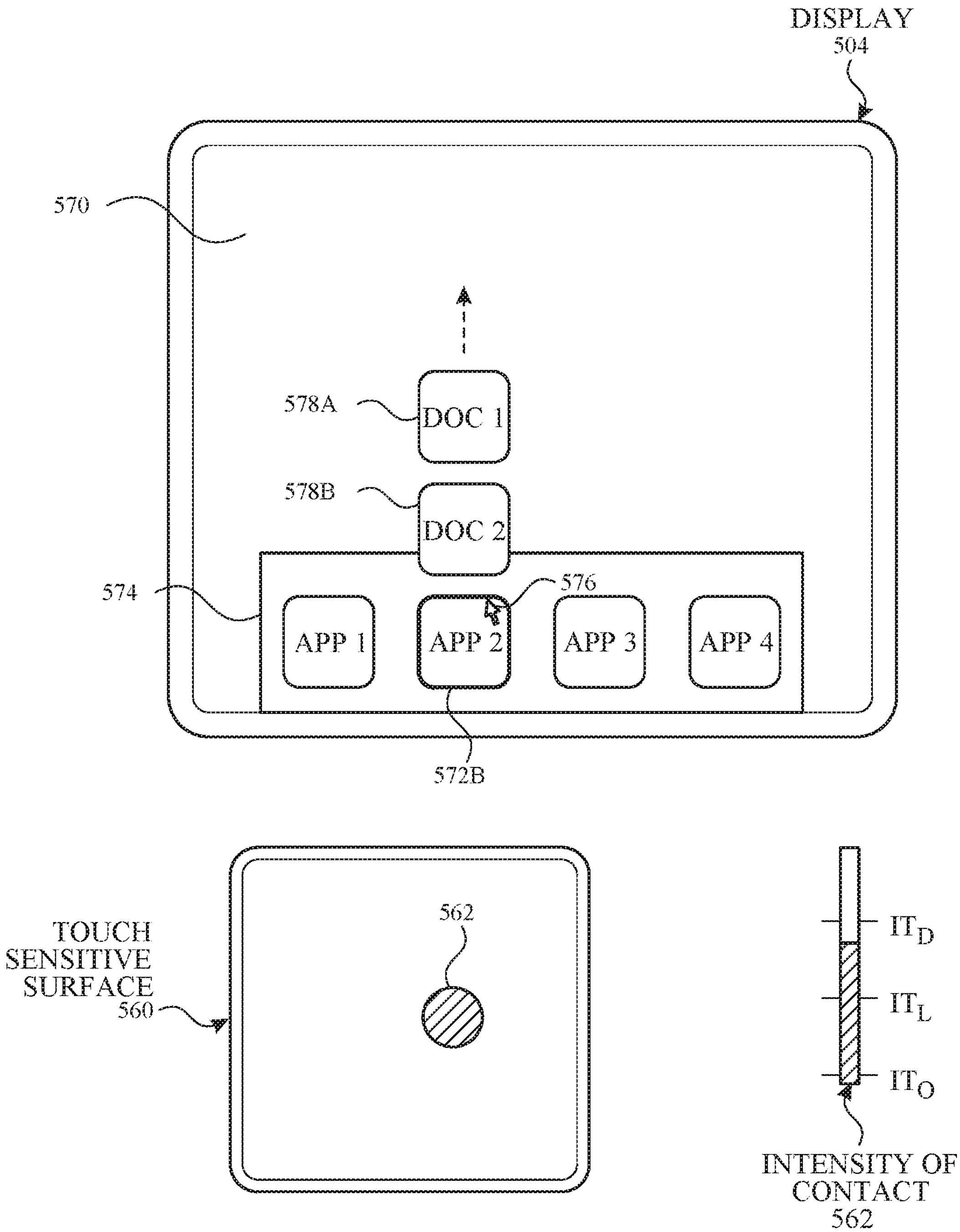
Figure 5H:
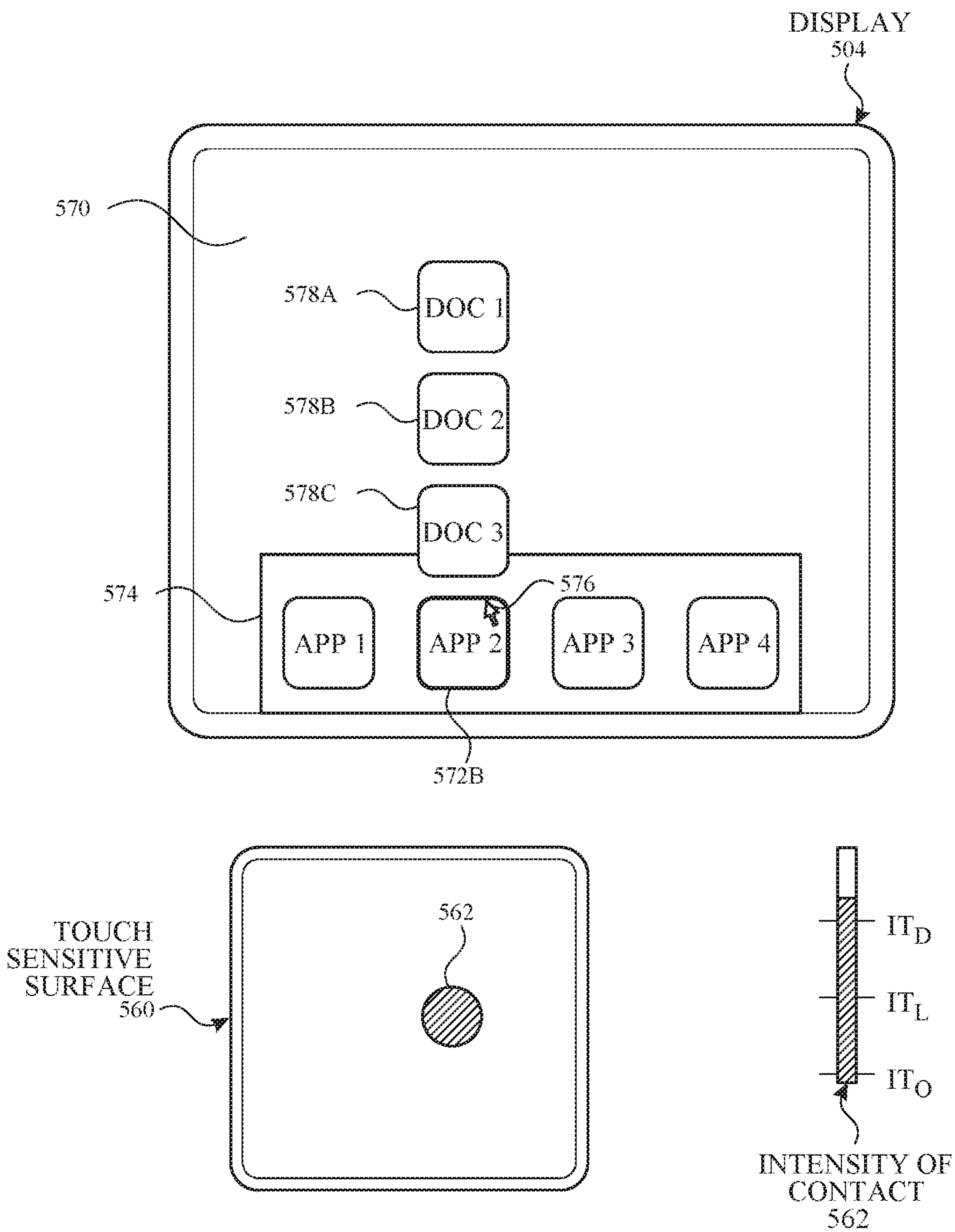

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5I. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

Figure 5I:
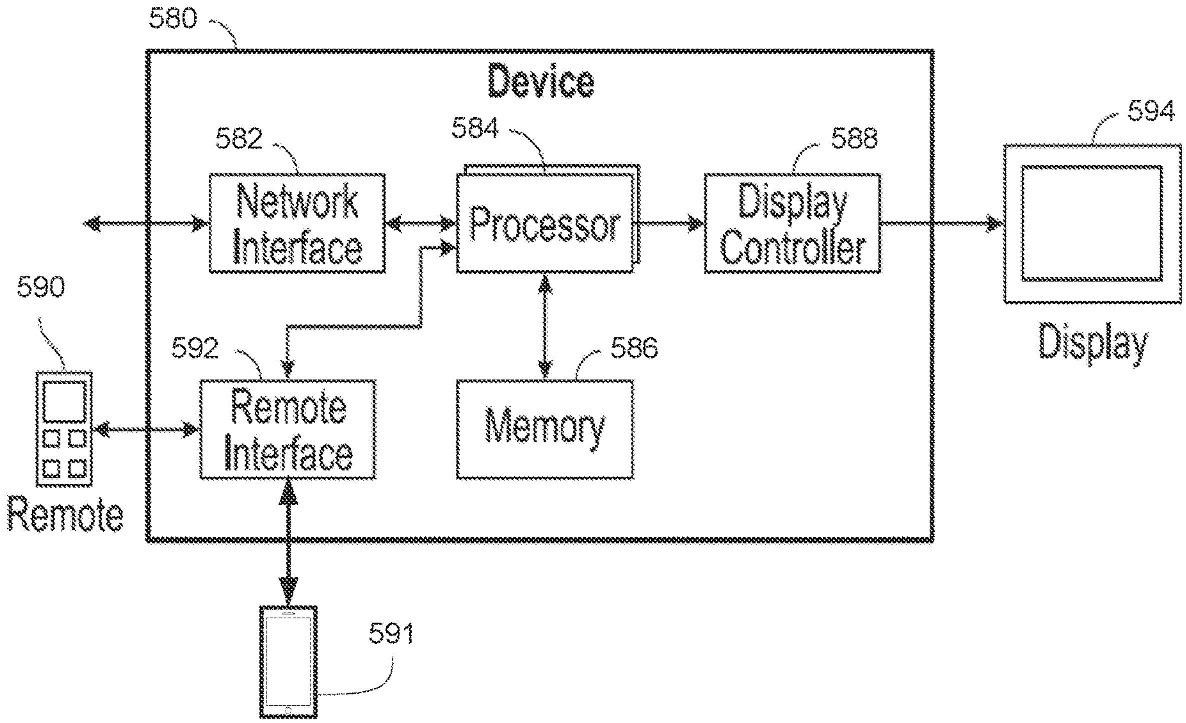
FIG. 5I illustrates a block diagram of an exemplary architectures for devices according to some embodiments of the disclosure.

FIG. 5I illustrates a block diagram of an exemplary architecture for the device 580 according to some embodiments of the disclosure. In the embodiment of FIG. 5I, media or other content is optionally received by device 580 via network interface 582, which is optionally a wireless or wired connection. The one or more processors 584 optionally execute any number of programs stored in memory 586 or storage, which optionally includes instructions to perform one or more of the methods and/or processes described herein (e.g., methods 700, 900, 1100, 1300, 1500, and 1700).

In some embodiments, display controller 588 causes the various user interfaces of the disclosure to be displayed on display 594. Further, input to device 580 is optionally provided by remote 590 via remote interface 592, which is optionally a wireless or a wired connection. In some embodiments, input to device 580 is provided by a multifunction device 591 (e.g., a smartphone) on which a remote control application is running that configures the multifunction device to simulate remote control functionality, as will be described in more detail below. In some embodiments, multifunction device 591 corresponds to one or more of device 100 in FIGS. 1A and 2, device 300 in FIG. 3, and device 500 in FIG. 5A. It is understood that the embodiment of FIG. 5I is not meant to limit the features of the device of the disclosure, and that other components to facilitate other features described in the disclosure are optionally included in the architecture of FIG. 5I as well. In some embodiments, device 580 optionally corresponds to one or more of multifunction device 100 in FIGS. 1A and 2, device 300 in FIG. 3, and device 500 in FIG. 5A; network interface 582 optionally corresponds to one or more of RF circuitry 108, external port 124, and peripherals interface 118 in FIGS. 1A and 2, and network communications interface 360 in FIG. 3; processor 584 optionally corresponds to one or more of processor(s) 120 in FIG. 1A and CPU(s) 310 in FIG. 3; display controller 588 optionally corresponds to one or more of display controller 156 in FIG. 1A and I/O interface 330 in FIG. 3; memory 586 optionally corresponds to one or more of memory 102 in FIG. 1A and memory 370 in FIG. 3; remote interface 592 optionally corresponds to one or more of peripherals interface 118, and I/O subsystem 106 (and/or its components) in FIG. 1A, and I/O interface 330 in FIG. 3; remote 590 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 594 optionally corresponds to one or more of touch-sensitive display system 112 in FIGS. 1A and 2, and display 340 in FIG. 3.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Hover Events and Controls

Users interact with electronic devices in many different manners, including using peripheral devices in communication with such devices. In some embodiments, an electronic device receives indications of a peripheral device (e.g., a stylus) proximate to, but not contacting a surface, such as a touch-sensitive surface in communication with the electronic device. The embodiments described herein provide ways in which the electronic device responds to such indications and, for example, providing a visual preview or other indication of an interaction with the electronic device based on a current position of the input device relative to the surface, thus enhancing interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6B:
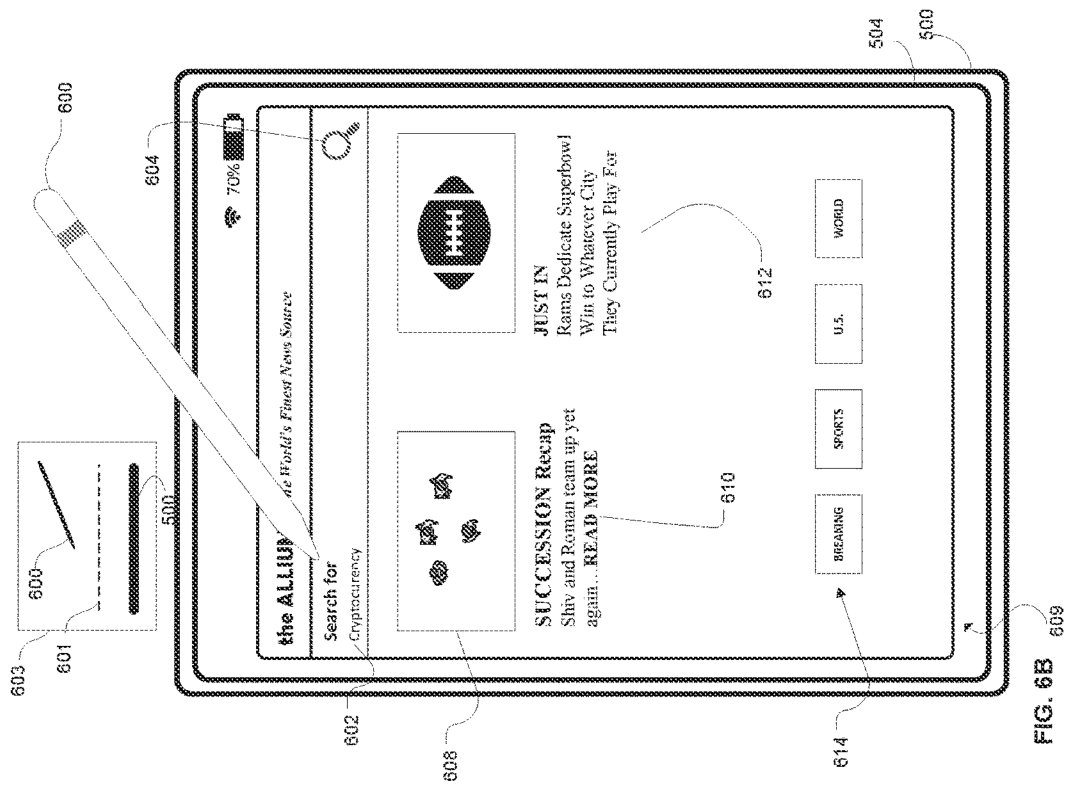
FIGS. 6A-6BF illustrate exemplary ways in which an electronic device displays additional controls and/or information when an input device such as a stylus is hovering over a user interface displayed by the electronic device in accordance with some embodiments.
Figure 6A:
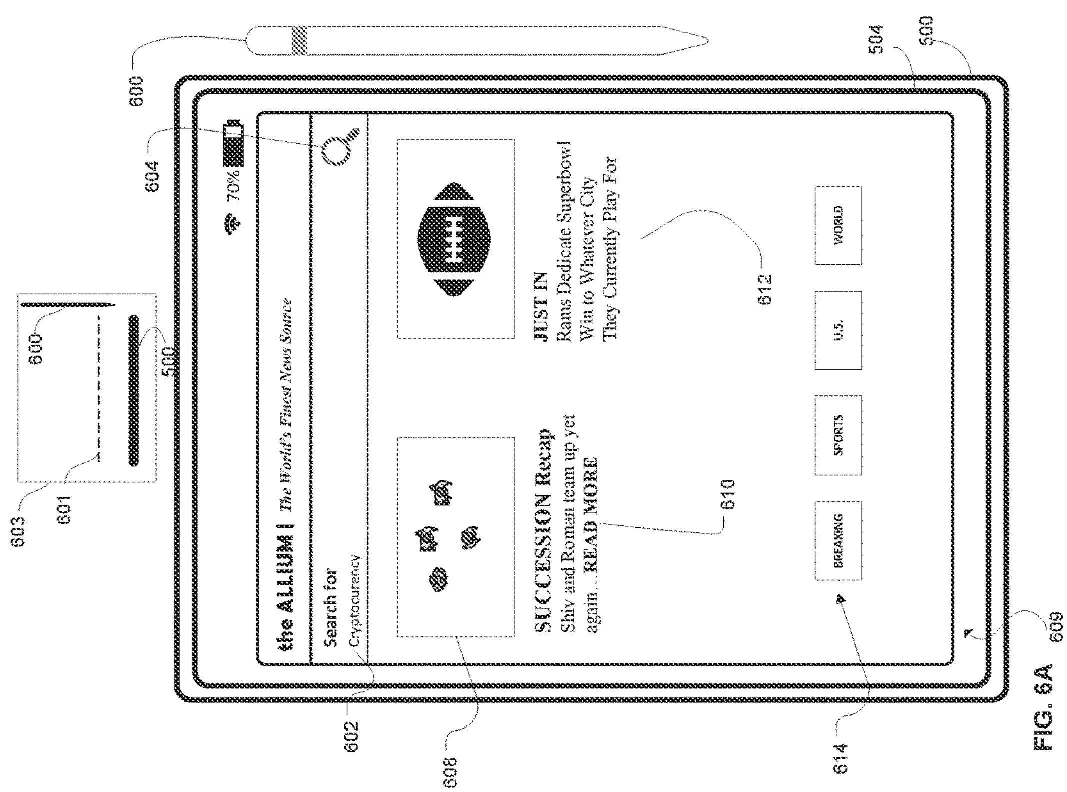

FIGS. 6A-6BF illustrate exemplary ways in which an electronic device displays selectable options and/or information in response to detecting an input device hovering over a surface associated with the electronic device in accordance with some embodiments. The embodiments in these figures are used to illustrate the processes described below, including the processes described with reference to FIGS. 7A-7G.

FIG. 6A illustrates electronic device 500 displaying user interface 609 (e.g., via a display device and/or via a display generation component). In some embodiments, user interface 609 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500. In some examples, a surface (e.g., a touch-sensitive surface) is in communication with device 500. For example, in FIG. 6A, device 500 includes touch screen 504 that displays user interface and detects touch or hover interactions with device 500.

In some embodiments, user interface 609 is a user interface of an application or a user interface in which media browsing, input, and interaction are able to be performed (e.g., for composing drawings, viewing drawings, modifying and/or interacting with font-based and/or handwritten text, navigating content such as web-based content, and/or interacting with media content.). In some embodiments, the application is an application installed on device 500.

In FIG. 6A, user interface 609 includes elements for media browsing and interaction. In some embodiments, device 500 is in communication with an input device, such as stylus 600. In some embodiments, device 500 is configured to receive an indication of contact between stylus 600 and a surface such as touch screen 504. In some embodiments, device 500 and/or stylus 600 are further configured to transmit and/or receive indications of proximity between the surface (e.g., touch screen 504) and stylus 600. For example, glyph 603 includes a hover distance threshold 601. Although threshold 601 is illustrated as a line extending parallel to touch screen 504, it is understood that such illustration is merely exemplary and not in any way limiting. In some embodiments, a "hover event" as referred to herein includes an instance of a respective portion of an input device (e.g., the tip of stylus 600) moving to a position less than a threshold distance (e.g., threshold 601 such as 0.5 cm, 1 cm, 3 cm, 5 cm, or 10 cm) from a surface (e.g., touch screen 504) while not contacting the surface. In some embodiments, a determination that a position of a projection of a respective portion of the input device (e.g., a perpendicular projection of a tip of a stylus 600) relative to the surface corresponds to a position of a user interface element (e.g., a selectable option, text, and/or graphical objects) is referred to herein as the location of the input device corresponding to the user interface element (e.g., the tip of a stylus corresponding to an object). Moreover, as referred to herein, display or modification of one or more portions of the user interface corresponding to a user interface object in response to a hover event optionally describes a hover event between the input device and the surface at a position in the user interface corresponding to the user interface object.

As shown in FIG. 6A, user interface 609 includes a plurality of interactive and non-interactive visual elements. For example, text 602 includes editable font-based text in a text entry region (e.g., a search field). In response to a hover event including stylus 600 corresponding to the text entry region, a text entry cursor preview is displayed, as will be described later. In some embodiments, icon 604 is a selectable to initiate one or more operations, such as a search query based on text 602, and is visually emphasized in response to a hover event as will be described later. In some embodiments, media player 608 is interactable to control playback of the corresponding media, and in response to a hover event, is visually modified, as will be described later. In some embodiments, link 610 is selectable to initiate execution of one or more operations such as display of linked web content and is visually emphasized in response to a hover event, as will be described later. In some embodiments, text 612 is non-editable text (e.g., is text that is part of an image that includes the image of the football and the image of text 612), and a selection cursor is displayed in response to a hover event, as will be described later. In some embodiments, respective elements within selectable options 614 are selectable to view corresponding linked content and are displayed with additional selectable options to navigate the respective elements in response to a hover event, as will be described later. While user interface 609 is representative of a view of electronic device 500 from an overhead position (e.g., normal with respect to a plane that is coplanar with touch screen 504), glyph 603 is representative of a view of electronic device 500 from a respective side of electronic device 500 (e.g., parallel, or nearly parallel with respect to a plane that is coplanar with touch screen 504). It is understood that such representations are merely exemplary for illustrative purposes to indicate hover events and interactions as described herein and are not limiting in any way.

In FIG. 6B, stylus 600 is moved to a position over touch screen 504, but beyond threshold 601 as seen in glyph 603. As referred to herein, respective positions of stylus 600 beyond threshold 601 are described as outside a hover threshold, as referred to herein. Because stylus 600 is beyond threshold 601, device 500 does not modify user interface 609 in response to such placement of stylus over touch screen 504.

Figure 6C:
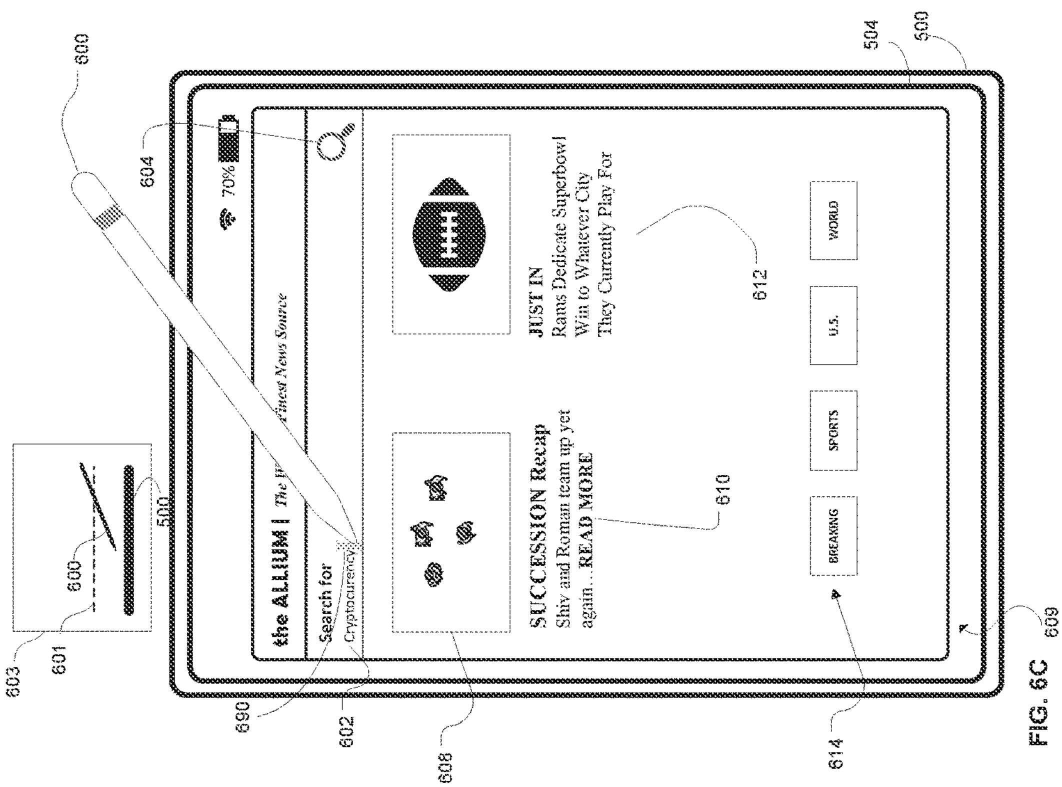

In FIG. 6C, stylus 600 is moved to a position within hover threshold 601, but not contacting touch screen 504, at a location corresponding to the search field that includes text 602. In response to the hover event, text insertion preview cursor 690 is displayed. In some embodiments, while stylus 600 remains within the hover threshold 601 and corresponds to a position within the text entry region including text 602, text insertion preview cursor 690 is moved in the user interface based on movement of stylus 600. Text insertion preview cursor 690 optionally indicates the location in user interface 609 at which a text insertion cursor will be placed and/or positioned in response to device 500 detecting stylus touch down on and contact touch screen 504. In FIG. 6C, in text insertion preview cursor 690 is displayed at the end of text 602 in the search field.

Figure 6D:
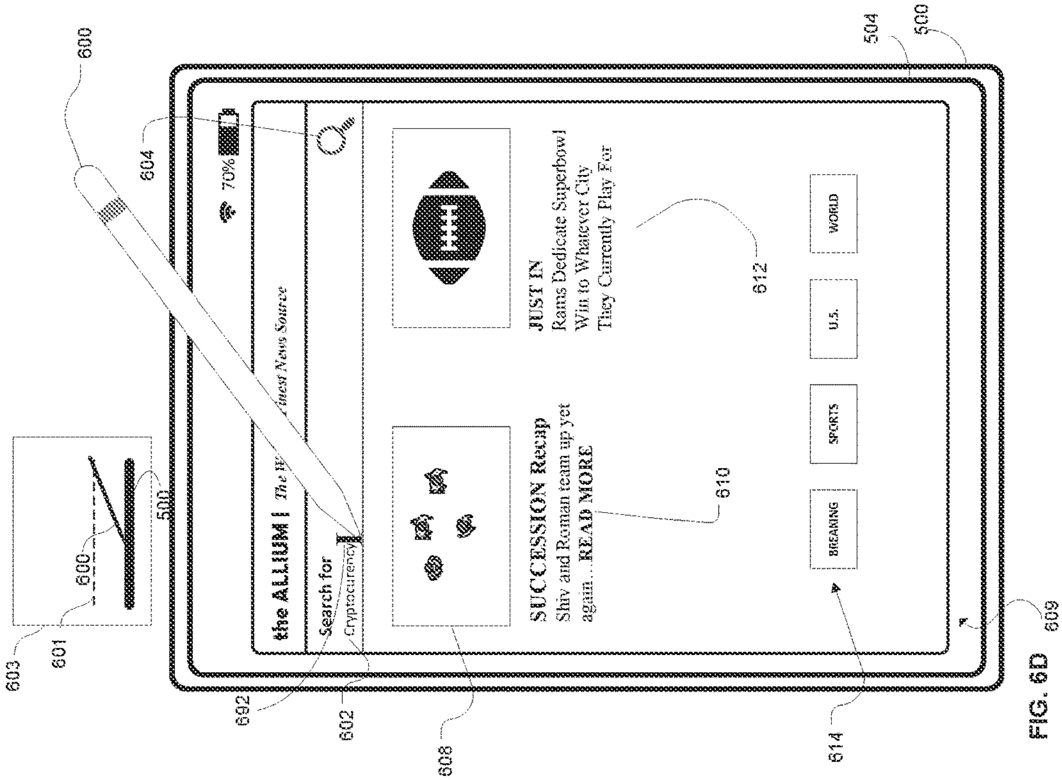

In FIG. 6D, as shown in glyph 603, stylus 600 contacts touch screen 504 at the position of text insertion preview cursor 690 shown in FIG. 6C. In response to the contact, display of text insertion preview cursor 690 is ceased and a text insertion cursor 692 is displayed at the end of text 602, as shown in FIG. 6D. In some embodiments, text insertion preview cursor 690 and text insertion cursor 692 are displayed with different visual appearances (e.g., different scale, color, opacity, shadows, border, and/or lighting effect) to differentiate between the preview and the insertion of the text insertion cursor. In some embodiments, after inserting text insertion cursor 692, stylus 600 is removed from the hover threshold (e.g., to a position beyond threshold 601). In response to the moving of stylus 600 outside of threshold 601, display of text insertion cursor 692 is maintained, as shown in FIG. 6E. Further, in FIG. 6E, device 500 has detected text input (e.g., from an external keyboard, from a soft keyboard and/or from voice input), and in response displays the new text corresponding to the text input (e.g., Mining) at the position of text insertion cursor 692. In some embodiments, while displaying text insertion cursor 692, text insertion preview cursor 690 is concurrently displayed at the location of stylus in user interface 609 in response to stylus 600 moving into the hover threshold 601.

Figure 6F:
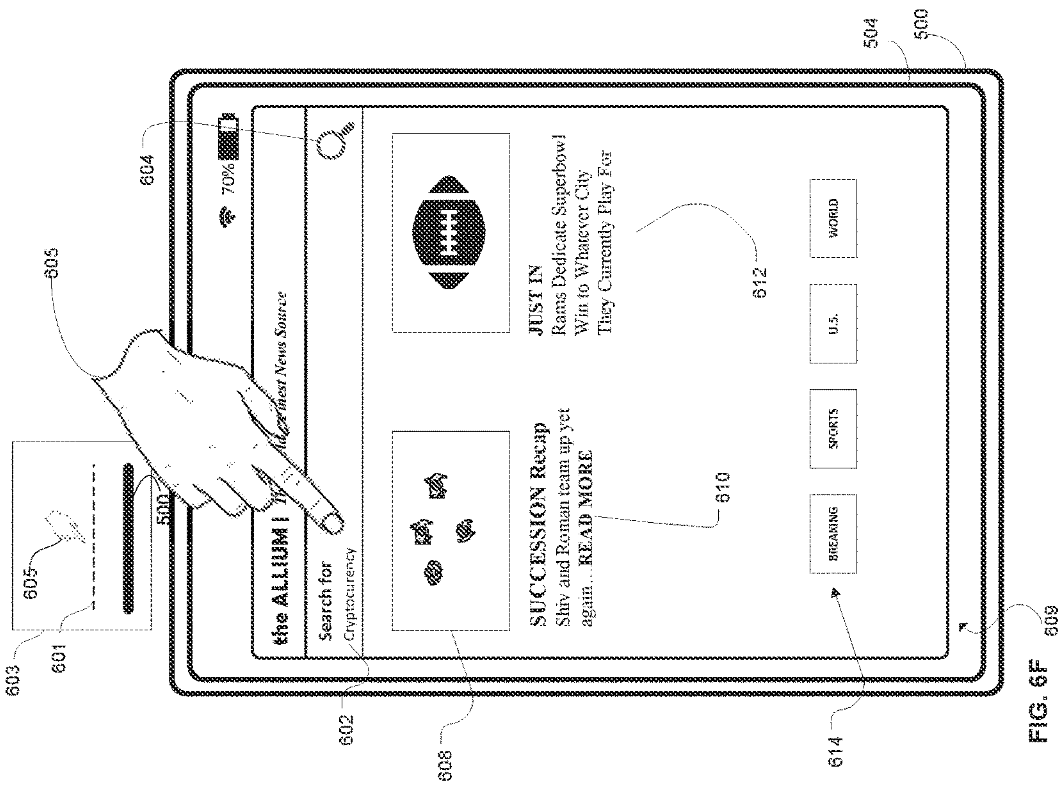
Figure 6E:
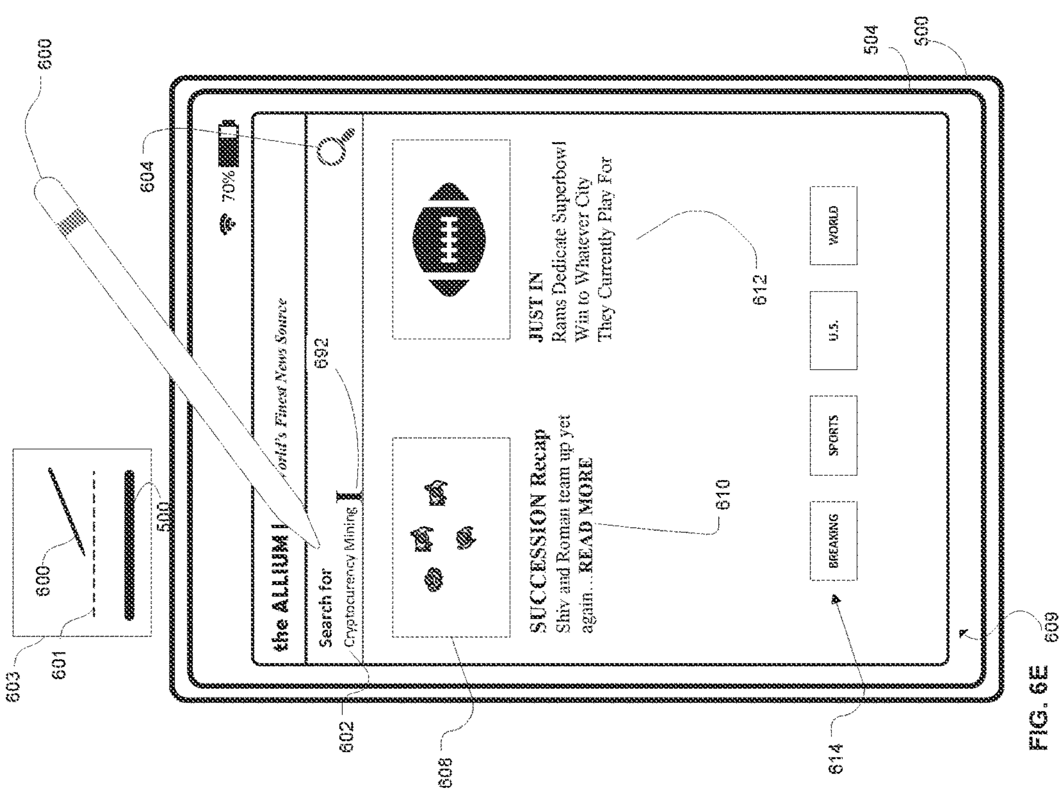
Figure 6H:
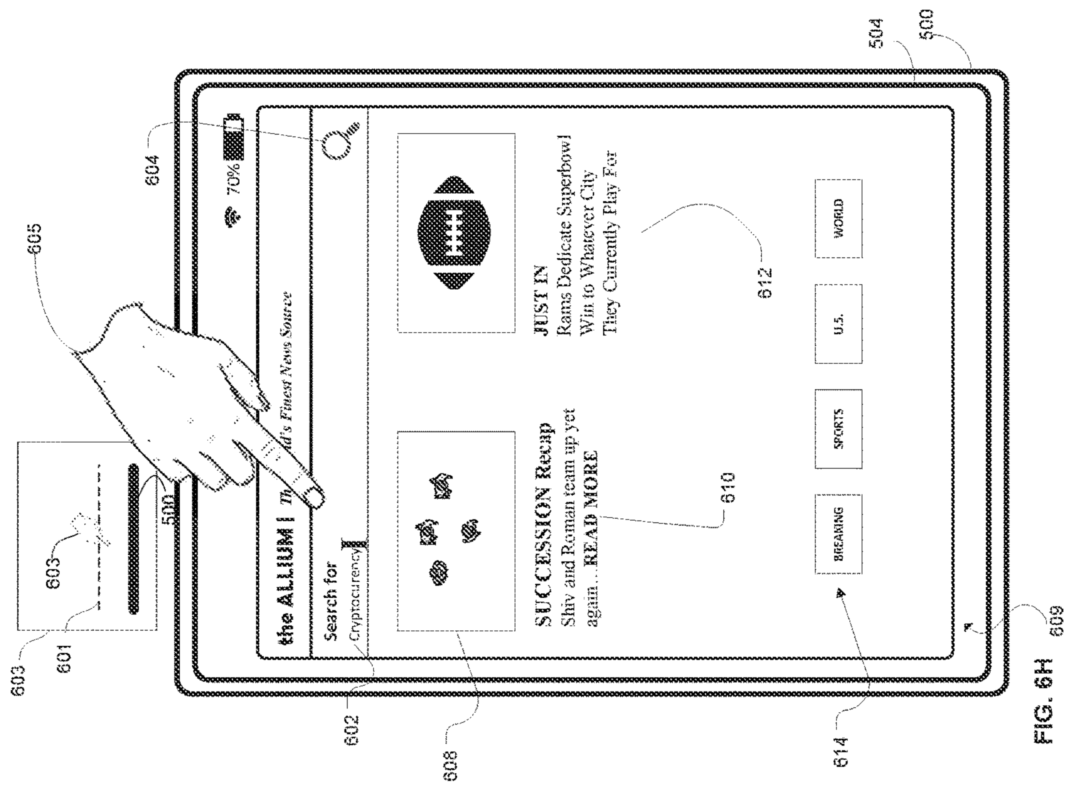
Figure 6G:
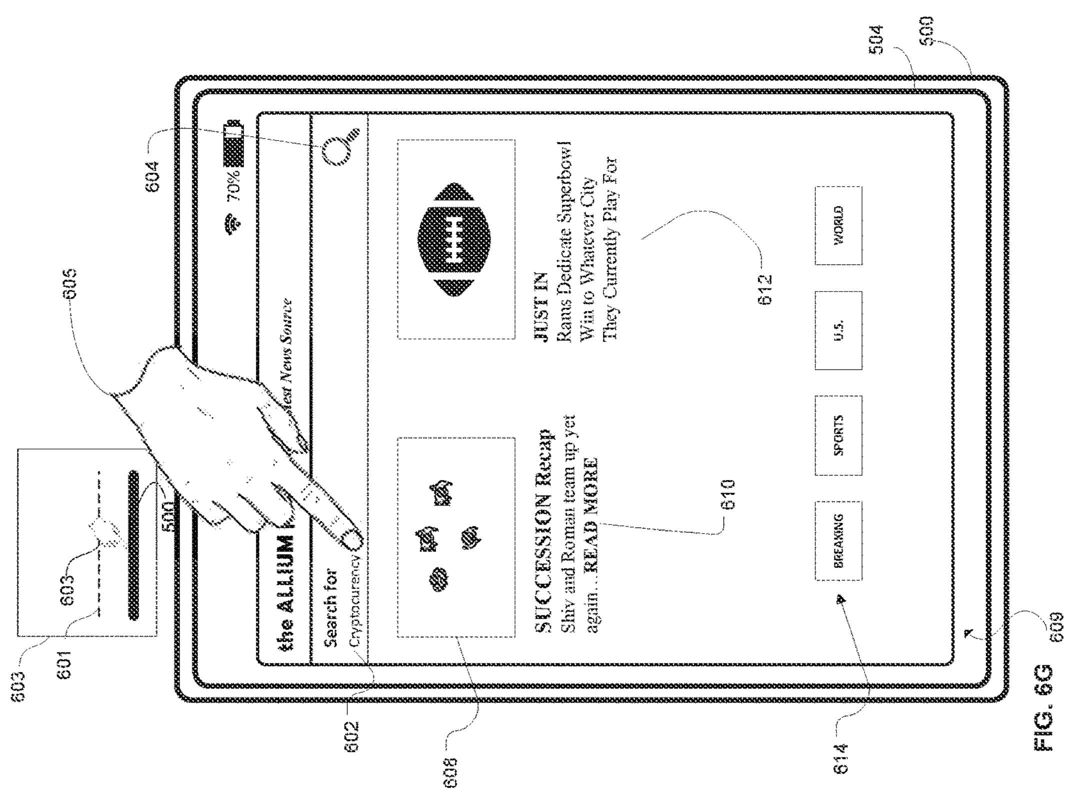

In FIG. 6F-6H, a respective object is moved within a threshold distance 601 of touch screen 504 and subsequently contacts the touch screen 504. FIG. 6F illustrates hand and/or finger 605 positioned outside the hover threshold 601. Hand and/or finger 605 is positioned at a location of the search field including text 602, but device 500 does not modify the display of text 602 or user interface 609 more generally, because hand and/or finger 605 is outside of threshold distance 601 and/or because hand and/or finger 605 is not stylus 600. If device 500 detects movement of hand and/or finger 605 towards touch screen 504 within hover threshold 601, device 500 optionally determines that hand 605 is not an input device (e.g., is not stylus 600), and forgoes display of text insertion preview cursor 690 (and/or other modifications of user interface 609). However, in FIG. 6H, device 500 detects contact of a respective portion (e.g., a finger) of hand 605 contacting a position inside the search field after text 602, and in response, device 500 inserts text insertion cursor 692 at the end of text 602 as shown in FIG. 6H. In some embodiments, text insertion cursor 692 is displayed at a first position in the search field (e.g., at the end of text 602), and in response to detecting a contact of hand and/or finger 605 at a second position of text 602 (e.g., in the middle of text 602), display of text insertion cursor 692 at the first portion is ceased and text insertion cursor 692 is displayed at the position of the contact corresponding to the second portion of text 602.

Figure 6J:
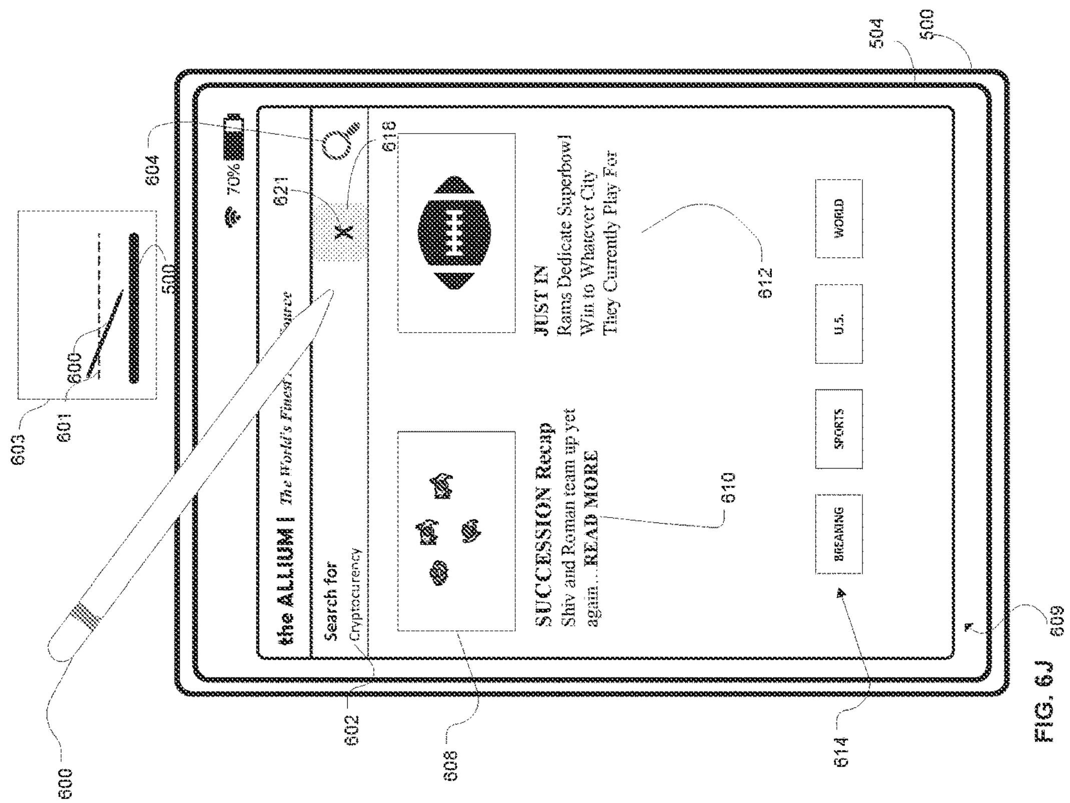
Figure 6I:
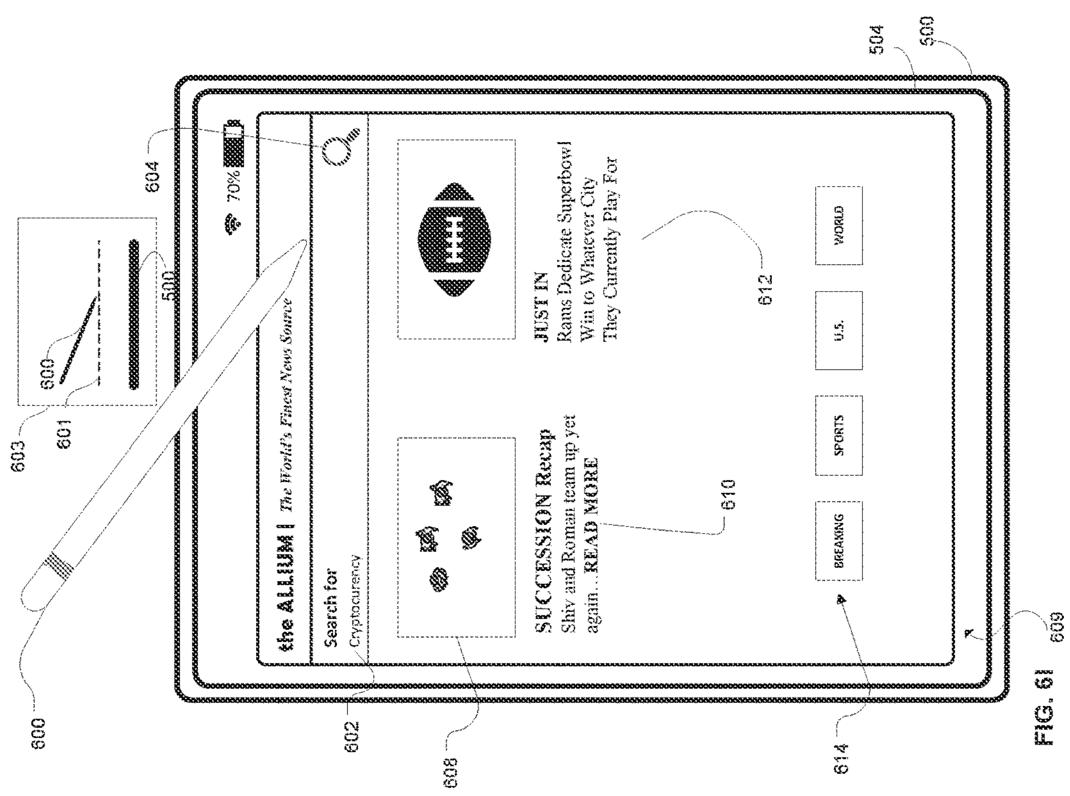
Figure 6L:
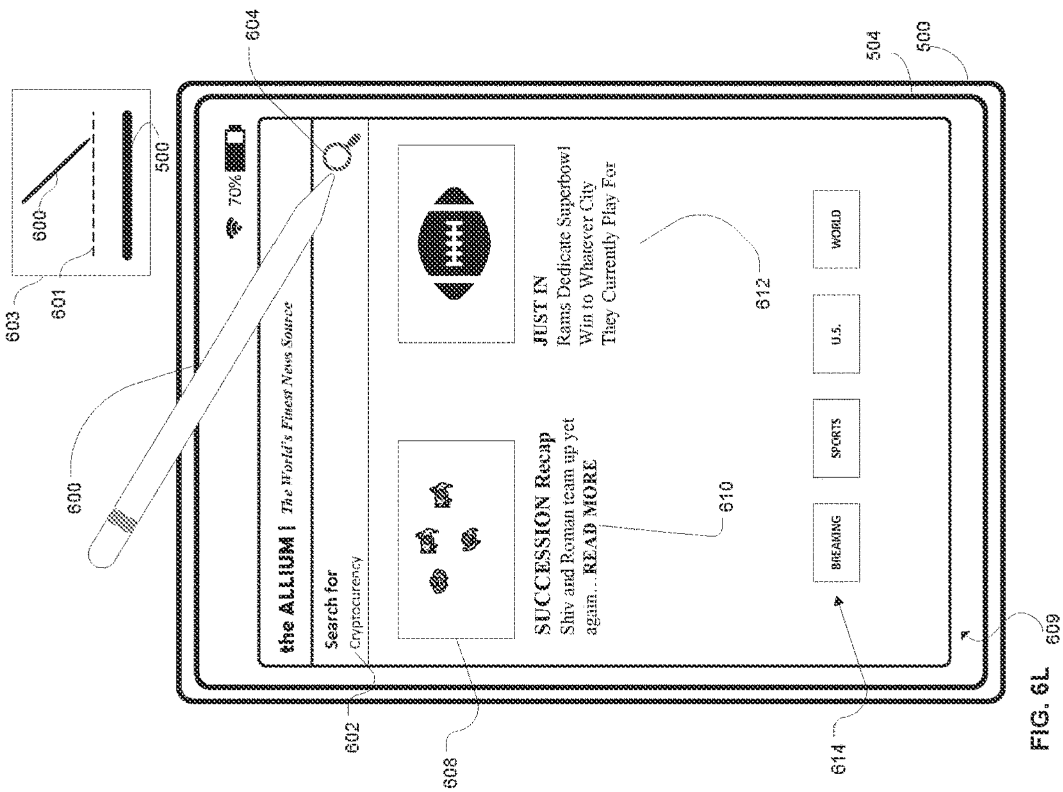
Figure 6K:
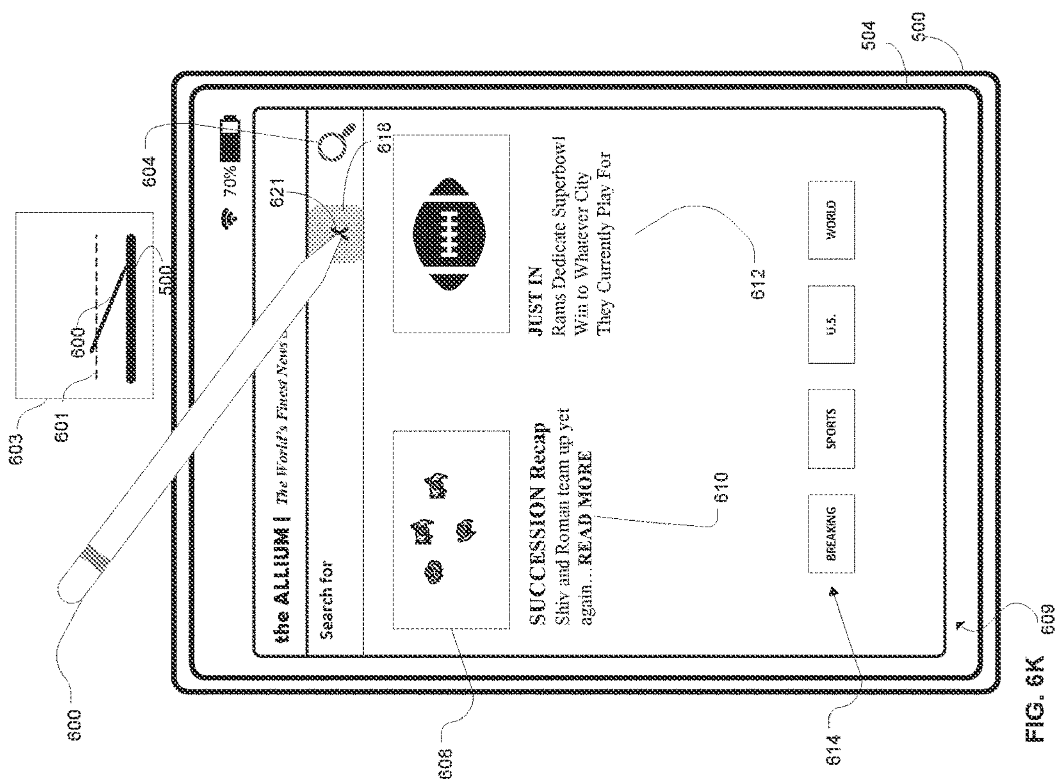

In FIG. 6I, stylus 600 is positioned outside the hover threshold 601 as shown in glyph 603, corresponding to a position of a content (e.g., text) entry region including text 602, and device 500 does not modify display of user interface 609. In response to stylus 600 entering the hover threshold 601 as shown in FIG. 6J while remaining at a location corresponding to the content entry region, selectable option 621 is displayed with visual emphasis 618. In some embodiments, visual emphasis 618 is displayed with a first visual appearance. In FIG. 6J, stylus 600 is at a location corresponding to the content entry region including text 602, but is optionally not at a location corresponding to selectable option 621. In some embodiments, display of selectable option 621 is ceased in response to movement of stylus 600 out of hover threshold 601 (e.g., away from touch screen 504) and/or in response to movement of stylus to a location of user interface 609 outside of the content entry region, even if remaining within hover threshold 601. While selectable option 621 is displayed, selection of the selectable option 621 optionally initiates performance of one or more operations associated with the content entry region. For example, as shown in FIG. 6K, display of text 602 is ceased in response to selection of the selectable option 621 (e.g., contact of stylus 600 with touch screen 504 at a position corresponding to selectable option 621). Further, in response to selection of selectable option, visual emphasis 618 is displayed with a second visual appearance, different from the first visual appearance (e.g., different scale, color, opacity, shadows, border, and/or lighting effect). It is understood the embodiments illustrated in FIGS. 6I-6K are merely exemplary, and in some embodiments, other selectable options are displayed in response to a hover event between an input device and a surface corresponding to a position of a user interface element.

In FIGS. 6L-6P, positions of stylus 600 within or outside a hover threshold 601 and/or optionally corresponding to a selectable option, and various responses of device 500, are depicted. For example, in FIG. 6L, stylus 600 is outside of the hover threshold represented by threshold 601 in glyph 603 at a position corresponding to a position of search icon 604. In some embodiments, despite the position of stylus 600 corresponding to search icon 604, no additional visual emphasis or element is displayed by device 500 while the stylus 600 is outside of the hover threshold.

Figure 6N:
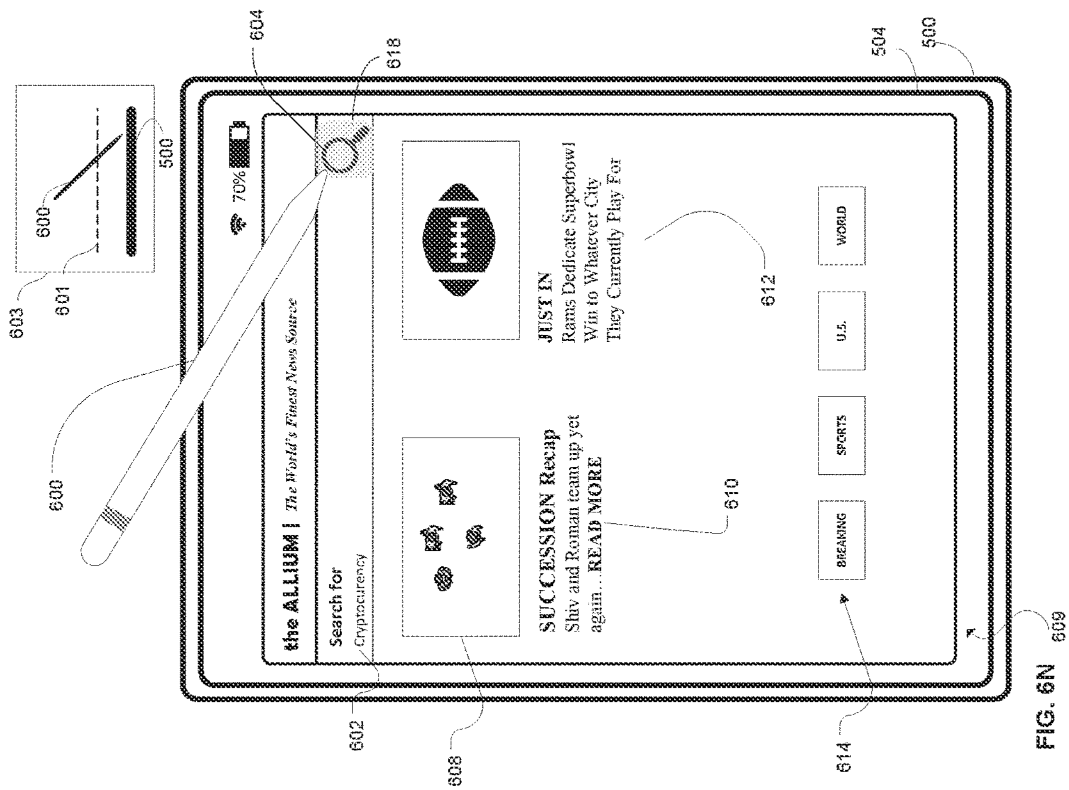
Figure 6M:
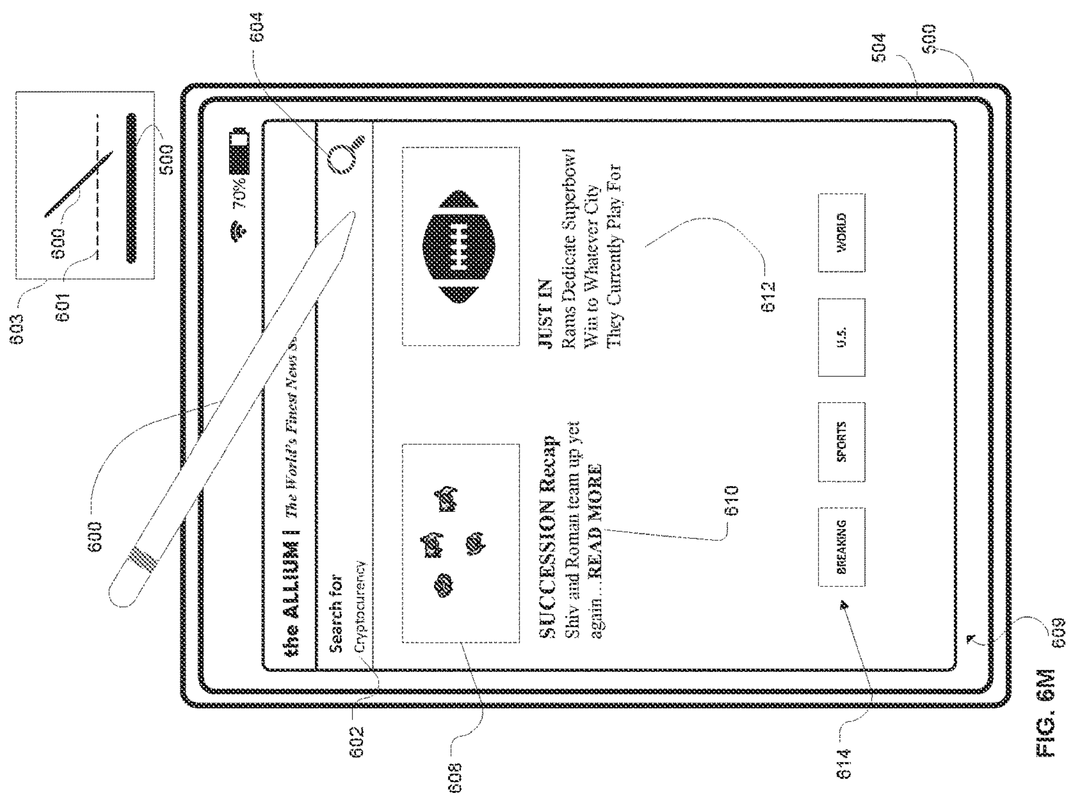

In FIG. 6M, stylus 600 is moved to a position within the hover threshold 601, but not corresponding to the position of search icon 604. For example, while the tip of stylus 600 is outside a threshold distance (e.g., 0.5 cm, 1 cm, 3 cm, 5 cm, or 10 cm) of search icon 604 and while stylus 600 is within threshold distance 601 of touch screen 504, display of additional visual emphasis or visual element(s) associated with search icon 604 are forgone by device 500. In some embodiments, a visual emphasis or alteration of icon 604 (e.g., a modified scale, color, opacity, shadow, border, and/or lighting effect) is displayed by device 500 in response to movement of stylus 600 within the threshold distance of search icon 604 as shown in FIG. 6N. For example, visual emphasis 618 includes a region surrounding search icon 604, optionally visually emphasized with a solid and/or translucent color around search icon 604. In some embodiments, while displaying visual emphasis 618 and hovering over search icon 604, movement of stylus 600 causes or does not cause modification of visual emphasis 618 and/or the visual appearance of icon 604. For example, downwards movement of stylus 600 from an upper-left corner of search icon 604 shown in FIG. 6N to a bottom-left corner of search icon 604 as shown in FIG. 6O does not cause device 500 to modify visual emphasis 618 and/or the search icon 604 (e.g., device 500 does not display visual emphasis 618 and/or icon 604 with parallax effects and/or lighting effects that change as the position of stylus 600 over icon 604 changes).

Figure 6P:
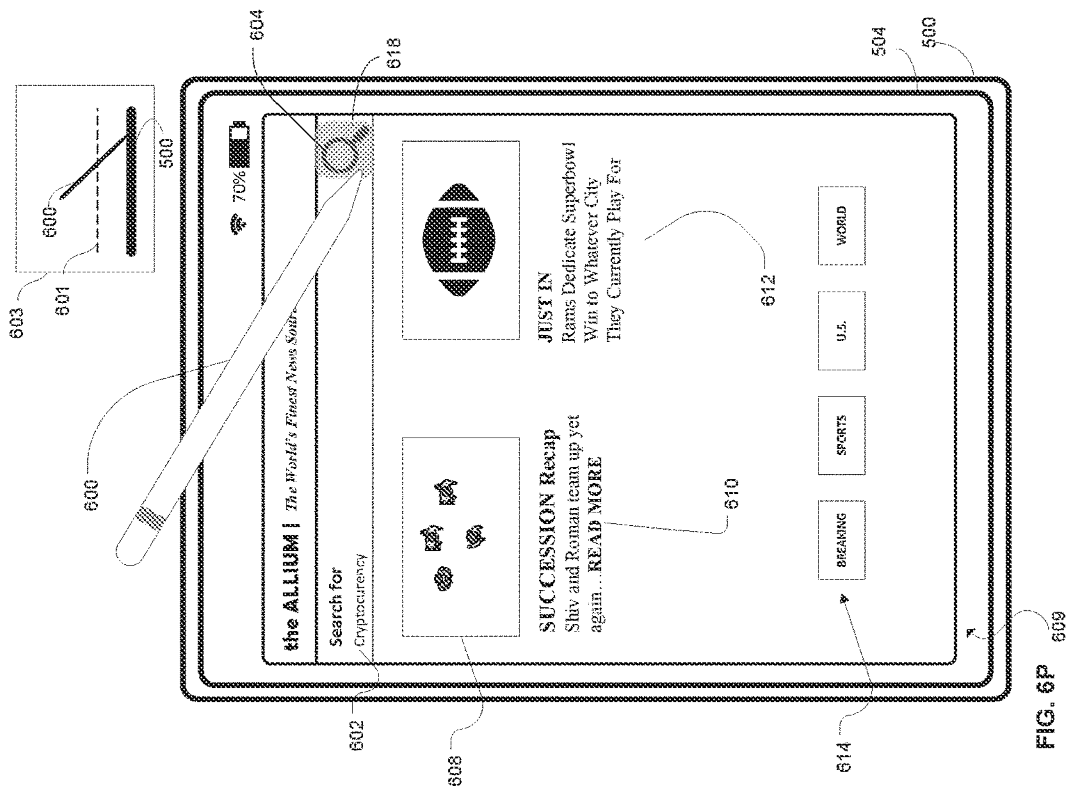
Figure 6O:
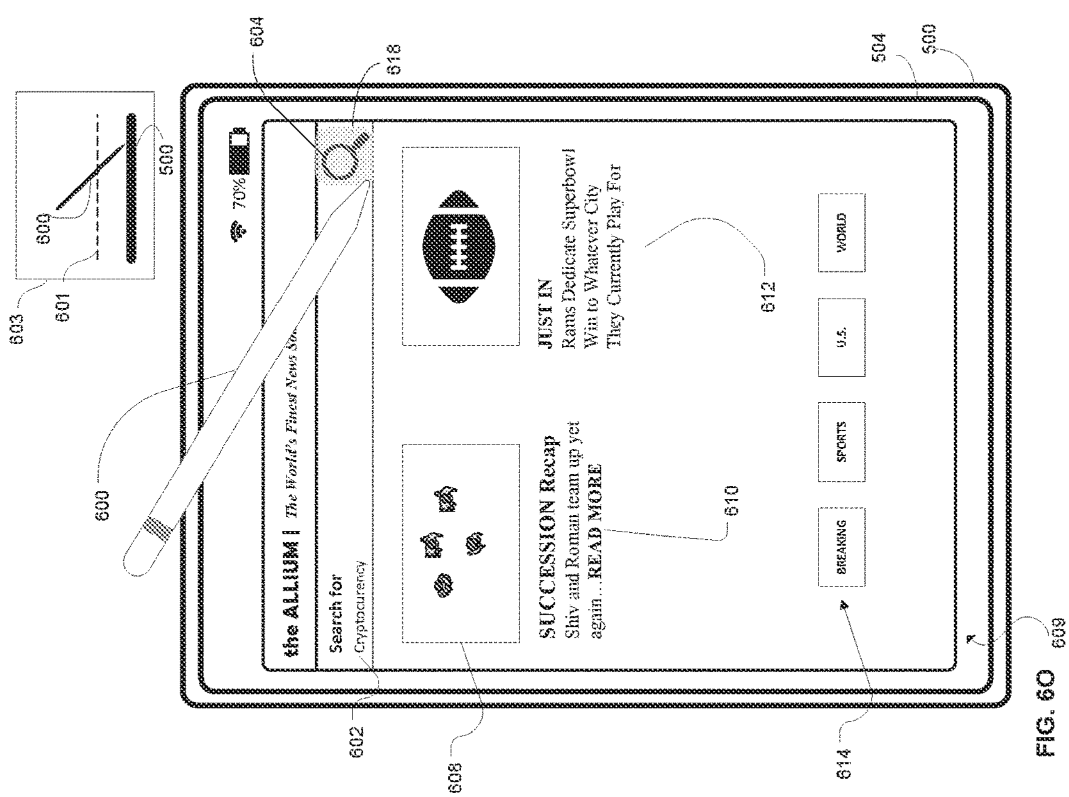

As shown in FIG. 6P, in some embodiments, one or more operations associated with search icon 604 are initiated and visual emphasis 618 is modified in response to a selection of icon 604, such as stylus 600 contacting touch screen 504 at a position on touch screen 504 corresponding to icon 604. For example, a translucency of visual emphasis 618 is optionally decreased or increased, and/or a color of the visual emphasis 618 is optionally modified. In some embodiments, the modified visual emphasis is maintained while contact of stylus 600 with touch screen 504 is maintained. In some embodiments, visual emphasis 618 is modified (e.g., to correspond to a visual appearance described with respect to hover events in FIG. 6N) in response to ceasing selection of search icon 604.

Figure 6R:
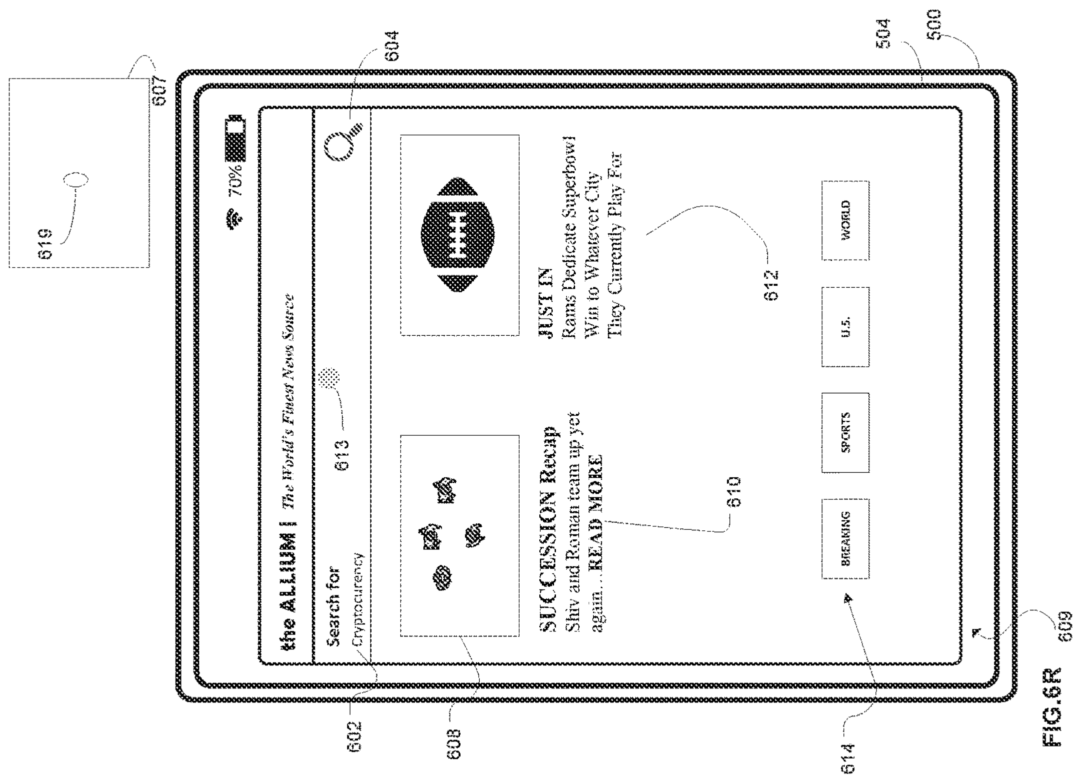
Figure 6Q:
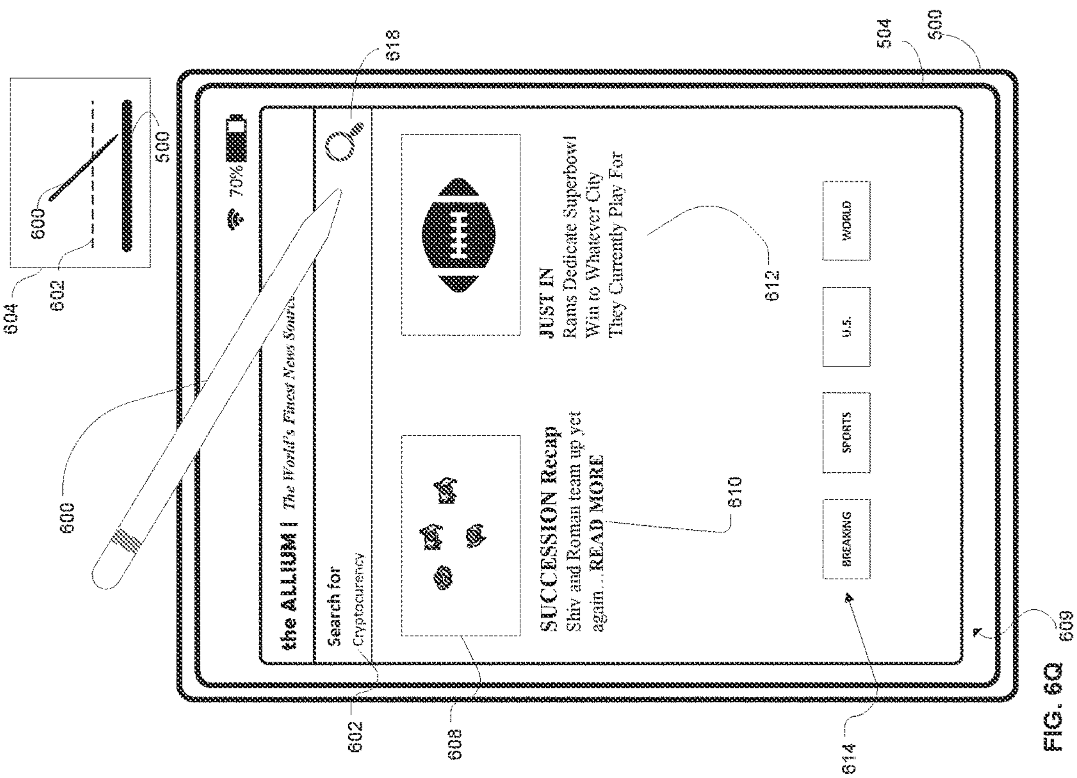

In FIG. 6Q, after termination of the selection of search icon 604 (e.g., corresponding to stylus 600 breaking contact/lifting off from touch screen 504), stylus 600 remains in the hover threshold 601 but is moved outside the threshold distance of search icon 604 (e.g., a position of stylus 600 does not correspond to search icon 604). In some embodiments, in response, device 500 ceases display of the visual emphasis of icon 604. It is understood that user interface 609 optionally includes additional or alternative selectable options, and interactions described with respect to search icon 604 (e.g., hovering, not hovering, moving stylus 600 to a position corresponding to, and/or optionally selecting search icon 604) are optionally the same or similar for such additional or alternative selectable options.

FIGS. 6R-6W illustrate interactions between electronic device 500 and a cursor input device (e.g., a mouse or trackpad). In some embodiments, in accordance with a determination that a position of a cursor controlled by such a cursor input device corresponds to a graphical object, visual emphasis associated with the graphical object is displayed by device 500. In some embodiments, in accordance with a determination that the position of the cursor does not correspond to the graphical object, visual emphasis of the graphical object is forgone.

Figure 6T:
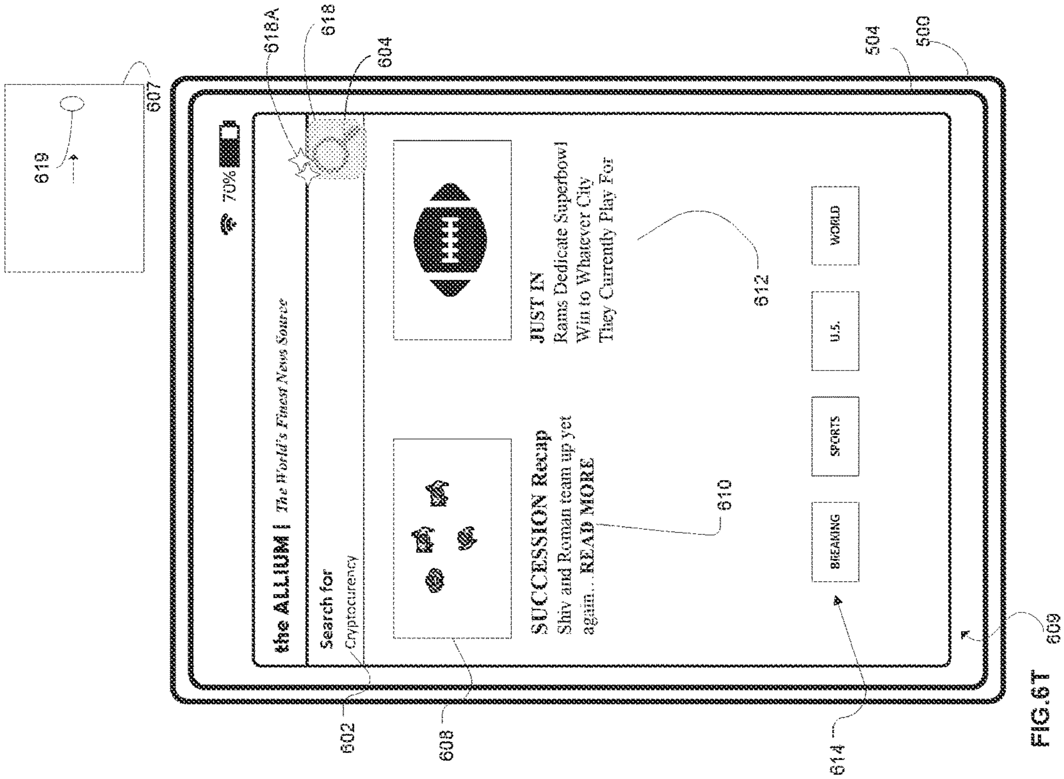

For example, in FIG. 6R, trackpad 607 is in communication with electronic device 500 (e.g., wirelessly or via a wired connection). In some embodiments, in response to detecting contact 619 on trackpad 607, device 500 displays cursor 613 in user interface 609. In some embodiments, in response to device 500 detecting communication between trackpad 607 and device 500, cursor 613 is displayed in user interface 609. In some embodiments, the position of cursor 613 in user interface 609 is modified in response to movement (e.g., rightward movement) of contact 619 on trackpad 607. For example, in FIG. 6S, in response to detecting rightward movement of contact 619 on trackpad 607, device 500 moves cursor 613 rightward in user interface 609. In FIG. 6T, further rightward movement of contact 619 is detected, and in accordance with a determination that the new position of cursor 613 corresponds to a position of search icon 604, visual emphasis 618 of icon 604 is displayed (e.g., cursor 613 is ceased to be displayed, and is represented by visual emphasis 618 in user interface 609). In some embodiments, visual emphasis 618 includes one or more lighting effects 618A. In some embodiments, lighting effect 618A includes a specular highlight (e.g., simulated lighting effects that simulate the movement of the object relative to one or more simulated or real light sources such as reflections and/or refraction) to provide the user a sense of how further inputs (e.g., movement of contact 619) correspond to a current state of interaction with search icon 604. For example, the displayed sheen of a specular highlight around visual emphasis 618 portions (e.g., a border of the visual emphasis) is optionally modified in response to user input (e.g., an indication of movement of contact 619 received from trackpad 607).

Figure 6S:
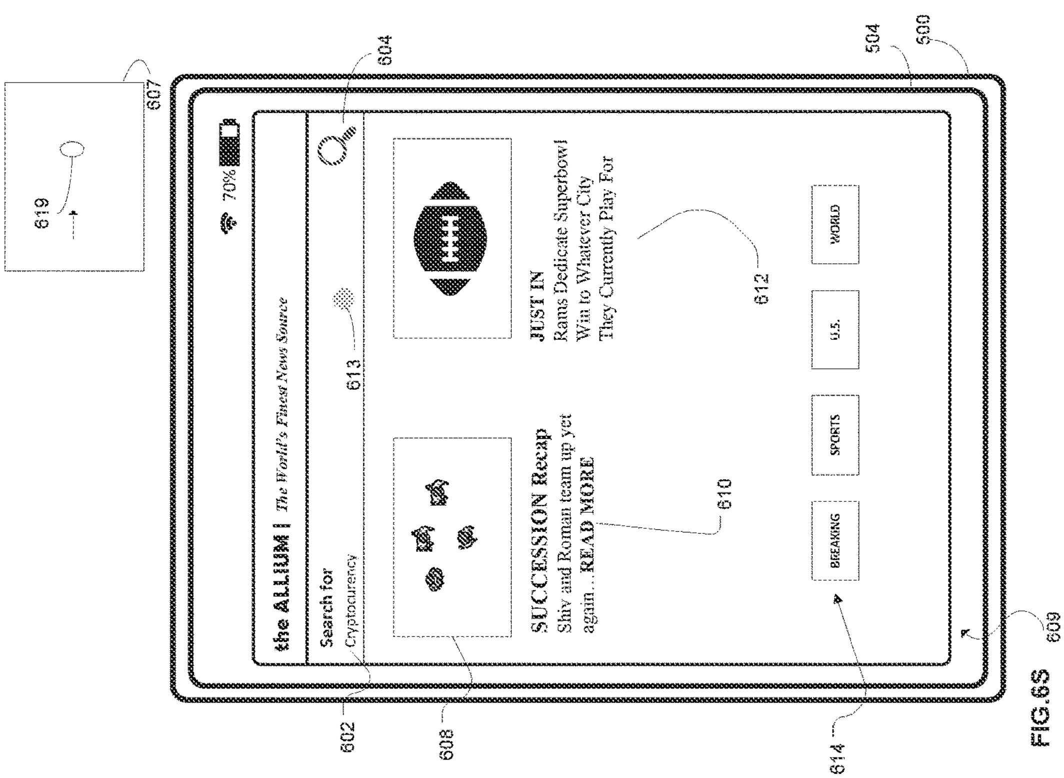
Figure 6V:
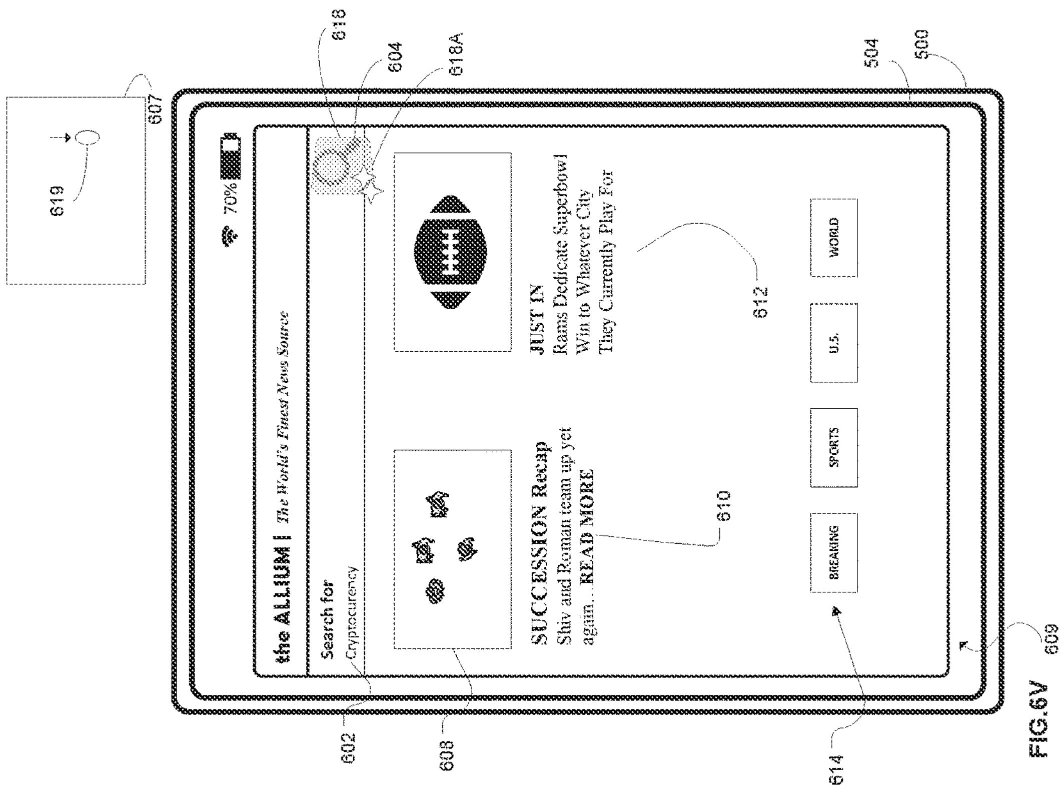
Figure 6U:
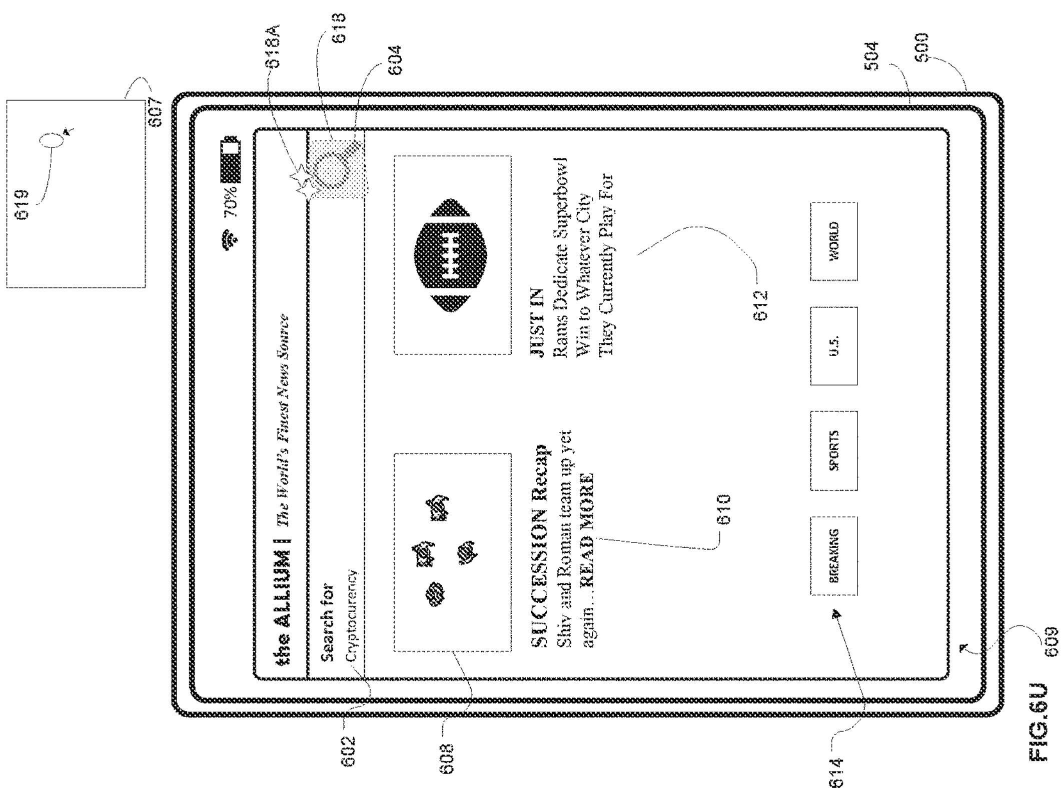

In FIG. 6U, while the position of the cursor corresponds to search icon 604 and visual emphasis 618 is displayed, user input for moving the cursor is received (e.g., device 500 detects upward and leftward movement of contact 619 on trackpad 607). In some embodiments, in accordance with a determination that the modified position of the cursor continues to correspond to search icon 604 (e.g., is with a threshold distance of search icon 604, such as 0.5 cm, 1 cm, 3 cm, 5 cm, or 10 cm), lighting effect 618A is optionally modified and/or a parallax effect is optionally applied to visual emphasis 618 based on the movement of contact 619. For example, contact 619 is moved upwards and to the left of trackpad 607 as shown in FIG. 6U. In response to the movement of contact 619, and in accordance with a determination that the modified position of the cursor corresponds to the search icon 604, a portion (e.g., the upper-left portion) of the specular highlight 618A is modified, and/or a shape of the visual emphasis and/or icon 604 is modified, thus creating a parallax effect between search icon 604 and visual emphasis 618 based on the movement of contact 619. In some embodiments, modification of a specular highlight includes modification of a point of a simulated light source directed toward a respective graphical representation.

In FIG. 6V, device 500 detects contact 619 moving downwards, though optionally less than an amount needed for cursor to move beyond the threshold amount from a region corresponding to search icon 604, and the above-described parallax effect is modified in response. Similarly, as described with respect to FIG. 6U, the specular highlight 618A optionally is modified correspondingly. Such modification optionally includes decreasing a brightness or otherwise modifying a lighting effect at a position of one or more portions of visual emphasis 618 that do not correspond to the motion, and/or increasing brightness or otherwise modifying the lighting effect at one or more portions of visual emphasis 618 that correspond to the motion. In FIG. 6W, while a location of the cursor corresponds to search icon 604, an input selecting search icon 604 is received as shown in FIG. 6W (e.g., a click or tap of contact 619 on trackpad 607). In response to receiving the selection, one or more operations, as previously described with reference to icon 604, are optionally performed (e.g., a search operation is performed).

Figure 6X:
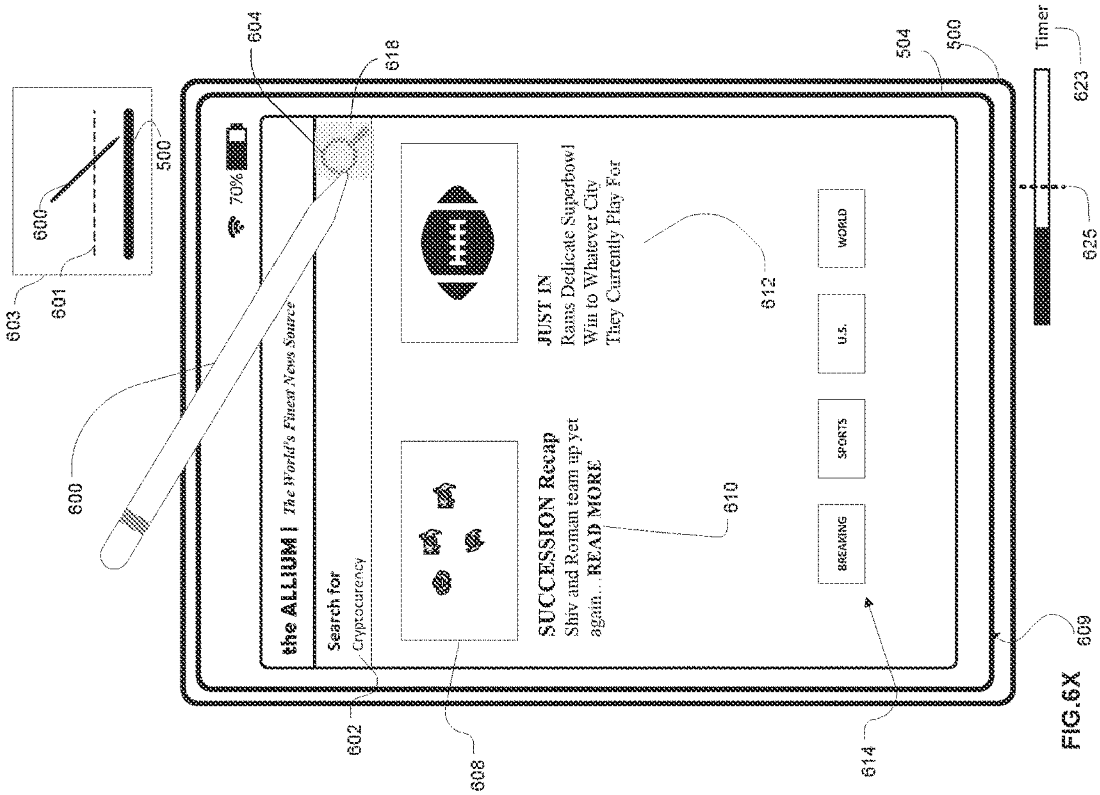
Figure 6W:
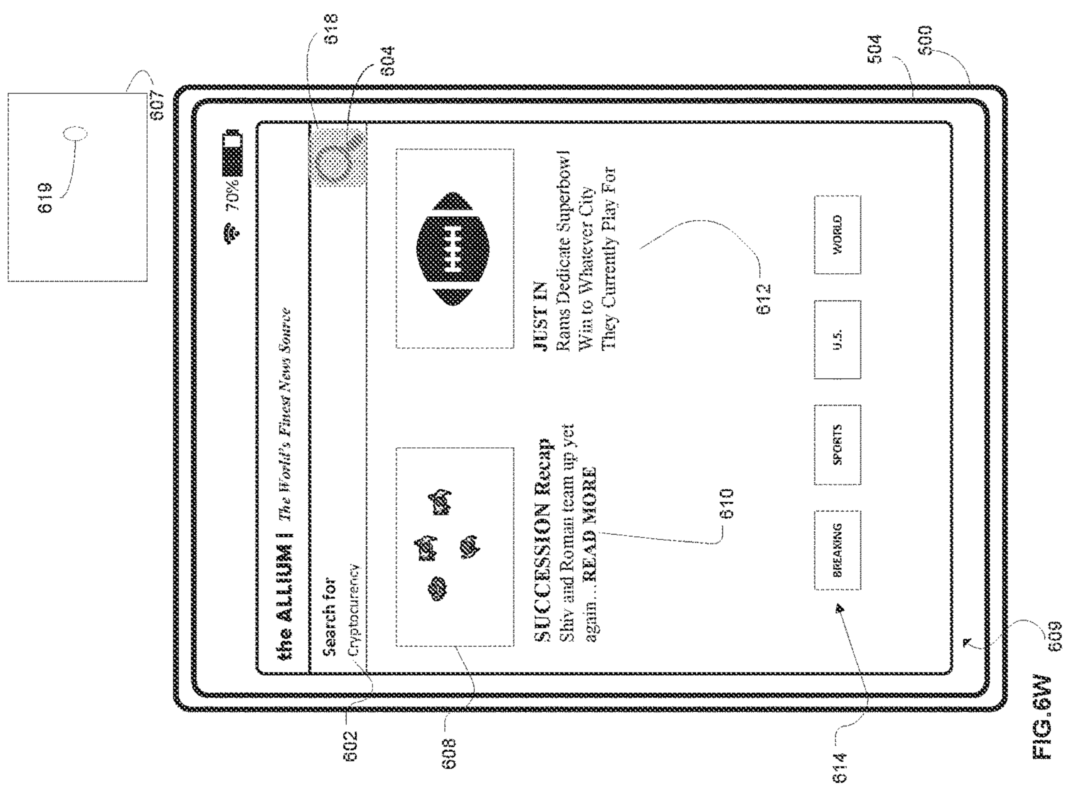
Figure 6Z:
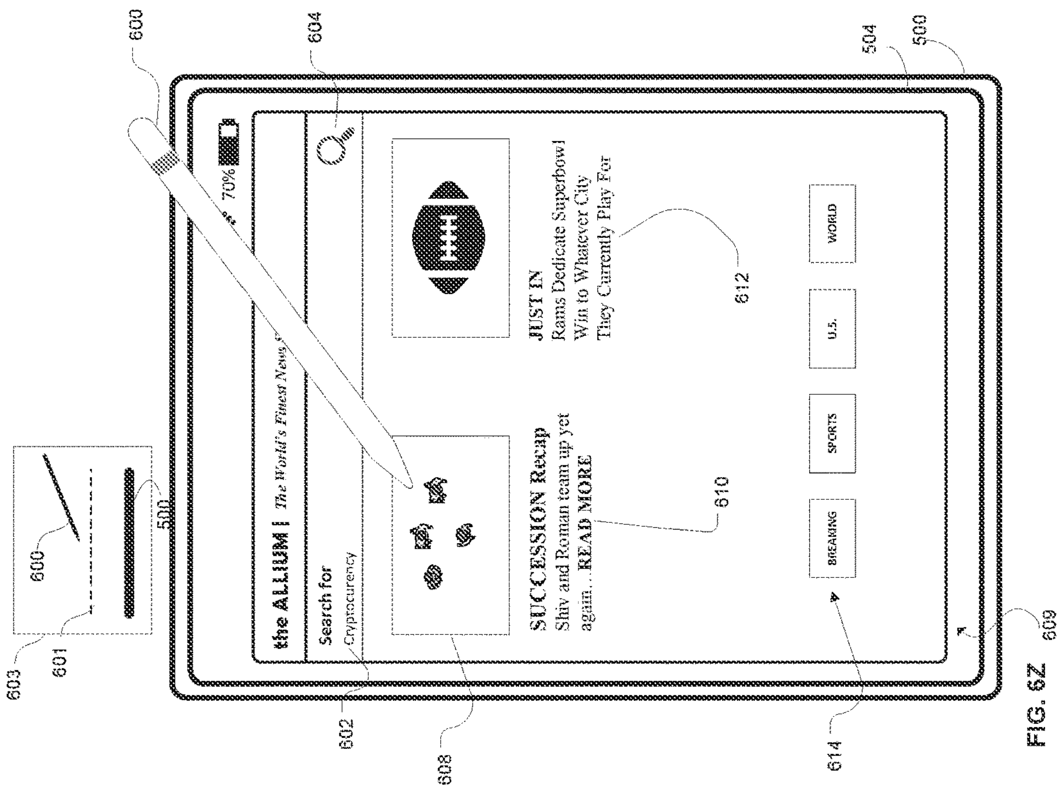
Figure 6Y:
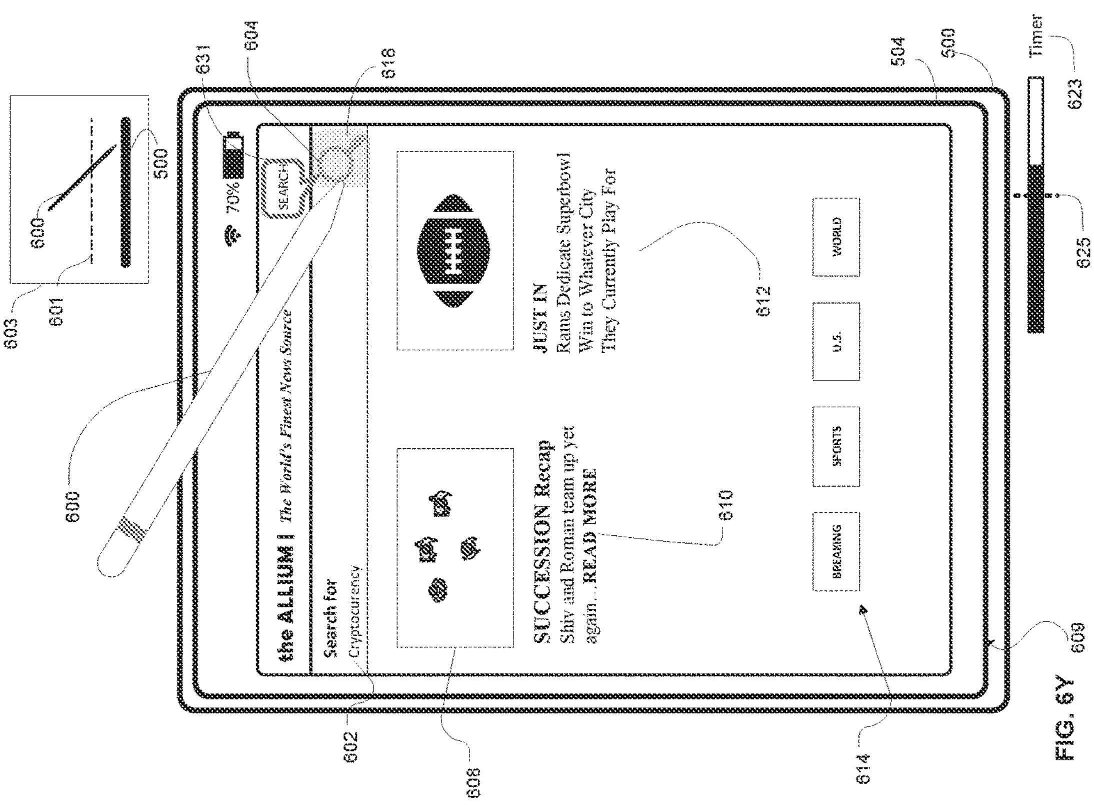
Figure 6A:
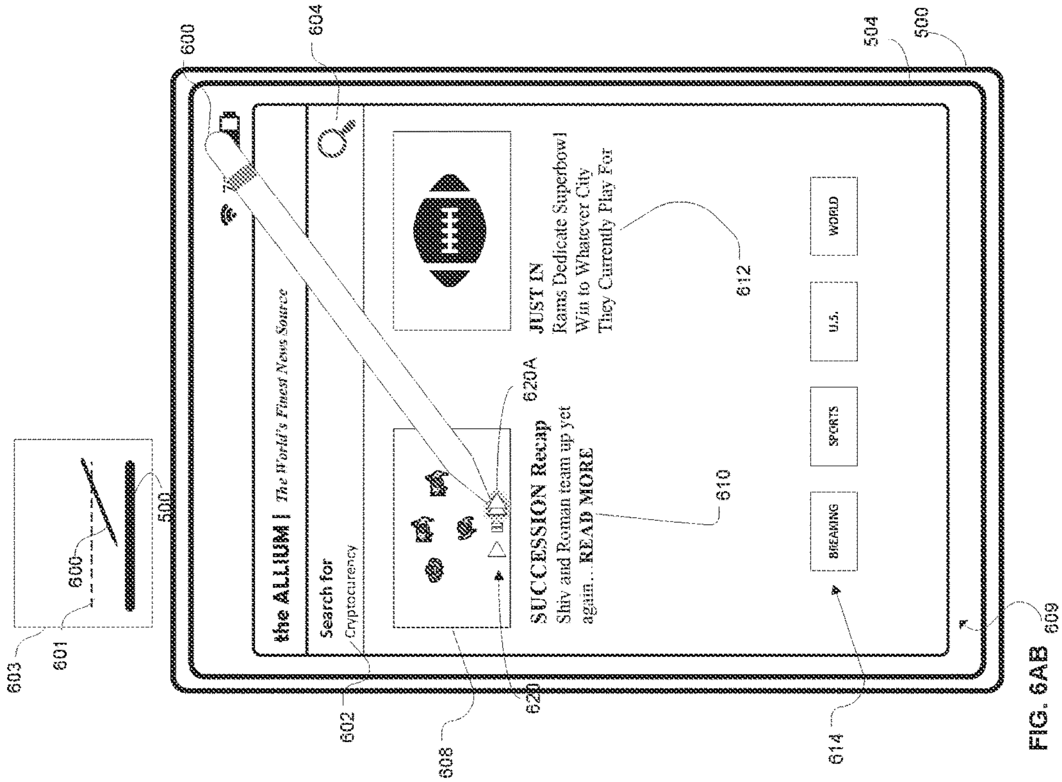
Figure 6A:
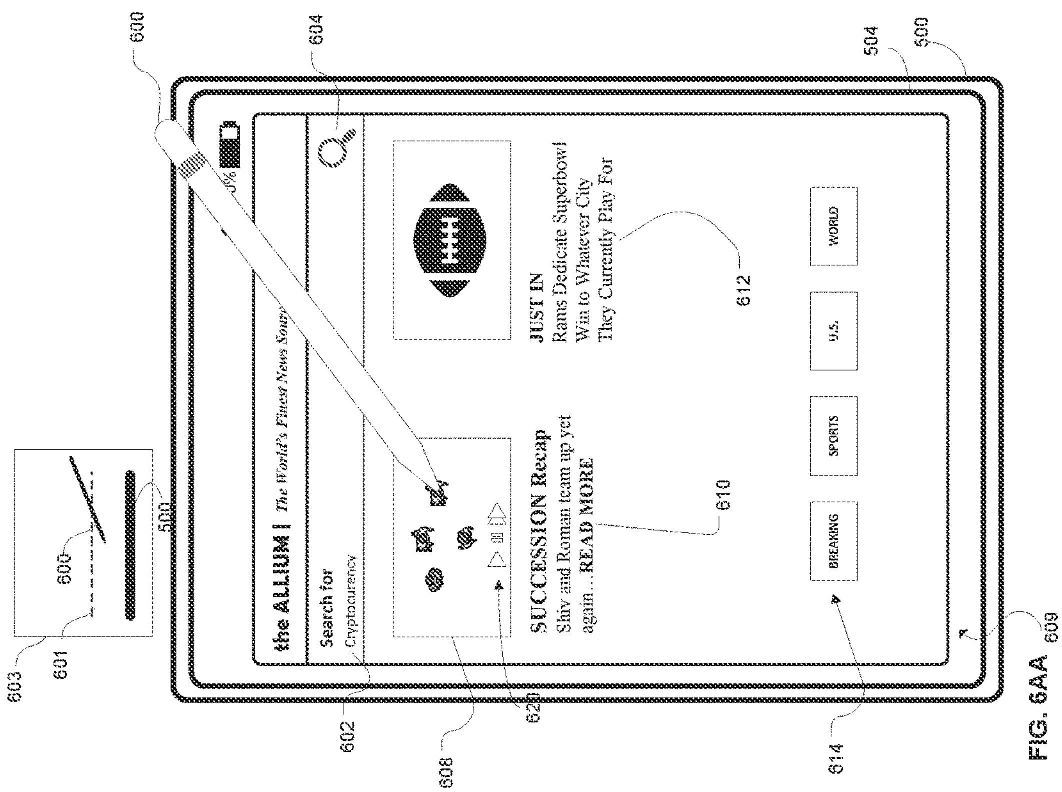
Figure 6A:
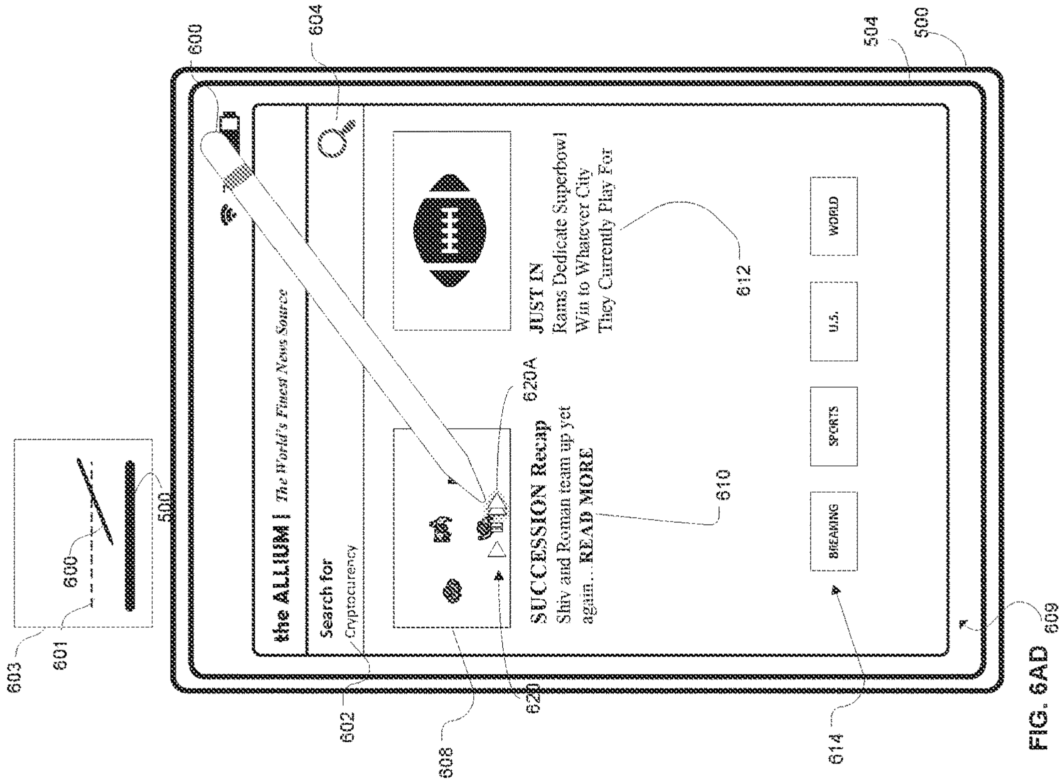
Figure 6A:
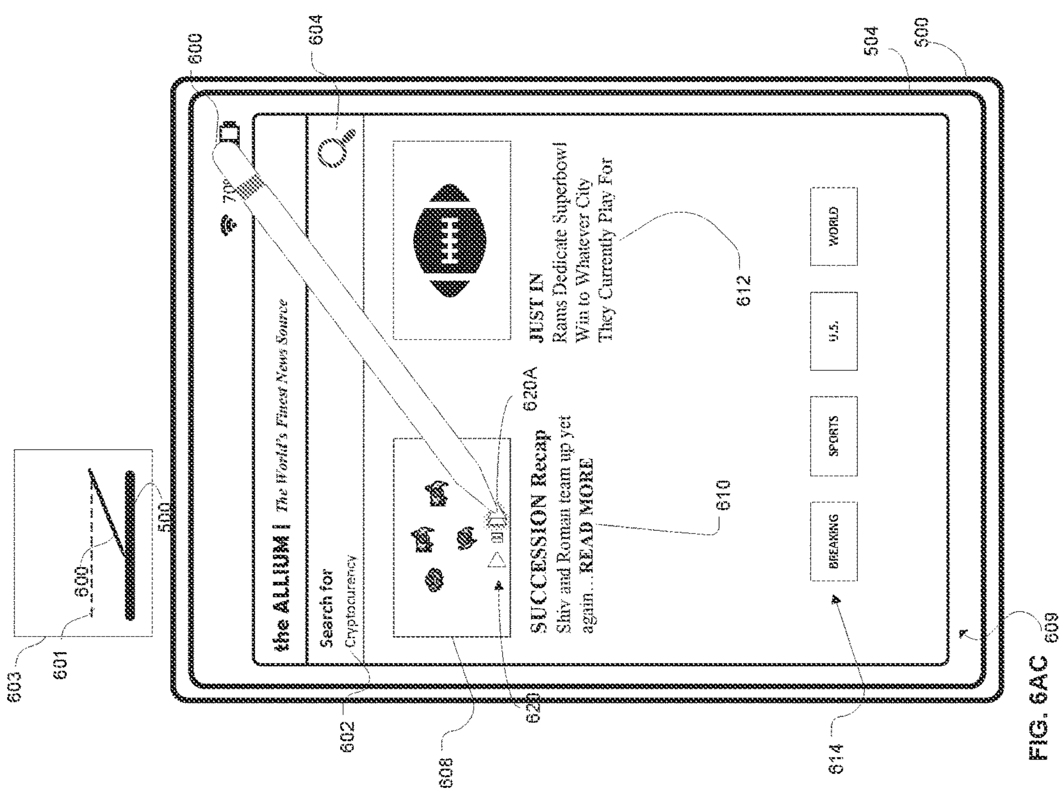
Figure 6A:
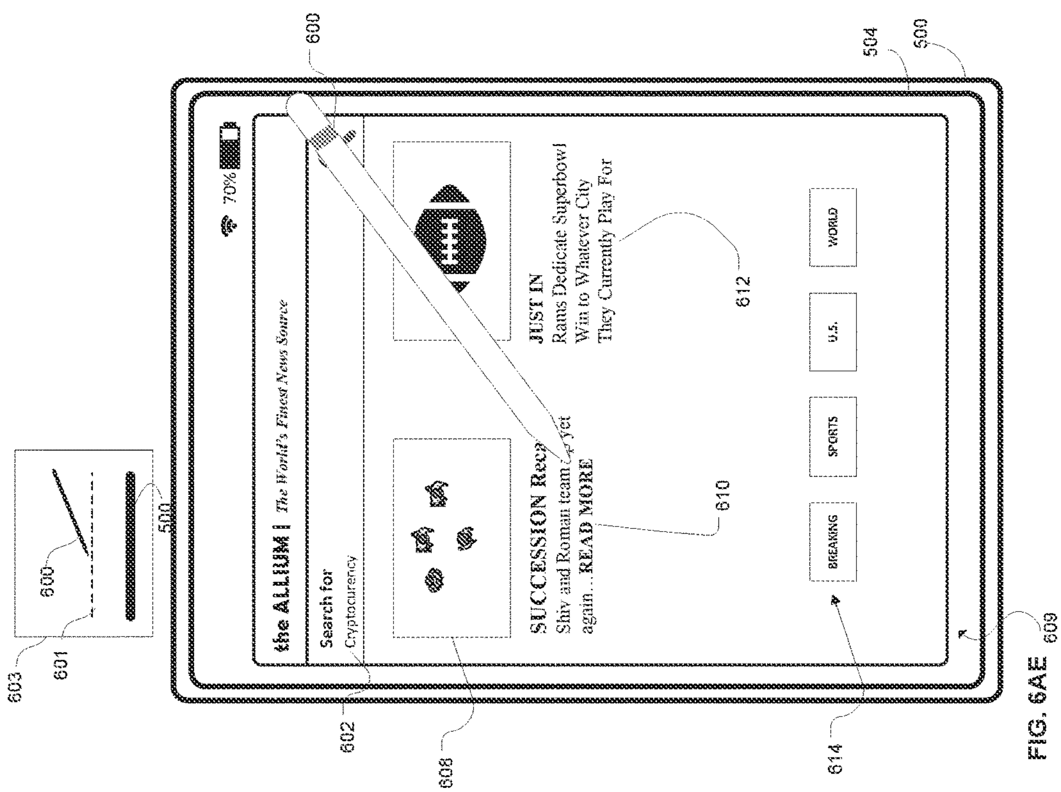
Figure 6A:
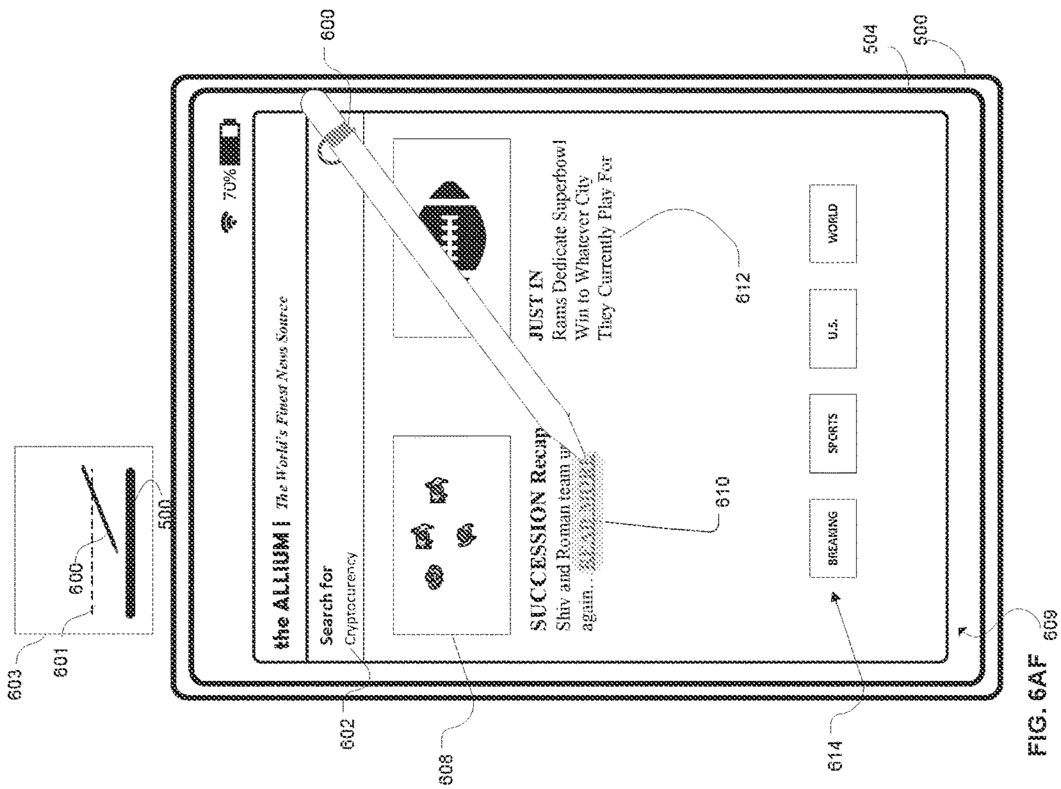
Figure 6A:
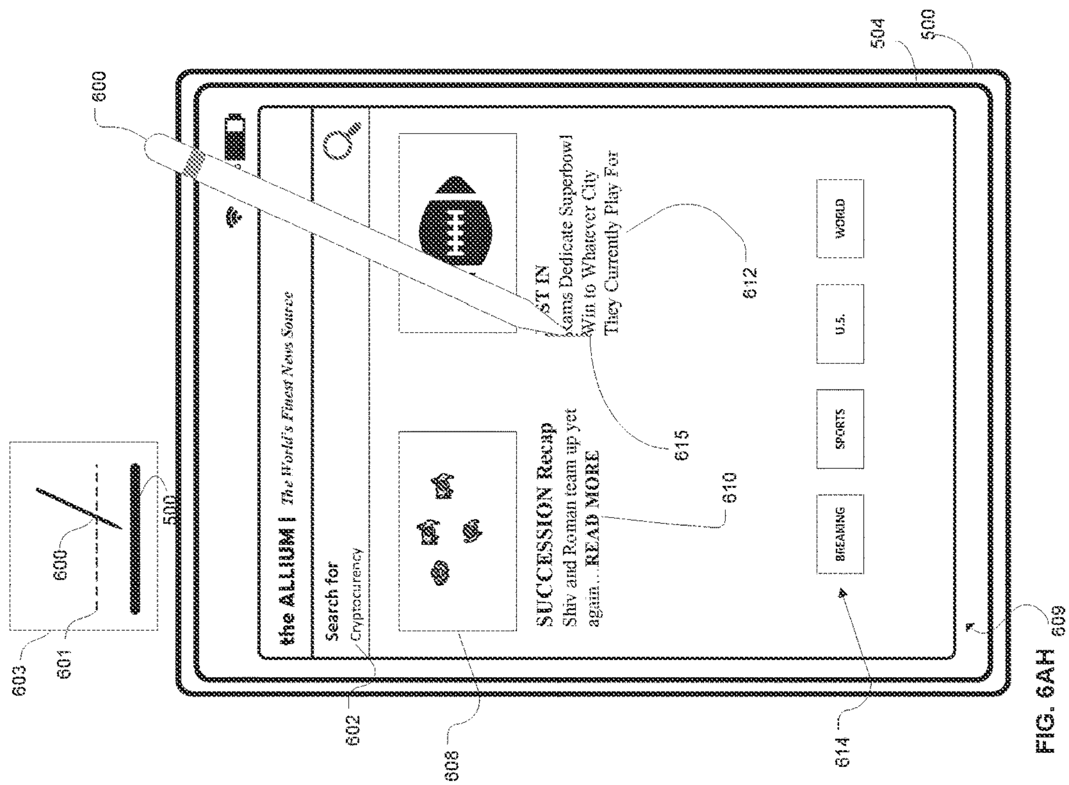
Figure 6A:
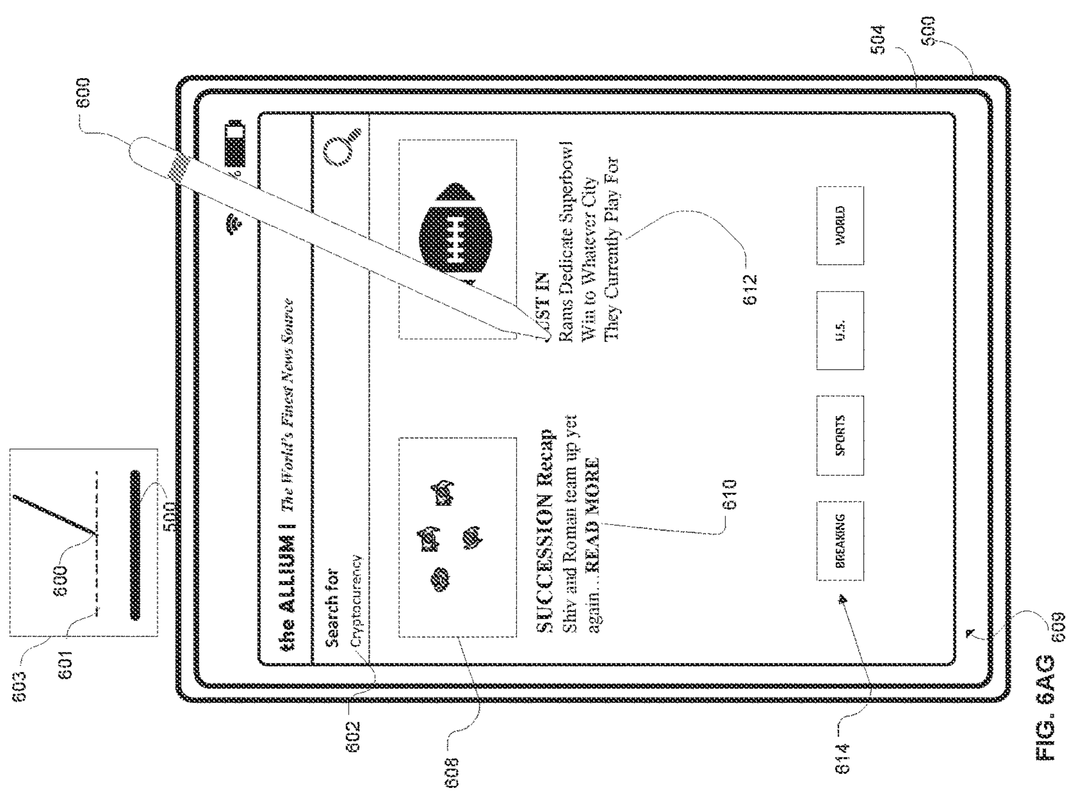
Figure 6A:
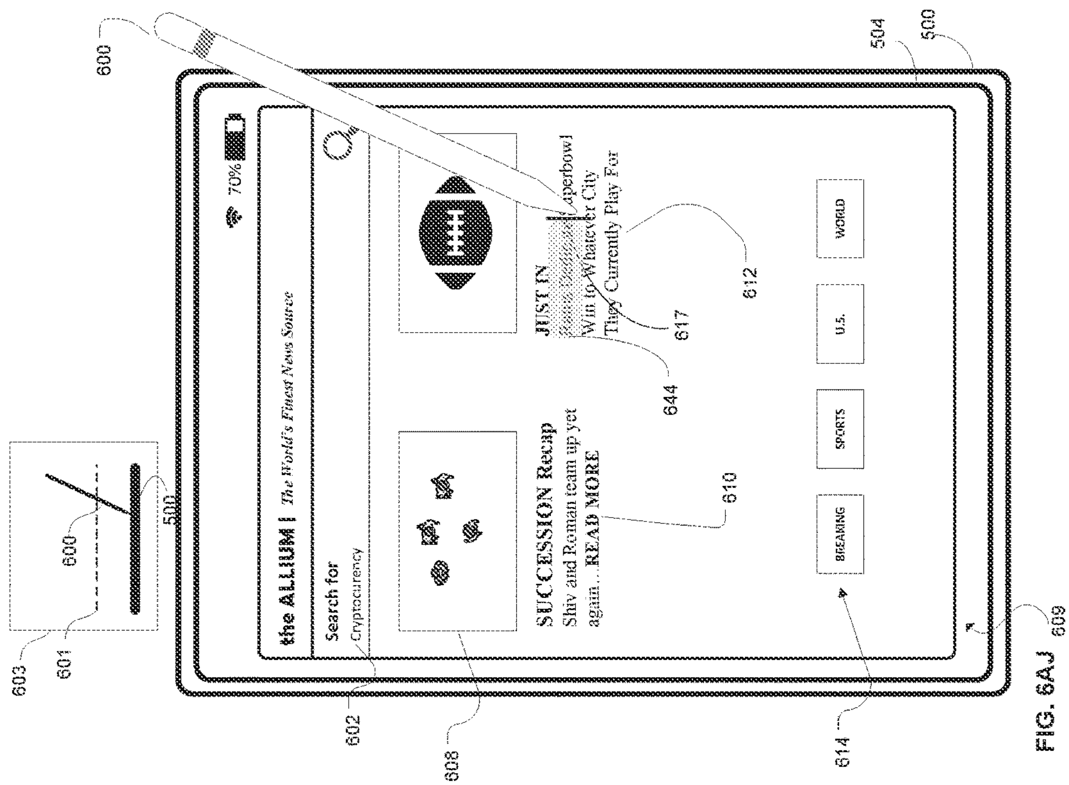
Figure 6A:
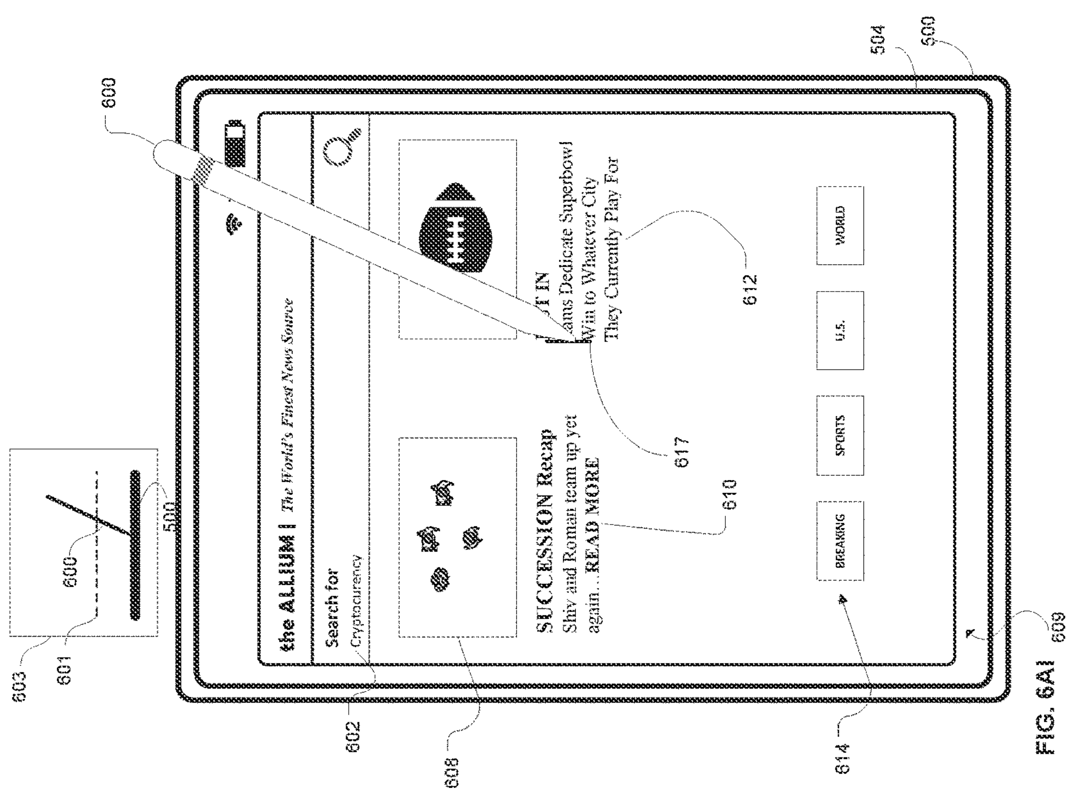
Figure 6A:
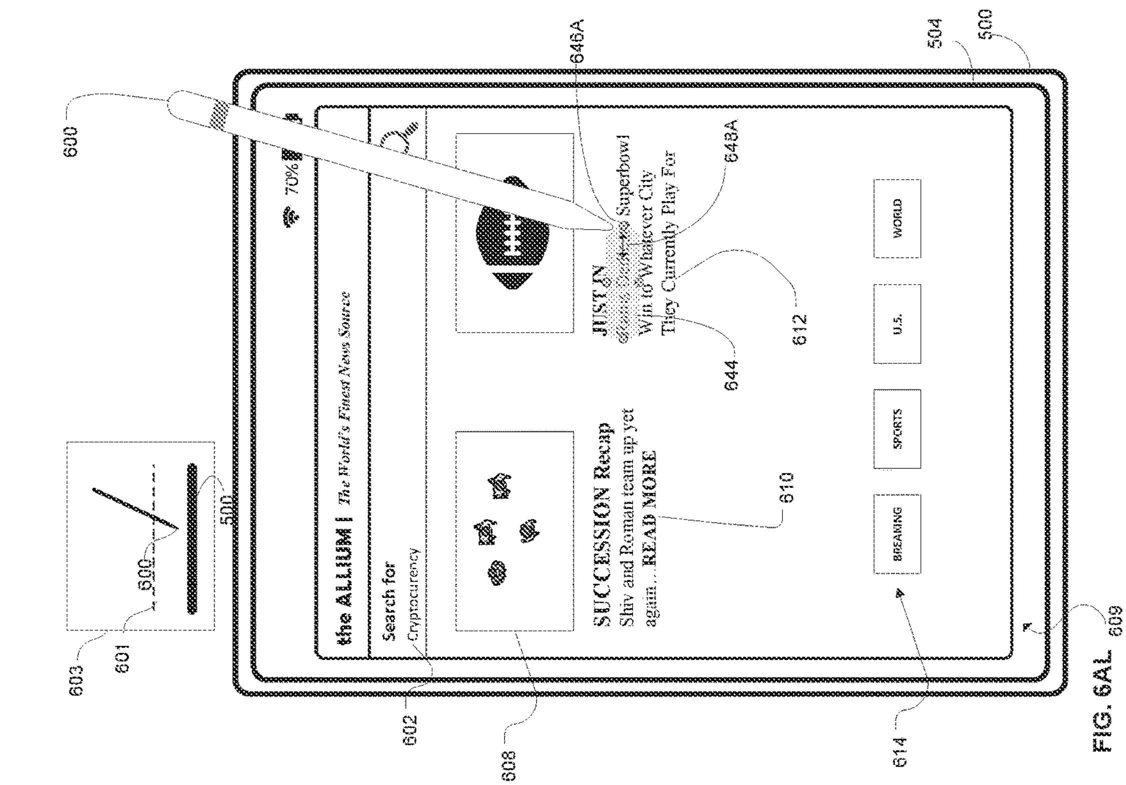
Figure 6A:
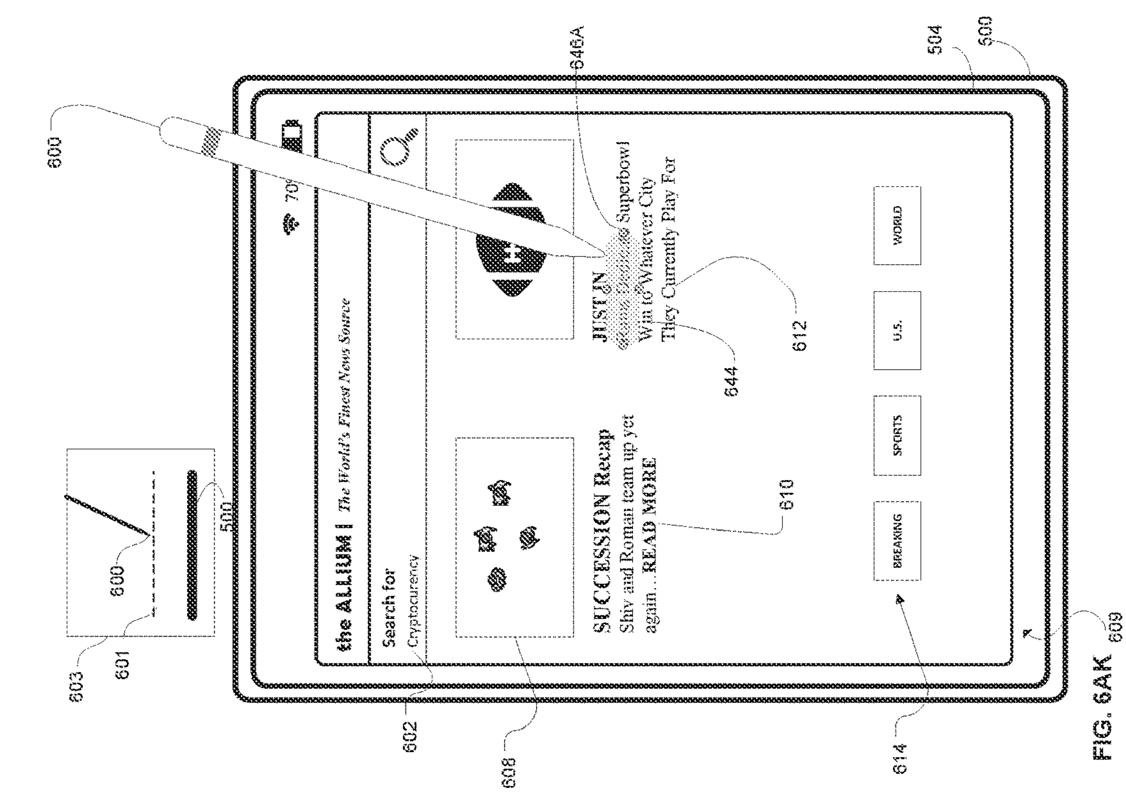
Figure 6A:
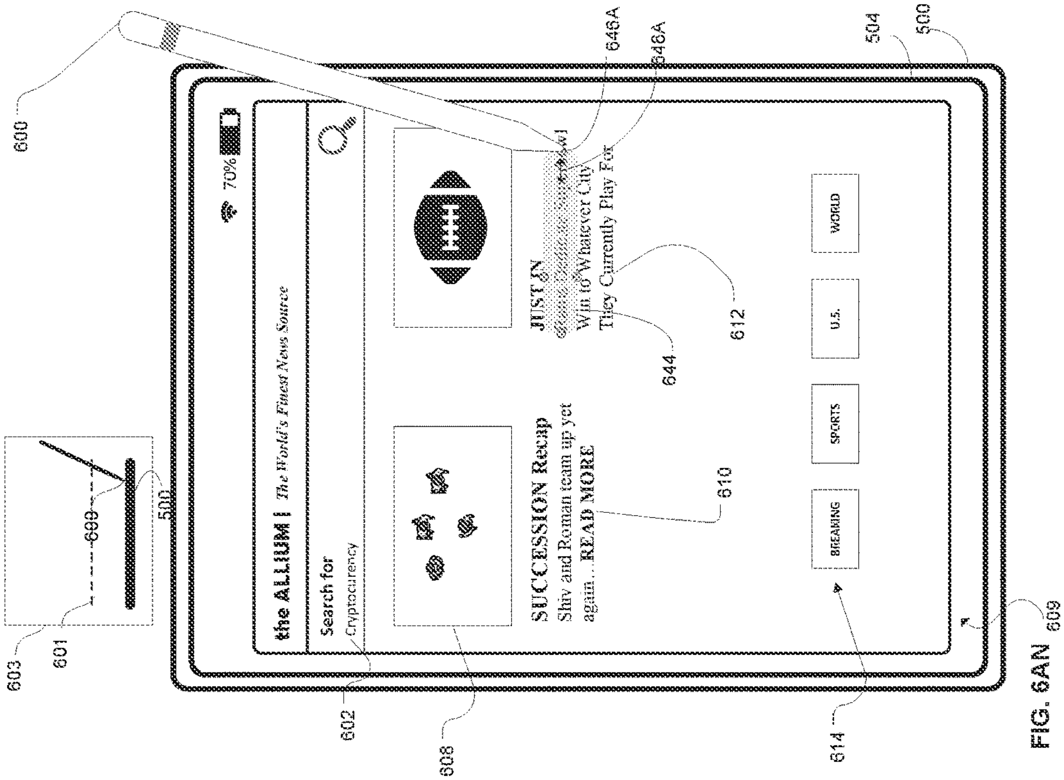
Figure 6A:
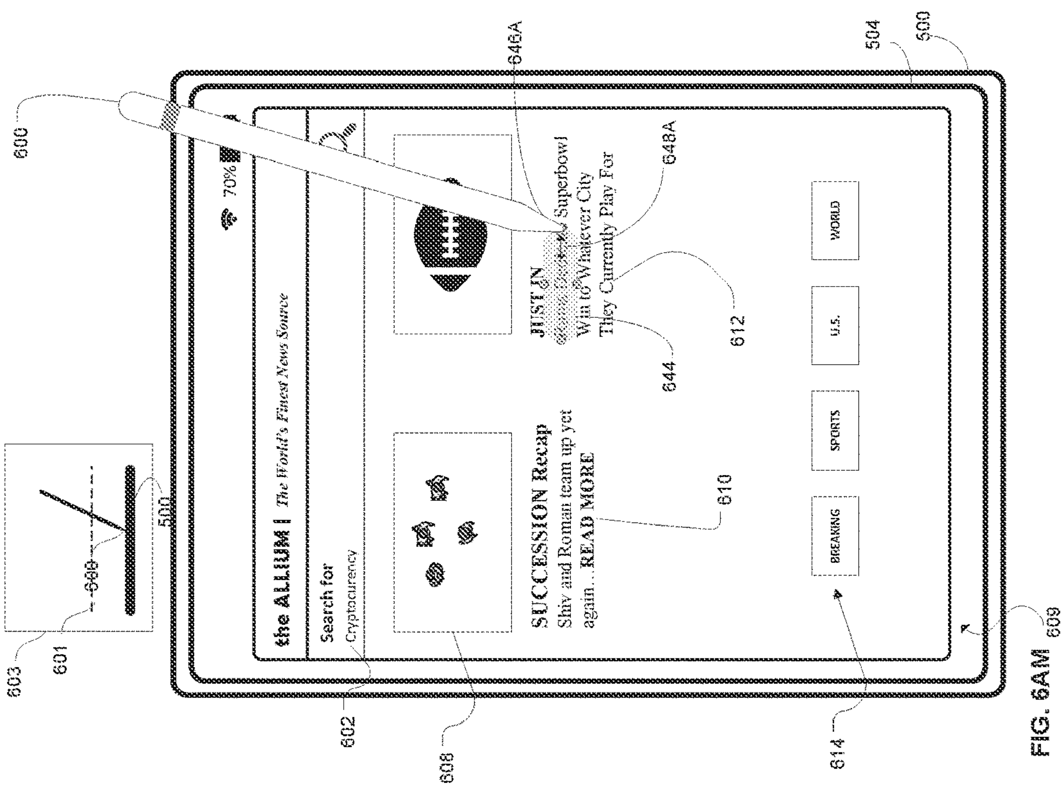
Figure 6A:
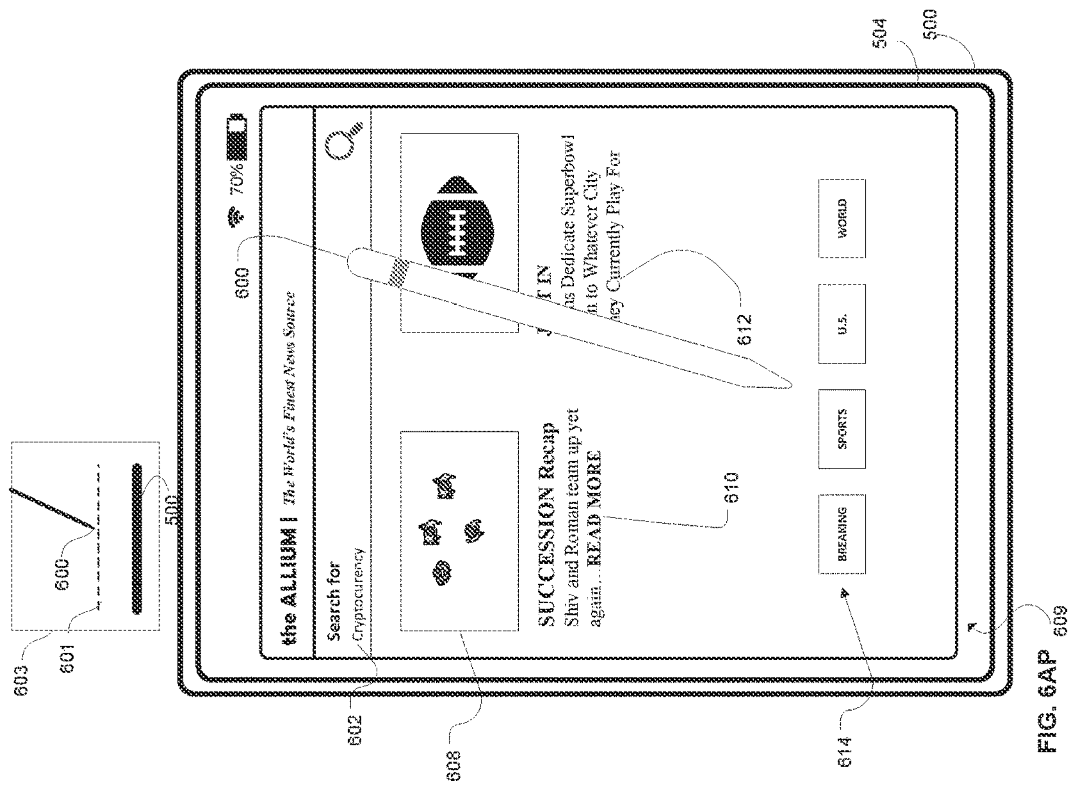
Figure 6A:
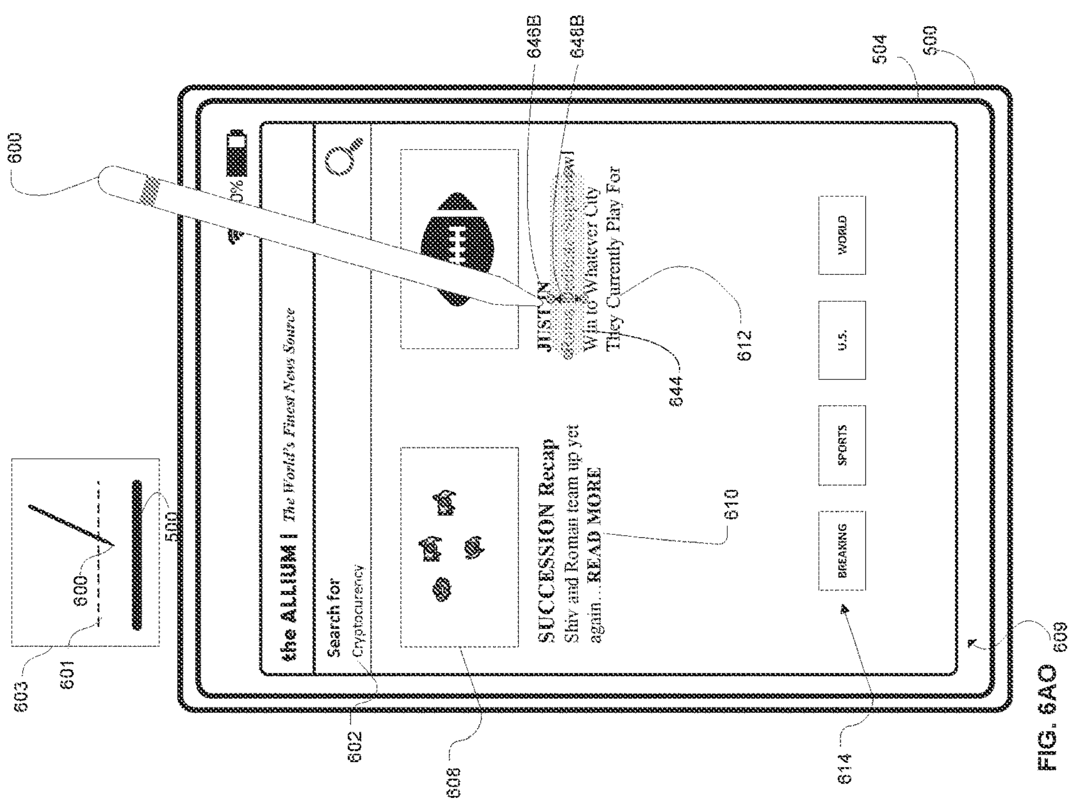
Figure 6A:
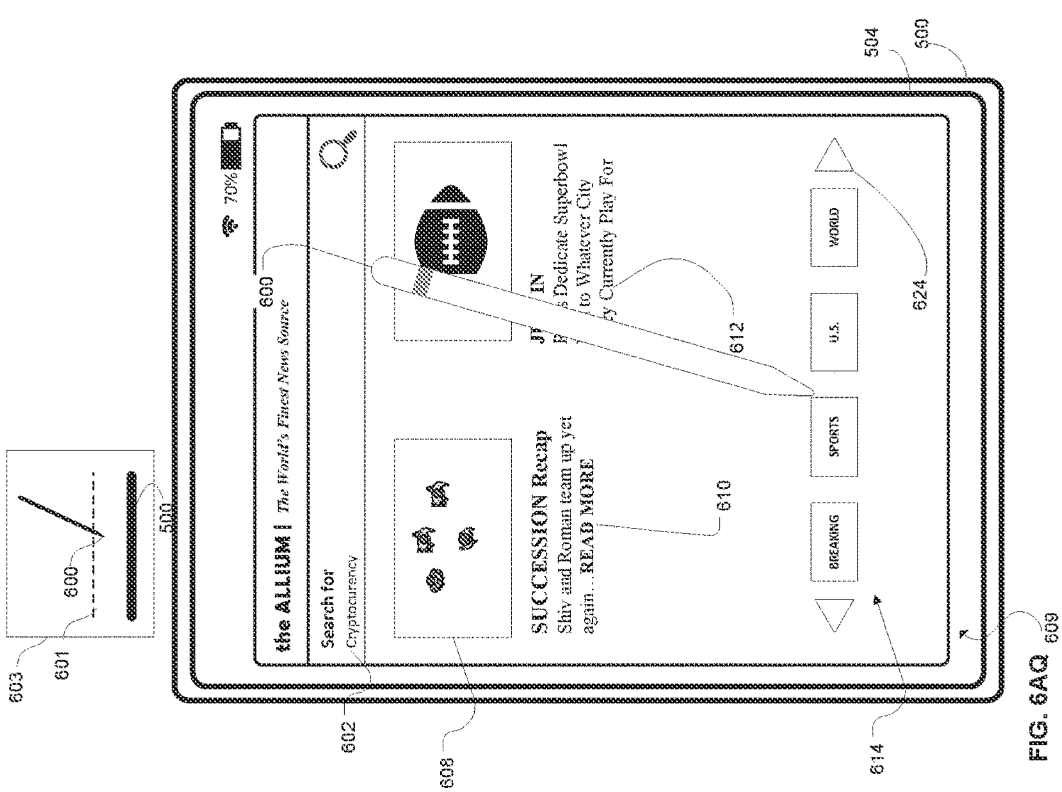
Figure 6A:
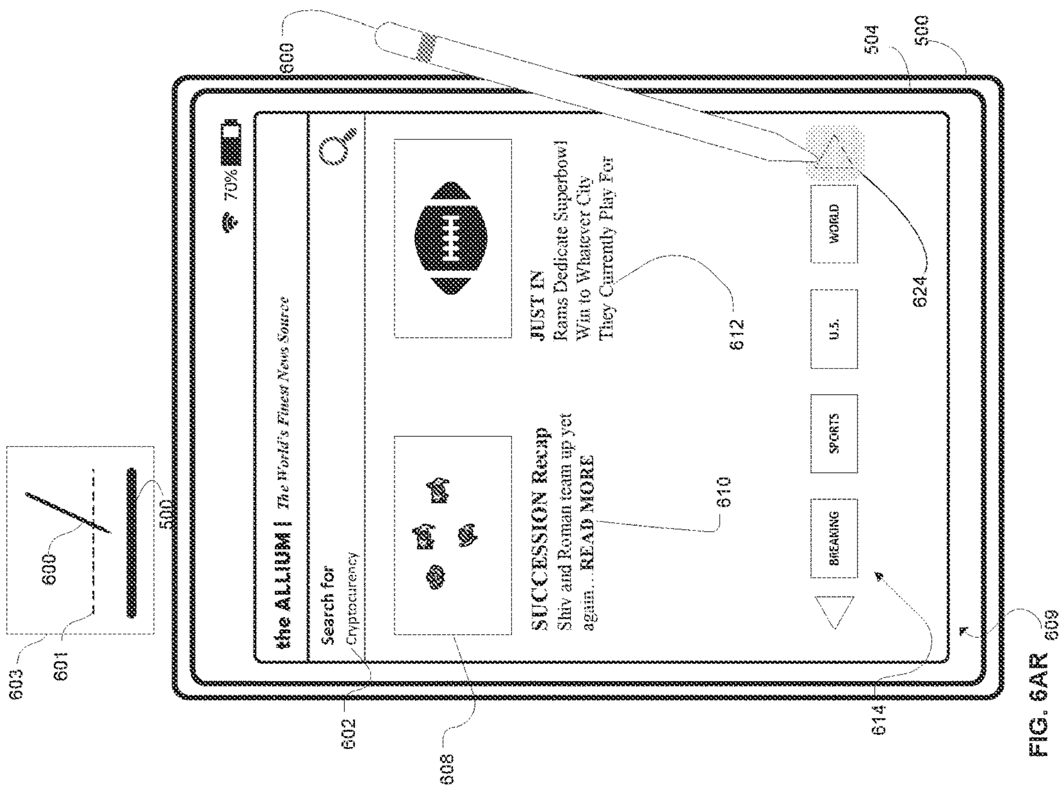
Figure 6A:
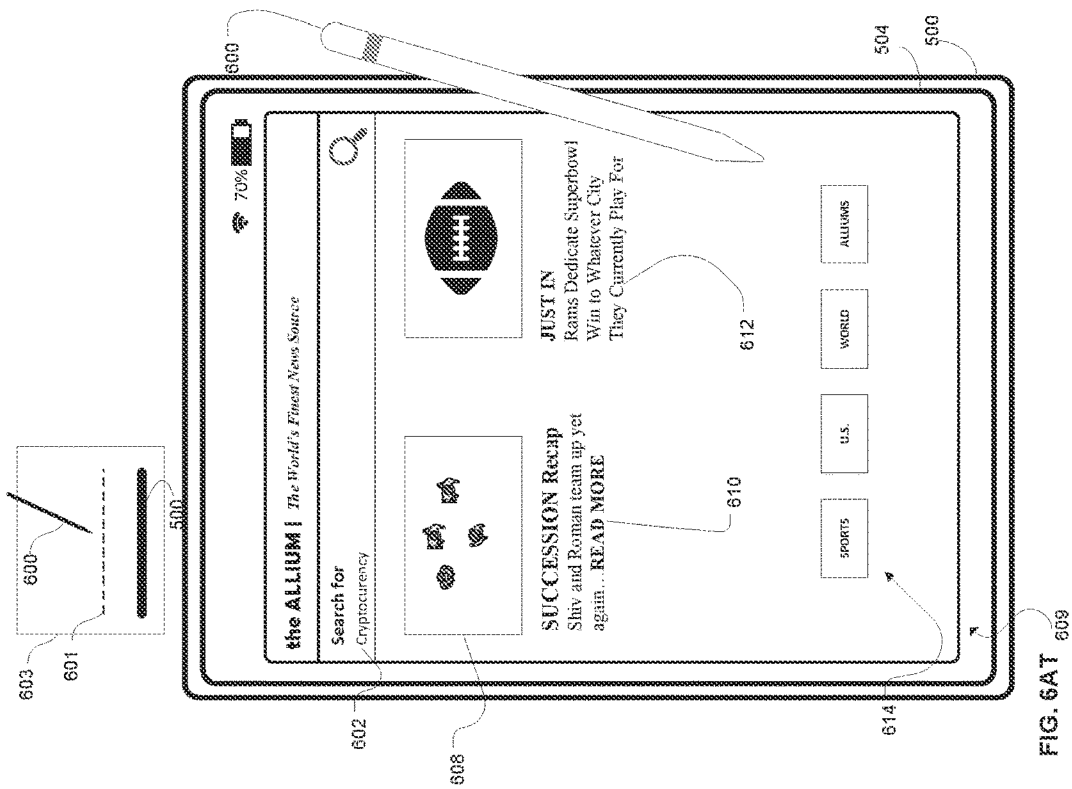
Figure 6A:
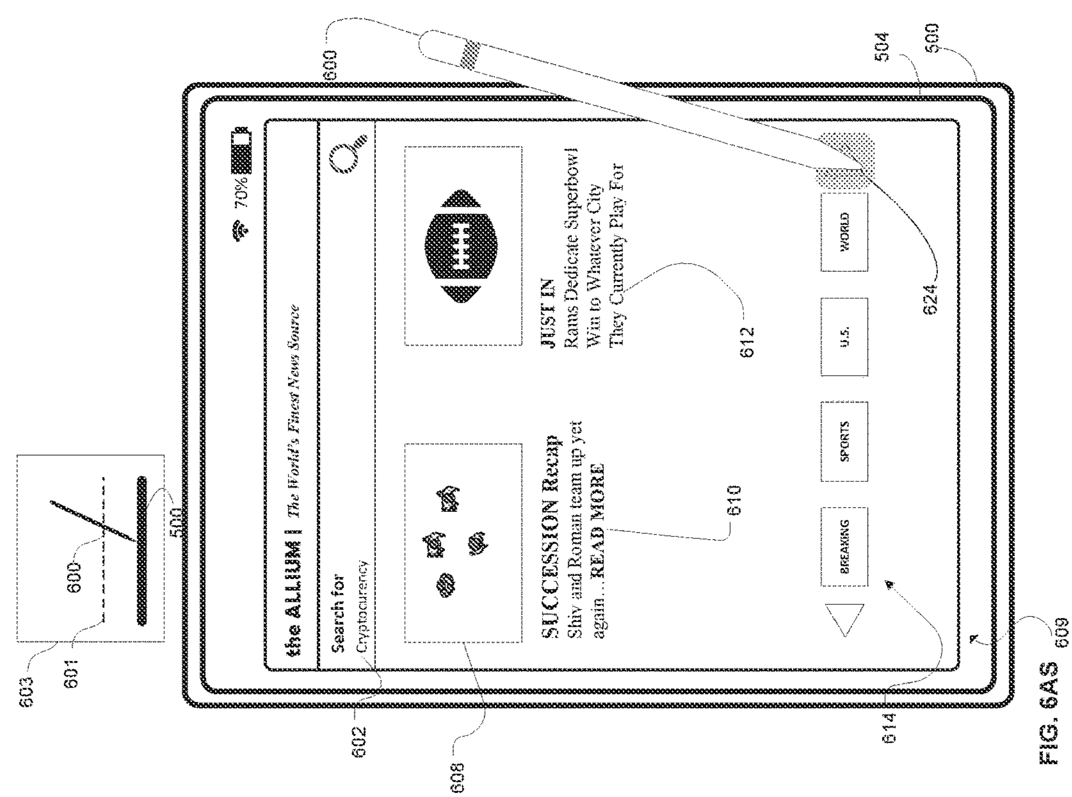
Figure 6A:
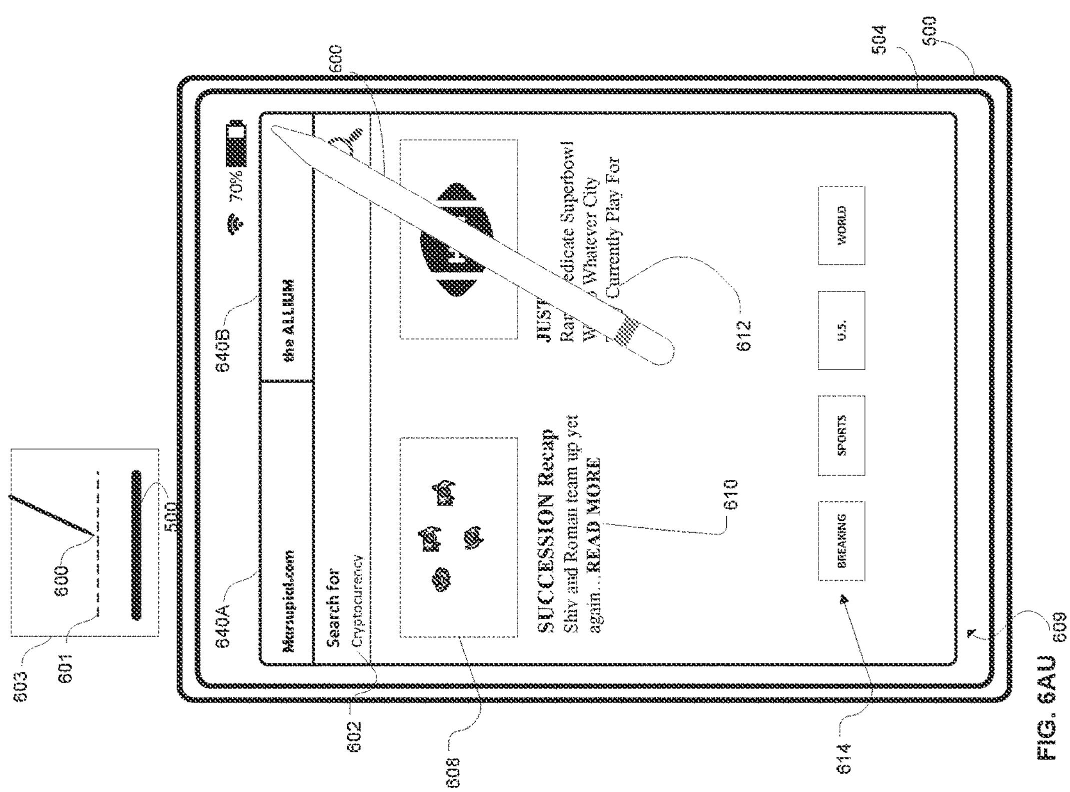
Figure 6A:
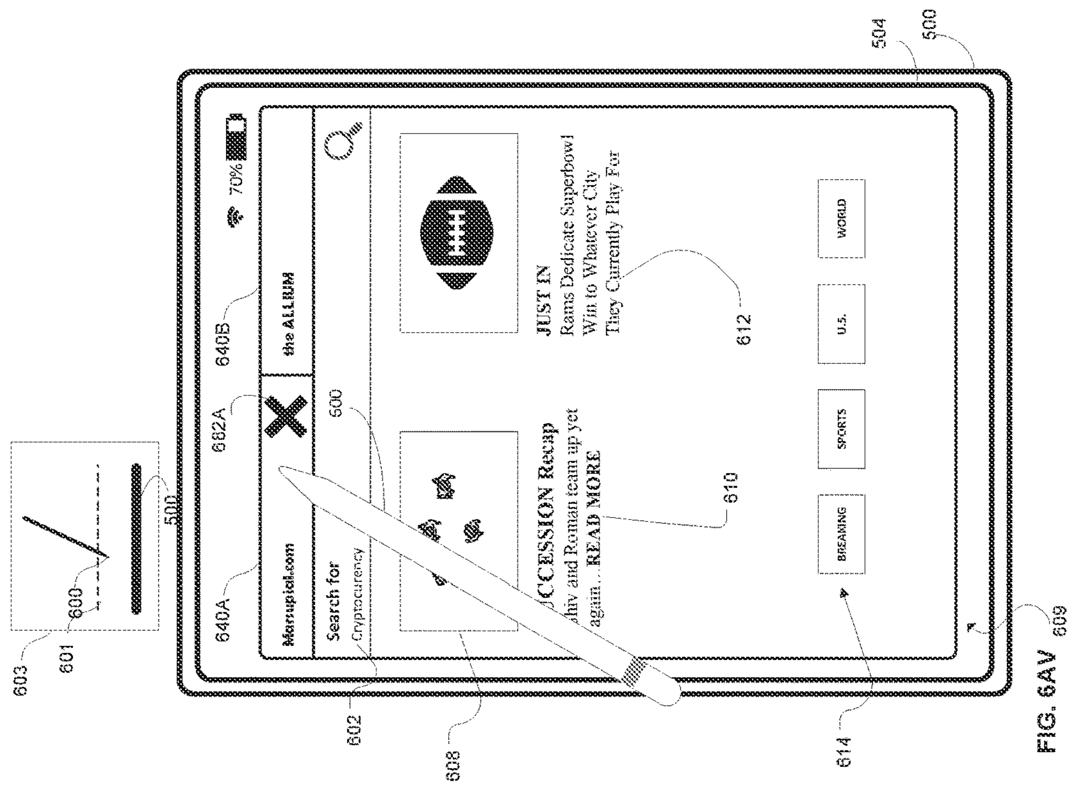
Figure 6A:
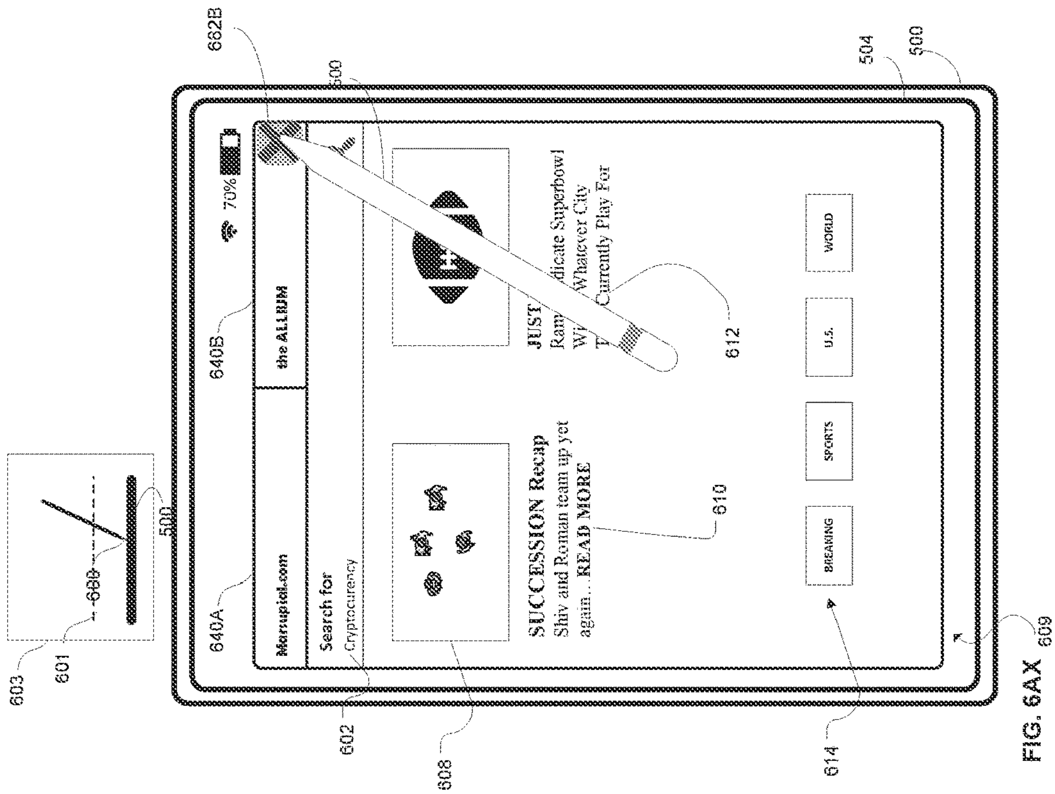
Figure 6A:
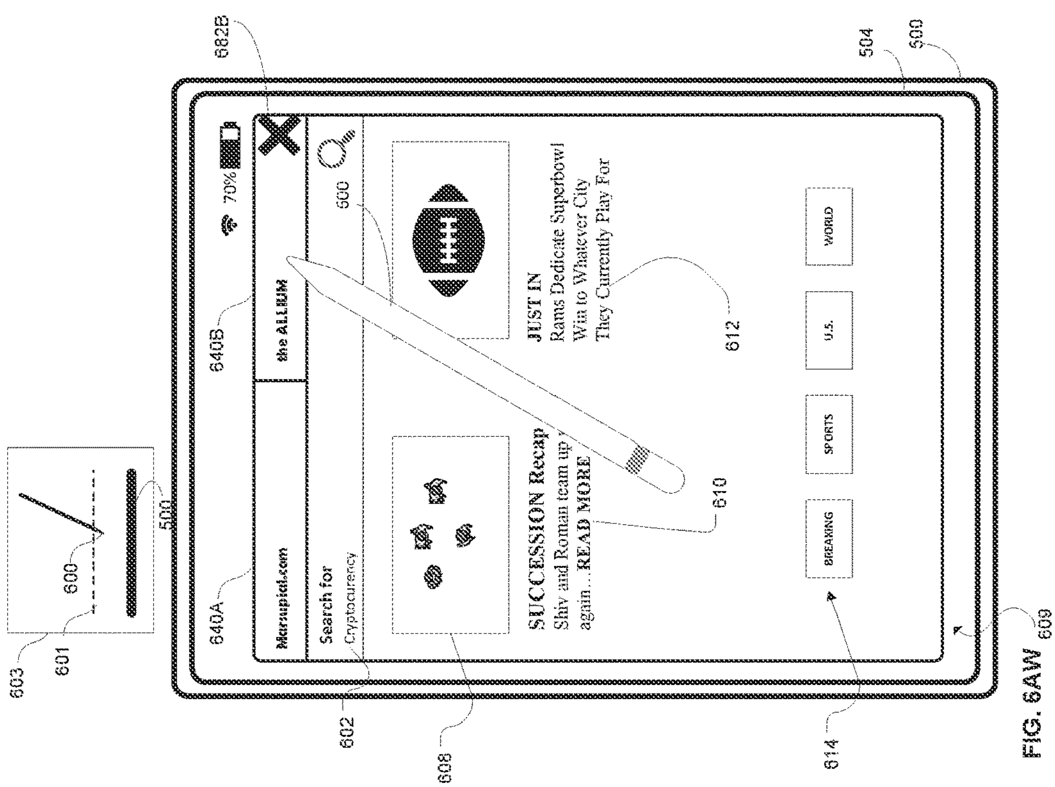
Figure 6A:
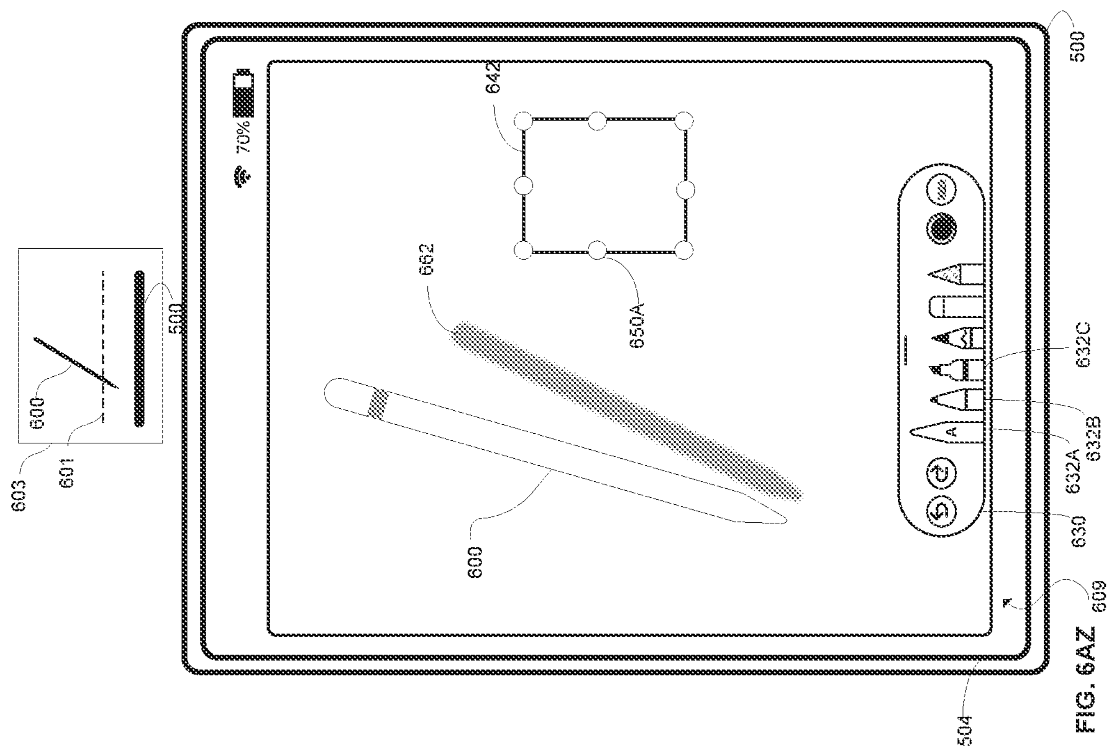
Figure 6A:
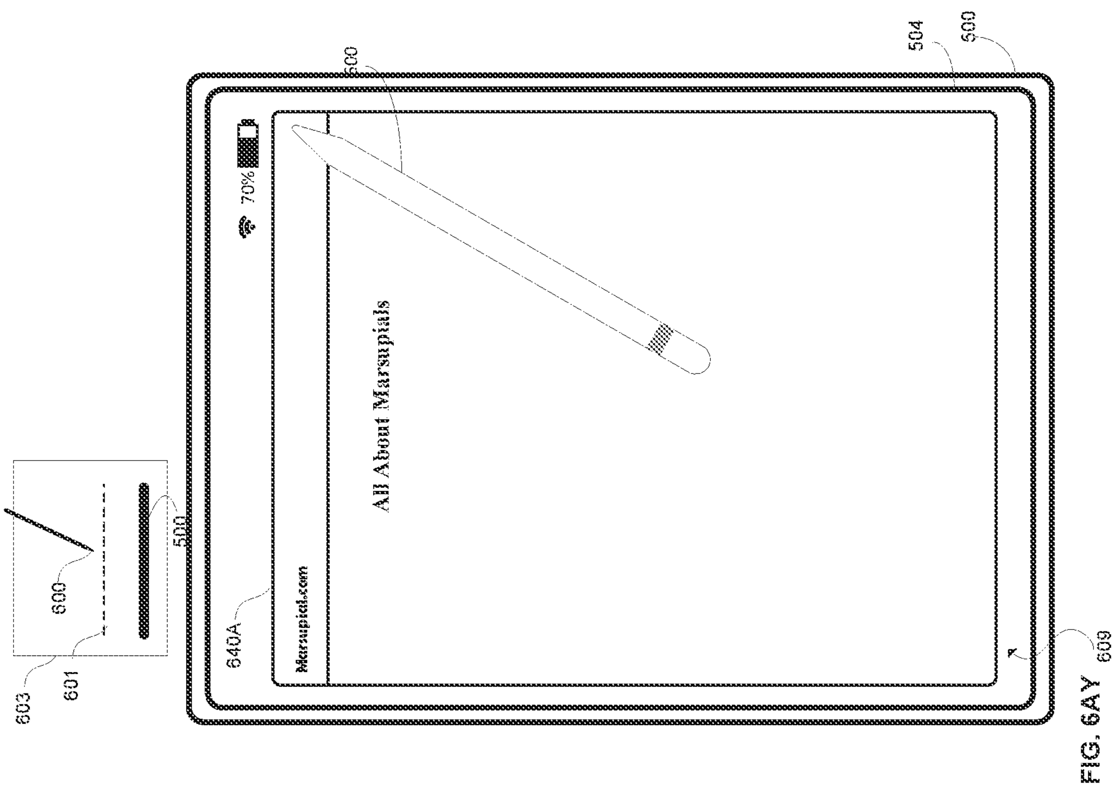
Figure 6B:
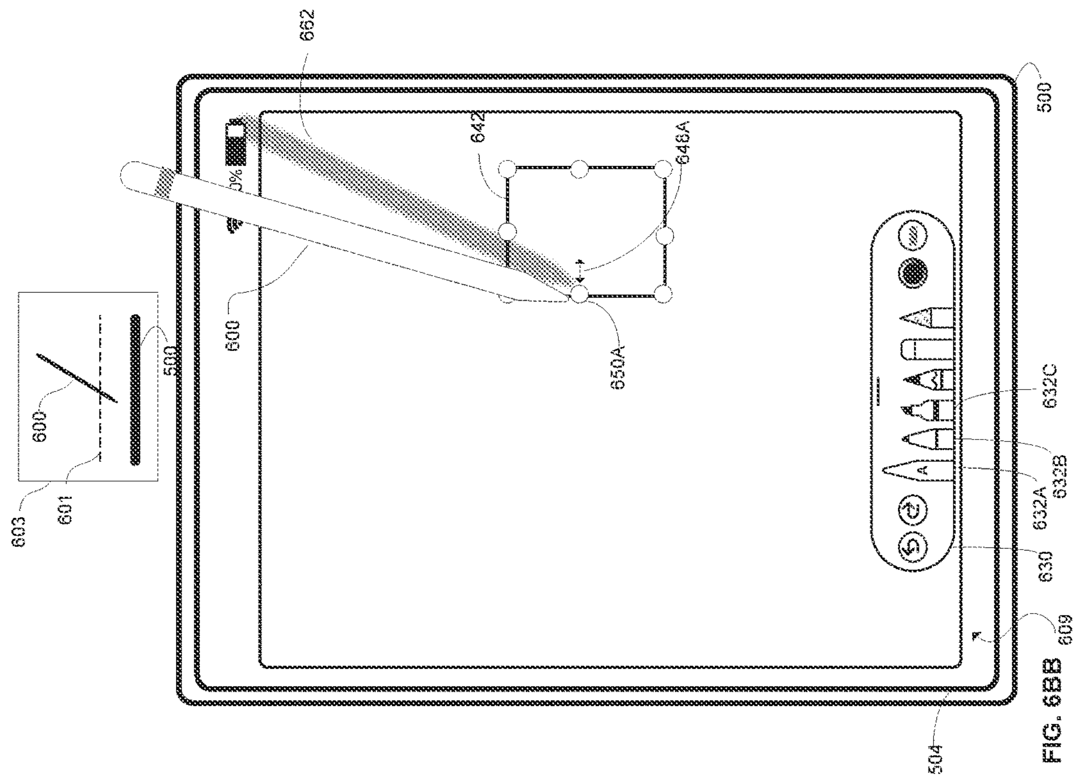
Figure 6B:
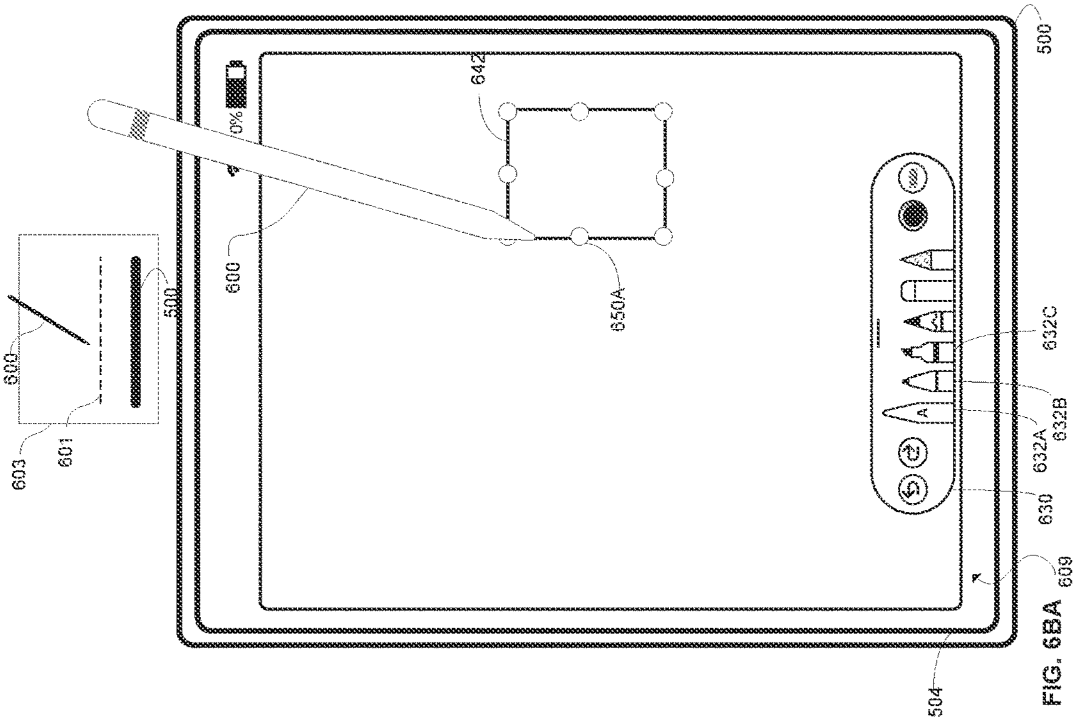
Figure 6B:
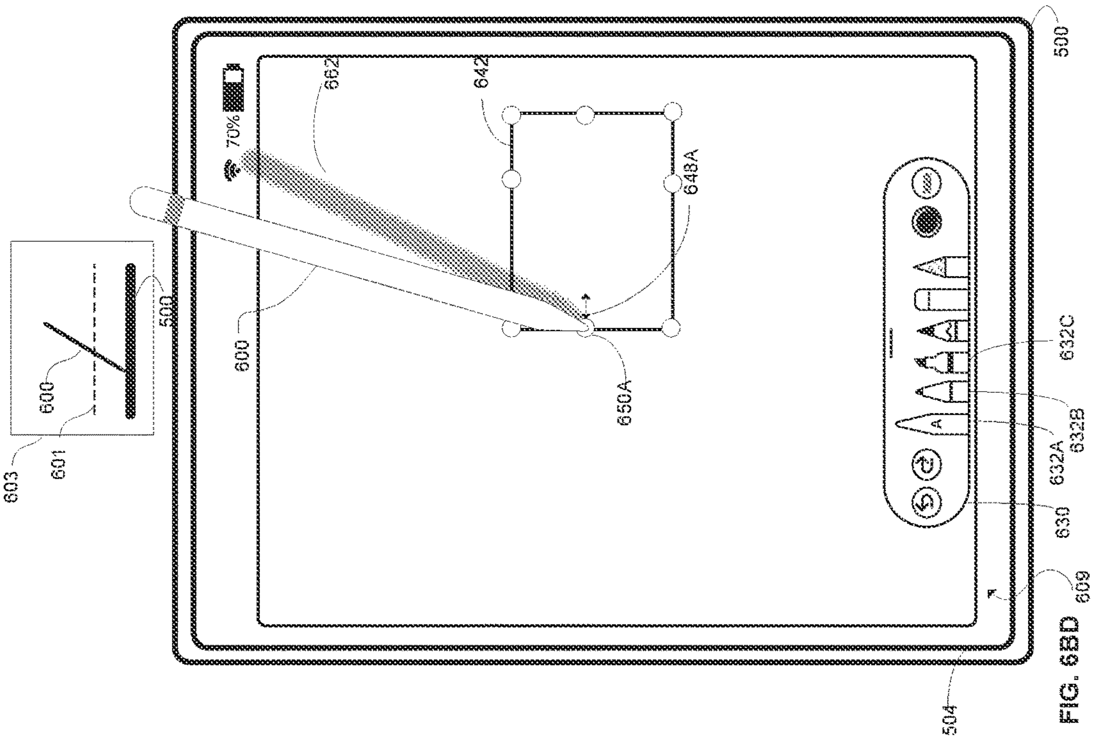
Figure 6B:
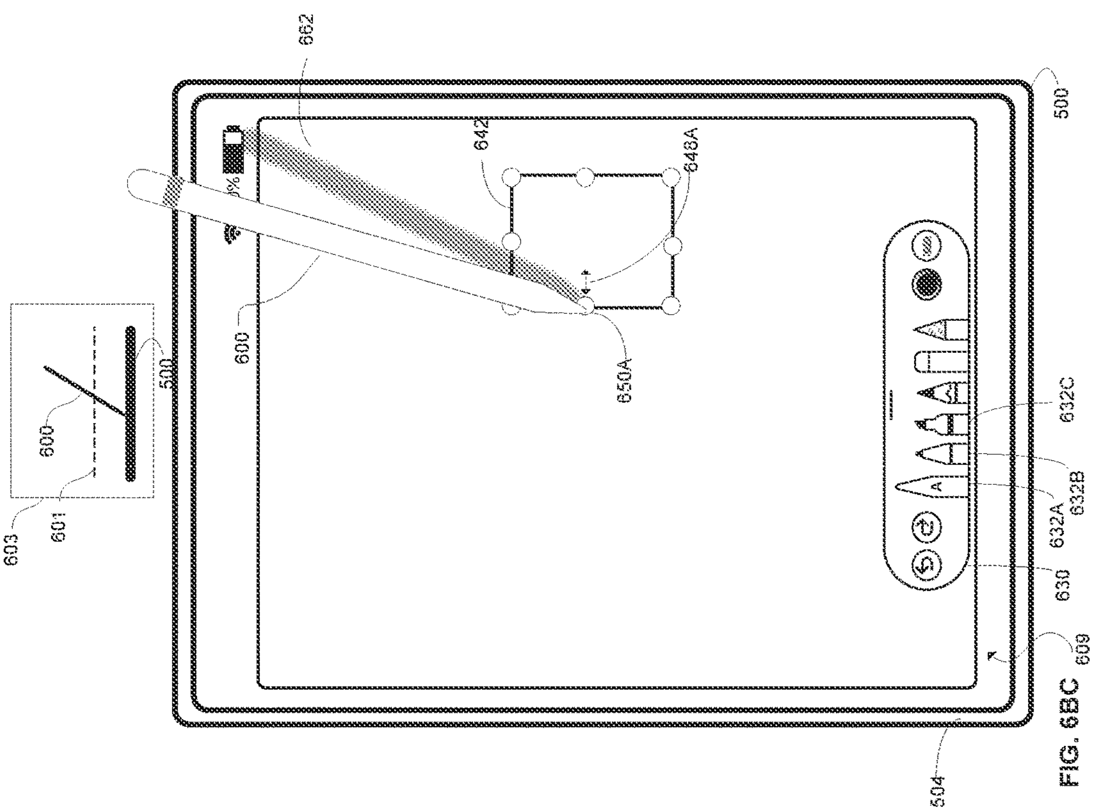
Figure 6B:
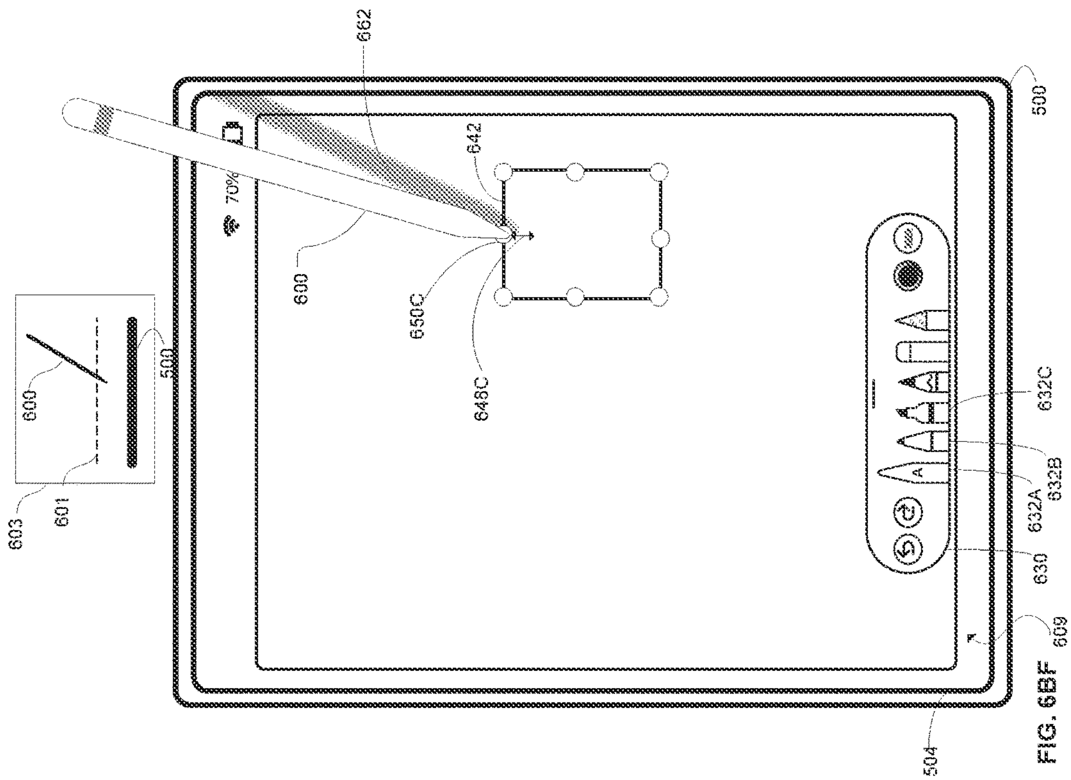
Figure 6B:
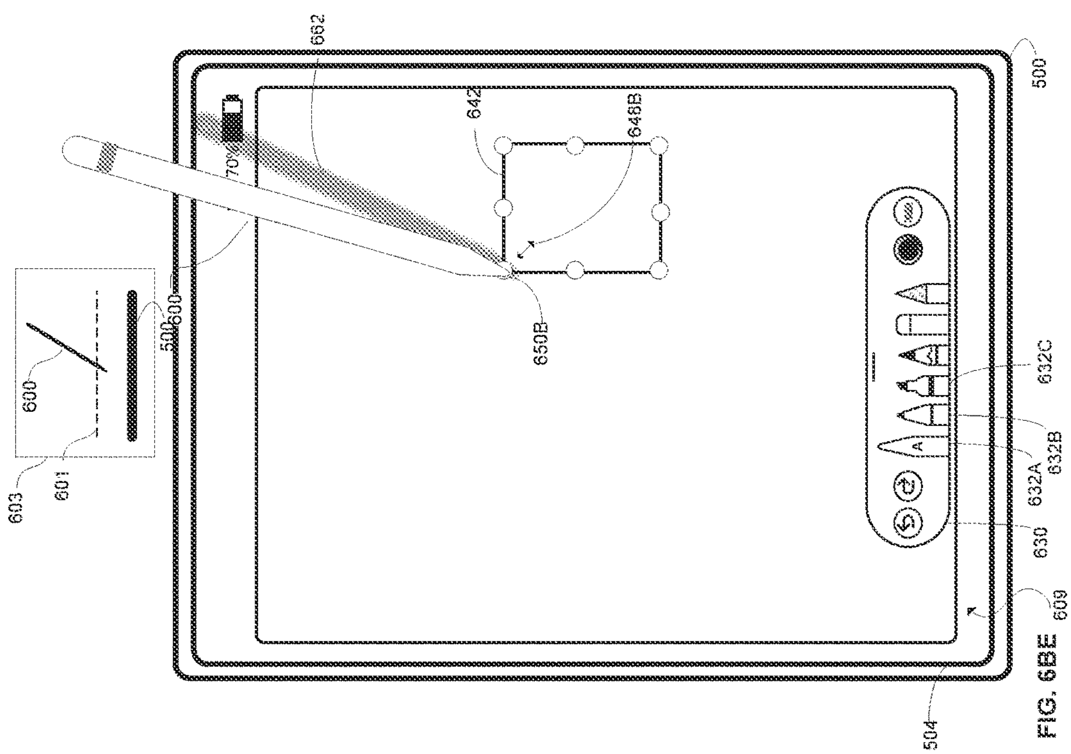
Figure 7A:
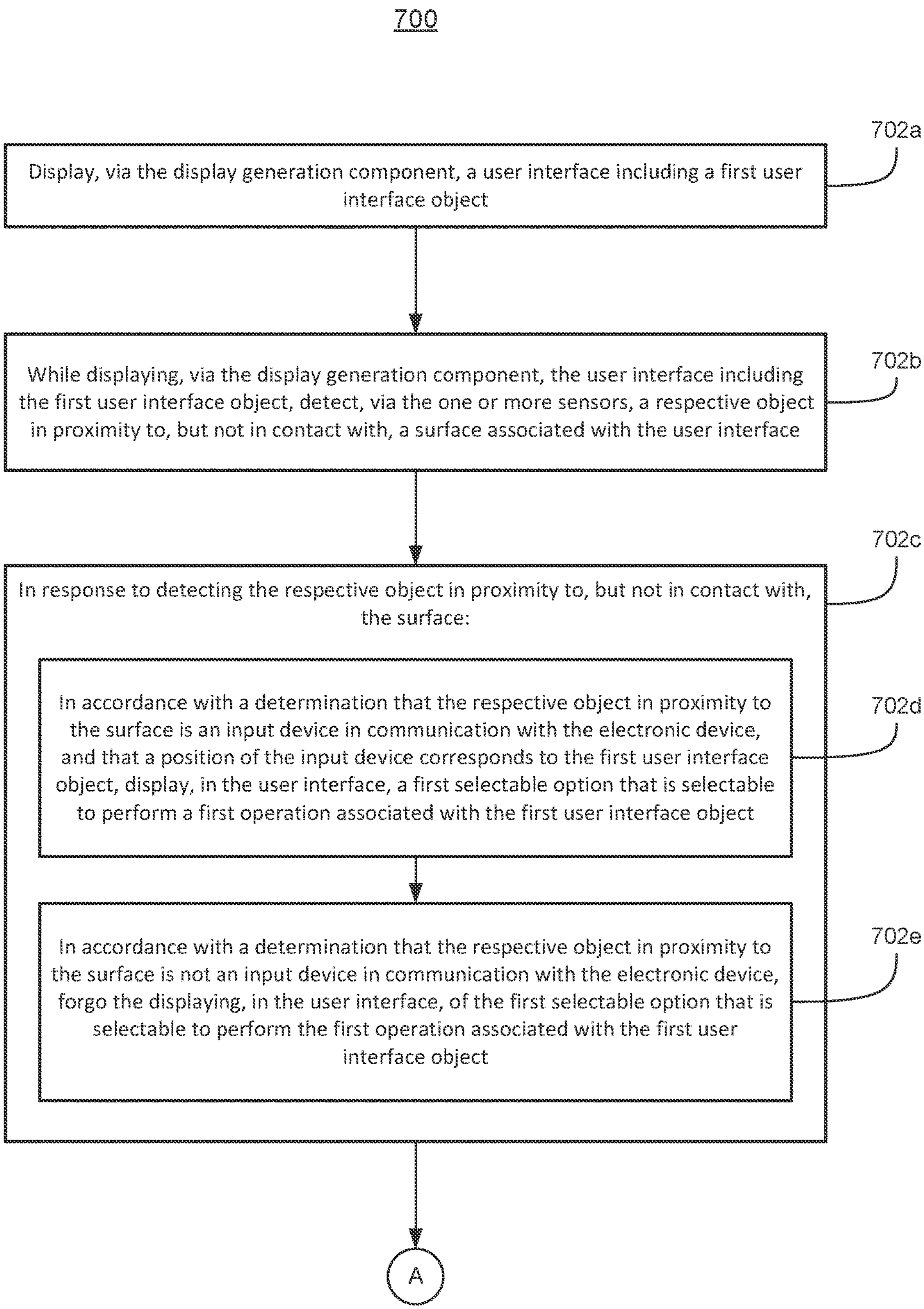
FIGS. 7A-7G are flow diagrams illustrating a method of displaying additional controls and/or information when an input device such as a stylus is hovering over a user interface displayed by the electronic device in accordance with some embodiments.
Figure 7B:
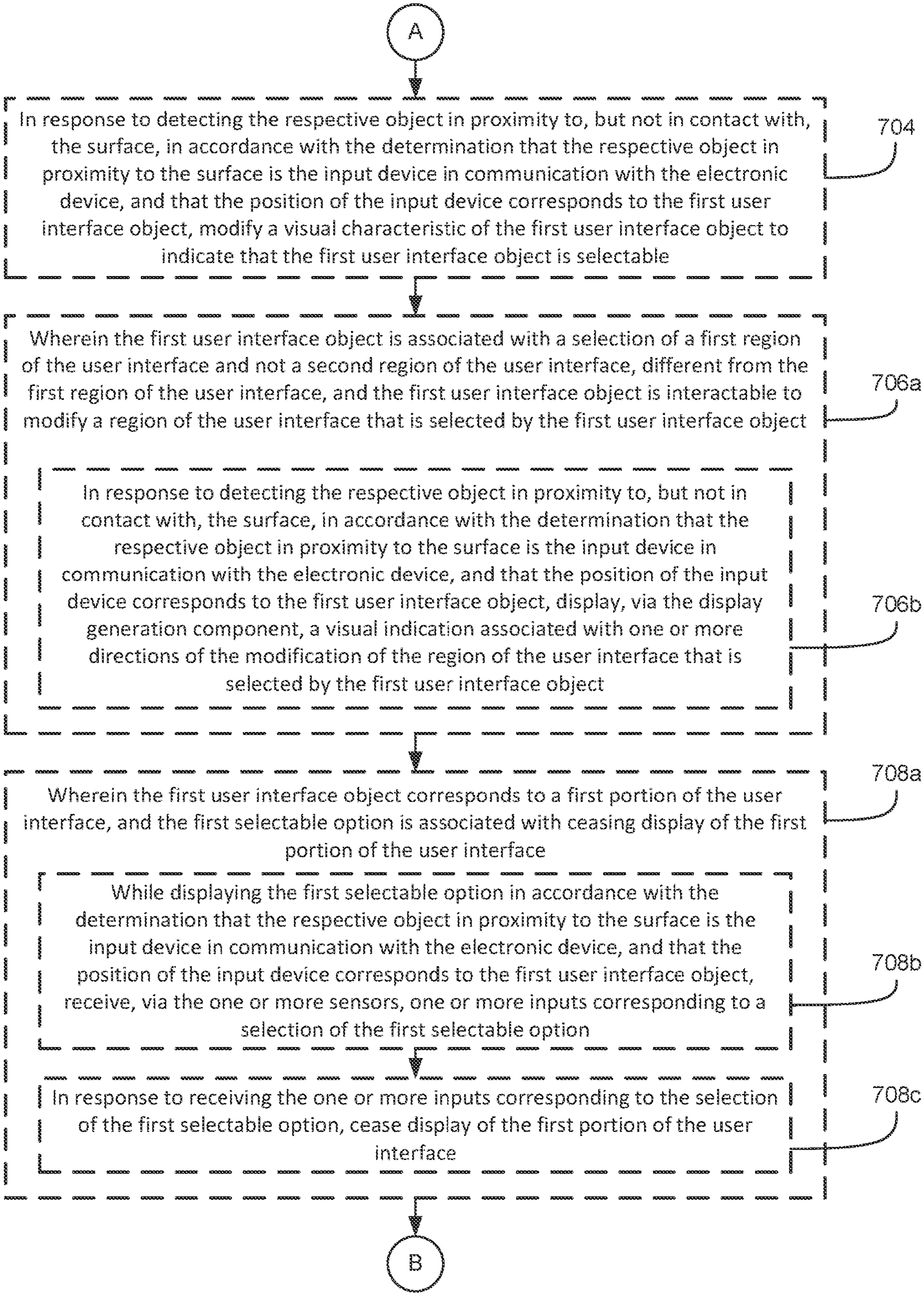
Figure 7C:
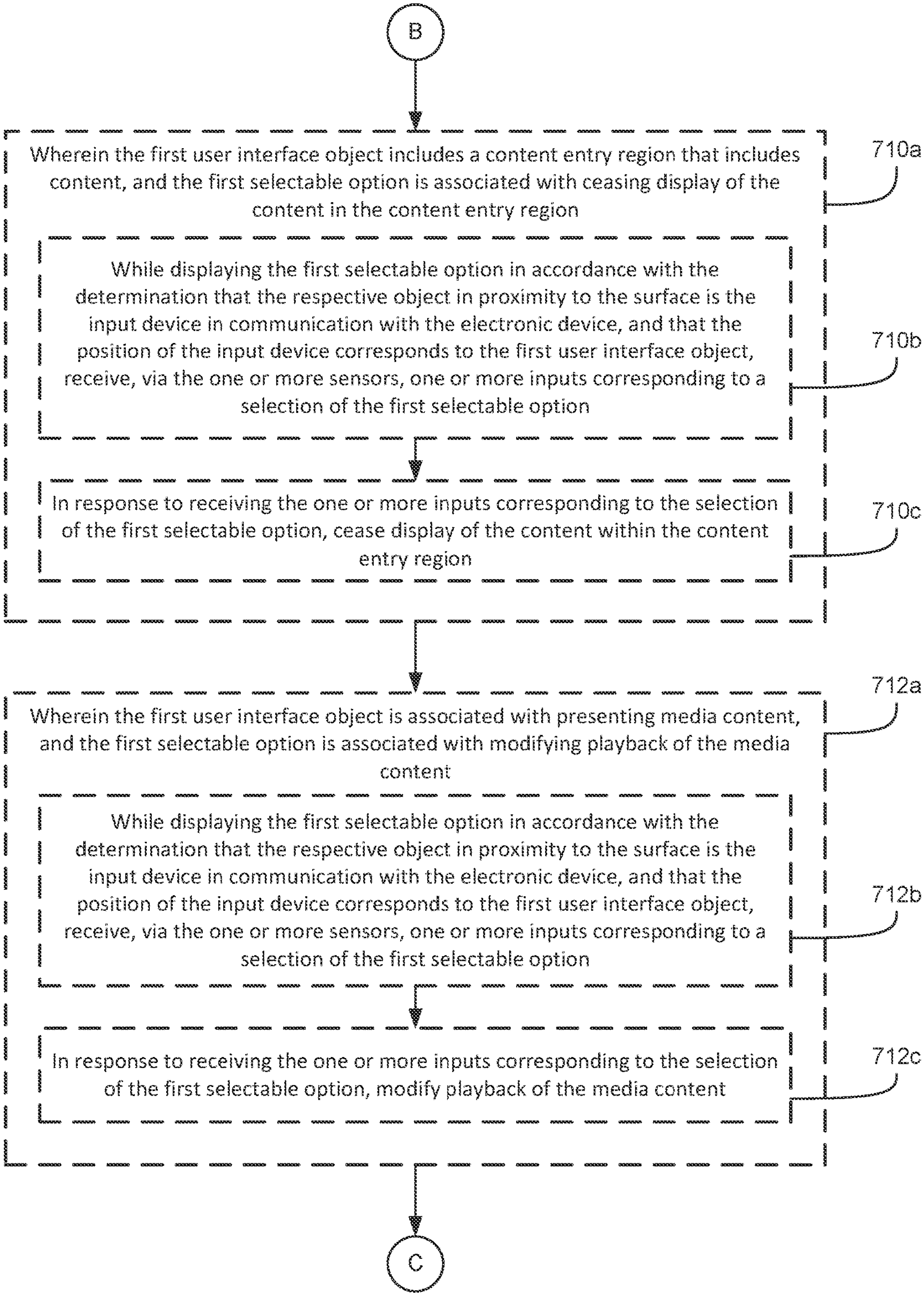
Figure 7D:
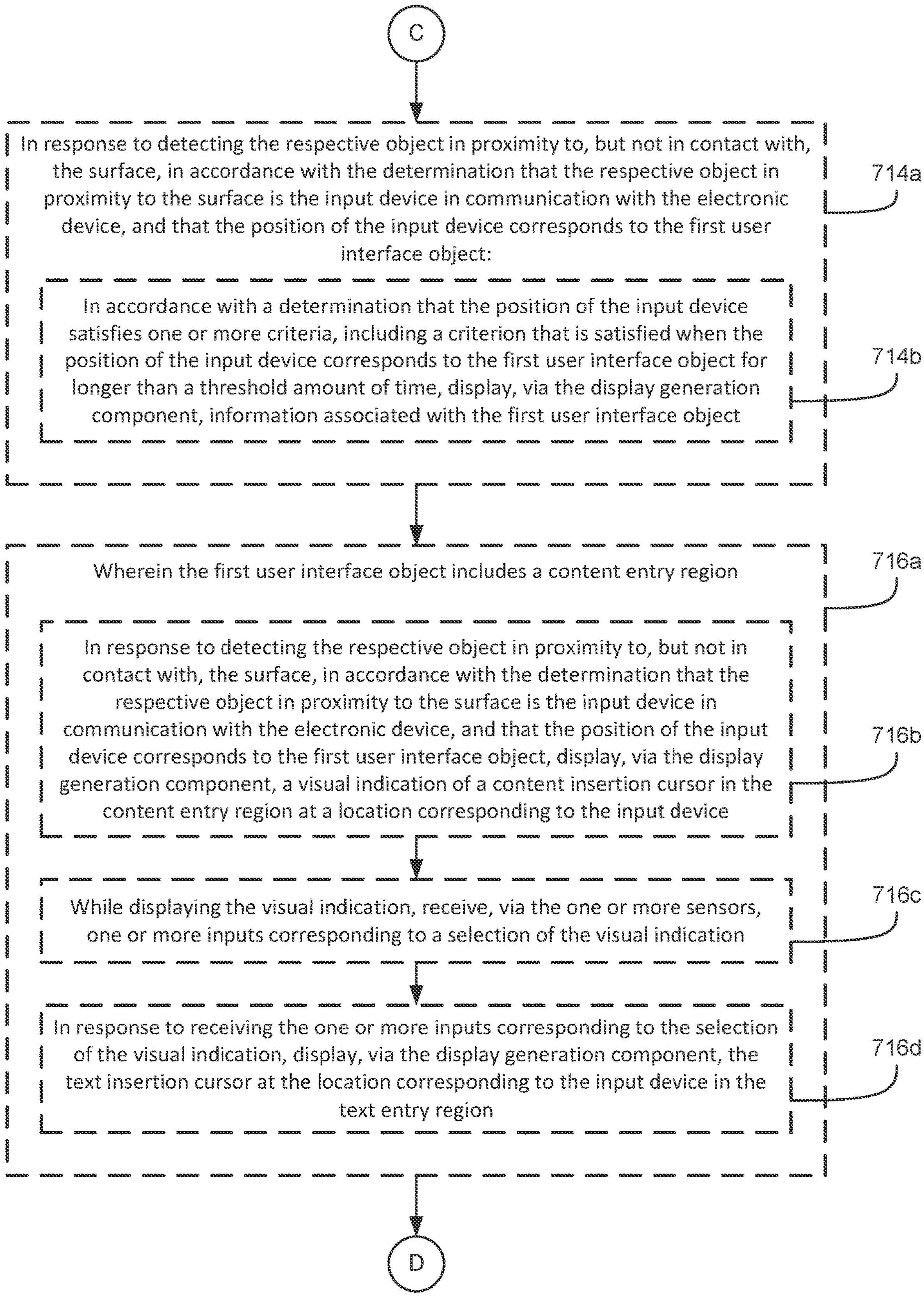
Figure 7E:
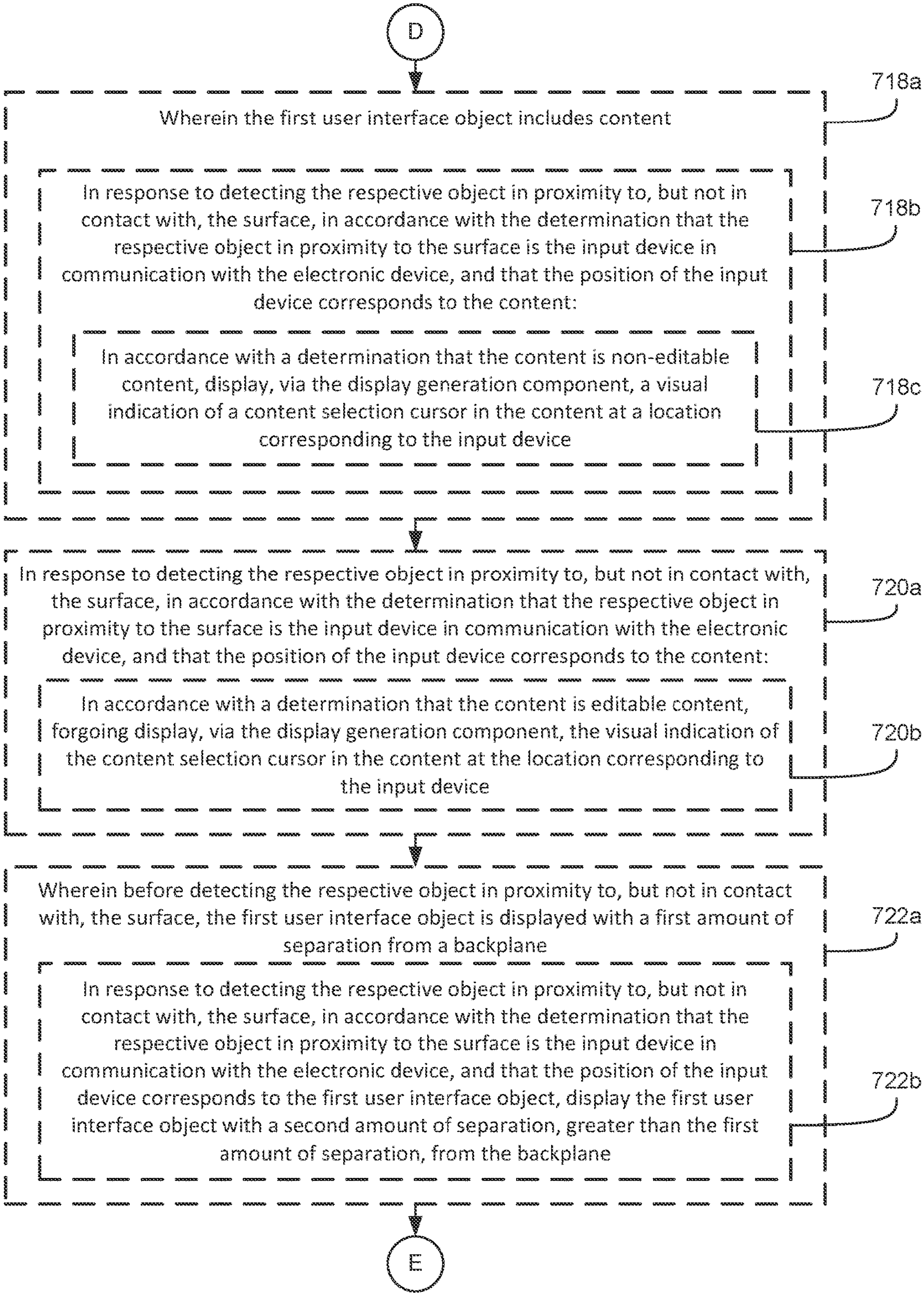
Figure 7F:
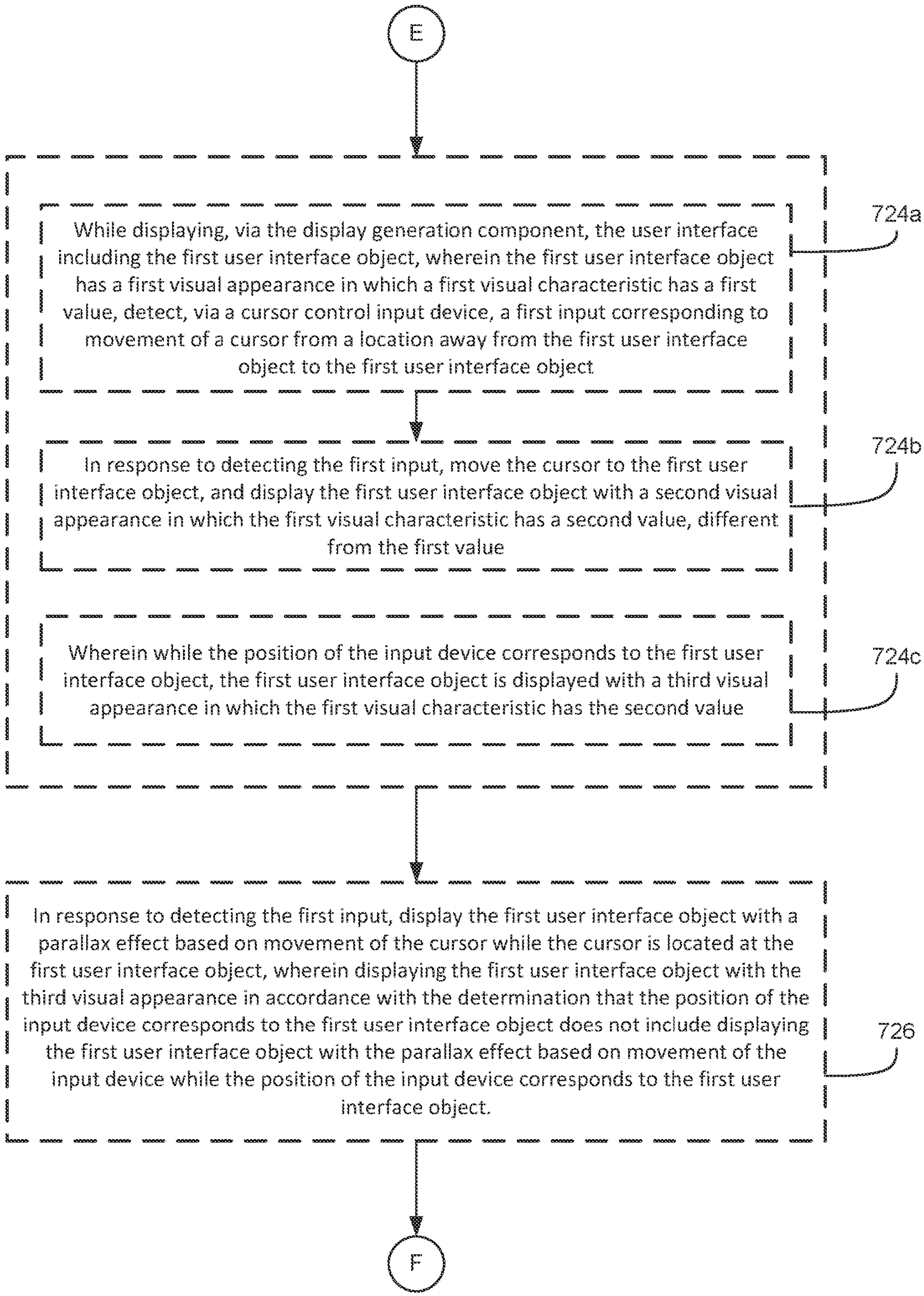
Figure 7G:
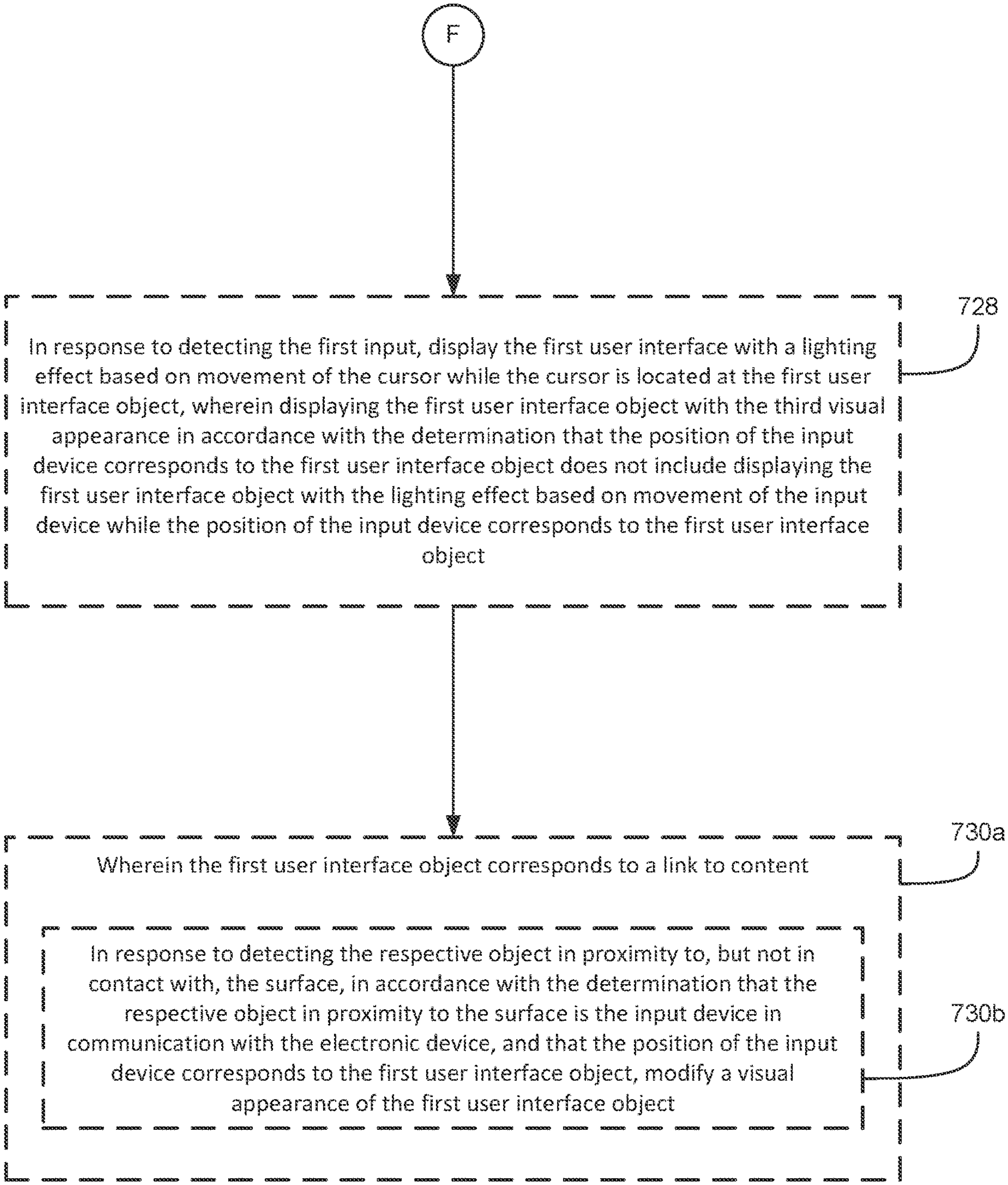

FIG. 6X-6Y illustrate contextual information displayed in response determining that timing information associated with a hover event meets one or more criteria.

For example, as shown in FIG. 6X, the location of stylus 600 corresponds to a search icon 604, and stylus 600 is within threshold distance 601 of touch screen 504. In some embodiments, when the location of stylus 600 corresponds to search icon 604, a timer 623 is initiated. In accordance with a determination that a criterion is satisfied requiring that the time that stylus 600 hovers over search icon 604 exceeds time threshold 625, one or more operations are performed. For example, as shown in FIG. 6Y, in response to detecting the stylus 600 has been hovering over icon 604 for longer than time threshold 625, a tooltip 631 is displayed by device 500. Tooltip 631 optionally includes contextual information associated with the corresponding visual element, such as search icon 604. In some embodiments, the contextual information is a name or a description of a related operation (e.g., "Search", indicating that selection of icon 604 will cause initiation of a search operation).

FIG. 6Z-6DD illustrate hover events and interactions with media content, such as a media player. In some embodiments, user interface 609 includes media content, such as a media player. Although some embodiments are described with respect to video displayed in a media player, it is understood that the media player additionally or alternatively includes audio content.

In FIG. 6Z, media player 608 is displayed in the user interface 609 and stylus 600 corresponds to a position of the media player. As shown in glyph 603, stylus 600 is outside the hover threshold 601, and therefore device 500 does not modify display of user interface 609 in response to the presence of stylus 600. In FIG. 6AA, stylus 600 enters the hover threshold 601, and in response to entering the hover threshold, one or more media controls 620 for media player 608 are displayed by device 500. Media controls 620 optionally include one or more selectable options to modify playback of corresponding media content (e.g., to fast-forward, rewind, pause, play, skip forwards, skip backwards, modify volume of audio, and/or navigate a playback queue). In FIG. 6AB, stylus 600 is moved to a position corresponding to fast-forward icon 620A while remaining within hover threshold 601 but not in contact with touch screen 504. In some embodiments, in accordance with a determination stylus 600 corresponds to a media control such as fast-forward icon 620A, visual emphasis associated with the respective media control is displayed, for example, a modification of scale, color, opacity, shadows, border, and/or lighting effect, as shown in FIG. 6AB. In some embodiments, selecting the respective selectable option initiates performance of one or more operations modifying playback or characteristics of the media, such as a fast forward operation with respect to the media. In FIG. 6AC, selection of fast-forward icon 620A is detected. In some embodiments, selection is determined in response to other gestures or indications (e.g., double-taps on a surface, taps or gestures on the input device, and/or hand gestures). In FIG. 6AD, in response to detecting the selection of the fast-forward icon 620A, device 500 advances a playback position of the media (e.g., the media content is navigated in accordance with the selection).

FIG. 6AE-6AF illustrate hover interactions associated with linked content, such as web links. In FIG. 6AE, stylus 600 is outside a hover threshold 601 as illustrated with respect to touch screen 504. In FIG. 6AE, the relative position of stylus 600 corresponds to content link 610, but device 500 does not modify the visual appearance of link 610 because stylus 600 is outside of hover threshold 601 of touch screen 504. In some embodiments, content link 610 is selectable to initiate one or more operations, such as display of a respective web page, initiation of an application, and/or web-based bookmarking, for example. In some embodiments, in response to a hover event of stylus 600 over touch screen 504 at a position corresponding to the contextual link 610, device 500 visually emphasizes link 610, as shown in FIG. 6AF. For example, device 500 optionally modifies the visual appearance of a background color, opacity, and/or characteristics of the font including bolding and/or underlining of link 610 in response to the hover event.

FIGS. 6AG-6AI illustrate examples of interaction with non-editable content, such as displayed text content or other graphical objects according to examples of the disclosure. For example, in FIG. 6AG, non-editable text 612 is displayed in user interface 609. Such text optionally corresponds to text of a webpage or text included in an image. In FIG. 6AG, the location of stylus 600 corresponds to non-editable text 612, but stylus 600 is outside of threshold distance 601 of touch screen 504, and device 500 does not modify user interface 609 as a result. In FIG. 6AH, in response to a hover event between stylus 600 and touch screen 504, a text selection cursor preview 615 is displayed with a first visual appearance by device 500 at a location corresponding to stylus 600 in text 612 (e.g., corresponding to the tip of stylus 600). The first visual appearance optionally indicates to the user a position of where subsequent selection of text 612 will begin (e.g., in response to contacting stylus 600 with touch screen 504). In some embodiments, the first visual appearance includes a first level of opacity and/or color. In FIG. 6AI, selection such as contact between stylus 600 and touch screen 504 is detected by device 500. In some embodiments, in response to the contact, display of text selection preview cursor 615 is ceased, and display of text selection cursor 617 is initiated at the position of the contact on the touch screen 504 (e.g., at the beginning of text 612 in FIG. 6AI). In some embodiments, text selection cursor 617 is displayed with a second visual appearance to visually distinguish between a selection cursor preview and the actual selection cursor. For example, the second visual appearance optionally is darker and/or less translucent than the first visual appearance. As shown in FIG. 6AJ, while maintaining the contact between stylus 600 and touch screen 504, stylus 600 is moved in the rightward direction along touch screen 504. In response to the movement, the position of text selection cursor 617 is updated and content (e.g., text) between the position in the user interface corresponding to the initial contact and the terminal position in the user interface is selected (e.g., highlighted with a degree of translucency) as shown by selection 644.

In FIGS. 6AK-6AO, hover interactions with selection of non-editable text are illustrated. In FIG. 6AK, non-editable text 612 is selected (e.g., as described with reference to FIG. 6AJ) as indicated by selection 644 including one or more selectable options including grabber 646A. Selectable options including grabber 646A are optionally selected to modify the bounds of selection 644 with respect to text 612. In some embodiments, the bounds of selection 644 are modified in response to selecting a respective grabber such as grabber 646A (e.g., contacting stylus 600 with touch screen 504) and modifying a position of grabber 646A (e.g., dragging stylus 600 across touch screen 504). In FIG. 6AL, in response to a hover event corresponding to grabber 646A, device 500 displays arrow 648A, indicating a direction of manipulation of selectable option 646A. For example, in FIG. 6AL, arrow 648A indicates that selectable option 646A is manipulable in left and right directions, which would cause selection 644 to contract or expand, accordingly.

In FIG. 6AM, in response to device 500 detecting selection of grabber 646A by stylus 600, device 500 initiates an operation to manipulate grabber 646A and/or selection 644. For example, while stylus is contacting grabber 646A, selection 644 is modified in accordance with movement of the stylus along touch screen 504. In FIG. 6AN, selection 644 is expanded to the right in response to corresponding movement of stylus 600 to the right while maintaining selection of selectable option 646A.

In some embodiments, device 500 displays different indications of functionality in response to detecting stylus hovering over different selectable options. For example, in FIG. 6AO, arrow 648B is displayed by device 500 in response to a hover event corresponding to stylus 600 over grabber 646B, wherein arrow 648B indicates that grabber 646B is vertically (rather than horizontally) manipulable to vertically expand or contract selection 644. It is understood that vertical manipulation of selection 644 optionally is similar, or the same as, described with respect to FIGS. 6AL-6AM.

In FIGS. 6AP-6AT, hover events directed to selectable icons and/or user interface objects including selectable icons, and display of additional selectable options are illustrated.

In FIG. 6AP, a region 614 of user interface 609 including a plurality of selectable options (e.g., "breaking", "sports", "U.S." and "world") is displayed in user interface 609, respectively selectable to initiate one or more operations, such as display of a respective web page, initiation of an application, and/or web-based bookmarking, for example. In FIG. 6AQ, stylus 600 is moved within hover threshold 601 of touch screen 504 as shown in glyph 603, and is at a location corresponding to the region 614 including the selectable options. In response, device 500 displays a plurality of navigational arrows, including arrow 624. In some embodiments, arrow 624 is selectable to scroll the plurality of selectable options (e.g., rightward). For example, device 500 optionally displays one or more selectable options that are not currently displayed, ceases display of one or more of the currently displayed selectable options, and/or modifies a position of respective currently displayed selectable options in response to selecting arrow 624.

In FIG. 6AR, a hover event including movement of stylus 600 to correspond to a location of navigational arrow 624 while remaining within the hover threshold 601 (e.g., while not contacting touch screen 504) is detected by device 500. In response to the hover event, navigational arrow 624 is displayed with visual emphasis (e.g., modification of scale, color, opacity, shadows, border, and/or lighting effect) with a first appearance (e.g., a first scale, color opacity, shadow, border, and/or lighting effect), as shown in FIG. 6AR. In FIG. 6AS, selection of navigational arrow 624 is detected (e.g., stylus 600 contacting touch screen 504 at a position corresponding to navigational arrow 624) by device 500. It is understood that in some embodiments, the selection of navigational arrow 624 optionally is one or more alternative inputs (e.g., hand gestures and/or double taps between stylus 600 and the surface). In FIG. 6AT, in response to the input in FIG. 6AS, device 500 scrolls through the selectable options in region 614 rightward to reveal the selectable option "Alliums" in region 614. Further, stylus 600 is moved outside of the hover threshold 601, and in response to such movement, device 500 ceases display of the navigational arrows, as shown in FIG. 6AT. In some embodiments, despite the movement of stylus 600 outside the hover threshold 601, display of navigational arrow 624 is maintained. In some embodiments, after moving stylus 600 outside the hover threshold 601, display of the navigational arrows is maintained for a threshold amount of time (e.g., 0.05, 0.1, 0.2, 0.5, 1, 2, 5, or 10 seconds), and after exceeding the time threshold, the display of the navigational arrows is ceased by device 500.

In FIGS. 6AU-6AY, user interface 609 corresponds to a web browser interface (e.g., Safari web browser), and hover events corresponding to a plurality of tabs of the web browser are illustrated.

In FIG. 6AU, content corresponding to first tab 640A is not displayed in user interface 609, and content corresponding to the second tab 640B is displayed (e.g., the second tab 640B is the currently-selected tab in FIG. 6AU). In some embodiments, content corresponding to respective tabs are displayed (e.g., concurrently displaying content from two or more tabs), and in some embodiments, content corresponding to respective tabs are not displayed (e.g., a default landing page, such as a page including a user's bookmarked links is displayed). As shown in glyph 603 in FIG. 6AU, stylus 600 is outside the hover threshold 601. In FIG. 6AV, a hover event is detected by the electronic device 500 including movement of stylus 600 into the hover threshold 601 and to a position corresponding to tab 640A (e.g., a region of user interface 609 corresponding to the displayed portion of tab 640A). In response to the hover event, selectable option 682A for tab 640A is displayed by device 500. In some embodiments, visual emphasis (e.g., scale, color, opacity, shadows, border, and/or lighting effect) of the region corresponding to the first tab 640A is modified or displayed in response to the hover event. In some embodiments, in response to a hover event corresponding to selectable option 682A and/or 682B, a visual emphasis for selectable options 682A and/or 682B is displayed or a currently displayed visual emphasis is modified, as will be described later. In FIG. 6AW, stylus 600 is moved from a position corresponding to first tab 640A to a position corresponding to a region associated with second tab 640B. In response to a determination that the position of stylus 600 does not correspond to first tab 640A, device 500 ceases display of selectable option 682A, as shown in FIG. 6AW. In some embodiments, the visual emphasis corresponding to first tab 640A is additionally or alternatively ceased in accordance with such a determination. Further, in FIG. 6AW, in response to a determination that stylus 600 hovers over touch screen 504 at a location corresponding to second tab 640B, display of second tab 640B is modified. For example, visual emphasis of second tab 640B is displayed and/or display of selectable option 682B is initiated by device 500; in some embodiments, details of displaying tab 640B and/or selectable option 682B are the same or similar to as described with respect to FIG. 6AU (e.g., visual emphasis and/or display of selectable option 682A). In FIG. 6AX, selection of selectable option 682B is detected by device 500 (e.g., an indication of contact between stylus 600 and touch screen 504 at a position corresponding to selectable option 682B is detected), and the visual emphasis of selectable option 682B is optionally modified (e.g., a modification of e.g., scale, color, opacity, shadows, border, and/or lighting effect). In some embodiments, the input selecting selectable option 682B is a hand gesture and/or one or more gestures on the input device.

In FIG. 6AY, in response to the selection of selectable option 682B in FIG. 6AX, device 500 ceases display of content corresponding to second tab 640B. Further, in response to the ceasing of the display of content corresponding to second tab 640B, content corresponding to first tab 640A is initiated, as shown in FIG. 6AY. In some embodiments, in accordance with a determination that user interface 609 includes a single tab, default content is displayed in response to a request to cease display of content corresponding to the single tab (e.g., a landing page).

In FIGS. 6AZ-6BF, hover events corresponding to requests to interact with a user interface object are shown.

In FIG. 6AZ, user interface 609 corresponds to a drawing user interface including a control palette 630 including selectable options to modify marks made in the drawing user interface by stylus 600. For example, selectable options 632A, 632B, and 632C are respectively selectable to modify a currently selected writing and/or drawing implement for stylus 600. Virtual shadow 662 is displayed in user interface 609 based on the position of stylus 600 relative to touch screen 504 and the currently selected writing and/or drawing implement. The behavior and appearance of the virtual shadow is further described with respect to method 900 and FIGS. 8A-8C. A currently selected user interface object 642 is displayed in a content entry region of the user interface 609 including grabber 650A, optionally selectable to modify user interface object 642. In some embodiments, a respective “grabber” is a selectable option that is selectable to modify a corresponding virtual object. For example, detecting a selection of a respective grabber and detecting modification of the respective grabber while maintaining the selection optionally modifies (e.g., scales, translates, and/or expands) a virtual object associated with the respective grabber in a manner (e.g., a direction of scaling, translating, and/or expanding the virtual object) based on the modification.

In FIG. 6BA, stylus 600 is moved to a position relative to touch screen 504 corresponding to grabber 650A, but outside hover threshold 601 as shown in glyph 603. Because stylus 600 is outside of hover threshold 601, device 500 does not modify the display of object 642 and/or the various grabbers for user interface object 642. In FIG. 6BB, stylus 600 is moved within hover threshold 601 and to a position corresponding to grabber 650A, and in response, device 500 displays directional arrow 648A. In some embodiments, in response to hovering over grabber 650A, one or more visual indications associated with a direction of manipulation (e.g., scaling, transforming, and/or extending) user interface object 642 are displayed. In some embodiments, a directional arrow indicates a possible direction of manipulation. For example, directional arrow 648B is oriented horizontally extending towards the left and towards the right, indicating manipulation (e.g., expanding the visual object) is possible towards the left and/or the right of grabber 650. In some embodiments, a directional arrow indicates one direction of manipulation (e.g., just upwards, just downwards, just rightwards, or just leftwards).

In FIG. 6BC, while the position of stylus 600 corresponds to the position of grabber 650A, an indication of selection including stylus 600 contacting touch screen 504 is received by device 500. In response to the contact, an operation associated with manipulating user interface object 642 is initiated by device 500. For example, in FIG. 6BD, while maintaining the contact described with respect to FIG. 6BC, an indication of movement (e.g., stylus 600 sliding along touch screen 504 to the left) is received. In response to the operation to manipulate the user interface object 642, device 500 scales user interface object 642 in accordance with the movement (e.g., scales object 642 leftward). In some embodiments, such manipulation corresponds to scaling (e.g., stretching, enlarging, and/or shrinking) a user interface object by a degree correlated with the amount of movement of stylus 600 (e.g., positively or negatively correlated).

In FIG. 6BE, user interface object 642 is displayed, and directional arrow 648B corresponding to a different manipulation of user interface object 642 is also displayed. In particular, in response to a hover event including hovering stylus 600 over touch screen 504 at a position corresponding to a position of a respective grabber corresponding to navigational arrow 648B (e.g., the upper-left grabber of object 642), navigational arrow 648B is optionally displayed by device 500. In some embodiments, navigational arrow 648B indicates detecting a selection and modification of a position of grabber 650B can modify user interface object 642 in two non-parallel directions (e.g., scaling, transforming, and/or extending the object towards the upper-left and/or towards the bottom-right of touch screen 504). Similarly, in FIG. 6BF, directional arrow 648C corresponding to a manipulation of the user interface object in a vertical direction is displayed in response to a hover event including stylus 600 moving to a position over touch screen 504 corresponding to a position of a respective grabber corresponding to navigational arrow 648C (e.g., the upper grabber of object 642). In some embodiments, navigational arrow 648C indicates detecting a selection and modification of a position of grabber 650C can modify user interface object 642 vertically (e.g., scaling, transforming, and/or extending the object towards the top and/or bottom of touch screen 504). In some embodiments, in response to detecting hover events of stylus 600 over the other respective grabbers of user interface object 642, device 500 similarly displays visual indications corresponding to directions of manipulation of those grabbers, as described with respect to FIGS. 6AZ-6BF.

FIGS. 7A-7J are flow diagrams illustrating a method 700 of displaying additional controls and/or information when an input device such as a stylus is hovering over a user interface displayed by the electronic device. The method 700 is optionally performed at an electronic device such as device 100, device 300, and device 500 as described above with reference to FIGS. 1A-1B, 2-3, 4A-4B and 5A-5I. Some operations in method 700 are, optionally combined and/or order of some operations is, optionally, changed.

As described below, the method 700 provides ways to display additional controls and/or information when an input device such as a stylus is hovering over a user interface displayed by the electronic device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device in communication with a display generation component and one or more sensors (e.g., a touch-sensitive surface). For example, a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external). In some embodiments, the display generation component is a display integrated with the electronic device (optionally a touch-sensitive and/or touch screen display), external display such as a monitor, projector, television, and/or a hardware component (optionally integrated or external) for projecting a user interface or causing a user interface to be visible to one or more users.

In some embodiments, the electronic device displays (702*a*), via the display generation component, a user interface including a first user interface object, such as user interface 609 including the search field in FIG. 6C. For example, the user interface is optionally a system user interface of the electronic device (e.g., a home screen interface, such as illustrated in FIG. 4A), a user interface of a content creation application (e.g., a drawing user interface), a user interface of a note taking application, a content browsing user interface or a web browsing user interface. In some embodiments, the first user interface object is a selectable option in the user interface that is selectable to perform a corresponding function that optionally is related to the user interface. For example, the first user interface object is optionally an application icon on a home screen user interface that is selectable to cause display of the application via the display generation component, a button in a drawing user interface that is selectable to display a palette including options to change characteristics of marks made in the drawing user interface using a stylus, or a representation of media within a content browsing interface that is selectable to initiate playback of the corresponding media.

In some embodiments, while displaying, via the display generation component, the user interface including the first user interface object, the electronic device detects (702*b*), via the one or more sensors, a respective object in proximity to, but not in contact with, a surface associated with the user interface, such as detecting stylus 600 in FIG. 6C or hand 605 in FIGS. 6F and/or 6G (e.g., the touch-sensitive surface, a physical surface on which the user interface is projected, or a virtual surface corresponding to at least a portion of the user interface). For example, the respective object is optionally a finger of a hand of a user interacting with the surface. In some embodiments, the object is a stylus in communication with the electronic device, or the object optionally is a stylus that is not in communication with the electronic device. In some embodiments, proximity between the respective object and the surface is determined using one or more signals transmitted between the respective object, the electronic device, and/or the surface. For example, the respective object optionally is a stylus having one or more sensors configured to detect one or more signals transmitted from the surface. In some embodiments, a received signal strength of the one or more signals is used as a criterion to determine proximity. In some embodiments, the one or more signals include data encoding one or more relative distances between the stylus and the surface. In some embodiments, the respective object is determined to be in proximity to, but not in contact with, the surface when the respective object is greater than a first threshold distance (e.g., 0.0, 0.01, 0.03, 0.1, 0.3, 0.5 or 1 cm) from the surface, and less than a second threshold distance that is greater than the first threshold distance (e.g., 0.1, 0.3, 0.5, 1, 3, 5, 10, 30, 50 or 100 cm) from the surface. Otherwise, the respective object is optionally determined to not be in proximity to the surface or is determined to be in contact with the surface.

In some embodiments, in response to detecting the respective object in proximity to, but not in contact with, the surface (702*c*), in accordance with a determination that the respective object in proximity to the surface is an input device in communication with the electronic device, such as stylus 600 in FIG. 6C, and that a position of the input device corresponds to the first user interface object, such as stylus 600 corresponding to the search field in FIG. 6C, the electronic device displays (702*d*), in the user interface, a first selectable option that is selectable to perform a first operation associated with the first user interface object, such as displaying text insertion cursor preview 690 in FIG. 6C. For example, the input device optionally is a stylus device. In some embodiments, the input device is a wearable device (e.g., a glove or thimble). Communication between the input device and the electronic device optionally includes one or more data streams transmitted and/or received by the input device and the electronic device. In some embodiments, determining that a position of the input device corresponds to a first user interface object (e.g., including a selection indicator and/or highlighting) optionally includes determining that the input device (and/or a perpendicular or other projection of the input device onto the touch-sensitive surface) is located within a threshold distance (e.g., 0.1, 0.3, 0.5, 1, 3, 5, 10, 30, 50 or 100 cm) of a respective position of, or corresponding to, the first user interface object displayed by the display generation component. As referred to herein, determining the position of the input device corresponds to the first user interface object and that the input device is located within the threshold distance of the respective portion of, or corresponding to, the first user interface object optionally is a "hover event." Similarly, a state where the input device is within the threshold distance optionally is referred to as "hovering" (e.g., over the surface). In some embodiments, the selectable option is not displayed until the input device is located within the threshold distance of the respective position of, or corresponding to, the first user interface object. For example, the input device, the electronic device, and/or the touch sensitive surface optionally determine that a magnitude of a vector extending from a portion (e.g., a tip) of the input device towards the surface—or extending from the surface towards the input device—is less than a threshold magnitude. In some embodiments, the selectable option is a button that controls media that is associated with displayed media playback (e.g., a play, pause, rewind, or fast-forward button). In some embodiments, the selectable option is selectable to initiate a scrolling process to scroll one or more displayed elements. For example, the selectable option optionally controls scrolling operations operating on a list of text and/or icons. In some embodiments, the user interface includes a text-entry field and the selectable option is selectable to delete or select one or more characters displayed in the text-entry field. In some embodiments, display of the first selectable option is forgone if the position of the input device does not correspond to the first user interface object, even if the input device is in proximity to, but not in contact with, the surface. In some embodiments, the electronic device responds to a hovering input device in one or more of the various ways described herein in response to individual hover events in a sequence of multiple hover events being detected. In some embodiments, while hovering, subsequent input is detected (e.g., the input device makes contact with the surface at the location of the first selectable option) to perform the first operation.

In some embodiments, in accordance with a determination that the respective object in proximity to the surface is not an input device in communication with the electronic device, such as hand 605 in FIGS. 6F-6G, the electronic device forgoes (702*e*) the displaying, in the user interface, of the first selectable option that is selectable to perform the first operation associated with the first user interface object, such as not displaying text insertion cursor preview 690 as described with reference to FIGS. 6F-6G. For example, the object optionally is a finger of a user in proximity to the surface. In some embodiments, the object is an input device (e.g., a stylus) that is not in communication with the electronic device. Displaying a selectable option to perform additional operations when an input device is in proximity to a user interface object reduces the number of inputs needed to access such operations.

In some embodiments, in response to detecting the respective object in proximity to, but not in contact with, the surface, in accordance with the determination that the respective object in proximity to the surface is the input device in communication with the electronic device, and that the position of the input device corresponds to the first user interface object (e.g., a perpendicular projection of the position of the tip of the input device onto the surface is within a threshold distance such 0.1, 0.3, 0.5, 1, 3, 5, 10, 30, 50 or 100 cm of the first user interface object), the electronic device modifies (704) a visual characteristic of the first user interface object to indicate that the first user interface object is selectable, such as modifying the display of icon 604 in FIG. 6N. As described previously with respect to step(s) 702, in response to determining the input device initiates a hover event, one or more functions optionally are performed. One such embodiment includes modifying one or more visual characteristics of the first user interface object. For example, the modifying includes displaying one or more visual indications to indicate interactivity of the user interface object (e.g., a button). The visual indications optionally include changing of color, shading, hue, saturation, lighting effects, display or modification of borders surrounding the user interface object, initiating or modifying an animation of the first user interface object, altering shadows associated with the first user interface object, scaling one or more portions of the user interface object, and/or modifying a perceived position (e.g., depth) of the first user interface object in the user interface. In some embodiments, the visual indications optionally include highlighting the first user interface object. In some embodiments, distinct visual indications are displayed in response to a hover event corresponds to respective portions of the first user interface object. For example, hovering over a portion of the first user interface object corresponding to the top boundary optionally causes display of one or more arrows (e.g., extended upwards and/or downwards). Similarly, one or more arrows are optionally displayed in response to hovering over a lateral boundary of the first user interface object (e.g., extending leftwards and/or rightwards). Displaying one or more modifications to one or more visual characteristics of the first user interface object to indicate that the user interface object is interactive efficiently conveys that the first user interface object can be interacted with, and reduces errors in interaction with the first user interface object.

In some embodiments, the first user interface object is associated with a selection of a first region of the user interface and not a second region of the user interface, different from the first region of the user interface, and the first user interface object is interactable to modify a region of the user interface that is selected by the first user interface object (706*a*), such as selection 644 in FIG. 6AK. For example, the user interface is a font-based, handwriting, and/or drawing user interface, and the first user interface object (e.g., a selection indicator and/or highlighting) indicates selection of the first portion of content displayed in the user interface. It is understood that the user interface optionally includes font, drawing, and/or handwritten content, separately or in some combination, and optionally includes graphical content (e.g., images and/or hand-drawn shapes or curves). In some embodiments, the first user interface object corresponds to a highlighted portion of the user interface. For example, the first portion of the user corresponds to a selected portion of content including textual and/or handwritten content displayed with a visual distinction (e.g., a partially transparent background having a first color or fill pattern based on the position and/or dimensions of the underlying selected content).

In some embodiments, in response to detecting the respective object in proximity to, but not in contact with, the surface, in accordance with the determination that the respective object in proximity to the surface is the input device in communication with the electronic device, and that the position of the input device corresponds to the first user interface object (e.g., as described previously with respect to step(s) 704), the electronic device displays (706*b*), via the display generation component, a visual indication associated with one or more directions of the modification of the region of the user interface that is selected by the first user interface object, such as display of arrows 648A or 648B in FIGS. 6AL and 6AO. One or more visual elements, such as circles or spheres, optionally are displayed at positions (e.g., overlaid over the border) of the visually distinguished region to communicate interactivity of the selected portion (e.g., before the input device hovers over the first user interface object), and in response to a hover event corresponding to a respective visual element, one or more arrows are optionally displayed indicating one or more directions of modification of the selection. For example, the selection is optionally a semi-rectangular highlighting encompassing font-based text, and the hover event optionally causes display of left and/or right arrows on lateral edges to indicate the highlight can be expanded laterally. In some embodiments, interacting with the first user interface object modifies the selection to include the second portion of the content, instead of the first portion. For example, contacting the surface with the input device, and subsequently moving the input device along the surface optionally expands text selection (e.g., vertically and/or laterally in accordance with vertical and/or lateral movement of the input device while in contact with the surface). In some embodiments, the hover event is dependent upon determining the input device corresponds to the first user interface object (e.g., a perpendicular projection of the position of the tip of the input device onto the surface is within a threshold distance such 0.1, 0.3, 0.5, 1, 3, 5, 10, 30, 50 or 100 cm of the first user interface object). In some embodiments, one or more visual indications are displayed in response to a hover event associated with respective portions of the first user interface object. For example, hovering over a portion of the first user interface object corresponding to the top boundary optionally causes display of one or more vertical arrows (e.g., extended upwards and/or downwards). Similarly, one or more horizontal arrows are optionally displayed in response to hovering over a lateral boundary of the first user interface object (e.g., extending towards the left and/or right). Displaying the visual indication in response to a hover event reduces erroneous inputs from the user and prevents constant display of such visual indications, thus reducing power consumption and computational load required by such operations.

In some embodiments, the first user interface object corresponds to a first portion of the user interface, such as tab 640B in FIG. 6AW, and the first selectable option is associated with ceasing display of the first portion of the user interface (708*a*), such as selectable option 682B in FIG. 6AW. For example, the first user interface object is a tab corresponding to a first section of content (e.g., a webpage, or other "page" of content) in a user interface of an application. For example, in response to detecting selection of the first user interface object, the electronic device displays, in the user interface of the application, content corresponding to the first user interface object without displaying content corresponding to a second user interface object, and in response to detecting selection of the second user interface object, the electronic device displays, in the user interface of the application, content corresponding to the second user interface object without displaying content corresponding to the first user interface object. In some embodiments, the first selectable option is a textual and/or graphical object selectable to cease display of the first section of content and is optionally not displayed before a hover event directed to the first user interface object is detected.

In some embodiments, while displaying the first selectable option in accordance with the determination that the respective object in proximity to the surface is the input device in communication with the electronic device, and that the position of the input device corresponds to the first user interface object (e.g., as described previously with respect to step(s) 704), the electronic device receives (708*b*), via the one or more sensors, one or more inputs corresponding to a selection of the first selectable option, such as selection of selectable option 682B in FIG. 6AX.

In some embodiments, in response to receiving the one or more inputs corresponding to the selection of the first selectable option, the electronic device ceases (708*c*) display of the first portion of the user interface (and optionally the first user interface object), such as ceasing display of the portion of the web browser user interface corresponding to tab 640B, as shown in FIG. 6AY. For example, in response to detecting a hover event over any part of the first user interface object, the first user interface object is visually emphasized (e.g., with a change in color, bolding, and/or scale) and/or the first selectable option is displayed within or in association with the first user interface object. While hovering over the surface, in response to receiving a selection of the first selectable option (e.g., contacting the surface with the tip of the input device at the location of the first selectable option), the electronic device optionally ceases display of the first section of content. For example, hovering over an "X" included in a tab corresponding to a webpage displayed in the user interface optionally causes the electronic device to visually distinguish the "X," and subsequent selection of the "X" (e.g., contacting the surface with the input device) causes the electronic device to cease display of the webpage. In some embodiments, the first selectable option (e.g., the "X") is also ceased to be displayed by the electronic device (e.g., display of the tab including the "X" is ceased). Displaying the first selectable option in response to hovering prevents constant display of the first selectable option and avoids cluttering the user interface, thus decreasing power and computational load required for such display.

In some embodiments, the first user interface object includes a content entry region that includes content, such as the search field including text 602 in FIG. 6J, and the first selectable option is associated with ceasing display of the content in the content entry region (710*a*), such as selectable option 621 in FIG. 6J. In some embodiments, the content entry region is a text-based region (e.g., a text field) or other content region including marks and/or characters (e.g., handwritten and/or font-based text and/or graphical objects). The first selectable option optionally is selectable to cease display of the entirety, or a subset of the content included in the content entry region. For example, the first selectable option is a button or icon to cease display of (e.g., delete or clear) text in a text entry region.

In some embodiments, while displaying the first selectable option in accordance with the determination that the respective object in proximity to the surface is the input device in communication with the electronic device, and that the position of the input device corresponds to the first user interface object (e.g., as described previously with respect to step(s) 704), the electronic device receives (710*b*), via the one or more sensors, one or more inputs corresponding to a selection of the first selectable option, such as selection of selectable option 621 in FIG. 6K.

In some embodiments, in response to receiving the one or more inputs corresponding to the selection of the first selectable option, the electronic device ceases (710*c*) display of the content within the content entry region, such as shown by ceasing display of text 602 in FIG. 6K. For example, in response to a hover event corresponding to a portion of the text entry region, the first selectable option is displayed. In response to receiving a selection of the first selectable option (e.g., contacting the surface with the tip of the input device at the location of the first selectable option) display of the entirety, or a subset of the text entry region is optionally ceased. It is understood that although the embodiments described herein are directed to a text entry region, such functions optionally apply to other content entry regions (e.g., ceasing display of handwritten marks, content including font-based and handwritten marks, and/or graphical objects). Displaying the first selectable option in response to hovering prevents constant display of the first selectable option and avoids cluttering the user interface, thus decreasing power and computational load required for such display.

In some embodiments, the first user interface object is associated with presenting media content, such as media player 608 in FIG. 6Z, and the first selectable option is associated with modifying playback of the media content (712*a*), such as selectable option 620A in FIG. 6AB. For example, the first user interface object includes, or is a media player for video and/or audio content. The first selectable option optionally is associated with navigation of such media content, for example, seeking or scrubbing forwards or backwards to traverse the media content. In some embodiments, selecting the first selectable option initiates, ceases, or resumes playback of the media content. In some embodiments, playback speed is increased or decreased, or navigation between another content item and the current content item (e.g., previous, or next in a queue of media content) is performed. All such operations are contemplated with respect to media playback and navigation.

In some embodiments, while displaying the first selectable option in accordance with the determination that the respective object in proximity to the surface is the input device in communication with the electronic device, and that the position of the input device corresponds to the first user interface object (e.g., as described previously with respect to step(s) 704), the electronic device receives (712*b*), via the one or more sensors, one or more inputs corresponding to a selection of the first selectable option, such as selectable of selectable option 620B in FIG. 6AC.

In some embodiments, in response to receiving the one or more inputs corresponding to the selection of the first selectable option, the electronic device modifies (712*c*) playback of the media content, such as shown in media player 608 in FIG. 6AD. In some embodiments, while hovering at a position corresponding to the first user interface object, one or more of the selectable options described with respect to the first selectable option are displayed. In response to receiving a selection of the first selectable option (e.g., contacting the surface with the tip of the input device at the location of the first selectable option) while displaying the respective selectable option (e.g., while hovering), performance of the associated operation optionally initiates. Displaying the first selectable option in response to hovering prevents constant display of the first selectable option, thus decreasing power and computational load required for such display.

In some embodiments, in response to detecting the respective object in proximity to, but not in contact with, the surface, in accordance with the determination that the respective object in proximity to the surface is the input device in communication with the electronic device, and that the position of the input device corresponds to the first user interface object (714*a*) (e.g., as described previously with respect to step(s) 704), in accordance with a determination that the position of the input device satisfies one or more criteria, including a criterion that is satisfied when the position of the input device corresponds to the first user interface object for longer than a threshold amount of time, such as shown with respect to stylus 600 in FIG. 6Y, the electronic device displays (714*b*), via the display generation component, information associated with the first user interface object, such as tooltip 631 shown for icon 604 in FIG. 6Y. For example, in response to a hover event including the input device and the surface, information describing a function corresponding to the first user interface object (e.g., information indicating what function(s) will be performed if the first user interface object and/or first selectable option is selected) is displayed in response to hovering the input device over the surface at a location corresponding to the user interface object for longer than a threshold amount of time (e.g., 0.05, 0.1, 0.25, 0.5, 0.75, 1, 2.5, or 5 s). The information optionally includes a name of a function associated with the user interface object and/or selectable option, and optionally describes one or more inputs required to initiate the function. In some embodiments, in response to detecting a hover event, the first user interface object is visually emphasized (e.g., with color, bolding, and/or scale.).

Displaying the information associated with the first user interface object in response to hovering prevents a user from erroneously initiating a function or needlessly reviewing documentation to understand the function tied to the first user interface object, thus decreasing computational load and power consumption required for such operations.

In some embodiments, the first user interface object includes a content (e.g., text) entry region (716*a*), such as the search field including text 602 in FIG. 6C. In some embodiments, in response to detecting the respective object in proximity to, but not in contact with, the surface, in accordance with the determination that the respective object in proximity to the surface is the input device in communication with the electronic device, and that the position of the input device corresponds to the first user interface object (e.g., as described previously with respect to step(s) 704), the electronic device displays (716*b*), via the display generation component, a visual indication of a content (e.g., text) insertion cursor in the content entry region at a location corresponding to the input device, such as display of insertion cursor preview 690 shown in FIG. 6C. For example, hovering the input device over a portion of the user interface corresponding to the user interface object causes display of a shadow corresponding to a text insertion cursor. The shadow of the text insertion is optionally displayed with a first visual appearance (e.g., color, saturation, hue, opacity, and/or with a first animation) to communicate a proposed position of text insertion cursor to the user. In some examples, the proposed position of the text insertion cursor corresponds to a portion (e.g., the tip) of the input device. For example, the proposed position corresponds to the position of the tip of the input device projected (e.g., perpendicularly projected) on to a position on the surface, and the projected surface position optionally corresponds to the proposed position in a content entry region. In some embodiments, new content input (e.g., text input) will not cause corresponding content to be displayed at the indication of the text insertion cursor until the text insertion cursor is placed at the indication of the text insertion cursor. In some embodiments, while the indication of the text insertion cursor is displayed at the above-described proposed position, the text insertion cursor is displayed at a different location in the content entry region (e.g., new content input (e.g., text input) will cause corresponding content to be displayed at the location of the text insertion cursor) and/or not displayed in the content entry region.

In some embodiments, while displaying the visual indication, the electronic device receives (716*c*), via the one or more sensors, one or more inputs corresponding to a selection of the visual indication (and/or selection of a region within a threshold distance of the visual indication, such as 0.1, 0.3, 0.5, 1, 3, 5, or 10 cm), such as shown with stylus 600 in FIG. 6D. In some embodiments, in response to receiving the one or more inputs corresponding to the selection of the visual indication, the electronic device displays (716*d*), via the display generation component, the text insertion cursor at the location corresponding to the input device in the text entry region, such as the display of text insertion cursor 692 in FIG. 6D. While hovering over the surface, in response to receiving a selection of the first selectable option (e.g., contacting the surface with the tip of the input device at the location of the first selectable option), the text insertion cursor is optionally inserted at and/or moved to the proposed position. The insertion and/or movement optionally includes displaying the text insertion cursor at the proposed position having a second visual appearance (e.g., corresponding to the first visual appearance having different respective visual characteristics, such as a lower opacity and/or darker color). In some embodiments, the shadow of the text insertion cursor is no longer displayed in response to the selection of the visual indication. In some embodiments, new content input (e.g., text input) will cause corresponding content to be displayed at the location of the text insertion cursor. Displaying a visual indication corresponding to a text insertion cursor prevents entry of text editing at an undesired location within a content (e.g., text) entry region, thus decreasing the computational load and power consumption required to process and display erroneous operations.

In some embodiments, the first user interface object includes content (718*a*), such as text 612 in FIG. 6AH. For example, the content is text displayed in a content (e.g., text) display region. In some embodiments, in response to detecting the respective object in proximity to, but not in contact with, the surface, in accordance with the determination that the respective object in proximity to the surface is the input device in communication with the electronic device, and that the position of the input device corresponds to the content (718*b*) (e.g., as described previously with respect to step(s) 704), in accordance with a determination that the content is non-editable content (e.g., the text is part of an image, and is not text that is editable (e.g., cannot be deleted or changed) in response to input, such as from a virtual keyboard), the electronic device displays (718*c*), via the display generation component, a visual indication of a content (e.g., text) selection cursor in the content at a location corresponding to the input device, such as the display of selection cursor preview 615 in FIG. 6AH at the location of the tip of stylus 600. In some examples, the position of the content selection cursor corresponds to a portion (e.g., the tip) of the input device. For example, the position corresponds to the position of the tip of the input device projected (e.g., perpendicularly projected) on to a position on the surface, and the projected surface position optionally corresponds to the position in a content display region. Even though the text in the content is optionally not editable, the text in the content is optionally selectable (e.g., via highlighting) for subsequent operations (e.g., copying, pasting and/or cutting). Displaying the content selection cursor in response to hovering prevents constant display of the content selection cursor, thus decreasing power and computational load required for such display.

In some embodiments, in response to detecting the respective object in proximity to, but not in contact with, the surface, in accordance with the determination that the respective object in proximity to the surface is the input device in communication with the electronic device, and that the position of the input device corresponds to the content (720*a*) (e.g., as described previously with respect to step(s) 704), in accordance with a determination that the content is editable content (e.g., the text is editable (e.g., can be deleted or changed) in response to input, such as from a virtual keyboard), such as text 602, the electronic device forgoes (720*b*) displaying, via the display generation component, the visual indication of the content (e.g., text) selection cursor in the content at the location corresponding to the input device, such as if in FIG. 6AH stylus 600 were hovering over text 602 rather than text 612. For example, the editable content is font-based or handwritten-based text and is displayed in region including a content entry region. In some embodiments, a content selection cursor is displayed while the position of the content selection cursor corresponds to non-editable text in content, and the displaying of the content selection cursor is ceased in accordance with movement of the input device (e.g., hovering over the surface) to a position corresponding to the editable text. In some embodiments, a second cursor, different from the content selection cursor, is displayed in response to the input device hovering over the editable content, such as a text insertion cursor and/or a shadow of a text insertion cursor (e.g., as described with respect to step(s) 716). Forgoing display of the content selection cursor in response to hovering over editable text indicates that the text is editable, thereby reducing errors in interaction between the input device and the text.

In some embodiments, before detecting the respective object in proximity to, but not in contact with, the surface, the first user interface object is displayed with a first amount of separation from a backplane (722*a*) (e.g., a backplane and/or background of the user interface), such as icon 604 in FIG. 6M being separated by the first amount from a backplane over which the rest of the content of user interface 609 is being displayed (e.g., the background of user interface 609). In some embodiments, in response to detecting the respective object in proximity to, but not in contact with, the surface, in accordance with the determination that the respective object in proximity to the surface is the input device in communication with the electronic device, and that the position of the input device corresponds to the first user interface object (e.g., as described previously with respect to step(s) 704), the electronic device displays (722*b*) the first user interface object with a second amount of separation, greater than the first amount of separation, from the backplane, such as icon 604 being separated by the second amount from the above-described backplane in FIG. 6N. For example, the backplane of the user interface shares the same plane as the plane of the user interface displayed in a two-dimensional (or nearly two-dimensional) environment (e.g., on a display device such on a computer monitor or smartphone). In some embodiments, the displaying of the first user interface object with the first amount of separation from the backplane includes a non-zero or zero amount of separation from the plane of the user interface. Displaying non-zero separation optionally includes displaying shadows, borders (e.g., width in different section of the border), scale, applied lighting effects, and/or other visual characteristics of the first user interface object to convey a sense of separation and/or difference in depth of the first user interface object relative to the plane of the user interface. In some examples, the user interface is a three-dimensional environment, and the first user interface object is separated from a flat or curved plane by the first amount of separation (e.g., 0, 0.1, 0.3, 0.5, 1, 3, 5, 10, 30, 50 or 100 cm). For example, the first user interface object is displayed in a mixed-reality environment and occupies a space or position with a separation that is perceived to correspond to a physical distance between a real-world object and a real-world plane (e.g., flat or curved). In some embodiments, the first user interface object is displayed at a greater or lesser amount of separation (e.g., 0, 0.1, 0.3, 0.5, 1, 3, 5, 10, 30, 50 or 100 cm) from the plane (e.g., flat or curved) in response to detecting the input device is hovering over the first user interface object and/or a position of the surface determined to correspond to the user interface object. If the respective object is not the input device and/or is not in a position that corresponds to the first user interface object, display of the first user interface object with the second amount of separation from the backplane is optionally forgone (e.g., and the first user interface object optionally remains displayed at the first amount of separation from the backplane). Displaying the first user interface object with a variable amount of separation indicates interactivity of the first user interface object to the user, thus preventing erroneous inputs directed to areas of the user interface other than the user interface object, thereby decreasing computational load and power consumption required to handle the erroneous inputs.

In some embodiments, while displaying, via the display generation component, the user interface including the first user interface object, wherein the first user interface object has a first visual appearance in which a first visual characteristic (e.g., color, shading, fill, border, animation, shadow, and/or lighting effect) has a first value, such as the visual appearance of icon 604 in FIG. 6S, the electronic device detects (724*a*), via a cursor control input device, a first input corresponding to movement of a cursor from a location away from the first user interface object to the first user interface object, such as the input for moving cursor 613 to icon 604 from FIG. 6S to FIG. 6T. For example, the first user interface object is a selectable representation, such as a button or icon, selectable to initiate a function of the device. Such a function optionally is an initiation of an application, display of a menu to enter content into a content entry region, addition of images or font-based text to the content entry region, or display of a menu to alter marks made to simulated handwriting in the content entry region. In some embodiments, the first visual appearance includes displaying the first user interface object with a default color, shading, fill, border, animation, shadow, and/or lighting effect. In some examples, the cursor control device is a computer mouse, trackpad, stylus, hand, or finger worn peripheral, and/or gaze/gesture detecting unit configured such that movement or interaction with the peripheral alters the position of a cursor optionally displayed in the user interface. The displayed cursor optionally is positioned in the user interface at a position in a two-dimensional or three-dimensional space, and subsequent movement or indication via the cursor control device optionally moves the cursor to correspond to (e.g., is overlaid over, within a threshold distance (e.g., 0, 0.1, 0.3, 0.5, 1, 3, 5, 10, 30, 50 or 100 cm) of, and/or occupies) a position in the user interface where the first user interface object is displayed.

In some embodiments, in response to detecting the first input, the electronic device moves (724*b*) the cursor to the first user interface object, such as shown from FIG. 6S to FIG. 6T, and displays the first user interface object with a second visual appearance in which the first visual characteristic has a second value, different from the first value, such as the visual appearance of icon 604 in FIG. 6T. In some embodiments, in response to moving the cursor to correspond to the first user interface object, the first user interface object optionally is displayed with a second visual appearance (e.g., color, shading, fill, border, animation, shadow, and/or lighting effect). For example, before moving the cursor to a button displayed in the user interface, the button is initially displayed including a first set of graphics and/or font with various colors with an initial amount of shadow over an initial background (e.g., a transparent, semi-transparent, or solid-colored background). In response to moving the cursor to correspond to the button, the background of the button optionally is displayed with a second set of visual values, including at least one or more different visual values (e.g., shadow, lighting effect, background, and/or line width) for the same first visual characteristic(s)). For example, a border and fill having a different opacity, but the same color optionally is displayed around and/or at interstitial spaces within the first user interface object.

In some embodiments, while the position of the input device corresponds to the first user interface object (e.g., as described previously with respect to step(s) 704), such as the position of stylus 600 corresponding to icon 604 in FIGS. 6N-6O, the first user interface object is displayed with a third visual appearance (e.g., optionally the same as or different from the second visual characteristic) in which the first visual characteristic has the second value (724*c*). In some embodiments, if the input device (e.g., optionally a device that is contextually or generally not associated with a cursor) position corresponds to the first user interface object, the first user interface object is optionally displayed with a third visual appearance including a third set of visual values (e.g., including the same set or subset of visual values described with respect to the first and second visual values, but optionally including at least one or more different visual values). The visual values, for example, include a different opacity than the second opacity value and the first opacity value, but have the same background color. In some examples, the third visual values are a subset or superset of the second visual values, or vice-versa. Displaying user interface objects with consistent visual changes across interactions with different input devices reduces erroneous interactions with the electronic device, thus decreasing computational load and power consumption required to process such operations.

In some embodiments, in response to detecting the first input, the electronic device displays (726) the first user interface object with a parallax effect based on movement of the cursor while the cursor is located at the first user interface object, such as displayed with respect to icon 604 in FIGS. 6U-6V, wherein displaying the first user interface object with the third visual appearance in accordance with the determination that the position of the input device corresponds to the first user interface object does not include displaying the first user interface object with the parallax effect based on movement of the input device while the position of the input device corresponds to the first user interface object (e.g., as described previously with respect to step(s) 704), such as the lack of parallax effect for icon 604 displayed from FIGS. 6N-6O. For example, as described above, a third visual appearance including third visual values includes a superset or subset of second visual values. Possible visual appearances and characteristics are previously described herein by way of non-limiting embodiments and are omitted for brevity. For example, a stylus interaction with a button (e.g., hovering the input device over the button) is identical, or nearly identical, to a comparable cursor interaction with the button (e.g., hovering a cursor based on a cursor-input device over the button). In some embodiments, hovering over the button with the cursor includes display of the first user interface object and/or its background area with a parallax effect, such that movement of the cursor causes movement of one or more portions of the button by different amounts compared with movement of another area of the button (e.g., background and/or border surrounding the button) in response to movement of the cursor (e.g., to indicate that movement of the cursor is being detected, and that further movement of the cursor will optionally cause the cursor to move away from the first user interface object). In some embodiments, while hovering over the button with the input device, the visual appearance of the button is identical to hovering with the cursor, however, the parallax effect is not displayed in response to detecting movement of the input device. In some embodiments, the opposite is true—the parallax effect is not displayed while moving the cursor device over the button, and the parallax effect is displayed while hovering and moving the input device over the surface at positions corresponding to the button. In some embodiments, hovering over the button with the input device includes displaying a level of parallax effect different from hovering over the button with the cursor device. Although some embodiments are described with respect to a button, it is understood that any suitable visual object (e.g., graphical objects, textual objects, and animated objects) optionally includes such behavior. Displaying a parallax effect depending on the type of input device reduces computational power needed to display a parallax effect for input device types that are not suited to such an effect and avoids situations where the parallax effect increases the difficulty of selecting the button with a stylus (e.g., due to movement of the button).

In some embodiments, in response to detecting the first input, the electronic device displays (728) the first user interface with a lighting effect based on movement of the cursor while the cursor is located at the first user interface object, such as displayed with respect to icon 604 in FIGS. 6U-6V. For example, the lighting effect optionally includes a specular highlight applied to a portion of the first user interface object. The portion optionally is a border surrounding an area associated with the first user interface object.

In some embodiments, displaying the first user interface object with the third visual appearance in accordance with the determination that the position of the input device corresponds to the first user interface object does not include displaying the first user interface object with the lighting effect based on movement of the input device while the position of the input device corresponds to the first user interface object (728) (e.g., as described previously with respect to step(s) 704), such as the lack of lighting effect for icon 604 displayed from FIGS. 6N-6O. For example, as described with respect to the parallax effect, lighting effects associated with the first user interface object (e.g., a button) optionally differ based on whether the cursor or the input device is being used to interacted with the first user interface object. In some embodiments, the first user interface object is displayed with lighting effects while the cursor corresponds to the first user interface object, but such lighting effects are optionally not displayed while the input device corresponds to the first user interface object. In some embodiments, the lighting effect (e.g., a simulated light source position, or brightness values of portions of a specular highlight) is modified in response to movement of the cursor. In some embodiments, the opposite is true—the lighting effects are displayed in response to input device interaction, but not cursor interaction. Optionally, the lighting effect is displayed in response to determining the cursor device and the input device respectively correspond to the first user interface object. In some embodiments, the lighting effect is a specular highlighting applied to a portion (e.g., a border or a portion) of an area in the user interface including the first user interface object. Displaying a lighting effect depending on the type of input device reduces computational power needed to display a lighting effect for input device types that are not suited to such an effect.

In some embodiments, the first user interface object corresponds to a link to content (730*a*) (e.g., a web link to web-based content), such as link 610 in FIG. 6AF. In some embodiments, in response to detecting the respective object in proximity to, but not in contact with, the surface, in accordance with the determination that the respective object in proximity to the surface is the input device in communication with the electronic device, and that the position of the input device corresponds to the first user interface object (e.g., as described previously with respect to step(s) 704), the electronic device modifies (730*b*) a visual appearance of the first user interface object, such as the modification of the visual appearance of link 610 in FIG. 6AF. For example, the content is a website, application, media, or other user interface environment associated with the link. In some embodiments, the first user interface object is a graphical or textual object, and in response to a hover event, is displayed with modified visual appearance such as highlighting, bolding, underlining, and/or other suitable visual emphasis. For example, the first user interface object is text associated with a hyperlink (e.g., to a webpage), and the modifying includes highlighting a portion of the user interface including the text (e.g., based on the outline of the text or an area surrounding the text), bolding, and/or underling the text. Additionally, the text optionally is enlarged (e.g., scaled or increased in font) to further communicate the potential interaction with the text. In some embodiments, while displaying the modified visual appearance, in response to receiving a selection of the first selectable option (e.g., contacting the surface with the tip of the input device at the location of the first selectable option) a function is initiated corresponding to the first user interface object. For example, an application is launched from a system user interface (e.g., if the first selectable option is an application icon displayed on a home screen user interface of the electronic device, such as described with reference to FIG. 4A) and/or a webpage associated with a graphical or textual link is displayed (optionally ceasing display of the user interface that was displayed when the selection was detected). Displaying the first user interface object with modified visual appearance conveys interactivity of the underlying object, and thus decreases inputs required to initiate operations associated with the user interface object and avoids errors in interaction with the user interface object, therefore decreasing computational load and power consumption otherwise required to initiate such operations.

It should be understood that the particular order in which the operations in FIGS. 7A-7G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100 and 1300) are also applicable in an analogous manner to method 700 described above with respect to FIGS. 7A-7G. For example, the interactions between the input device and the surface, the response(s) of the electronic device, the virtual shadow of the input device, and/or the inputs detected by the electronic device and/or detected by the input device optionally have one or more of the characteristics of the interactions between the input device and the surface, the response(s) of the electronic device, the virtual shadow of the input device, and/or the inputs detected by the electronic device and/or detected by the input device described herein with reference to other methods described herein (e.g., methods 900, 1100 and 1300). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 7A-7G are, optionally, implemented by components depicted in FIGS. 1A-1B. For example, displaying operations 702*a* and 702*d*, and detecting operation 702*b*, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Providing Feedback About the Pose of an Input Device

Users interact with electronic devices in many different manners, including interacting with such devices using an input device such as a stylus. In some embodiments, an electronic device receives inputs from such an input device that are based on the relative pose (e.g., orientation and/or position) of the input device relative to a surface with which the input device is interacting (e.g., contacting and/or hovering over). The embodiments described below provide ways in which an electronic device provides feedback about the pose of an input device relative to a surface, thus enhancing interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8B:
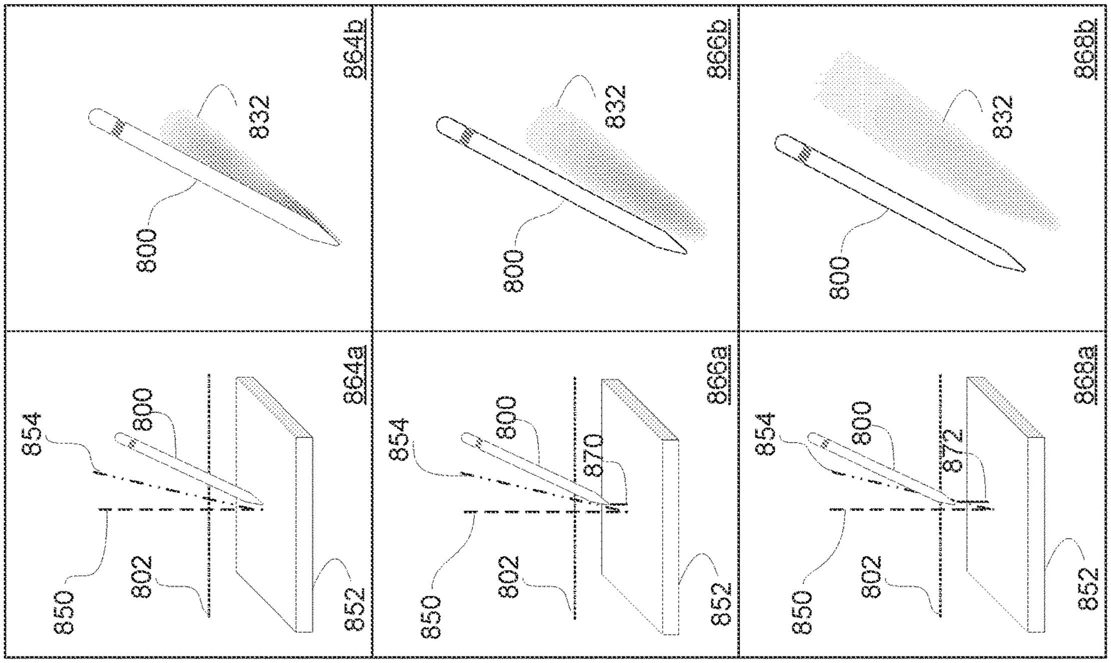
FIGS. 8A-8AF illustrate exemplary ways in which an electronic device provides feedback about the pose of an input device relative to a surface in accordance with some embodiments.
Figure 8A:
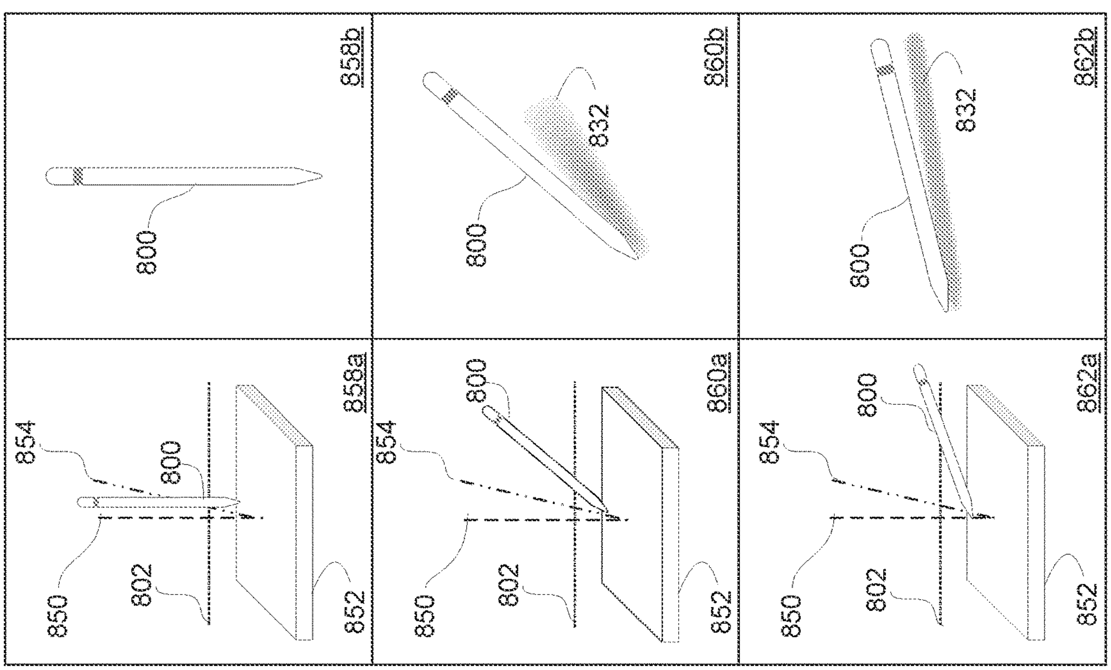

FIGS. 8A-8AF illustrate exemplary ways in which an electronic device displays indications of a pose of an input device relative to a surface in accordance with some embodiments of the disclosure. The embodiments in these figures are used to illustrate the processes described below, including the processes described with reference to FIGS. 9A-9K.

FIG. 8A illustrates a first exemplary set of simulated shadows 832 displayed by an electronic device that correspond to input device 800 (e.g., for an assumed virtual light source located above the surface 852) for different orientations of the input device 800 relative to the surface. Surface 852 optionally corresponds to a touch screen of the electronic device, but other surfaces are possible such as described with reference to method 700. In sections 858*a*, 860*a* and 862*a*, a z-axis 850 points out of the surface 852 (e.g., in a direction normal to a plane of the surface 852), an x-axis is parallel to the surface 852, and a y-axis is perpendicular to the x-axis and also parallel to the surface 852. Sections 858*a*, 860*a* and 862*a* correspond to different orientations of input device 800 relative to surface 852, and corresponding sections 858*b*, 860*b* and 862*b*, respectively, illustrate example simulated shadows 832 displayed by the electronic device in response to detecting the input device 800 at those orientations. In some embodiments, the simulated shadow 832 displayed by the electronic device is characterized relative to one or more thresholds, such as thresholds 802 and 854. For example, the electronic device optionally does not display a simulated shadow if input device 800 (or the tip of input device 800) is further than threshold distance 802 from surface 852. If input device 800 (or the tip of input device 800) is closer than threshold distance 802 from surface 852, the electronic device optionally displays a simulated shadow for input device 800 based on the location and/or orientation of input device 800 relative to surface 852.

For example, in section 858*a* of FIG. 8A, input device 800 is normal to the surface (e.g., within threshold angle 854 of normal). When input device 800 is normal to the surface and/or within threshold angle 854 of the normal, the electronic device optionally does not display a simulated shadow for the input device, such as shown in section 858*b*. In contrast, in section 860*a*, the tilt of input device 800 is a first amount greater than the threshold angle 854 relative to the normal to surface 852 such as 15, 20, 25, 30 or 35 degrees. In response, the electronic device displays simulated shadow 832 for input device 800 with a first degree of intensity (e.g., first degree of blurriness, first degree of shadow spread, and/or first degree of opacity) such as shown in section 860*b*. In section 862*a*, the tilt of the input device 800 relative to normal 850 is greater than the tilt of input device 800 in section 860*a*. The degree of intensity of the simulated shadow 832 in corresponding section 862 is less blurry, includes less shadow spread, and includes an increased degree of opacity compared to the simulated shadow 832 in section 860*b* corresponding to the tilt of the input device 800 found in section 860*a*. In some embodiments, the intensity of the visual representation of the simulated shadow 832 changes in response to a change in tilt of the input device 800. For example, the tilt of the input device 800 in section 862*a* is greater than the tilt of input device 800 in section 860*a* and its corresponding simulated shadow 832 in 862*b* is more intense (e.g., darker and/or more defined) than the simulated shadow 832 in 860*b*, which includes a simulated shadow 832 that is lighter and blurrier. Further, in some embodiments, the length of simulated shadow 832 gets shorter as the tilt of input device 800 relative to normal 850 decreases, such as shown in sections 860*b* and 862*b* in FIG. 8A.

FIG. 8B illustrates a second exemplary set of simulated shadows 832 changing in visual appearance in response to a change in distance of the input device 800 from the surface. In FIG. 8B, tilt of the input device 800 relative to normal 850 remains constant while the distance of the input device 800 relative to the surface 852 changes (e.g., from no distance (or contact with the surface), to distance 870 to distance 872) as the input device 800 moves away from the surface. In some embodiments, if the input device 800 (e.g., tip of the stylus) moves above (or is beyond) the predefined threshold distance 802, the simulated shadow 832 is not displayed (e.g., not included in the user interface), similar to as shown in section 858*b* in FIG. 8A. As shown in FIG. 8B, the visual appearance of the simulated shadow 832 in response to the change in distance of input device 800 changes in intensity. For example, in section 864*a*, the input device 800 is in contact with the surface 852 (e.g., very little to no distance between the tip of input device 800 and the surface 852). When input device 800 is in contact with the surface 852, the electronic device displays the simulated shadow for the input device with a first degree of intensity (e.g., first degree of blurriness, first degree of shadow spread, and/or first degree of opacity), such as shown in section 864*b*. In contrast, in section 866*a*, there is a first distance between the tip of input device 800 and the surface 852, such as 0.1, 0.2, 0.5, 0.8, 1, 3, or 5 cm. In response, the electronic device displays simulated shadow 832 for input device 800 with a second degree blurriness greater than the first degree of blurriness, a second degree of shadow spread greater than the first degree of shadow spread, and/or a second degree of opacity greater than the first degree of opacity, such as shown in section 866*b*. In section 868*a*, the distance 872 between the tip of the input device 800 and the surface 852 is greater than the distance 870 in section 866*a*. The degree of intensity of the simulated shadow 832 corresponding to section 868*a* includes a third degree of blurriness greater than the second degree of blurriness, a third degree of shadow spread greater than the second degree of shadow spread, and/or a third degree of opacity greater than the second degree of opacity, such as shown in section 868*b*. For example, in section 868*b* the simulated shadow 832 is less opaque when the tip of the input device 800 is distance 872 away from the surface 852, and in section 866*b*, the simulated shadow 832 is more opaque when the tip of the input device 800 is distance 870 away from the surface 852.

Compared to sections 868*b* and 866*b*, the simulated shadow 832 is even more opaque when the input device 800 is in contact with the surface 852 (e.g., having no distance between the tip of the input device and the surface), as shown in section 864*b*.

As shown in FIGS. 8A, 8B and/or 8C, the direction and/or orientation of the simulated shadow 832 changes as the orientation of the input device 800 changes relative to surface 852. FIG. 8C illustrates a third exemplary set of simulated shadows 832 for input device 800 in contact with the surface 852 and positioned in an orientation downward and rightward, distinct from the orientation shown in FIG. 8B, which is downward and leftward. As shown in FIGS. 8B and 8C, the orientation of the simulated shadow 832 changes correspondingly as the orientation of the input device 800 changes relative to the surface 852 (e.g., when the tip of the input device 800 is oriented downward and rightward, the tip of simulated shadow 832 is oriented downward and rightward, and when the tip of the input device 800 is oriented downward and leftward, the tip of simulated shadow 832 is oriented downward and leftward).

FIG. 8C further, illustrates the simulated shadow 832 changing as the tilt of the input device 800 relative to normal 850 changes. For example, in section 874*a*, input device 800 is within threshold angle 854 of normal, though different from the tilt of input device 800 in section 858*a* of FIG. 8A. When input device 800 is within threshold angle 854 of the normal 850, the electronic device optionally does not display a simulated shadow 832 for the input device, such as shown in section 874*b*. In contrast, in section 876*a*, the tilt of input device 800 is a first amount greater than the threshold angle 854 relative to the normal 850 to surface 852 such as 15, 20, 25, 30 or 35 degrees. In response, the electronic device displays simulated shadow 832 for input device 800 with a first degree of intensity (e.g., first degree of blurriness, first degree of shadow spread, and/or first degree of opacity) such as shown in section 876*b*. In section 878*a*, the tilt of the input device 800 is greater than the tilt of input device 800 in section 876*a*. The degree of intensity of the simulated shadow 832 corresponding to section 878*a* in section 878*b* is less blurry, includes less shadow spread, and/or includes an increased degree of opacity compared to the simulated shadow 832 in section 876*b* corresponding to the tilt of the input device 800 shown in section 876*a*. As shown in the examples of FIGS. 8A-8C, in some embodiments, the simulated shadow changes in blurriness, length, intensity, opacity, size, and/or color in response to one or more of the tilt, orientation, and/or distance of the input device 800 relative to the surface 852.

In some embodiments, the details of the simulated shadow 832 displayed by the electronic device for input device 800 as described and illustrated in FIGS. 8A-8C optionally apply to one or more or all of the simulated shadows illustrated and described with reference to methods 700, 900, 1100 and/or 1300.

Figure 8D:
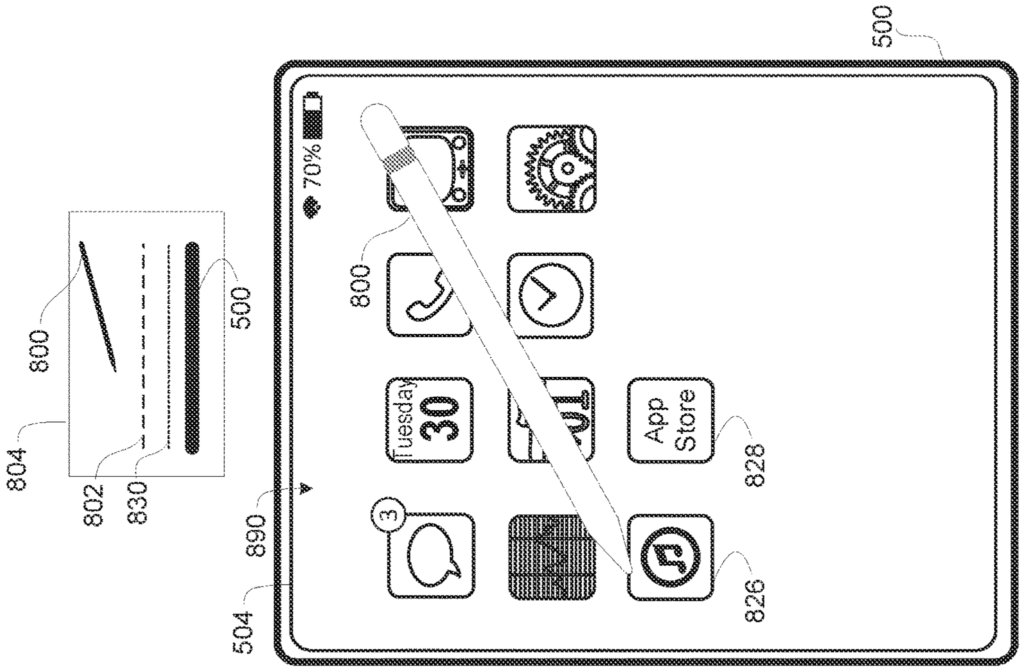
Figure 8C:
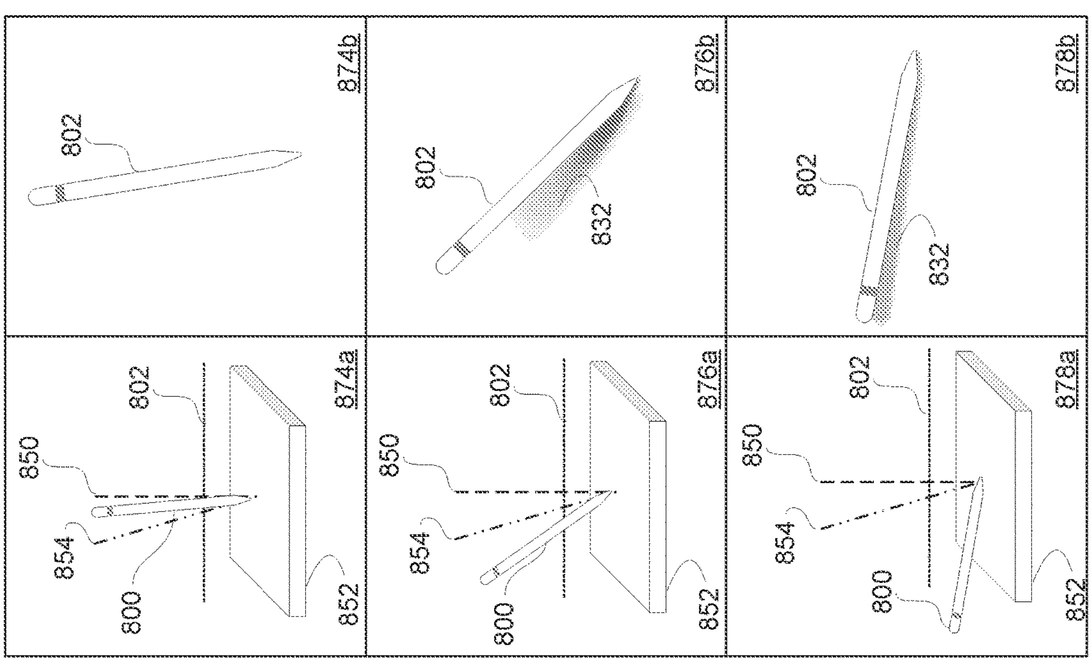

FIG. 8D illustrates an exemplary device 500 (corresponding to object 500 of glyph 804) that includes a touch screen 504. Device 500 is optionally the electronic device referenced in the description of FIGS. 8A-8C. As shown in FIG. 8D, the electronic device 500 is displaying a home screen user interface 890. The home screen user interface 890 includes one or more virtual objects (e.g., virtual objects 826 and 828). As described with reference to FIGS. 8D-8K, virtual objects 826 and 828 are representations of application icons, such as application icon 826 and application icon 828 that are selectable to cause device 500 to display and/or launch the corresponding applications. FIG. 8D further illustrates glyph 804 including a side view of the device 500. Glyph 804 indicates the relative pose including distance of the input device 800 relative to a surface of the device 500 (e.g., touch screen 504). The glyph further includes two thresholds. Threshold 802 is a first distance threshold from the surface of device 500 (e.g., 0.3, 0.5, 1, 3, 5, 10, 20, 50 or 100 cm). Threshold 830 is a second, smaller, threshold from the surface of device 500 (e.g., 0.1, 0.3, 0.5, 1, 3, 5, 10, 20, or 50 cm). As will be shown and described later, device 500 optionally displays a virtual shadow and/or other indications in response to the position of input device relative to thresholds 802 and 830.

It is understood that although virtual objects 826, 828, and user interface 890 are illustrated as being displayed on touch screen 504, virtual objects 826, 828, and user interface 890 are optionally displayed on a head-mounted display that includes a display generation component that displays those items to the user in a computer-generated environment (e.g., an extended reality environment or a three-dimensional environment). In some embodiments, virtual objects 826, 828, and user interface 890 are displayed on a physical surface on which those items are projected, or a virtual surface corresponding to at least a portion of those items.

In FIG. 8D, input device 800 is further than threshold 802 from device 500—therefore, device 500 is not displayed a virtual shadow corresponding to input device 800. FIG. 8E illustrates that the input device 800 moved such that input device 800 is within the threshold distance 802 of the surface of device 500. In response to the device 500 detecting the input device 800 moving below threshold 802 in glyph 804, the device 500 displays virtual shadow 832 having a visual appearance corresponding to the input device as described with reference to FIGS. 8A-8C. In some embodiments, the device 500 ceases to display virtual shadow 832 in the user interface 890 when the input device 800 (e.g., tip of the stylus) is above threshold 802, as shown in FIG. 8D. Thus, in some embodiments, even though the input device 800 is located above the virtual object 826, if the input device is not located within the threshold distance 802 of the surface, the device 500 displays the user interface not including virtual shadow 832. Returning to FIG. 8E, FIG. 8E further illustrates that device 500 presents virtual object 826 as visually distinguished (e.g., application icon 826 is enlarged) from other virtual objects (e.g., virtual object 828) to indicate that the current focus of input device 800 is on virtual object 826 (e.g., virtual object 826 would be selected if device 500 were to detect input device make contact with the surface of touch screen 504).

Figure 8F:
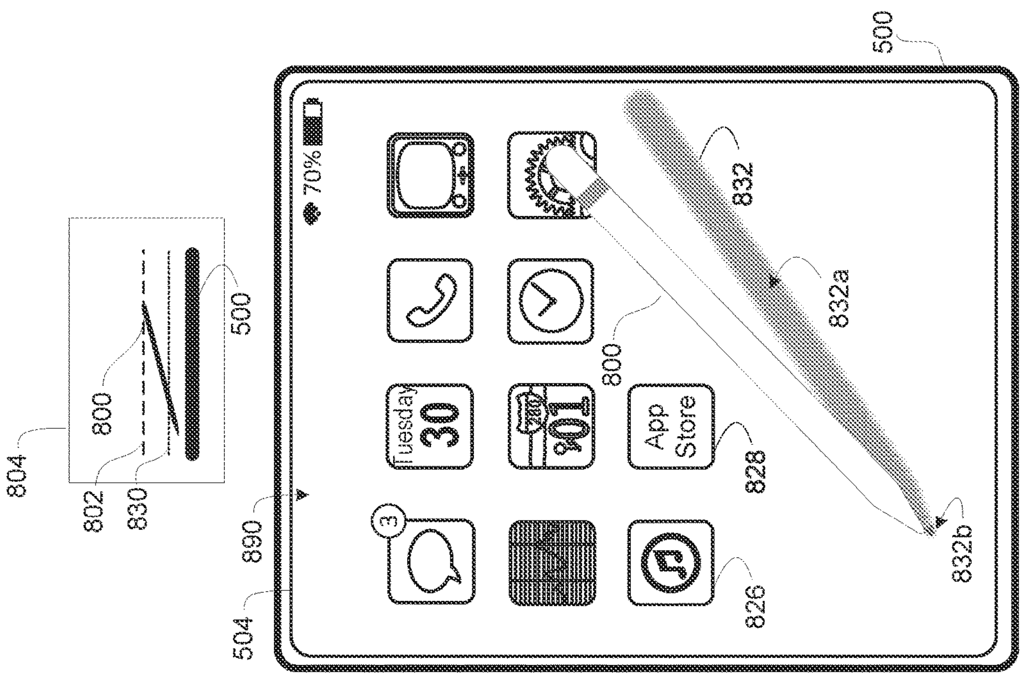
Figure 8E:
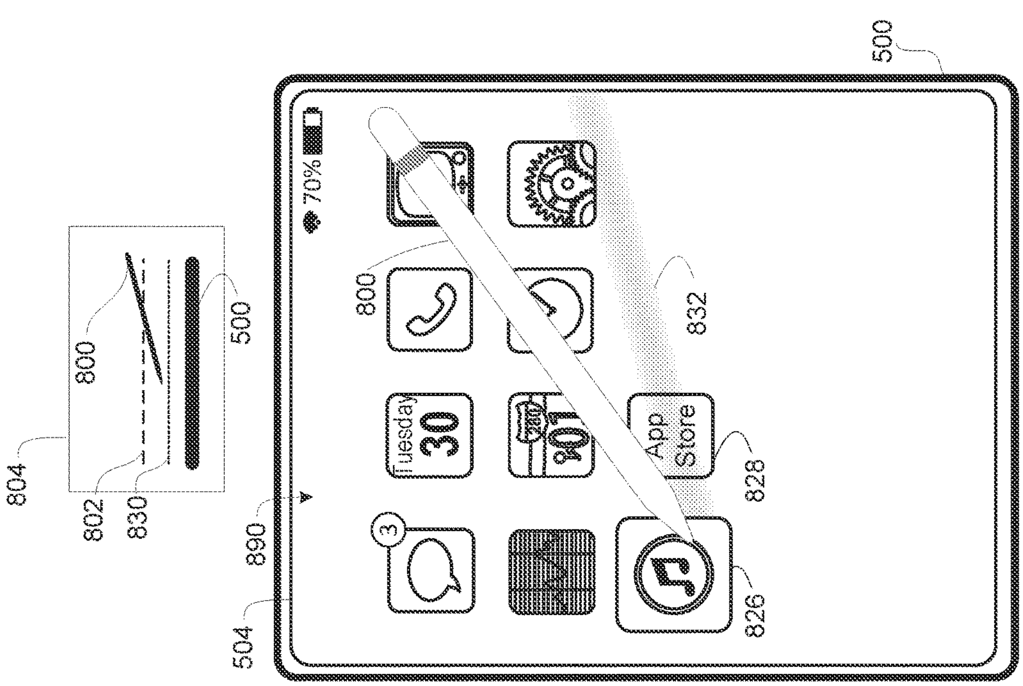

FIG. 8F illustrates that the input device 800 moved such that input device 800 is beyond a lateral threshold distance (e.g., 0.1, 0.3, 0.5, 1, 3, 5 or 10 cm) of virtual object 826 and, in response to the device 500 detecting the input device 800 moving away from virtual object 826, the device 500 displays the virtual object 826 returning to its original size as shown in FIG. 8F. Thus, in some embodiments, even though the input device 800 is located within the threshold distance 802 of the surface as shown in glyph 804, if the input device is not located within a lateral threshold distance of virtual object 826, the device 500 displays the user interface 890 not including virtual object 826 having focus (e.g., selectable to initiate a process associated with virtual object 826) as indicated at least in part by its enlarged visual appearance.

Figure 8H:
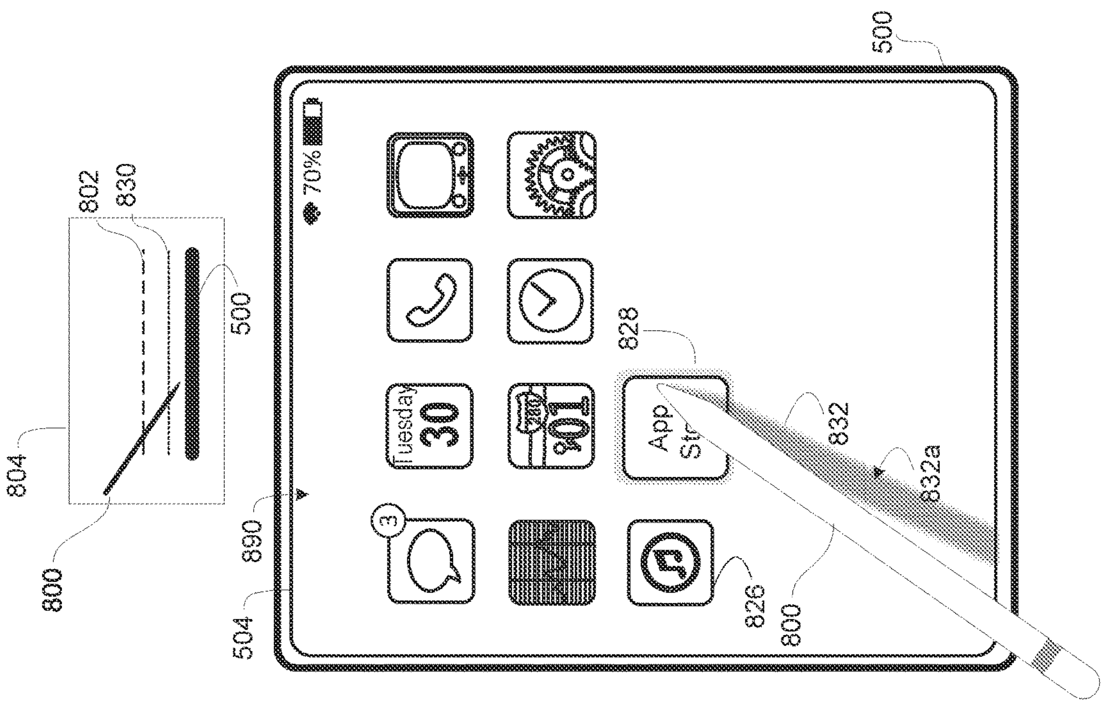
Figure 8G:
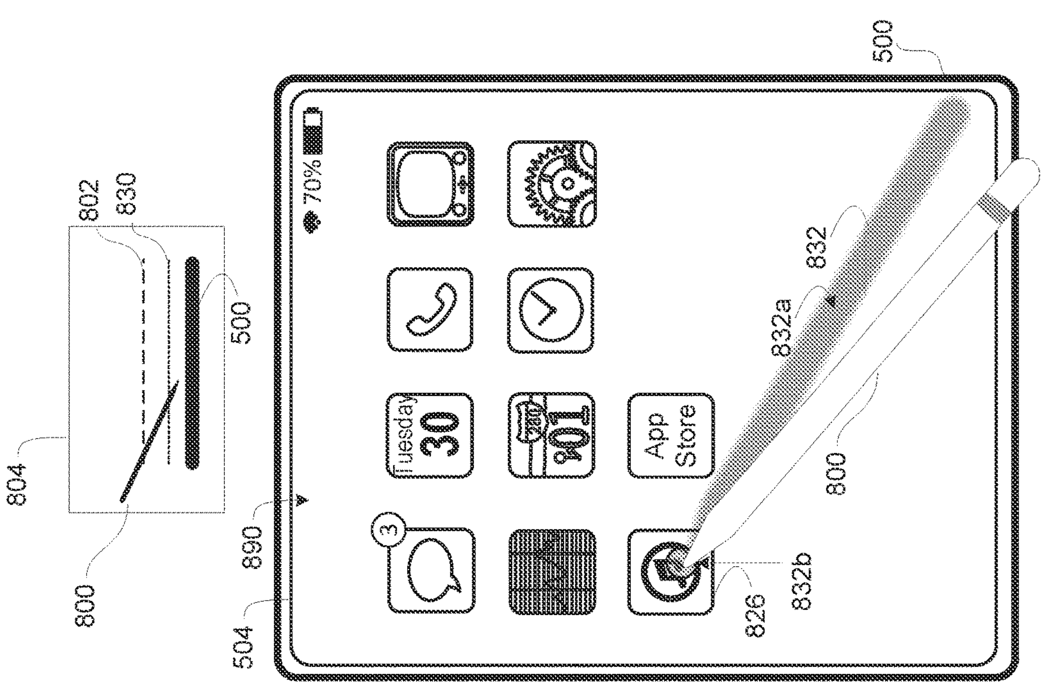

FIG. 8F further illustrates an example of the device 500 displaying an indication of a particular portion of the virtual shadow 832 in the user interface 890 when the input device 800 is within (or below) threshold distance 830 as illustrated in glyph 804. As shown in FIG. 8G, the virtual shadow 832 includes a first portion corresponding to the barrel of the input device 800 (e.g., virtual shadow portion 832*a*) and a second portion corresponding to the tip of the input device 800 (e.g., virtual shadow portion 832*b*). Virtual shadow portion 832*b* optionally indicates the location, in user interface 890, at which the tip of input device 800 will make contact if the input device 800 is brought closer to the surface of touch screen 504, thereby providing feedback to the user about how input device 800 will interact with device 500. Further, virtual shadow portion 832*b* is optionally visually distinguished from virtual shadow portion 832*a* (e.g., darker, more intense and/or less blurry).

FIG. 8G illustrates that while the input device 800 is positioned with the threshold distance 830, the input device 800 is moved such that input device 800 is again within the lateral threshold distance of virtual object 826. In response to the device 500 detecting the input device 800 moving within the lateral threshold distance of virtual object 826, the electronic device 500 changes the visual appearance of virtual shadow portion 832*b* to be the shape of a cursor, such as a circular cursor (indicated by a small circle on virtual object 826) indicating that the input device's current focus is on virtual object 826. In some embodiments, the size or shape of the circular cursor of FIG. 8G is not based on the size or shape of virtual object 826. Additionally or alternatively, in some embodiments, the electronic device 500 changes the visual appearance of virtual shadow portion 832*b* according to the size and/or shape of a virtual object that has the focus of input device 800. For example, as shown in FIG. 8H, virtual object 828 has the focus of input device 800 and is an enlarged square shape—therefore, device 500 changes the visual appearance of the tip of the virtual shadow portion to be an enlarged square giving a visual appearance that virtual object 828 includes a shadow and/or highlighting.

Figure 8J:
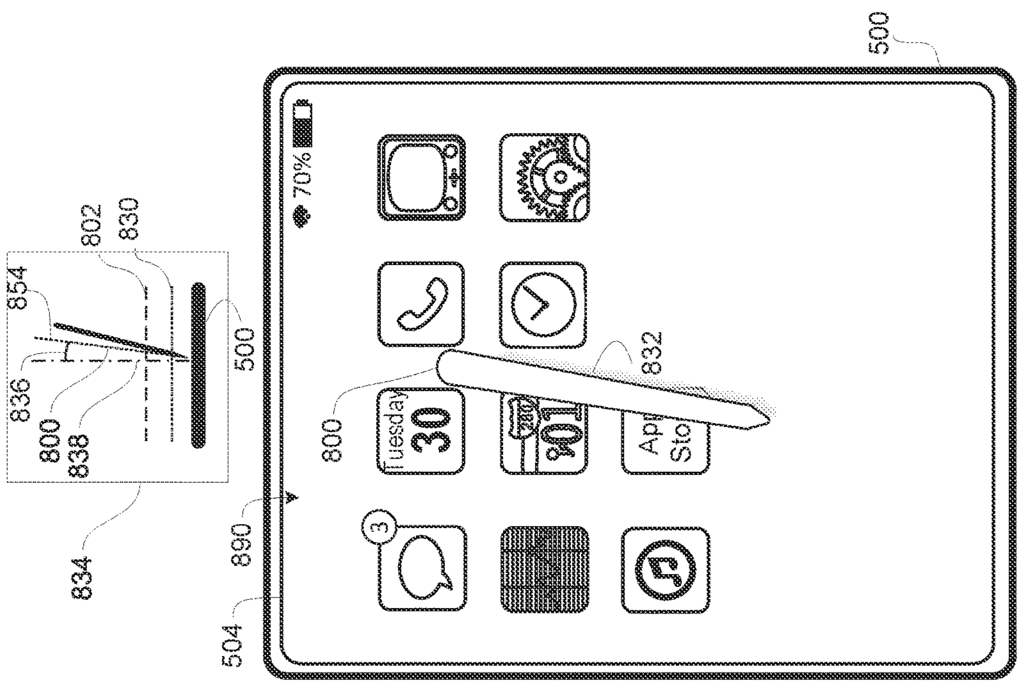
Figure 8I:
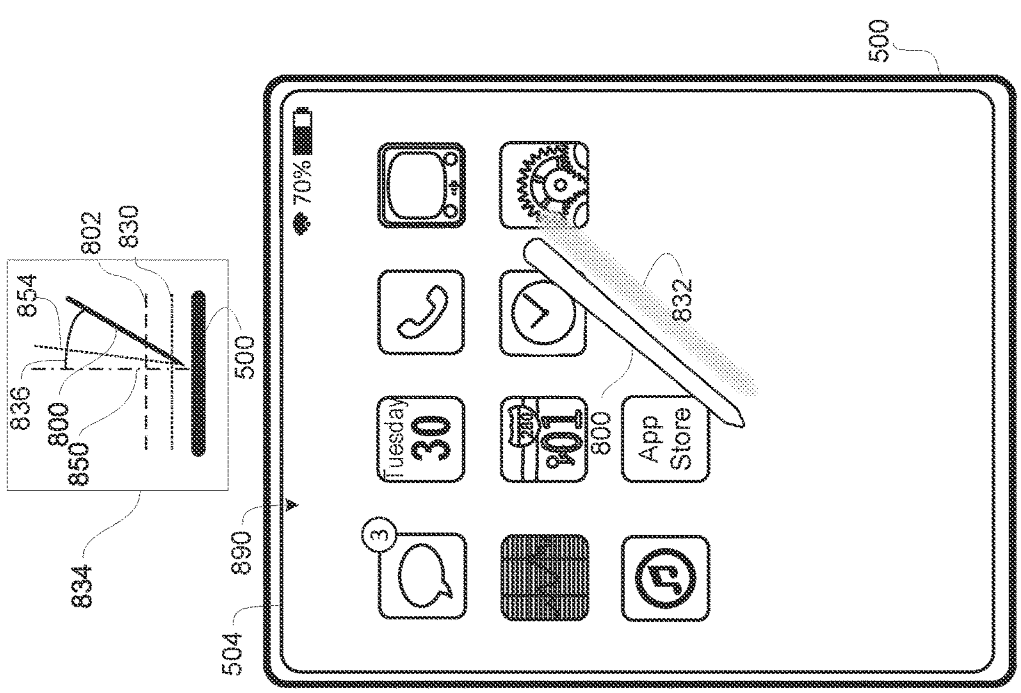
Figure 8L:
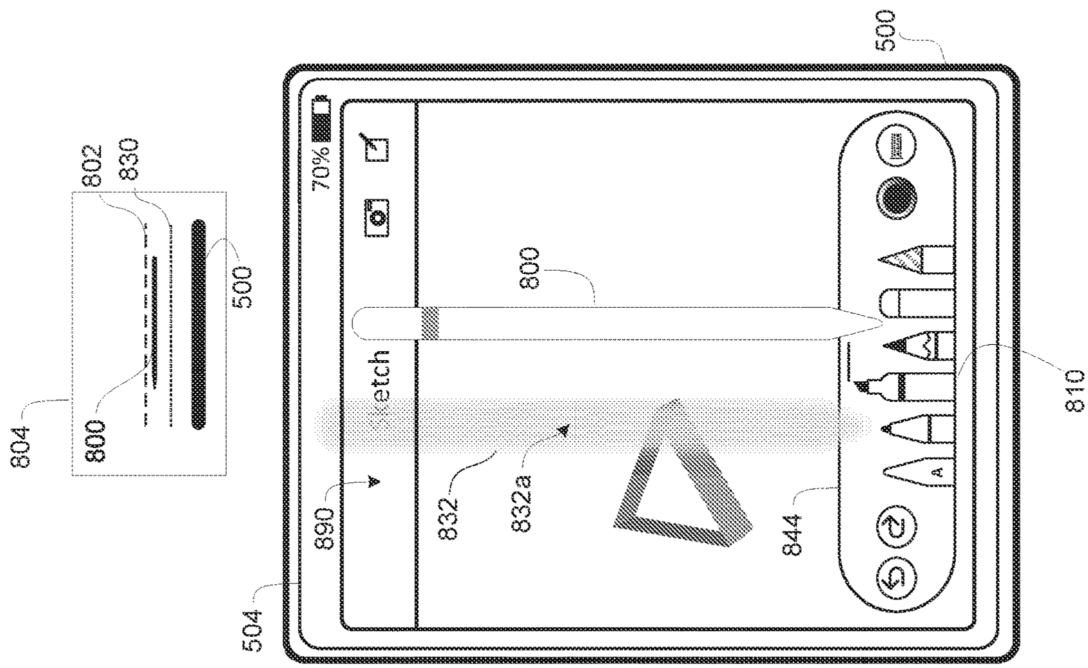
Figure 8K:
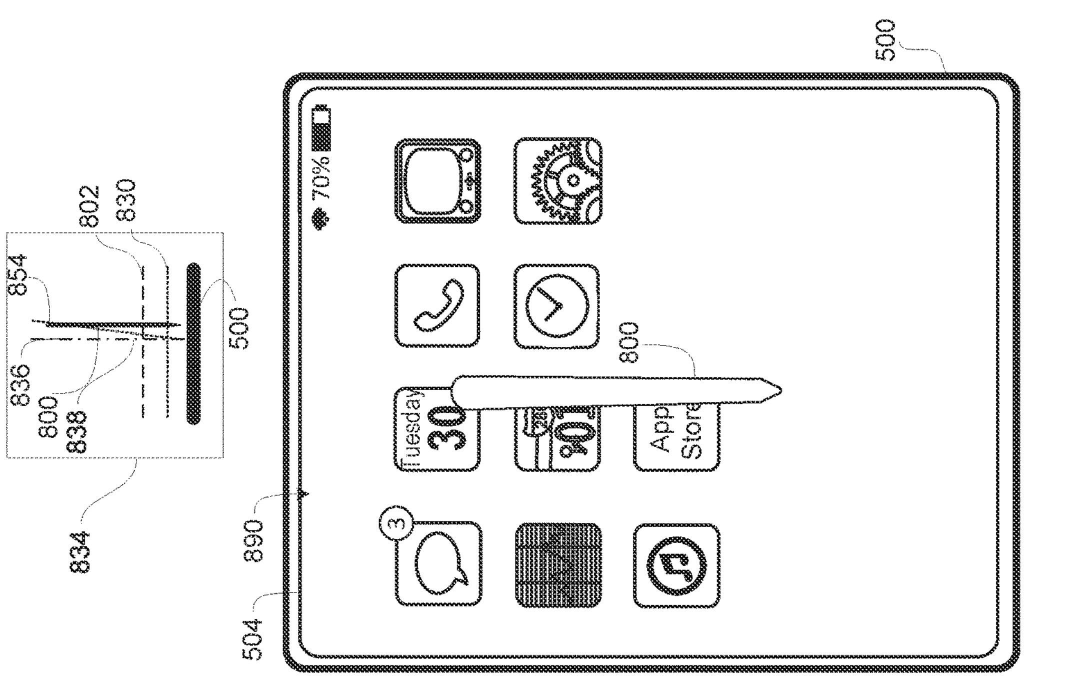

FIGS. 8I-8K illustrate an example of changing the tilt 836 of the input device 800 relative to the surface of the touch screen 504, and in response to the change in tilt, the device 500 updating the displayed visual appearance of virtual shadow 832. In FIGS. 8I-8K, the orientation, position, and distance of the input device 800 relative to the surface remain constant, while the tilt of the input device 800 changes (e.g., from tilt 836 in FIG. 8I to tilt 836 in FIG. 8J to no tilt in FIG. 8K) as the input device tilts closer to perpendicular to the surface (or perpendicular to the device 500). For example, as shown in FIGS. 8I-8K, as the tilt of the input device 800 moves closer to normal (e.g., closer to threshold angle 854), the device 500 changes the visual appearance of the virtual shadow 832 (e.g., from virtual shadow 832 in FIG. 8I to virtual shadow 832 in FIG. 8J to ceasing to display virtual shadow 832 in FIG. 8K). In some embodiments, in response to detecting that the tilt of the input device decreases towards zero (e.g., when the input device is greater than threshold angle 854 of the normal), the device 500 gradually diminishes and/or reduces the visual appearance of virtual shadow 832 until virtual shadow 832 is no longer displayed in the user interface. Conversely, in some embodiments, in response to detecting that the tilt of the input device increases towards 90 degrees relative to normal as the input device is tilted closer to being parallel to the surface, the device 500 gradually increases the intensity of and/or the visual appearance of virtual shadow 832. As shown in FIGS. 8I-8K, in some embodiments, the virtual object 832 changes opacity (e.g., decreasing opacity), changes size (e.g., decreasing size) and/or changes color (e.g., lighter color) as the tilt of the input device 800 is an angle closer to (but greater than threshold angle 854 of) the normal to the surface of the touch screen 504. Details of the change in visual appearance of virtual shadow 832 based on changes in pose of input device 800 relative to the surface are provided with reference to FIGS. 8A-8C.

In some embodiments, the user interface 890 is a user interface of a drawing application or a user interface in which content drafting is performed using input device 800. In some embodiments, the drawing application is an application installed on device 500. As shown in FIGS. 8L-8AF, the user interface 890 includes one or more virtual objects (e.g., virtual object 844). Virtual object 844 in FIG. 8L is a content entry palette that includes one or more selectable options associated with content. For example, content entry palette 844 includes options for selecting the drawing implement (e.g., content entry tool) being emulated by the input device 800, options for undoing a recent content-entry related action or redoing (e.g., performing again) the recent content-entry relation action, options for changing a color of content, and/or options for selecting a virtual keyboard for entering text. In some embodiments, the possible drawing implements for input device 800 include a text entry tool, a pen entry tool, a highlighter (or marker) entry tool 810, a pencil entry tool, an eraser tool, and/or a content selection tool.

In some embodiments, the device 500 displays the virtual shadow 832 having a first visual appearance when the input device 800 (e.g., the tip or other representative portion of the input device) is further than threshold 830 from the surface, and the device 500 displays the virtual shadow 832 having a second visual appearance, distinct from the first visual appearance, when the input device 800 is closer than threshold 830 to the surface. For example, in FIG. 8L, the device 500 displays virtual shadow 832 including a first virtual shadow portion 832*a* corresponding to a barrel of the input device 800 when the device 500 detects that the input device 800 is below threshold distance 802 but above threshold distance 830. FIG. 8M illustrates an example of the device 500 displaying a second virtual shadow portion 832*b* corresponding to the tip of the input device 800 when the device 500 detects that the input device 800 is below threshold distance 830. In some embodiments, the second virtual shadow portion 832*b* indicates where the input device will touch (or mark) the user interface 890 before the input device 800 touches (or contacts) the surface of the touch screen 504. In some embodiments, the device 500 presents the second virtual shadow portion 832*b* having a shape and/or color that corresponds to the tip of the currently selected drawing implement being emulated by the input device 800. For example, in FIG. 8M, the currently selected drawing implement is the marker entry tool 810 with black as the selected color as indicated via a color-picker tool 814. In response to the device 500 detecting the input device 800 moving below the threshold 830, because the device 500 has determined that the currently selected drawing implement is the marker entry tool 810, device 500 presents the second virtual shadow portion 832*b* of the virtual shadow 832 having a visual appearance corresponding to the marker entry tool. For example, the second virtual shadow portion 832*b* is a black rectangle corresponding to the active color (e.g., from color-picker tool 814) and the flat chisel tip of the marker entry tool 810, as shown in FIG. 8M. In some embodiments, as the tip of the input device 800 is in contact with the surface and moves across the surface, the device 500 updates the user interface to display marks and/or lines as black in color and rectangular in shape (e.g., corresponding to the color and/or shape of second virtual shadow portion 832*b*).

Figure 8N:
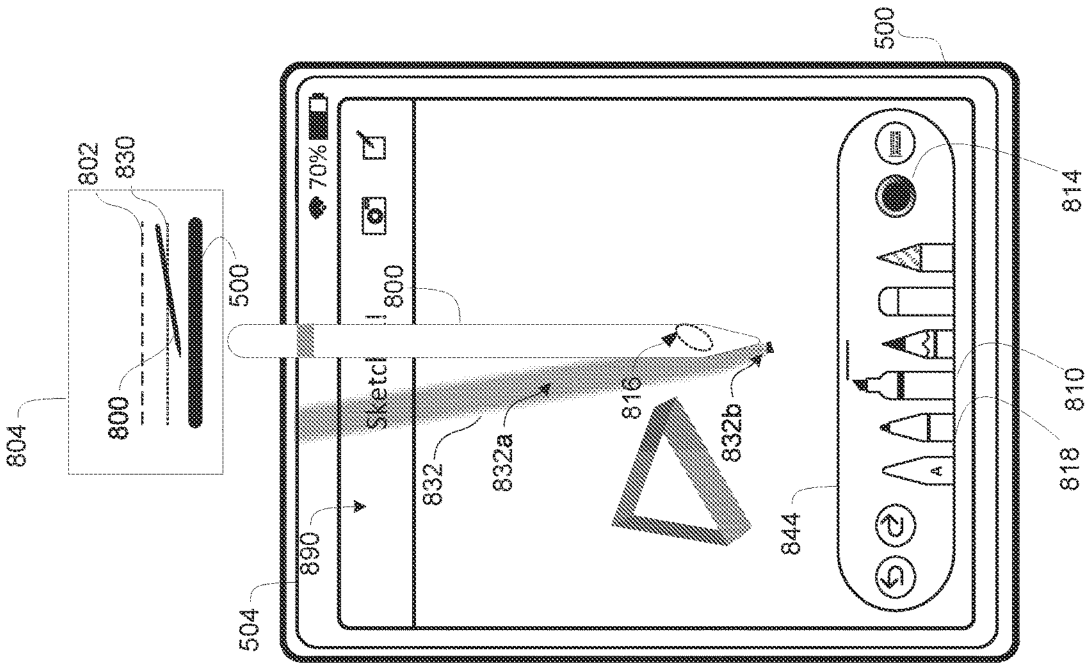
Figure 8M:
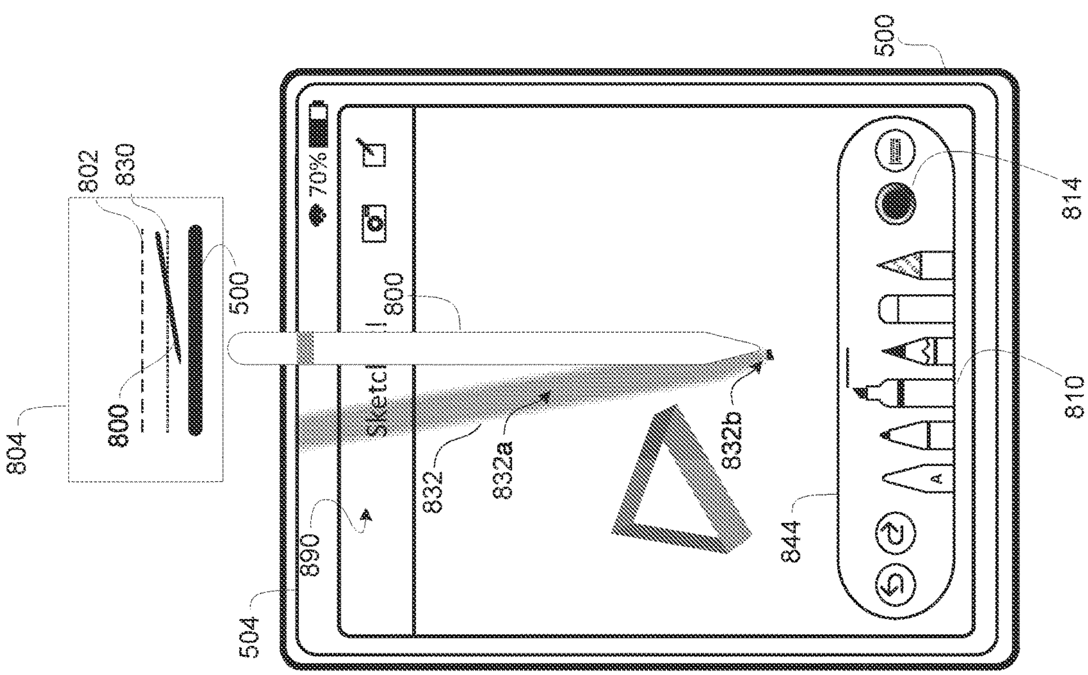

In some embodiments, the device 500 detects an indication of a gesture (e.g., one or more taps) on the input device 800 and interprets the indication of the gesture as a request to initiate an action. For example, in FIG. 8N, the device 500 detects an indication of a gesture detected by input device 800 (e.g., indicated by 816) corresponding to a request to change the currently selected drawing implement from the marker tool 810 to the pen entry tool 818, and in response to detecting the request to change the currently selected drawing implement, the device 500 selects the pen tool 818 as the currently selected drawing implement, as shown in FIG. 8O. In some embodiments, the input to change the currently selected drawing implement is any suitable input for making such as chance, such as a voice input, a touch input on touch screen 504, or the like. In response to selecting the pen entry tool 818, the device displays the user interface 890 with virtual object 844 having the pen entry tool 818 as currently selected (e.g., active), and the second virtual shadow portion 832*b* having a visual appearance corresponding to the pen entry tool 818 (e.g., rounded bullet), as shown in FIG. 8O. In addition to changing the shape of the second virtual shadow portion 832*b*, the device 500 changes the color of the second virtual shadow portion 832*b* to correspond to the active color (e.g., from color-picker tool 814), which is a gray color. In some embodiments, as the tip of the input device 800 is in contact with the surface and moves across the surface, the device 500 updates the user interface to display marks and/or lines with the active color (e.g., corresponding to the color of second virtual shadow portion 832*b*).

Figure 8P:
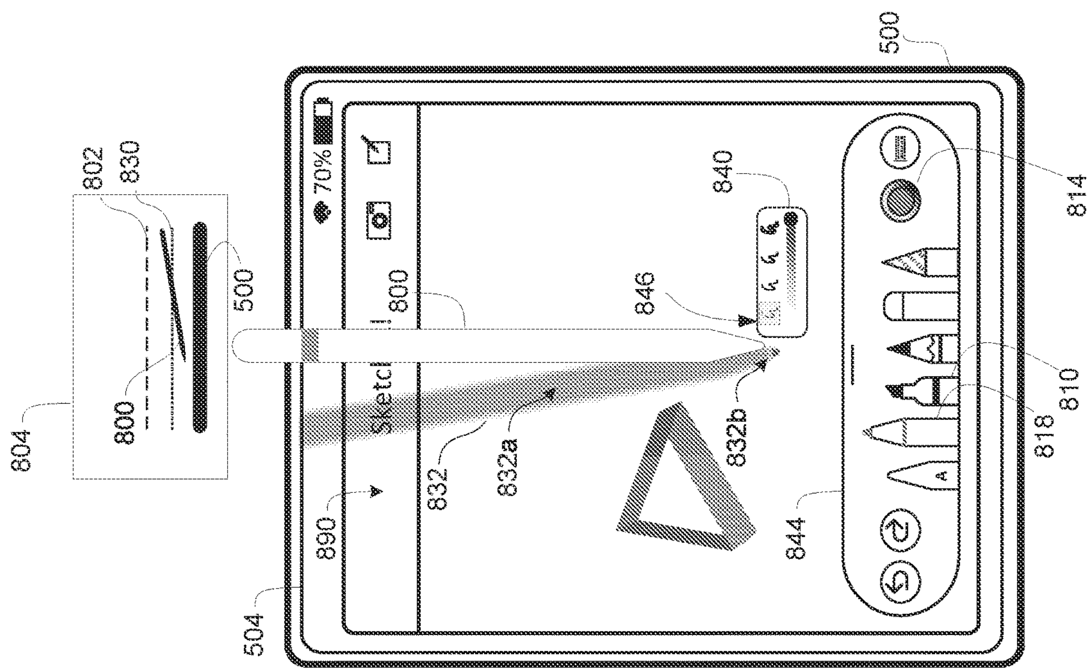
Figure 8O:
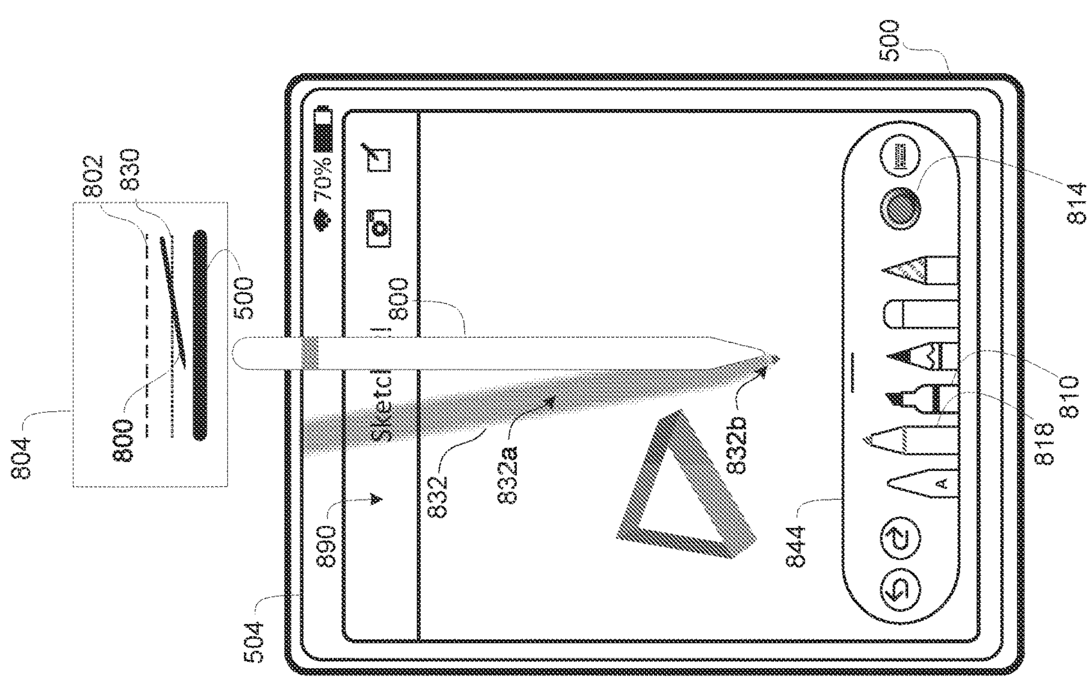
Figure 8Q:
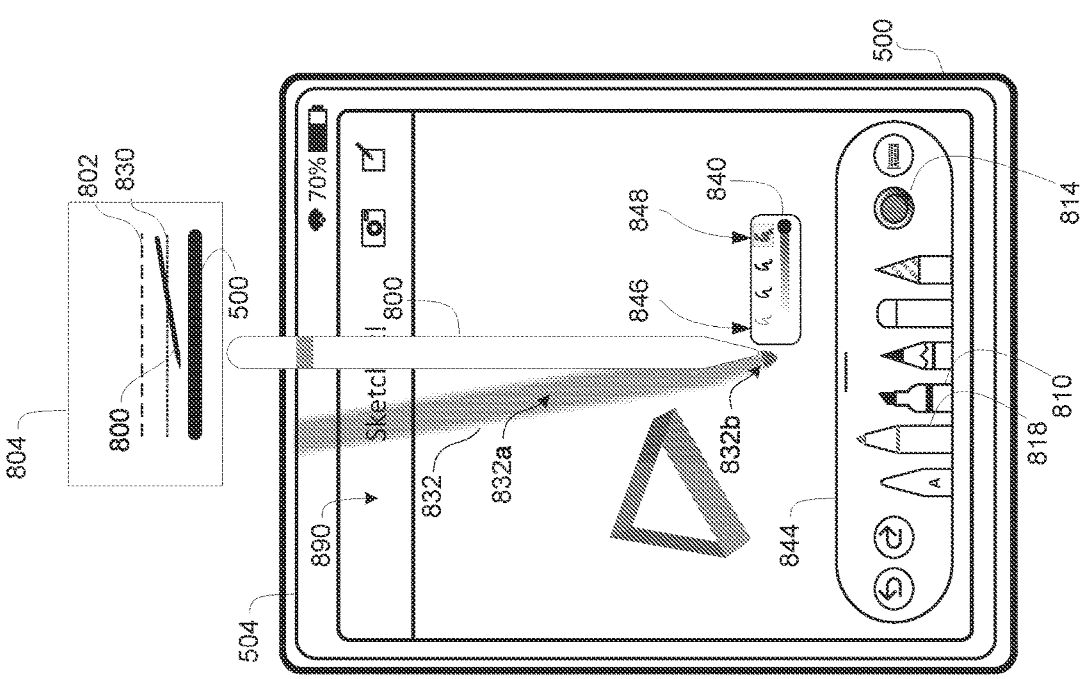

Turning to FIG. 8P, in some embodiments, while the input device 800 is detected as within the threshold distance 830, the device 500 detects an indication of a gesture on the input device 800 (or other suitable input, such as a voice input, a touch input on touch screen 504 or the like) corresponding to a request to change one or more drawing settings for the input device 800. In response to detecting the request to change the one or more drawing settings for the input device 800, the device 500 displays a content entry user interface element 840 at or near the second virtual shadow portion 832*b* (which is optionally positioned based on the position of input device 800 relative to the surface), as shown in FIG. 8P. The content entry user interface element 840 includes one or more selectable options for changing one or more drawing settings (e.g., opacity and/or thickness level) associated with the currently selected drawing implement. The device 500 detects an input to change the line thickness level change from level 846 (e.g., thinnest) to level 848 (thickest), as shown in FIG. 8Q. In response to the determined change, device 500 changes the visual appearance of the second virtual shadow portion 832*b* to correspond to the change in line thickness level (e.g., from a thin, small tip in FIG. 8P to a thick, large tip in FIG. 8Q). In some embodiments, as the tip of the input device 800 is in contact with the surface and moves across the surface, the device 500 updates the user interface to display marks and/or lines with the active line thickness (e.g., corresponding to the size and/or thickness of second virtual shadow portion 832*b*) and/or propagates the drawing settings to the marks and/or lines already drawn.

Figure 8R:
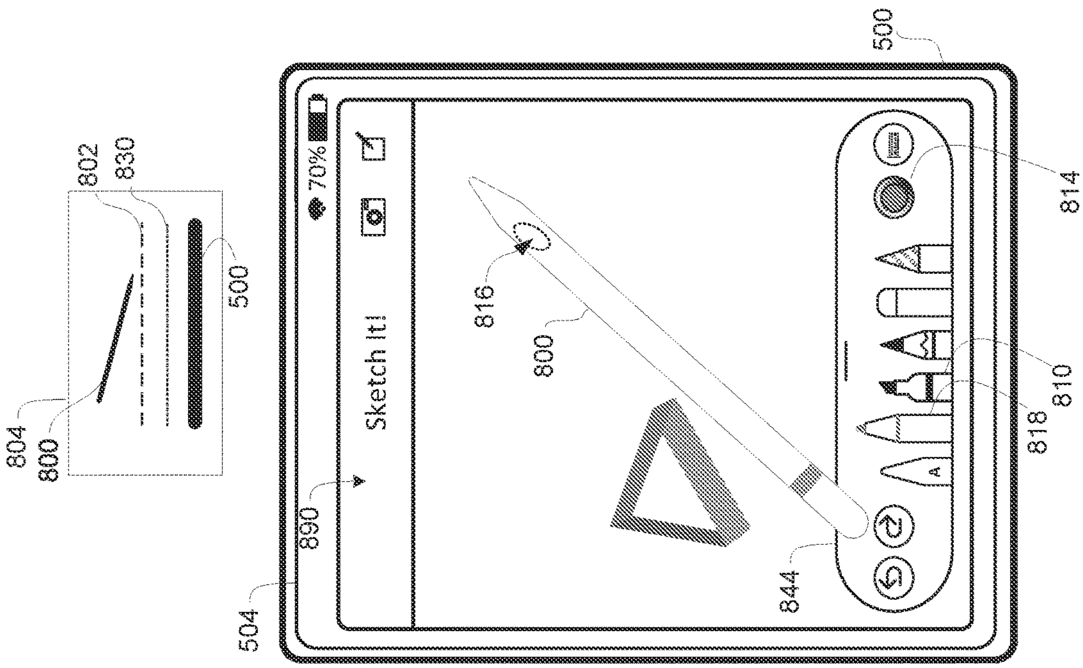
Figure 8T:
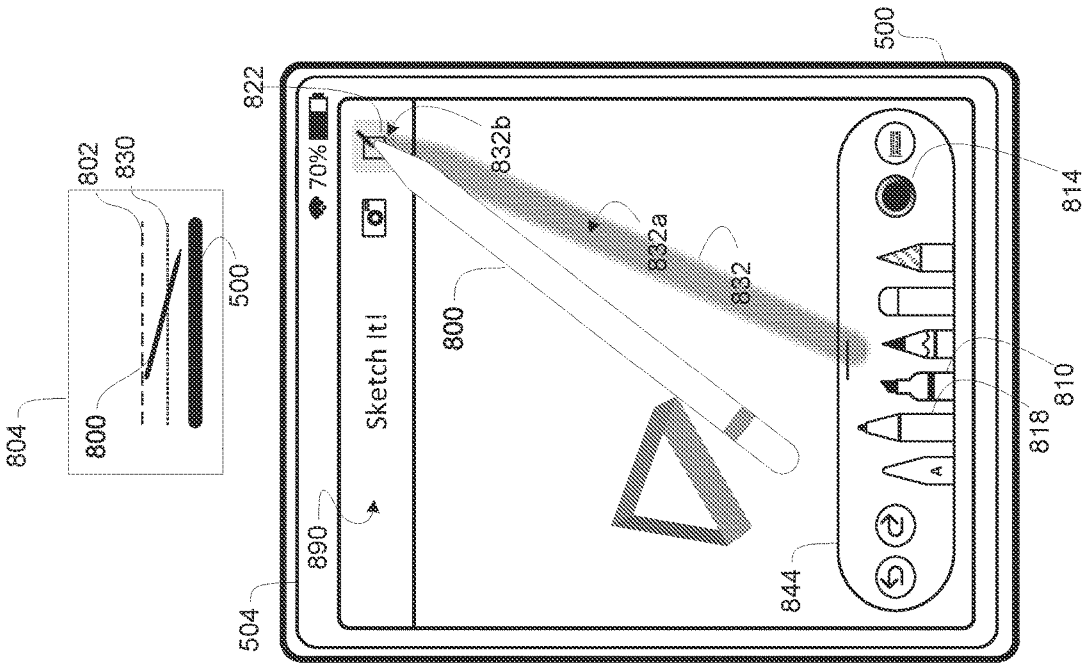
Figure 8S:
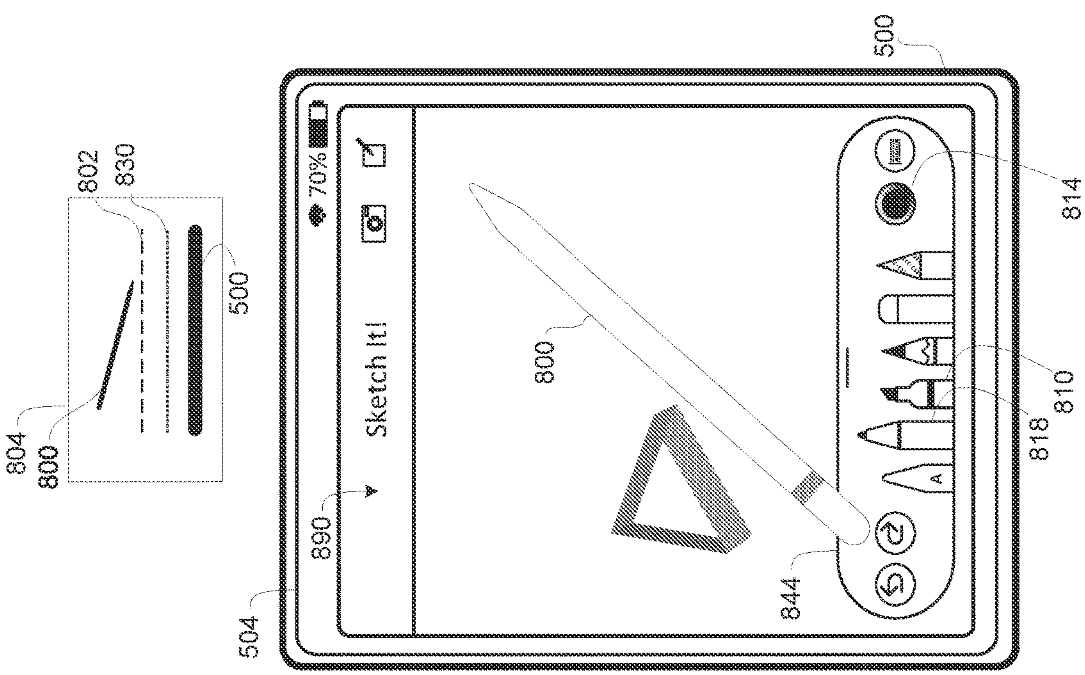

In FIG. 8R, the device 500 detects an indication of a gesture 816 (or other suitable input, such as a voice input, a touch input on touch screen 504 or the like) corresponding to a request to change the color of the currently selected drawing implement from gray to black, and in response to detecting the request to change the color of the currently selected drawing implement, the device 500 changes the active color from gray as shown in color-picker tool 814 of FIG. 8R to black as shown in color-picker tool 814 of FIG. 8S even though input device 800 is further than threshold distance 802 from the surface of touch screen 504. Thus, compared to FIG. 8Q, when the second virtual shadow portion 832*b* was displayed when the tip of the input device 800 was below threshold 830 and when the input to change the line thickness of the currently selected drawing implement was detected, in FIGS. 8R and 8S, input device 800 is further than threshold distance 802 from the surface of touch screen 504, and therefore the device 500 is not displaying the virtual shadow 832 for the input device 800 when the input to change the color of the currently selected drawing implement is detected.

In FIG. 8T, the device 500 detects input device 800 below threshold 830 and within a lateral threshold distance of selectable virtual object 822 that is selectable to create a new drawing sheet in the drawing application. In response, the device 500 displays virtual shadow 832 for input device 800 as previously described, and the visual appearance of virtual shadow portion 832*b* is based on the shape and/or size of selectable virtual object 822. As shown in FIG. 8T, because selectable virtual object 822 has focus (e.g., the input device 800 is within the lateral threshold distance of selectable virtual object 822), the visual appearance of virtual shadow portion 832*b* is changed to a shape similar to or based on the shape of selectable virtual object 822 (e.g., a square), thus presenting a visual appearance that selectable virtual object 822 includes a shadow and/or highlighting. In some embodiments, the visual appearance of the first portion of the virtual shadow corresponding to the barrel of the input device 800 (e.g., virtual shadow portion 832*a*) is not based on the currently selected drawing implement (e.g., has the same visual appearance across different selected drawing implements).

Figure 8V:
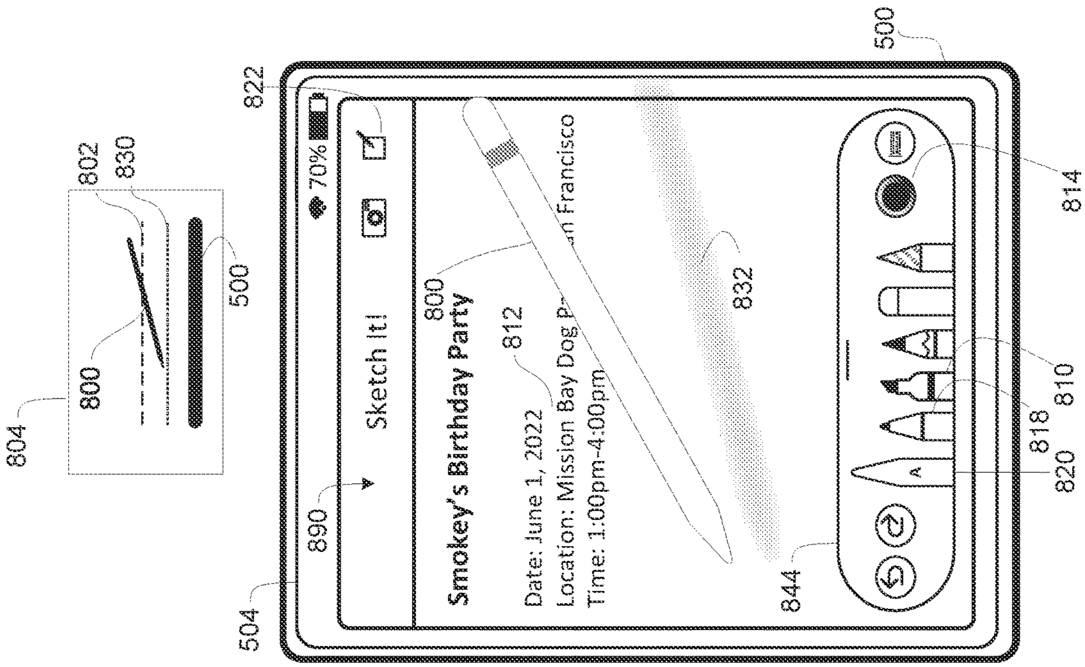
Figure 8U:
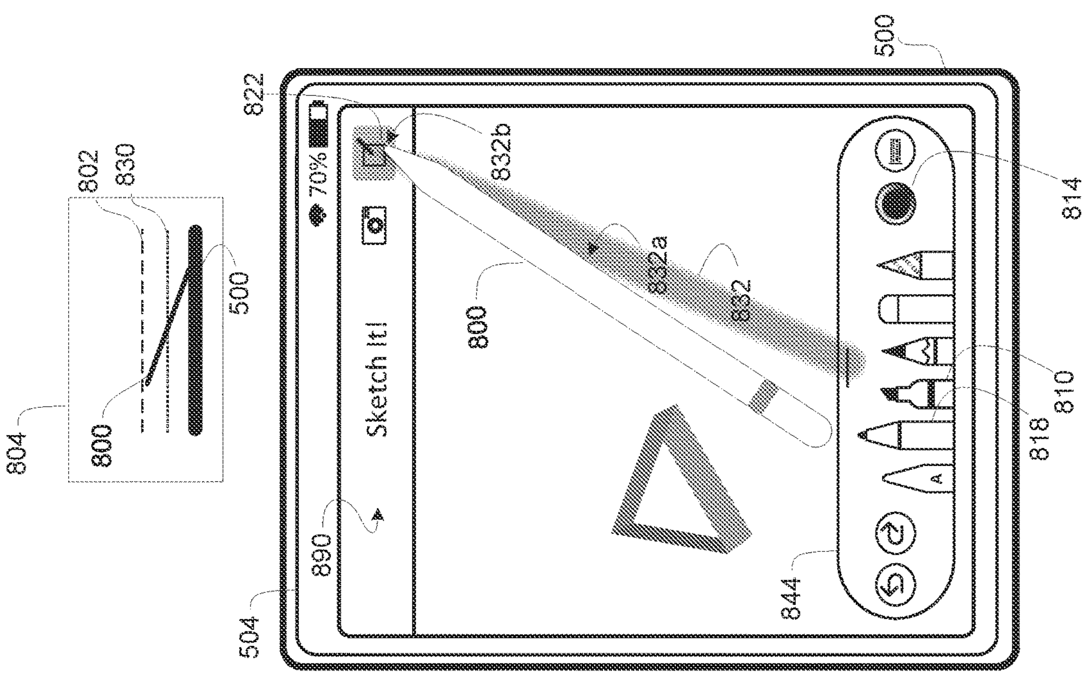

FIG. 8U illustrates that while the input device 800 is positioned with the lateral threshold distance of selectable virtual object 822, the input device 800 is moved such that the tip of input device 800 makes contact with the surface at a location corresponding to the location of selectable virtual object 822. In response to the device 500 detecting the input device 800 in contact with the surface at a location corresponding to the location of selectable virtual object 822, the electronic device 500 changes the visual appearance of selectable virtual object 822 and/or virtual shadow portion 832*b* (indicated by a darker shading and/or highlighting than the visual appearance of selectable virtual object 822 in FIG. 8T) to indicate the selection of virtual object 822. In response to such selection, device 500 optionally displays a blank drawing canvas in user interface 890.

In FIGS. 8V to 8AF, user interface 890 includes content entry region 812. In some embodiments, content entry region 812 is configured to receive handwritten input (e.g., a drawing input via the input device 800) and display a representation of the handwritten input (e.g., if drawing input is provided) and/or display font-based text (e.g., if font-based text input is provided and/or if handwritten input is converted to font-based text based on the currently selected drawing implement for input device 800). As shown in FIG. 8V, selection of text entry tool 820 as the currently selected drawing implement causes the device 500 to enter into text entry mode in which handwritten inputs drawn in the content entry region 812 are analyzed for text characters, identified, and converted into font-based text in the content entry region 812. In FIG. 8V, input device 800 is within threshold distance 802 of the surface of touch screen 504, but further than threshold distance 830 of the surface of touch screen—therefore, device 500 displays virtual shadow 832 for input device 800.

Figure 8X:
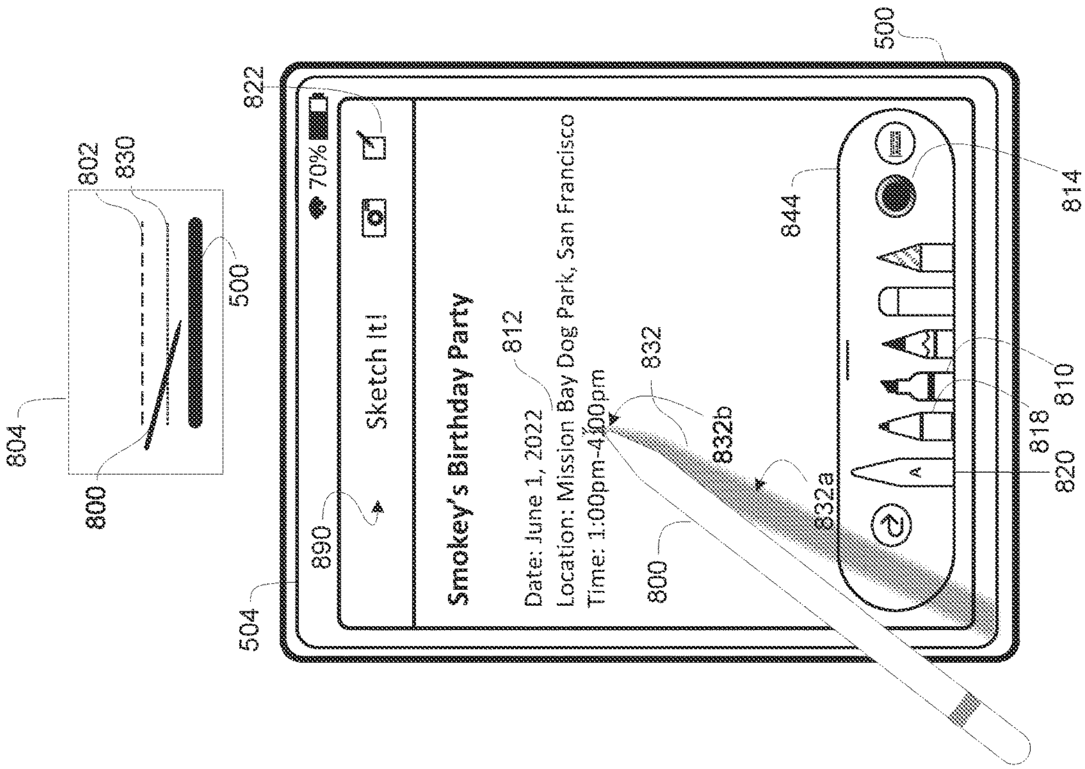
Figure 8W:
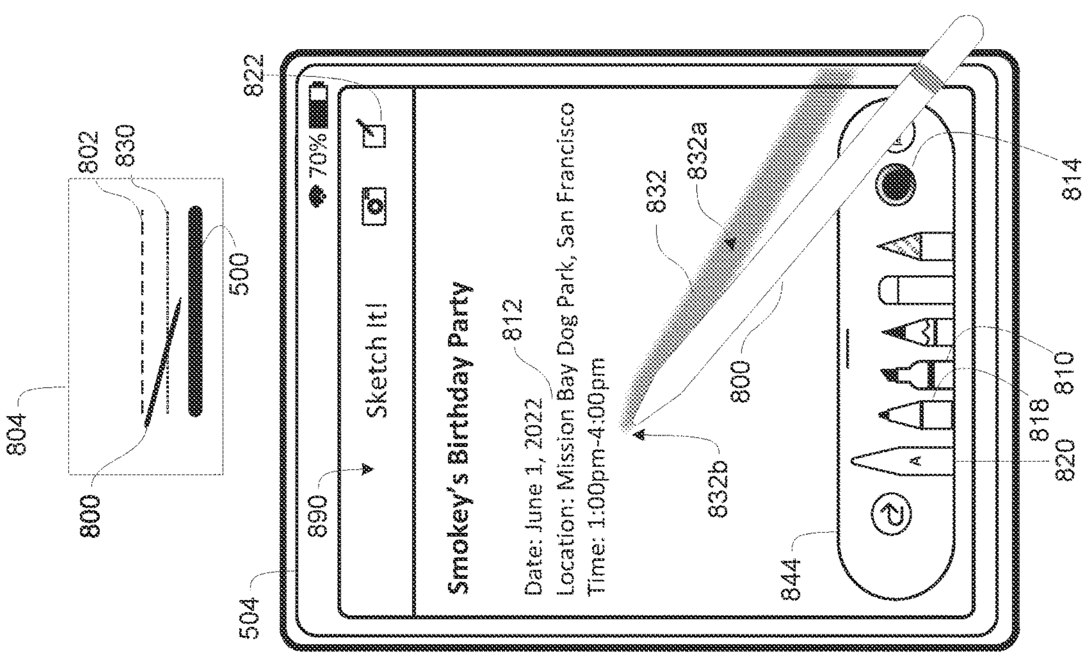

FIG. 8W illustrates that while the input device is below threshold 830, the device continues to display virtual shadow 832 corresponding to the currently selected drawing implement which is the text entry tool 820, but does not display the tip portion of the virtual shadow (e.g., virtual shadow portion 832*b* having a shape and/or color that corresponds to the tip of the selected drawing implement being emulated by the input device 800) as previously described. In some embodiments, when the currently selected drawing implement is the text entry tool 820, handwritten input and corresponding (e.g., converted) font-based text are displayed with a default color and/or line thickness—therefore, the color and/or line thickness of handwritten input provided while the text entry tool 820 is the currently selected drawing implement are optionally irrelevant to the text entry tool 820, and device 500 does not display a virtual shadow portion 832*b* that has a color and/or shape corresponding to the text entry tool 820.

FIG. 8X illustrates that while the input device 800 is below threshold 830, the input device 800 is moved such that input device 800 is positioned within a lateral threshold distance (e.g., 0.1, 0.3, 0.5, 1, 3, 5, or 10 cm) of content (e.g., text) in content entry region 812. In response to the device 500 detecting the input device 800 is within a threshold distance of the content, the electronic device 500 changes the visual appearance of the second virtual shadow portion 832*b* of virtual shadow 832 to a text insertion cursor. For example, the second virtual shadow portion 832*b* is, optionally, replaced with an indication of a text insertion cursor (e.g., simulated shadow on a cursor) while the tip of the input device 800 is located at a location within the lateral threshold distance of the content in the content entry region 812. In some embodiments, the vertical position of virtual shadow portion 832*b* within the content is snapped to the line of content and/or text to which the tip of input device 800 is closest, as shown in FIG. 8X. Further, the horizontal position of virtual shadow portion 832*b* within the content optionally corresponds to the horizontal position of the tip of input device 800.

Figure 8Z:
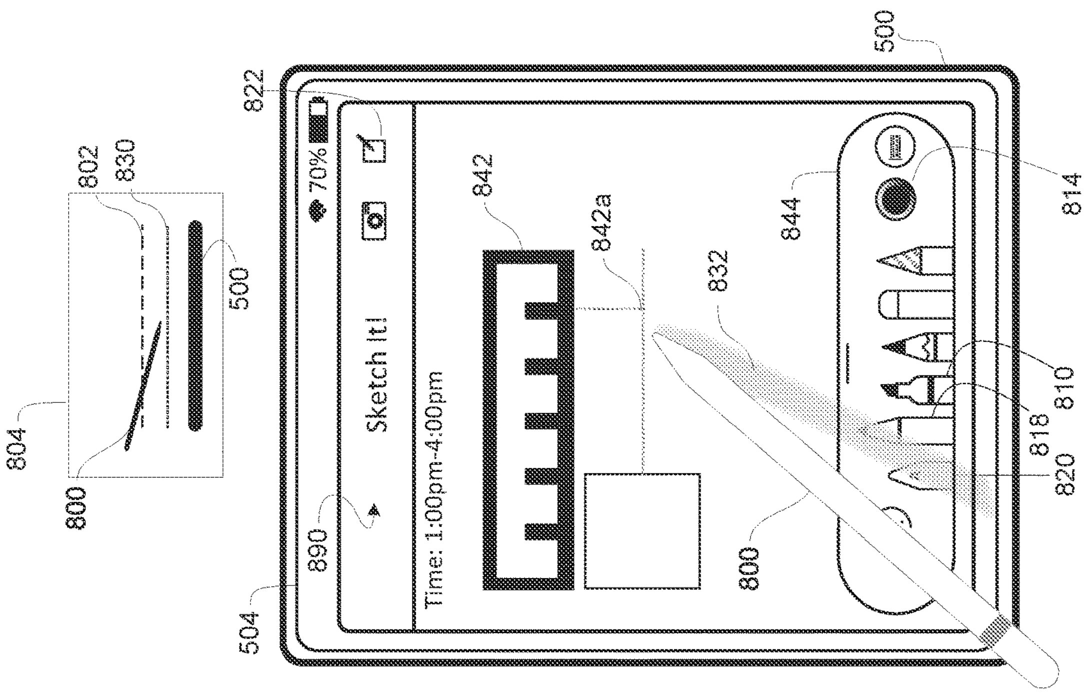
Figure 8Y:
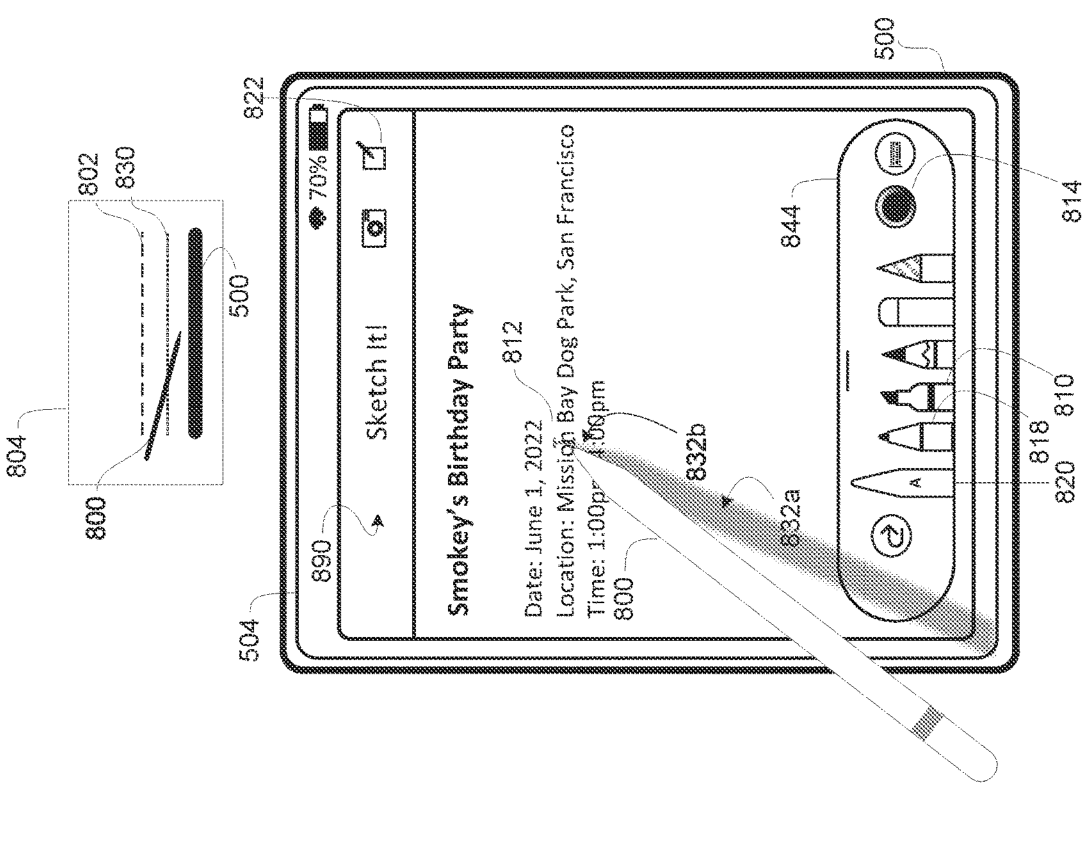
Figure 8A:
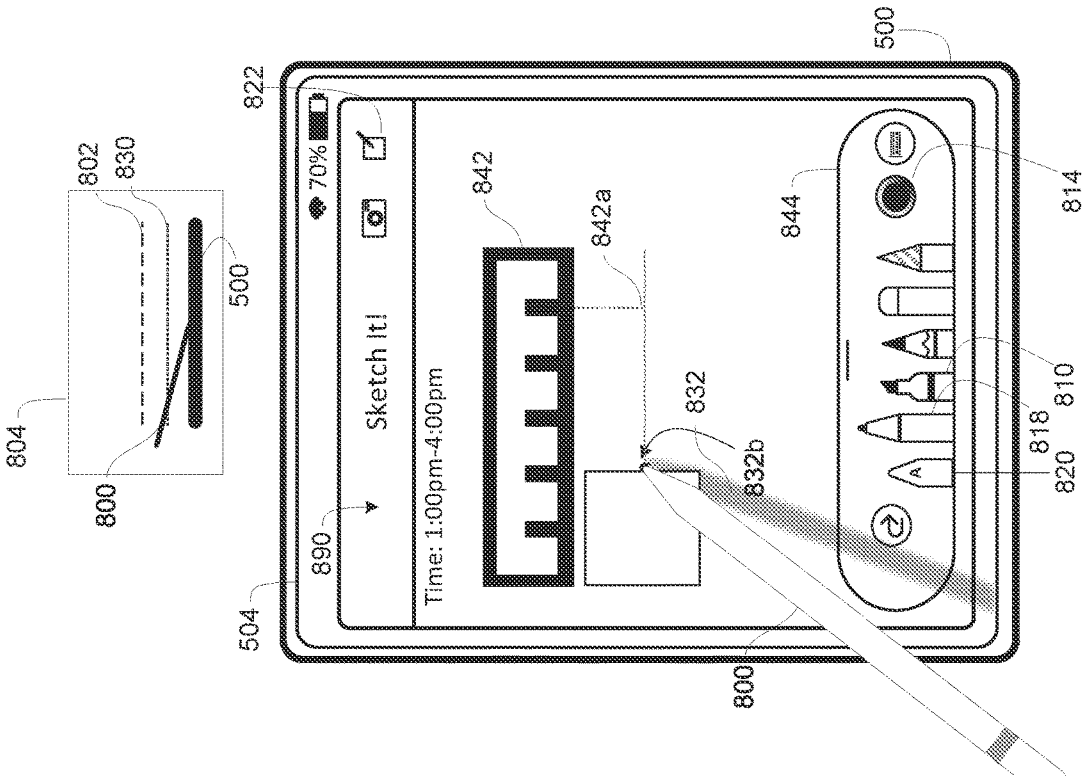
Figure 8A:
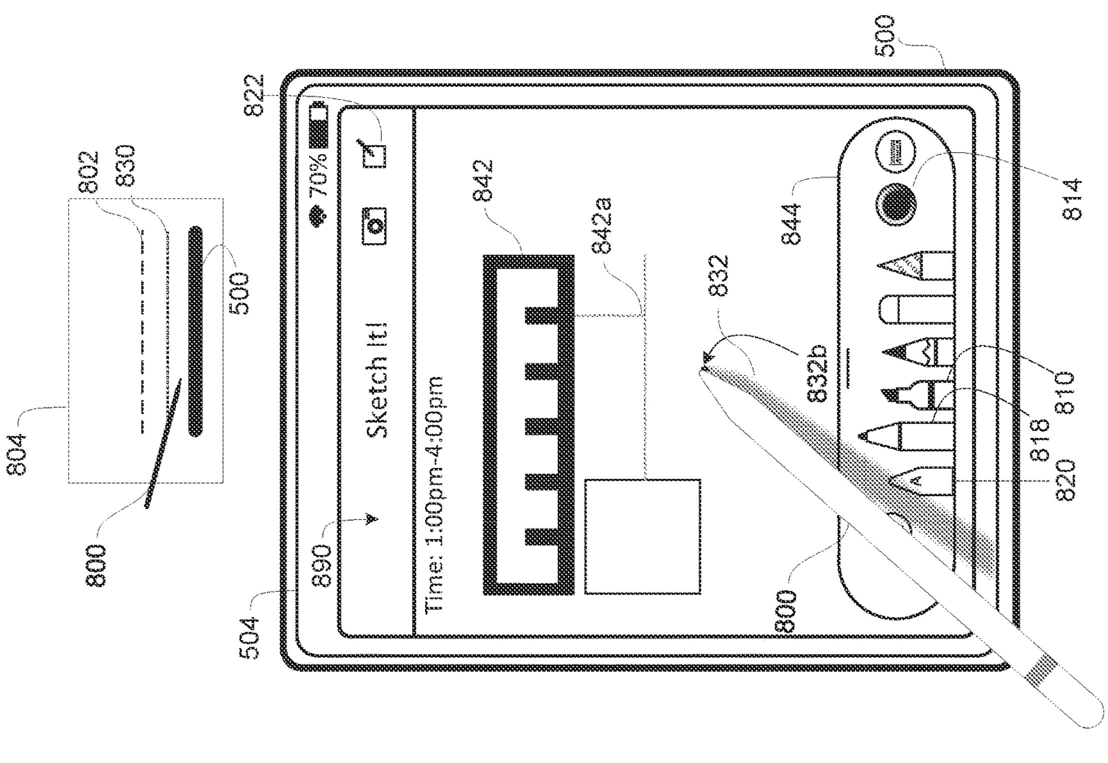
Figure 8A:
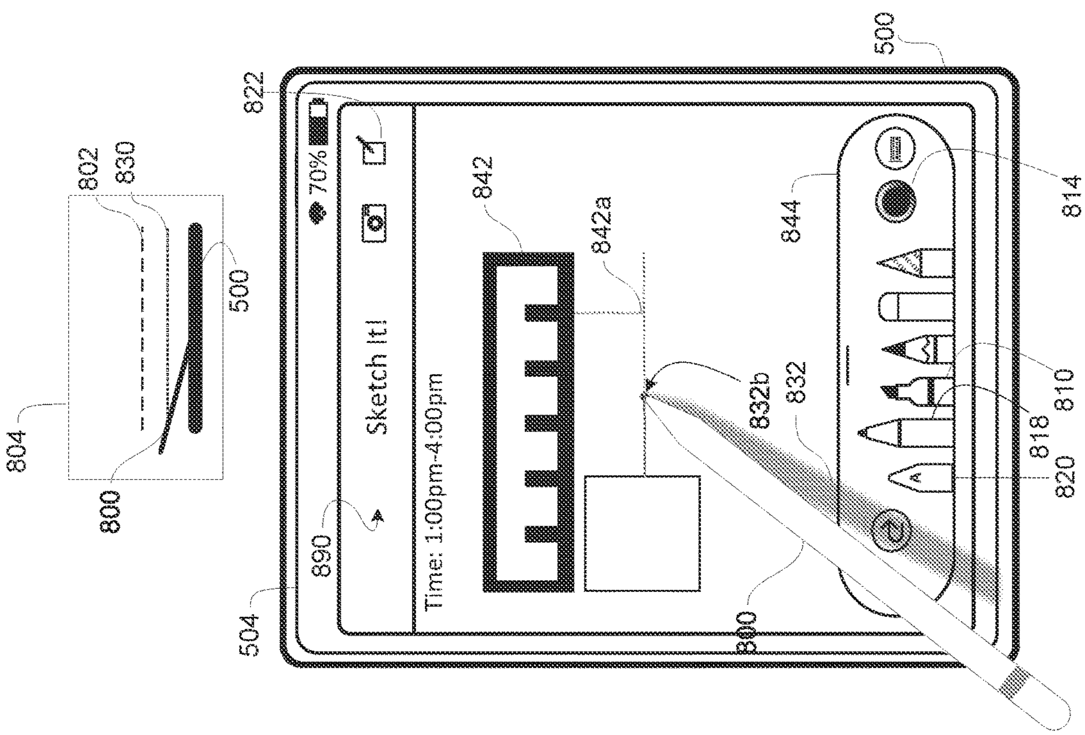
Figure 8A:
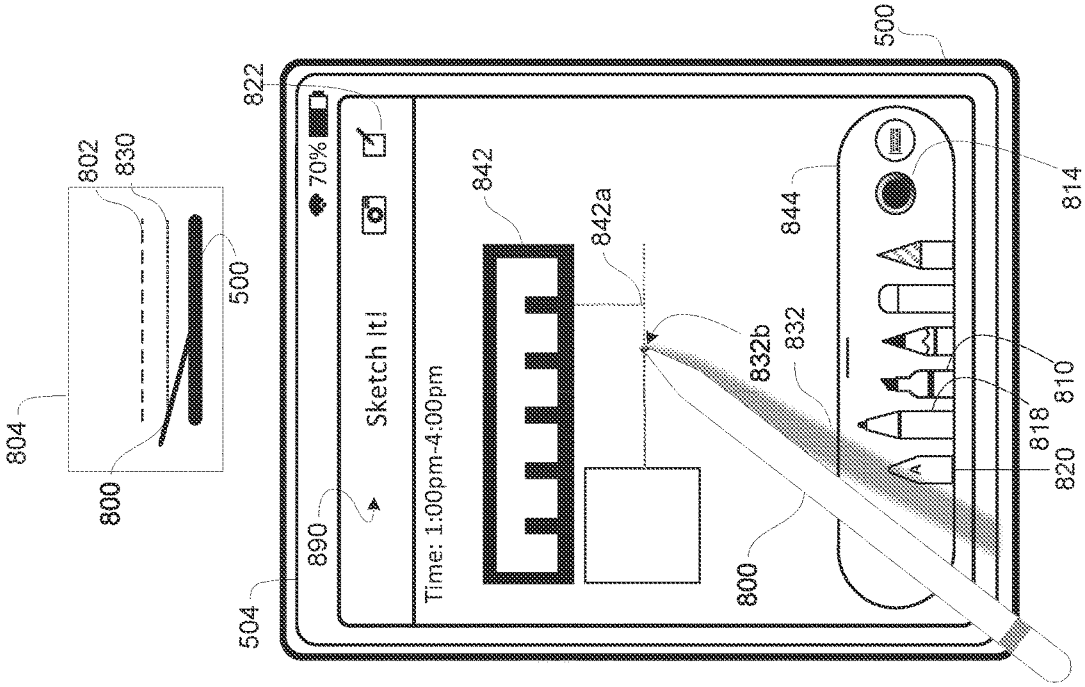
Figure 8A:
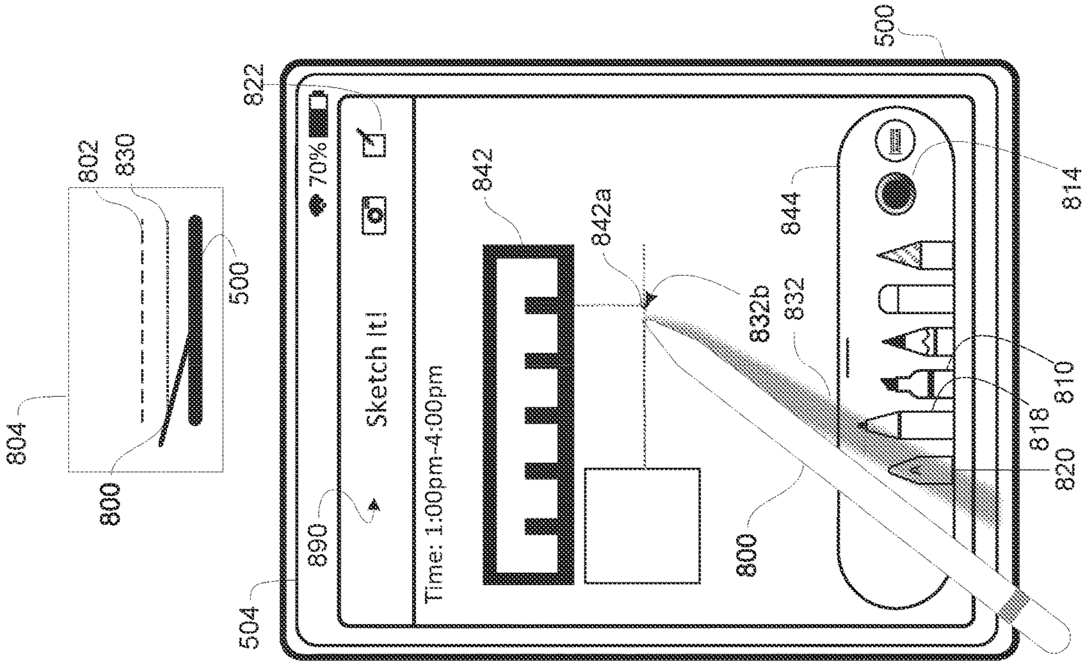
Figure 8A:
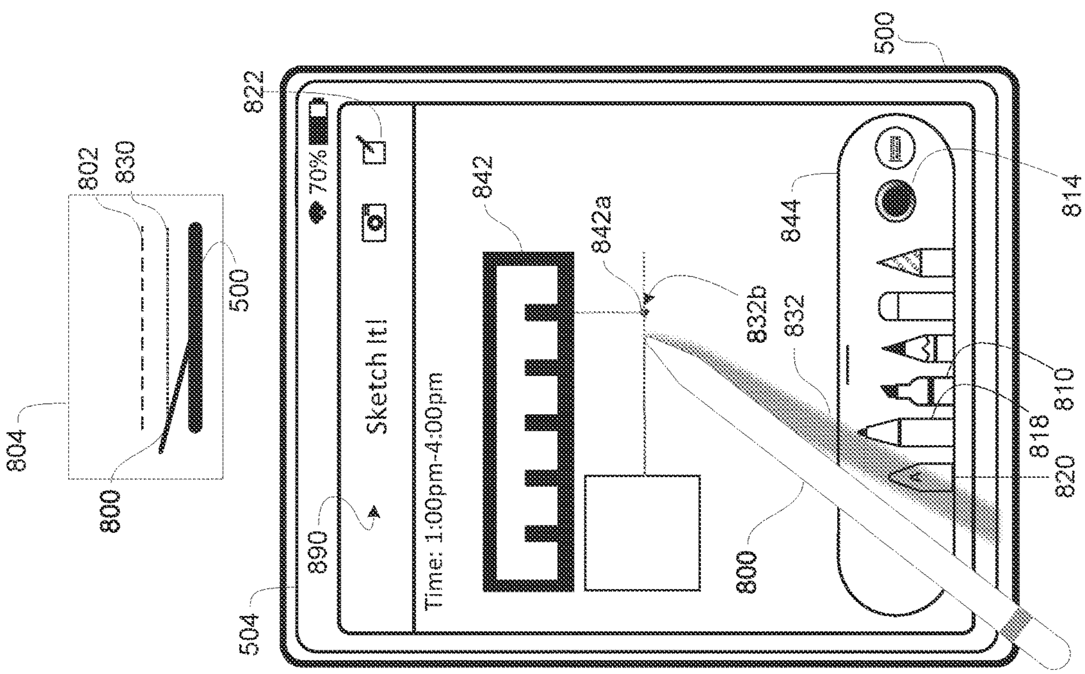
Figure 9A:
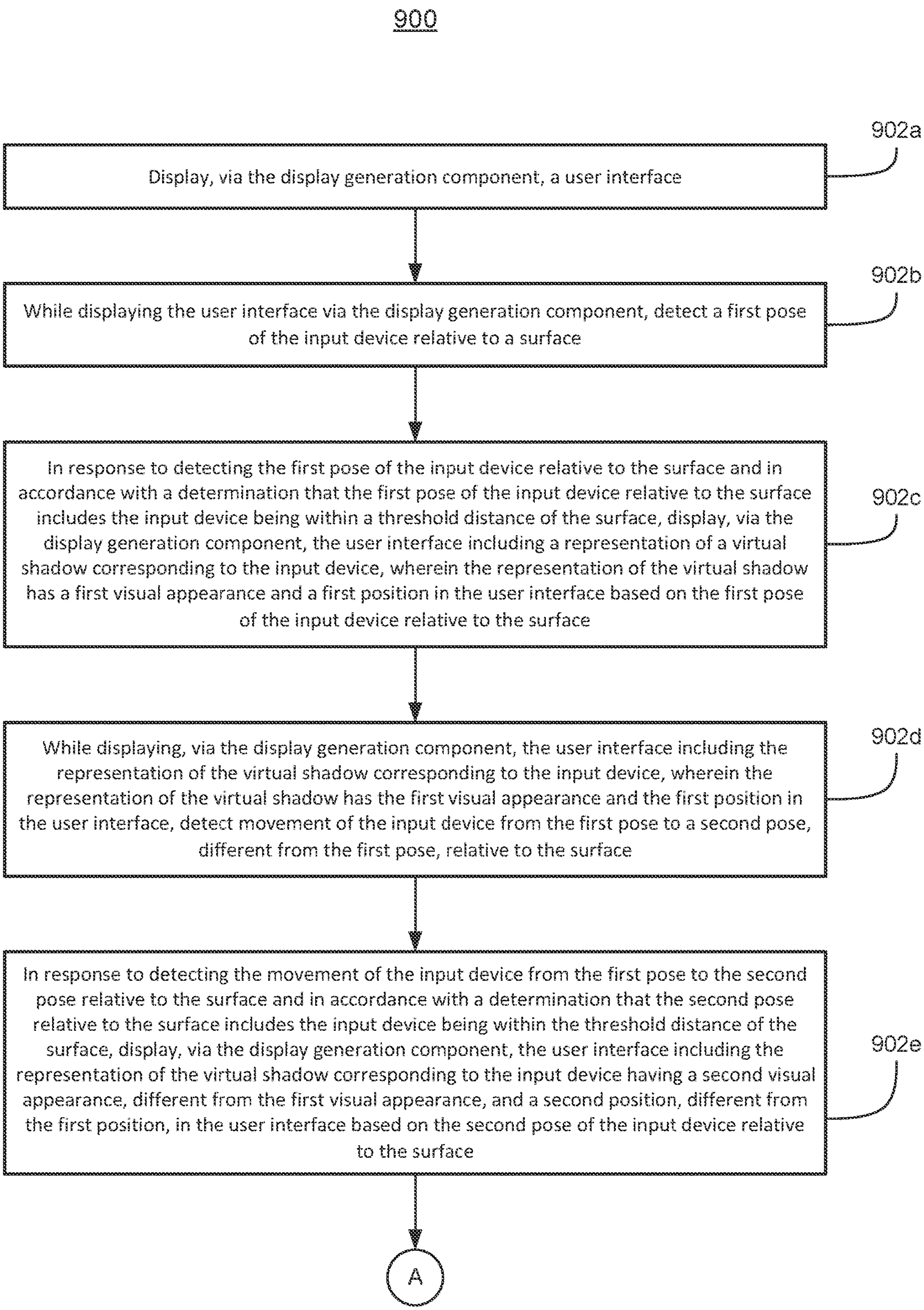
Figure 9B:
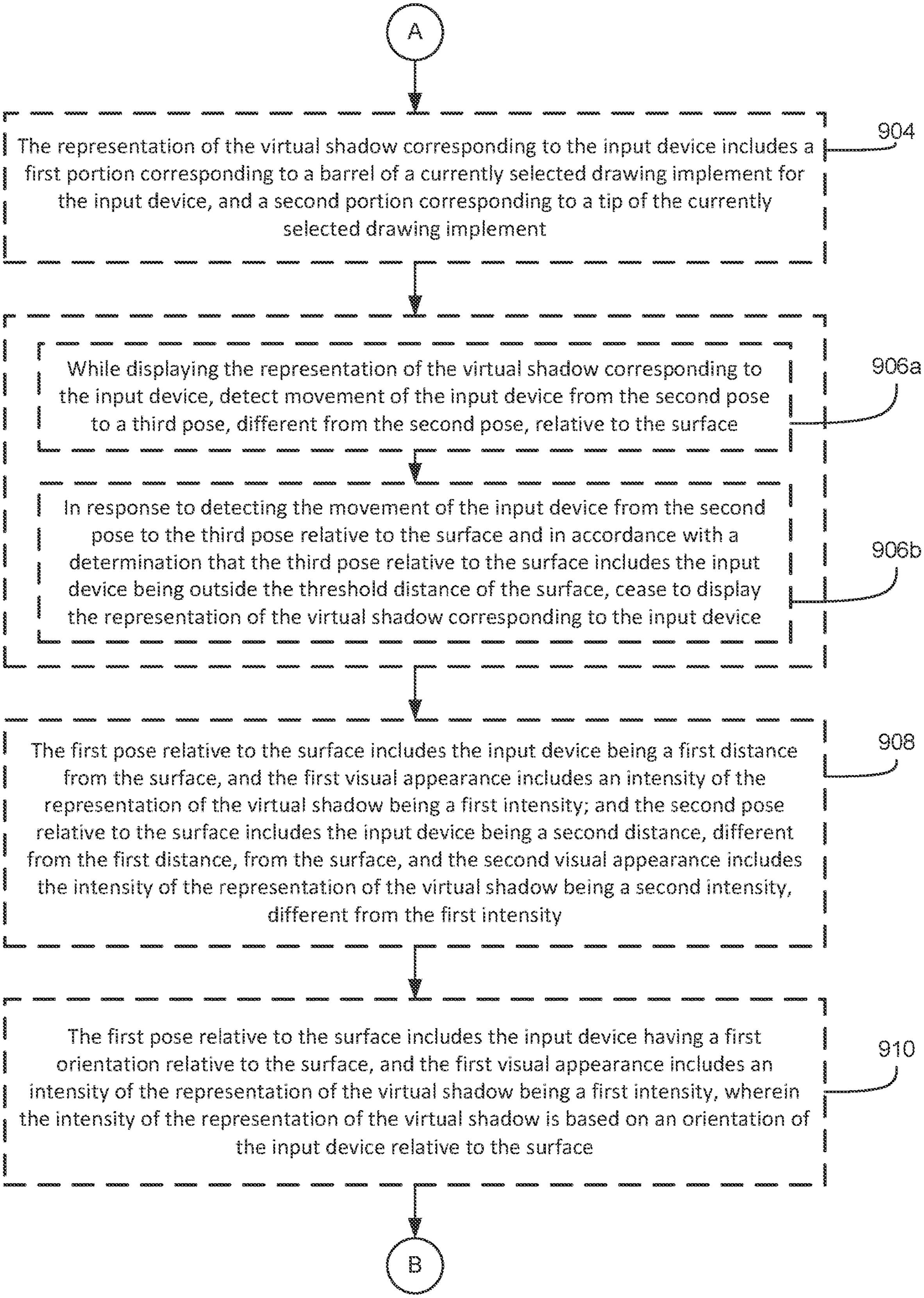
Figure 9C:
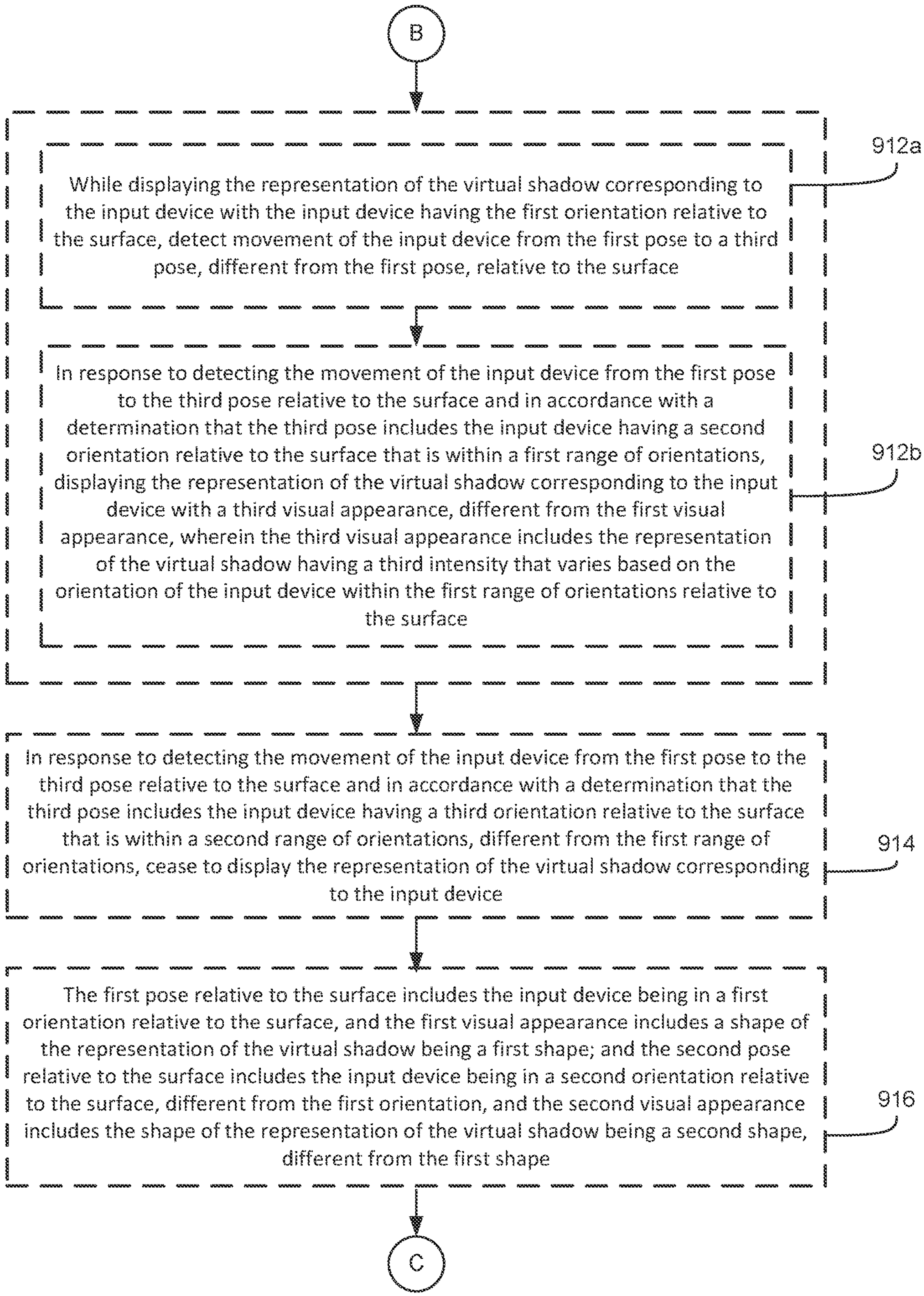
Figure 9E:
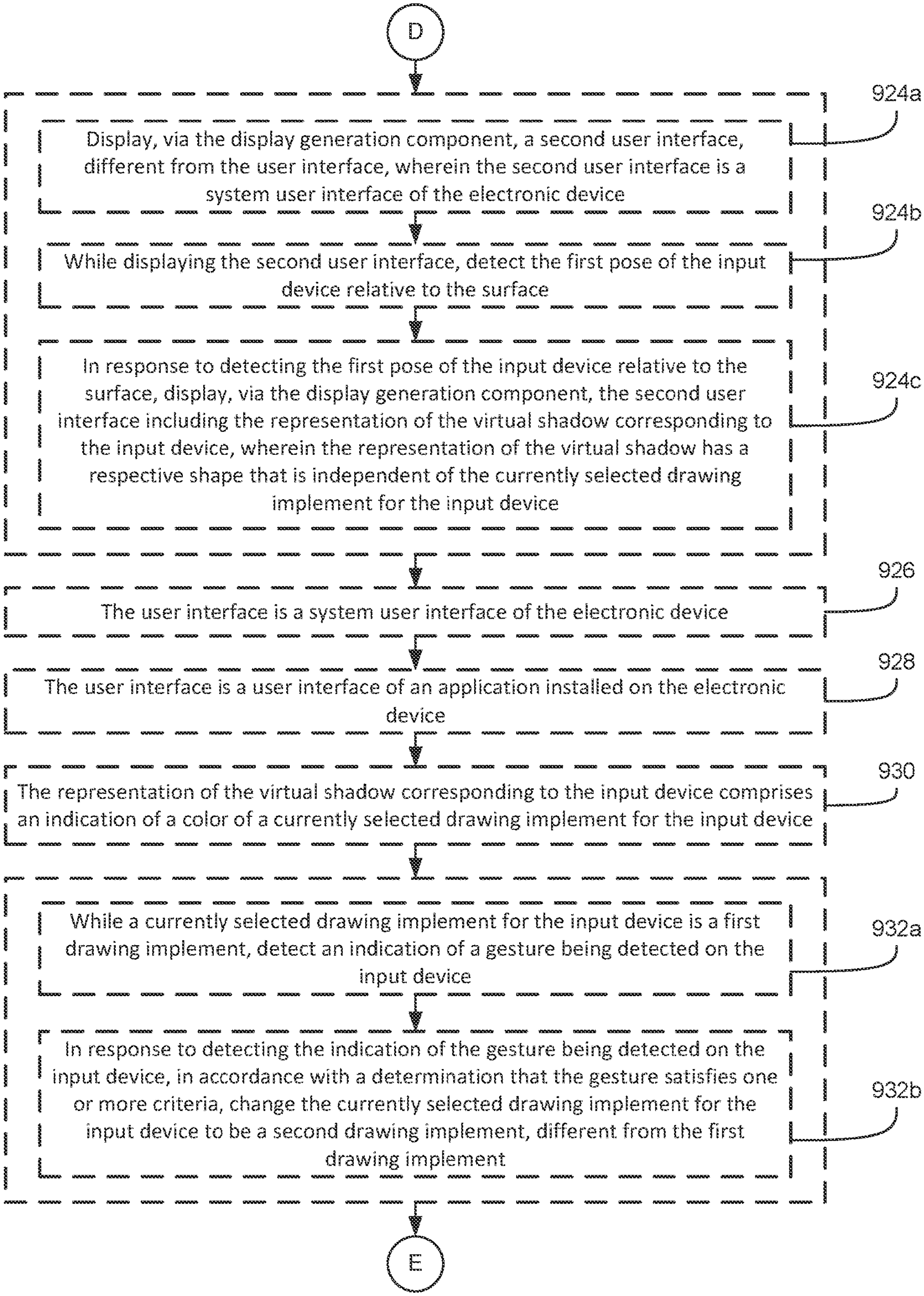
Figure 9F:
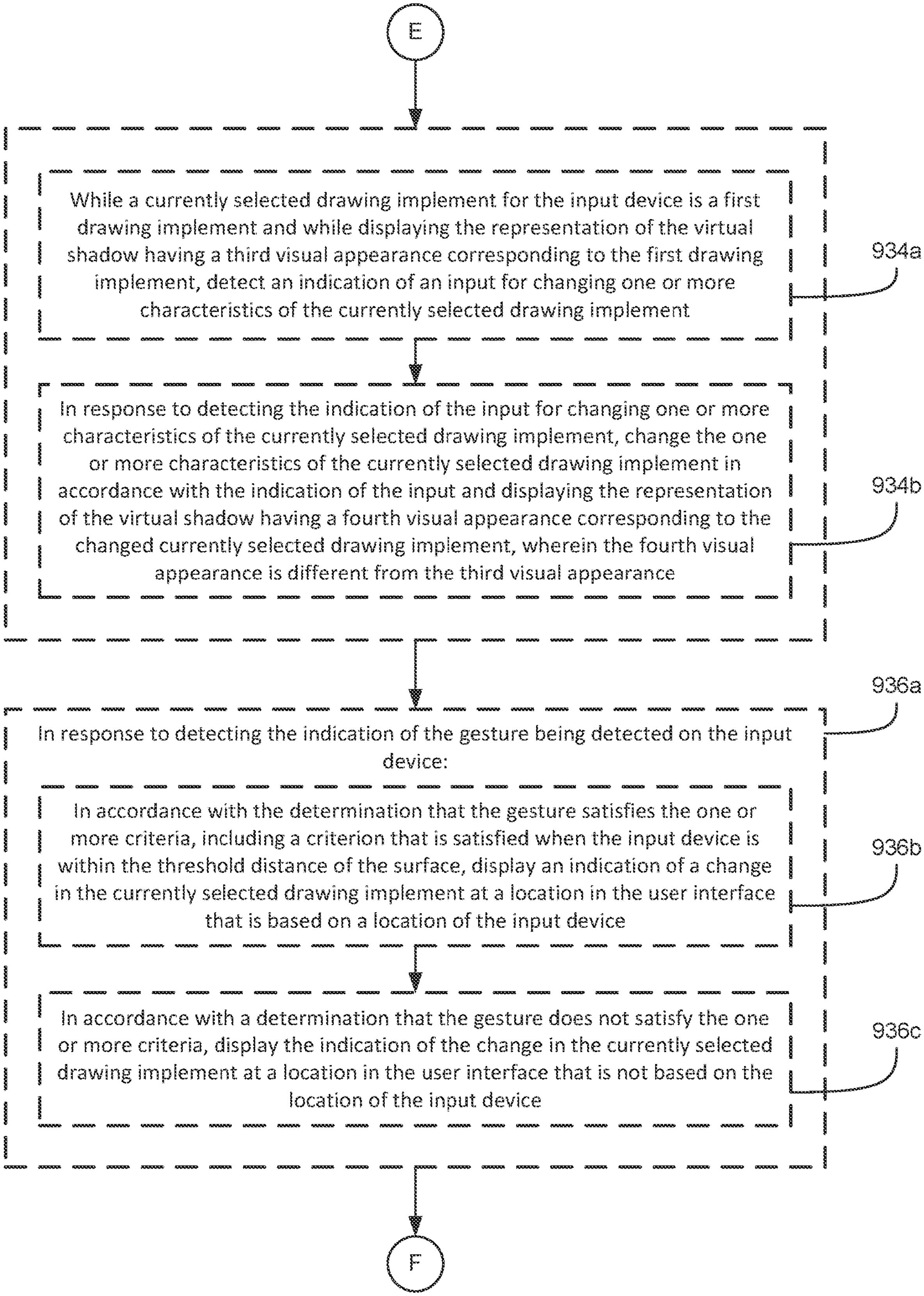
Figure 9G:
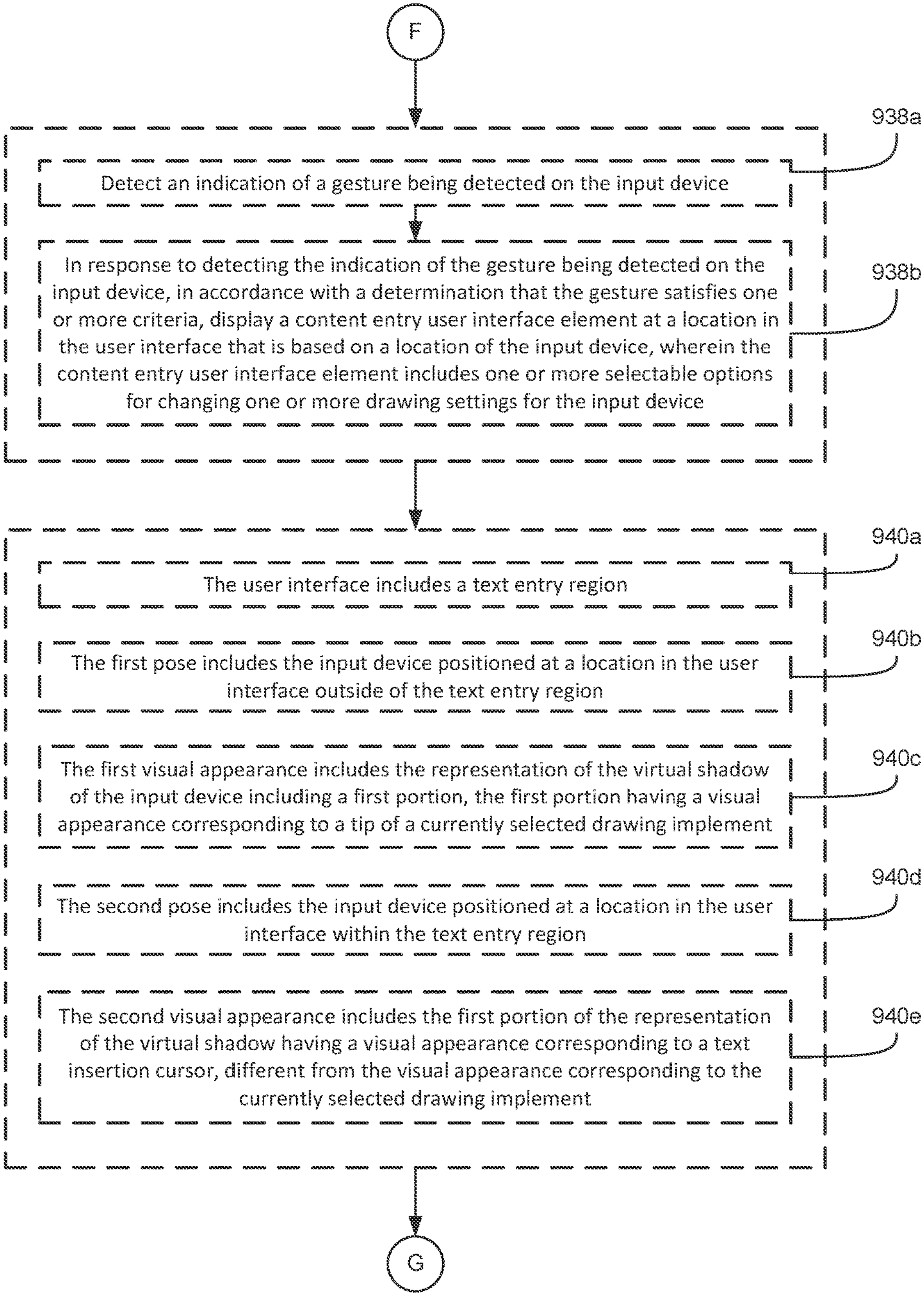
Figure 9H:
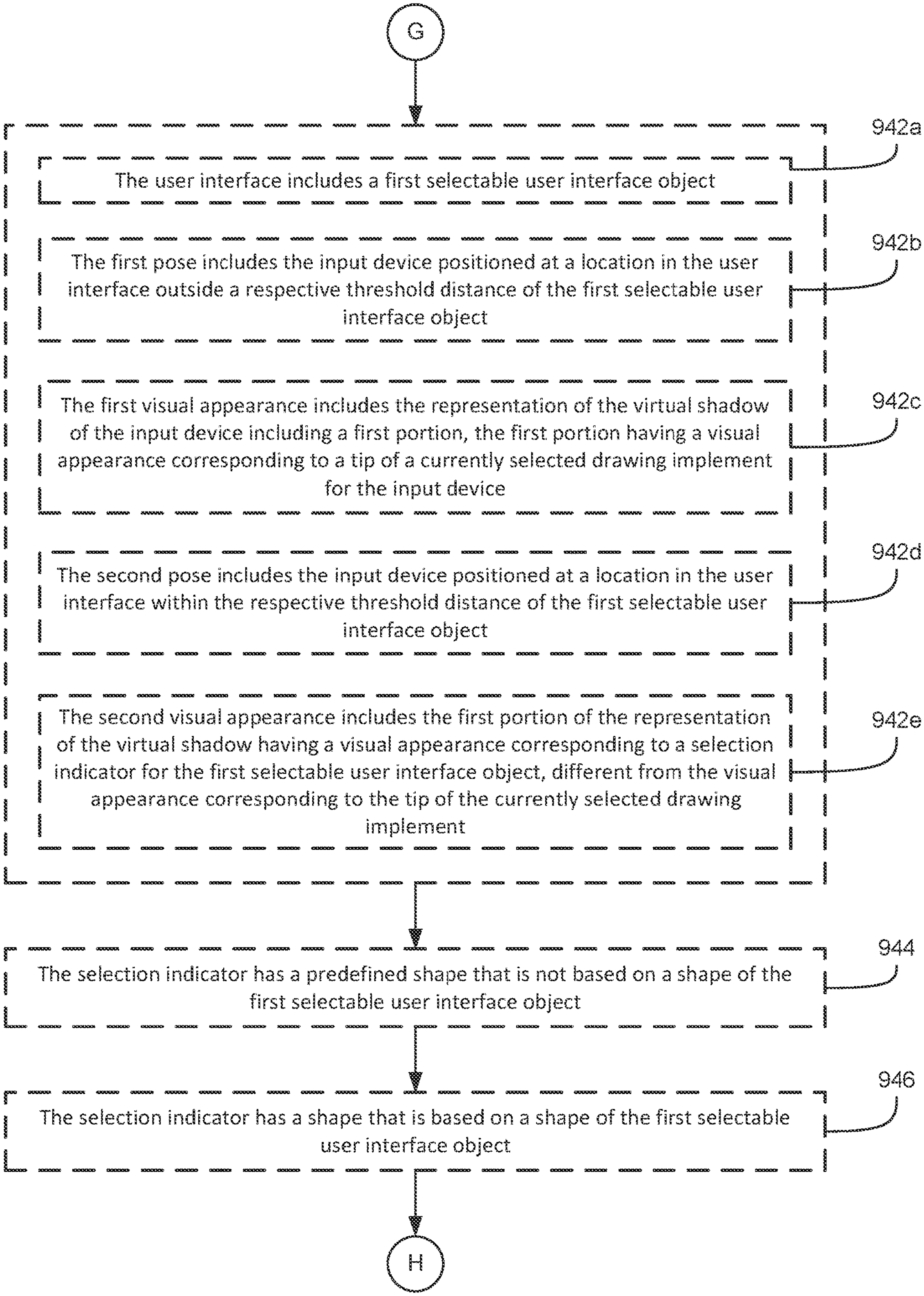
Figure 9J:
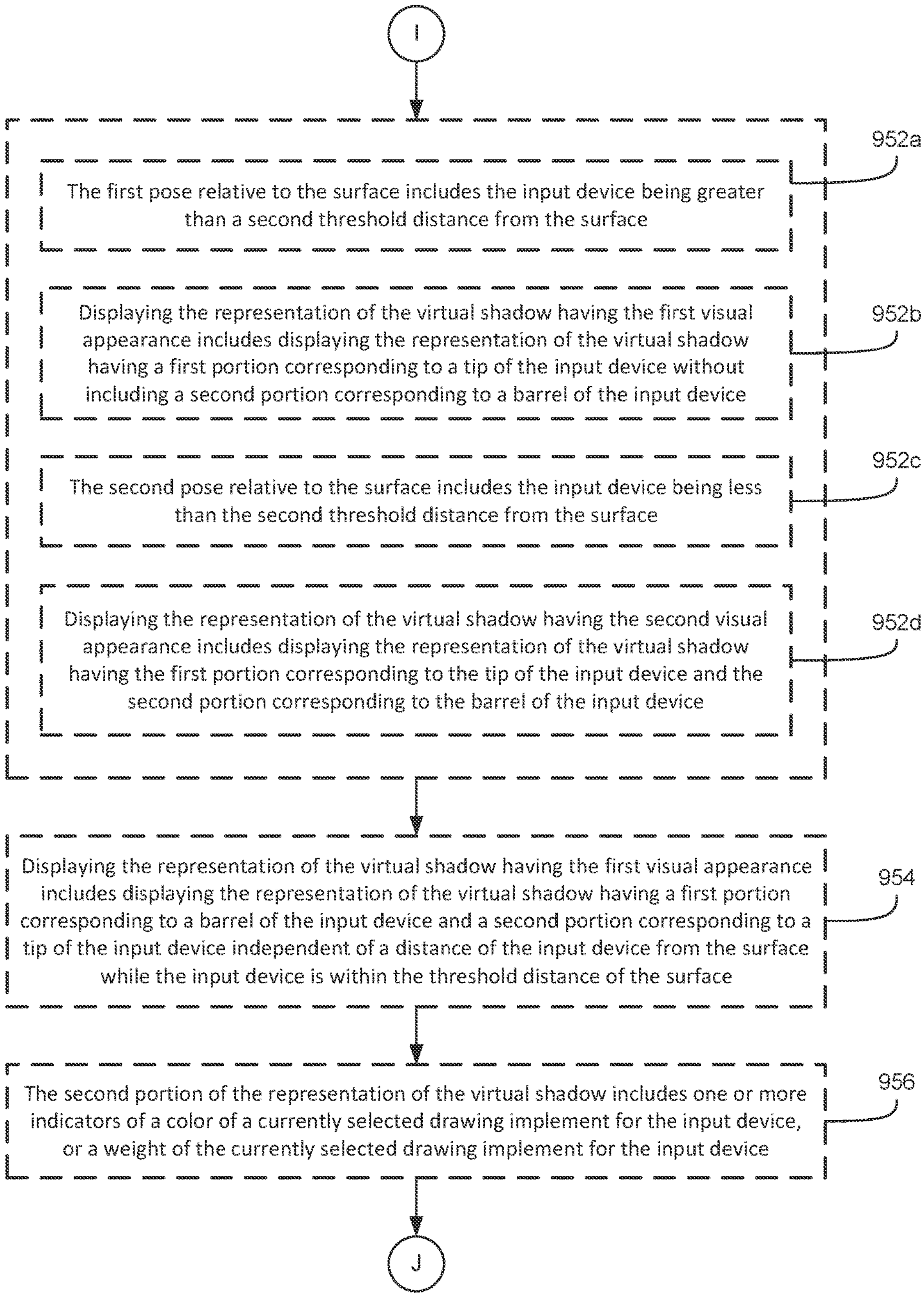

For example, in FIG. 8Y, the device 500 detects input device 800 move upward in the user interface 890, and correspondingly displays the virtual shadow portion 832*b* including the text insertion cursor from the lower line of text to the middle line of text in content entry region 812. As shown in FIGS. 8X and 8Y the movement of the text insertion cursor within the content corresponds to movement of the input device 800. For example, while the tip of input device 800 is over a particular character of the font-based text in content entry region 812, the text insertion cursor is displayed accordingly (e.g., the text insertion cursor is positioned to the closest character of the font-based text without requiring the user to more precisely move the tip of the input device 800 to a particular character). As such, in some embodiments, the vertical and/or horizontal position of virtual shadow portion 832*b* and/or the text insertion cursor is separated from (e.g., different from) the actual position in user interface 890 that corresponds to the position of the tip of input device 800 due to device 500 automatically snapping virtual shadow portion 832*b* and/or the text insertion cursor to the closest line and/or character in the content in content entry region 812.

In FIGS. 8Z to 8AF, user interface 890 includes one or more virtual objects (e.g., virtual objects 842 and 842*a*). Virtual object 842 is a content alignment user interface element (e.g., virtual ruler) that includes one or more virtual objects 842*a* (e.g., guide point). In some embodiments, the device 500 snaps the second virtual shadow portion 832*b* to the closest virtual object 842*a* to facilitate in automatically drawing lines that are aligned based on the content alignment user interface element. In the example illustrated in FIG. 8Z, device 500 detects that input device 800 is below threshold 802 (e.g., the tip of input device is within threshold distance 802 from the surface) and in response, the device 500 displayed virtual shadow 832, as previously described. FIG. 8AA illustrates that input device 800 is moved to a position below threshold 830 (e.g., the tip of input device is within threshold distance 830 from the surface). In response to the device 500 detecting the input device 800 is below threshold 830, the electronic device 500 changes the visual appearance of the virtual shadow 832 to include the second virtual shadow portion 832*b* corresponding to the tip of the currently selected drawing implement (e.g., pen tool 818), as previously described with reference to FIGS. 8N-8Q.

FIGS. 8AB to 8AD illustrate contact and movement of the tip of input device 800 along the guide lines of the virtual object 842. In response to the contact and movement of the input device 800, the device 500 generates a line at the location of the guide lines of the virtual object 842 in accordance with the movement of the input device 800, as shown from FIG. 8AB to FIG. 8AD. In some embodiments, the virtual shadow portion 832*b* is snapped vertically to the horizontal guide line (e.g., while the tip of input device 800 is within a lateral threshold distance of the horizontal guide line, such as 0.1, 0.3, 0.5, 1, 3 or 5 cm) during the movement of input device 800 to facilitate the drawing of a straight line in accordance with the movement of the input device 800, even if the tip of input device 800 is not located at the various positions along the guide line.

From FIG. 8AD to FIG. 8AE, input device 800 moves further to the right, towards object 842*a*. In response, as shown in FIG. 8AE, the second virtual object portion 832*b* corresponding to the tip of the currently selected drawing implement snaps to the closet virtual object 842*a* because it is the closest guide point to the location of the input device 800 and/or because the tip of input device 800 has moved within a lateral threshold distance (e.g., 0.1, 0.3, 0.5, 1, 3, or 5 cm) of virtual object 842*a*). In some embodiments, in conjunction with snapping virtual shadow portion 832*b* to object 842*a*, device 500 also completes the line drawn by input device 800 from the square on the left through to object 842*a*, and the line is optionally aligned based on an alignment provided by alignment object 842 (e.g., as opposed to the actual path traversed by input device 800). In some embodiment, as long as the device 500 detects movement of the input device 800 while remaining within the lateral threshold distance of the virtual object 842*a*, the device 500 maintains display of the second virtual object portion 832*b* at virtual object 842*a*, as shown from FIG. 8AE to FIG. 8AF. In some embodiments, when the device 500 detects the input device 800 within the lateral threshold distance of one or more guide points, the device 500 traverses the one or more guide lines to automatically generate a line along the one or more guide points that is aligned with the guide lines (e.g., as opposed to having alignment based on the actual path traversed by input device 800). Thus, in some embodiments, even though the second virtual object portion 832*b* is part of virtual object 832, if the input device is located within the lateral threshold distance of a content alignment guide (e.g., virtual object 842*a*), the device 500 displays the second virtual object portion 832*b* offset (or separated) from virtual object 832.

FIGS. 9A-9K are flow diagrams illustrating a method 900 of providing feedback about the pose of an input device relative to a surface. The method 900 is optionally performed at an electronic device such as device 100, device 300, and device 500 as described above with reference to FIGS. 1A-1B, 2-3, 4A-4B and 5A-5I. Some operations in method 900 are, optionally combined and/or order of some operations is, optionally, changed.

As described below, the method 900 provides ways to provide feedback about the pose of an input device relative to a surface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at an electronic device in communication with a display generation component, one or more sensors (e.g., a touch-sensitive surface) and an input device. For example, the electronic device is a mobile device (e.g., a tablet, a smartphone, a media player, or a wearable device) including a touch screen and wireless communication circuitry, or a computer including one or more of a keyboard, mouse, trackpad, and touch screen and wireless communication circuitry and optionally has one or more of the characteristics of the electronic device of method 700. In some embodiments, the display generation component has one or more characteristics of the display generation component in method 700. In some embodiments, the input device has one or more characteristics of the one or more input devices in method 700. In some embodiments that include the touch-sensitive surface (e.g., touch-sensitive display system 112 in FIG. 1A or touch screen 112 in FIG. 4A), the input device (e.g., a stylus in communication with the electronic device, such as a stylus as described with reference to methods 700, 900, 1100 and/or 1300) hovering over the touch-sensitive surface is detected so that when the input device is detected hovering over the touch-sensitive surface, a representation of a virtual shadow corresponding to the input device changes when the input device moves relative to the touch-sensitive surface, as described in method 900 herein. In some embodiments, the one or more sensors optionally include one or more sensors of FIG. 1A.

In some embodiments, the electronic device displays (902*a*), via the display generation component, a user interface, such as user interface 890 in FIGS. 8D-8AF. For example, a user interface of an application installed and/or running on the electronic device, or a user interface of the operating system of the electronic device. In some embodiments, the user interface is a home screen user interface of the electronic device, or a user interface of an application accessible by the operating system of the electronic device, such as a word processing application, a note taking application, an image management application, a digital content management application, a drawing application, a presentation application, a word processing application, a spreadsheet application, a messaging application, a web browsing application, and/or an email application. In some embodiments, the user interface concurrently includes multiple user interfaces of one or more applications and/or the operating system of the electronic device. In some embodiments, the user interface has one or more of the characteristics of the user interface of method 700.

In some embodiments, while displaying the user interface via the display generation component, the electronic device detects (902*b*) a first pose (e.g., position and/or orientation) of the input device (e.g., the stylus) relative to a surface (e.g., the touch-sensitive surface, a physical surface on which the user interface is projected, or a virtual surface corresponding to at least a portion of the user interface), such as the pose of input device 800 in section 860*a* in FIG. 8A. For example, the electronic device and/or touch sensitive surface obtains pose information including position/attitude (pitch, yaw, and/or roll), orientation, tilt, path, force, distance, and/or location of the input device relative to the surface from one or more sensors of the input device, one or more electrodes in the surface, one or more planar surfaces of a physical object (or physical regions) in a physical environment, other defined coordinate systems, other sensors, and/or other input devices (e.g., an input trackpad including a specialized surface that is configured to translate motion and pose information of the input device).

In some embodiments, in response to detecting the first pose of the input device relative to the surface and in accordance with a determination that the first pose of the input device relative to the surface includes the input device being within a threshold distance (e.g., 0, 0.01, 0.05, 0.1, 0.2, 0.5, 0.8, 1, 3, 5, 10, 30, 50 or 100 cm) of the surface, the electronic device displays (902*c*), via the display generation component, the user interface including a representation of a virtual shadow corresponding to the input device, such as virtual shadow 832 in section 860*b* in FIG. 8A, wherein the representation of the virtual shadow has a first visual appearance and a first position in the user interface based on the first pose of the input device relative to the surface, such as the appearance and/or position of virtual shadow 832 in section 860*b* in FIG. 8A. For example, the electronic device optionally determines that the input device is within the threshold distance of the surface (in some embodiments, not contacting the surface, and in some embodiments, in contact with the surface) and, in accordance with the determination, displays the virtual shadow having the first visual appearance corresponding to a first intensity (e.g., first degree of coloring, first shape, first size, first degree of transparency, first angle, first distance, first degree of blur, and/or first other characteristic of the virtual shadow) virtually cast onto the user interface by the input device. For example, the first position of the representation of the virtual shadow virtually cast onto the user interface is based on the pose information concerning the input device's physical location and/or attitude relative to the surface. In some embodiments, the position and/or visual appearance of the virtual shadow corresponding to the input device is as if one or more external light sources at one or more positions relative to the electronic device are shining onto the input device and/or surface of the display generation component and/or surface, and resulting in the virtual shadow being displayed.

In some embodiments, while displaying, via the display generation component, the user interface including the representation of the virtual shadow corresponding to the input device, wherein the representation of the virtual shadow has the first visual appearance and the first position in the user interface, the electronic device detects (902*d*) movement of the input device from the first pose to a second pose (e.g., position and/or orientation), different from the first pose, relative to the surface, such as movement from the pose of input device 800 in section 860*a* in FIG. 8A to the pose of input device 800 in section 862*a* in FIG. 8A. For example, the electronic device detects input from the user (e.g., finger manipulations on the input device, gestures on the input device, and/or rotational or translational movements of the input device) to move the position and/or orientation of the input device from the first pose to the second pose relative to the surface. For example, the second pose of the input device is optionally within the threshold distance of the surface and is optionally vertically oriented relative to a reference axis compared to the first pose where the input device is optionally horizontally oriented relative to the reference axis. In some embodiments, transitioning from the first pose to the second pose includes changing the distance of the input device from the surface without changing an orientation of the input device relative to the surface; in some embodiments, transitioning from the first pose to the second pose includes changing the orientation of the input device relative to the surface without changing the distance from the surface; in some embodiments, transitioning from the first pose to the second pose includes changing the orientation of the input device relative to the surface and changing the distance from the surface.

In some embodiments, in response to detecting the movement of the input device from the first pose to the second pose relative to the surface and in accordance with a determination that the second pose relative to the surface includes the input device being within the threshold distance of the surface, the electronic device displays (902*e*), via the display generation component, the user interface including the representation of the virtual shadow corresponding to the input device having a second visual appearance, different from the first visual appearance, and a second position, different from the first position, in the user interface based on the second pose of the input device relative to the surface, such as the appearance and/or position of virtual shadow 832 in section 862*b* in FIG. 8A. For example, the virtual shadow is displayed with a second degree of coloring, second shape, second size, second degree of transparency, second angle, second distance, second degree of blur, and/or otherwise visually altering the appearance of the simulated shadow. In some embodiments, once the input device is located within the threshold distance of the surface, the electronic device displays (or presents) the representation of the virtual shadow changing in accordance with the position and/or orientation information concerning the input device's physical location and/or attitude relative to the surface; for example, the virtual shadow is more intense (more distinct, and/or darker) at the second position (closer to the surface) compared to the first position (further from the surface, but within the threshold distance). In some embodiments, the position and/or visual appearance of the virtual shadow corresponding to the input device in the second pose is as if the above-described one or more external light sources at the (same) above-described one or more positions relative to the electronic device are shining onto the input device and/or surface of the display generation component and/or the surface, and resulting in the updated virtual shadow being displayed. Displaying a virtual shadow for the input device that changes based on a change in pose of the input device provides an indication of the pose of the input device, a distance to the surface, and/or a distance to a target user interface element and enables the user to precisely place the input device, thereby reducing errors in the interaction between the input device and/or the surface (e.g., avoiding accidental marks made by the input device in the user interface) and reducing inputs needed to correct such errors.

In some embodiments, the representation of the virtual shadow corresponding to the input device includes a first portion corresponding to a barrel of a currently selected drawing implement for the input device, such as portion 832*a* in FIG. 8M, and a second portion corresponding to a tip of the currently selected drawing implement (904), such as portion 832*b* in FIG. 8M. For example, the input device emulates one or more virtual drawing implements (e.g., pen, pencil, brush, and/or highlighter) and when the input device is determined to be within the threshold distance of the surface, the user interface optionally includes both an indication of the first portion corresponding to the barrel of the currently selected drawing implement and an indication of the second portion corresponding to the tip of the currently selected drawing implement. In some embodiments, the indication of the first portion corresponding to the barrel of the currently selected drawing implement indicates one or more of a distance of the input device relative to the surface, an orientation of the input device relative to the surface, and/or a tilt of the input device relative to the surface. In some embodiments, the indication of the second portion corresponding to the tip of the currently selected drawing implement indicates one or more of proximity of the input device to the surface and/or where a mark will be drawn (or rendered for display) by the user interface if and/or when the input device provides a marking input to the user interface (e.g., movement of the input device while the tip of the input device is in contact with the surface). In some embodiments, the representation of the virtual shadow including the first portion and the second portion is not shown (e.g., because a user interface of an application installed on the electronic device already presents a visual indication of the input device, because a user interface of an application installed on the electronic device does not support (is not configured to) present the representation of the virtual shadow, and/or because the input device is outside the threshold distance of the surface). In some embodiments, only a portion of the first portion corresponding to the barrel of the currently selected drawing implement for the input device is included in the user interface, and not the entire first portion corresponding to the barrel of the currently selected drawing implement for the input device (e.g., because the remainder of the first portion would be beyond a display boundary of the display generation component). In some embodiments, the user interface includes the first portion corresponding to the barrel of the currently selected drawing implement for the input device but not the second portion, as described in more detail later. In some embodiments, the user interface includes the second portion corresponding to the tip of the currently selected drawing implement for the input device but not the first portion, as described in more detail later with reference to step(s) 950. In some embodiments, the user interface includes the first portion corresponding to the barrel of the currently selected drawing implement for the input device before including the second portion corresponding to the tip of the currently selected drawing implement for the input device, as described in more detail later with reference to step(s) 948. By presenting a virtual shadow having two distinct portions, the electronic device enables the user to precisely place the input device relative to the surface and know the type and/or characteristics of the virtual drawing implement before providing input for a mark on the user interface, thereby reducing errors in the interaction between the input device and/or the surface (e.g., avoiding accidental marks made by the input device in the user interface) and reducing inputs needed to correct such errors.

In some embodiments, while displaying the representation of the virtual shadow corresponding to the input device, the electronic device detects (906*a*) movement of the input device from the second pose to a third pose, different from the second pose, relative to the surface, such as movement of input device 800 from FIG. 8Q to FIG. 8R. For example, the third pose is outside the above-described threshold distance of the surface.

In some embodiments, in response to detecting the movement of the input device from the second pose to the third pose relative to the surface and in accordance with a determination that the third pose relative to the surface includes the input device being outside the threshold distance (e.g., 0, 0.01, 0.05, 0.1, 0.2, 0.5, 0.8, 1, 3, 5, 10, 30, 50 or 100 cm) of the surface, the electronic device ceases (906*b*) to display the representation of the virtual shadow corresponding to the input device, such as not displaying virtual shadow 832 in FIG. 8R. For example, when the input device is detected as being outside the threshold distance of the surface, the representation of the virtual shadow disappears (e.g., is not included) from the user interface. In some embodiments, the threshold distance (a "hide distance") at which the electronic device ceases to display the representation of the virtual shadow corresponding to the input device is different from the threshold distance (a "display distance") at which the electronic device begins to display the representation of the virtual shadow corresponding to the input device (e.g., threshold hysteresis to avoid jitter in displaying the representation of the virtual shadow when the input device is at or very near the threshold distance). In some embodiments, the "hide distance" is greater than the "display distance"; in some embodiments, the "hide distance" is less than the "display distance." In some embodiments, the entire input device is required to be detected as being outside the threshold distance of the surface before the representation of the virtual shadow disappears. In some embodiments, a majority (e.g., greater than 70%, 75%, 80%, 85%, 90%, or 95%) of the input device is required to be detected as being outside the threshold distance of the surface before the representation of the virtual shadow disappears. In some embodiments, the tip of the input device (or other particular portion of the input device) is required to be detected as being outside the threshold distance of the surface before the representation of the virtual shadow disappears. Ceasing the display of the virtual shadow indicates that input from the input device will not be detected by the electronic device, thereby reducing errors in the interaction between the input device and/or the surface (e.g., avoiding accidental marks made by the input device in the user interface) and reducing inputs needed to correct such errors.

In some embodiments, the first pose relative to the surface includes the input device being a first distance from the surface, such as the distance of input device 800 in FIG. 8L, and the first visual appearance includes an intensity of the representation of the virtual shadow being a first intensity (908), such as the intensity of virtual shadow 832 in FIG. 8L. For example, the representation of the virtual shadow having the first intensity is displayed with a first degree of coloring, a first shape, a first size, a first degree of transparency, a first angle, a first offset (e.g., gap between the virtual shadow and the input device), a first degree of blur, and/or first other characteristic of the virtual shadow. In some embodiments, the second pose relative to the surface includes the input device being a second distance, different from the first distance, from the surface, such as the distance of input device 800 in FIG. 8M, and the second visual appearance includes the intensity of the representation of the virtual shadow being a second intensity, different from the first intensity (908), such as the intensity of virtual shadow 832 in FIG. 8M. The electronic device detects a change in the distance of the input device from (or relative to) the surface, and in response to the change in the distance, optionally updates the representation of the virtual shadow. For example, the second distance is less than the first distance (e.g., closer to the surface) and the representation of the virtual shadow having the second intensity is displayed with a second degree of coloring greater (e.g., darker) than the first degree of coloring, a second shape shorter than the first shape, a second size smaller than the first size, a second degree of transparency less than the first degree of transparency, a second angle offset relative to the input device greater than the first angle (e.g., rotated closer to the input device), a second offset less than the first offset (e.g., smaller gap between the virtual shadow and the input device), and/or a second degree of blur less than the first degree of blur (e.g., sharper). In some embodiments, if the second distance is greater than the first distance (e.g., farther from the surface), the representation of the virtual shadow includes a third intensity displayed with a third degree of coloring lesser (e.g., lighter) than the first degree of coloring, a second shape longer than the first shape, a third size larger than the first size, a third degree of transparency greater than the first degree of transparency, a third angle offset relative to the input device less than the first angle (e.g., rotated farther from the input device), a third offset less than the first offset (e.g., larger gap between the virtual shadow and the input device), and/or a third degree of blur greater than the first degree of blur (e.g., blurrier). Displaying a virtual shadow for the input device that changes in intensity based on a change in pose of the input device provides an indication of the relative position of the input device relative to the surface, a distance to the surface, and/or a distance to a target user interface element and enables the user to precisely place the input device, thereby reducing errors in the interaction between the input device and/or the surface (e.g., avoiding accidental marks made by the input device in the user interface) and reducing inputs needed to correct such errors.

In some embodiments, the first pose relative to the surface includes the input device having a first orientation relative to the surface, such as the orientation of input device 800 in section 876*a* in FIG. 8C, and the first visual appearance includes an intensity of the representation of the virtual shadow being a first intensity (e.g., as described in more detail with reference to step(s) 908), wherein the intensity of the representation of the virtual shadow is based on an orientation of the input device relative to the surface (910), such as the intensity of virtual shadow 832 in section 876*b* in FIG. 8C. The input device having the first orientation relative to the surface optionally includes a first tilt (or angle) relative to a normal (perpendicular) to the surface, as described in more detail later with reference to step(s) 914. In some embodiments, the electronic device detects a change in the tilt relative to the normal to the surface, and in response to the change in the tilt relative to the normal to the surface, the electronic device updates the representation of the virtual shadow, as described in more detail later with reference to step(s) 914. Displaying a virtual shadow for the input device that changes in intensity based on a change in orientation of the input device provides an indication of the tilt of the input device relative to the surface and enables the user to precisely place the input device, thereby reducing errors in the interaction between the input device and/or the surface (e.g., avoiding accidental marks made by the input device in the user interface) and reducing inputs needed to correct such errors.

In some embodiments, while displaying the representation of the virtual shadow corresponding to the input device with the input device having the first orientation relative to the surface, the electronic device detects (912*a*) movement of the input device from the first pose to a third pose, different from the first pose, relative to the surface, such as movement of the input device from section 876*a* in FIG. 8C to section 878*a* in FIG. 8C. For example, the third pose is within the threshold distance (e.g., 0, 0.01, 0.05, 0.1, 0.2, 0.5, 0.8, 1, 3, 5, 10, 30, 50 or 100 cm) of the surface.

In some embodiments, in response to detecting the movement of the input device from the first pose to the third pose relative to the surface and in accordance with a determination that the third pose includes the input device having a second orientation relative to the surface that is within a first range of orientations (e.g., within 1, 2, 3, 5, 10, 15, 20, 30, 35, 40, or 45, and/or between 0 and 45 degrees, 3 and 30 degrees or 5 and 20 degrees from the normal), (For example, the third pose includes a third tilt (e.g., 15 degrees from normal) that is less than a first tilt of the first pose (e.g., 45 degrees from normal) and the representation of the virtual shadow having the third visual appearance (e.g., degree of intensity) different from the first visual appearance (e.g., less intensity than the first visual appearance).) the electronic device displays (912*b*) the representation of the virtual shadow corresponding to the input device with a third visual appearance, different from the first visual appearance, wherein the third visual appearance includes the representation of the virtual shadow having a third intensity (e.g., as described in more detail with reference to step(s) 908) that varies based on the orientation of the input device within the first range of orientations relative to the surface, such as the intensity of virtual shadow 832 varying based on the orientation of input device 800 as it varies up to being within threshold angle 854 of normal 850 in FIGS. 8A-8C. For example, the intensity of the representation of the virtual shadow optionally gradually changes while the orientation of the input device relative to the surface is within the first range of orientations. For example, as the input device tilt decreases, the intensity of the virtual shadow also decreases. In some embodiments, as the tilt of the input device decreases from 20 degrees to 5 degrees from normal, the intensity of the representation of the virtual shadow gradually decreases. For example, when the orientation of the input device includes a tilt of 20 degrees from normal, the electronic device optionally displays the representation of the virtual shadow with decreased intensity (e.g., short shape, small, and/or blurry). As the tilt continues to decrease from 20 degrees to for example, 10 degrees from normal, the electronic device optionally displays the representation of the virtual shadow with even less intensity (e.g., shorter shape, smaller, and/or blurrier) than when the input device included a tilt of 20 degrees from normal. In some embodiments, the intensity of the representation of the virtual shadow decreases until reaching a second range of orientations, as described in more detail with reference to step(s) 912. Displaying a virtual shadow for the input device that gradually changes in intensity based on a change in orientation of the input device provides an indication of the tilt of the input device relative to the surface and enables the user to precisely place the input device, thereby reducing errors in the interaction between the input device and/or the surface (e.g., avoiding accidental marks made by the input device in the user interface) and reducing inputs needed to correct such errors.

In some embodiments, in response to detecting the movement of the input device from the first pose to the third pose relative to the surface and in accordance with a determination that the third pose includes the input device having a third orientation relative to the surface that is within a second range of orientations (e.g., within 0, 1, 2, 3, 5, 10, 15, 20, 30, 35, 40, or 45 degrees from the normal, or between 30 and 0 degrees from the normal, 20 and 0 degrees from the normal or 5 and 0 degrees from the normal), different from the first range of orientations, such as being within threshold angle 854 of normal 850 in FIGS. 8A-8C, the electronic device ceases (914) to display the representation of the virtual shadow corresponding to the input device, such as shown in section 858*b* in FIG. 8A and section 874*b* in FIG. 8C. For example, the intensity of the representation of the virtual shadow decreases until reaching the second range of orientations where the representation of the virtual shadow optionally fades away. In some embodiments, the second range of orientations is closer to the perpendicular than the first range of orientations. For example, when the third orientation of the input device includes zero tilt which is within the second range of orientations, the representation of the virtual shadow disappears (e.g., is not included) from the user interface. In some embodiments, while the orientation of the input device is within the second range of orientations, changes in orientation of the input device that remain in the second range of orientations do not cause changes in display in the user interface (e.g., aspects of the representation of the virtual shadow are not displayed). Ceasing the display of the virtual shadow when the input device is substantially perpendicular to the surface provides an indication that the input device is approximately perpendicular to the surface, thereby reducing errors in the interaction between the input device and/or the surface (e.g., avoiding accidental marks made by the input device in the user interface) and reducing inputs needed to correct such errors.

In some embodiments, the first pose relative to the surface includes the input device being in a first orientation relative to the surface, and the first visual appearance includes a shape of the representation of the virtual shadow being a first shape (916), such as the shape of virtual shadow 832 in section 860*b* in FIG. 8A. For example, the first orientation is perpendicular or approximately perpendicular to the surface (e.g., within 1, 3, 5, 10, 15, or 20 degrees of being perpendicular). The representation of the virtual shadow optionally includes the first shape when the input device is perpendicular or approximately perpendicular to the surface. In some embodiments, the electronic device optionally displays the representation of the virtual shadow having the first shape with less visibility (e.g., short shape and/or small) than a second shape of the representation of the virtual shadow when the input device is parallel or more or approximately parallel to the surface, as described in more detail later with reference to the step(s) 914. In some embodiments, the representation of the virtual shadow includes the second portion corresponding to the tip of the currently selected drawing implement for the input device without including the first portion corresponding to the barrel of the currently selected drawing implement for the input device. In some embodiments, a first respective portion of the first portion corresponding to the barrel of the currently selected drawing implement for the input device is included in the representation of the virtual shadow, but not a second respective portion of the first portion of the virtual shadow, when the first orientation of the input device is perpendicular or approximately perpendicular to the surface.

In some embodiments, the second pose relative to the surface includes the input device being in a second orientation relative to the surface, different from the first orientation, and the second visual appearance includes the shape of the representation of the virtual shadow being a second shape, different from the first shape (916), such as the shape of virtual shadow 832 in section 862*b* in FIG. 8A. For example, the first orientation is parallel or approximately parallel to the surface (e.g., within 1, 3, 5, 10, 15, or 20 degrees of being parallel). The representation of the virtual shadow optionally includes the second shape when the input device is parallel or approximately parallel to the surface. In some embodiments, the electronic device displays the representation of the virtual shadow having the second shape with more visibility than the representation of the virtual shadow having the first shape. For example, the second shape is optionally longer than the first shape and/or the second shape is optionally larger than the first shape. In some embodiments, a majority (or all) of the first portion corresponding to the barrel of the currently selected drawing implement for the input device is included in the representation of the virtual shadow when the first orientation of the input device is parallel or approximately parallel to the surface as compared to including only a portion of the first portion corresponding to the barrel of the currently selected drawing implement for the input device when the input device is perpendicular or approximately perpendicular to the surface. Displaying a virtual shadow for the input device that changes based on a change in orientation of the input device provides an indication of the orientation of the input device relative to the surface and enables the user to precisely place the input device, thereby reducing errors in the interaction between the input device and/or the surface (e.g., avoiding accidental marks made by the input device in the user interface) and reducing inputs needed to correct such errors.

In some embodiments, the first pose relative to the surface includes the input device being in a first orientation relative to the surface, and the first visual appearance includes an orientation of the representation of the virtual shadow being in a first respective orientation relative to the user interface (918), such as the orientation of virtual shadow 832 in section 860*b* in FIG. 8A. For example, at the first orientation, the barrel end of the input device (e.g., farthest from the tip of the input device) points in a direction towards an edge of the user interface (e.g., top edge, left edge, right edge, or left edge). In some embodiments, the electronic device displays the representation of the virtual shadow being in the respective orientation relative to the user interface (e.g., the end of the first portion corresponding to the barrel of the currently selected drawing implement for the input device pointing towards the top edge of the user interface as opposed to pointing towards the bottom edge, the right edge, or the left edge of the user interface) based on the detected orientation of the input device. In some embodiments, the tip of input device points in the direction towards an edge of the user interface (e.g., top edge, left edge, right edge, or left edge) and the electronic device displays the representation of the virtual shadow being in the respective orientation relative to the user interface (e.g., the end of the second portion corresponding to the tip of the currently selected drawing implement for the input device pointing towards the top edge of the user interface as opposed to pointing towards the bottom edge, the right edge, or the left edge of the user interface) based on the detected orientation of the input device.

In some embodiments, the second pose relative to the surface includes the input device being a in second orientation relative to the surface, different from the first orientation (For example, at the second orientation, the barrel end of the input device points in a direction towards a bottom edge of the user interface opposite (or different) from the first orientation pointing towards the top edge of the user interface.), and the second visual appearance includes the orientation of the representation of the virtual shadow being a second respective orientation, different from the first respective orientation, relative to the user interface (918),), such as the orientation of virtual shadow 832 in section 876*b* in FIG. 8C. For example, the user interface includes the representation of the virtual shadow being in the second respective orientation relative to the user interface (e.g., the end of the first portion corresponding to the barrel of the currently selected drawing implement for the input device pointing towards the bottom edge of the user interface as opposed to pointing towards the top edge, the right edge, or the left edge of the user interface). The representation of the virtual shadow being in the second respective orientation is optionally the opposite direction (or a different direction) from the first respective orientation of the representation of the virtual shadow in that the representation of the virtual shadow being in the first respective orientation optionally includes the end of the first portion corresponding to the barrel of the currently selected drawing implement for the input device as pointing towards the top edge of the user interface. In some embodiments, the tip of input device points in the direction towards the bottom edge of the user interface and the electronic device displays the representation of the virtual shadow being in the respective orientation relative to the user interface (e.g., the end of the second portion corresponding to the tip of the currently selected drawing implement for the input device pointing towards the bottom edge of the user interface as opposed to pointing towards the top edge, the right edge, or the left edge of the user interface). Displaying a virtual shadow for the input device that changes orientation based on a change in orientation of the input device provides an indication of whether the input device is pointing to a particular edge or boundary of the surface and enables the user to precisely place the input device, thereby reducing errors in the interaction between the input device and/or the surface (e.g., avoiding accidental marks made by the input device in the user interface) and reducing inputs needed to correct such errors.

In some embodiments, the user interface is a user interface of a drawing application (920), such as user interface 890 in FIG. 8L. For example, the representation of the virtual shadow is included in a user interface of a drawing application. The drawing application is optionally an application in which marking inputs received from the input device are displayed in a user interface in the form of marks on a drawing canvas. In some embodiments, the representation of the virtual shadow is included in user interfaces of various applications accessible by the electronic device, such as a word processing application, a photo management application, a spreadsheet application, a presentation application, a website creation application, an e-mail application, or other content creation application. In some embodiments, the virtual shadow is displayed by the electronic device in user interfaces of drawing applications (e.g., applications configured to receive drawing input from the input device) but not in other types of applications (e.g., applications that are not configured to receive drawing input from the input device, such as calendar applications, TV/movie browsing applications, digital wallet applications and/or map/navigation applications). In some embodiments, the virtual shadow is not displayed by the electronic device in system user interfaces (e.g., as described with reference to step(s) 922). Displaying a virtual shadow in a drawing application enables the user to precisely place the input device when providing drawing input, thereby reducing errors in the interaction between the input device and/or the surface (e.g., avoiding accidental marks made by the input device in the user interface) and reducing inputs needed to correct such errors.

In some embodiments, displaying the representation of the virtual shadow with the first visual appearance includes (922*a*), in accordance with a determination that a currently selected drawing implement for the input device is a first drawing implement, displaying the representation of the virtual shadow with a first shape corresponding to the first drawing implement (922*b*), such as the shape of virtual shadow 832 in FIG. 8N. For example, if the first drawing implement is a virtual pen (e.g., the input device is being used as a virtual pen), the first shape of the virtual shadow corresponds to a rounded bullet of the virtual pen. In another example, the second portion (of the representation of the virtual shadow with the first shape) corresponding to the tip of the currently selected drawing implement for the input device is optionally a rounded bullet (corresponding to the rounded bullet of the virtual pen).

In some embodiments, displaying the representation of the virtual shadow with the first visual appearance includes, in accordance with a determination that the currently selected drawing implement for the input device is a second drawing implement, different from the first drawing implement, displaying the representation of the virtual shadow with a second shape corresponding to the second drawing implement, wherein the second shape is different from the first shape (922*b*), such as the shape of virtual shadow 832 in FIG. 8O. For example, if the second drawing implement is a virtual highlighter, different from the virtual pen, the second shape of the virtual shadow corresponds to a flat chisel tip of the virtual pen which is different from the first shape of the virtual shadow corresponding to the rounded bullet tip. In another example, the second portion (of the representation of the virtual shadow with the second shape) corresponding to the tip of the currently selected drawing implement for the input device is optionally a flat chisel tip (corresponding to the flat chisel tip of the virtual highlighter). In some embodiments, the shape (and/or color) of the representation of the virtual shadow corresponds to the shape (and/or color) of the tip of the virtual drawing implement being emulated by the input device, as described in more detail later with reference to step(s) 920. In some embodiments, the first shape and/or second shape correspond to the shapes of the selectable representations of the corresponding tools that are displayed in a tools palette in the user interface (e.g., such as the tools palette described with reference to step(s) 934), where the tools palette is interactable to select the drawing implement for the input device. Presenting a virtual shadow changing based on the currently selected drawing implement indicates to the user the type and/or characteristics of the currently selected drawing implement before input for providing a mark on the user interface is detected, thereby reducing errors in the interaction between the input device and/or the surface (e.g., avoiding accidental marks made by the input device in the user interface) and reducing inputs needed to correct such errors.

In some embodiments, the electronic device displays (924*a*), via the display generation component, a second user interface, different from the user interface, wherein the second user interface is a system user interface of the electronic device, such as user interface 890 in FIG. 8E. For example, the second user interface is an interface accessible by the electronic device such as an application launch user interface with a plurality of application icons (e.g., selectable user interface objects), such as a home screen user interface as described with reference to FIG. 4A. In some embodiments, the second user interface is a system settings user interface from which one or more system settings for the electronic device (e.g., Wi-Fi settings, display settings, cellular settings and/or sound settings) can be changed. In some embodiments, the second user interface is not a user interface of an application that is installed on the electronic device, but is rather a user interface of an operating system of the electronic device.

In some embodiments, while displaying the second user interface, the electronic device detects (924*b*) the first pose of the input device relative to the surface, such as the pose of input device 800 in FIG. 8E. For example, the first pose of the input device is optionally horizontally oriented relative to the reference axis.

In some embodiments, in response to detecting the first pose of the input device relative to the surface, the electronic device displays (924*c*), via the display generation component, the second user interface including the representation of the virtual shadow corresponding to the input device, such as virtual shadow 832 in FIG. 8G, wherein the representation of the virtual shadow has a respective shape that is independent of (e.g., does not include or depend on) the currently selected drawing implement for the input device, such as the shape of virtual shadow 832 in FIG. 8G being independent of a currently selected drawing implement for input device 800. For example, although the representation of the virtual shadow corresponds to the shape (and/or color) of the tip of the currently selected drawing implement (e.g., flat chisel tip of the virtual highlighter) for the input device in the user interface of the drawing application, in some embodiments, the representation of the virtual shadow has a respective shape that is independent of the currently selected drawing implement for the input device in the system user interface. For example, while the user interface is the system user interface, the representation of the virtual shadow optionally has a shape corresponding to the physical shape of the input device (as opposed to the currently selected drawing implement, such as the virtual highlighter in the user interface of the drawing application). In some embodiments, while displaying the user interface (e.g., a user interface of a drawing application) and while displaying a representation of a virtual shadow for the input device that has a shape corresponding to the currently selected drawing implement (e.g., a highlighter tool), the electronic device detects an input to display the second user interface (e.g., a system user interface). In some embodiments, the input to display the second user interface is an input to display the system user interface overlaid on the user interface (e.g., a control center user interface from which one or more functionalities of the electronic device are controlled, such as Wi-Fi, display brightness and/or audio volume), or an input to replace display of the user interface with display of the system user interface (e.g., an input to navigate to a home screen user interface of the electronic device, such as in FIG. 4A). In some embodiments, in response to such an input to display the system user interface, the electronic device replaces display of the representation of the virtual shadow that is based on the currently selected drawing implement with the representation of the virtual shadow that has a shape that is independent of (e.g., does not include or depend on) the currently selected drawing implement. Similarly, in response to an input to display (or redisplay) the user interface (e.g., of the drawing application), the electronic device replaces display of the representation of the virtual shadow that has a shape that is independent of (e.g., does not include or depend on) the currently selected drawing implement with the representation of the virtual shadow that has a shape based on the currently selected drawing implement. Displaying the virtual shadow with a shape that is independent of a currently selected drawing implement when the user interface is a user interface other than a content creation user interface provides an indication that settings and/or characteristics of the currently selected drawing implement are not applicable in the present user interface, thereby reducing errors in the interaction between the input device and/or the surface (e.g., avoiding accidental marks made by the input device in the user interface) and reducing inputs needed to correct such errors.

In some embodiments, the user interface is a system user interface of the electronic device (926), such as user interface 890 in FIG. 8D. Example system user interfaces are described in more detail with reference to step(s) 922. Displaying a virtual shadow in a system user interface enables the user to precisely place the input device, thereby reducing errors in the interaction between the input device and/or the surface (e.g., avoiding accidental marks made by the input device in the user interface) and reducing inputs needed to correct such errors.

In some embodiments, the user interface is a user interface of an application installed on the electronic device (928), such as user interface 890 in FIG. 8L. For example, the representation of the virtual shadow is included in a user interface without a drawing canvas element or content drafting layout element (e.g., virtual counterpart of a canvas pad, drawing pad, and/or content board). For example, the user interface is optionally a user interface of an email application, a web browser application, or a banking application. Displaying a virtual shadow in a user interface of an application installed on the electronic device enables the user to precisely place the input device, thereby reducing errors in the interaction between the input device and/or the surface (e.g., avoiding accidental marks made by the input device in the user interface) and reducing inputs needed to correct such errors.

In some embodiments, the representation of the virtual shadow corresponding to the input device comprises an indication of a color of a currently selected drawing implement for the input device (930), such as portion 832*b* of virtual shadow 832 in FIG. 8M indicating a color of the currently selected highlighter tool for input device 800. For example, if the currently selected drawing implement for the input device is a virtual yellow highlighter (e.g., the input device is being used as a virtual yellow highlighter), the representation of the virtual shadow optionally includes an indication of a yellow rectangle (corresponding to the yellow flat chisel tip of the virtual highlighter). In some embodiments, the color is indicated at the tip portion of the virtual shadow (e.g., the color of the tip portion of the shadow is or corresponds to the color) and not the second portion corresponding to the barrel. In some embodiments, the color is indicated in both the tip portion and the barrel portion of the virtual shadow (e.g., both portions of the virtual shadow are presented having the color of the currently selected drawing implement). In some embodiments, the electronic device detects a change in the color of the currently selected drawing implement (e.g., in response to detecting an input to change the color of the drawing implement), and in response to the color change, the electronic device changes the color of the virtual shadow to correspond with the color change. For example, in some embodiments, in accordance with a determination that the color of the currently selected drawing implement is a first color, the representation of the virtual shadow corresponding to the input device comprises an indication of the first color (e.g., a tip of the virtual shadow has the first color), and in accordance with a determination that the color of the currently selected drawing implement is a second color that is different from the first color, the representation of the virtual shadow corresponding to the input device comprises an indication of the second color (e.g., a tip of the virtual shadow has the second color). Presenting a virtual shadow having an indication of the currently selected color of the virtual drawing implement indicates to the user the type and/or characteristics including color of the virtual drawing implement before input for providing a mark on the user interface, thereby reducing errors in the interaction between the input device and/or the surface (e.g., avoiding accidental marks made by the input device in the user interface) and reducing inputs needed to correct such errors.

In some embodiments, while a currently selected drawing implement for the input device is a first drawing implement, the electronic device detects (932*a*) an indication of a gesture being detected on the input device, such as input 816 in FIG. 8N. For example, the gesture detected on the input device includes a tap or double tap on the surface of the input device (e.g., as opposed to a tap of the input device on the surface associated with the user interface). In some embodiments, the gesture detected on the input device has one or more of the characteristics of the gesture(s) detected on the input device described with reference to method 1100.

In some embodiments, in response to detecting the indication of the gesture being detected on the input device, in accordance with a determination that the gesture satisfies one or more criteria (e.g., the one or more criteria include a criterion that is satisfied when a double tap is detected on the input device), the electronic device changes (932*b*) the currently selected drawing implement for the input device to be a second drawing implement, different from the first drawing implement, such as changing the currently selected drawing implement from the highlighter tool 810 to the pen tool 818 in FIG. 8O. In some embodiments, the currently selected drawing implement being emulated by the input device changes in response to detecting the double tap gesture on the input device. For example, the first drawing implement is a virtual pen and in response to the detecting the indication of the gesture corresponding to the double tap gesture on the input device, the first drawing implement changes to a second drawing implement, which is a virtual brush. In some embodiments, in response to detecting the double tap gesture, the electronic device changes one or more characteristics of the currently selected drawing implement. The one or more characteristics include color, tip mark weight, and/or tip mark opacity. Changing the virtual drawing implement tool in response to detecting a tap gesture on the input device improves the interaction between the input device and/or the user interface and reduces inputs needed to change the virtual drawing implement.

In some embodiments, while a currently selected drawing implement for the input device is a first drawing implement and while displaying the representation of the virtual shadow having a third visual appearance corresponding to the first drawing implement, the electronic device detects (934*a*) an indication of an input for changing one or more characteristics of the currently selected drawing implement, such as input 816 in FIG. 8N or an input to change the line thickness of the currently selected drawing implement from FIGS. 8P to 8Q. For example, the input is optionally a gesture detected on the input device includes a tap or double tap on the surface of the input device (e.g., as opposed to a tap of the input device on the surface associated with the user interface). In some embodiments, the gesture detected on the input device has one or more of the characteristics of the gesture(s) detected on the input device described with reference to method 1100. In some embodiments, the input is an input to change a color of the currently-selected drawing implement, such as an input detected on the input device or an input detected on the surface, such as interaction (e.g., via the input device or a finger) with an input device control palette that includes one or more selectable options that are selectable to change the color of the currently selected drawing implement.

In some embodiments, the representation of the virtual shadow having the third visual appearance corresponding to the first drawing implement includes a rounded bullet tip (corresponding to the rounded bullet of the virtual pen). In another example, the second portion of the representation of the virtual shadow corresponding to the tip of the first drawing implement for the input device is the rounded bullet tip (corresponding to the rounded bullet tip of the virtual pen). More generally, in some embodiments, the electronic device displays the virtual shadow with an appearance and/or shape corresponding to the first drawing implement, optionally including an indication of the currently selected color for the drawing implement, as previously described with reference to step(s) 920, 928 and 930.

In some embodiments, in response to detecting the indication of the input for changing one or more characteristics of the currently selected drawing implement, the electronic device changes (934*b*) the one or more characteristics of the currently selected drawing implement in accordance with the indication of the input and displaying the representation of the virtual shadow having a fourth visual appearance corresponding to the changed currently selected drawing implement (e.g., a second drawing implement, different from the first drawing implement, and/or the first drawing implement having a different color), wherein the fourth visual appearance is different from the third visual appearance, such as the change in the visual appearance of virtual shadow 832 from FIG. 8M to FIG. 8N or from FIG. 8P to 8Q. For example, the second drawing implement is a virtual highlighter, different from the virtual pen, and the second shape of the virtual shadow corresponds to a flat chisel tip of the virtual pen which is different from the first shape of the virtual shadow corresponding to the rounded bullet tip. In another example, the second portion (of the representation of the virtual shadow with the second shape) corresponding to the tip of the currently selected drawing implement for the input device is a flat chisel tip (corresponding to the flat chisel tip of the virtual highlighter). In some embodiments, the shape (and/or color) of the representation of the virtual shadow corresponds to the shape (and/or color) of the tip of the virtual drawing implement currently being emulated by the input device. In some embodiments, in addition to displaying feedback in the form of the virtual shadow corresponding to the input device, the electronic device concurrently displays feedback about the currently selected drawing implement in a palette user interface element displayed in the user interface (and optionally updates the palette user interface element as the drawing implement and/or characteristics of the drawing implement change), where the palette user interface element optionally includes one or more of an indication of the currently selected drawing implement, an indication of a color setting for the currently selected drawing implement, an indication of an opacity setting for the currently selected drawing implement and/or an indication of a line thickness setting for the currently selected drawing implement. Presenting a virtual shadow changing based on the currently selected drawing implement indicates to the type and/or characteristics of the currently selected drawing implement before input for providing a mark on the user interface is detected, thereby reducing errors in the interaction between the input device and/or the surface (e.g., avoiding accidental marks made by the input device in the user interface) and reducing inputs needed to correct such errors.

In some embodiments, in response to detecting the indication of the gesture being detected on the input device (936*a*) (e.g., the gesture detected on the input device includes a tap on the input device), in accordance with the determination that the gesture satisfies the one or more criteria, including a criterion that is satisfied when the input device is within the threshold distance (e.g., 0, 0.01, 0.05, 0.1, 0.2, 0.5, 0.8, 1, 3, 5, 10, 30, 50 or 100 cm) of the surface, the electronic device displays (936*b*) an indication of a change in the currently selected drawing implement at a location in the user interface that is based on a location of the input device, such as displaying portion 832*b* of virtual shadow 832 in FIGS. 8N and 8O that indicates the change in the currently selected drawing implement and is displayed at a location in the user interface 890 based on the location of input device 800. For example, the indication of the change from the currently selected drawing implement (e.g., virtual pen) to another drawing implement (e.g., virtual highlighter) being emulated by the input device is displayed at a location where the representation of the virtual shadow appears, which is optionally displayed at a location in the user interface based on the location of the input device relative to the surface. For example, the second portion (of the representation of the virtual shadow) corresponding to the tip of the currently selected drawing implement for the input device is the rounded bullet (corresponding to the rounded bullet tip of the virtual pen), and in response to the change to the virtual highlighter, the electronic device optionally changes the second portion corresponding to the tip of the currently selected drawing implement from the rounded bullet (corresponding to the rounded bullet tip of the virtual pen) to the flat chisel tip (corresponding to the flat chisel tip of the virtual highlighter) when the input device is within the threshold distance of the surface. In some embodiments, the indication of the change includes a graphical image or text description of the currently selected drawing implement. In some embodiments, the indication of the change is displayed near or above the tip of the virtual shadow.

In some embodiments, in response to detecting the indication of the gesture being detected on the input device (936*a*) (e.g., the gesture detected on the input device includes a tap on the input device), in accordance with a determination that the gesture does not satisfy the one or more criteria (e.g., the input device is outside the threshold distance of the surface), the electronic device displays (936*c*) the indication of the change in the currently selected drawing implement at a location in the user interface that is not based on the location of the input device, such as displaying the change in color of the currently selected drawing implement in indicator 814 from FIGS. 8R to 8S. In some embodiments, when the input device is outside the threshold distance of the surface, the representation of the virtual shadow disappears (is not included) from the user interface, and as such, the second portion corresponding to the tip of the currently selected drawing implement for the input device does not visually change. In some embodiments, when the input device moves within the threshold distance of the surface, the electronic device displays the changed second portion corresponding to the flat chisel tip of the virtual highlighter. In some embodiments, because the representation of the virtual shadow is not displayed in the user interface when the input device is outside the threshold distance of the surface, the electronic device displays the change from the rounded bullet (corresponding to the rounded bullet tip of the virtual pen) to the flat chisel tip (corresponding to the flat chisel tip of the virtual highlighter) as a visual indication on a content entry user interface element (e.g., palette) in the user interface, and the content entry user interface element includes options for selecting the drawing implement and/or controlling the one or more characteristics of the drawing implement. In some embodiments, the content entry user interface element is displayed anchored to an edge (e.g., top, bottom, right or left) of the user interface, and is not displayed at a location that is based on the current hover location of the input device over the surface. Providing the embodiment where the user easily changes the virtual drawing implement tool by performing a tap gesture on the input device improves the interaction between the input device and/or the user interface and reduces inputs needed to change the virtual drawing implement.

In some embodiments, the electronic device detects (938*a*) an indication of a gesture being detected on the input device, such as a gesture detected on input device 800 in FIG. 8O. For example, the gesture detected on the input device includes a tap on the input device, as described with reference to step(s) 930.

In some embodiments, in response to detecting the indication of the gesture being detected on the input device, in accordance with a determination that the gesture satisfies one or more criteria (e.g., the one or more criteria include a criterion that is satisfied when a double tap is detected on the input device), the electronic device displays (938*b*) a content entry user interface element at a location in the user interface that is based on a location of the input device, such as element 840 in FIG. 8P, wherein the content entry user interface element includes one or more selectable options for changing one or more drawing settings for the input device, such as the options in element 840 for changing line thickness in FIG. 8P. In some embodiments, the user interface includes the content entry user interface element at a location on or near a location where the representation of the virtual shadow appears (e.g., adjacent to the tip of the virtual shadow of the input device). For example, the content entry user interface element is displayed at or near the second portion corresponding to the tip of the currently selected drawing implement for the input device. In some embodiments, the one or more selectable options are selectable for adjusting drawing implement color, tip mark weight, and/or tip mark opacity. Displaying visual indications related to the virtual drawing implement at the location near the virtual shadow tip provides an efficient way of controlling the type and/or characteristics of the drawing implement, thereby reducing errors in the interaction between the input device and/or the surface (e.g., avoiding accidental marks made by the input device in the user interface) and reducing inputs needed to correct such errors.

In some embodiments, the user interface includes a text entry region (940*a*), such as the region including text 812 in FIG. 8V. The text entry region is optionally a user interface element for receiving text (e.g., a text entry field), such as from virtual keyboard displayed by the electronic device and/or such as handwritten input from the input device, such as described in more detail with reference to method 1300.

In some embodiments, the first pose includes the input device positioned at a location in the user interface outside of the text entry region (940*b*), such as the position of input device 800 in FIG. 8V. For example, the first pose of the input device outside the text entry region is optionally considered to be an intent not to engage with (e.g., enter text into) the text entry region. In some embodiments, the electronic device detects the first pose of the input device at a location of the surface that corresponds to a respective location in the user interface outside the text entry region. For example, the tip of the input device is at a location relative to the surface that corresponds to a location outside of the text entry region.

In some embodiments, the first visual appearance includes the representation of the virtual shadow of the input device including a first portion, the first portion having a visual appearance corresponding to a tip of a currently selected drawing implement (940*c*), such as virtual shadow 832 for input device 800 in FIG. 8Q. In some embodiments, at the first pose, the input device emulates the currently selected drawing implement. For example, the user interface optionally includes the first portion of the representation of the virtual shadow corresponding to the tip of the currently selected drawing implement, as described with reference to step(s) 904 and 920.

In some embodiments, the second pose includes the input device positioned at a location in the user interface within the text entry region (940*d*), such as the position of input device 800 in FIG. 8X. For example, the second pose of the input device within the text entry region is optionally considered to be an intent to engage within (e.g., enter text into) the text entry region. In some embodiments, the electronic device detects the second pose of the input device at a location of the surface that corresponds to a respective location in the user interface within the text entry region. For example, the tip of the input device is at a location relative to the surface that corresponds to a location within the text entry region.

In some embodiments, the second visual appearance includes the first portion of the representation of the virtual shadow having a visual appearance corresponding to a text insertion cursor, such as portion 832*b* in FIG. 8X, different from the visual appearance corresponding to the currently selected drawing implement (940*e*). In some embodiments, at the second pose, the electronic device changes the first portion of the representation of the virtual shadow from a tip corresponding to the tip of the currently selected drawing implement to the text insertion cursor. In response to detecting the tip of input device touchdown on the surface, the electronic device optionally places the text insertion cursor in the text entry region, and subsequent text input detected by the electronic device (e.g., via a virtual keyboard displayed by the electronic device) is optionally displayed in the text entry region at the position of the text insertion cursor. Changing the virtual shadow to a text insertion cursor when it is detected that the input device is detected at a location that corresponds to a respective location of the text entry region in the user interface indicates that the input device is positioned at a location corresponding to text input, indicates that the input device will interact with the surface and/or user interface without generating marks in the user interface, and improves the interaction between the input device and/or the user interface and reduces inputs needed to correct errors.

In some embodiments, the user interface includes a first selectable user interface object (942*a*), such as option 822 in FIG. 8T. The first selectable user interface object is optionally selectable to perform an action to launch an application or perform another function corresponding to the first selectable user interface object.

In some embodiments, the first pose includes the input device positioned at a location in the user interface outside a respective threshold distance of the first selectable user interface object (942*b*), such as the position of input device 800 in FIG. 8S. For example, the first pose of the input device outside the threshold distance such as 0.01, 0.03, 0.05, 0.1, 0.2, 0.3, 1, 3, or 5 cm of the first selectable user interface object is optionally considered to be an intent not to engage with (e.g., select) the first user interface object. In some embodiments, the electronic device detects the first pose of the input device at a location of the surface that corresponds to a respective location outside the respective threshold distance of the first selectable user interface object. For example, the tip of the input device is at a location relative to the surface that corresponds to a location outside the respective threshold distance of the first selectable user interface object.

In some embodiments, the first visual appearance includes the representation of the virtual shadow of the input device including a first portion, the first portion having a visual appearance corresponding to a tip of a currently selected drawing implement for the input device (942*c*), such as virtual shadow 832 for input device 800 in FIG. 8O. In some embodiments, at the first pose, the input device emulates the currently selected drawing implement. For example, the user interface optionally includes the first portion of the representation of the virtual shadow corresponding to the tip of the currently selected drawing implement, as described with reference to step(s) 904 and 920.

In some embodiments, the second pose includes the input device positioned at a location in the user interface within the respective threshold distance of the first selectable user interface object (942*d*), such as the position of input device 800 in FIG. 8T. For example, the second pose of the input device within the threshold distance of the first selectable user interface object is optionally considered to be an intent to engage with (e.g., select) the first selectable user interface object. In some embodiments, the electronic device detects the second pose of the input device at a location of the surface that corresponds to a respective location within the respective threshold distance of the first selectable user interface object. For example, the tip of the input device is at a location relative to the surface that corresponds to a location within the respective threshold distance of the first selectable user interface object.

In some embodiments, the second visual appearance includes the first portion of the representation of the virtual shadow having a visual appearance corresponding to a selection indicator for the first selectable user interface object, such as portion 832*b* in FIG. 8T, different from the visual appearance corresponding to the tip of the currently selected drawing implement (942*e*). In some embodiments, at the second pose, the electronic device changes the first portion of the representation of the virtual shadow from a tip corresponding to the tip of the currently selected drawing implement to the selection indicator for the first selectable user interface object. In response to detecting the tip of input device touchdown on the surface, the electronic device optionally causes selection of the first selectable user interface object and/or performance of the function corresponding to the first selectable user interface object. Changing the virtual shadow to a selection indicator when it is detected the input device is at a location that corresponds to a respective location of the selectable user interface object in the user interface indicates that the input device is positioned at a location corresponding to selectable user interface object, and improves the interaction between the input device and/or the user interface and reduces inputs needed to correct errors.

In some embodiments, the selection indicator has a predefined shape that is not based on a shape of the first selectable user interface object (944), such as portion 832*b* in FIG. 8G. The selection indicator is optionally displayed having a predefined shape and does not change in shape to conform to a shape of the first selectable user interface object. For example, the selection indicator is not resized to encompass, enclose, and/or highlight the first selectable user interface object. In some embodiments, the selection indicator is a circle, a square, a rectangle or a pointer shape that does not depend on the shape of the first user interface object. Displaying the selection indicator with a predefined shape provides an indication to the user that the user interface object is selectable, thereby improving the interaction between the input device and/or the user interface and reduces inputs needed to correct errors.

In some embodiments, the selection indicator has a shape that is based on a shape of the first selectable user interface object (946), such as portion 832*b* in FIG. 8T. The selection indicator is optionally displayed having a dynamic shape that changes to conform to a shape of the first selectable user interface object. For example, the selection indicator is optionally resized to encompass, enclose, and/or highlight the first selectable user interface object. For example, if the first selectable user interface object has a square shape, the selection indicator optionally has a square shape (e.g., 1, 3, 5, 10 or 20% larger than the first selectable user interface object), and is displayed overlaid on or behind the first selectable user interface object. If the first selectable user interface object has a circular shape, the selection indicator optionally has a circular shape (e.g., 1, 3, 5, 10 or 20% larger than the first selectable user interface object), and is displayed overlaid on or behind the first selectable user interface object. In some embodiments, the size of the selection indicator is larger or smaller, respectively, based on the size of the selectable user interface object. Thus, in some embodiments, the shape and/or size of the selection indicator changes depending on what selectable user interface object the input device is interacting with. Displaying the selection indicator with a dynamic shape based on the user interface object provides an indication to the user that the user interface object is selectable, thereby improving the interaction between the input device and/or the user interface and reduces inputs needed to correct errors.

In some embodiments, while displaying the representation of the virtual shadow corresponding to the input device in the first pose relative to the surface, and the first pose includes the input device not being in contact with the surface, such as the position of input device 800 in FIG. 8T, the electronic device detects (948*a*) movement of the input device from the first pose to a third pose, different from the first pose, relative to the surface, such as the movement of input device 800 from FIG. 8T to 8U. For example, the third pose of the input device includes the tip of the input device making contact with the surface.

In some embodiments, in response to detecting the movement of the input device from the first pose to the third pose relative to the surface and in accordance with a determination that the third pose relative to the surface includes the input device being in contact with the surface (e.g., the tip of the input device being in contact with the surface), the electronic device continues (948*b*) to display the representation of the virtual shadow corresponding to the input device, such as continuing to display virtual shadow 832 in FIG. 8U. In some embodiments, when the input device is in contact with the surface, the electronic device continues to display the representation of the virtual shadow at a location based on the pose of the input device relative to the surface. In some embodiments, as the electronic device determines continuous contact of the input device with the surface and the electronic device determines changes to the pose of the input device (e.g., position and/or orientation relative to the surface), the electronic device changes the representation of the virtual shadow in accordance with the changes in one or more of the ways described herein with respect to changes of pose of the input device relative to the surface. Displaying a virtual shadow when the input device is in contact with the surface enables the user to precisely place the input device on the surface, thereby reducing errors in the interaction between the input device and/or the surface (e.g., avoiding accidental marks made by the input device in the user interface) and reducing inputs needed to correct such errors.

In some embodiments, the first pose relative to the surface includes the input device being greater than a second threshold distance from the surface (950*a*) (e.g., 0, 0.01, 0.03, 0.05, 0.1, 0.2, 0.3, 1, 3, 5, 10, 25, 50 or 100 cm). For example, the input device is relatively far from the surface, but still within the threshold distance (e.g., 0, 0.01, 0.05, 0.1, 0.2, 0.5, 0.8, 1, 3, 5, 10, 30, 50 or 100 cm) of the surface, required for display of the virtual shadow in the user interface, such as the position of input device 800 in FIG. 8L.

In some embodiments, displaying the representation of the virtual shadow having the first visual appearance includes displaying the representation of the virtual shadow having a first portion corresponding to a barrel of the input device without including a second portion corresponding to a tip of the input device (950*b*), such as the display of virtual shadow 832 in FIG. 8L. For example, if the input device is relatively far from the surface, but remains within the threshold distance of the surface, the second portion of the representation of the virtual shadow corresponding to the tip of the currently selected drawing implement is not included in the representation of the virtual shadow. In some embodiments, the second portion of the representation of the virtual shadow corresponding to the tip of the currently selected drawing implement becomes increasingly less intense as the input device moves away from the surface.

In some embodiments, the second pose relative to the surface includes the input device being less than the second threshold distance from the surface (950*c*), such as the position of input device 800 in FIG. 8M. For example, the input device is relatively close to the surface, less than the second threshold distance from the surface.

In some embodiments, displaying the representation of the virtual shadow having the second visual appearance includes displaying the representation of the virtual shadow having the first portion corresponding to the barrel of the input device and the second portion corresponding to the tip of the input device (950*d*), such as virtual shadow 832 in FIG. 8M including portion 832*a* and portion 832*b*. For example, if the input device is relatively close to the surface, the representation of the virtual shadow includes the first portion corresponding to the barrel of the currently selected drawing implement and the second portion corresponding to the tip of the currently selected drawing implement. In some embodiments, the second portion of the representation of the virtual shadow corresponding to the tip of the currently selected drawing implement because increasingly intense as the input device moves closer to the surface (e.g., is initially displayed when the input device reaches the second threshold distance, and increases in intensity as the input device becomes increasingly close to the surface). Presenting a virtual shadow having two distinct portions that appear at different distances indicate the distance of the input device from the surface, thereby reducing errors in the interaction between the input device and/or the surface (e.g., avoiding accidental marks made by the input device in the user interface) and reducing inputs needed to correct such errors.

In some embodiments, the first pose relative to the surface includes the input device being greater than a second threshold distance from the surface (952*a*) (e.g., 0, 0.01, 0.03, 0.05, 0.1, 0.2, 0.3, 1, 3, 5, 10, 25, 50 or 100 cm), such as the position of input device 800 in FIG. 8L. For example, the input device is relatively far from the surface, but still within the threshold distance required for display of the virtual shadow in the user interface.

In some embodiments, displaying the representation of the virtual shadow having the first visual appearance includes displaying the representation of the virtual shadow having a first portion corresponding to a tip of the input device without including a second portion corresponding to a barrel of the input device (952*b*), such as if the virtual shadow 832 of input device 800 in FIG. 8L included portion 832*b* (corresponding to the tip) but did not include portion 832*a* (corresponding to the barrel). For example, if the input device is relatively far from the surface, but remains within the threshold distance of the surface, the second portion of the representation of the virtual shadow corresponding to the barrel of the currently selected drawing implement is not included in the representation of the virtual shadow. In some embodiments, the second portion of the representation of the virtual shadow corresponding to the barrel of the currently selected drawing implement because increasingly less intense as the input device moves away from the surface.

In some embodiments, the second pose relative to the surface includes the input device being less than the second threshold distance from the surface (952*c*), such as the position of input device 800 in FIG. 8M. For example, the input device is relatively close to the surface, less than the second threshold distance from the surface.

In some embodiments, displaying the representation of the virtual shadow having the second visual appearance includes displaying the representation of the virtual shadow having the first portion corresponding to the tip of the input device and the second portion corresponding to the barrel of the input device (952*d*), such as virtual shadow 832 in FIG. 8M including portion 832*a* and portion 832*b*. For example, if the input device is relatively close to the surface, the representation of the virtual shadow includes the first portion corresponding to the tip of the currently selected drawing implement and the second portion corresponding to the barrel of the currently selected drawing implement. Presenting a virtual shadow having two distinct portions that appear at different distances indicates the distance of the input device from the surface, thereby reducing errors in the interaction between the input device and/or the surface (e.g., avoiding accidental marks made by the input device in the user interface) and reducing inputs needed to correct such errors.

In some embodiments, displaying the representation of the virtual shadow having the first visual appearance includes displaying the representation of the virtual shadow having a first portion corresponding to a barrel of the input device and a second portion corresponding to a tip of the input device independent of a distance of the input device from the surface while the input device is within the threshold distance of the surface (954), such as if the virtual shadow 832 for input device 800 in FIG. 8L included portion 832*a* and portion 832*b*. For example, displaying the representation of the virtual shadow having the first portion corresponding to the barrel of the input device and the second portion corresponding to the tip of the input device depends on the pose of the input device being within the threshold distance of the surface, but is independent of the distance of the input device from the surface as long as the distance remains within the threshold distance. Displaying a consistent presentation of the virtual shadow when the virtual shadow is displayed reduces inconsistent feedback given to the user, thereby reducing errors in the interaction between the input device and/or the surface (e.g., avoiding accidental marks made by the input device in the user interface) and reducing inputs needed to correct such errors.

In some embodiments, the second portion of the representation of the virtual shadow includes one or more indicators of a color of a currently selected drawing implement for the input device, or a weight of the currently selected drawing implement for the input device (956), such as portion 832*b* in FIG. 8O indicating a color and weight of the currently selected drawing implement. For example, if the currently selected drawing implement is a virtual black brush with a thick brush tip, the second portion corresponding to the tip of the input device optionally includes one or more visual indicators comprising thick black bristles, which would optionally result in a heavy weight brushstroke in response to the input device providing a marking input. In another example, if the currently selected drawing implement is a virtual red brush with a thin brush tip, the second portion corresponding to the tip of the input device optionally includes one or more visual indicators comprising thin red bristles, which would optionally result in a thin weight brushstroke in response to the input device providing a marking input.

Presenting a virtual shadow having a portion corresponding to the tip of the currently selected drawing implement wherein the portion indicates one or more characteristics of the currently selected drawing implement such as color and/or line weight indicates such characteristics to the user before marking input is directed to the user interface, thereby reducing errors in the interaction between the input device and/or the surface (e.g., avoiding accidental marks made by the input device in the user interface) and reducing inputs needed to correct such errors.

In some embodiments, the user interface includes a content alignment user interface element (958*a*), such as element 842 and/or 842*a* in FIG. 8AA. The content alignment user interface element is optionally a virtual ruler tool, a grid user interface element, or other precise smart snapping guide comprising one or more text alignment, spacing, and resizing user interface elements used to position content precisely and/or properly with respect to geometry in the user interface.

In some embodiments, the representation of the virtual shadow corresponding to the input device includes a first portion corresponding to a barrel of a currently selected drawing implement for the input device, and a second portion corresponding to a tip of the currently selected drawing implement (958*b*), such as shown in virtual shadow 832 in FIG. 8AB. For example, if the first drawing implement is a virtual pen (e.g., the input device is being used as a virtual pen), the first shape of the virtual shadow corresponds to a rounded bullet of the virtual pen. In another example, the second portion (of the representation of the virtual shadow with the first shape) corresponding to the tip of the currently selected drawing implement for the input device is a rounded bullet (corresponding to the rounded bullet of the virtual pen), as described with reference to step(s) 920.

In some embodiments, in response to detecting the movement of the input device from the first pose to the second pose relative to the surface (958*c*) (e.g., in some embodiments, transitioning from the first pose to the second pose includes changing the distance of the input device from the surface, the position of the input device relative to the surface and/or the orientation of the input device relative to the surface), such as movement of input device 800 from FIG. 8AB to FIG. 8AD or 8AE, in accordance with a determination that the second pose includes the input device positioned at a location corresponding to a first respective location in the user interface that is within a second threshold distance (e.g., 0.01, 0.03, 0.05, 0.1, 0.2, 0.3, 1, 3, or 5 cm) of the content alignment user interface element (e.g., the tip of the input device is at a location relative to the surface that corresponds to a location within the second threshold distance of the content alignment user interface element), the electronic device displays (958*d*) the first portion of the representation of the virtual shadow at a first location in the user interface based on the location of the input device and the second portion of the representation of the virtual shadow at a location of the content alignment user interface element in the user interface, such as snapping portion 832*b* to content alignment element 842*a* in FIG. 8AE while the remainder of shadow 832 is displayed at a position corresponding to input device 800. For example, if the input device is relatively close to the content alignment user interface element, the representation of the virtual shadow includes the first portion corresponding to the barrel of the currently selected drawing implement at a location based on the input device (e.g., near the location of the input device) and the second portion of the representation of the virtual shadow automatically snaps (e.g., automatically relocates) to a location of the content alignment user interface element (e.g., at a location nearest a preset snap point (or marker) of the virtual ruler tool or corner point of the grid user interface element), such that the first and second portions of the virtual shadow optionally become visually disconnected from each other. In some embodiments, the electronic device detects the second pose of the input device at a location of the surface that corresponds to a respective location within the second threshold distance of the content alignment user interface element. In some such embodiments, the representation of the virtual shadow includes the first portion corresponding to the barrel of the currently selected drawing implement located at a respective location that corresponds to the respective location of the input device in the surface, and the second portion corresponding to the tip of the currently selected drawing implement is located at the location of the content alignment user interface element in the user interface. In some embodiments, in response to detecting contact of the tip of the input device on the surface while the second portion of the virtual shadow is located at the content alignment user interface element, even if the tip of the input device is not actually at a location corresponding to the content alignment user interface element, causes the electronic device to direct subsequent input from the input device (e.g., movement of the input device while the tip of the input device remains in contact with the surface) to the content alignment user interface element (e.g., manipulating the content alignment user interface element in accordance with the movement of the input device, such as based on the direction and/or magnitude of the movement of the input device).

In some embodiments, in accordance with a determination that the second pose includes the input device positioned at a location corresponding to a second respective location in the user interface outside the second threshold distance of the content alignment user interface element (e.g., the tip of the input device is at a location relative to the surface that corresponds to a location outside the second threshold distance of the content alignment user interface element), such as the position of input device 800 in FIG. 8AD, the electronic device displays (958*e*) the first portion of the representation of the virtual shadow at the first location in the user interface and the second portion of the representation of the virtual shadow at the second respective location in the user interface based on the location of the input device, such as displaying portion 832*b* and the remainder of shadow 832 at a position corresponding to input device 800 in FIG. 8AD. For example, if the input device is relatively far from the content alignment user interface element, the representation of the virtual shadow includes the first portion corresponding to the barrel of the currently selected drawing implement at a location based on the input device (e.g., near the location of the input device) and the second portion of the representation of the virtual shadow at a location based on the input device (e.g., near the location of the tip of the input device), and the first and second portions of the virtual shadow are optionally not visually disconnected from each other. In some embodiments, the electronic device detects the second pose of the input device at a location of the surface that corresponds to a respective location outside the second threshold distance of the content alignment user interface element. In some such embodiments, the representation of the virtual shadow includes the first portion corresponding to the barrel of the currently selected drawing implement located at a respective location that corresponds to the respective location of the input device in the surface, and the second portion corresponding to the tip of the currently selected drawing implement located at a respective location that corresponds to the respective location of the input device in the surface. In some embodiments, in response to detecting contact of the tip of the input device on the surface while the second portion of the virtual shadow is located at the location corresponding to the input device causes the electronic device to direct subsequent input from the input device (e.g., movement of the input device while the tip of the input device remains in contact with the surface) to the user interface and not to the content alignment user interface element (e.g., receiving handwritten input directed to the user interface). Snapping the virtual shadow to a respective location of the content alignment user interface element in the user interface simplifies interaction with the content alignment user interface element, improves the interaction between the input device and/or the user interface and reduces inputs needed to correct errors.

It should be understood that the particular order in which the operations in FIGS. 9A-9K have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, and 1300) are also applicable in an analogous manner to method 900 described above with respect to FIGS. 9A-9K. For example, the interactions between the input device and the surface, the response(s) of the electronic device, the virtual shadow of the input device, and/or the inputs detected by the electronic device and/or detected by the input device optionally have one or more of the characteristics of the interactions between the input device and the surface, the response(s) of the electronic device, the virtual shadow of the input device, and/or the inputs detected by the electronic device and/or detected by the input device described herein with reference to other methods described herein (e.g., methods 700, 1100, and 1300). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 9A-9K are, optionally, implemented by components depicted in FIGS. 1A-1B. For example, displaying operations 902*a*, 902*c* and 902*e* and detecting operations 902*b* and 902*d* are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Hover Control Palette

Users interact with electronic devices in many different manners, including peripheral devices in communication with such devices. In some embodiments, an electronic device receives indications of a peripheral device proximate to, but not contacting a surface, such as a touch-sensitive surface in communication with the electronic device. The embodiments described herein provide ways in which the electronic device responds to such indications by, for example, initiating operations to modify display of content, thus enhancing interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10B:
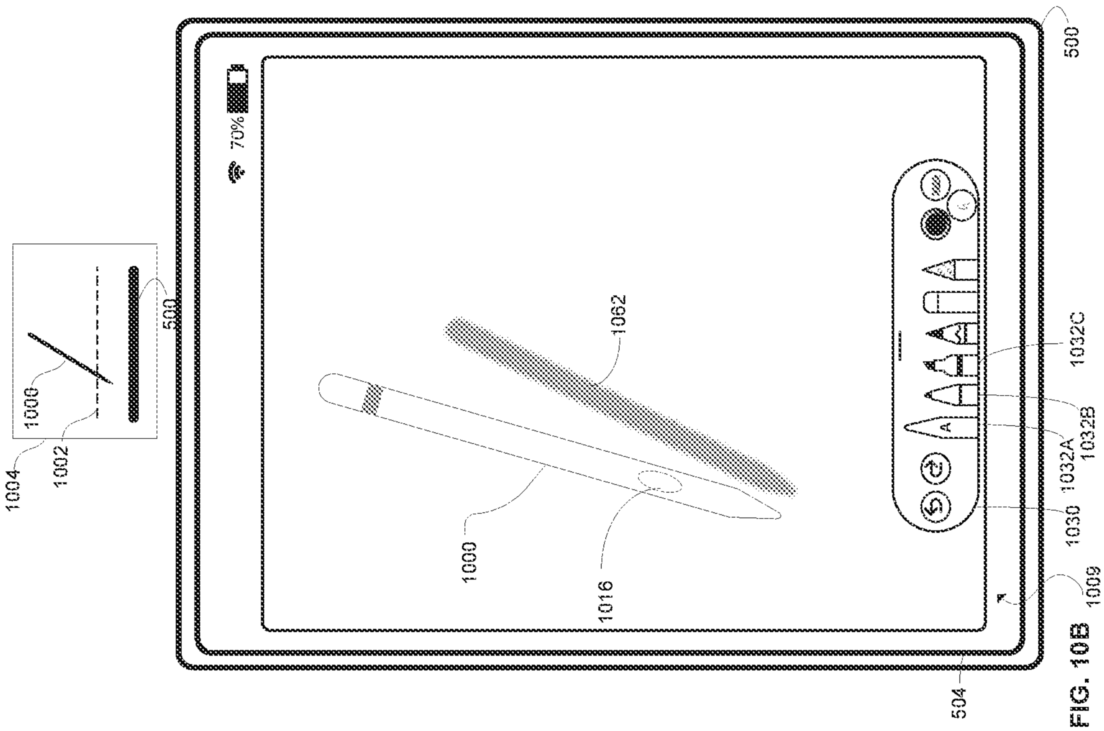
FIGS. 10A-10AP illustrate exemplary ways in which an electronic device performs contextual actions in response to input provided from an input device in accordance with some embodiments.
Figure 10A:
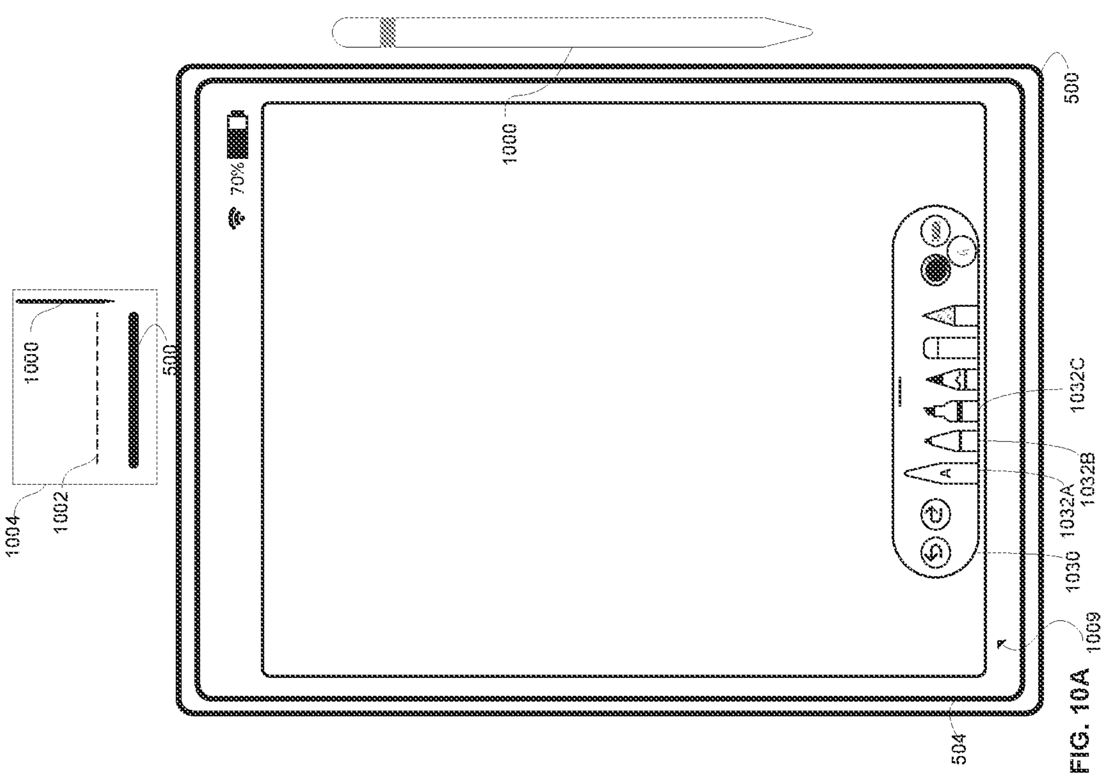

FIGS. 10A-10AP illustrate exemplary ways in which an electronic device responds to inputs from an input device based on the position of the input device in accordance with some embodiments. The embodiments in these figures are used to illustrate the processes described below, including the processes described with reference to FIGS. 11A-11H.

FIG. 10A illustrates electronic device 500 displaying user interface 1009 (e.g., via a display device and/or via a display generation component). In some embodiments, user interface 1009 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500. In some examples, a surface (e.g., a touch-sensitive surface) is in communication with device 500.

In some embodiments, user interface 1009 is a drawing user interface in which simulated handwriting and drawing are able to be performed. In some embodiments, user interface 1009 is a user interface of an application installed on device 500.

In FIG. 10A, user interface 1009 is configured for content entry and drawing. In some embodiments, device 500 is in communication with an input device, such as stylus 1000. In some embodiments, device 500 is configured to receive an indication of contact between stylus 1000 and a surface such as touch screen 504. In some embodiments, device 500 and/or stylus 1000 are further configured to transmit and/or receive indications of proximity between the surface (e.g., touch screen 504) and stylus 1000. For example, glyph 1004 includes a hover distance threshold 1002. Although threshold 1002 is illustrated as a line extending parallel to touch screen 504, it is understood that such illustration is merely exemplary and not in any way limiting. In some embodiments, a "hover event" as referred to herein includes an instance of a respective portion of an input device (e.g., the tip of stylus 1000) moving to a position less than a threshold distance (e.g., threshold 1002 such as 0.5 cm, 1 cm, 3 cm, 5 cm, or 10 cm) corresponding to hover threshold 1002 from a surface (e.g., touch screen 504). In some embodiments, a determination that a position of a projection of a respective portion of the input device (e.g., a perpendicular projection of a tip of a stylus) relative to the surface corresponds to a position of a user interface element (e.g., a selectable option, text, and/or graphical object) is referred to herein as the input device corresponding to the user interface element (e.g., the stylus, or the tip of the stylus corresponding to an object). Moreover, display or modification of one or more portions of the user interface corresponding to a user interface object in response to a hover event optionally describes a hover event between the input device and the surface at a position in the user interface corresponding to the user interface object. Similarly, to "hover" or the act of "hovering" optionally corresponds to a state in which the input device is within a threshold distance of the surface (e.g., threshold 1002) but not contacting the surface. In some embodiments, a virtual shadow of a simulated writing and/or drawing implement is displayed in response to a determination that the input device is hovering over the surface (e.g., touch screen 504). Description of the virtual shadow is found in reference to method 900 and FIGS. 8A-8C, according to examples of the disclosure.

In some embodiments, detecting selection of a user interface object corresponds to detecting contact between stylus 1000 and touch screen 504 at a position of the user interface object; however, it is understood that detecting selection is possible based on other types of user inputs. For example, a gesture (e.g., tap, double-tap, swipe) on an input device, focus of gaze of the user oriented towards the user interface object, and/or gestures of the user towards the user interface object (e.g., a pinch or other hand gesture directed to the user interface object) are optionally interpreted as a selection input by device 500.

FIGS. 10A-10E illustrate modification of a simulated drawing implement accompanied by visual feedback illustrating such a modification. In FIG. 10A, user interface 1009 is a drawing user interface including a content entry region. Content entry palette 1030 includes selectable options for initiating operations with respect to the content entry region (e.g., re-do, undo the last operations, toggling display of a virtual keyboard, and/or initiate display and modification of marks and strokes made in the user interface). In some embodiments, content entry palette 1030 is displayed at a predetermined portion of user interface 1009 (e.g., along the bottom edge of user interface 1009), and as such, visual feedback displayed in the content entry palette 1030 is displayed at the predetermined portion of the user interface. In some embodiments, content entry palette 1030 is not displayed in (or at the predetermined portion of) user interface 1009 in FIGS. 10A-10AP. The selectable options optionally are selectable to toggle between various content entry tools, such as a text entry tool 1032A, a pen entry tool 1032B, a highlighter (or marker) entry tool 1032C, a pencil entry tool, an eraser tool, and/or a content selection tool. In some embodiments, the simulated appearance of marks displayed in response to stylus 1000 in contact with and moving on touch screen 504 mimic a real-world drawing and/or writing implement. In some embodiments, selection of a current drawing implement is modified in response to detecting selection of a different tool for drawing and/or writing (referred to herein as a "simulated drawing implement" for brevity). In some embodiments, while the position of the stylus 1000 does not correspond to the user interface (e.g., is not hovering over touch screen 504), content entry palette 1030 is not displayed or displayed with a modified (e.g., with a higher degree of translucency) appearance, regardless of whether stylus 1000 is within or outside the hover threshold 1002. Glyph 1004 illustrates a side-view of device 500 and stylus 1000 to illustrate orientation, position (e.g., with respect to touch screen 504), and contact between the devices.

In FIG. 10B, stylus 1000 is moved within the hover threshold corresponding to the content entry region of user interface 1009. Stylus 1000 is moved to a position relative to touch screen 504 within hover threshold 1002, and in response to detecting such movement, virtual shadow 1062 is displayed by device 500. In some embodiments, virtual shadow 1062 is based on the position of one or more respective portions of stylus 1000 relative to touch screen 504 (e.g., based on a position of the tip of stylus 1000 and/or the barrel of stylus 1000). Virtual shadow 1062 provides the benefit of a visual preview of a position of interaction of input device 1000 with device 500. For example, the tip of virtual shadow 1062 optionally corresponds to a location of selection on a touch screen 504, wherein detecting contact of stylus 1000 at the location initiates one or more operations (e.g., selection or drawing), as will be described in more detail later. In control palette 1030, a currently selected text entry tool 1032A is visually emphasized (e.g., is moved upwards) to indicate the currently selected tool or drawing implement to the user. While displaying the virtual shadow 1062, device 500 detects an indication of one or more inputs (e.g., a tap, multi-tap, stroke, and/or long-press gestures) received from stylus 1000, referred to herein as an "indication of stylus input." For example, device 500 optionally receives an indication of gesture 1016 on the body of stylus 1000. Because stylus 1000 is within hover threshold 1002 when the indication is received, a first set of one or more operations is optionally performed.

Figure 10D:
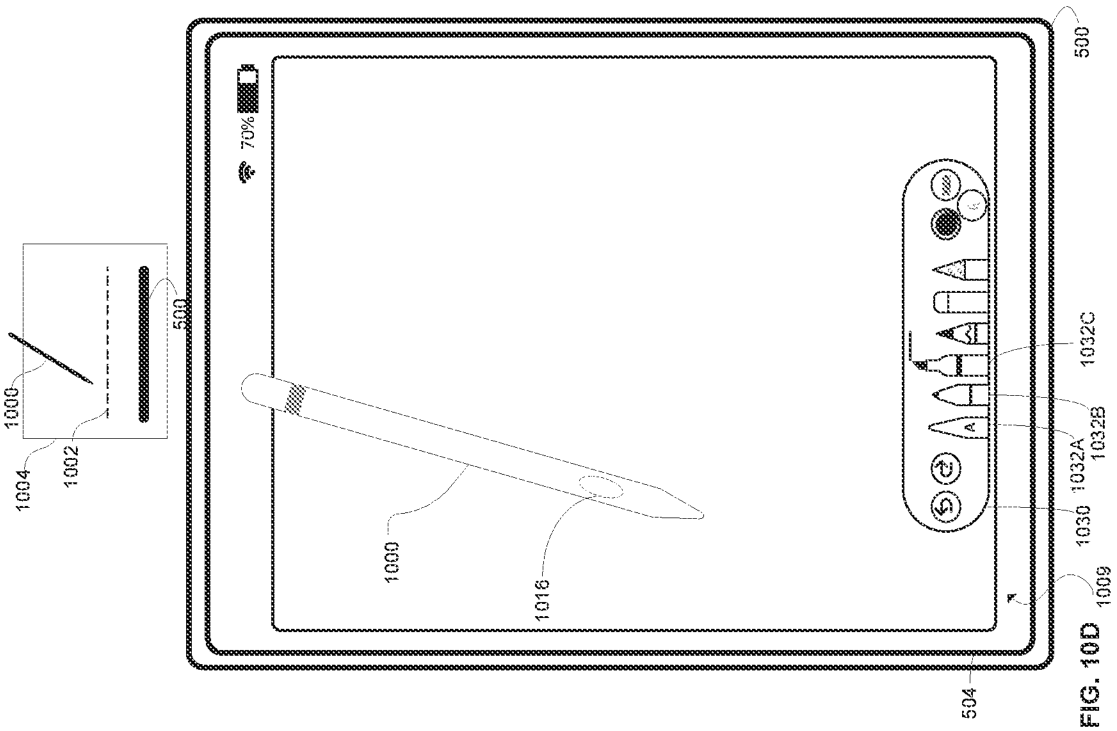
Figure 10C:
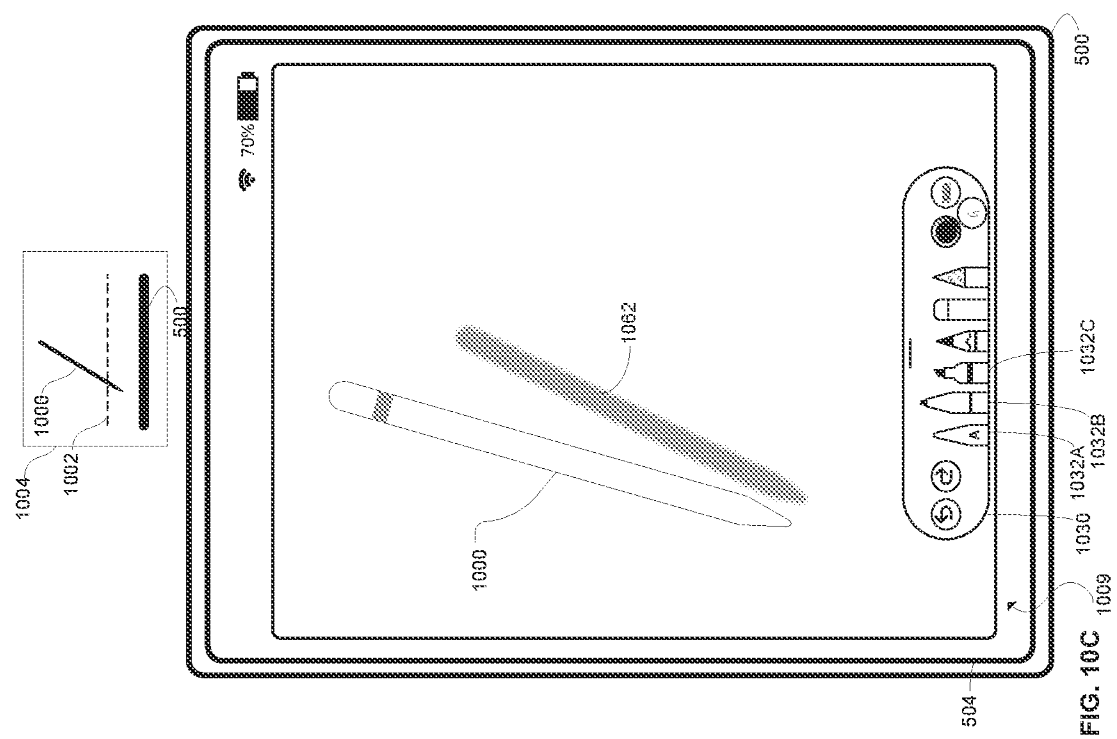

In FIG. 10C, in response to the receiving the indication of one or more inputs while stylus 1000 is hovering over touch screen 504, the first one or more operations are performed including a modification of a currently selected simulated drawing implement. In response to the indication, text entry tool 1032A is moved downwards in control palette 1030 and pen entry tool 1032B is moved upwards to indicate that the currently selected tool or drawing implement is now the pen entry tool 1032B.

In FIG. 10D, stylus 1000 is moved outside the hover threshold 1002 (and device 500 ceases to display virtual shadow 1062), and an indication of stylus input corresponding to gesture 1016 is received as described with respect to FIG. 10B. In accordance with a determination that stylus 1000 is outside hover threshold 1002 when the indication is received, in some embodiments, the same first operation is performed. For example, pen entry tool 1032B is moved downwards in control palette 1030 and a new, currently selected highlighter tool 1032C is moved upwards. In some embodiments, in accordance with a determination that stylus 1000 is outside hover threshold 1002 when the indication is received, the first operation is not performed, and a second operation is performed or not performed, as will be described in more detail later. In FIG. 10D, for example, while outside the hover threshold 1002, the indication of stylus input represented by gesture 1016 is received and the currently selected drawing implement is not modified, as represented by the lack of modification of control palette 1030 in FIG. 10E.

Figure 10E:
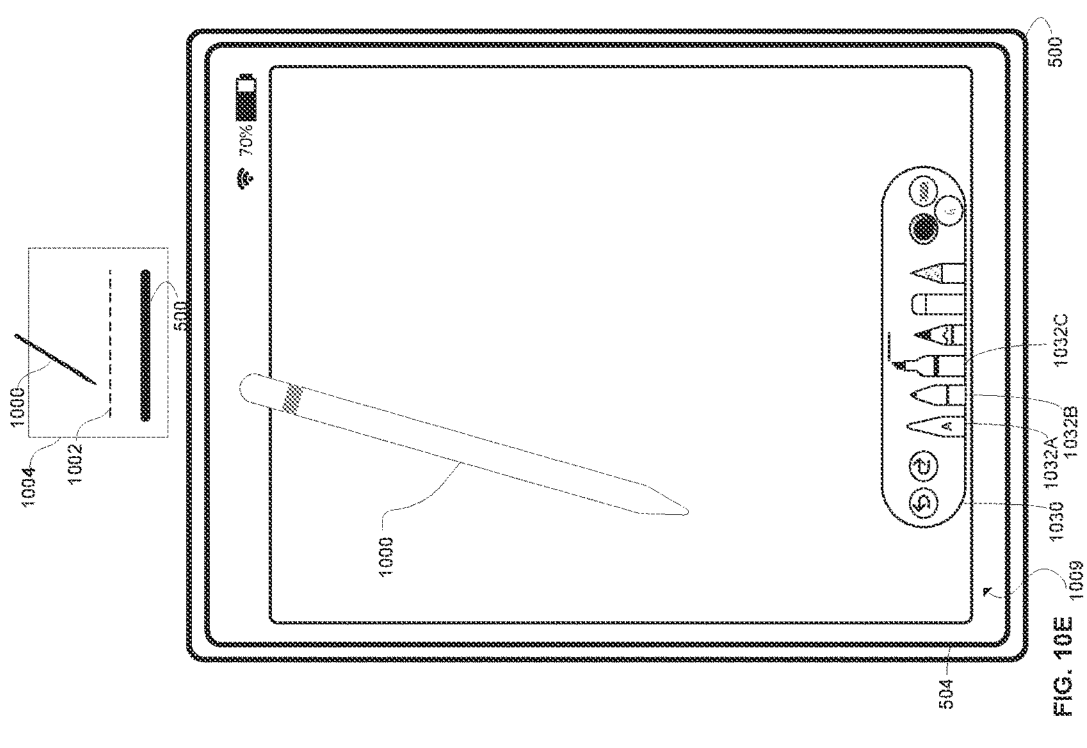
Figure 10F:
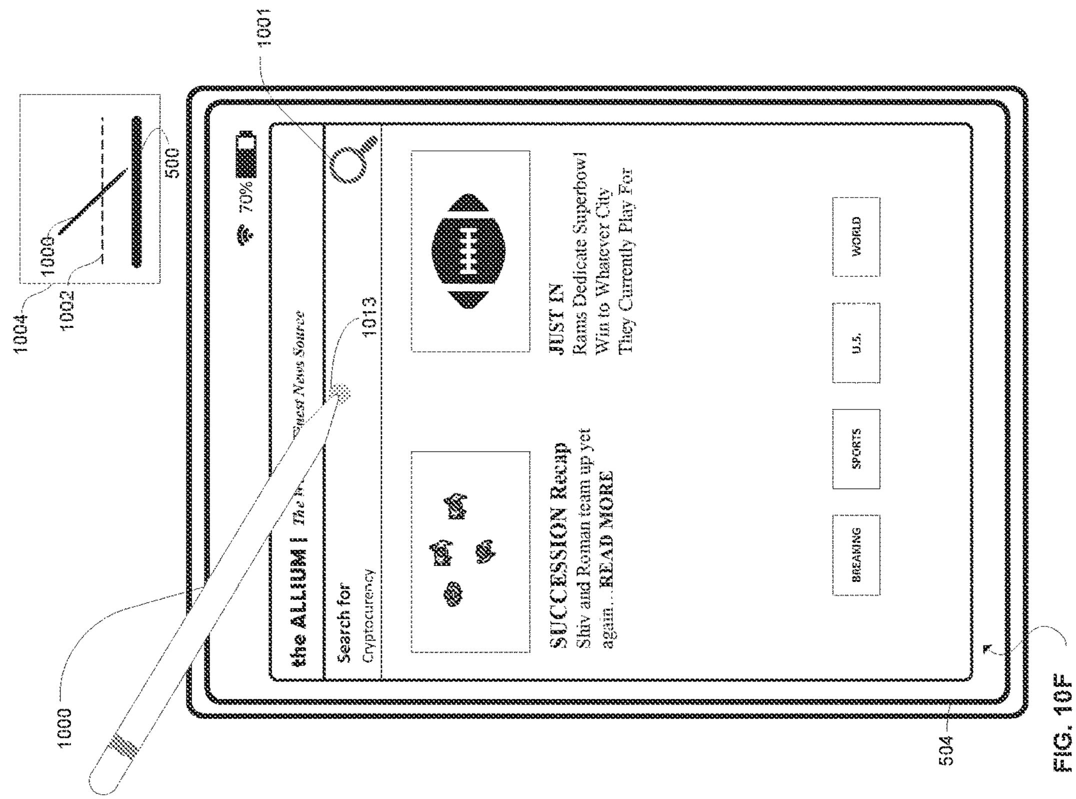
Figure 10H:
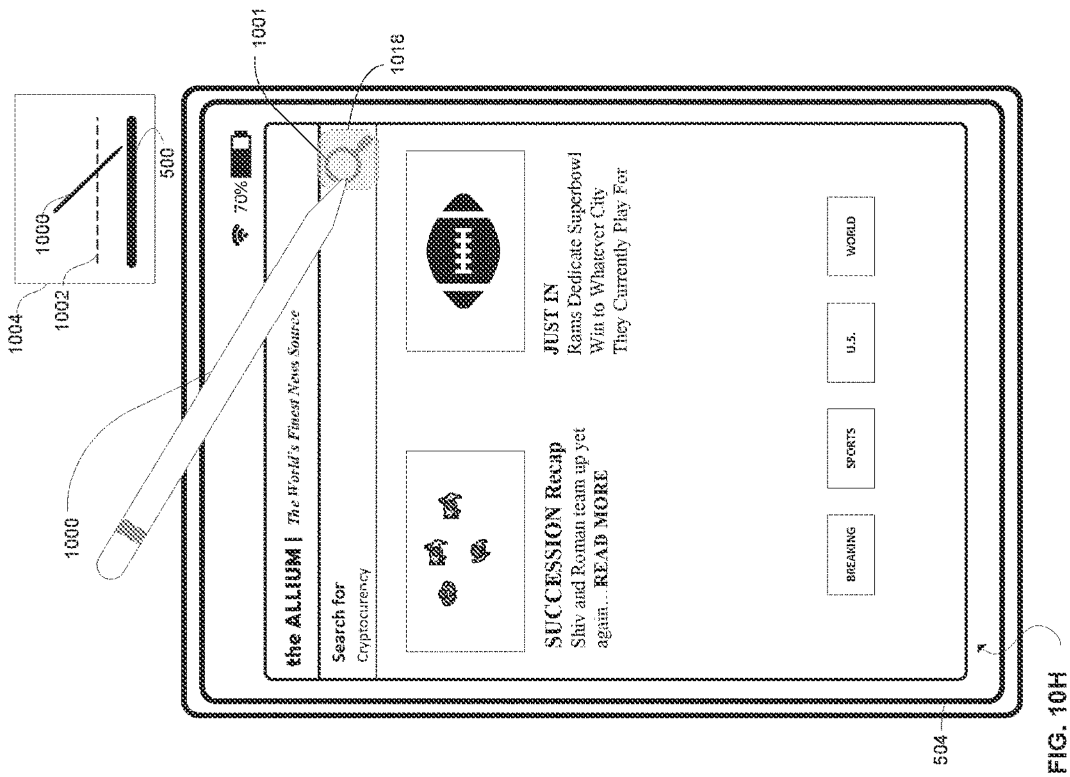
Figure 10G:
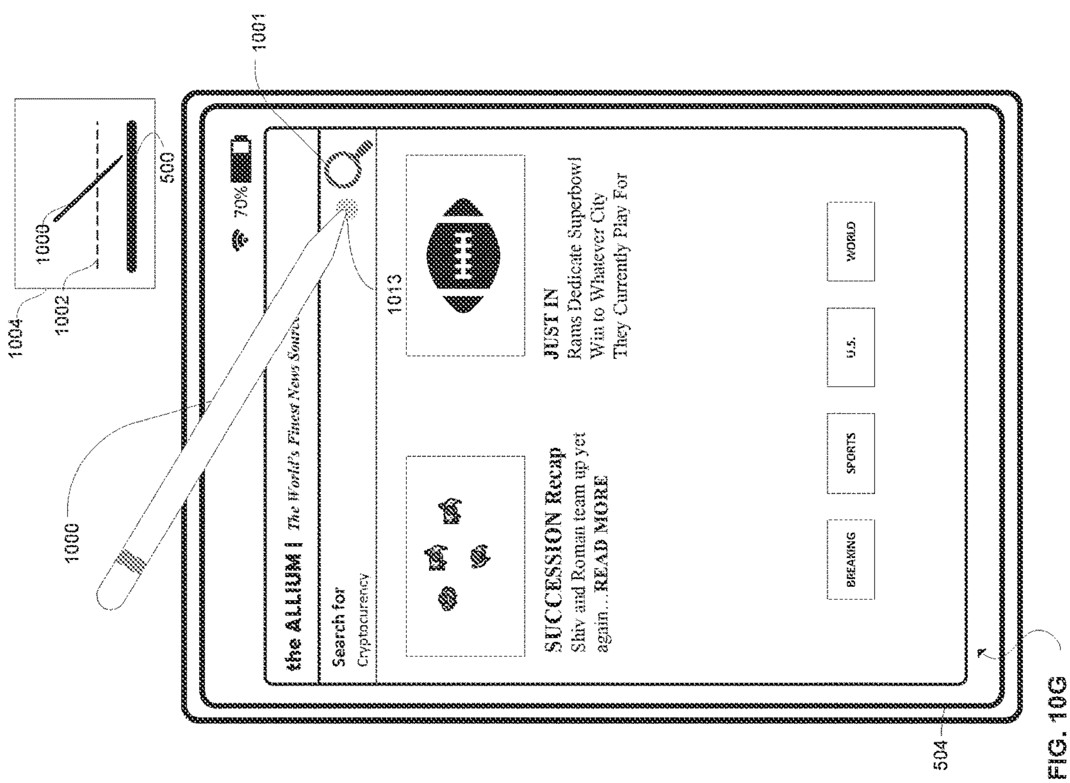

In FIGS. 10F-10H, user interface 1009 is a content browsing interface including a cursor for navigating the interface. In FIG. 10F, in response to detecting stylus 1000 within hover threshold 1002, cursor 1013 is displayed by device 500 based on a position of a projection of the tip of stylus 1000 onto touch screen 504. In some embodiments, cursor 1013 is not displayed while stylus 1000 does not correspond to a position in the user interface and/or while stylus 1000 is outside the hover threshold 1002. In FIG. 10G, in response to detecting movement of the stylus 1000 while hovering over touch screen 504, cursor 1013 is moved in accordance with the movement (e.g., the movement of the tip of stylus 1000 rightward from FIG. 10F to 10G causes cursor 1013 to be moved rightward correspondingly from FIG. 10G to 10G). In some embodiments, while stylus 1000 is within hover threshold 1002, display of cursor 1013 is maintained. In FIG. 10H, in response to detecting the position of the tip of stylus 1000 move further rightward to correspond to search icon 1001, visual emphasis 1018 is displayed associated with search icon 1001. The visual emphasis optionally includes displaying search icon 1001 with a different scale, color, opacity, shadows, border, and/or lighting effect. In some embodiments, in response to detecting that stylus 1000 corresponds to positions of other user interface objects, visual emphasis is similarly applied to the respective user interface object(s).

Figure 10J:
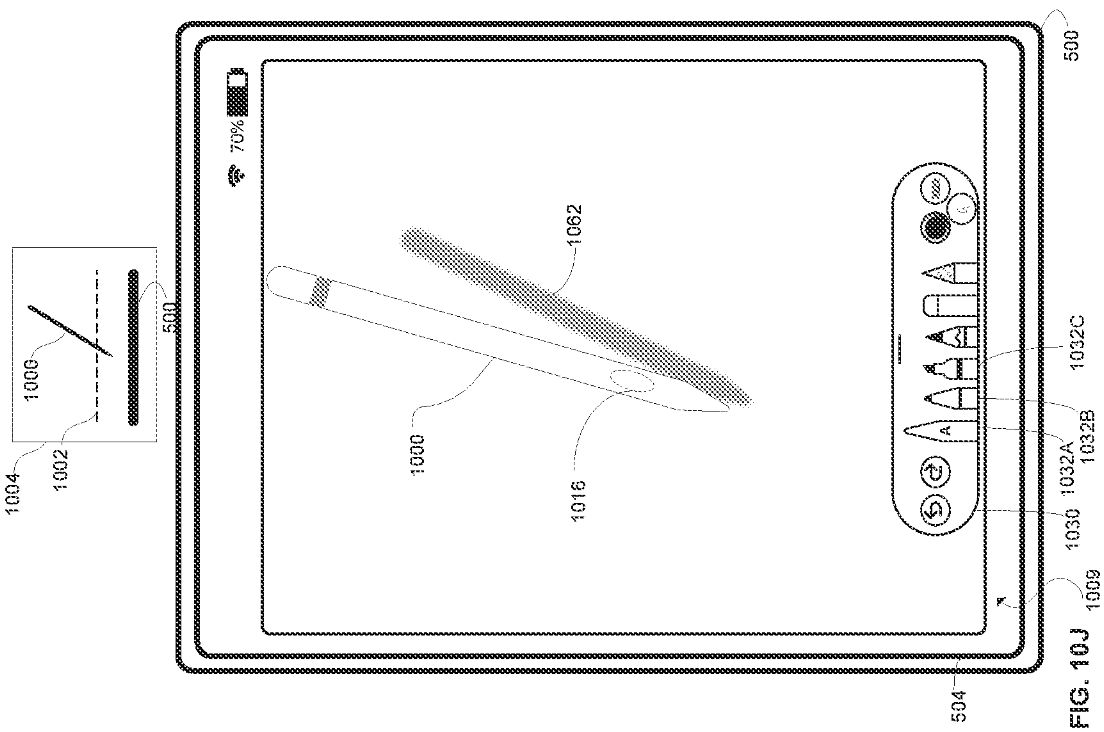
Figure 10I:
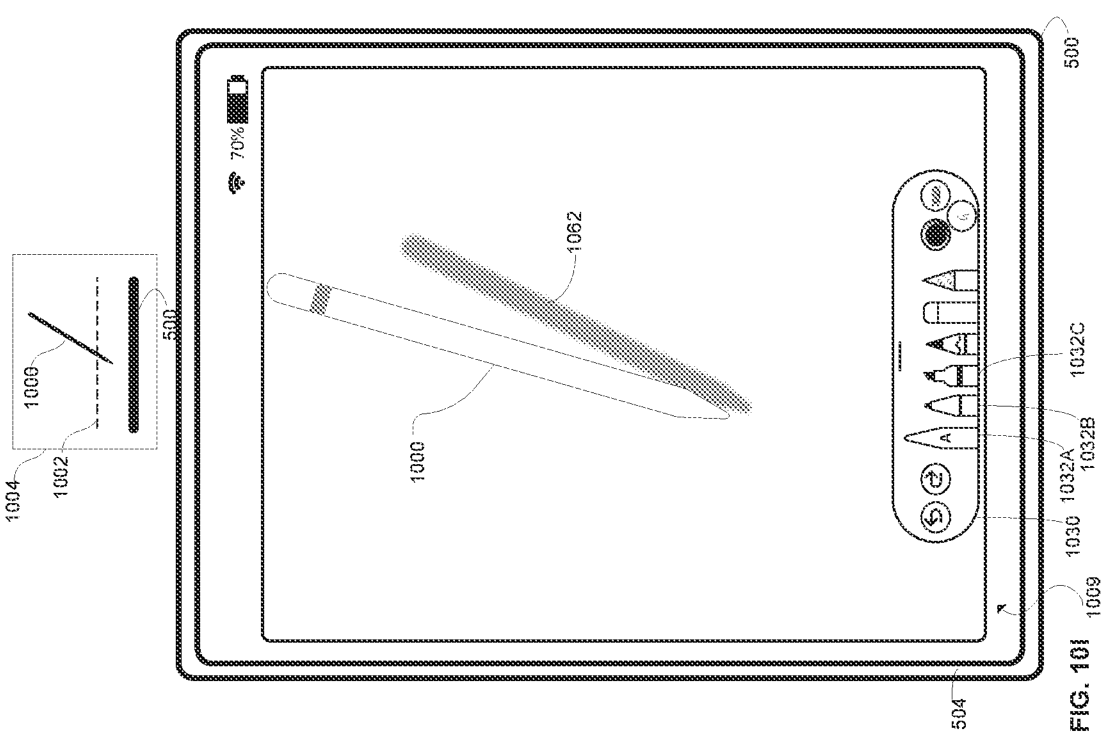
Figure 10L:
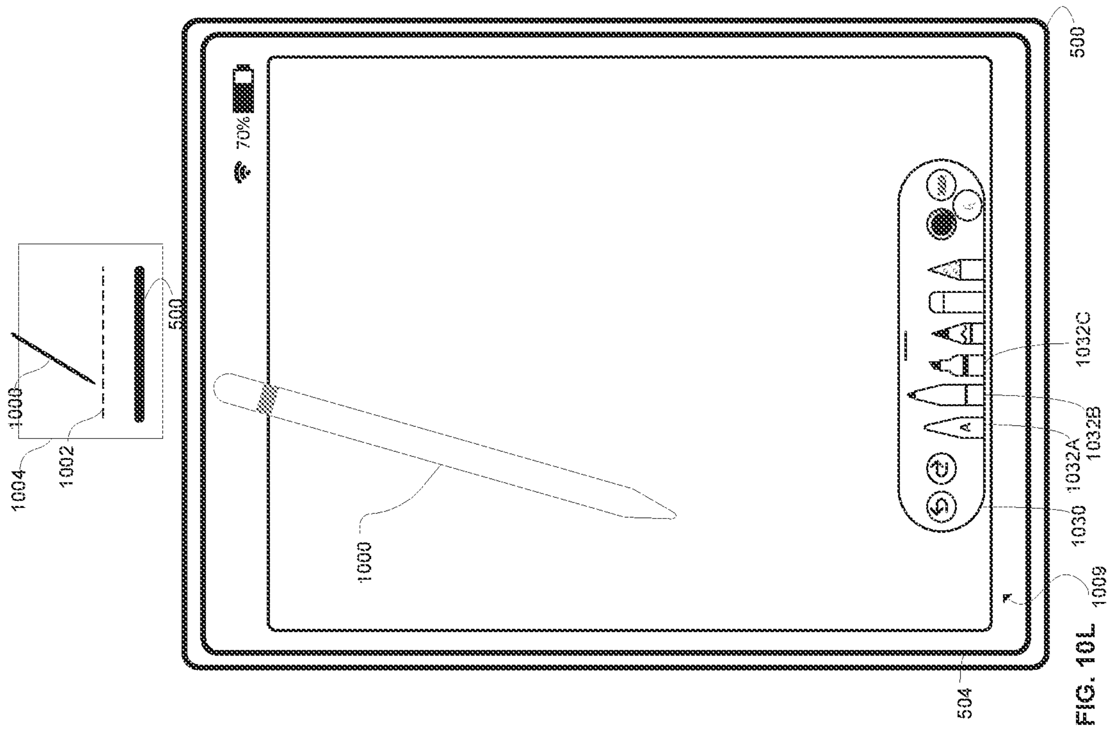
Figure 10K:
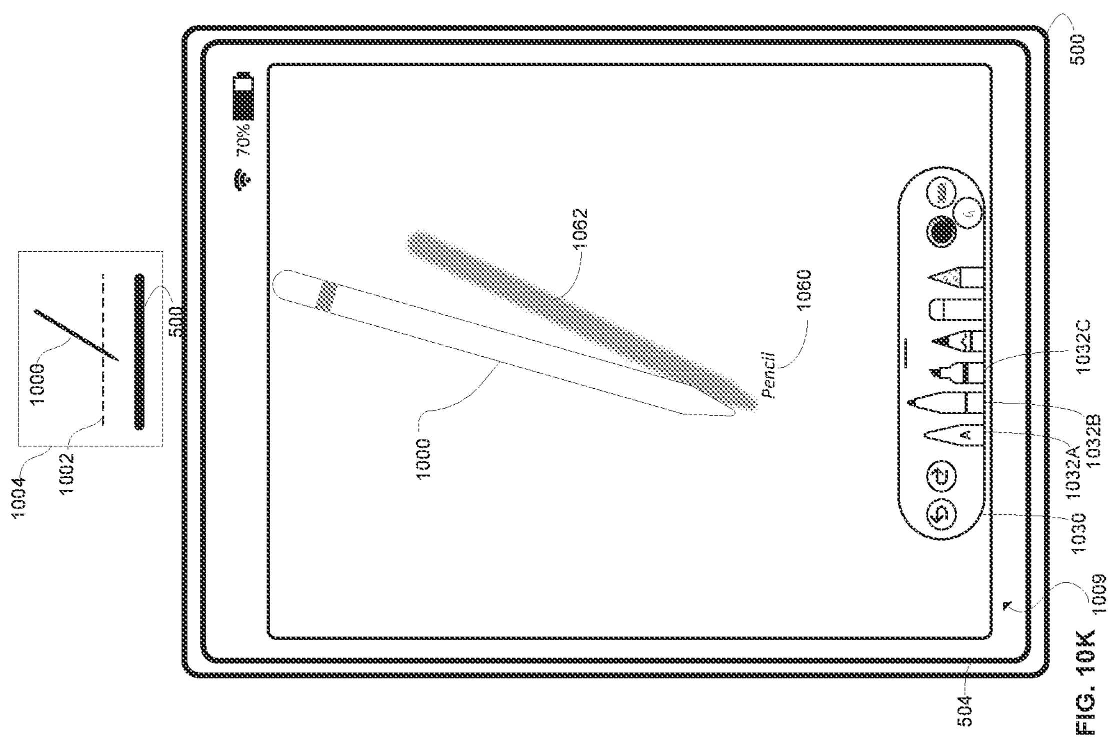

In FIGS. 10I-10O, user interface 1009 is a content drawing interface. In FIG. 10I, stylus 1000 is within hover threshold 1002, and therefore virtual shadow 1062 is displayed. Control palette 1030 includes an indication of a currently selected text entry tool 1032A. In FIG. 10J, while stylus 1000 is within hover threshold 1002, an indication of one or more inputs received at the stylus is received (e.g., a tap, double tap, dragging gesture, and/or other suitable gestures on the stylus body) corresponding to gesture 1016. In response to detecting the indication and in accordance with a determination that the stylus is detected to be within the hover threshold 1002, a first operation including modifying a currently selected tool or drawing implement and displaying first visual feedback is performed, as show in FIG. 10K. In FIG. 10K, textual feedback 1060 is displayed in response to detecting the indication of one or more stylus inputs. In some embodiments, textual feedback 1060 describes a new, currently selected drawing implement. In some embodiments, textual feedback 1060 describes a modification of a visual appearance (e.g., translucency, line width, and/or color) of the currently selected drawing implement in accordance with the first operation. In some embodiments, textual feedback is displayed in user interface 1009 at a position corresponding to the position of the tip of input device 1000. In some embodiments, display of textual feedback 1060 is ceased after a threshold amount of time (e.g., 0.25, 0.5, 0.75, 1, 2, 5, 7.5, or 10 seconds). In some embodiments, textual feedback 1060 is not displayed, as described in the embodiments that follow.

Figure 10N:
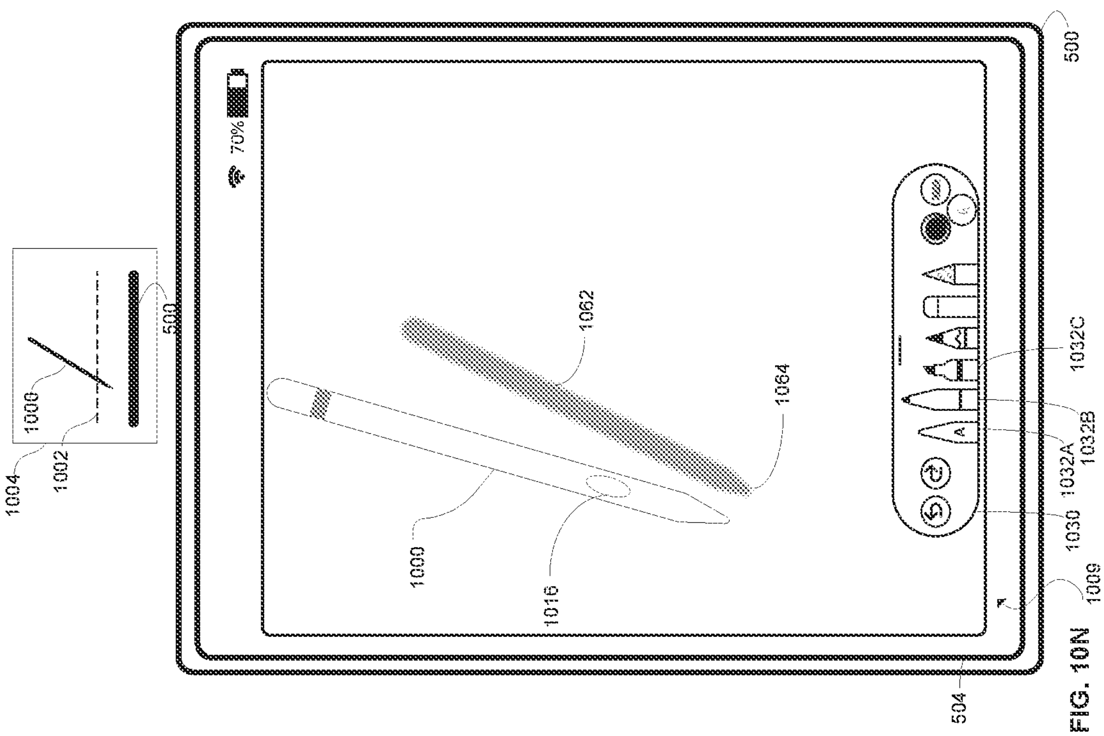
Figure 10M:
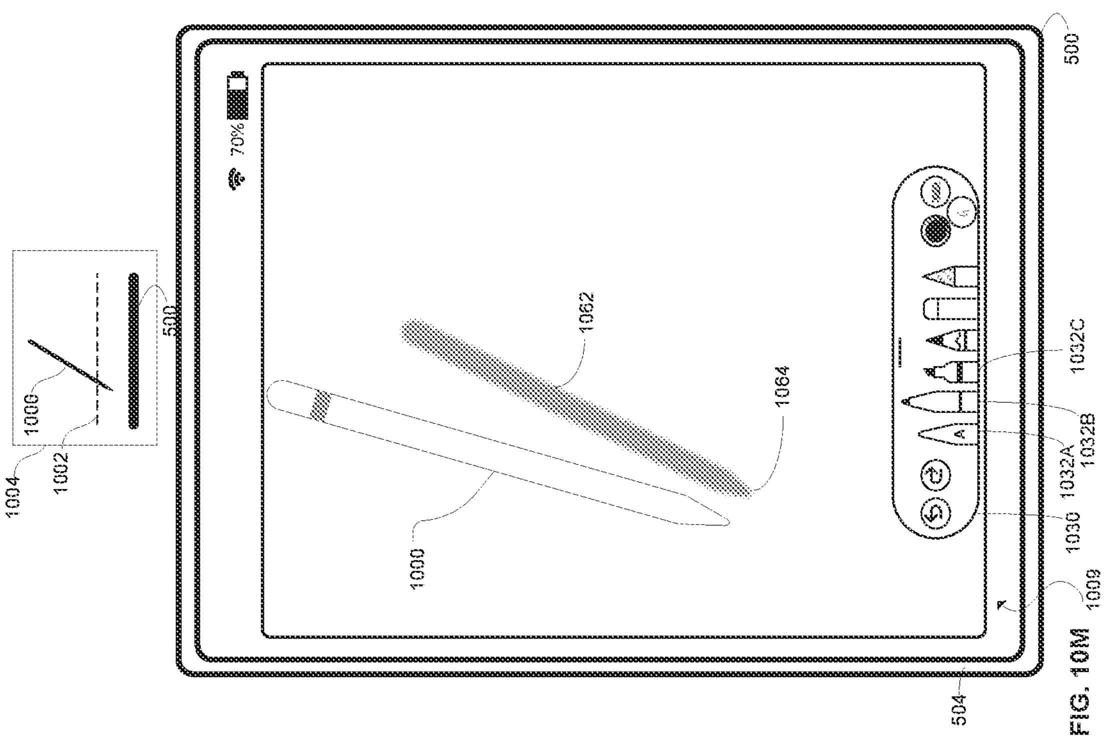
Figure 10P:
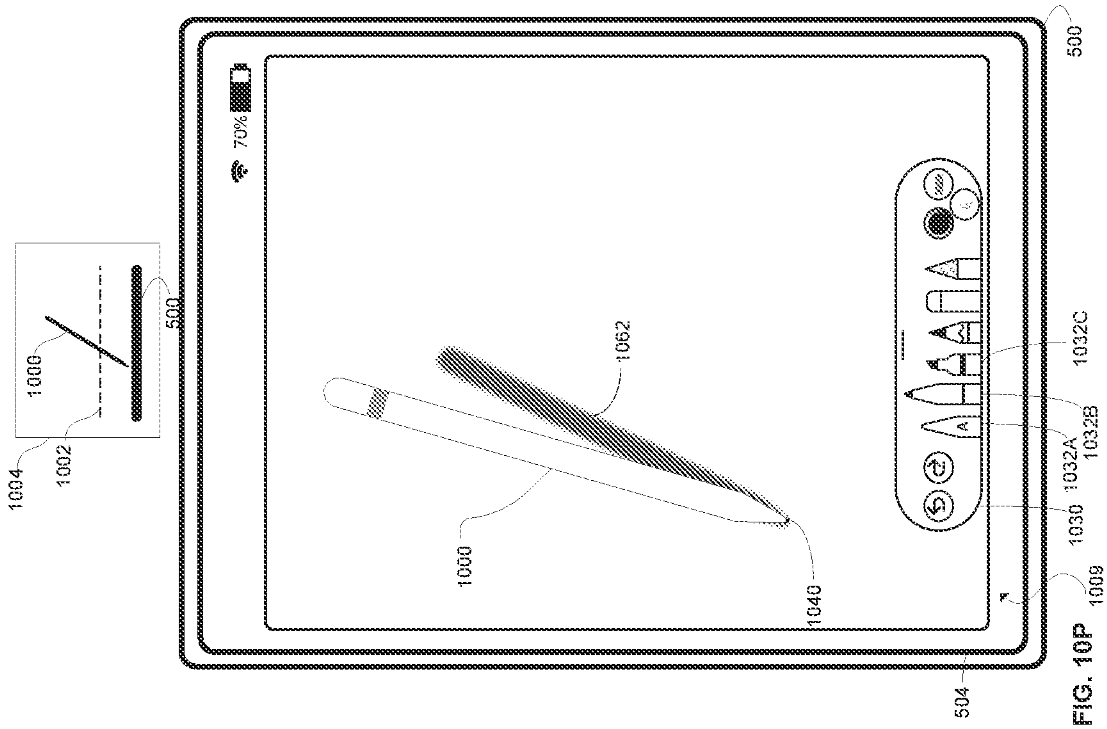
Figure 10O:
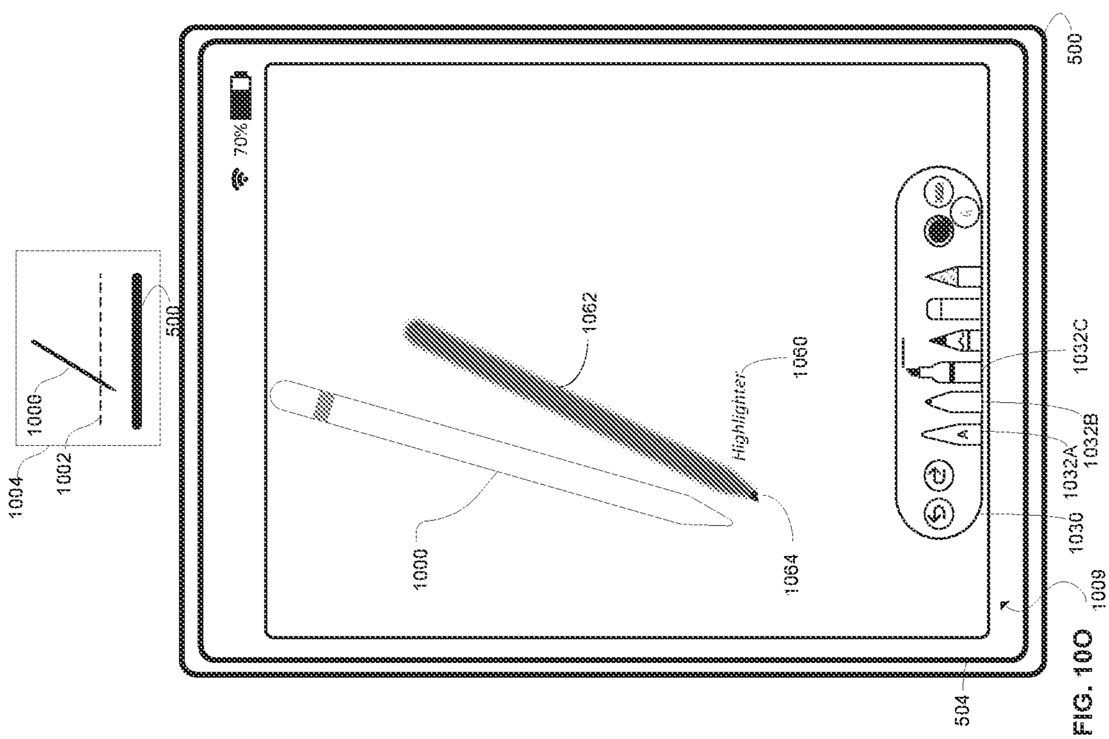

FIGS. 10L-10O illustrate modification of simulated drawing implements and corresponding visual indications. In FIG. 10L, stylus 1000 is moved outside hover threshold 1002, and in response to detecting such movement, display of a virtual shadow for stylus 1000 is ceased by device 500, display of textual feedback as described with respect to FIG. 10K is ceased by device 500, and an indication of currently selected pen tool 1032B is maintained (e.g., the tool is moved upwards in control palette 1030) in palette 1030. In some embodiments, in response to detecting stylus 1000 is within hover threshold 1002, the virtual shadow for stylus 1000 is redisplayed. For example, in FIG. 10M, in response to such detecting, virtual shadow 1062 is displayed by device 500 based on the profile of the pen tool 1032B having a pen tip 1064. In some embodiments, pen tip 1064 is visually distinguished (e.g., with shading, border, color, and/or translucency) from the remainder of virtual shadow 1062, as described in more detail with reference to method 900. In FIG. 10N, an indication of one or more stylus inputs is detected as described with respect to FIG. 10J, corresponding to gesture 1016. In response to the indication, as shown in FIG. 10O, highlighter tool 1032C is currently selected, and pen tool 1032B is not selected (e.g., as shown in palette 1030). In response to the indication, the virtual shadow 1062 is updated to reflect the new currently selected simulated drawing implement. For example, tip 1064 reflects a real-world highlighter with a chisel tip, and optionally includes visual emphasis (e.g., tip 1064 is darker and more opaque than the other portions of virtual shadow 1062).

FIGS. 10P-10AP illustrate a sequence of entering strokes/marks and modifications of simulated drawing implements according to embodiments of the disclosure. In some embodiments, strokes/marks entered into a content entry region of a content drawing user interface 1009 are maintained during and after multiple hover events, detection of contact, and/or detection of lift-off of the contact from touch screen 504.

In FIG. 10P, pen tool 1032B is a currently selected simulated drawing implement and contact between stylus 1000 and touch screen 504 is detected. As described previously, while within hover threshold 1002, a virtual shadow 1062 is displayed corresponding to pen tool 1032B. In response to the detection of contact, first mark 1040 is displayed in user interface 1009 in accordance with the currently selected pen tool 1032B based on one or more currently selected visual characteristics for the drawing implement (e.g., line thickness, color, translucency, and/or pattern of marks). In some embodiments, a detected force of the contact and/or a speed of the contact controls one or more characteristics of displayed mark 1040 (e.g., a thinner mark is displayed in response to a relatively faster and/or lighter contact, or a thicker mark is displayed in response to a relatively slower and/or more forceful contact). In FIG. 10Q, movement of stylus 1000 across touch screen 504 while remaining in contact with touch screen 504 is detected, and in response to the movement, mark 1040A is displayed having a profile corresponding to the movement of stylus 1000. As described previously, while stylus 1000 is contacting touch screen 504, a tip of virtual shadow 1062 is optionally displayed at a position of the tip of stylus 1000.

Figure 10R:
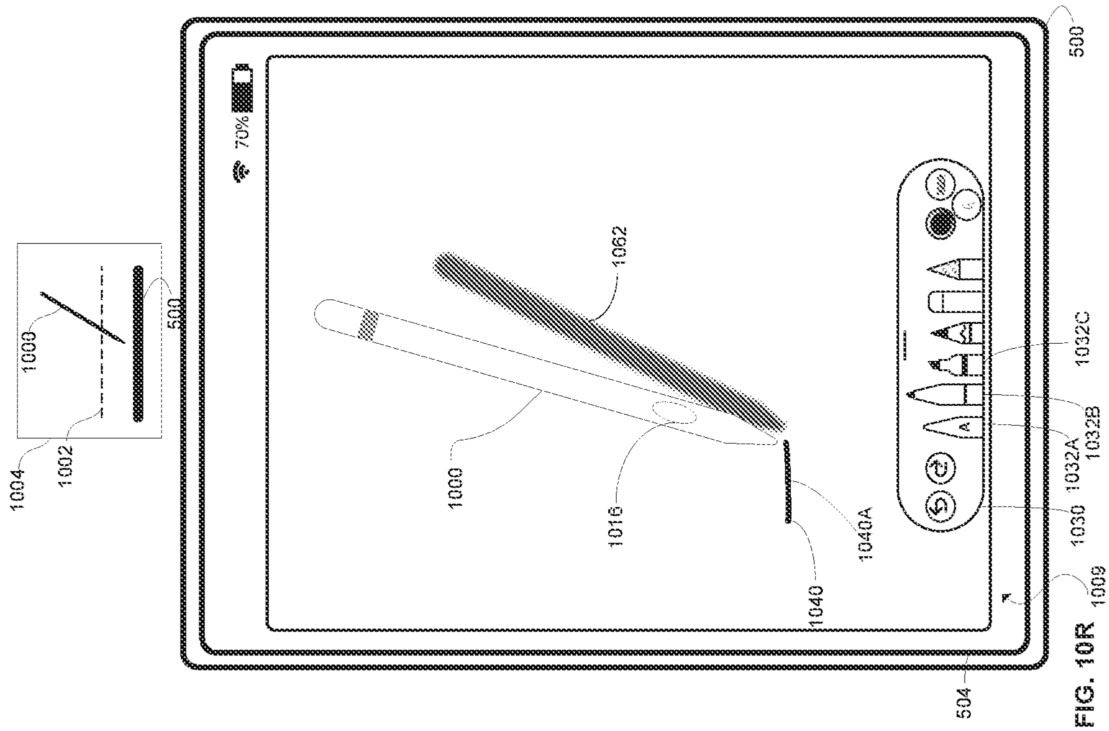
Figure 10Q:
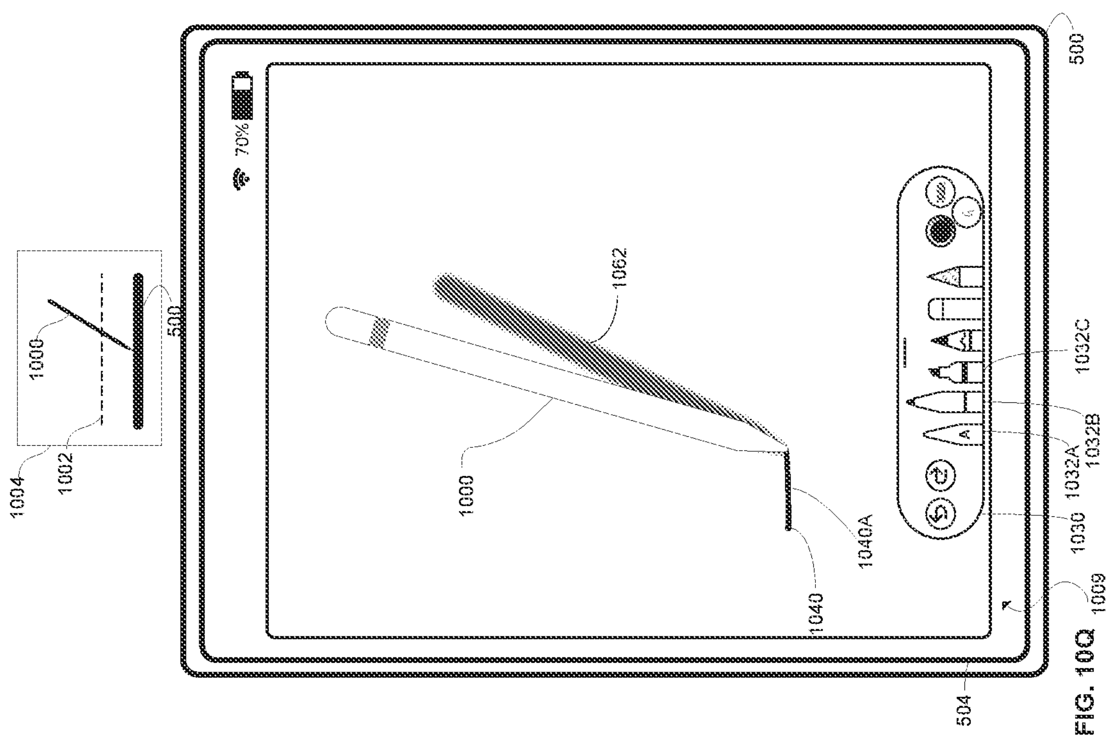

In FIG. 10R, lift-off of stylus 1000 from touch screen 504 is detected, and virtual shadow 1062 is offset from the determined position of the tip of stylus 1000 projected on to touch screen 504 in accordance with a determination that stylus 1000 is hovering over touch screen 504 (e.g., within hover threshold 1002). Further, in FIG. 10R, one or more stylus inputs (e.g., gesture 1016) are received as described with respect to FIG. 10J. In FIG. 10S, visual feedback is displayed in response to the one or more stylus inputs at one or more portions of user interface 1009. For example, a portable control palette 1050 is displayed at a position in user interface 1009 based on a determined position of a respective portion of the input device (e.g., a perpendicular projection of the tip of stylus 1000 on to touch screen 504) when the one or more stylus inputs are received. In some embodiments, as described with respect to method 1100, the portable control palette includes selectable options to modify marks made in response to detected strokes of stylus 1000. In some embodiments, in response to detecting a selection of a respective selectable option, additional selectable and/or interactable options are displayed (e.g., representations of mark width, colors, and/or sliders to modify aspects of the mark). In some embodiments, detecting subsequent selection and modification directed to the additional selectable and/or interactable options accordingly modifies visual characteristics of additionally detected marks. Width modifier 1050A, for example, is selectable to modify a width of marks made in response to detecting contact and/or movement of stylus 1000. Translucency modifier 1050B, for example, is selectable to modify a translucency of marks made in response to detecting contact and/or movement of stylus 1000. Color modifier 1050C, for example, is selectable to modify a color of marks made in response to detecting contact and/or movement of stylus 1000. In some embodiments, after a timeout period including a detected lack of interaction (e.g., no selection and/or manipulation of respective selectable options) with the portable control palette 1050, display of the portable control palette 1050 is ceased. As shown in FIG. 10S, virtual shadow 1062 is overlaid over portable control palette 1050 to indicate to the user a position of potential selection (e.g., selection of a respective selectable option or modifier within portable control palette 1050).

Figure 10T:
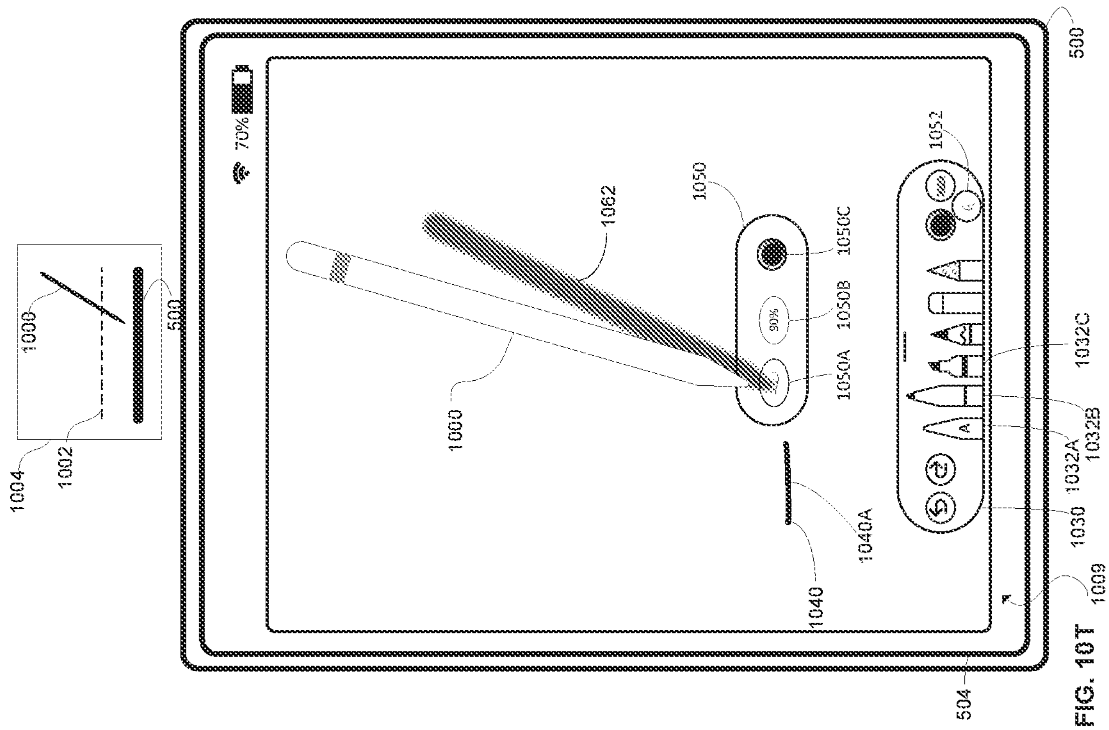
Figure 10S:
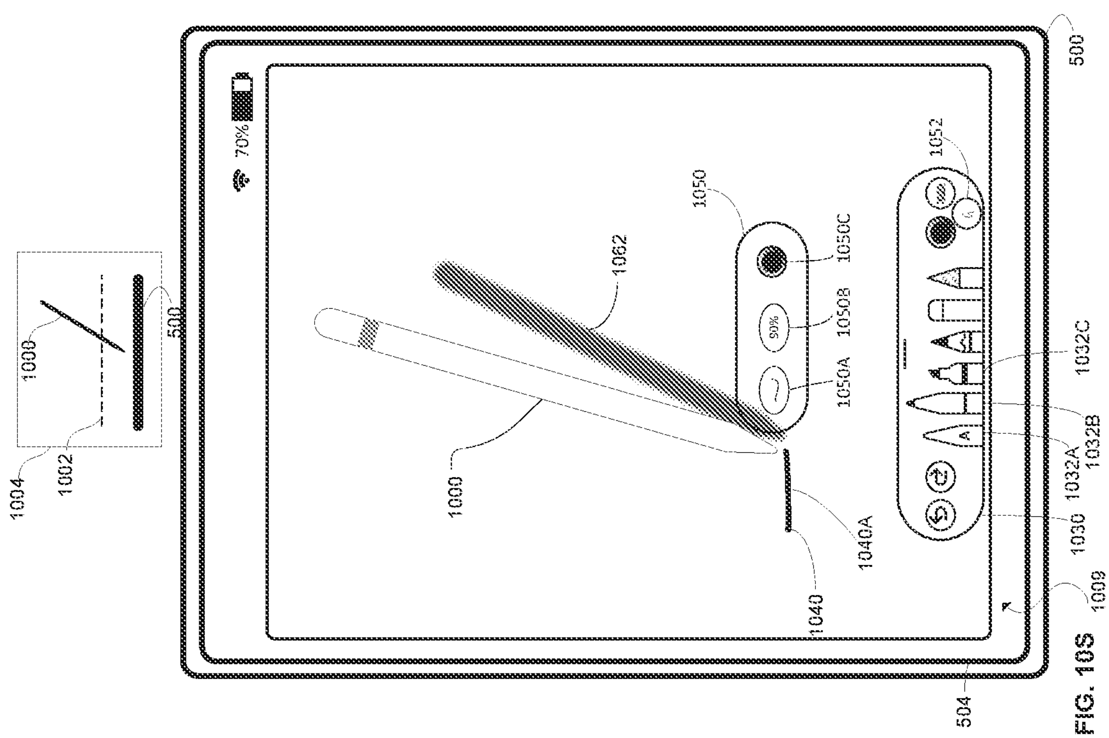

In FIG. 10T, for example, stylus 1000 is moved to hover at a position corresponding to width modifier 1050A, and the tip of virtual shadow 1062 is displayed at a location corresponding to width modifier 1050A. In some embodiments, in response to a hover event in which stylus 1000 corresponds to width modifier 1050A, width modifier 1050A is displayed with visual emphasis (e.g., with a different scale, color, opacity, shadows, border, and/or lighting effect). In FIG. 10U, selection of width modifier 1050A is detected. One or more inputs or indications of one or more inputs are received to modify the width of marks. For example, width optionally is increased.

Figure 10V:
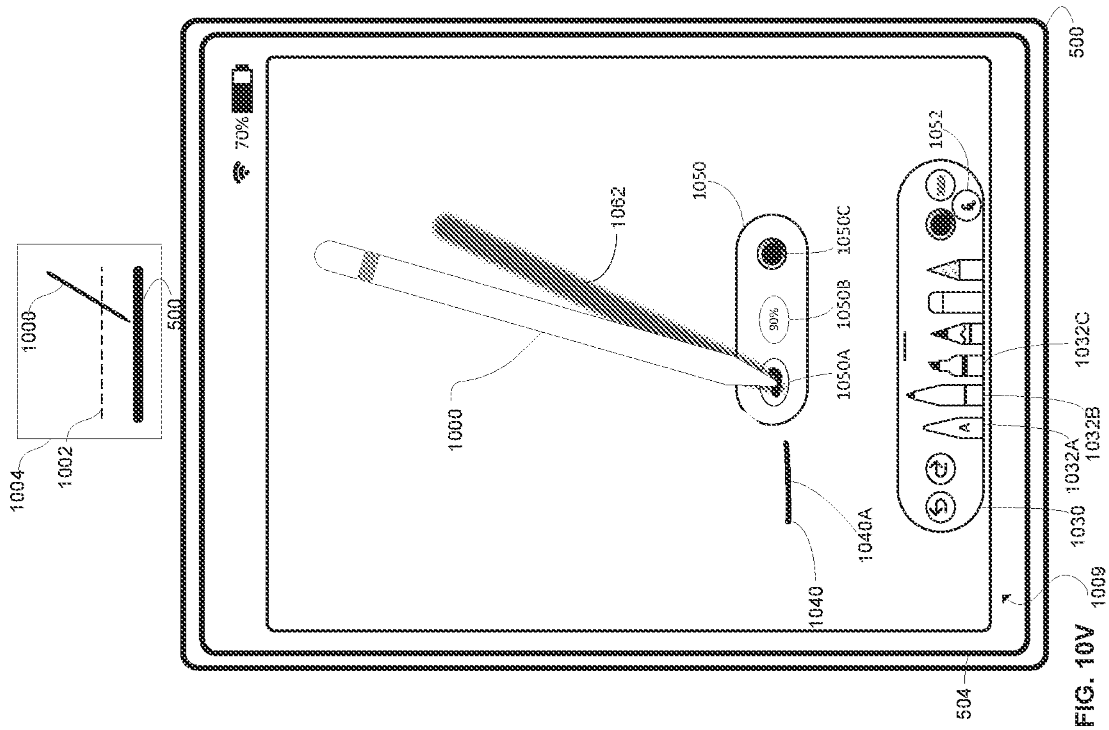
Figure 10U:
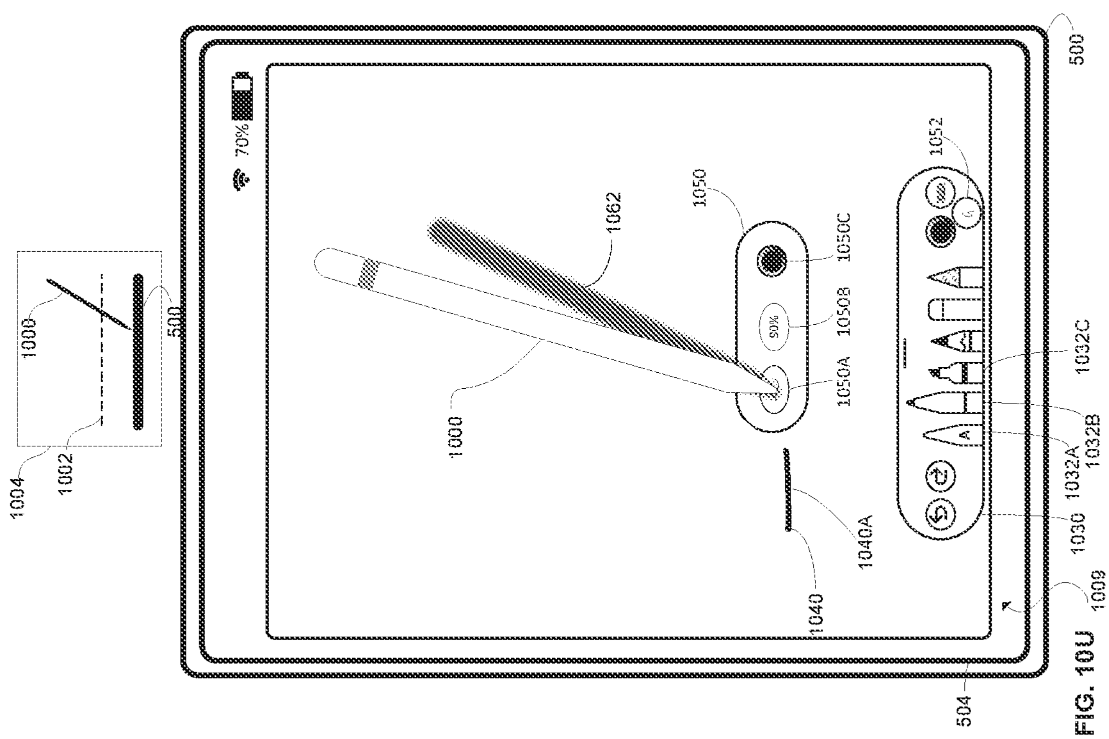

In FIG. 10V, in response to detecting the modification of width of marks, visual feedback is provided at two locations in user interface 1009: at portable control palette 1050 and at control palette 1030. Such visual feedback optionally includes a preview of the modification, such as increased thickness of a preview mark in width modifier 1050A and a preview mark in control 1052. In some embodiments, visual feedback is displayed at one of the respective locations and not the other. In some embodiments, visual feedback is not provided at either location. In FIG. 10W, lift-off of stylus 1000 from touch screen 504 is detected and the visual feedback is maintained.

Figure 10X:
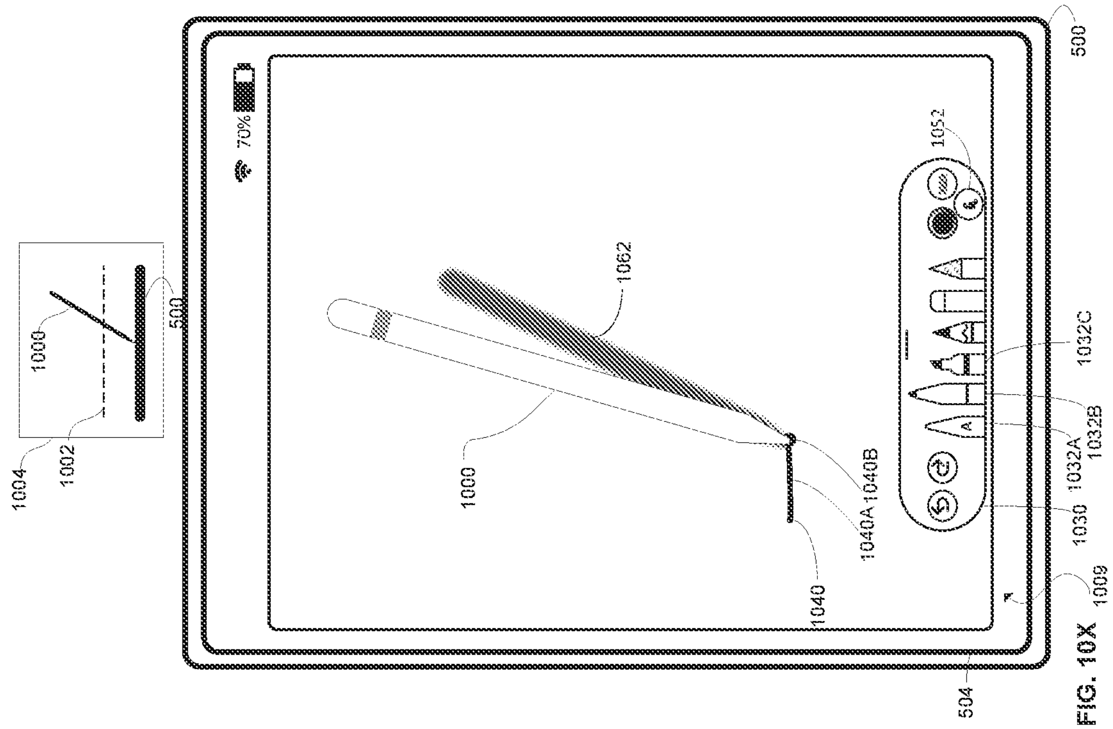
Figure 10W:
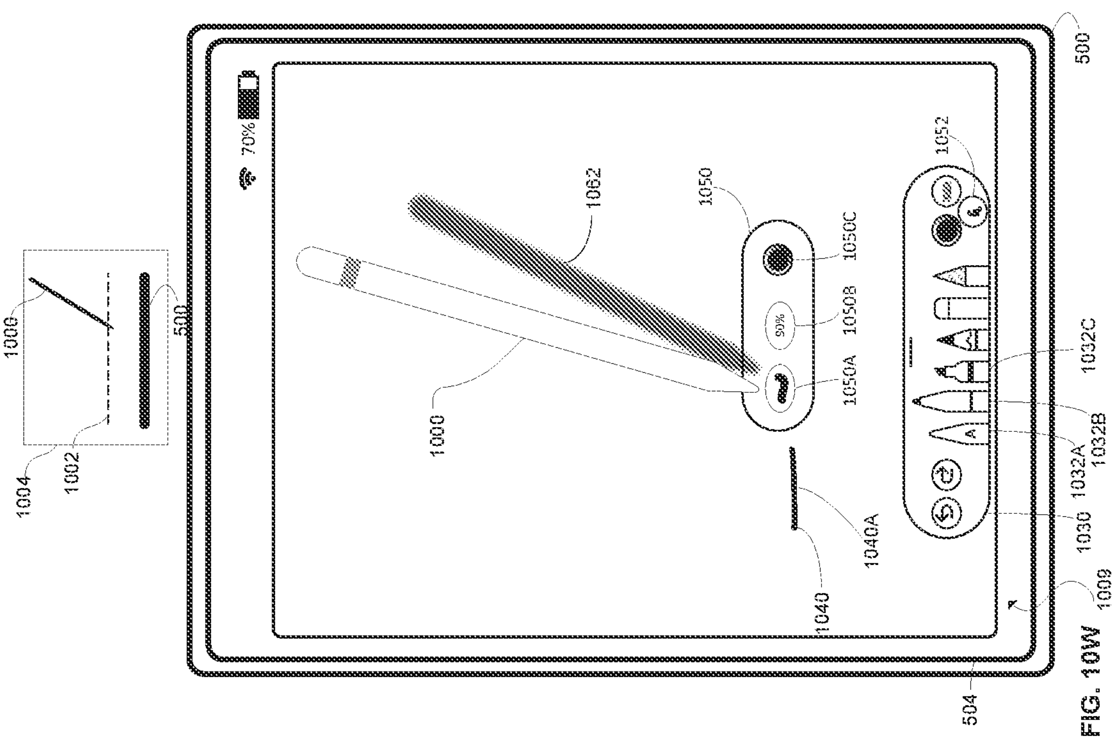

In FIG. 10X, a second mark 1040B is displayed in response to detecting contact between stylus 1000 and touch screen 504 with a thicker width compared to mark 1040A in accordance with the modified mark width as reflected by preview mark in control 1052. In FIG. 10Y, in response to detecting movement of stylus 1000 across touch screen 504, second mark 1040B is expanded in accordance with the movement. In some embodiments, moving stylus 1000 outside hover zone (or to another location not in contact with touch screen 504, such as within hover threshold 1002) and detecting an indication of one or more stylus inputs reverts a last-received modification of one or more characteristics associated with the simulated writing implement (e.g., visual appearance and/or a currently selected drawing implement).

Figure 10Z:
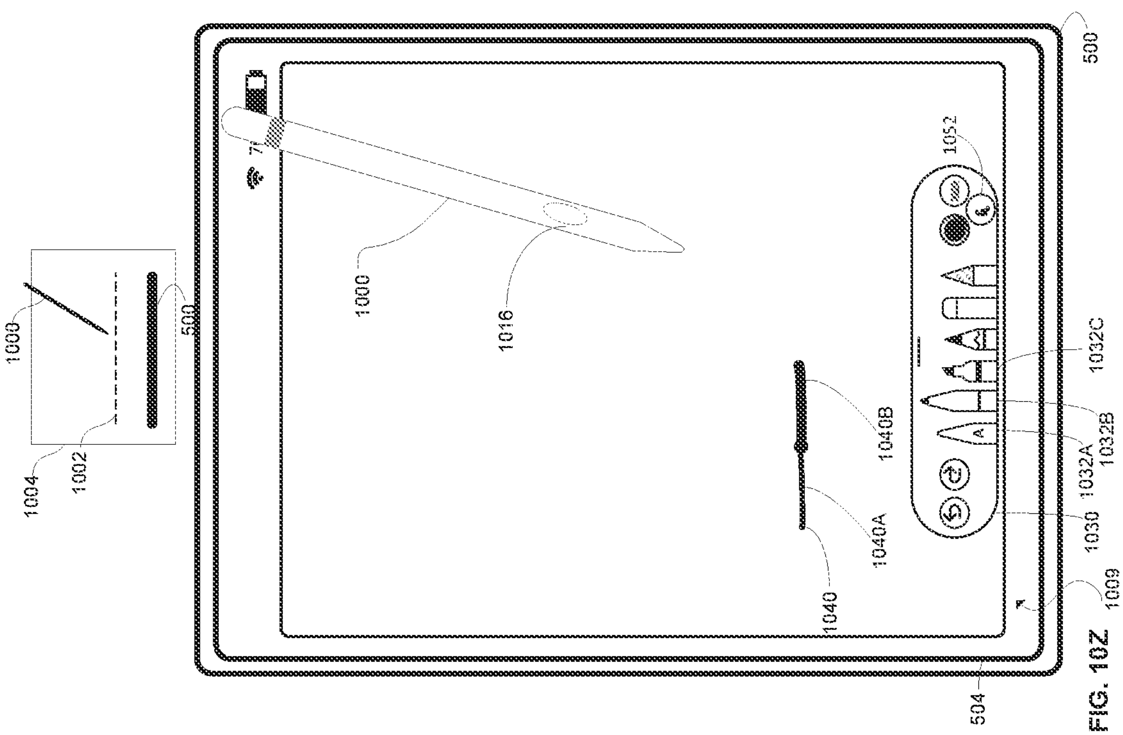
Figure 10Y:
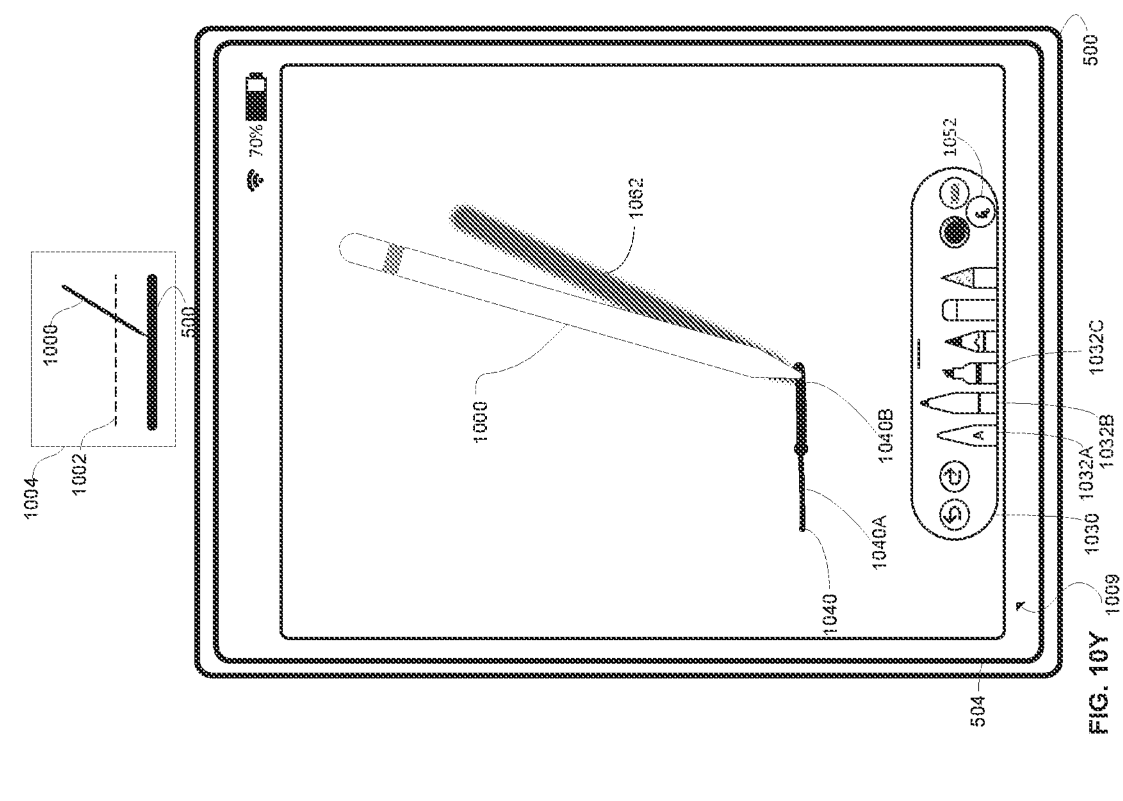
Figure 10A:
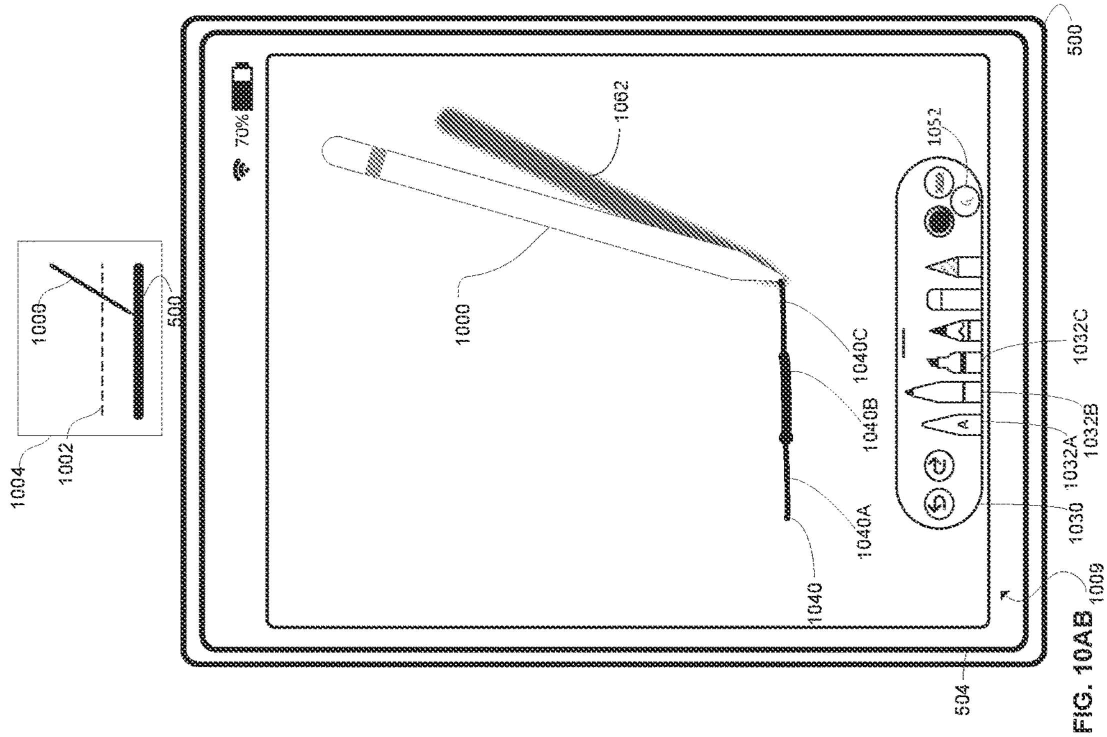
Figure 10A:
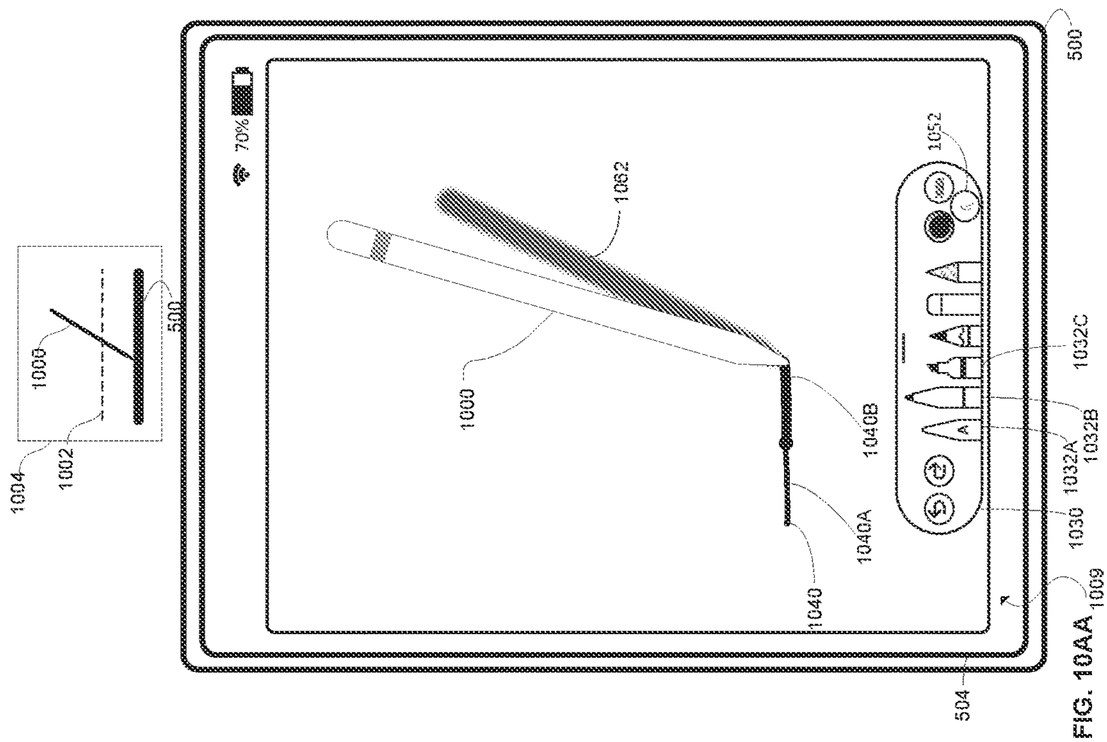
Figure 10A:
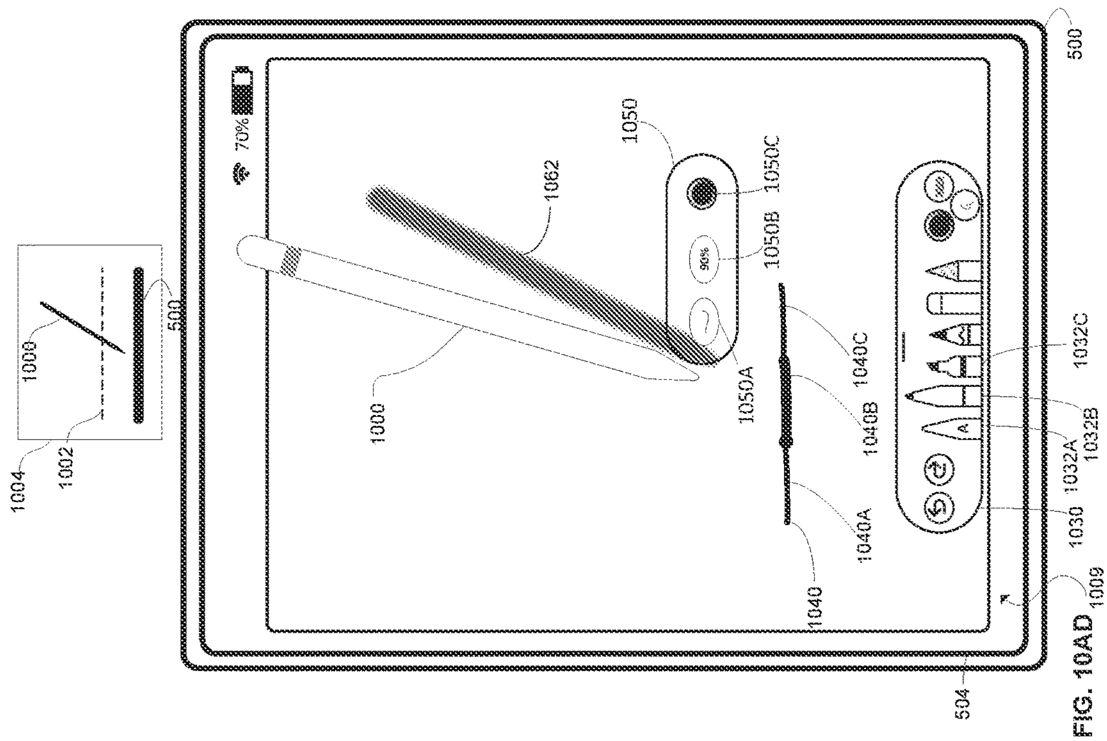
Figure 10A:
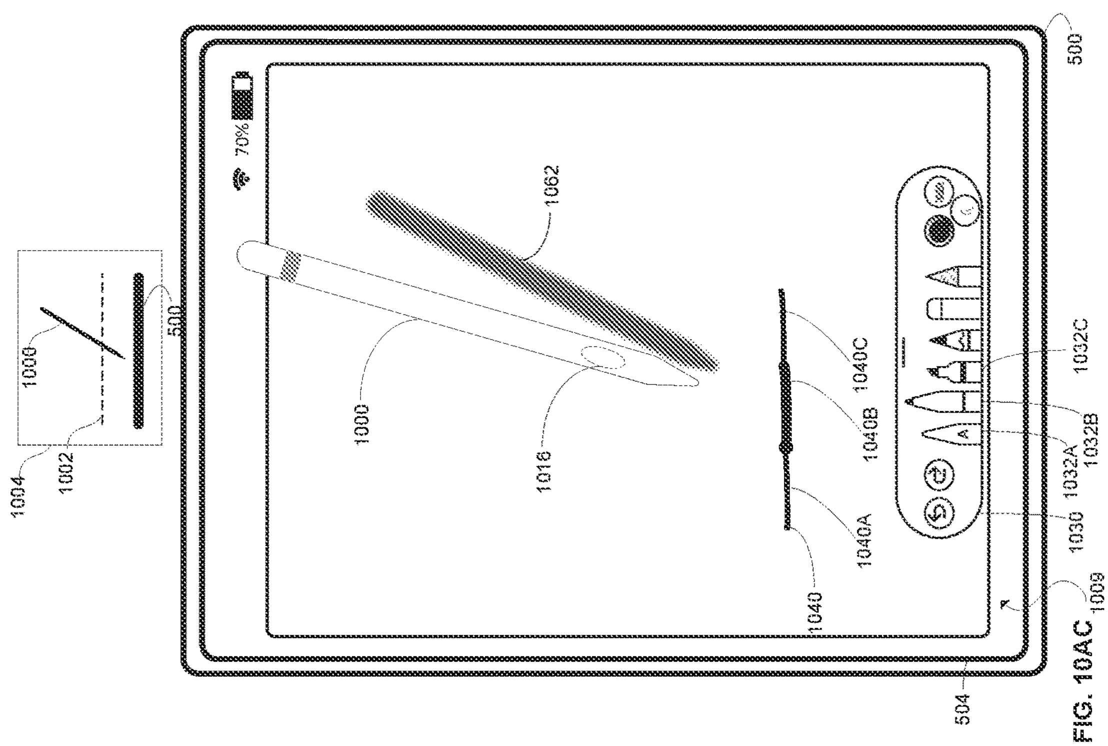
Figure 10A:
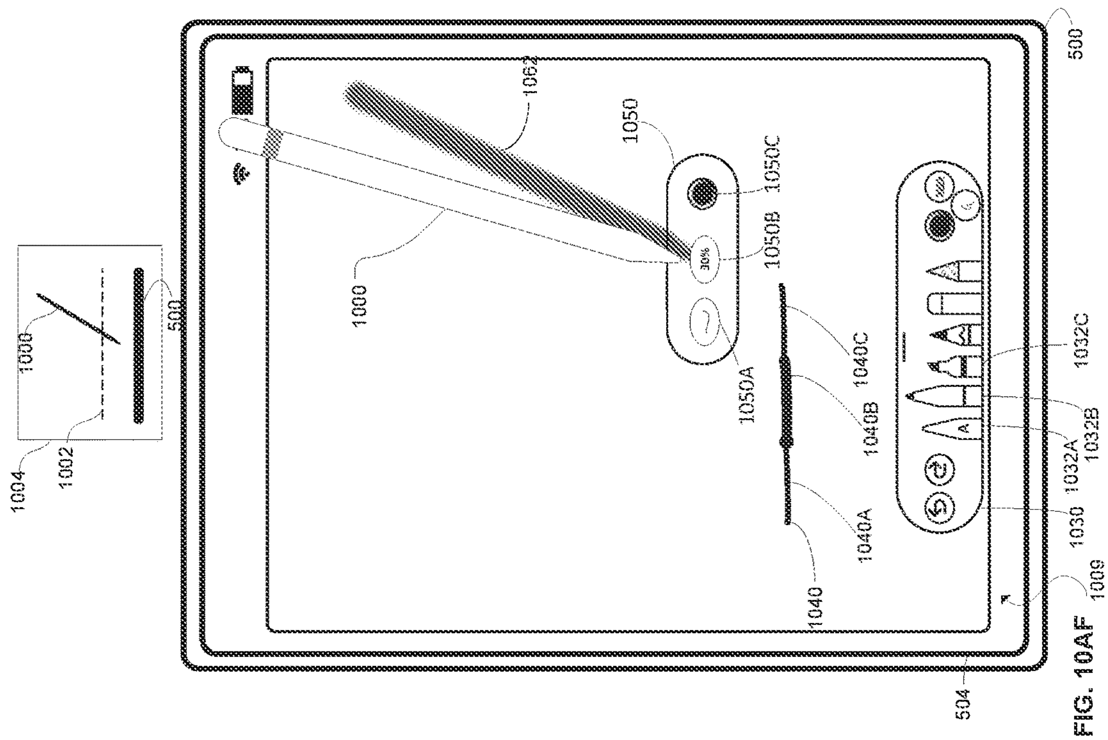
Figure 10A:
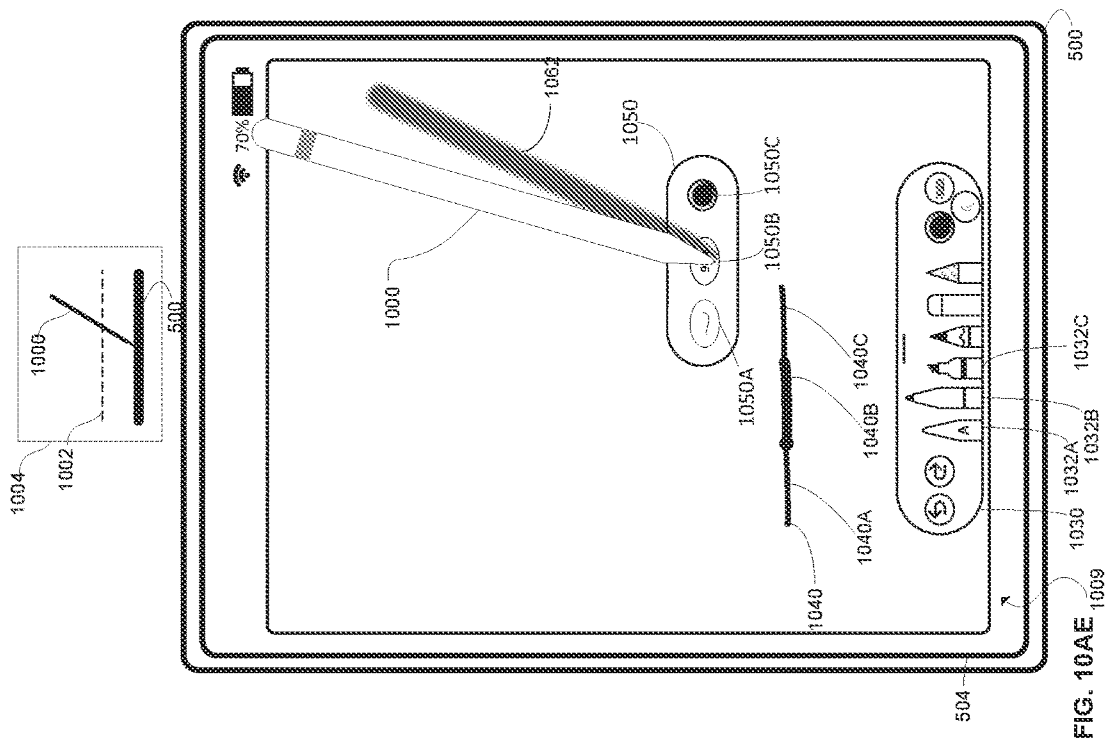
Figure 10A:
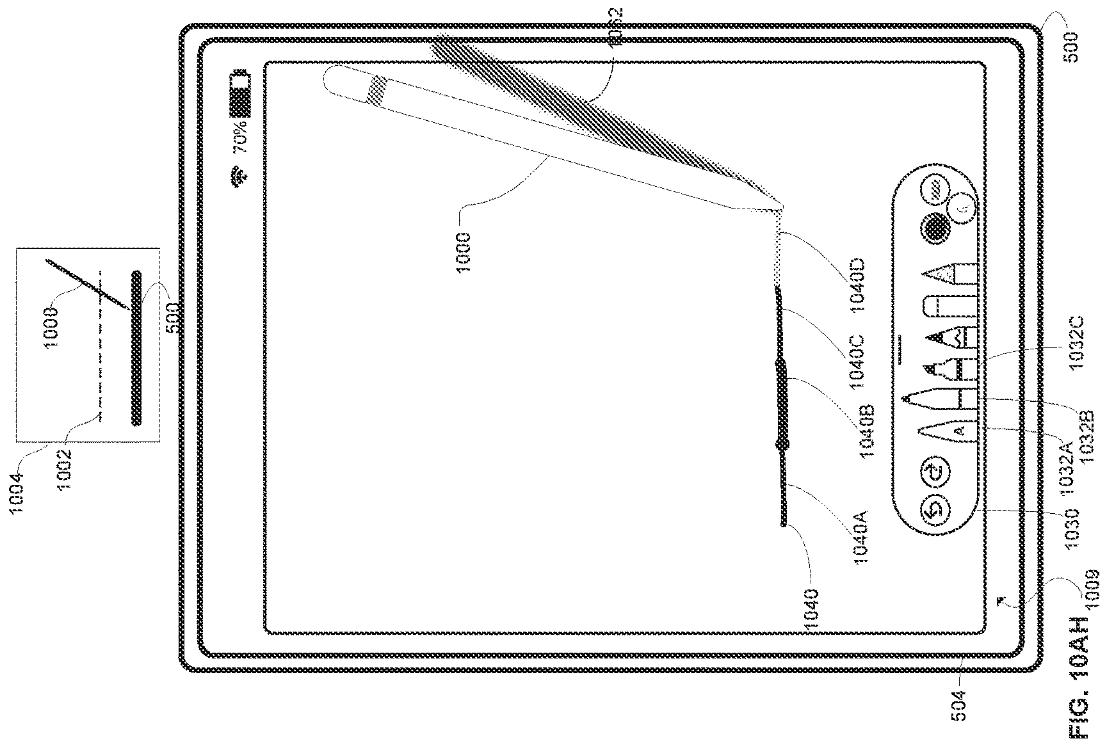
Figure 10A:
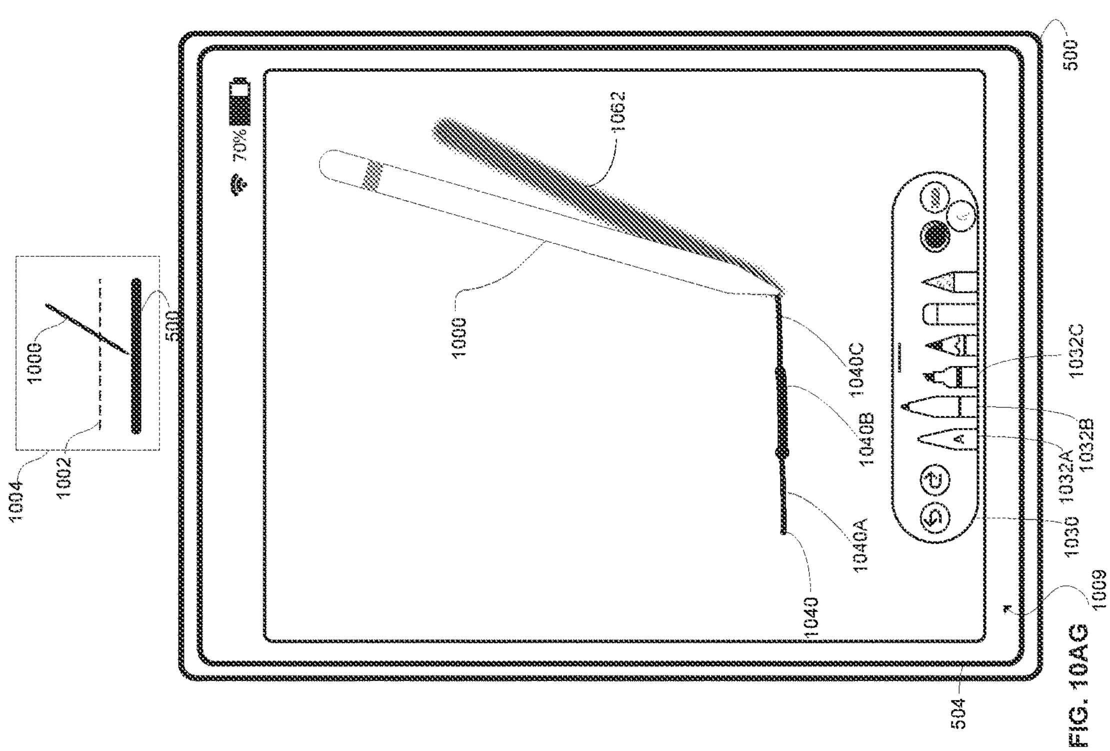
Figure 10A:
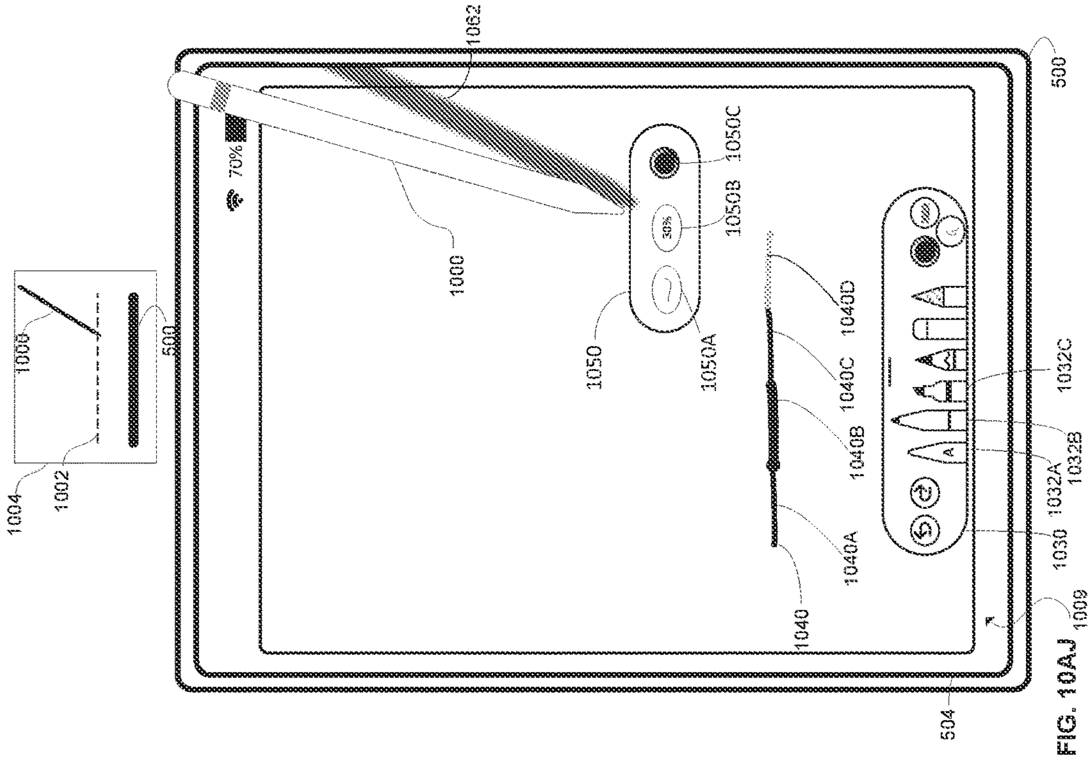
Figure 10A:
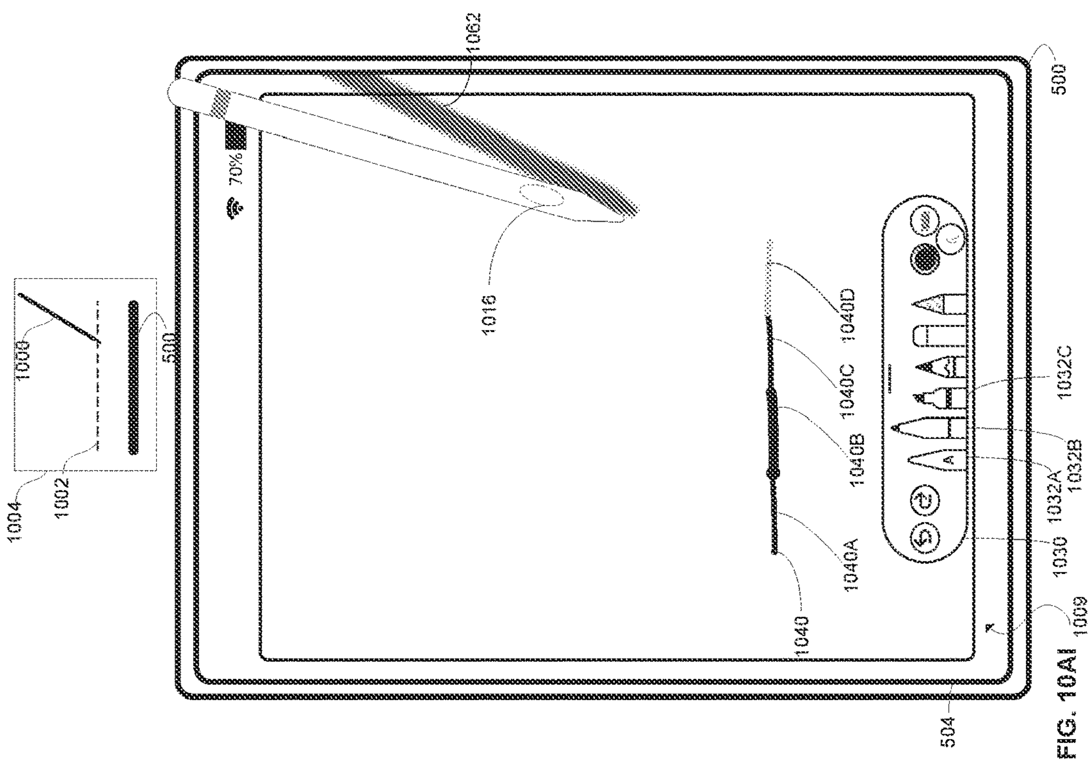
Figure 10A:
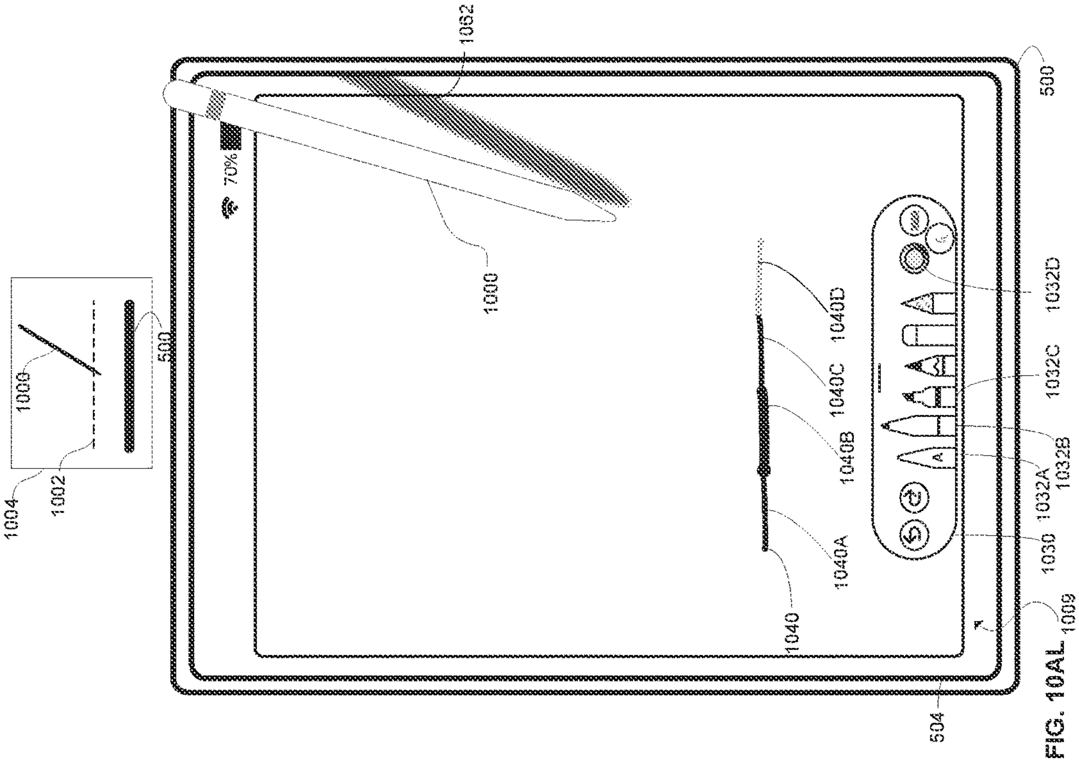
Figure 10A:
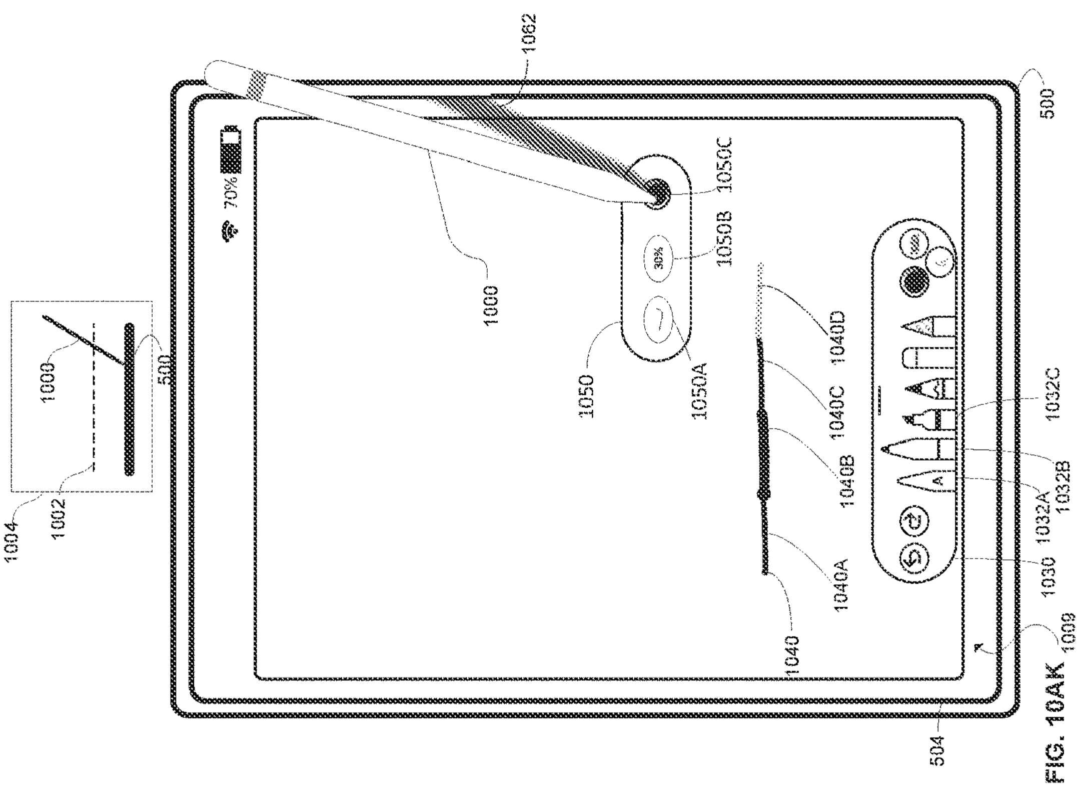
Figure 10A:
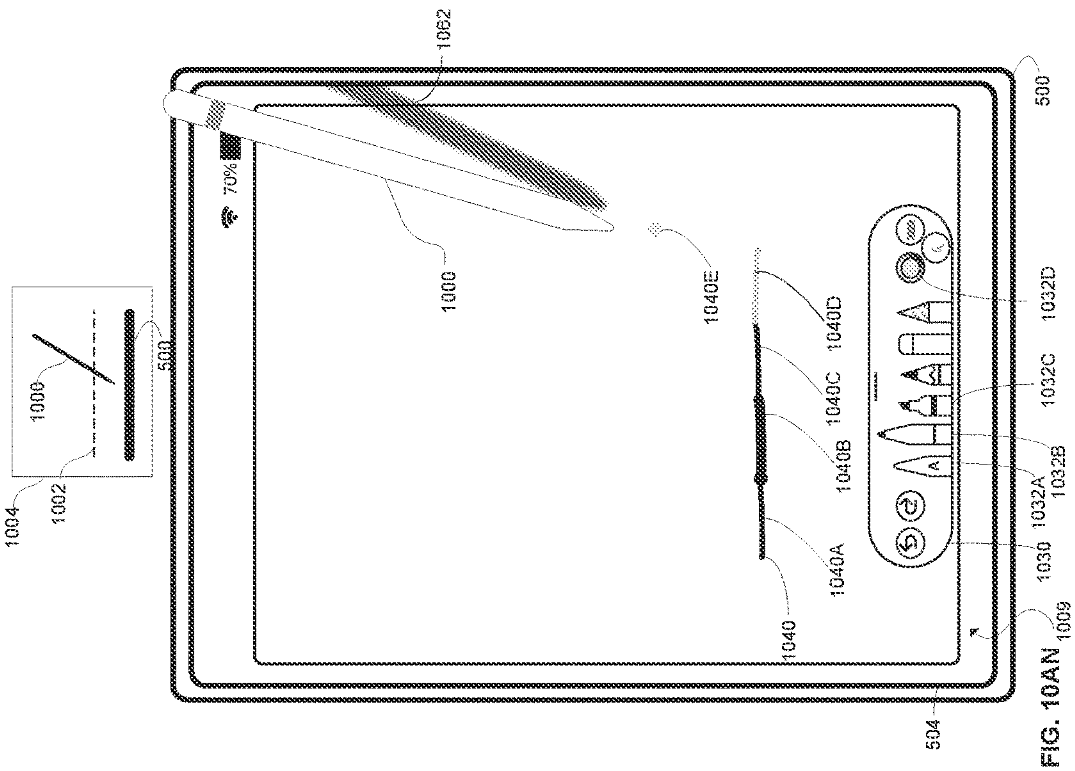
Figure 10A:
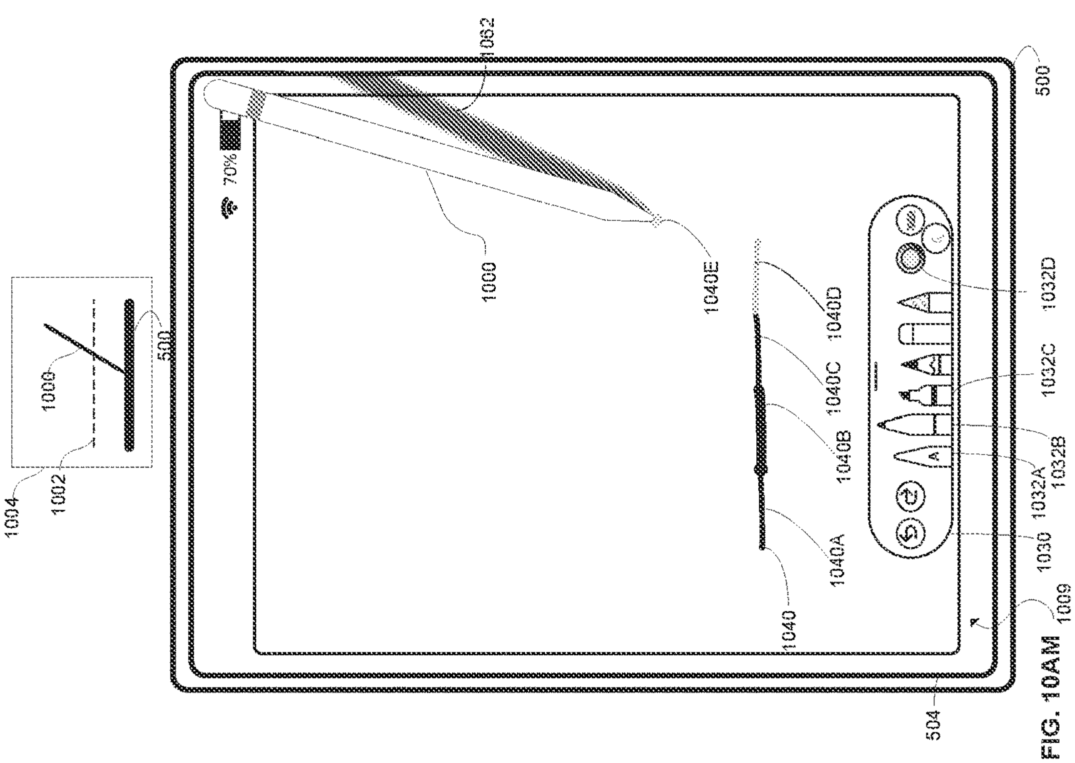
Figure 10A:
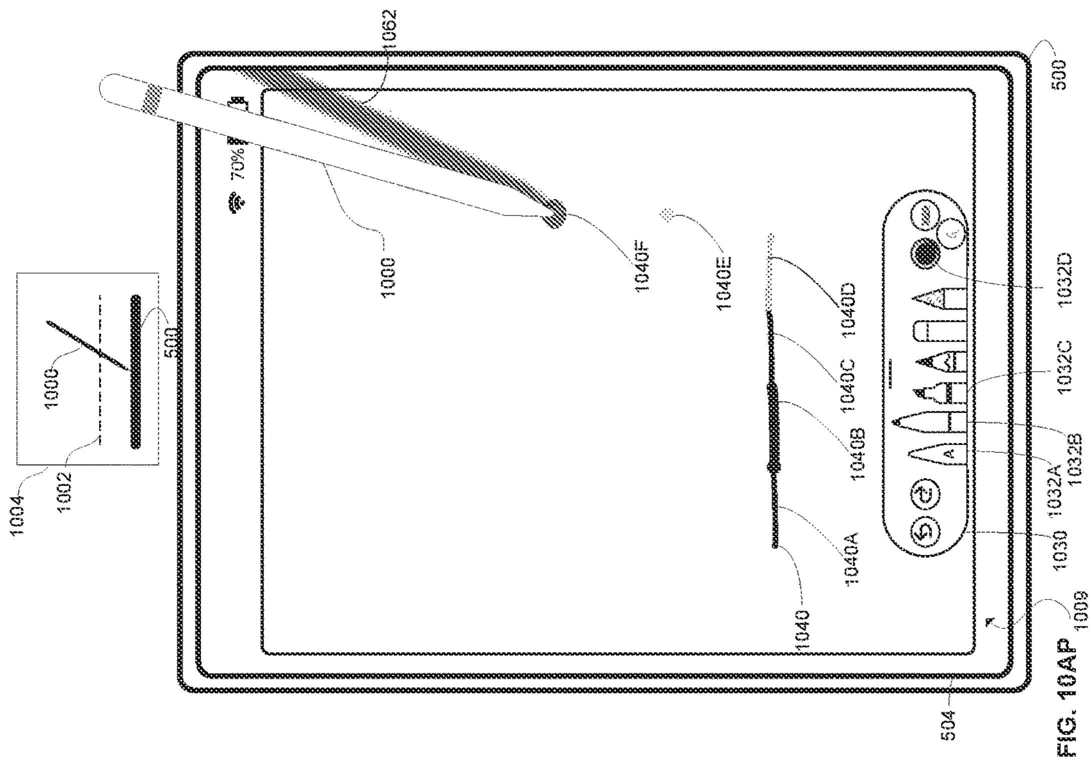
Figure 10A:
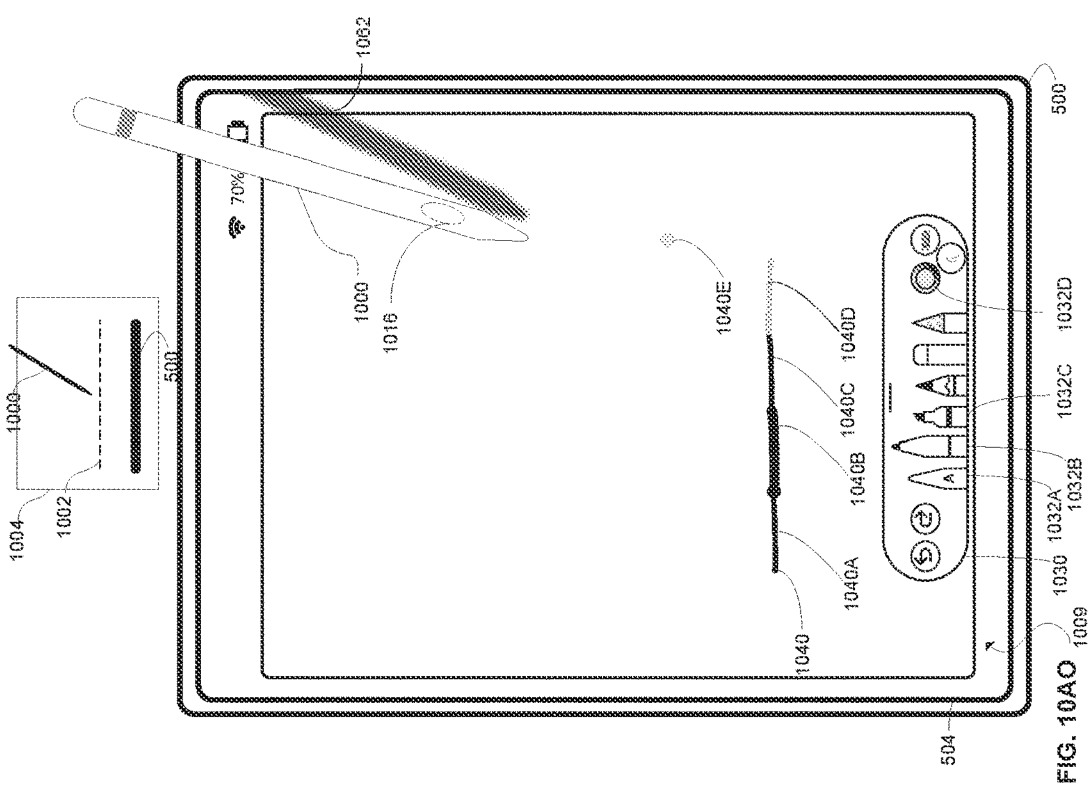
Figure 11A:
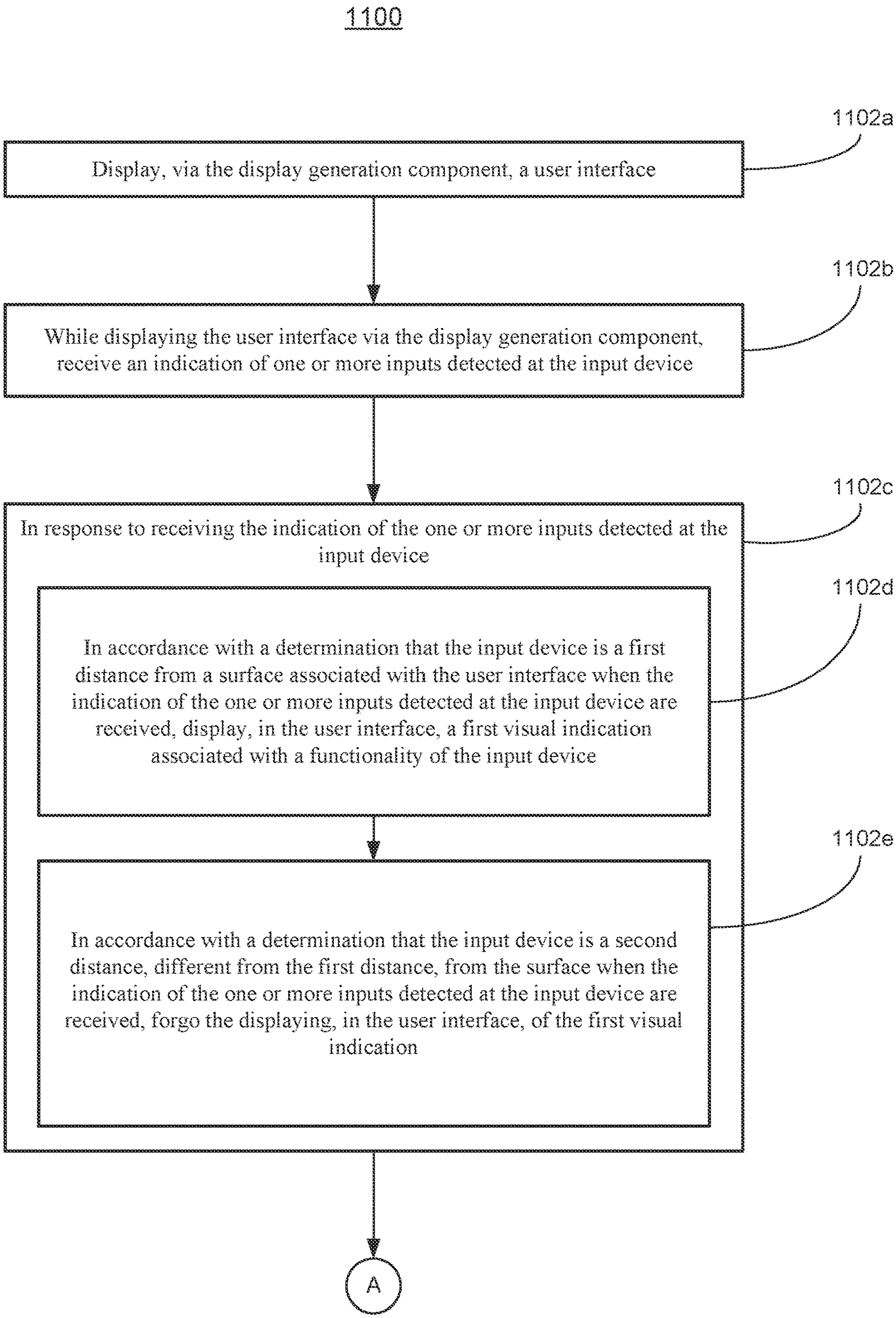
FIGS. 11A-11H are flow diagrams illustrating a method of performing contextual actions in response to input provided from an input device in accordance with some embodiments.
Figure 11B:
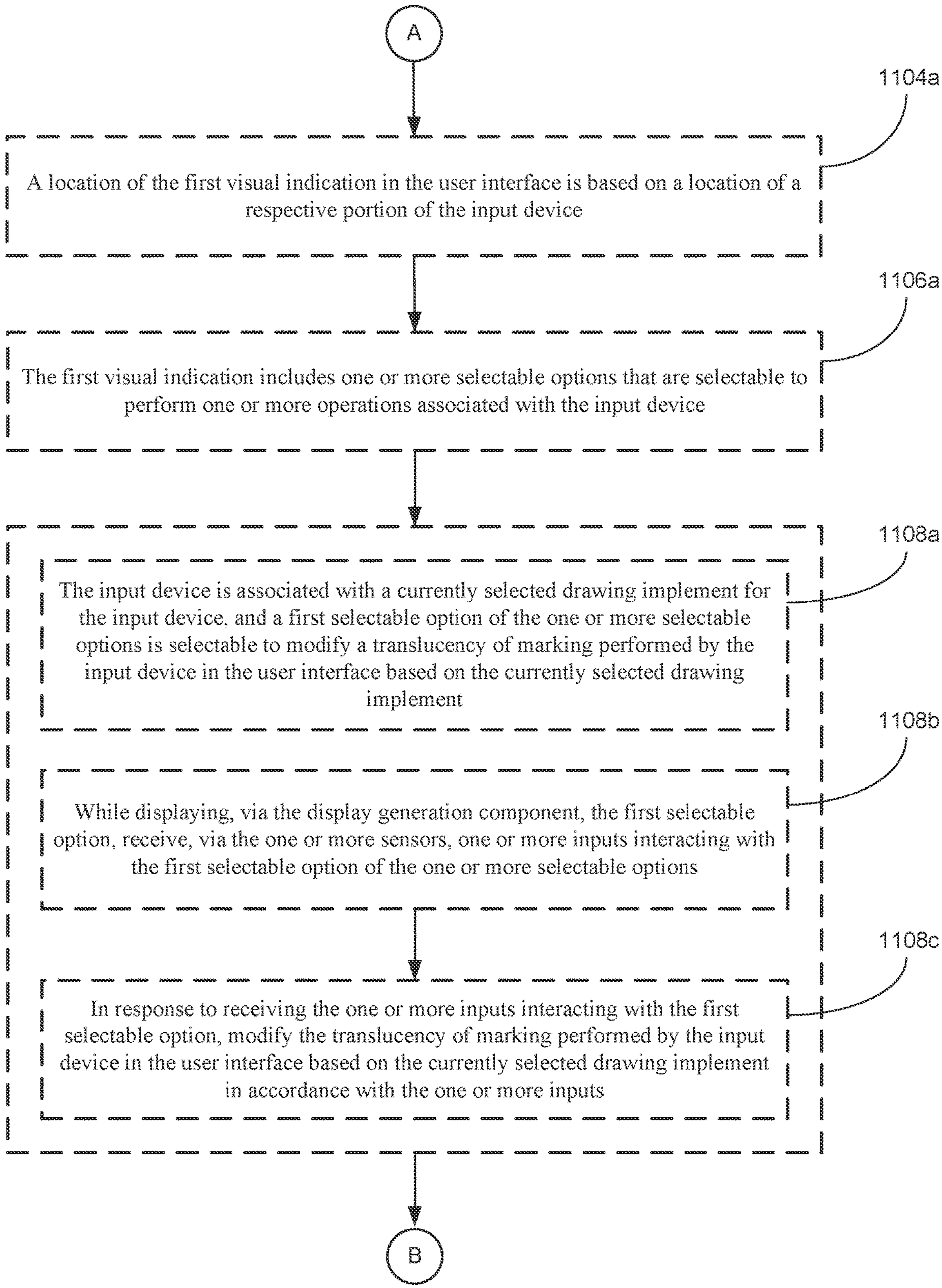
Figure 11C:
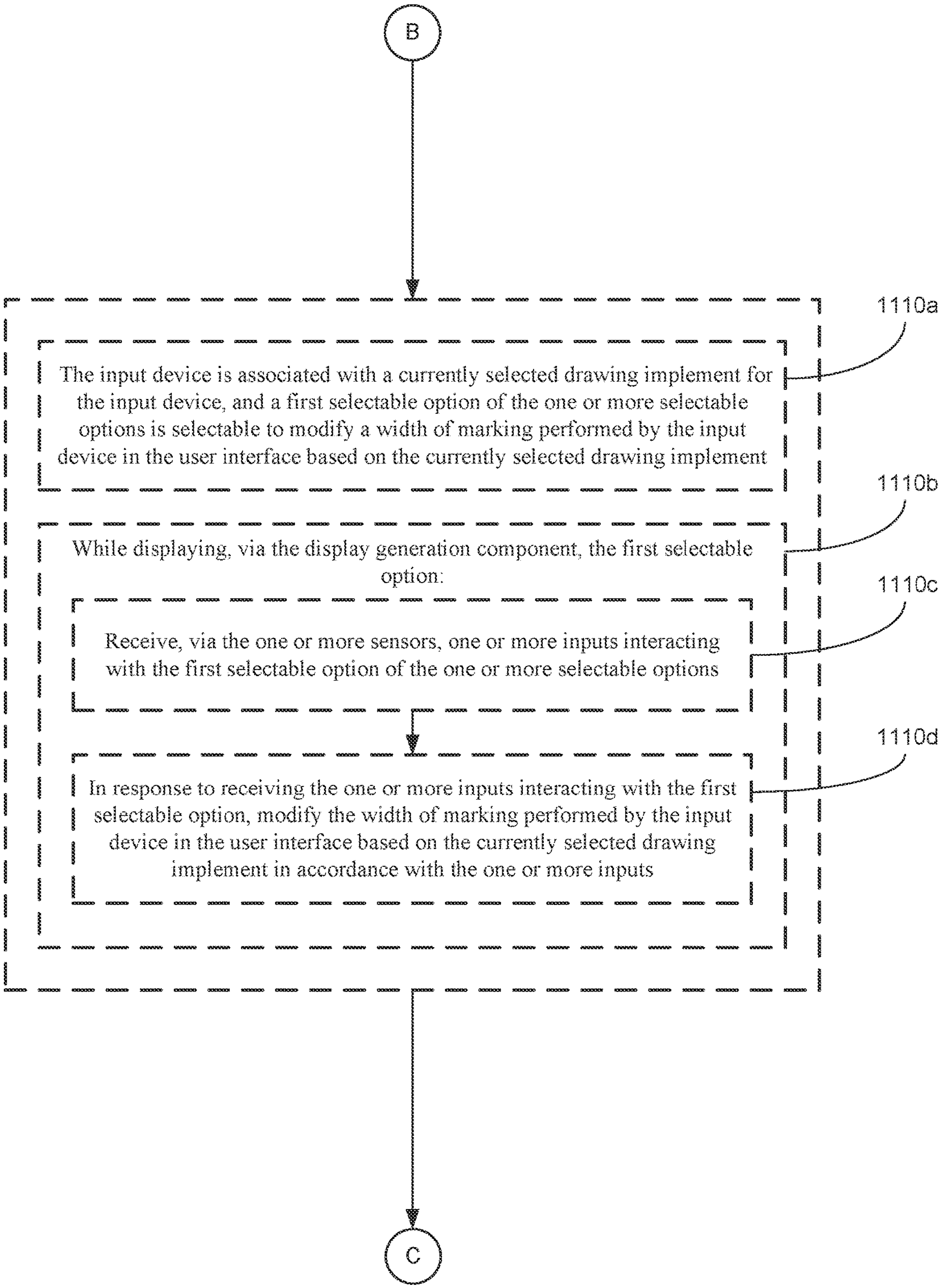
Figure 11D:
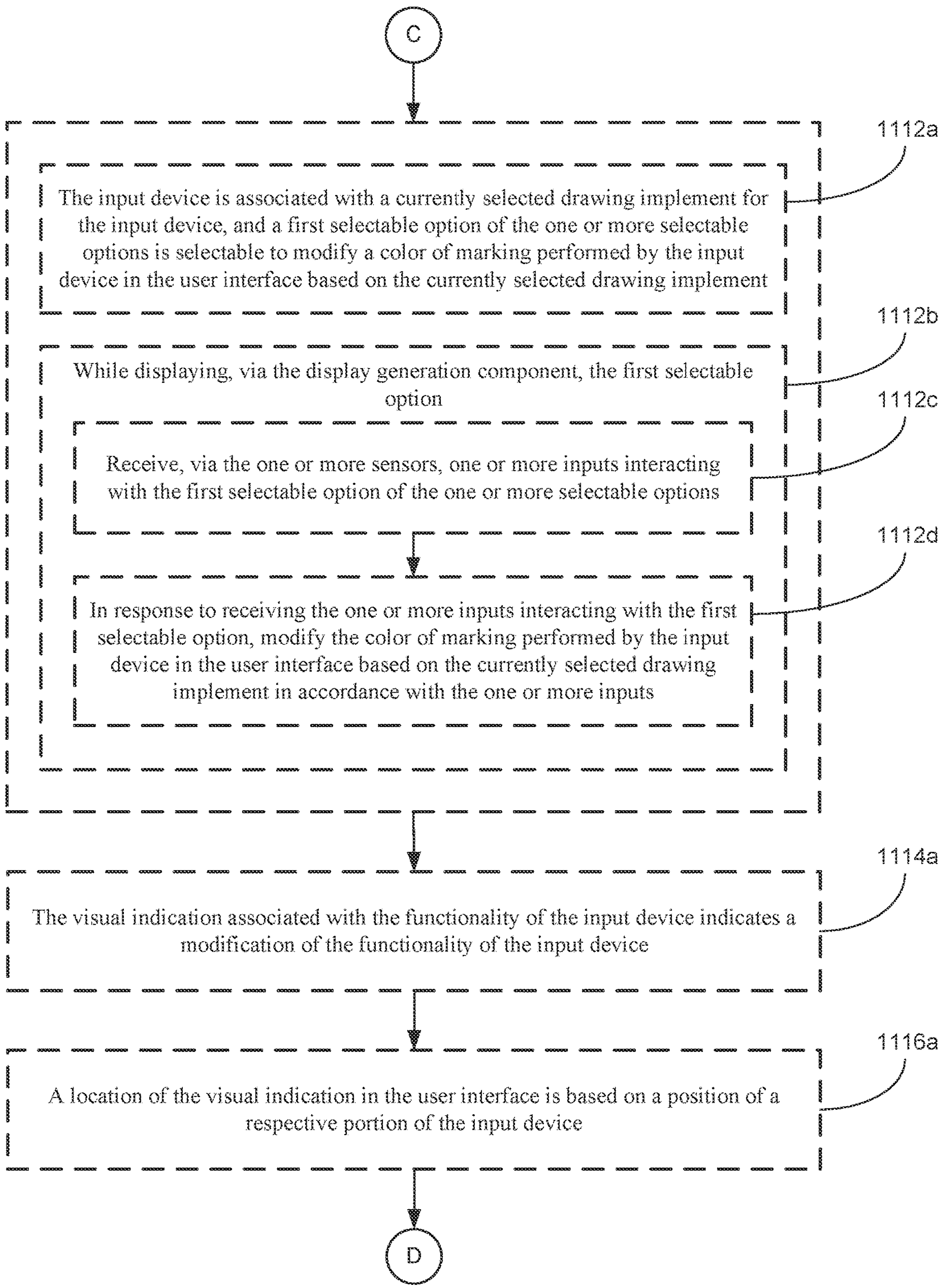
Figure 11E:
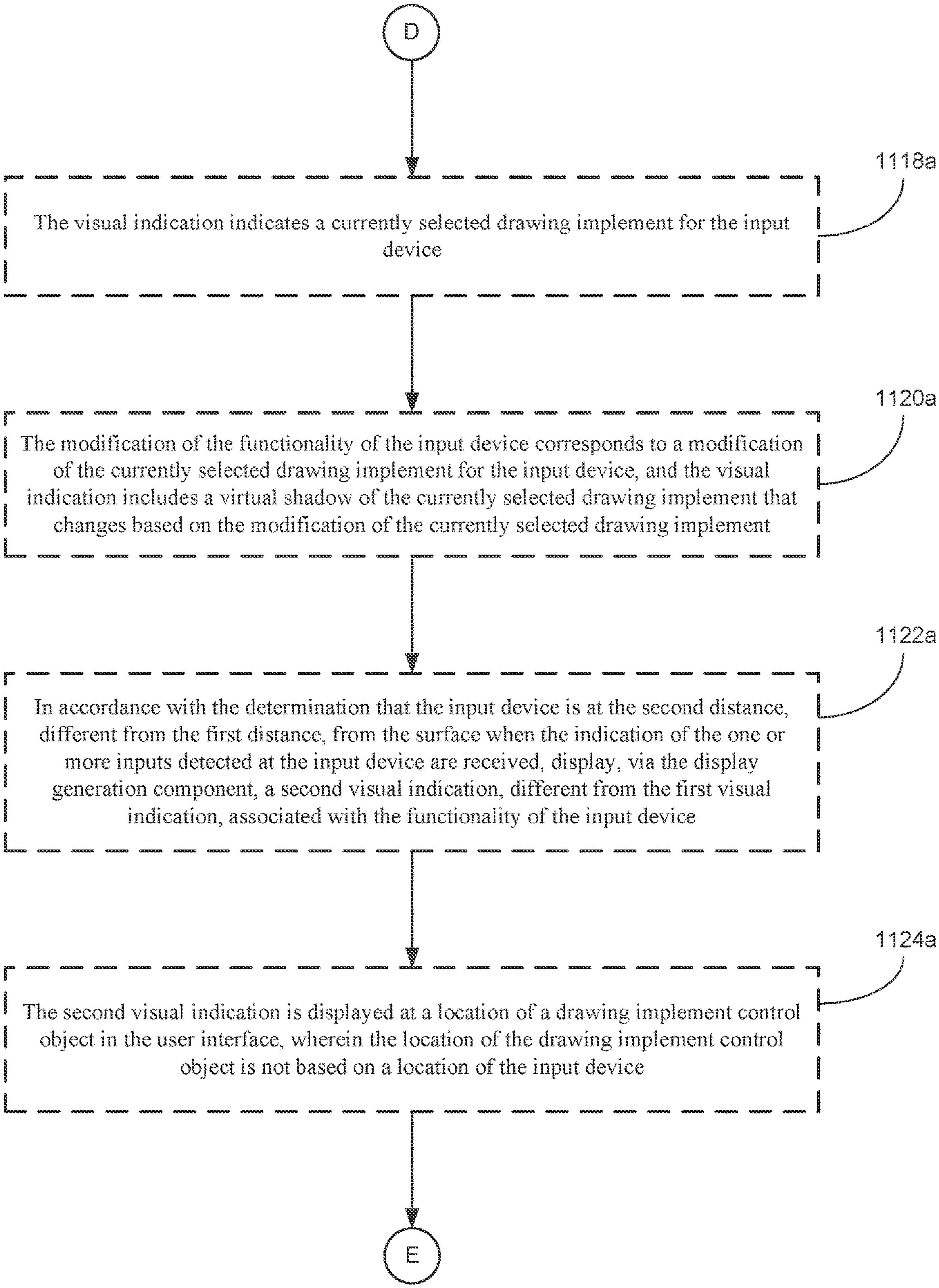
Figure 11F:
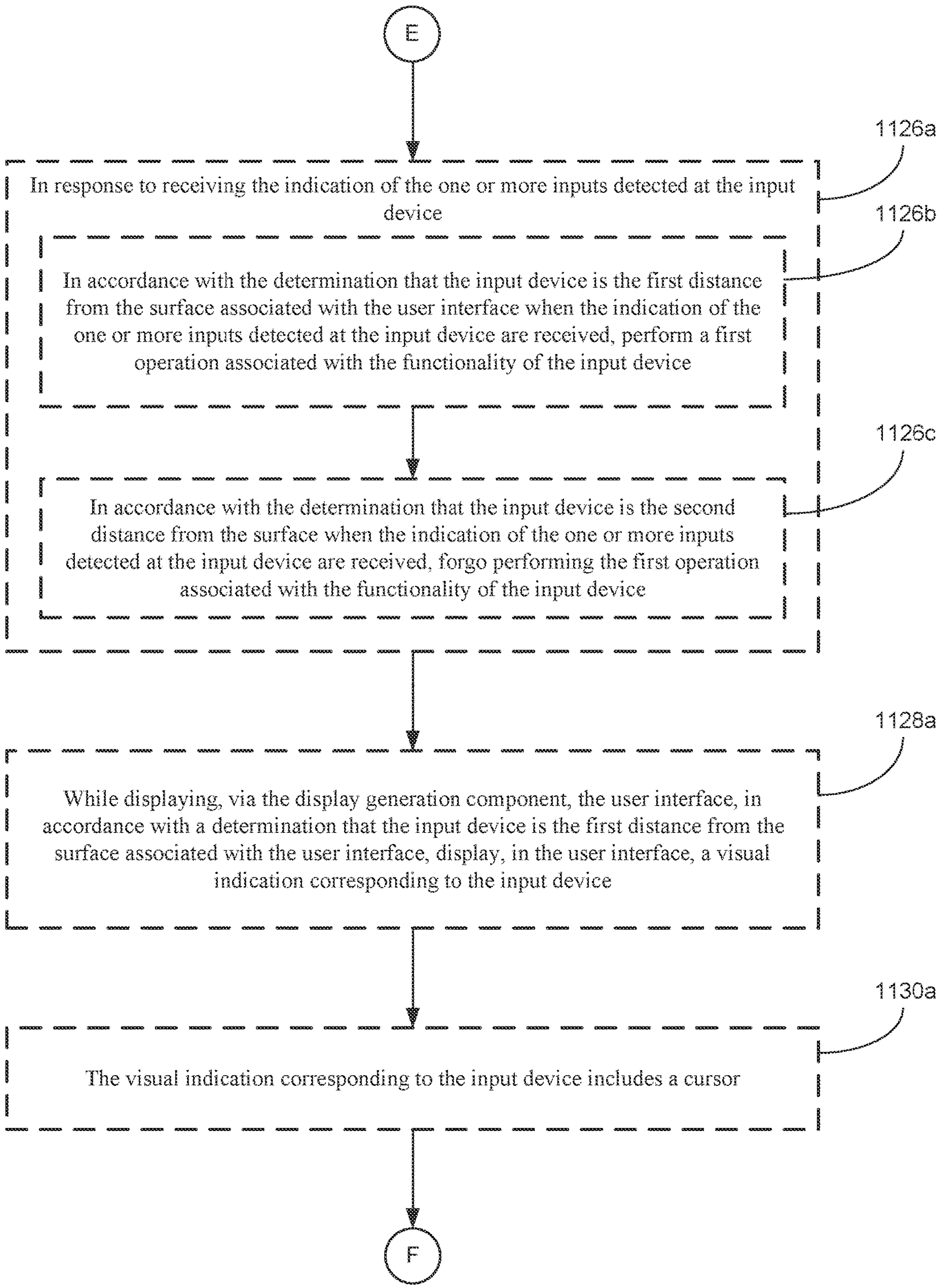
Figure 11G:
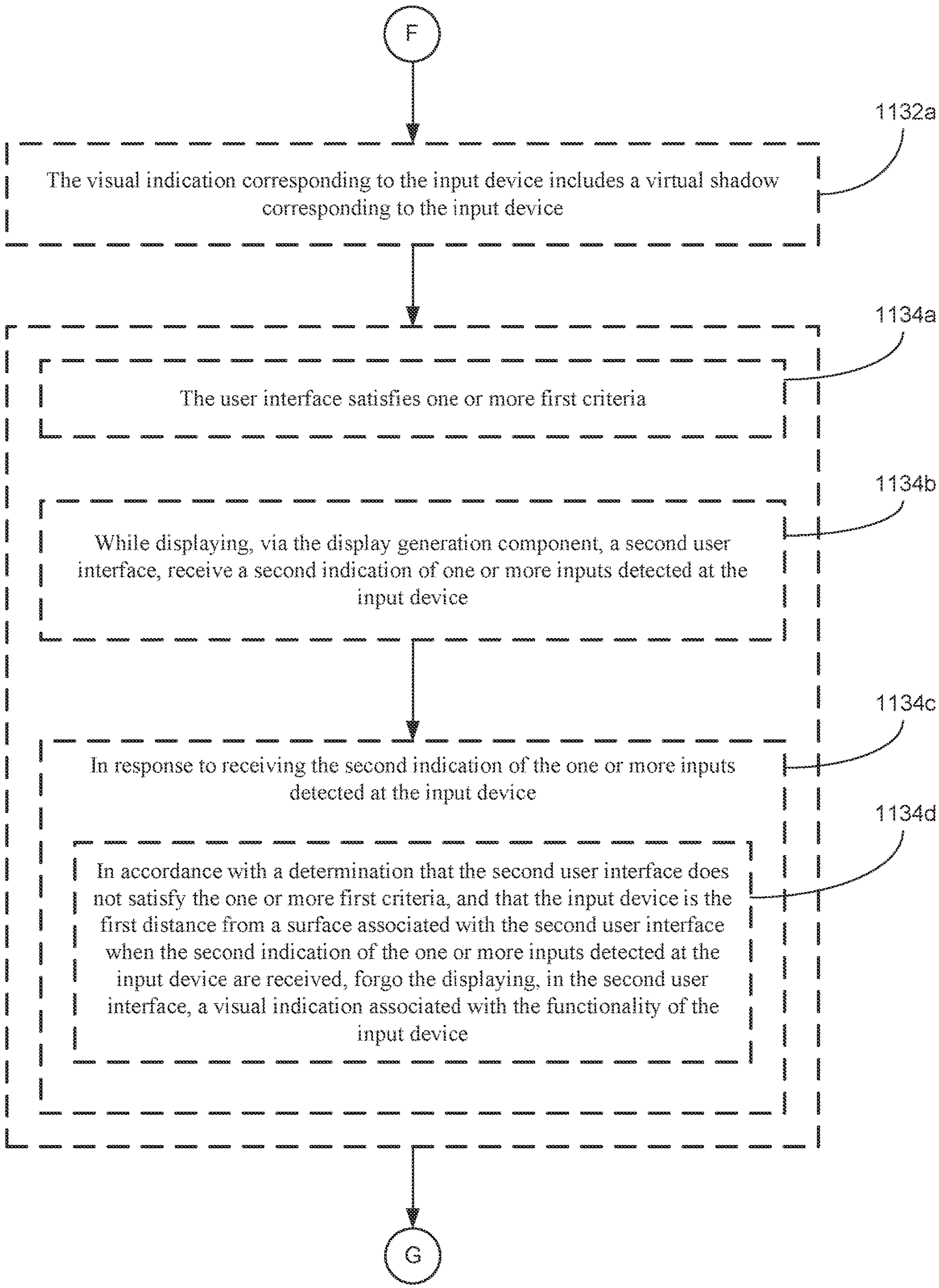
Figure 11H:
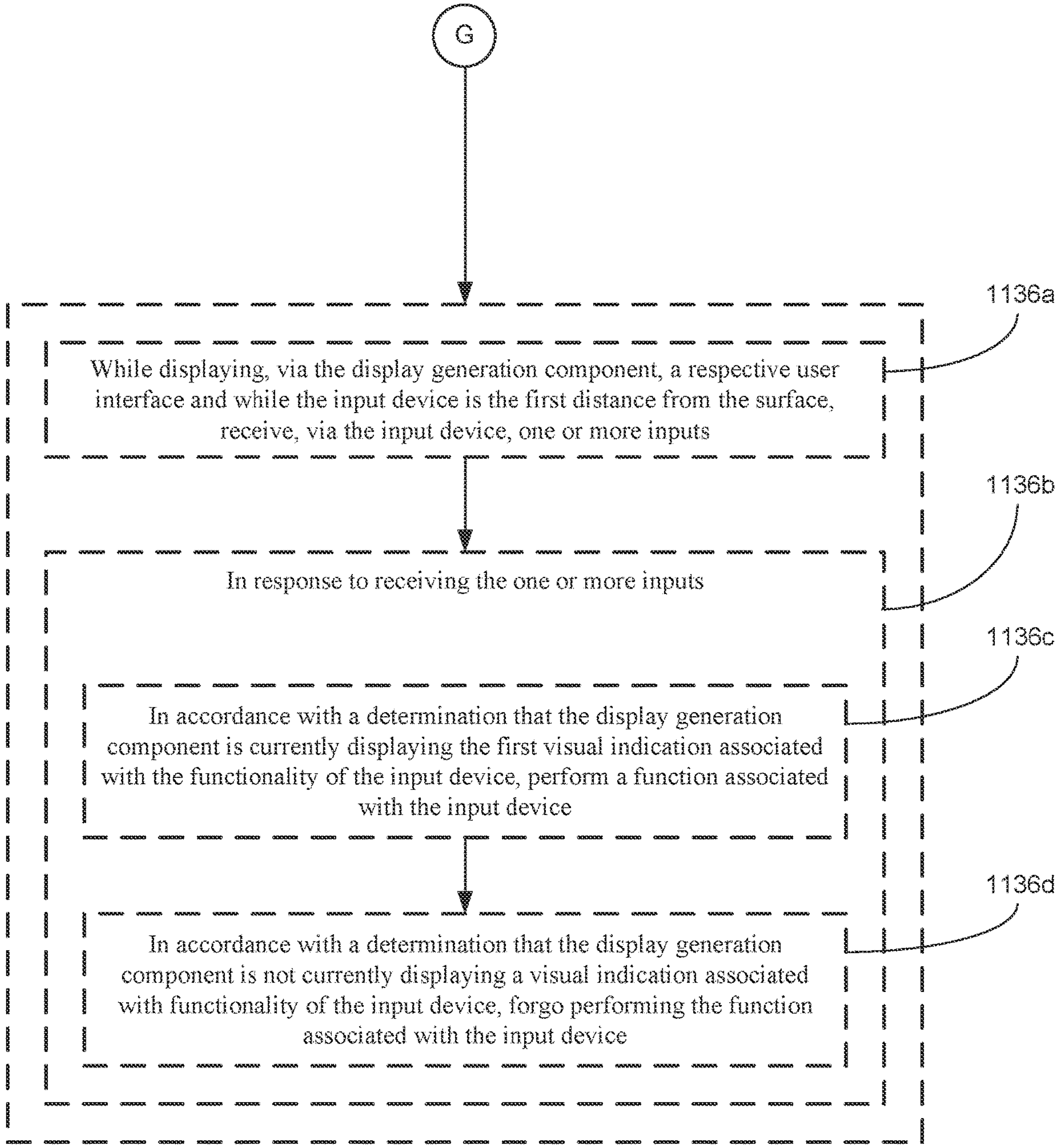

In FIG. 10Z, stylus 1000 is moved outside of hover threshold 1002, and an indication of one or more inputs received at stylus 1000 corresponding to gesture 1016 is detected. In response to the indication, an operation to modify the mark width is initiated. Thus, in some embodiments, the same operation that is performed in response to receiving the indication while stylus 1000 is within the over threshold 1002 is performed in response to the indication of one or more inputs while stylus 1000 is outside of hover threshold 1002. In some embodiments, the visual feedback is only displayed at palette 1030 (e.g., as shown in preview mark in control 1052 in FIG. 10AA), and not at a portable palette as described in FIGS. 10S-10W (e.g., because the portable palette 1050 is not displayed in response to input 1016 on stylus 1000 when stylus 1000 is outside of hover threshold 1002). In some embodiments, the operation performed in response to the indication of input 1016 reverts the currently selected drawing implement to a state prior to the last detected modification (e.g., the previous modification with respect to FIG. 10Z is the increase in mark width described with respect to FIGS. 10U-10V). In FIG. 10AA, preview mark in control 1052 is updated to appear thinner, in accordance with the modification to the line width of the currently selected drawing implement. Accordingly, in FIG. 10AB, third mark 1040C is displayed with the same line width as mark 1040A in response to detecting movement of stylus 1000 across touch screen 504.

In FIG. 10AC, lift-off of stylus 1000 from touch screen 504 is detected, and an indication of one or more stylus inputs described with respect to FIG. 10J (corresponding to gesture 1016) is detected. In accordance with a determination that the stylus 1000 is within the hover threshold 1002 when the indication is detected, the portable control palette 1050 is displayed proximate to the projected position of the tip of stylus 1000 in the user interface 1009, as shown in FIG. 10AD. In FIG. 10AE, display of the portable control palette 1050 is maintained at its initially displayed position, and stylus 1000 is moved to correspond to translucency modifier 1050B. In some embodiments, visual emphasis is displayed by device 500 as described previously with respect to width modifier 1050A and FIG. 10V in accordance with the tip of stylus 1000 corresponding to translucency modifier 1050B. In FIG. 10AF, after detecting selection and/or modification of translucency modifier 1050B, the translucency of marks made in response to detecting stylus contact is increased (e.g., the opacity is decreased from 90% to 30%), as indicated in option 1050B in FIG. 10AF. In FIG.

10AG, contact between stylus 1000 and touch screen 504 is detected, and in FIG. 10AH fourth mark 1040D is displayed in accordance with movement of stylus 1000 across touch screen 504. In accordance with the currently selected increased translucency, fourth mark 1040D is a more translucent mark in the content entry region of user interface 1009 than the other currently displayed marks.

In FIG. 10AI, stylus 1000 lifts-off from touch screen 504 and remains at a position within threshold distance 1002, and an indication of one or more stylus inputs corresponding to gesture 1016 are detected. In response to the indication, as shown in FIG. 10AJ, portable control palette 1050 is displayed in the user interface 1009 at a position corresponding to the tip of stylus 1000. In FIG. 10AK, an indication of selection of color modifier 1050C is received. As described with respect to width modifier 1050A and translucency modifier 1050B, selection and/or modification of the color of marks made in user interface 1009 directed to additional modifier selectable options are optionally received. Accordingly, in FIG. 10AL, color preview 1032D is modified to reflect a new, currently selected color of the marks. In FIG. 10AM, contact between stylus 1000 and touch screen 504 is detected, and fifth mark 1050E is displayed in response to the contact having the modified color reflected by color preview 1032D. In FIG. 10AN, lift-off of stylus 1000 from touch screen 504 is detected, and fifth mark 1050E is maintained.

In FIG. 10AO, stylus 1000 is moved to a position not corresponding to the position of fifth mark 1050E described with respect to FIGS. 10AM and 10AN, outside of the hover threshold 1002. An indication of one or more stylus inputs described with respect to FIG. 10J corresponding to gesture 1016 is received, and in accordance with a determination that stylus 1000 is outside hover threshold 1002 when the indication is received, an operation is performed that does not include display of visual feedback in a portable control palette. For example, because stylus 1000 is outside hover threshold 1002, color preview 1032D is updated in control palette 1030, as shown in FIG. 10AP, but is not updated in a portable control palette because the portable control palette is not displayed. In response to a detection of contact between stylus 1000 and touch screen 504 in FIG. 10AP, sixth mark 1040F is displayed in accordance with the modified color reflected in color preview 1032D (e.g., as opposed to causing a change in one or more characteristics of the currently selected drawing implement in response to contact between stylus 1000 and touch screen 504, such as in FIG. 10V, 10AE or 10AK, because portable palette 1050 was not displayed when the contact between stylus 1000 and touch screen 504 was detected in FIG. 10AP). Thus, in some embodiments, detection of contact of stylus 1000 and touch screen 504 that otherwise modifies or initiates modification of characteristics of marks in the user interface is forgone because the requisite interactable element—a portable control palette—is not displayed, therefore, such a modification is not performed.

FIGS. 11A-11I are flow diagrams illustrating a method 1100 of performing contextual actions in response to input provided from an input device. The method 1100 is optionally performed at an electronic device such as device 100, device 300, and device 500 as described above with reference to FIGS. 1A-1B, 2-3, 4A-4B and 5A-5I. Some operations in method 1100 are, optionally combined and/or order of some operations is, optionally, changed.

As described below, the method 1100 provides ways to perform contextual actions in response to input provided from an input device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 1100 is performed at an electronic device in communication with a display generation component, an input device and one or more sensors (e.g., a touch-sensitive surface). In some embodiments, the electronic device has one or more of the characteristics of the electronic devices of methods 700 and/or 900. In some embodiments, the display generation component has one or more of the characteristics of the display generation components of methods 700 and/or 900. In some embodiments, the input device has one or more of the characteristics of the input devices of methods 700 and/or 900. In some embodiments, the one or more sensors has one or more of the characteristics of the one or more sensors of methods 700 and/or 900.

In some embodiments, the electronic device displays (1102*a*), via the display generation component, a user interface, such as the user interface shown in FIG. 10R. For example, the user interface is optionally a system user interface of the electronic device (e.g., a home screen interface, such as illustrated in FIG. 4A), a user interface of a content creation application (e.g., a drawing user interface), a user interface of a note taking application, a content browsing user interface, or a web browsing user interface. In some embodiments, the user interface has one or more of the characteristics of the user interfaces of methods 700, 900 and/or 1300.

In some embodiments, while displaying the user interface via the display generation component, the electronic device receives (1102*b*) an indication of one or more inputs detected at the input device, such as input 1016 in FIG. 10R. In some embodiments, the input device is a stylus in communication with the electronic device, and is configured to receive one or more inputs using sensors in communication with or included within the stylus. For example, the stylus optionally is configured with touch sensing circuitry (e.g., resistive, capacitive, piezoelectric, and/or acoustic sensors) to detect touch input and/or gestures from one or more fingers interacting with the stylus. The touch input and/or gestures optionally include a sequence of tapping of a finger on a housing of the stylus and/or motions (e.g., swipe movements of one or more fingers) along the housing of the stylus. In response to the stylus detecting the touch input and/or gestures, the electronic device optionally receives (from the stylus) an indication corresponding to the receipt of the touch input and/or gestures by the stylus or other devices in communication with the electronic device and/or the stylus.

In some embodiments, in response to receiving the indication of the one or more inputs detected at the input device (1102*c*) (e.g., as described with respect to step(s) 1102, herein), in accordance with a determination that (e.g., a tip of) the input device is a first distance from a surface associated with the user interface (e.g., the touch-sensitive surface, a physical surface on which the user interface is projected, or a virtual surface corresponding to at least a portion of the user interface) when the indication of the one or more inputs detected at the input device are received, such as within threshold distance 1002 of device 500 in FIG. 10R, the electronic device displays (1102*d*), in the user interface, a first visual indication associated with a functionality of the input device, such as control element 1050 in FIG. 10S. In some embodiments, the input device and/or electronic device is configured to determine a first distance between the surface and the input device. The first distance is optionally within a threshold distance of the surface, optionally set by a user of the electronic device (e.g., 0.1, 0.3, 0.5, 1, 3, 5, 10, 30, 50 or 100 cm). In some embodiments, when the input device is within the threshold distance, a visual representation such as a virtual shadow corresponding to a profile of the input device and/or a characteristic of the input device (e.g., a tip of a simulated drawing and/or writing implement) is optionally displayed simultaneously or in quick succession, such as described in more detail below in step(s) 1114-1120 and/or with reference to method 900. In some embodiments, in response to determining the indication of the one or more inputs is received while the input device is, or within a threshold period of time (e.g., 1, 5, 7.5, 10, 25, 50, 75, 100, 200, or 500 ms) was located at, the first distance from the touch-sensitive surface, the electronic device initiates display of a visual indication via the display generation component. The visual indication optionally is related to functionality of the electronic device, and optionally includes display of selectable options to initiate performance of functions of the electronic device. For example, while displaying a content creation application (e.g., a drawing user interface), the visual indication includes one or more selectable options to modify characteristics of inputs (e.g., handwritten inputs) received from the input device. The characteristics optionally include thickness of strokes rendered in response to the one or more inputs and/or in response to the input device contacting the surface and/or moving while in contact with the surface, and/or characteristics of a simulated drawing and/or writing implement simulated by the input device (e.g., a marker, a pencil, a highlighter, a painting brush, or a pen). In some embodiments, further information is displayed in response to receiving a selection of the one or more selectable options including textual and/or graphical feedback corresponding to the selection. The textual feedback optionally includes a label identifying the selected change in the characteristics of the simulated drawing and/or writing implement (e.g., the line thickness, the selected drawing and/or writing implement, or a color of simulated handwritten input). The visual indication optionally is displayed at a predetermined position on the display (e.g., a menu ribbon at a periphery of the displayed user interface) or optionally at a position relative to the input device, as will be described in more detail below with reference to step(s) 1120-1126.

In some embodiments, in accordance with a determination that the (e.g., tip of the) input device is a second distance, different from (e.g., greater than or less than) the first distance (e.g., the input device is further than the above-described threshold distance from the surface), from the surface when the indication of the one or more inputs detected at the input device are received (e.g., as described with respect to step(s) 1102), the electronic device forgoes (1102*e*) the displaying, in the user interface, of the first visual indication, such as not displaying control element 1050 in FIG. 10Z in response to detecting input 1016 on input device 1000. In some embodiments, instead of displaying the first visual indication, a second, different visual indication is displayed and/or an operation is performed, as described in more detail below with reference to step(s) 1120-1126. For example, within a content creation application user interface, a predetermined function optionally set by a user is performed in response to receiving the indication of the one or more inputs. Displaying the above-described visual indication reduces the number of user inputs required to guide a user to initiate operations of the electronic device and avoids display of additional visual elements required for such guidance, thus decreasing processing power and computational complexity when initiating such operations.

In some embodiments, a location of the first visual indication in the user interface is based on a location of a respective portion of the input device (1104*a*), such as the location of element 1050 in FIG. 10S being based on the location of the tip of input device 1000. For example, a perpendicular projection of the position of the tip of the input device onto the surface corresponds to a displayed position of the first visual indication in the user interface. In some embodiments, the user interface includes a content entry (e.g., drawing) region. In some embodiments, the first visual indication is displayed based on constraints of the display environment and/or display generation component. For example, the displayed position generally corresponds to a position below the position of the tip, however, when the tip of the device is proximate to a display boundary (e.g., the edges of a screen or a defined display region), the displayed position is adjacent to, or above the tip. Displaying the visual indication based on a location of the input device displays the visual indication at a location likely to be seen by the user, thereby increasing the likelihood that the visual indication will be seen and reducing subsequent erroneous interaction with the electronic device.

In some embodiments, the first visual indication includes one or more selectable options that are selectable to perform one or more operations associated with the input device (1106*a*), such as options 1050A, 1050B, 1050C in FIG. 10S. For example, the visual indication is a control palette when the one or more inputs are received at the input device while displaying a content entry (e.g., drawing and/or writing) user interface. The control palette optionally includes one or more selectable options associated with altering marks made in response to input from the input device, for example, the appearance of handwritten input displayed in response to strokes from a stylus. In some embodiments, the one or more selectable options correspond to operations associated with modifying marks. For example, in response to receiving a selection of a first selectable option (e.g., contacting the surface with the tip of the input device at the location of the first selectable option), an operation to cease display or re-display previously ceased content (e.g., marks) is initiated. In some embodiments, in response to receiving a selection of the first selectable option (e.g., contacting the surface with the tip of the input device at the location of the first selectable option), a simulated writing implement is changed. For example, a currently selected simulated writing implement corresponds to a highlighter, pencil, eraser, pen, marker, or other writing implement, and the control palette includes selectable options corresponding to a subset, or all of the writing implements described herein. Selecting a respective selectable option corresponding to a first simulated writing implement optionally modifies the currently selected simulated writing implement to correspond to the first simulated writing implement. In some embodiments, one or more selectable options corresponds to operations to enhance the content entry experience, such as tools to guide content entry. For example, the control palette includes a selectable option, selectable to display a simulated guide (e.g., a ruler) in the user interface. The simulated guide optionally includes marks based on strokes of the input device (e.g., along the surface), but displays a cleaner (e.g., straighter) mark compared to the path of respective strokes. In some embodiments, the control palette includes one or more selectable options to modify appearances of marks made in response to the input device. Displaying the visual indication lowers the user's cognitive burden and reduces input needed to navigate through other user interface menus, thus reducing computational load and power consumption required to interact with such menus.

In some embodiments, the input device is associated with a currently selected drawing implement for the input device, and a first selectable option of the one or more selectable options is selectable to modify a translucency of marking performed by the input device in the user interface based on the currently selected drawing implement (1108*a*), such as option 1050B in FIG. 10S (e.g., as described previously with respect to step(s) 1106). The first selectable option optionally corresponds to modifying a translucency of marking performed by the input device.

In some embodiments, while displaying, via the display generation component, the first selectable option, the electronic device receives (1108*b*), via the one or more sensors, one or more inputs interacting with the first selectable option of the one or more selectable options, such as shown with input device 1000 contacting option 1050B in FIG. 10AE (e.g., as described previously with respect to step(s) 1106). In some embodiments, the one or more inputs include gestures (e.g., with a hand of a user) or other indications of selection, such as the gaze of a user, directed towards the first selectable option.

In some embodiments, in response to receiving the one or more inputs interacting with the first selectable option, the electronic device modifies (1108*c*) the translucency of marking performed by the input device in the user interface based on the currently selected drawing implement in accordance with the one or more inputs, such as shown in the mark 1040D displayed in FIG. 10AH. For example, a first drawing and/or writing implement having a first degree of translucency is currently selected, and the strokes of the input device across the surface corresponding to a request to display hand drawn input (e.g., makes contact with the surface, and while maintaining contact, moves across the surface) is detected. In response to receiving the request to display the hand drawn input, a first mark is displayed based on the currently selected (e.g., the first) simulated drawing and/or writing implement having the first degree of translucency. Receiving the input corresponding to selection of the first selectable option optionally corresponds to a request to modify the currently selected translucency of the drawing and/or writing implement from the first level of translucency to a second level of translucency, different from the first level of translucency. In response to a second request to display the hand drawn input, similar to the first request to display hand drawn input, a second mark is optionally displayed having the second degree of translucency. In some embodiments, the degree of translucency is not uniformly applied over a mark made in response to the currently selected drawing and/or writing implement. For example, the currently selected implement is a highlighter, and displayed marks optionally have a non-uniform translucency (e.g., respective portions of the mark have higher or lower degrees of translucency despite the highlighter having a currently selected first level of translucency). A first portion of a first mark displayed based on a highlighter having a first level of translucency, for example, is optionally displayed with a third degree of translucency, higher than—but based on—the first degree of translucency, to simulate the effect of the textured chisel-tip of a real-world highlighter. Writing with a real-world highlighter optionally includes streaks of uneven brightness, color, and perceived translucency. After modifying the currently selected degree of transparency of the highlighter to correspond to a third degree of transparency, different from the first and optionally the second degree of transparency, a second portion of a second mark (e.g., similar to the first portion of the first mark) optionally is displayed with a fourth degree of transparency, optionally higher than the first, second, and third levels of transparency. Displaying options modifying marks made in response to the input device prevents unnecessary navigation and selection through the user interface otherwise required to modify the marks, thus improving efficiency of user interaction and decreasing computational load and power consumption required for such navigation.

In some embodiments, the input device is associated with a currently selected drawing implement for the input device, and a first selectable option of the one or more selectable options is selectable to modify a width of marking performed by the input device in the user interface based on the currently selected drawing implement (1110*a*), such as option 1050A in FIG. 10S (e.g., as described previously with respect to step(s) 1106).

In some embodiments, while displaying, via the display generation component, the first selectable option (1110*b*), the electronic device receives (1110*c*), via the one or more sensors, one or more inputs interacting with the first selectable option of the one or more selectable options, such as selection of option 1050A in FIG. 10U (e.g., as described previously with respect to step(s) 1106).

In some embodiments, in response to receiving the one or more inputs interacting with the first selectable option, the electronic device modifies (1110*d*) the width of marking performed by the input device in the user interface based on the currently selected drawing implement in accordance with the one or more inputs, such as shown in the mark 1040B displayed in FIG. 10Y (e.g., as described previously with respect to step(s) 1106). For example, while using a currently selected first drawing and/or writing implement (e.g., a pencil, marker, highlighter, and/or pen) having a first, and currently selected mark width, a request to display hand drawn input (e.g., stroking the input device across the surface including contact with the surface, and while maintaining contact, moving the input device across the surface) is received. In response to receiving the request to display the hand drawn input, a first mark is displayed based on the currently selected (e.g., the first) simulated drawing and/or writing implement having the first width. Receiving the input corresponding to selection of the first selectable option optionally is determined to be a request to modify the currently selected width of the drawing and/or writing implement from the first width to a second width, different from the first width. In some embodiments, one or more selectable options corresponding to distinct mark widths, or a sliding element providing gross and/or granular adjustments to the mark width, is displayed in response to the selection. In response to a second request to display hand drawn input, similar to the first request, a second mark is displayed having the second width. In some embodiments, the width of a mark is based on force, velocity, and/or acceleration of the input device. For example, while the first width is currently selected, a mark made in response to a slow stroke is relatively wider, whereas a mark made in response to a quick stroke is relatively narrower. While a second, greater width is currently selected, slow and quick marks optionally are respectively displayed with a relatively greater width compared to marks made using the first width. However, the relative difference in width between the slow stroke mark and the quick stroke mark while the second width is selected optionally is similar in magnitude to the relative difference in width between the slow stroke mark and the quick stroke while the first width is selected. Displaying options modifying marks made in response to the input device prevents unnecessary navigation and selection through the user interface otherwise required to modify the marks, thus improving efficiency of user interaction and decreasing computational load and power consumption required for such navigation.

In some embodiments, the input device is associated with a currently selected drawing implement for the input device, and a first selectable option of the one or more selectable options is selectable to modify a color of marking performed by the input device in the user interface based on the currently selected drawing implement (1112*a*), such as option 1050C in FIG. 10AJ (e.g., as described previously with respect to step(s) 1106).

In some embodiments, while displaying, via the display generation component, the first selectable option (1112*b*), the electronic device receives (1112*c*), via the one or more sensors, one or more inputs interacting with the first selectable option of the one or more selectable options, such as the selection of option 1050C in FIG. 10AK (e.g., as described previously with respect to step(s) 1106).

In some embodiments, in response to receiving the one or more inputs interacting with the first selectable option, the electronic device modifies (1112*d*) the color of marking performed by the input device in the user interface based on the currently selected drawing implement in accordance with the one or more inputs, such as shown in indicator 1032D in FIG. 10AL (e.g., as described previously with respect to step(s) 1106). For example, a first drawing and/or writing implement having a first, and currently selected color is currently selected, and a request to display hand drawn input (e.g., stroking the input device across the surface including contact with the surface, and while maintaining contact, moving the input device across the surface) is received. In response to receiving the request to display the hand drawn input, a first mark is displayed based on the currently selected (e.g., the first) simulated drawing and/or writing implement having the first color. Receiving the input corresponding to selection of the first selectable option optionally is determined to be a request to modify the currently selected color of the drawing and/or writing implement from the first color to a second color, different from the first color. For example, one or more selectable options correspond to a predetermined, or recently used, set of colors. In some embodiments, selecting a respective option displays a palette, color wheel, or slider, optionally associated with a color of the respective option. After receiving an input modifying a color (e.g., selecting or interacting with a selectable option described previously) and in response to a second request to display hand drawn input, similar to the first request, a second mark is displayed having the second color. Displaying options modifying marks made in response to the input device prevents unnecessary navigation and selection through the user interface otherwise required to modify the marks, thus improving efficiency of user interaction and decreasing computational load and power consumption required for such navigation.

In some embodiments, the visual indication associated with the functionality of input device indicates a modification of the functionality of the input device (1114*a*), such as indication 1064 in FIG. 10O indicating a change in the current drawing implement for the input device and/or indication 1060 indicating a change in the current drawing implement for the input device. For example, the modification is a change in a currently selected simulated drawing and/or writing implement. In some embodiments, a respective portion of a representation (e.g., a virtual shadow) of a simulated drawing and/or writing implement (e.g., the tip) is modified, such as described with reference to method 900. For example, the virtual shadow of the simulated drawing and/or writing implement changes from a highlighter chisel-tip to a pencil or pen-like tip. Additionally or alternatively, the indication optionally includes textual or other graphical feedback (e.g., a textual notification) optionally displayed at a position corresponding to a respective portion of the input device (e.g., the tip) to describe or illustrate the modification. For example, the visual indication includes the name of the newly currently selected simulated drawing and/or writing implement. Displaying indications of the modification of the functionality of the input device prevents user inputs based on mistaken understanding about a current operation or function of the input device, thus preventing the computational load and power consumption required to process such inputs.

In some embodiments, a location of the visual indication in the user interface is based on a position of a respective portion of the input device (1116*a*), such as the position of indication 1060 in the user interface in FIG. 10O being based on the position of the tip of the input device. As described with respect to step(s) 1114, a position of a respective portion of the input device (e.g., the tip) is optionally determined (e.g., relative to the surface and corresponding to a position in the user interface). In some embodiments, the visual indication is displayed at a location or position in the user interface corresponding to the position of the respective portion of the input device (e.g., adjacent to or proximate to the tip). Displaying indications of modification near the respective portion of the input device lowers the user's cognitive burden and reduces input needed to navigate through other user interface menus, thus preventing the computational load and power consumption required to interact with such menus.

In some embodiments, the visual indication indicates a currently selected drawing implement for the input device (1118*a*), such as indication 1060 in FIG. 10O. As described with respect to step(s) 1114, the visual indication optionally reflects the currently selected drawing or writing implement. Displaying indications of modification of the input device lowers the user's cognitive burden and reduces input needed to navigate through other user interface menus, thus preventing the computational load and power consumption required to interact with such menus.

In some embodiments, the modification of the functionality of the input device corresponds to a modification of the currently selected drawing implement for the input device, and the visual indication includes a virtual shadow of the currently selected drawing implement that changes based on the modification of the currently selected drawing implement (1120*a*), such as virtual shadow 1062 changing from FIG. 10N to FIG. 10O in response to the currently selected drawing implement being changed. As described with respect to step(s) 1114, the visual indication optionally reflects the currently selected drawing or writing implement. In some embodiments, the visual indication includes a virtual shadow that is modified in response to modification of the currently selected drawing implement, such as described in more detail with reference to method 900. Displaying indications of modification near the respective portion of the input device lowers the user's cognitive burden and reduces input needed to navigate through other user interface menus, thus preventing the computational load and power consumption required to interact with such menus.

In some embodiments, in accordance with the determination that the input device is at the second distance, different from the first distance, from the surface when the indication of the one or more inputs detected at the input device are received, such as the distance of input device 1000 in FIG. 10Z, the electronic device displays (1122*a*), via the display generation component, a second visual indication, different from the first visual indication, associated with the functionality of the input device, such as the indication in indicator 1052 shown in FIG. 10AA that indicates the change in line thickness performed in response to the input detected in FIG. 10Z. For example, in a drawing user interface, a control palette is optionally displayed at a predetermined absolute or relative position in the user interface (e.g., along the upper or lower border of a display device). In some embodiments, a function associated with the functionality of the device (e.g., modifying a currently selected simulated drawing and/or writing implement as described with respect to step(s) 1106-1114) is initiated in response to receiving an indication of the one or more inputs detected at the input device, regardless of whether the input device is determined to be at the first or at the second distance from the surface. In some embodiments, the corresponding first visual indication associated with the function is displayed in accordance with a determination that the input device is at the first distance, but such display is forgone in accordance with a determination that the input device is at the second distance. In some embodiments, the control palette includes one or more selectable options to modify marks made in response to inputs from the input device (e.g., as described with respect to step(s) 1106-1114, or different from the embodiments described in step(s) 1106-1114). In some embodiments, in accordance with a determination the input device is further away from the surface (e.g., at a second distance), the control palette is displayed at the predetermined position in the user interface. For example, a current state of a drawing user interface optionally does not include the palette, and in response to receiving the indication of receipt of the one or more inputs at the input device in accordance with the input device being at the second distance, the control palette is displayed at the predetermined position. As described with respect to step(s) 1106-1114, in accordance with a determination the input device is at the first distance, the control palette is optionally displayed at a position corresponding to a respective portion of the input device (e.g., the tip). In some embodiments, the content included in the control panel (e.g., the displayed information and/or selectable options) is different in accordance with a determination that the input device is at the first distance or the second distance. For example, if the one or more inputs are received at the input device while the input device is at the second distance (e.g., relatively farther from the surface), a full control palette is displayed, and if the inputs are received while the input device is at the first distance, a subset of the full control palette is displayed. For example, the subset optionally excludes selectable options corresponding to one or more visual characteristics and/or functions included in the full control palette. In some embodiments, the selectable options displayed in the differing control palettes perform similar or the same operations, but differ in appearance (e.g., differ in graphical and/or textual appearance). Displaying the different visual indication based on different distances of the input device reduces the likelihood erroneous interactions are received at the input and/or electronic device.

In some embodiments, the second visual indication is displayed at a location of a drawing implement control object in the user interface, such as object 1030 in FIG. 10AA, wherein the location of the drawing implement control object is not based on a location of the input device (1124*a*), such as the location of object 1030 in FIG. 10AA being fixed in the user interface and/or not based on the location of input device 1000. As described with respect to step(s) 1120, the second visual indication optionally is displayed at a predetermined position in the user interface, such as the control palette displayed along a border of a display device. In some embodiments, a position or dimensions of a representation of a currently selected simulated drawing and/or writing implement is modified to reflect current selection(s) is displayed—or not displayed—in the second visual indication (e.g., control palette). For example, in the control palette, a currently selected writing implement is enlarged, emphasized with a distinct shadow, border, and/or light, and/or extended away from a border of a display region (e.g., a border of a display device) as compared with unselected writing implements. In response to the input, a currently selected simulated drawing and/or writing implement optionally is toggled, and the previously selected drawing and/or writing implement is optionally de-emphasized, and the newly selected simulated drawing and/or writing implement is optionally emphasized. In some embodiments, a representation corresponding to a visual characteristic (e.g., width, color, translucency, or pattern) behaves similarly in response to a request to modify the visual characteristic. For example, a selectable option included in the control palette at the predetermined position in the user interface reflects emphasis and de-emphasis in response to the request to modify the currently selected selectable option (e.g., requested from the input device). In some embodiments, further selectable options selectable to modify characteristics of marks are displayed in response to selecting a navigational selectable option (e.g., an arrow or other visual indicator indicating that additional options are available but not currently displayed). Displaying the second visual indication at the location of the drawing implement control object provides feedback to the user at a predictable location, thus preventing obscuration of portions of the user interface and/or inputs required to navigate the user interface to view the feedback.

In some embodiments, in response to receiving the indication of the one or more inputs detected at the input device (1126*a*) (e.g., as described with respect to step(s) 1102), in accordance with the determination that (e.g., a tip of) the input device is the first distance from the surface associated with the user interface (e.g., the touch-sensitive surface, a physical surface on which the user interface is projected, or a virtual surface corresponding to at least a portion of the user interface) when the indication of the one or more inputs detected at the input device are received, the electronic device performs (1126*b*) a first operation associated with the functionality of the input device, such as switching the currently selected drawing implement for input device 1000 from FIG. 10N to FIG. 10O. For example, the first operation includes modifying marks made in response to selection of one or more selectable options from the input device as described with respect to step(s) 1106-1112. In some embodiments, in response to the indication of the one or more inputs, a modification to the simulated writing implement is initiated. For example, a modification of the simulated drawing and/or writing implement, and/or modification of visual characteristics of marks made in accordance with inputs from the input device are initiated. The modification optionally includes reverting the currently selected simulated drawing and/or writing implement to a most recently used simulated drawings and/or writing implement.

In some embodiments, in accordance with the determination that the (e.g., tip of the) input device is the second distance from the surface when the indication of the one or more inputs detected at the input device are received, the electronic device forgoes (1126*c*) performing the first operation associated with the functionality of the input device, such as not switching the currently selected drawing implement for input device 1000 from FIG. 10D to FIG. 10E. For example, the modification of the simulated drawing and/or writing implement is forgone in accordance with the determination the tip of a stylus is at the second distance from the surface (e.g., greater than a threshold—or first—distance as described with respect to step(s) 1102). Requiring the input device be at the first distance reduces the risk of accidental initiation of the first operation, thereby reducing unintended initiation of such an operation.

In some embodiments, while displaying, via the display generation component, the user interface, in accordance with a determination that the input device is the first distance from the surface associated with the user interface, the electronic device displays, in the user interface, a visual indication corresponding to the input device (1128*a*), such as the virtual shadow 1062 displayed by device 500 for input device 1000 in FIG. 10B. For example, as described with respect to step(s) 1114, a virtual shadow is optionally displayed in accordance with a determination that the input device is the first distance from the surface, such as described in more detail with reference to method 900. In some embodiments, the virtual shadow is modified in accordance with a modification of proximity between the input device and the surface. In some embodiments, a respective portion (e.g., the tip) of the input device is displayed to reflect a currently selected drawing and/or writing implement. In some embodiments, respective portions of the virtual shadow corresponding to respective portions of the input device (e.g., a stylus) are displayed with one or more visual characteristics (e.g., a translucency, sharpness of a border, and/or orientation of the border of the virtual shadow) based on a position of the input device relative to the surface. For example, while the stylus tip is pointed towards the surface at a non-parallel and/or a non-normal angle, the tip of the virtual shadow corresponding to the tip of a stylus is optionally displayed with a higher intensity, higher opacity, and/or a sharper border compared to a portion of the virtual shadow corresponding to a portion of the stylus further away from the surface (e.g., a portion closer to the opposing end of the tip of the stylus). In some embodiments, the virtual shadow is displayed representing a portion of (e.g., half) the corresponding input device. For example, the virtual shadow represents the half of a stylus closest to the tip of the stylus. In some embodiments, in response to receiving an indication of selection from the input device (e.g., contacting the surface with the tip of the input device at a location) an operation associated with the selection is initiated. For example, if the location of selection corresponds to a selectable option, an operation associated with the selectable option is initiated. Alternatively, in a drawing user interface, a mark is optionally inserted at the location in the user interface corresponding to the selection. Displaying the visual indication at the first distance indicates that input from the input device can initiate performance of one or more functions, reducing the likelihood the user performs such an input at a second distance, not configured to initiate the one or more functions.

In some embodiments, the visual indication corresponding to the input device includes a cursor (1130*a*), such as cursor 1013 in FIGS. 10F to 10G. For example, the visual indication is a cursor or other pointing indicator to indicate how the input device's current position relative to the surface corresponds to positions in the user interface. In some embodiments, visual characteristics (e.g., size, shape, color, translucency, border, fill, and/or shadows) of the cursor are modified in response to moving the visual indication within a threshold distance (e.g., 0.1, 0.3, 0.5, 1, 3, 5, 10, 30, 50 or 100 cm) of an element in the user interface (e.g., a graphical object), such as described in more detail with reference to method 700. Displaying a cursor provides visual feedback indicating how the input device is oriented and optionally interacts with elements within the user interface, thereby reducing unnecessary or mistaken inputs.

In some embodiments, the visual indication corresponding to the input device includes a virtual shadow corresponding to the input device (1132*a*), such as the virtual shadow 1062 displayed by device 500 for input device 1000 in FIG. 10B. As described with respect to step(s) 1128, the visual indication optionally is a virtual shadow based on a currently selected drawing and/or handwriting implement, such as described in more detail with reference to method 900. Displaying the visual indication at the first distance indicates that input from the input device can initiate performance of one or more functions, reducing the likelihood the user performs such an input at a second distance, not configured to initiate the one or more functions.

In some embodiments, the user interface satisfies one or more first criteria (1134*a*), for example the user interface in FIG. 10B satisfies the one or more first criteria. For example, the one or more first criteria include a criterion that is satisfied based on a determined context of the user interface. Such contexts optionally include different types of application user interfaces, for example, drawing application user interfaces. As described with respect to step(s) 1106-1126, one or more operations optionally are performed in accordance with a determination that a current context of the user interface corresponds to a writing or drawing user interface.

In some embodiments, while displaying, via the display generation component, a second user interface (e.g., different from or the same as the user interface), such as a user interface different from the user interface in FIG. 10B, the electronic device receives (1134*b*) a second indication of one or more inputs detected at the input device (e.g., the second indication is similar or the same as the first indication described with respect to step(s) 1102), such as input 1016 in FIG. 10B.

In some embodiments, in response to receiving the second indication of the one or more inputs detected at the input device (1134*c*), in accordance with a determination that the second user interface does not satisfy the one or more first criteria, and that the input device is the first distance from a surface associated with the second user interface (e.g., different from or the same as the surface associated with the user interface) when the second indication of the one or more inputs detected at the input device are received, the electronic device forgoes (1134*d*) the displaying, in the second user interface, a visual indication associated with the functionality of the input device, such as not displaying indication 1060 that is shown in FIG. 10K. For example, failing to satisfy the one or more criteria includes determining the current context corresponds to a non-drawing/writing user interface. In some embodiments, although the input device is within a threshold distance (e.g., 0.1, 0.3, 0.5, 1, 3, 5, 10, 30, 50 or 100 cm) of a surface (e.g., the surface, or a surface similar to the surface described with respect to step(s) 1102), the visual indication (e.g., a control palette) is not displayed. Forgoing display of the visual indication prevents interaction or feedback that is not meaningful or applicable to the currently displayed user interface, thus preventing needless display of information or processing of inputs.

In some embodiments, while displaying, via the display generation component, a respective user interface (e.g., the user interface or the second user interface) and while the input device is the first distance from the surface, the electronic device receives (1136*a*), via the input device, one or more inputs (e.g., as described with respect to step(s) 1102), such as one or more inputs from input device 1000 moving down and contacting the surface from FIGS. 10AJ to 10AK. In some embodiments, the one or more inputs include the tip of the input device coming into contact with the surface.

In some embodiments, in response to receiving the one or more inputs (1136*b*), in accordance with a determination that the display generation component is currently displaying the first visual indication associated with the functionality of the input device, such as indication 1050 in FIGS. 10AJ to 10AK, the electronic device performs (1136*c*) a function associated with the input device, such as changing the opacity (corresponding to option 1050B) or the color (corresponding to option 1050C) of the currently selected drawing implement in FIG. 10AK. For example, as described with respect to step(s) 1104-1118, the first visual indication may indicate that initiation of one or more functions or operations is possible. Such operations optionally include modifying characteristics of handwritten marks, modification of a currently selected drawing and/or writing implement, and/or other visual feedback (e.g., a textual description of the initiated operation). In some embodiments, one or more of the operations are only performed in response to the one or more inputs if the first visual indication was displayed when the one or more inputs were detected (e.g., while displaying a control palette, which optionally is based on a determined current context of the respective user interface).

In some embodiments, in accordance with a determination that the display generation component is not currently displaying a visual indication associated with functionality of the input device, such as in FIGS. 10AL to 10AM where the user interface does not include element 1050 (e.g., the electronic device detects the tip of the input device coming into contact with the surface before or without the first visual indication or other visual feedback described herein being displayed), the electronic device forgoes (1136*d*) performing the function associated with the input device, such as the moving down and contacting of the surface by input device 1000 in FIG. 10AM not changing the opacity (corresponding to option 1050B) or the color (corresponding to option 1050C) of the currently selected drawing implement, but rather drawing content in the user interface in accordance with the contact of input device 1000 with touch screen 504. For example, performance of the one or more of the operations described above are optionally contingent upon display of the control palette, such that the same input optionally does or does not result in the one or more operations being performed based on whether the control palette was or was not, respectively, displayed in the user interface when the input was detected. Forgoing performance of one or more operations or functions prevents interaction that is not intended, thus preventing needless display of information or processing of inputs.

It should be understood that the particular order in which the operations in FIGS. 11A-11H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, and 1300) are also applicable in an analogous manner to method 1100 described above with respect to FIGS. 11A-11H. For example, the interactions between the input device and the surface, the response(s) of the electronic device, the virtual shadow of the input device, and/or the inputs detected by the electronic device and/or detected by the input device optionally have one or more of the characteristics of the interactions between the input device and the surface, the response(s) of the electronic device, the virtual shadow of the input device, and/or the inputs detected by the electronic device and/or detected by the input device described herein with reference to other methods described herein (e.g., methods 700, 900, and 1300). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 11A-11H are, optionally, implemented by components depicted in FIGS. 1A-1B. For example, displaying operations 1102*a* and 1102*d*, and receiving operation 1102 bare, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Conversion of Handwritten Input

Users interact with electronic devices in many different manners, including providing handwritten input to such devices using an input device such as a stylus. The embodiments described below provide ways in which an electronic device controls conversion of such handwritten input into font-based text, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 12B:
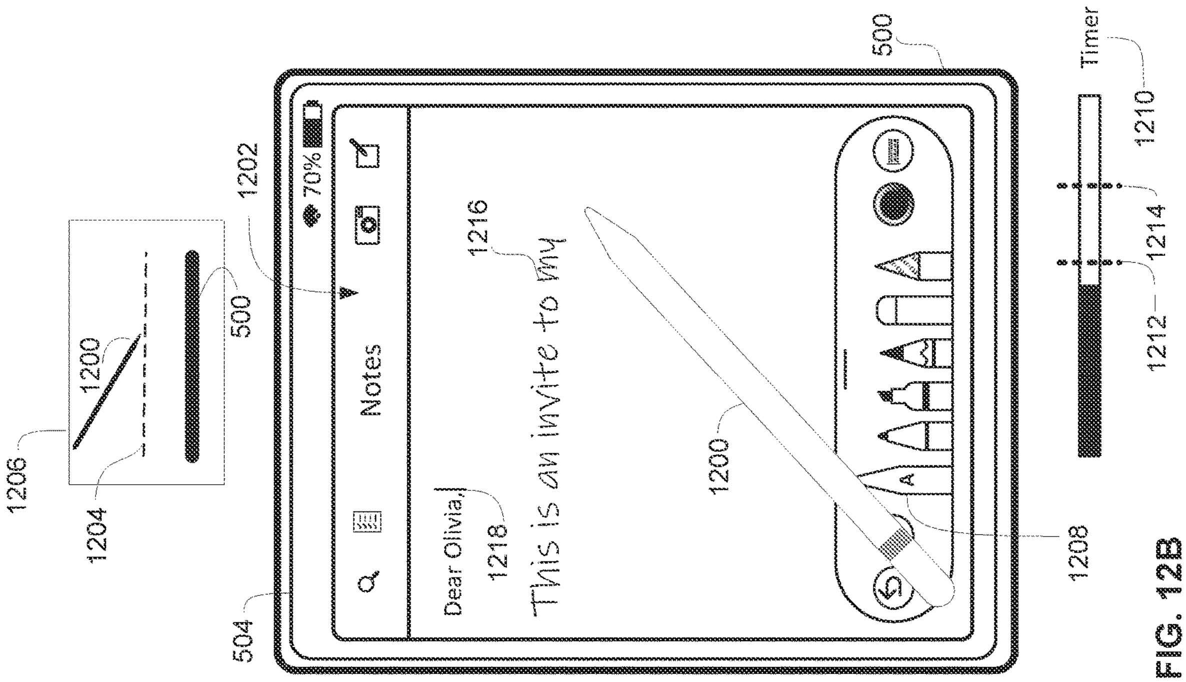
FIGS. 12A-12AT illustrate exemplary ways in which an electronic device provides for handwritten input for conversion into font-based text using an input device in accordance with some embodiments.
Figure 12A:
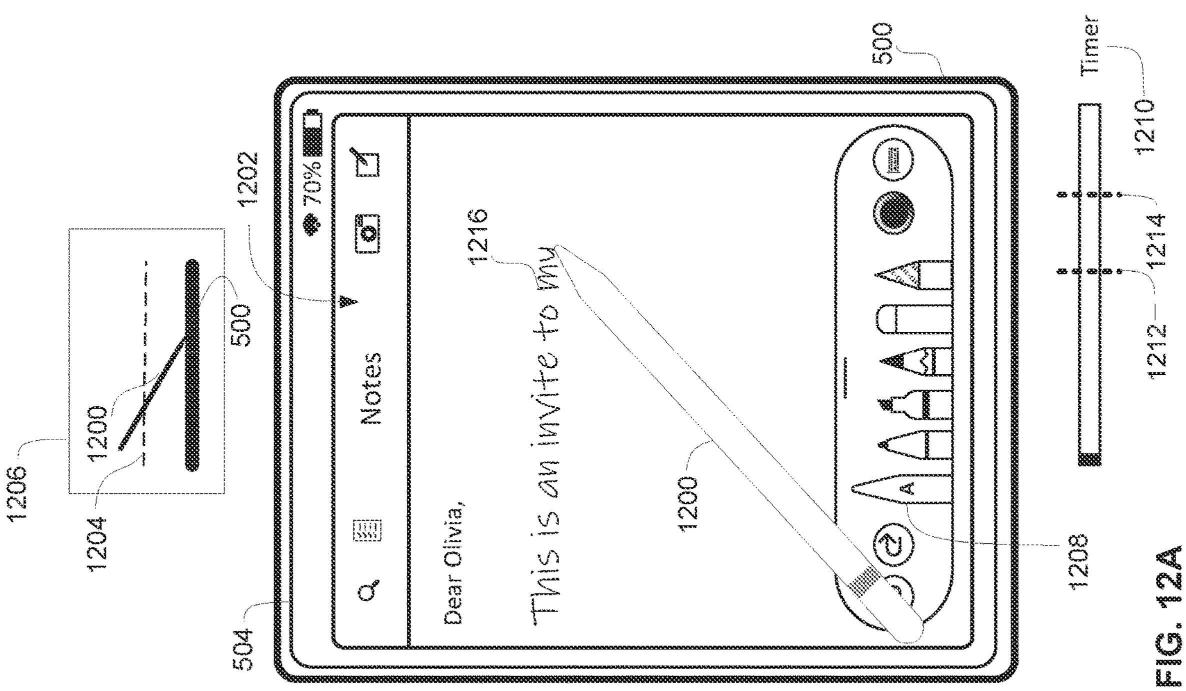

FIGS. 12A-12AT illustrate exemplary ways in which an electronic device interprets indications of a pose of an input device relative to a surface to perform one or more content-related operations including converting handwritten text into font-based text, inputting content into a content entry region, and/or selecting non-editable content in accordance with some embodiments of the disclosure. The embodiments in these figures are used to illustrate the processes described below, including the processes described with reference to FIGS. 13A-13K.

FIG. 12A illustrates an exemplary device 500. In FIG. 12A, device 500 is displaying user interface 1202 corresponding to a note taking application. In some embodiments, user interface 1202 includes a text entry region in which a user is able to enter multiple lines of text. For example, in FIG. 12A, the device 500 receives handwritten input directed to the text entry region of the user interface 1202 by input device 1200. In FIG. 12A, a currently selected drawing implement for input device 1200 is a text entry implement (e.g., indicated by element 1208 in the palette displayed in the user interface). In some embodiment, handwritten input provided by the text entry implement will be converted to font-based text by device 500, as will be described later. In FIG. 12A, while the handwritten input is being received, the device 500 displays a representation of the handwritten input 1216 in the text entry region of the user interface 1202.

In FIG. 12B, while displaying the representation of the handwritten input 1216, the device 500 detects an end of the handwritten input and movement of the input device 1200 to a position above threshold 1204, as shown in glyph 1206. Glyph 1206 indicates the relative pose including distance of the input device 1200 relative to a surface of the device 500 (e.g., touch screen 504). Threshold 1204 is optionally a distance threshold from the surface of device 500 (e.g., 0.3, 0.5, 1, 3, 5, 10, 20, 50 or 100 cm). In some embodiments, device 500 optionally displays a virtual shadow and/or indications in response to the position of the input device 1200 being within threshold 1204 to touch screen 504 (e.g., as described in more detail with reference to methods 700, 900, 1100 and/or 1300). In some embodiments, in response to detecting movement (e.g., lift-off of input device 1200 from the surface) above threshold 1204, device 500 initiates a timer 1210 to begin tracking a duration since the end of the handwritten input was detected. In FIG. 12B, the timer 1210 continues to count upwards but has not reached the threshold time 1212 (e.g., 0.01 seconds, 0.05 seconds, 0.1 seconds, 0.2 seconds, 0.3 seconds, 0.5 seconds, 1 second, 2 seconds, 3 seconds, 5 seconds, 10 seconds, 20 seconds, 30 second, 60 seconds or 120 seconds). In FIG. 12C, when timer 1210 reaches a threshold time 1212, device 500 converts the handwritten input into font-based text 1216. In some embodiments, device 500 converts the handwritten input after threshold time 1212 elapses after the end of the handwritten input is detected, because input device 1200 was moved outside of threshold 1204 of touch screen 504.

Figure 12D:
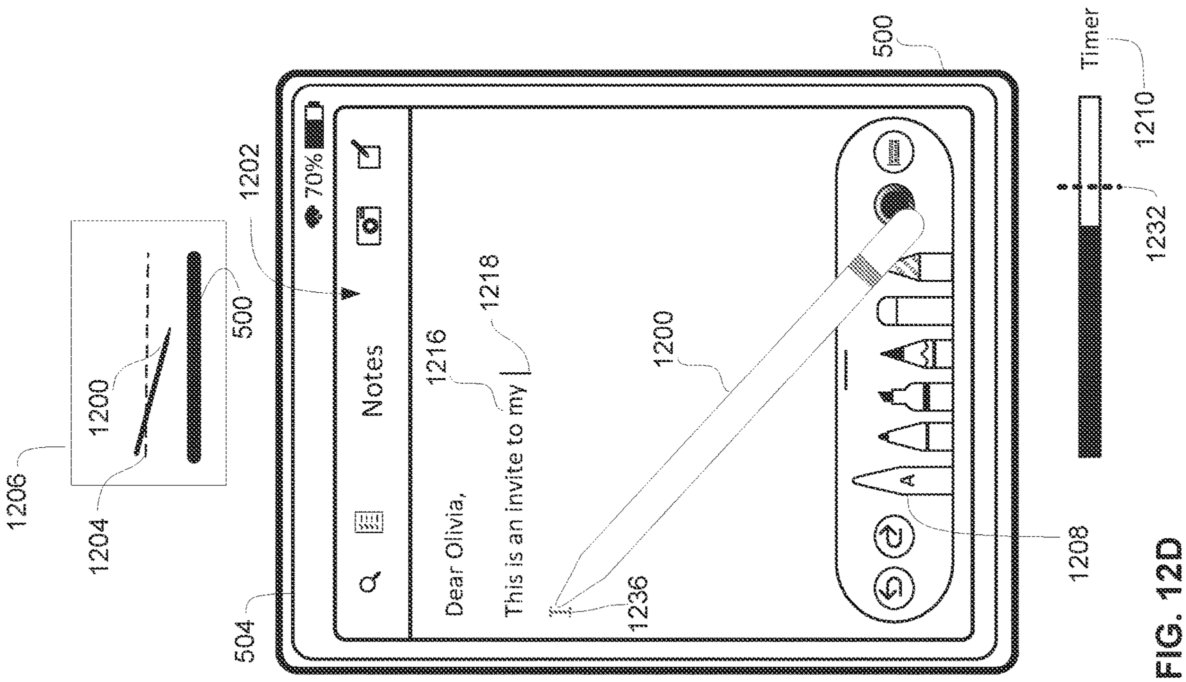
Figure 12C:
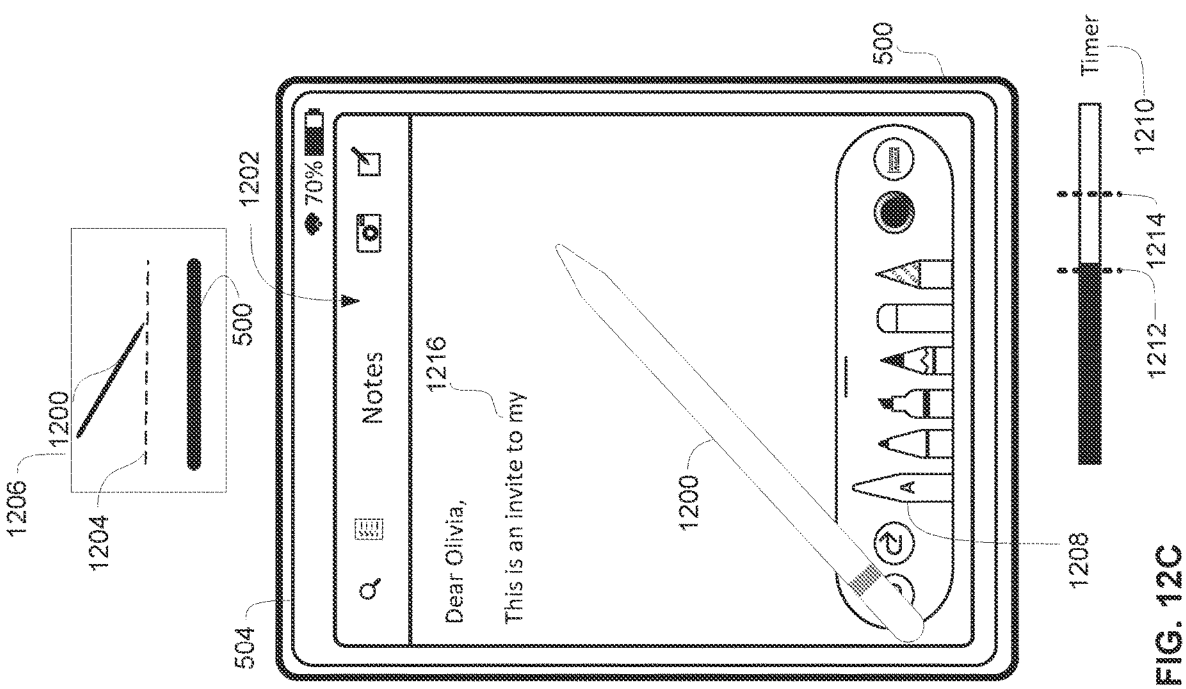

FIG. 12D illustrates the input device 1200 being moved such that input device 1200 is positioned below threshold 1204 and corresponds to a location of the converted font-based text 1216. In response to the device 500 determining that the input device 1200 is positioned at a location relative to the surface of the touch screen 504 corresponding to the location of the converted font-based text 1216, the device 500 displays a text insertion cursor 1218 at a location based on the structure of the converted font-based text 1216. For example, in FIG. 12D, the text insertion cursor 1218 is displayed at the end converted font-based text 1216 with a whitespace character (e.g., space) between the text insertion cursor 1218 and the font-based text 1216. Additional input detected by device 500 corresponding to font-based text will optionally be displayed and/or inserted by device 500 at the location of text insertion cursor 1218.

As shown in FIG. 12D, when the input device 1200 is moved such that input device 1200 is positioned at a location corresponding to the location of the converted font-based text 1216, the device 500 displays an indication of a text insertion cursor 1236 (e.g., shadow text insertion cursor) at a location in the user interface 1202 corresponding to a location of the tip of the input device 1200 relative to the surface. The shadow text insertion cursor 1236 optionally indicates where in user interface 1202 text insertion cursor 1218 will be inserted and/or moved in response to device 500 detecting contact of input device 1200 with touch screen 504. In contrast to FIG. 12D, in which the device 500 displays the indication of a text insertion cursor 1236 when the input device 1200 is below threshold 1204 in glyph 1206, the device 500 ceases to or does not display the indication of a text insertion cursor 1236 in the user interface 1202 when the input device 1200 is above threshold 1204, as shown in FIG. 12C. In FIG. 12D, input device 1200 has been hovering over the location of the shadow text insertion cursor 1236 for duration of time less than time threshold 1232, as shown in timer 1210.

Figure 12F:
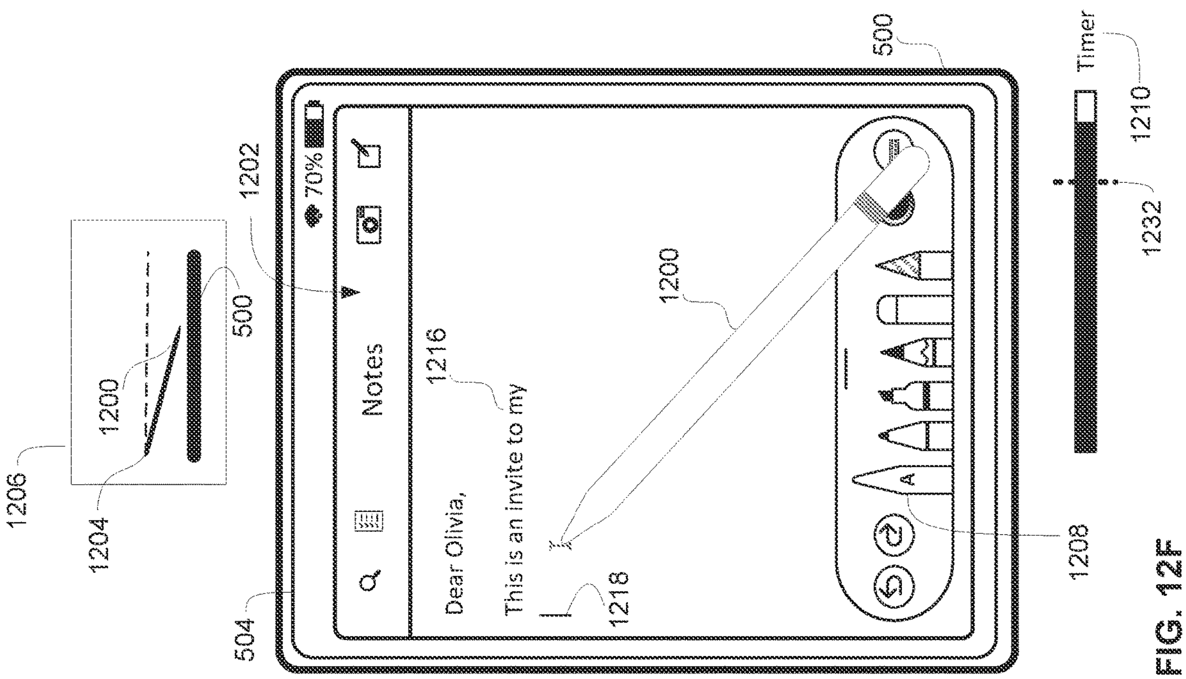
Figure 12E:
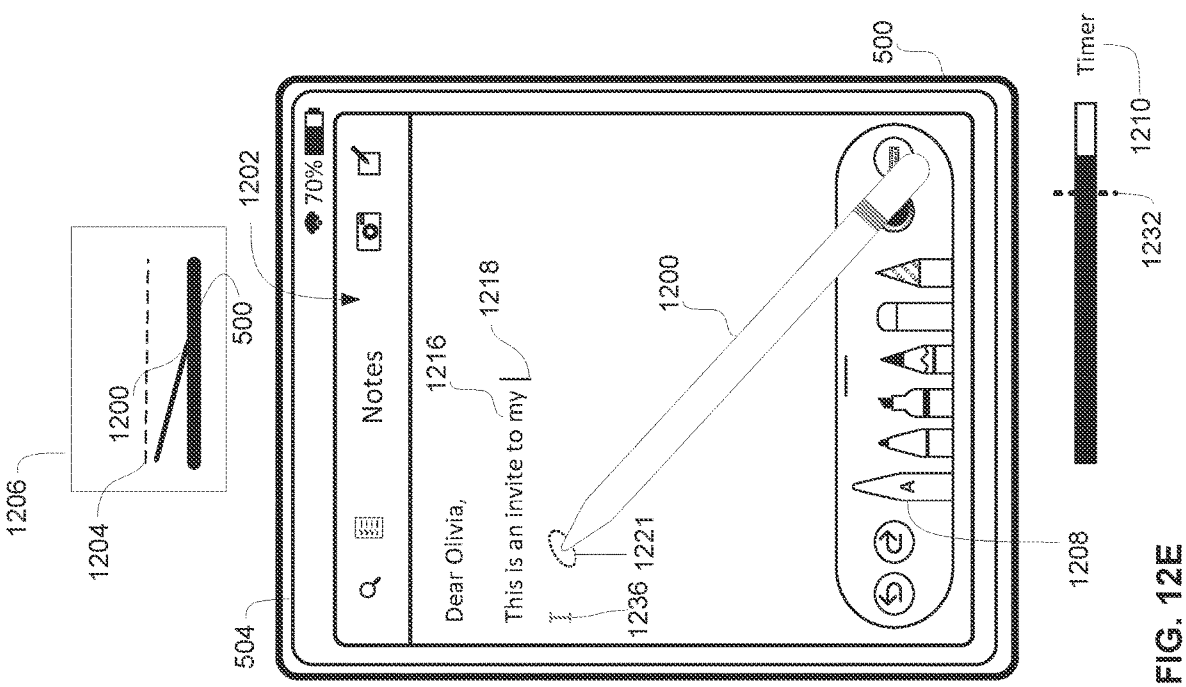

Turning to FIG. 12E, in some embodiments, while the input device is detected as within the threshold distance 1204, the device 500 detects an indication of an input on the surface of the touch screen 504 corresponding to a request to insert a new line of content in user interface 1202 that is configured to include content. The input, for example, comprises a tap input 1221 on the surface of the touch screen 504 by the input device 1200. In some embodiments, inserting a new line of content comprises inserting the new line as a line below the current line of content (e.g., the line of content that includes text insertion cursor 1218). In some embodiments, inserting a new line of content comprises inserting a line break character into the current line of text or at the beginning of a next portion of text. In some embodiments, when the device 500 detects the indication of the input on the surface of the touch screen 504 corresponding to the request to insert the new line of content, the device 500 displays the indication of the text insertion cursor 1236 at the position at which the new line of content will be created, as shown in FIG. 12E. In some embodiments, when the device 500 detects the indication of the input on the surface of the touch screen 504 corresponding to the request to insert the new line of content, if the input device 1200 has been hovering over its current position for a threshold time 1232 (e.g., 0.01, 0.05, 0.1, 0.3, 0.5, 1, 2, 3, 5, 10, 20, 30, or 60 seconds) when the input 1221 from input device 1200 was detected (e.g., as shown in FIG. 12E), then device 500 inserts the new line of content at a location of the content entry region as indicated by the display location of cursor 1218 in FIG. 12F.

Figure 12H:
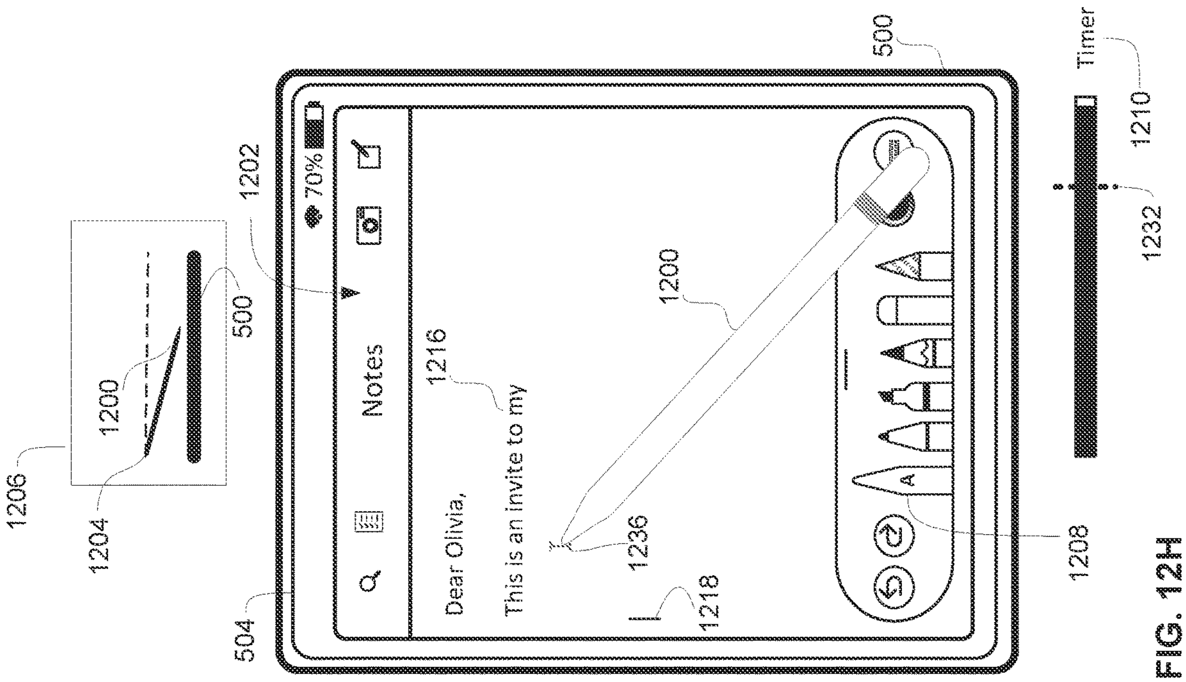
Figure 12G:
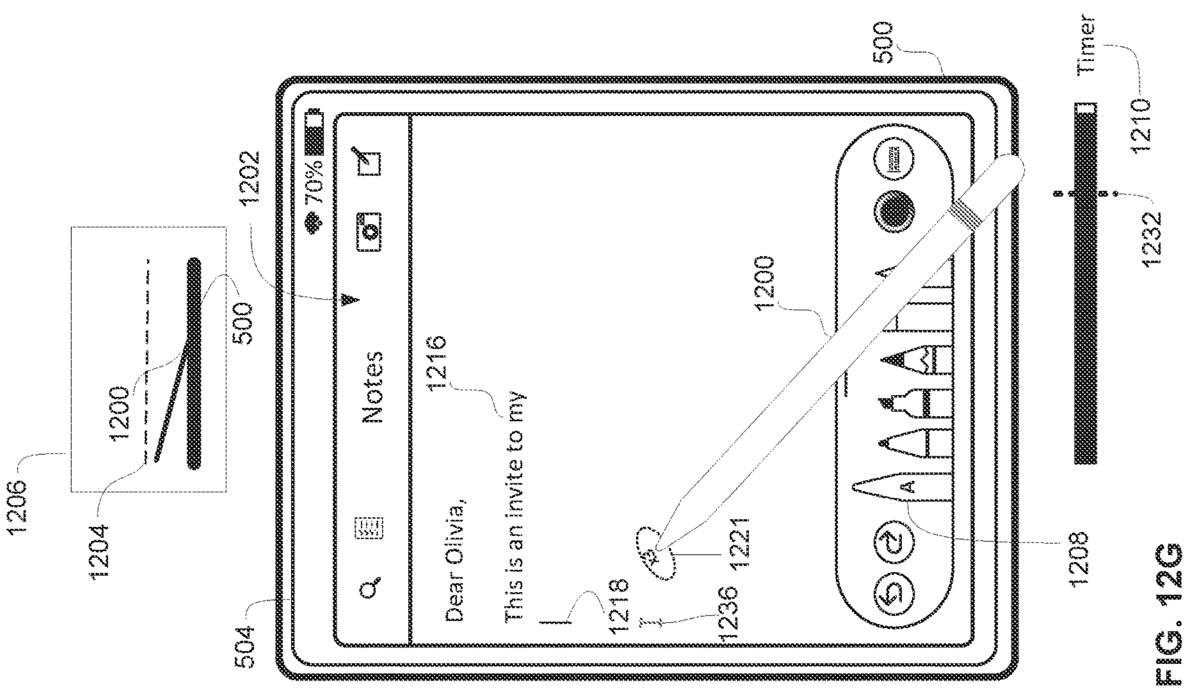

In some embodiments, the device 500 detects a single tap (e.g., single tap input 1221 of FIG. 12E) or a sequence of taps that includes a plurality of taps (e.g., tap input 1221 of FIG. 12G includes three taps). The number of new lines of content created by device 500 is optionally based on the number of taps detected by the device 500. For example, in FIG. 12G, the device 500 detects tap input 1221 comprising three taps that were detected after input device 1200 was hovering at its current location for longer that time threshold 1232, and in response, the device 500 inserts three new lines of content at positions in the content entry region as indicated by the display of cursor 1218 in FIG. 12H.

Figure 12J:
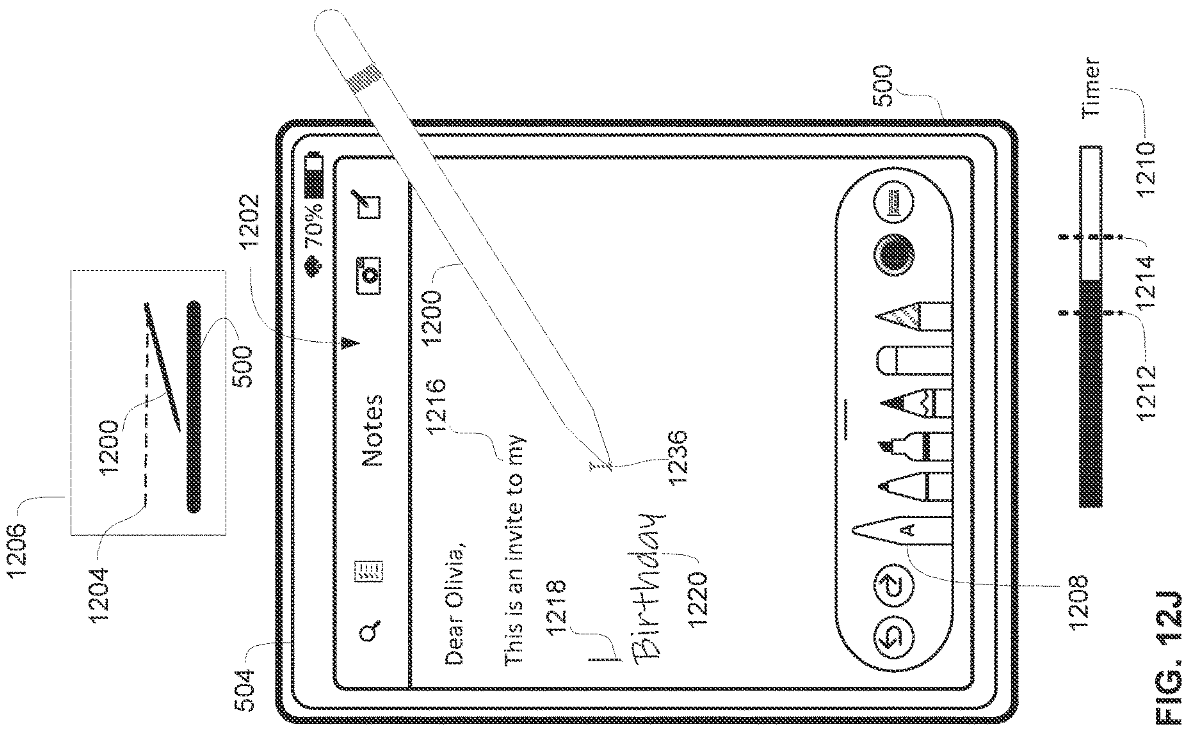
Figure 12I:
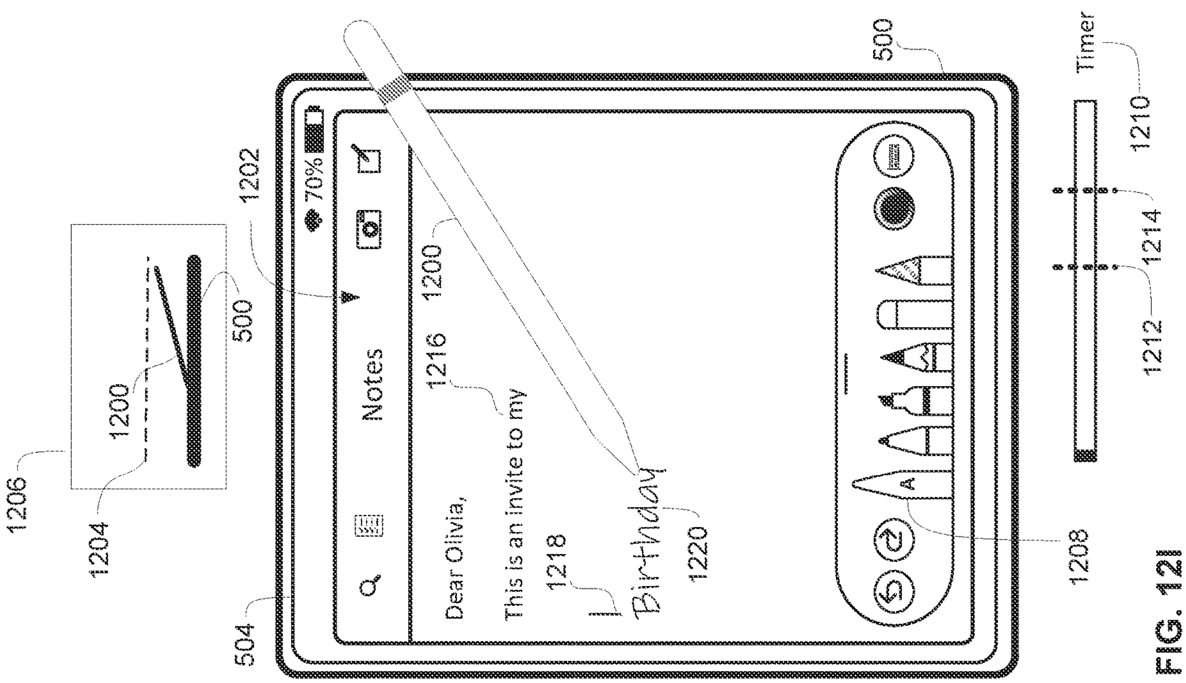

In FIG. 12I, the device 500 receives handwritten input directed to the content entry region of the user interface 1202 by input device 1200 and, while the handwritten input is being received, the device 500 displays a representation of the handwritten input 1220 in the content entry region of the user interface 1202. In some embodiments, in response to detecting the end of the handwritten input, timer 1210 begins counting the duration of time that has elapsed since the end of the handwritten input. From FIGS. 12I-12J, subsequent to detecting the end of the handwritten input, device 500 detects that input device 1200 has moved to a position within threshold 1204. Because input device 1200 remains within threshold 1204 of touch screen 504, device 500 will convert the handwritten input 1220 when timer 1210 reaches a second threshold time 1214 (e.g., 0.1 seconds, 0.3 seconds, 0.5 seconds, 1 second, 2 seconds, 3 seconds, 5 seconds, 10 seconds, 20 seconds, 30 second or 60 seconds) as opposed to the first threshold time 1212. In FIG. 12K, when timer 1210 reaches the second threshold time 1214, the handwritten input is converted into font-based text 1220, which is entered into the content entry region at the location of text insertion cursor 1218, which is displayed at the end of the converted font-based text 1220 in FIG. 12K. In some embodiments, the second threshold time 1214 is a greater time threshold than the first threshold time 1212.

Figure 12L:
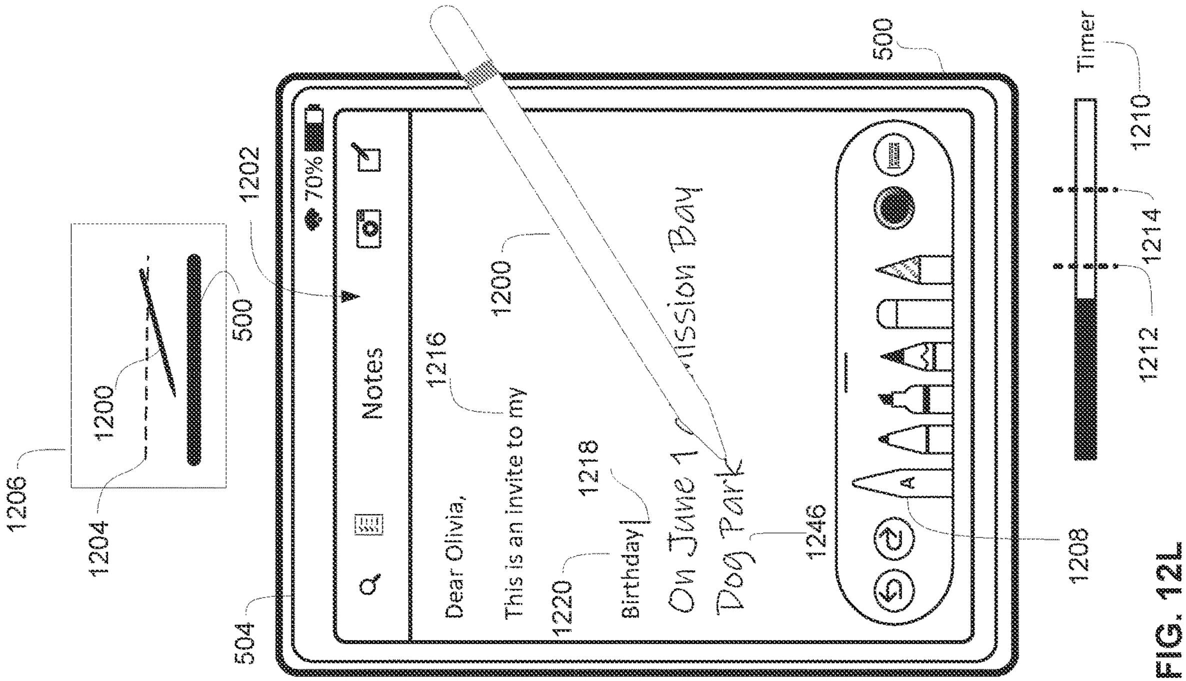
Figure 12K:
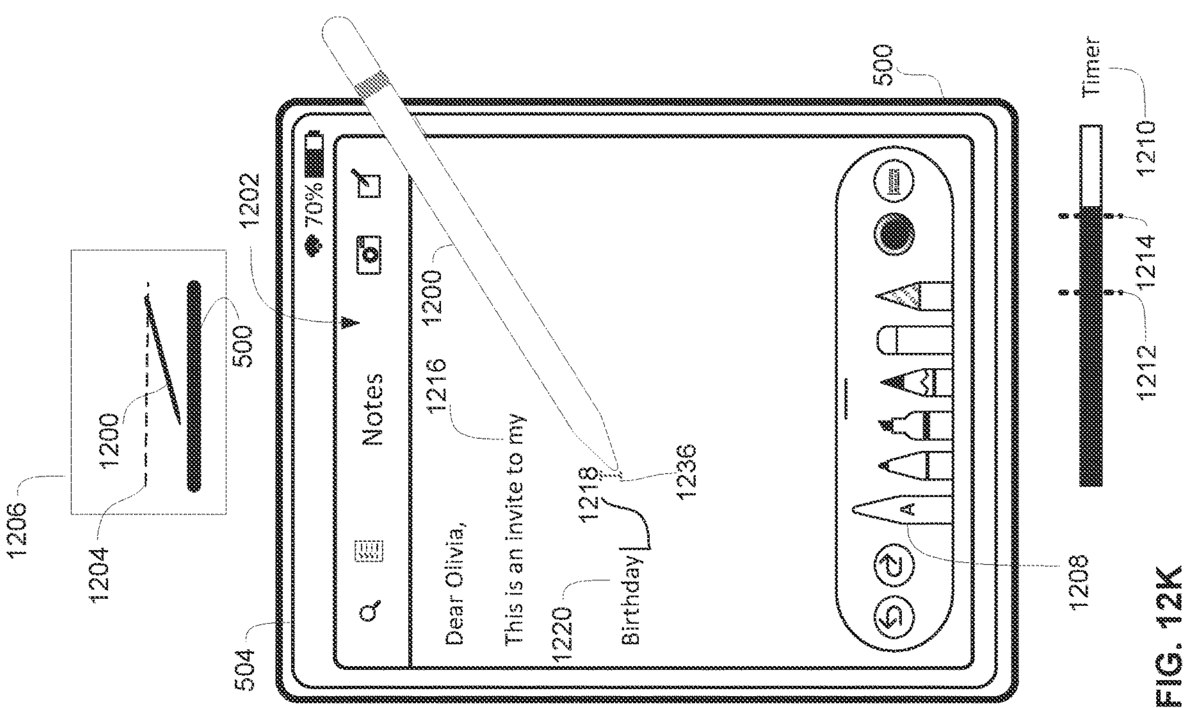
Figure 12N:
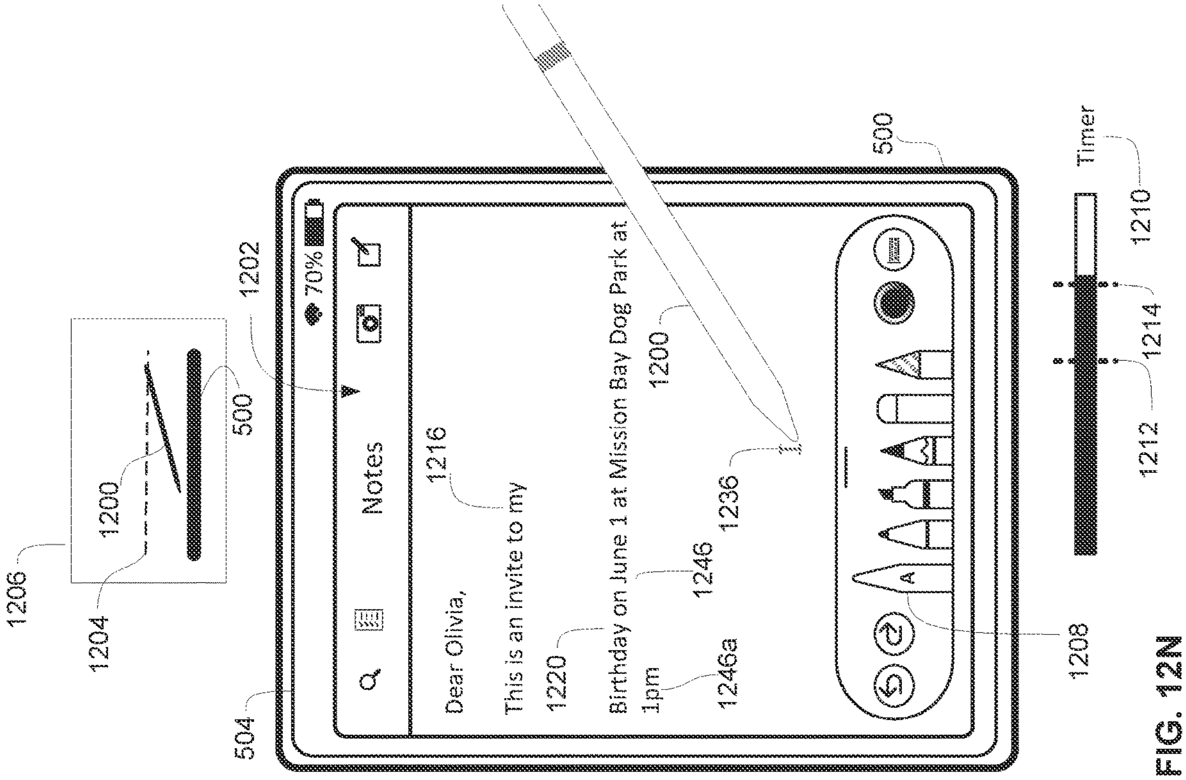
Figure 12M:
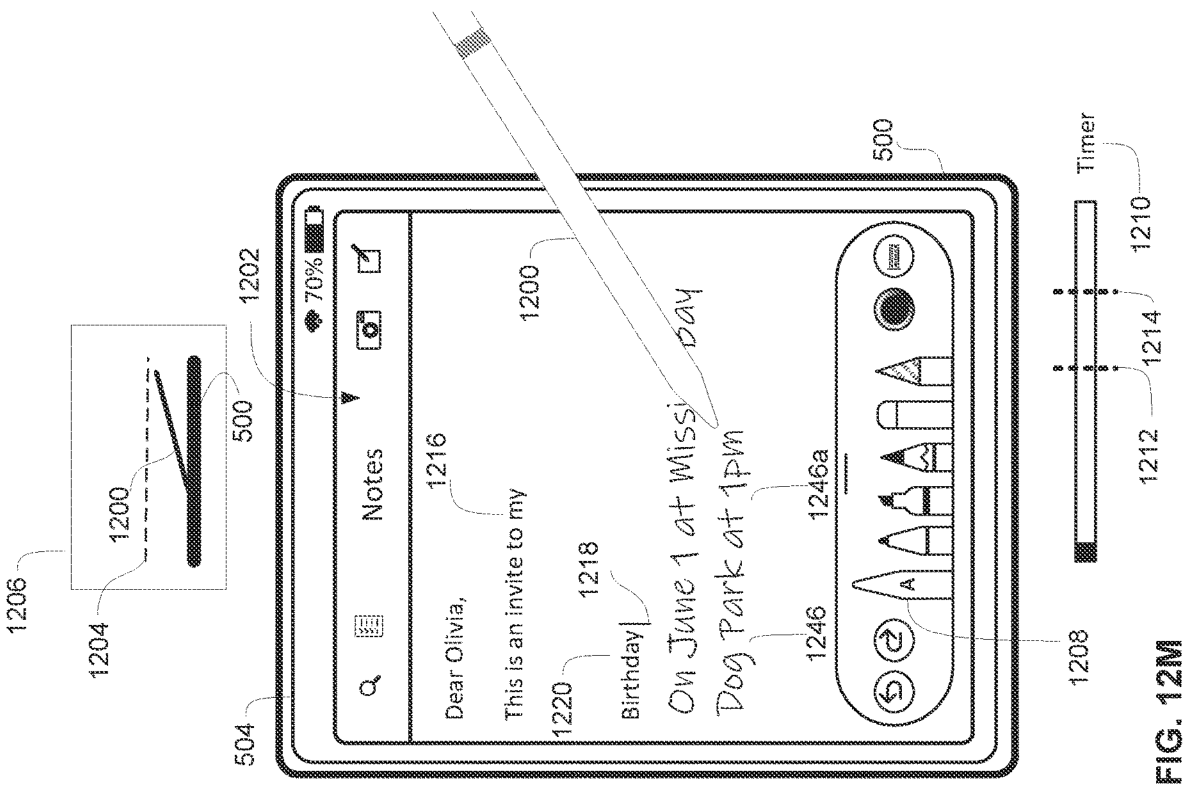
Figure 12O:
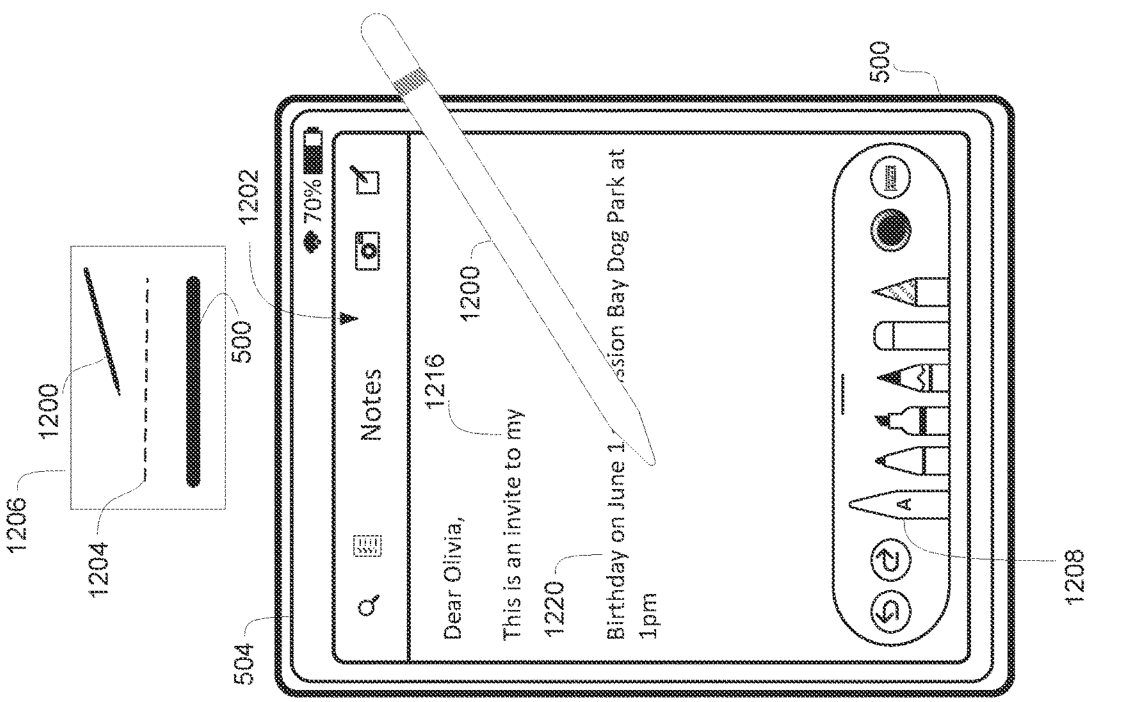

In FIG. 12L, the device 500 has received additional handwritten input directed to the content entry region of the user interface 1202 by input device 1200. In FIG. 12L, while the handwritten input is being received, the device 500 displays a representation of the handwritten input 1246 in the content entry region of the user interface 1202. In FIG. 12L, device 500 has also detected an end to the handwritten input, and therefore timer 1210 has started to elapse. However, in FIG. 12M, device 500 detects additional handwritten input before timer 1210 reached time threshold 1214, which has caused device 500 to reset timer 1210 and display the representation of the additional handwritten input 1246*a* while still maintaining the representation of the handwritten input 1246 as handwritten input. In FIG. 12N, device 500 has detected another end to the handwritten input, and input device 1200 lifted off to a position within threshold 1204 of touch screen 504. As shown in FIG. 12N, when timer 1210 reaches the second threshold time 1214, the two handwritten inputs are converted into font-based text 1246 and 1246*a*. In FIG. 12N, the converted font-based text 1246 and 1246*a* is inserted on the same line as the previously converted font-based text 1220 (e.g., because the device 500 did not detect an input for inserting the converted font-based text to a new content line as will be discussed with reference to FIG. 12P). In FIG. 12N, because input device 1200 is within threshold 1204, device 500 also displays indication of cursor 1236 at the position of the tip of input device 1200 in user interface 1202. In FIG. 12O, the device 500 detects movement of input device 1200 above threshold 1204. In response, the device 500 ceases to display the indication of the text insertion cursor 1236 in the user interface 1202.

Figure 12P:
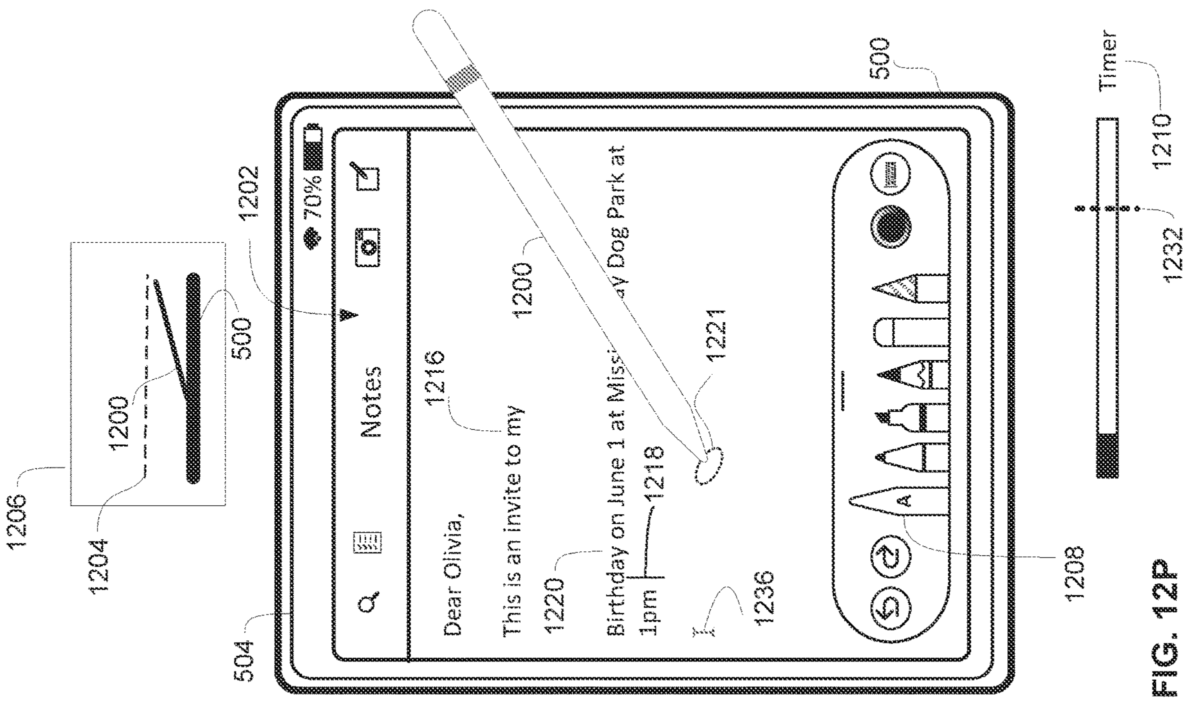
Figure 12R:
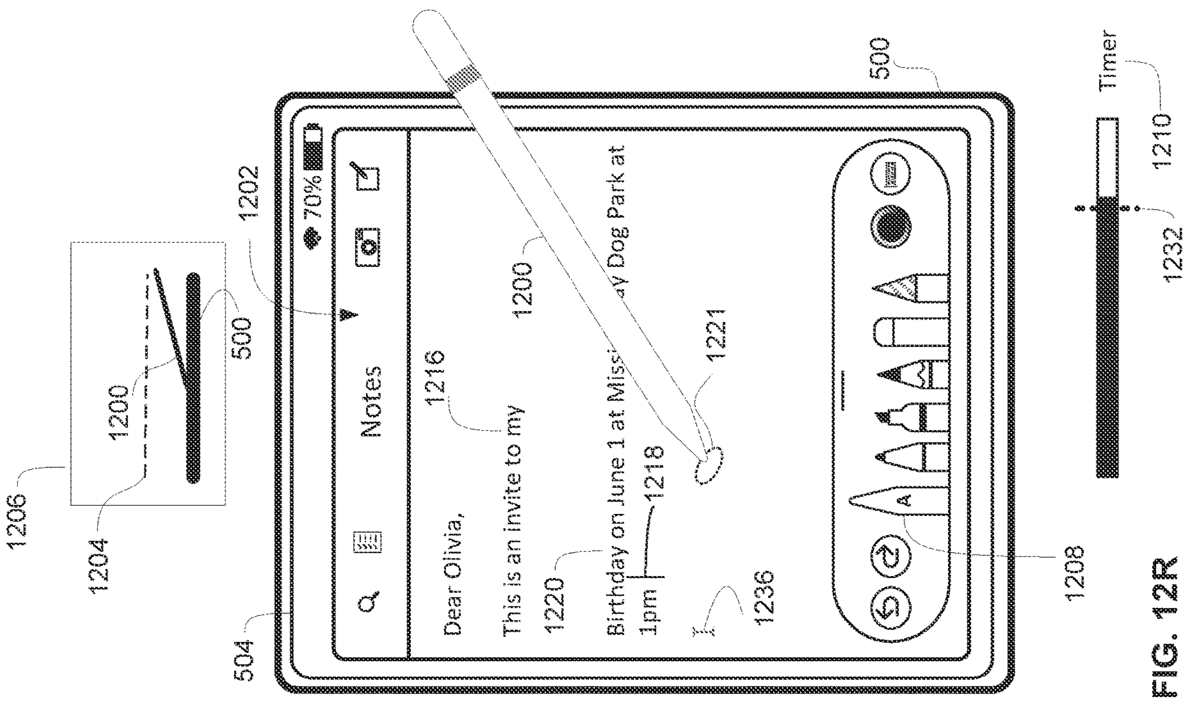
Figure 12Q:
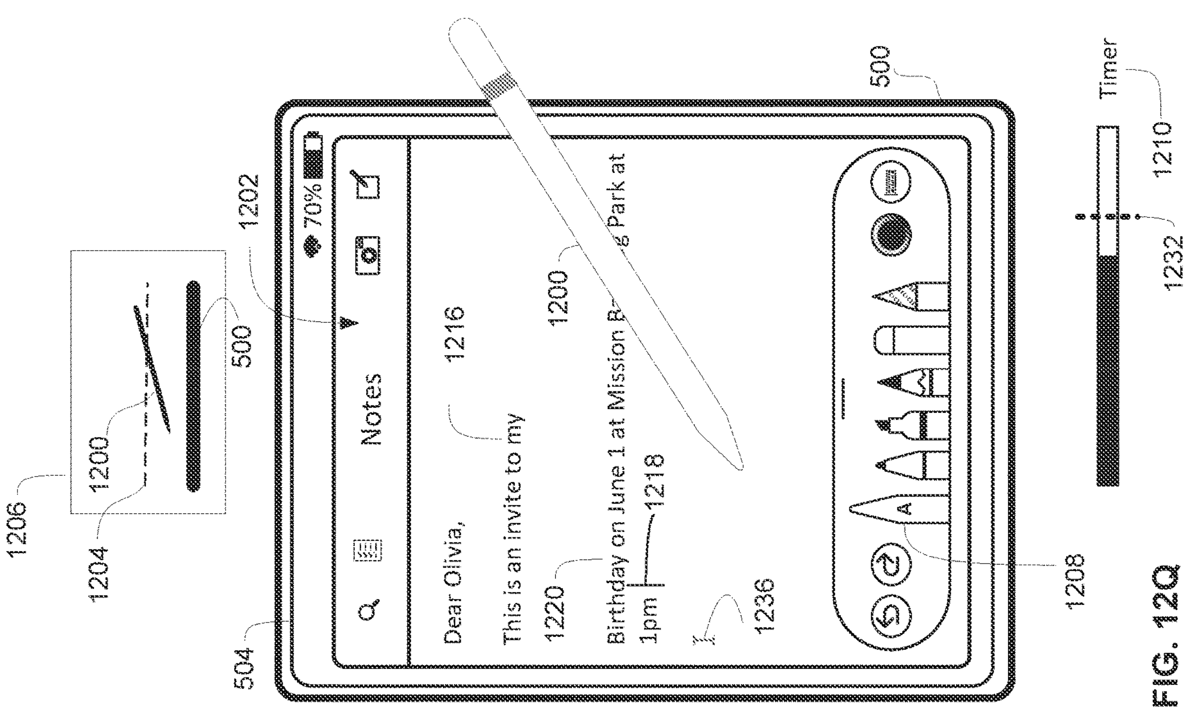

In FIG. 12P, the device 500 detects an indication of an input on the surface of the touch screen 504 corresponding to a request to insert a new line of content that is configured to include content. The input, for example comprises a tap input 1221 on the surface of the touch screen 504 by the input device 1200. In some embodiments, if the tap input 1221 is received after input device 1200 has been hovering within threshold 1204 for longer than a time threshold 1232 as shown in FIG. 12P, the device 500 inserts a new line at the location corresponding to the indication of the text insertion cursor 1236. However, in FIG. 12P, timer 1210 had not yet reached threshold 1232 when input 1221 was detected from input device 1200—as such, device 500 does not insert a new line of content in user interface 1202. In FIG. 12Q, input device 1200 is maintaining a hover within threshold 1204 of touch screen 504 and the timer 1210 continues to count upwards but has not yet reached the threshold time 1232. In FIG. 12R, the device 500 detects another tap input 1221 from input device 1200 corresponding to a request to insert a new line of content and detects that timer 1210 had reached the threshold time 1232 when input 1221 was detected. In response to determining that timer 1210 has reached the threshold time 1232, the device 500 inserts the new line of content at the location at which shadow text insertion cursor 1236 was displayed in FIG. 12R, as indicated by text insertion cursor 1218 shown in FIG. 12S. Further, in FIG. 12S, device 500 is now displaying shadow text insertion cursor 1236 at a position in user interface 1202 corresponding to the tip of input device 1200.

Figure 12T:
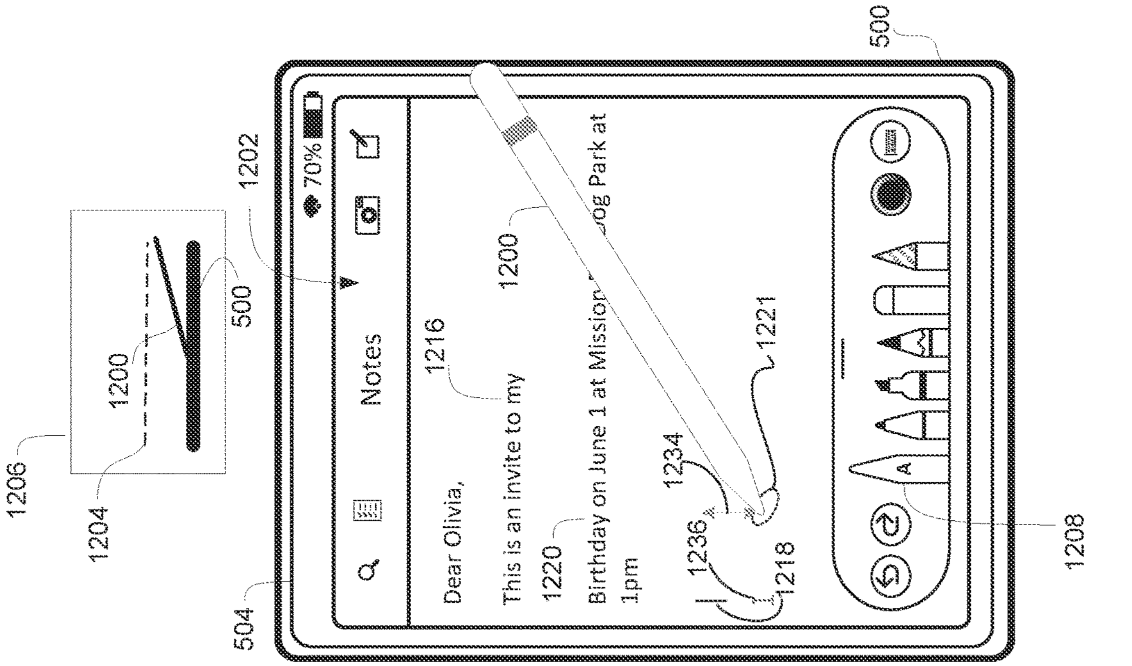
Figure 12S:
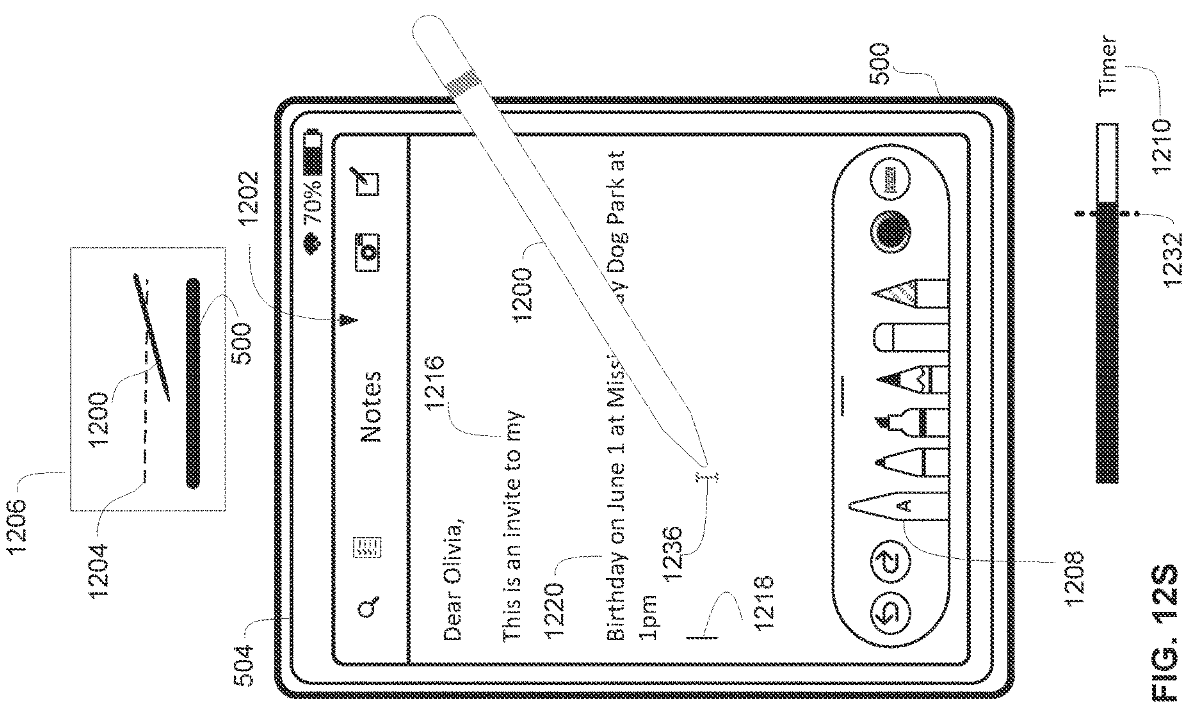
Figure 12V:
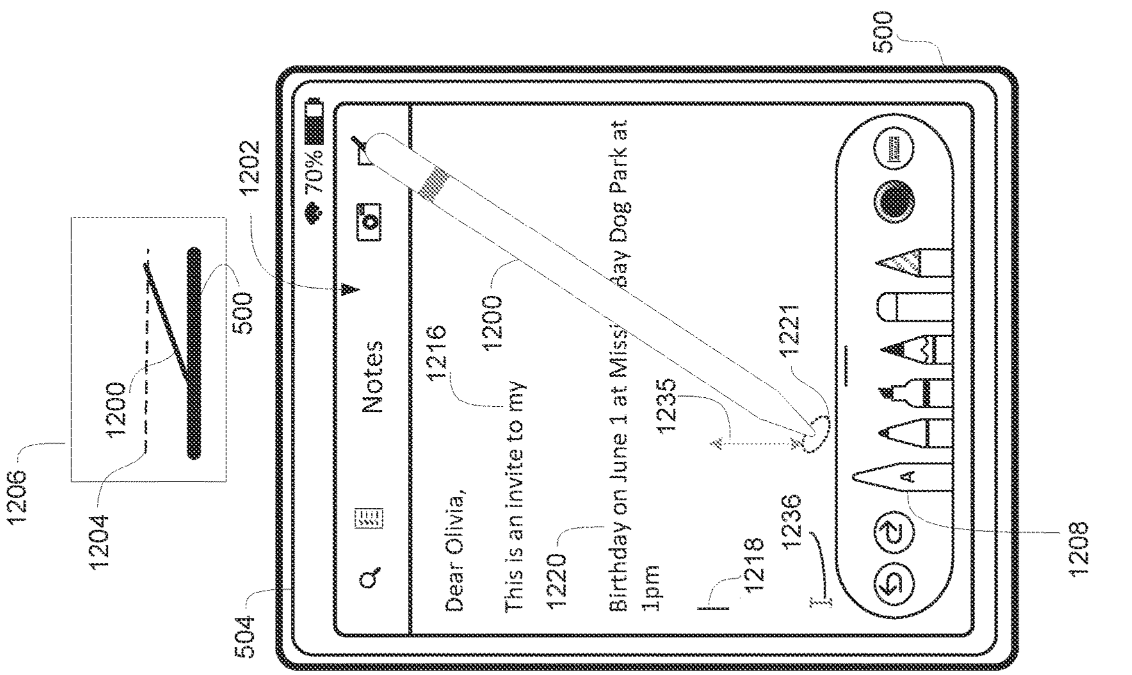
Figure 12U:
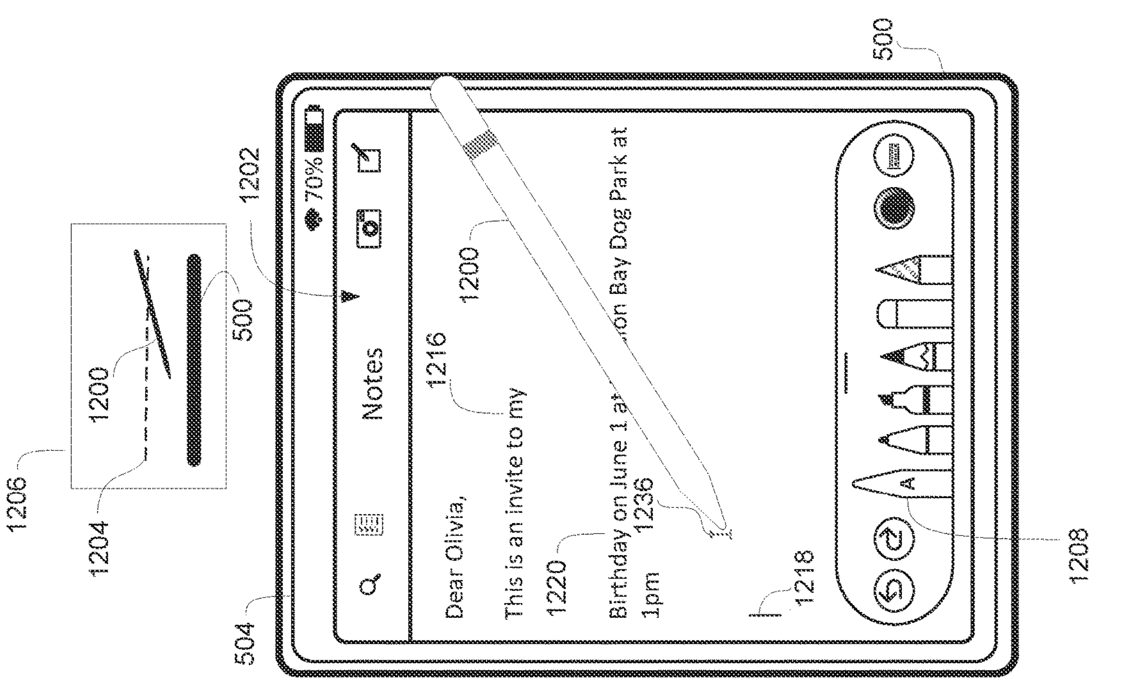

In FIG. 12T, the device 500 detects another indication of an input on the surface of the touch screen 504 corresponding to a request to insert a new line of content that is configured to include content. The input, for example, comprises a tap input 1221 on the surface of the touch screen 504 by the input device 1200. In some embodiments, if the tap input 1221 is received a first distance 1234 (e.g., 0.01, 0.03, 0.05, 0.1, 0.2, 0.3, 1, 3, or 5 cm) from the end of a last line in the user interface, the device 500 inserts one new line in the user interface. For example in FIG. 12T, when the tap input distance is the first distance 1234, the device 500 optionally inserts one new line of content, as shown in FIG. 12U (e.g., such as described previously with reference to FIGS. 12E-12F). In FIG. 12V, when the distance of the tap input is a second distance 1235 greater than the first distance 1234 from the end of the last line of content, the device 500 optionally inserts more than one new line of content in user interface 1202. The number of new lines inserted is optionally based on the distance 1235 as shown in FIG. 12W. For example, if the device 500 detects that the distance is equal to (or corresponds to) three new content lines, device 500 inserts three new content lines in user interface.

Figure 12X:
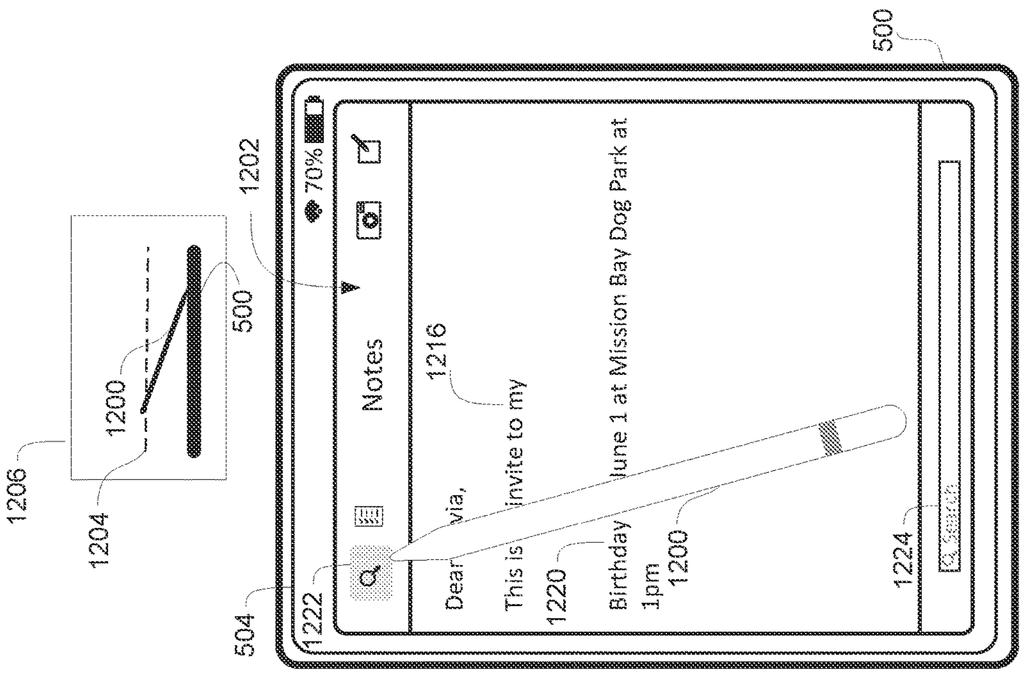
Figure 12W:
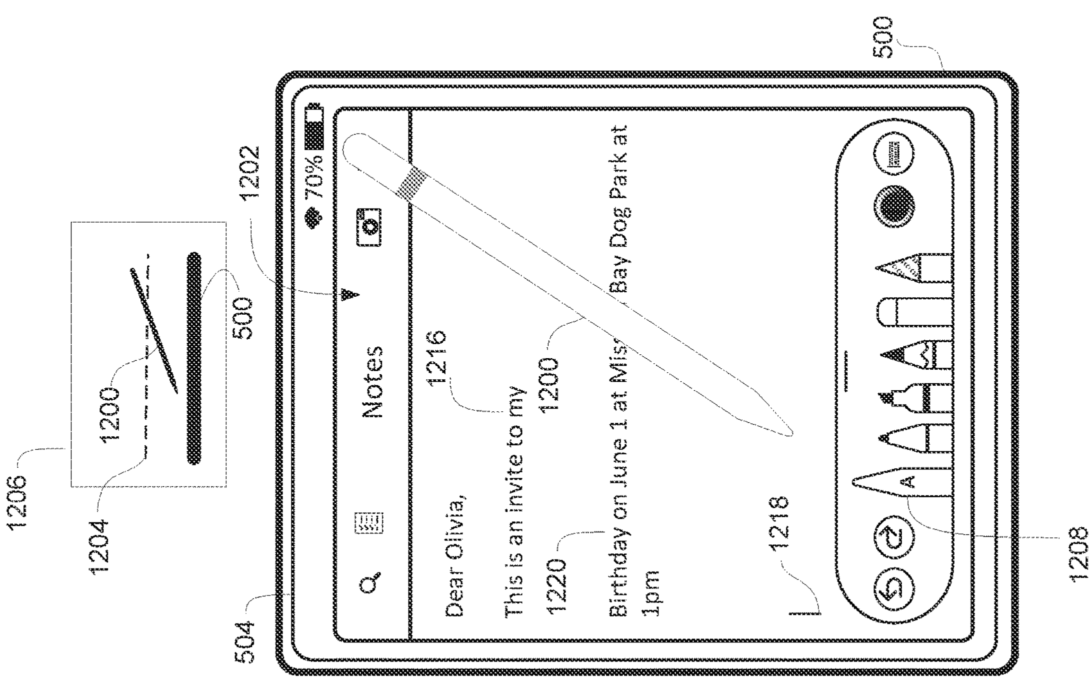
Figure 12Z:
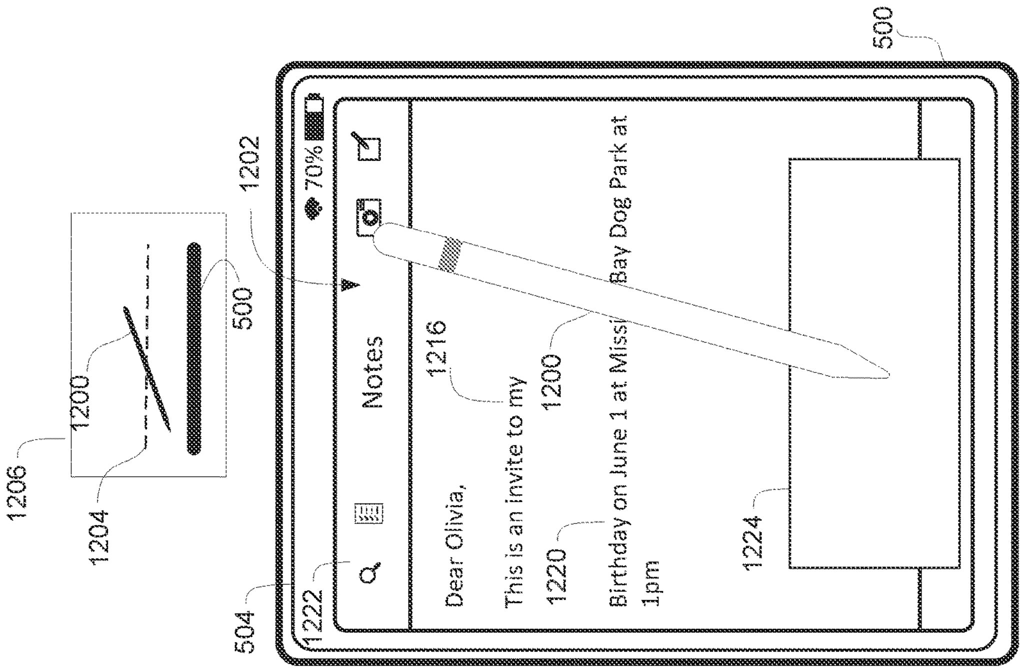
Figure 12Y:
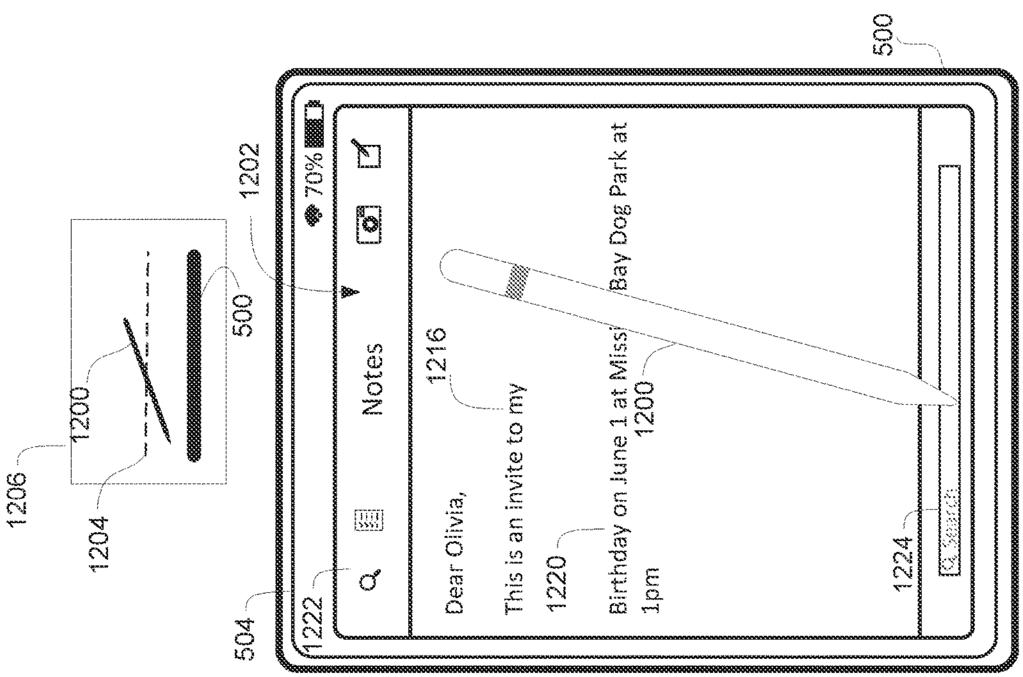
Figure 12A:
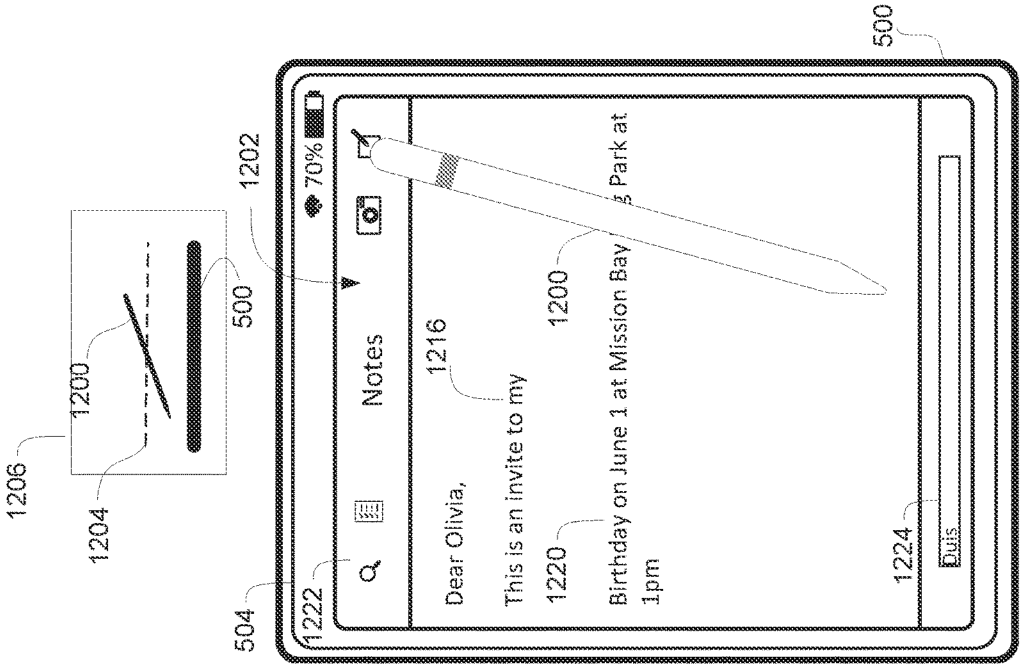
Figure 12A:
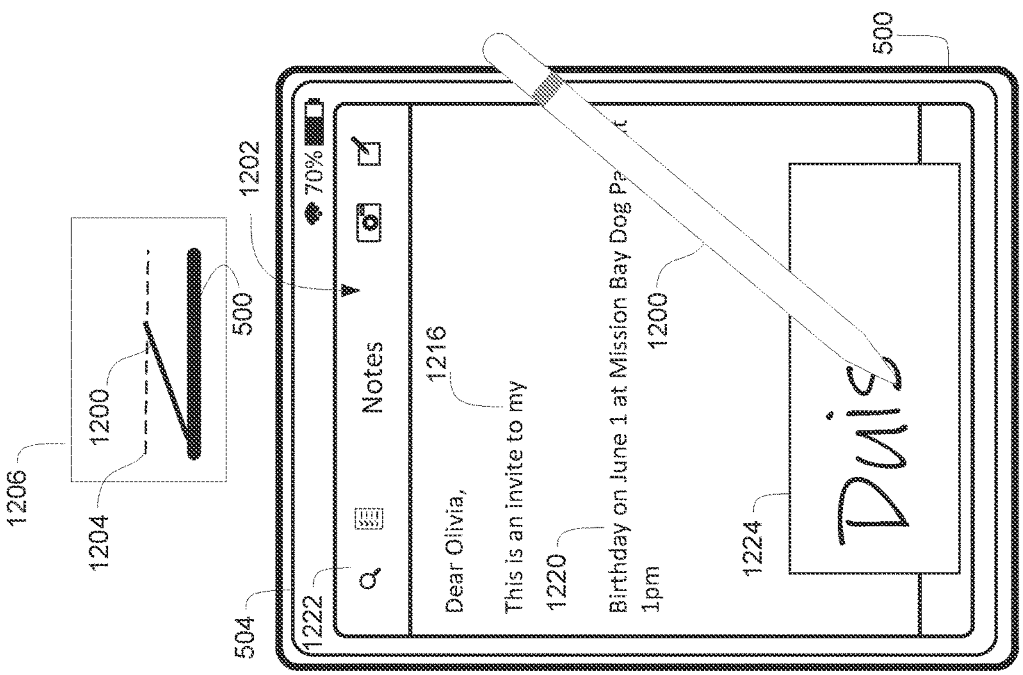
Figure 12A:
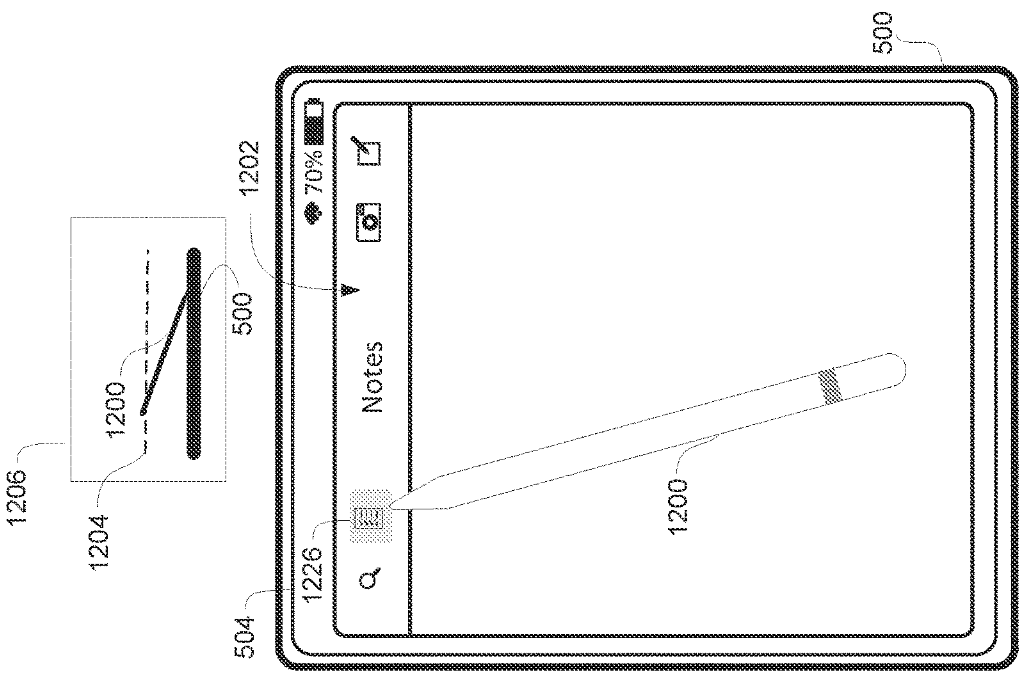
Figure 12A:
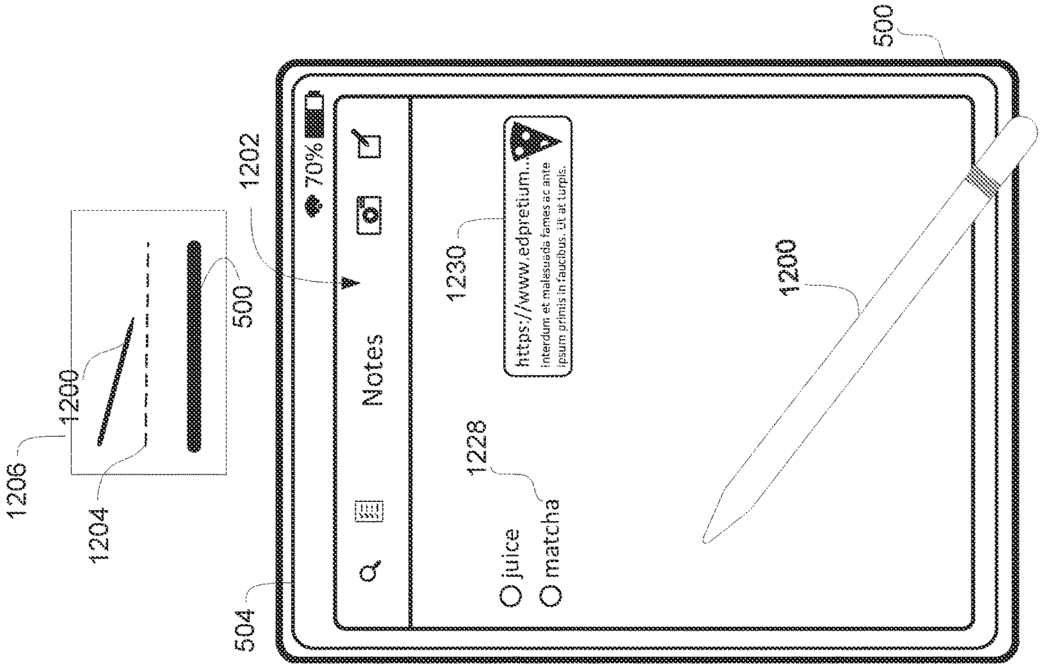
Figure 12A:
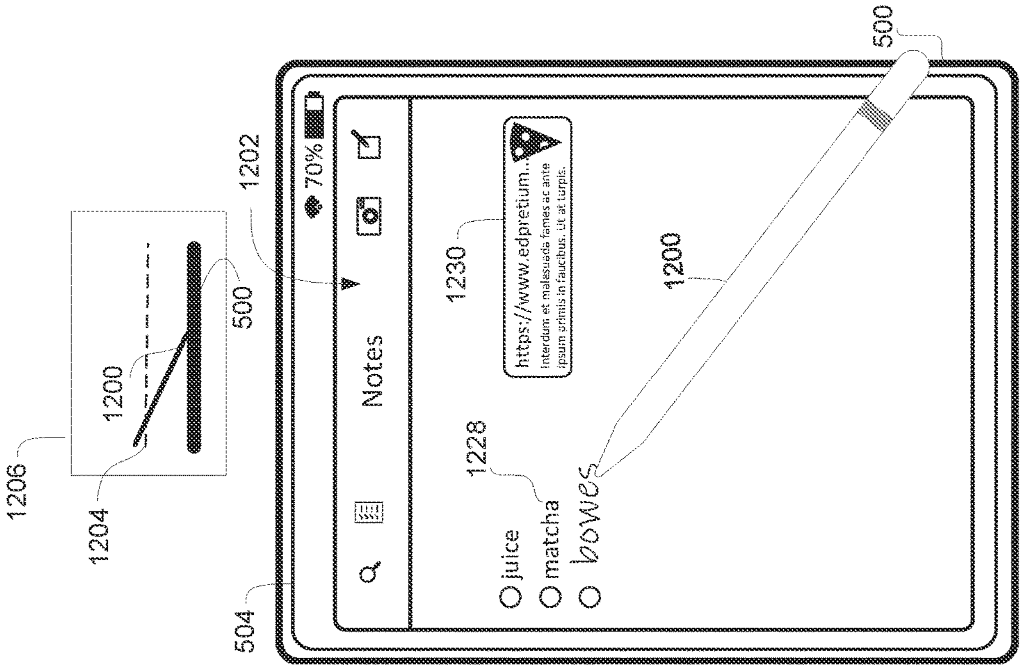
Figure 12A:
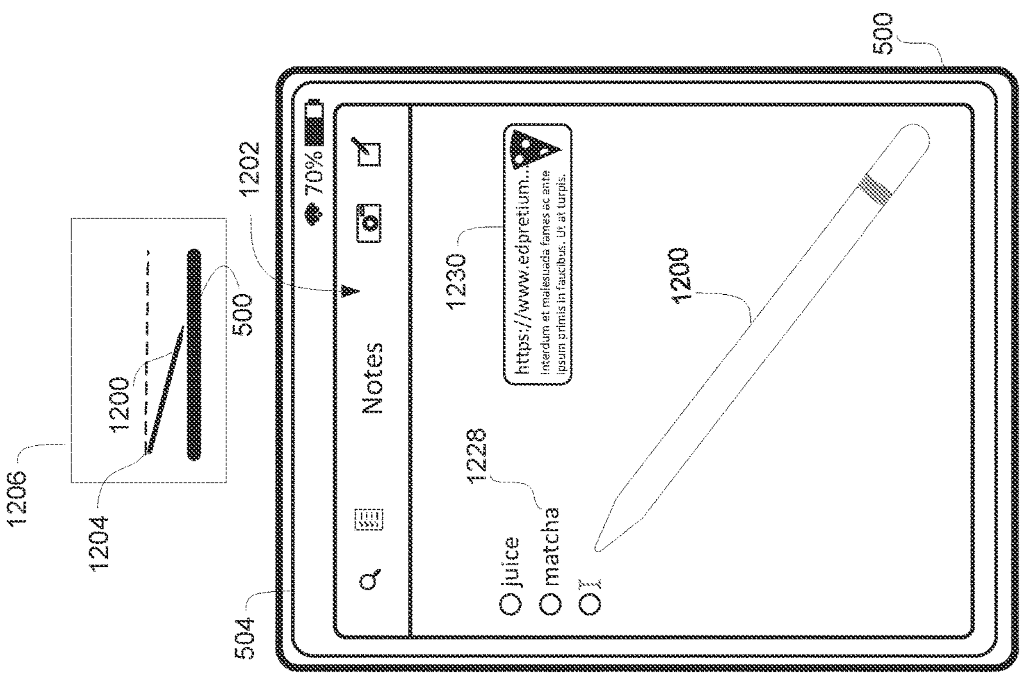
Figure 12A:
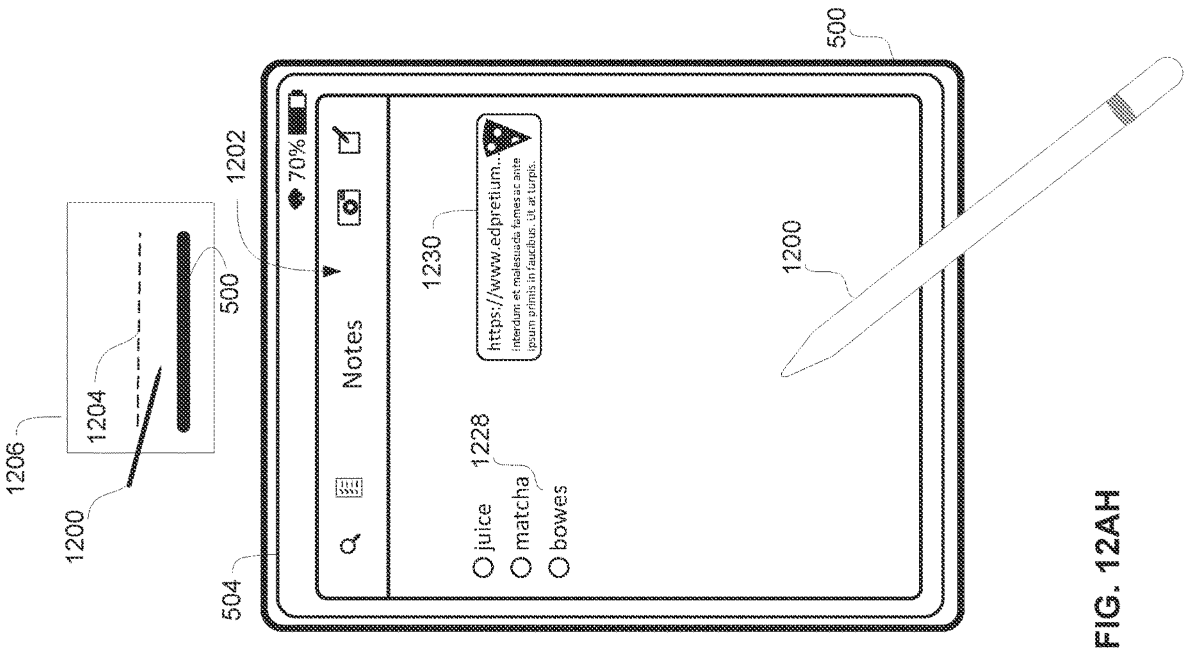
Figure 12A:
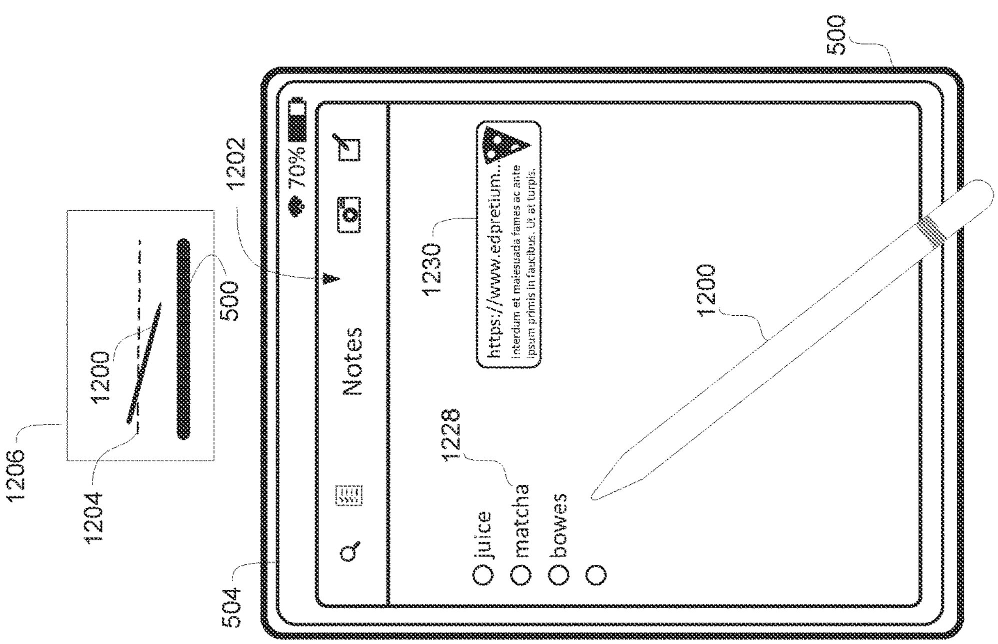
Figure 12A:
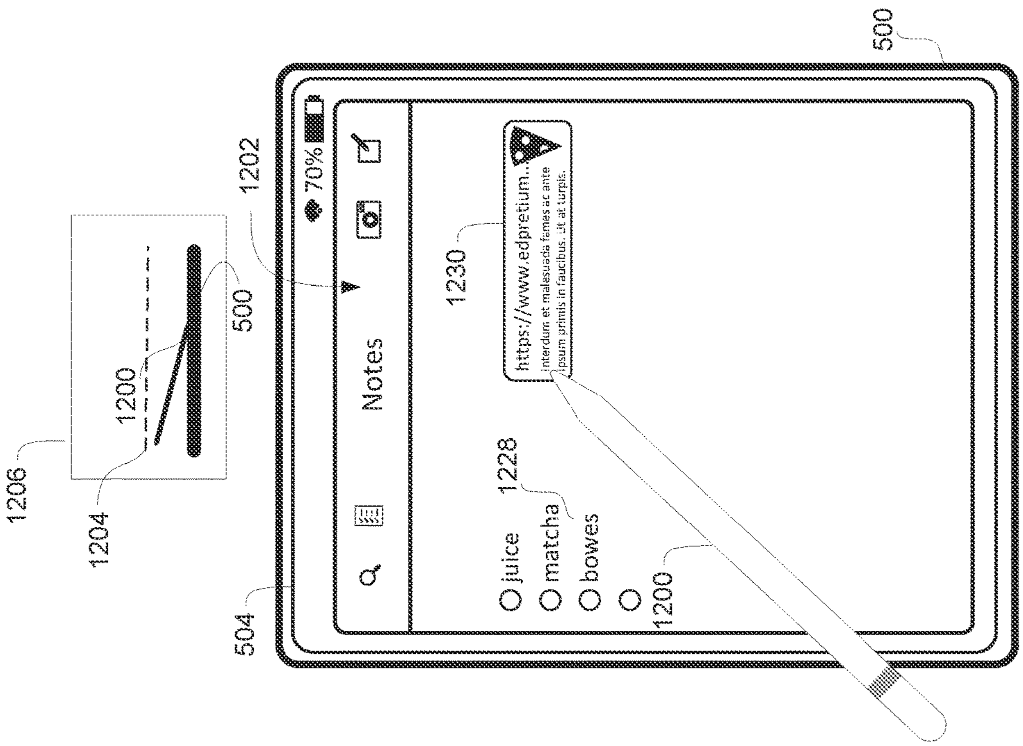
Figure 12A:
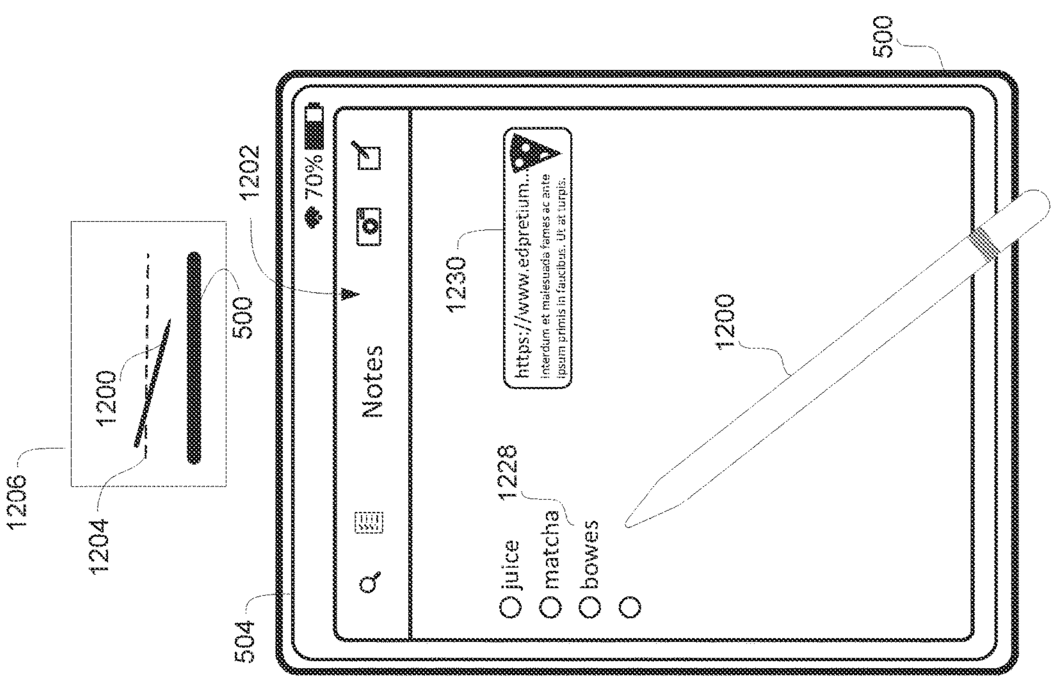
Figure 12A:
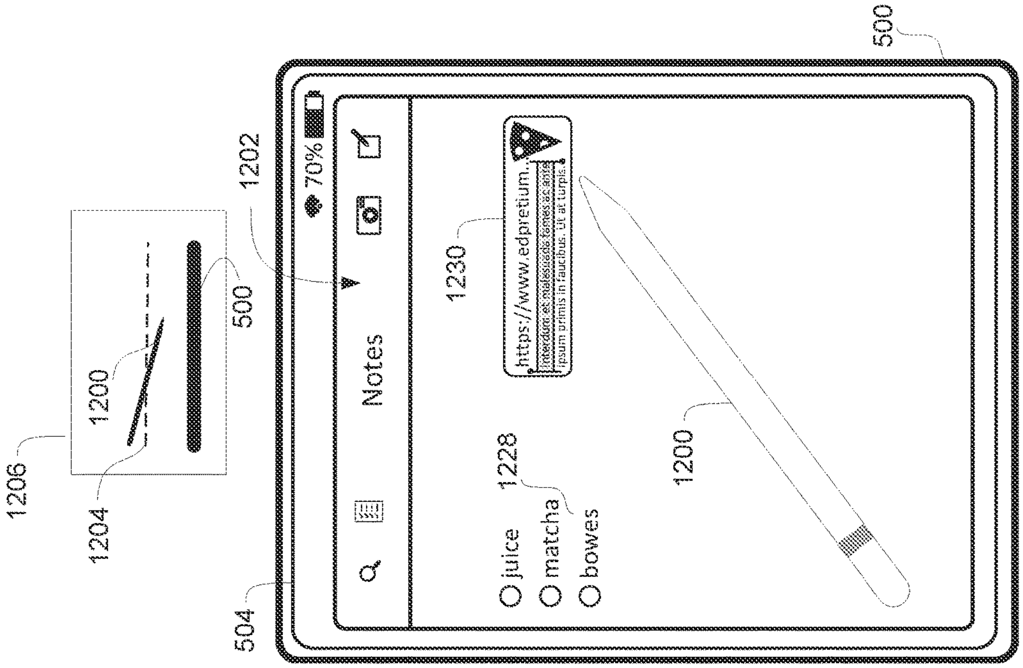
Figure 12A:
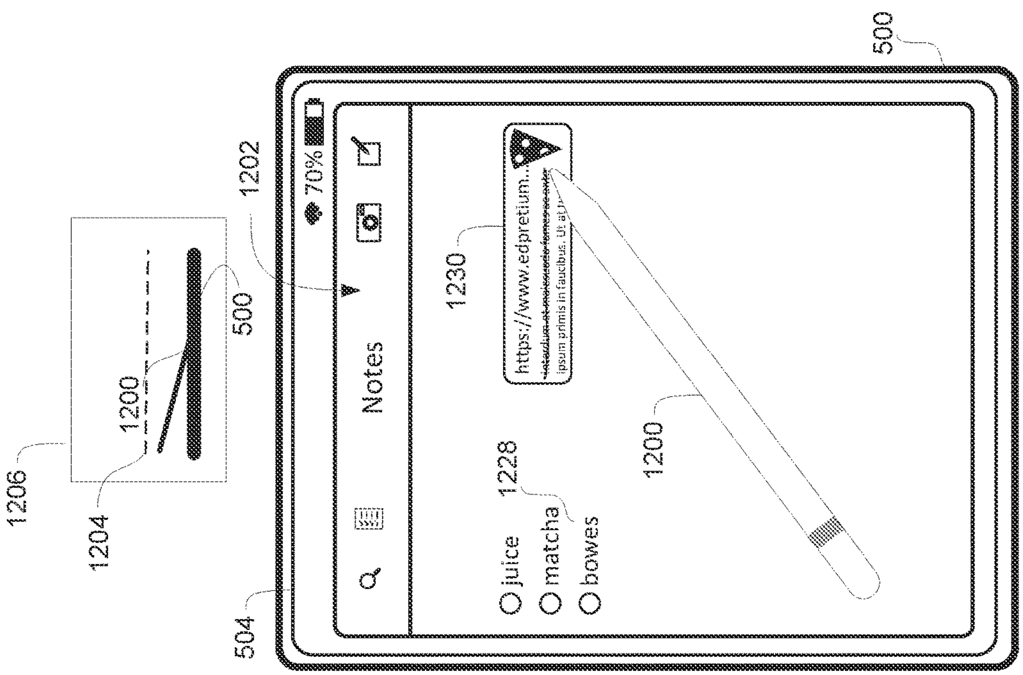
Figure 12A:
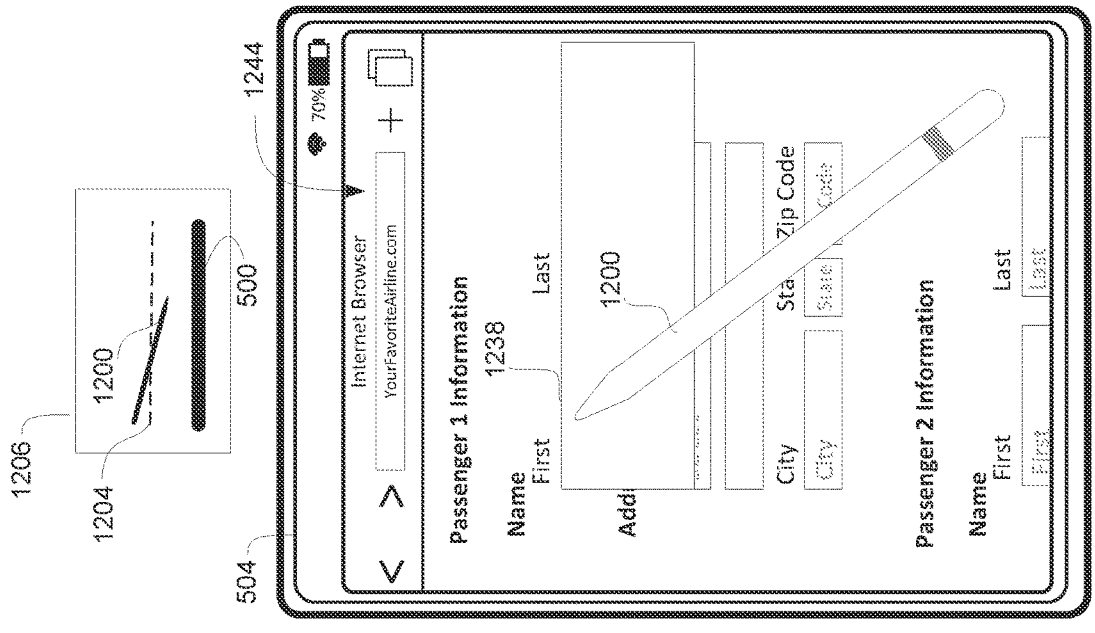
Figure 12A:
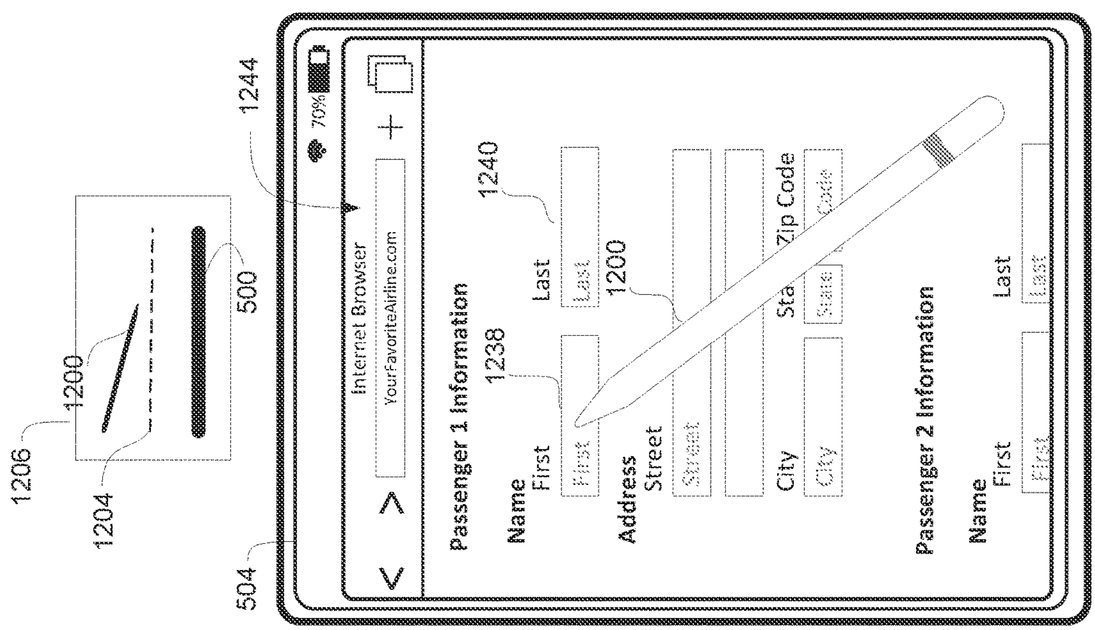
Figure 12A:
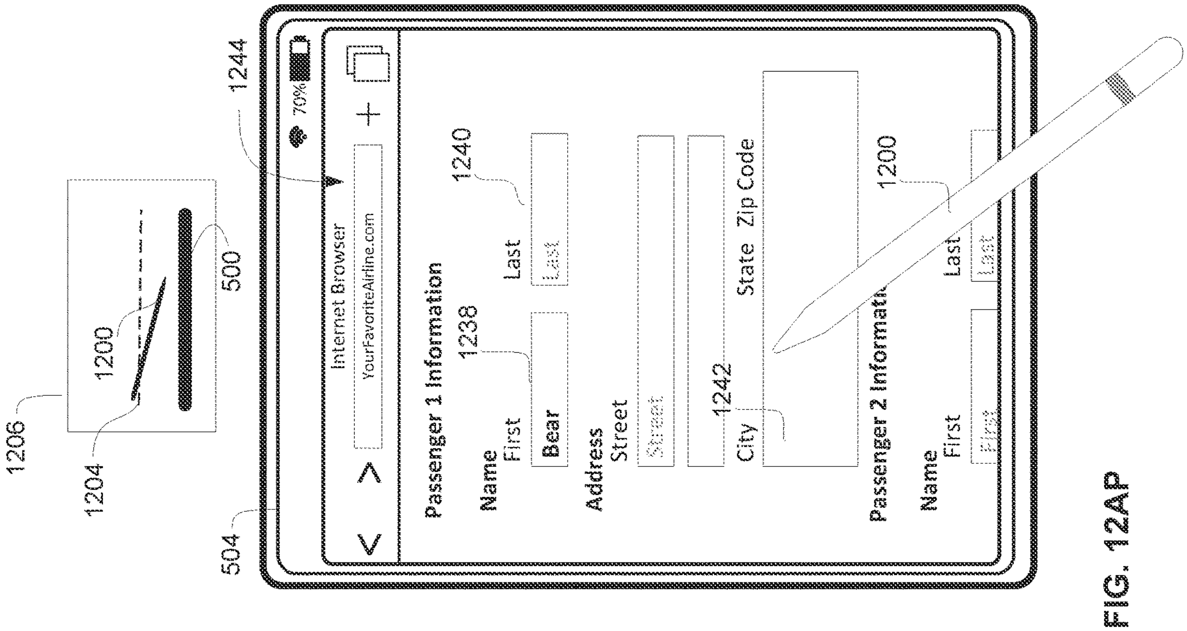
Figure 12A:
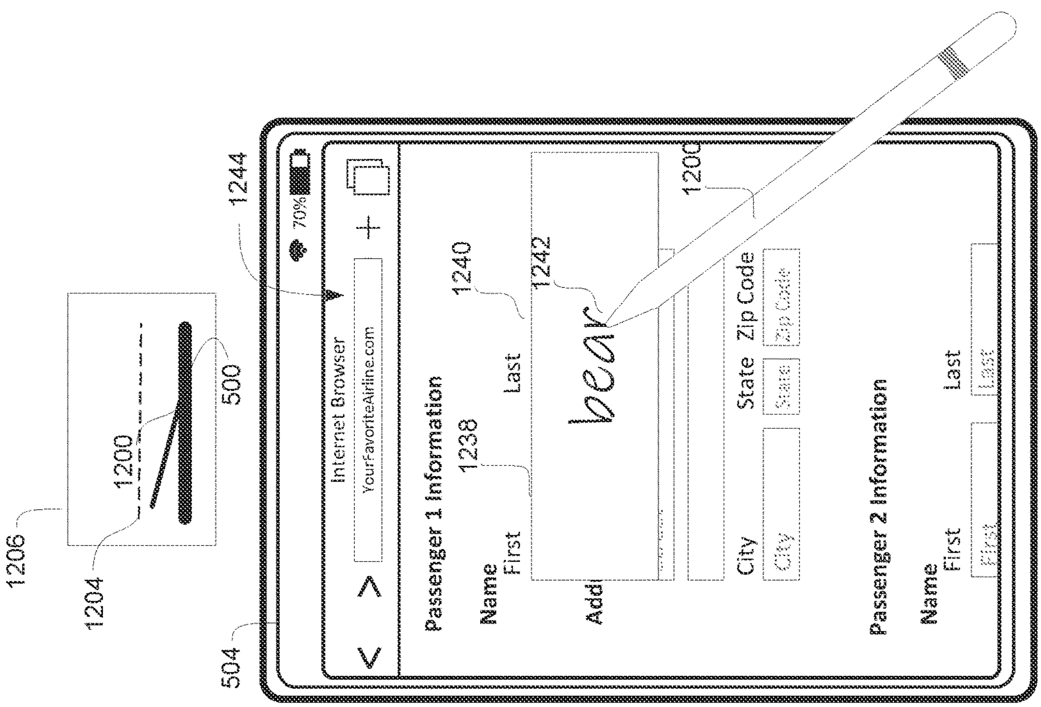
Figure 12A:
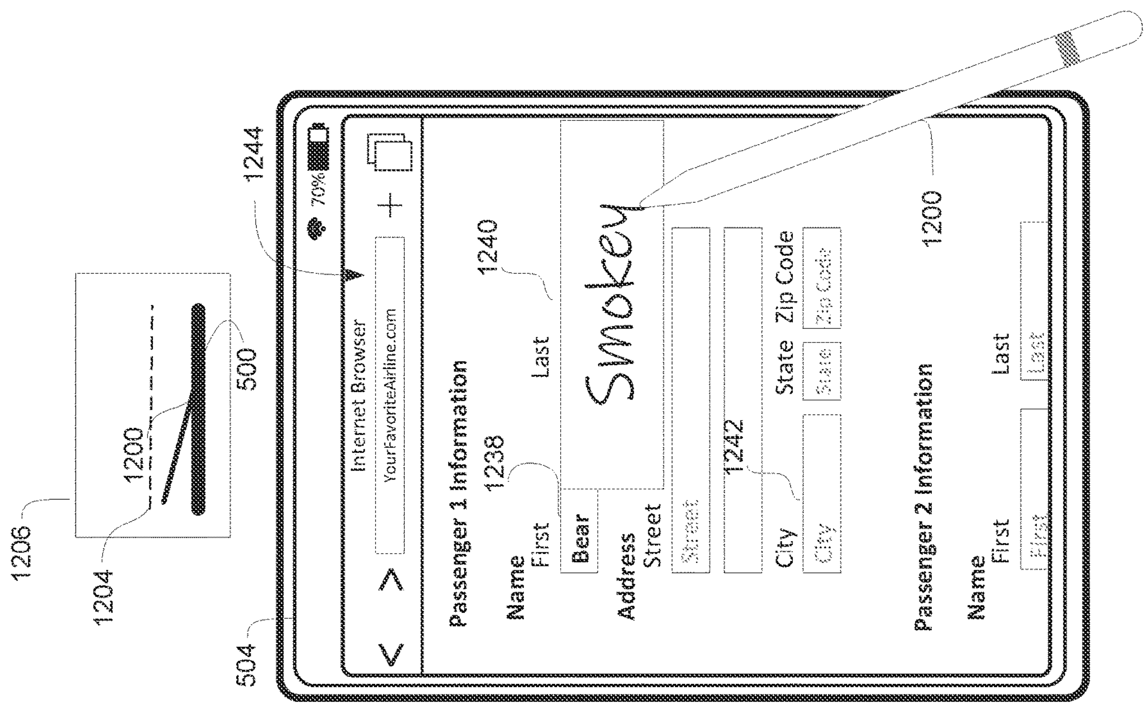
Figure 12A:
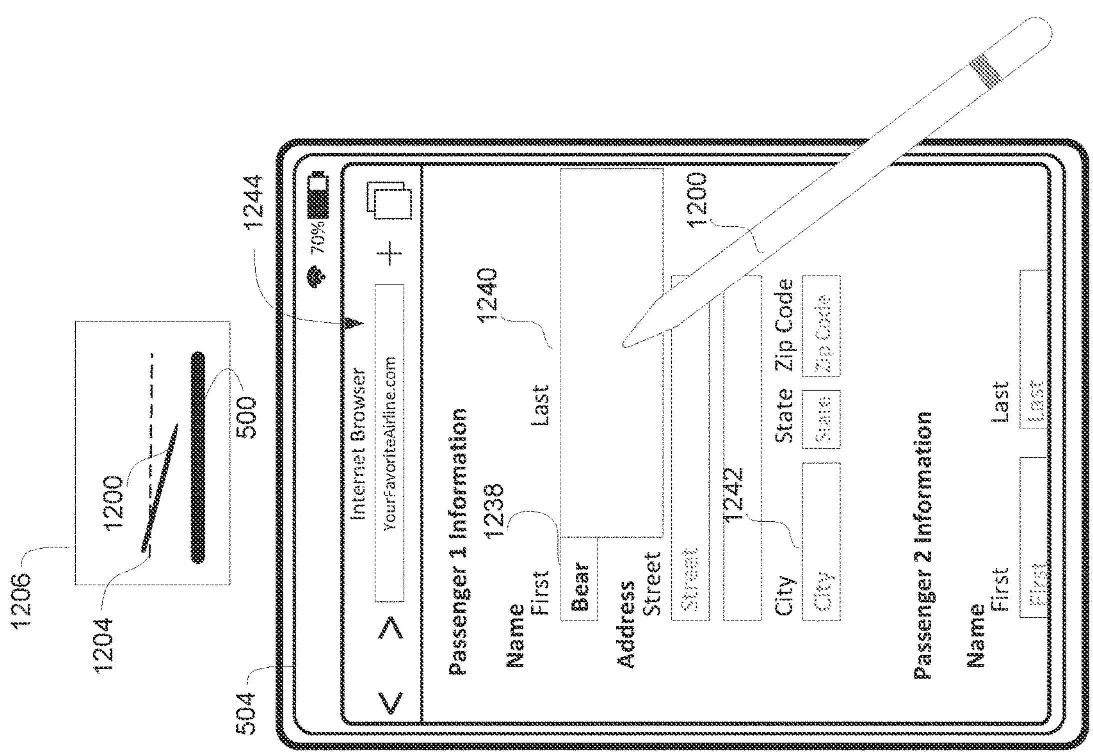
Figure 12A:
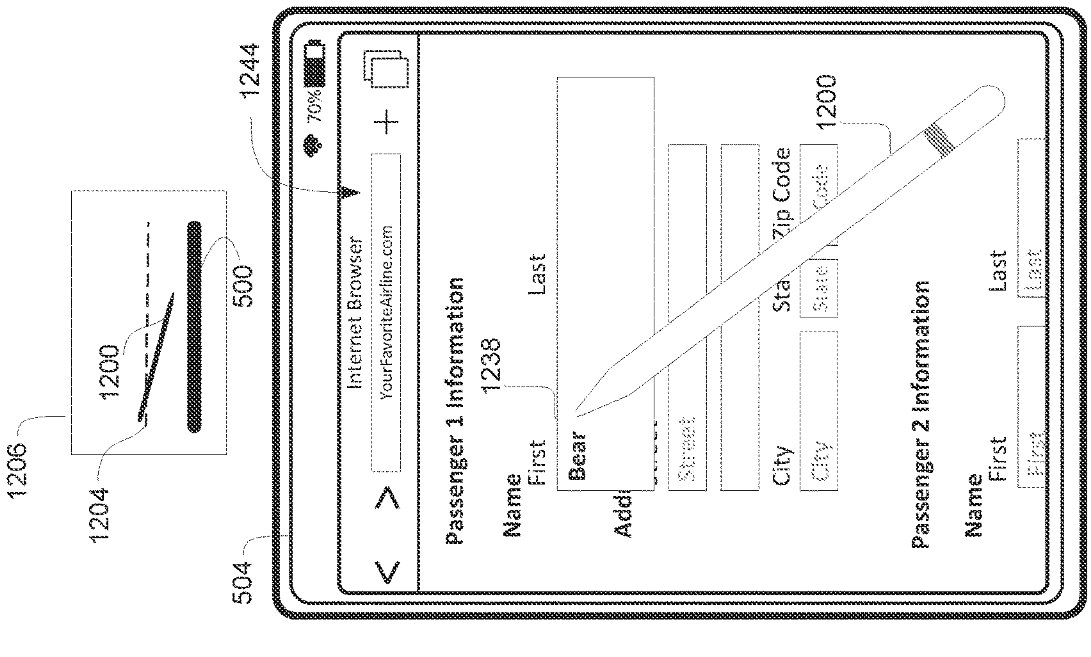
Figure 12A:
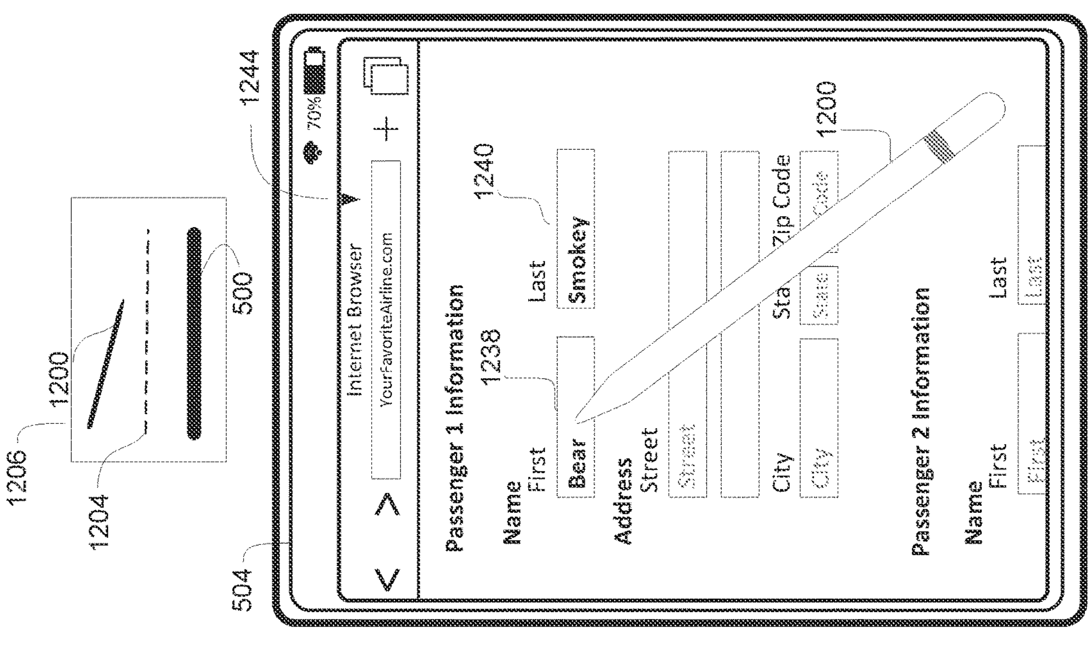
Figure 13A:
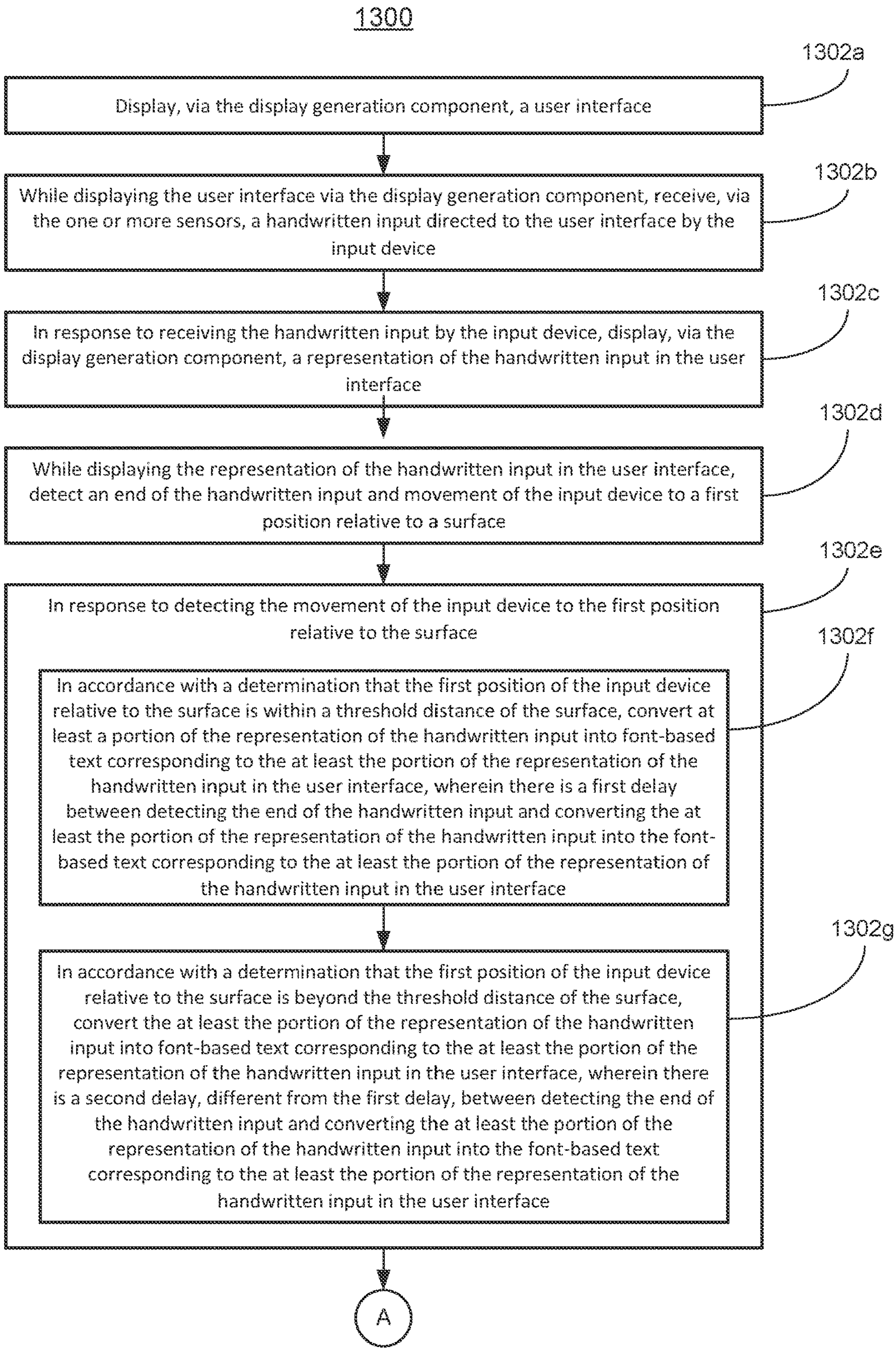
FIGS. 13A-13K are flow diagrams illustrating a method of providing for handwritten input for conversion into font-based text using an input device in accordance with some embodiments.
Figure 13B:
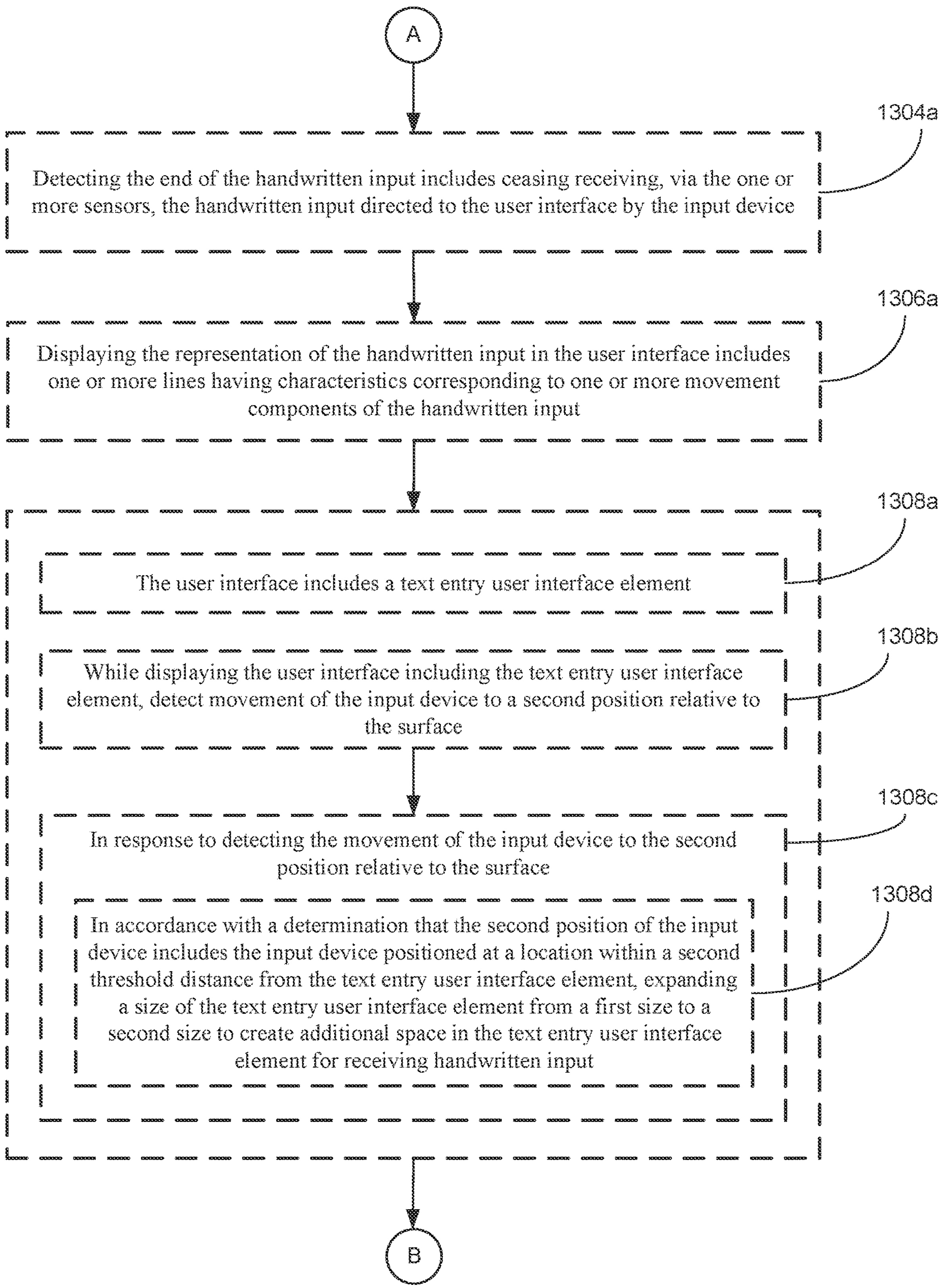
Figure 13C:
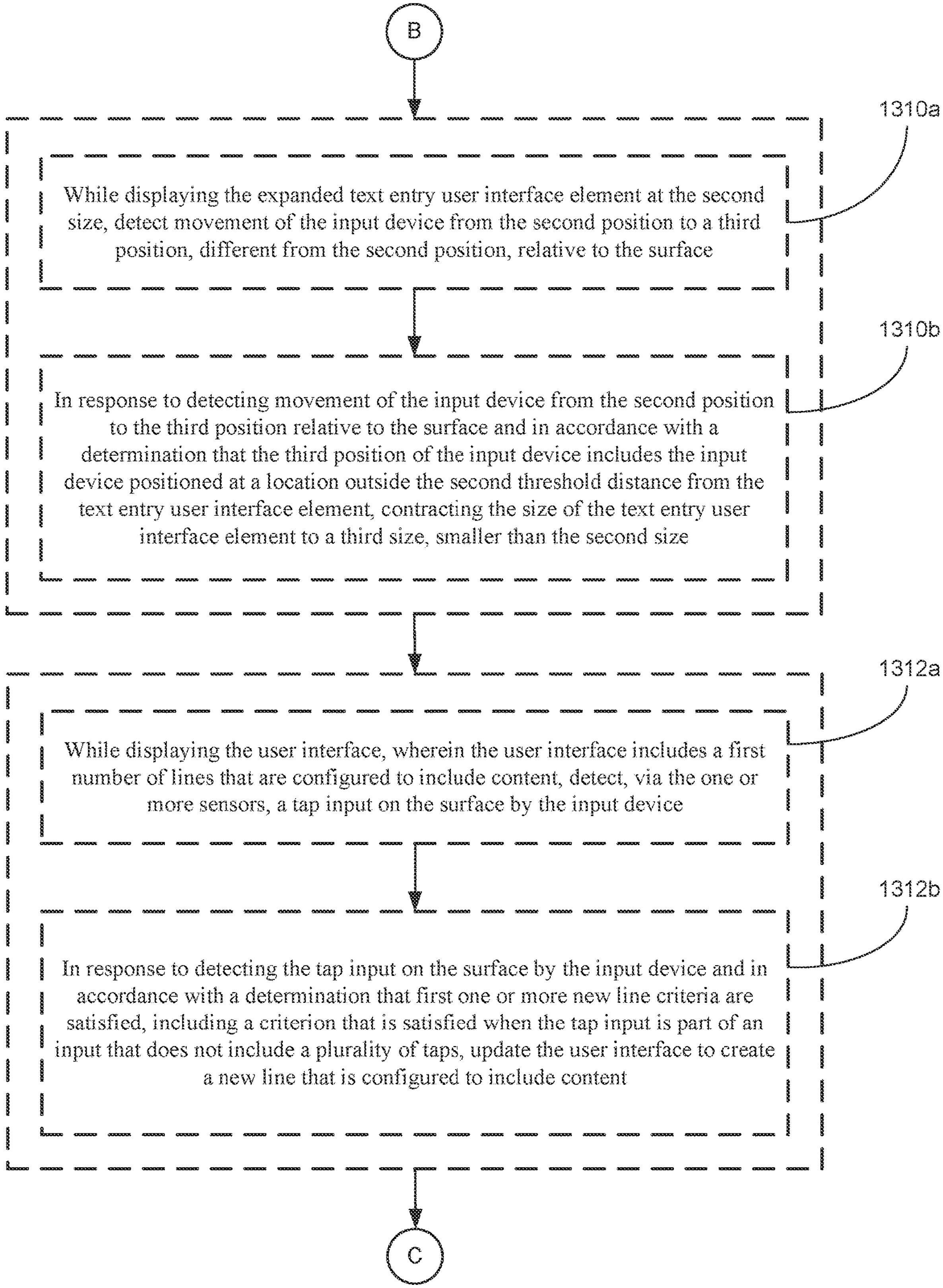
Figure 13D:
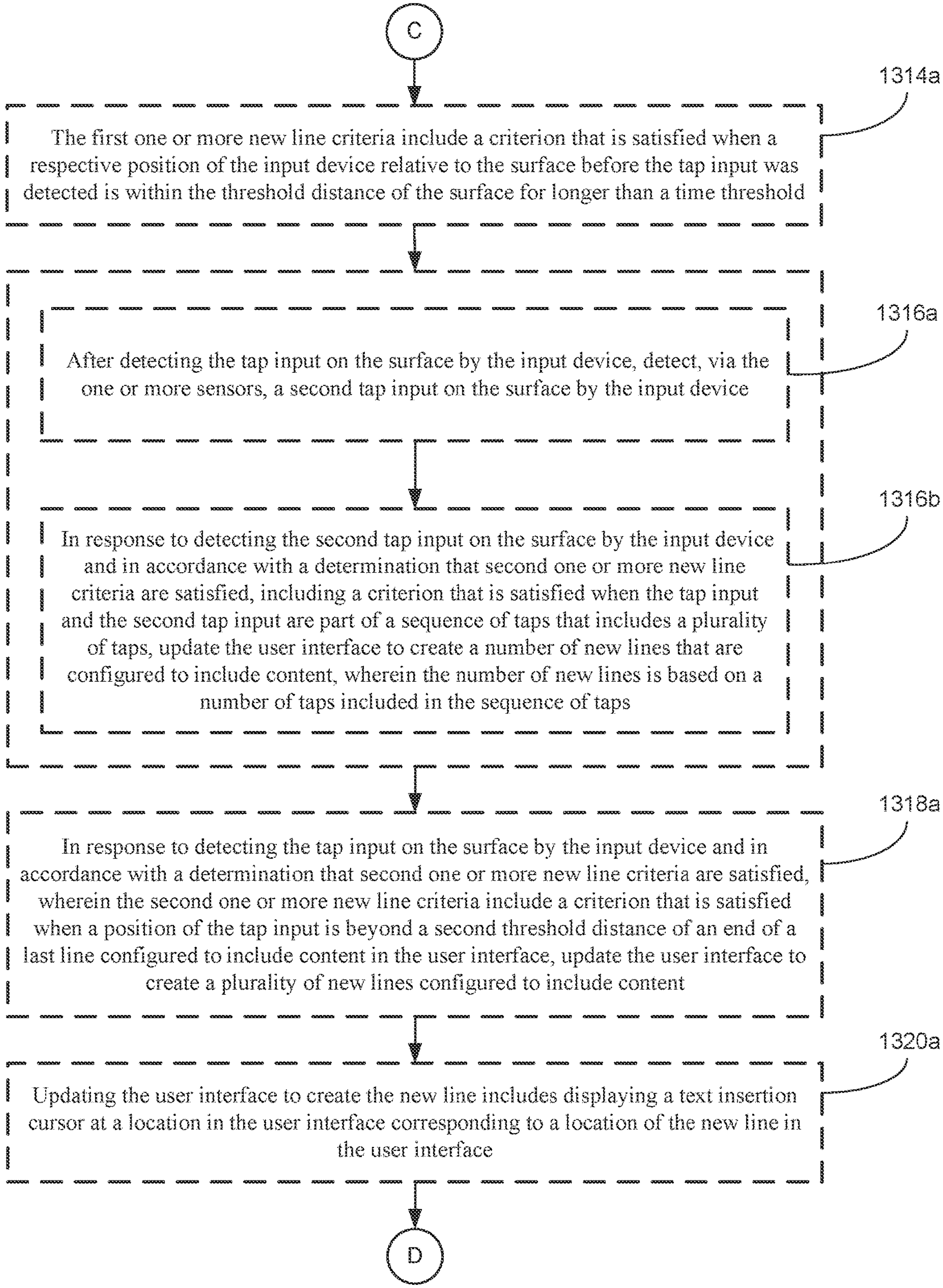
Figure 13E:
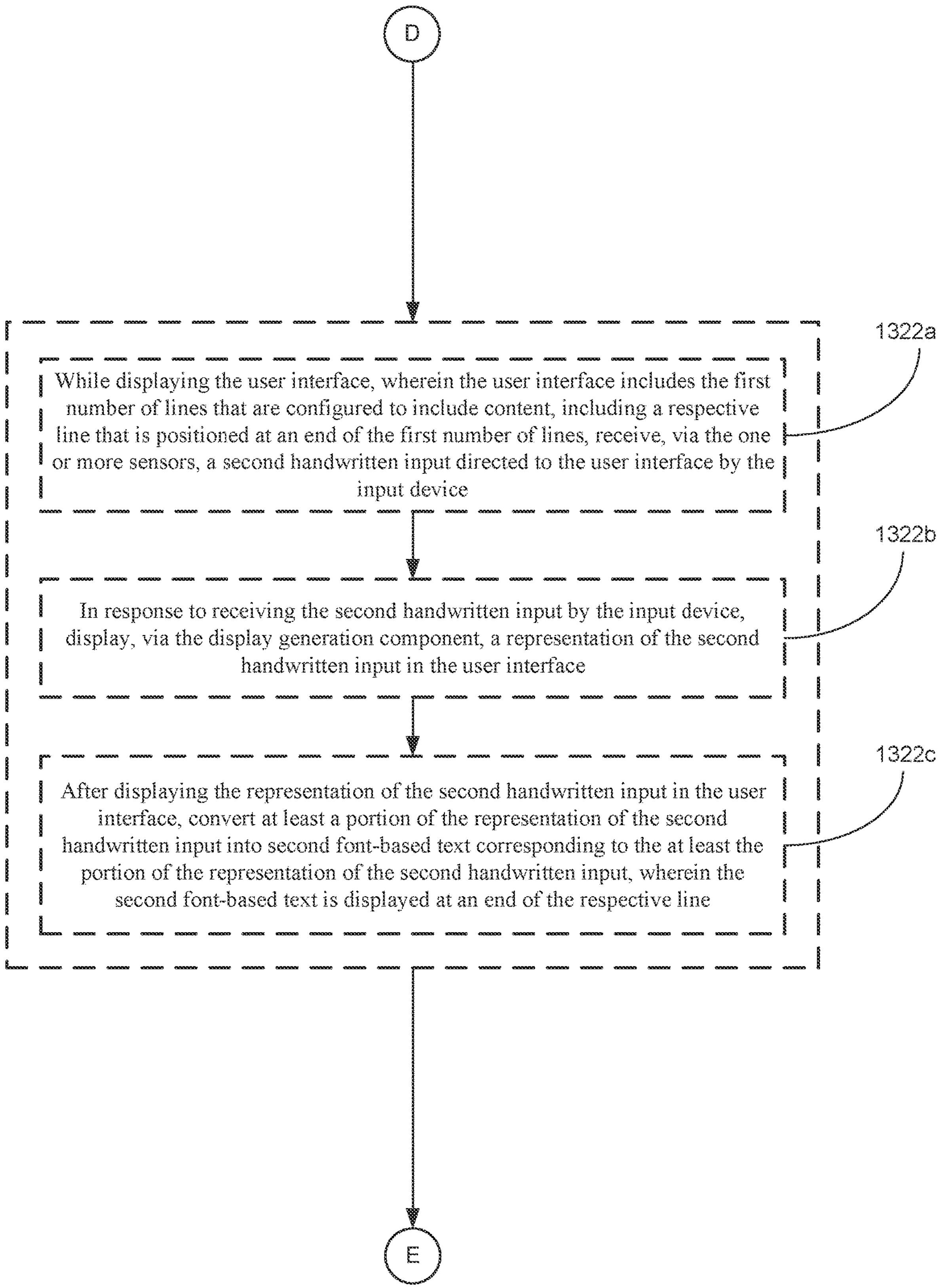
Figure 13F:
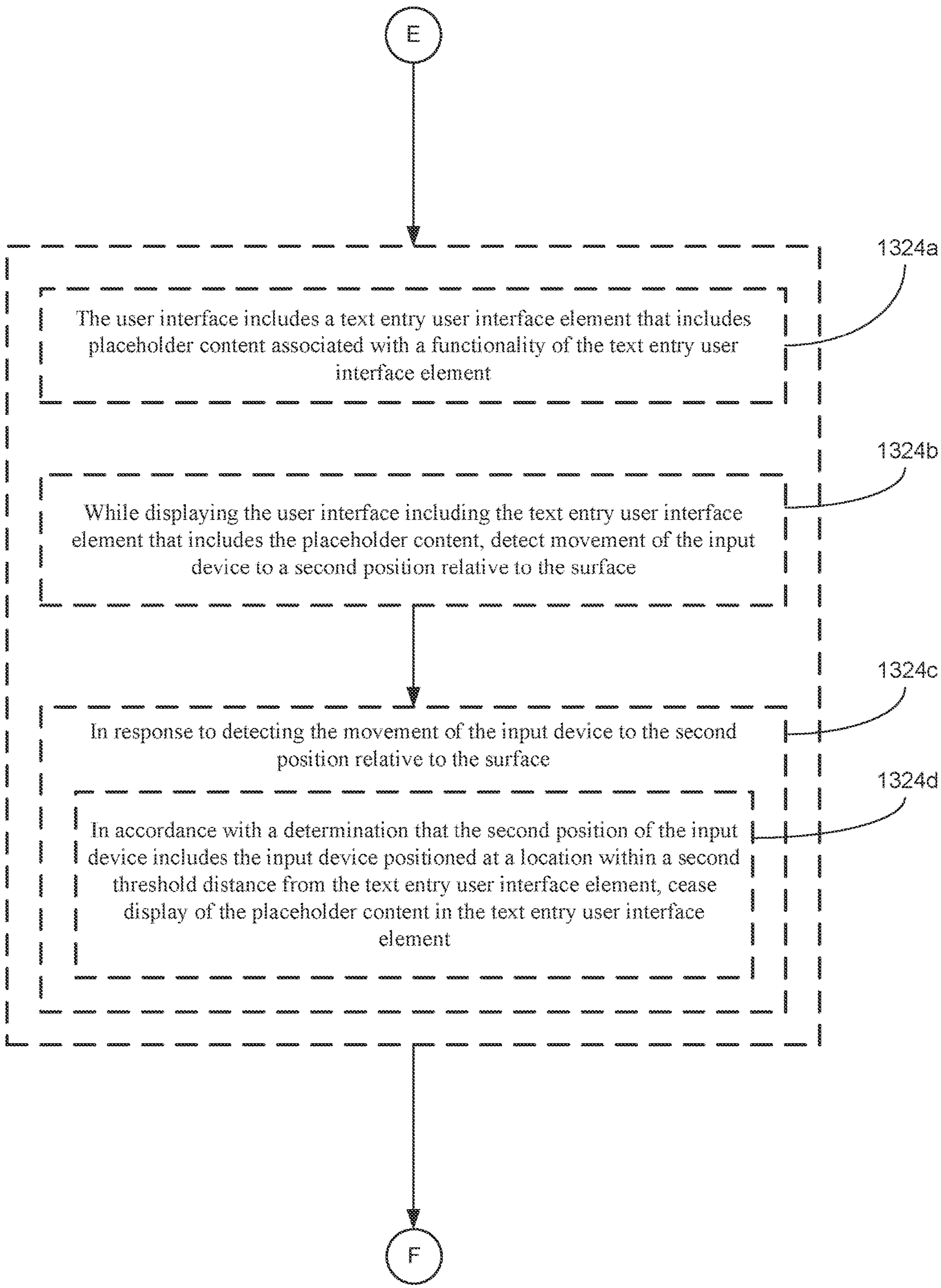
Figure 13G:
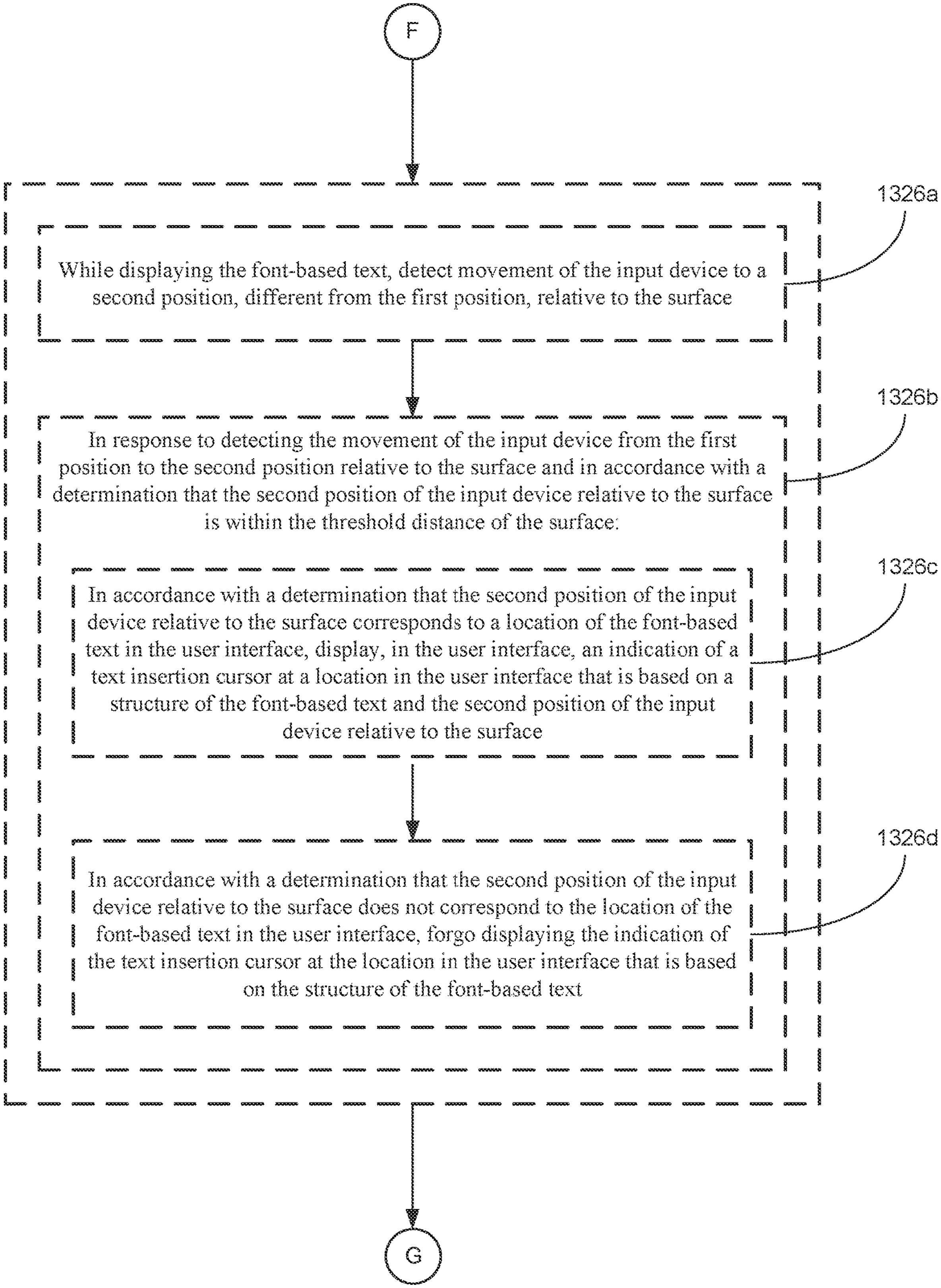
Figure 13H:
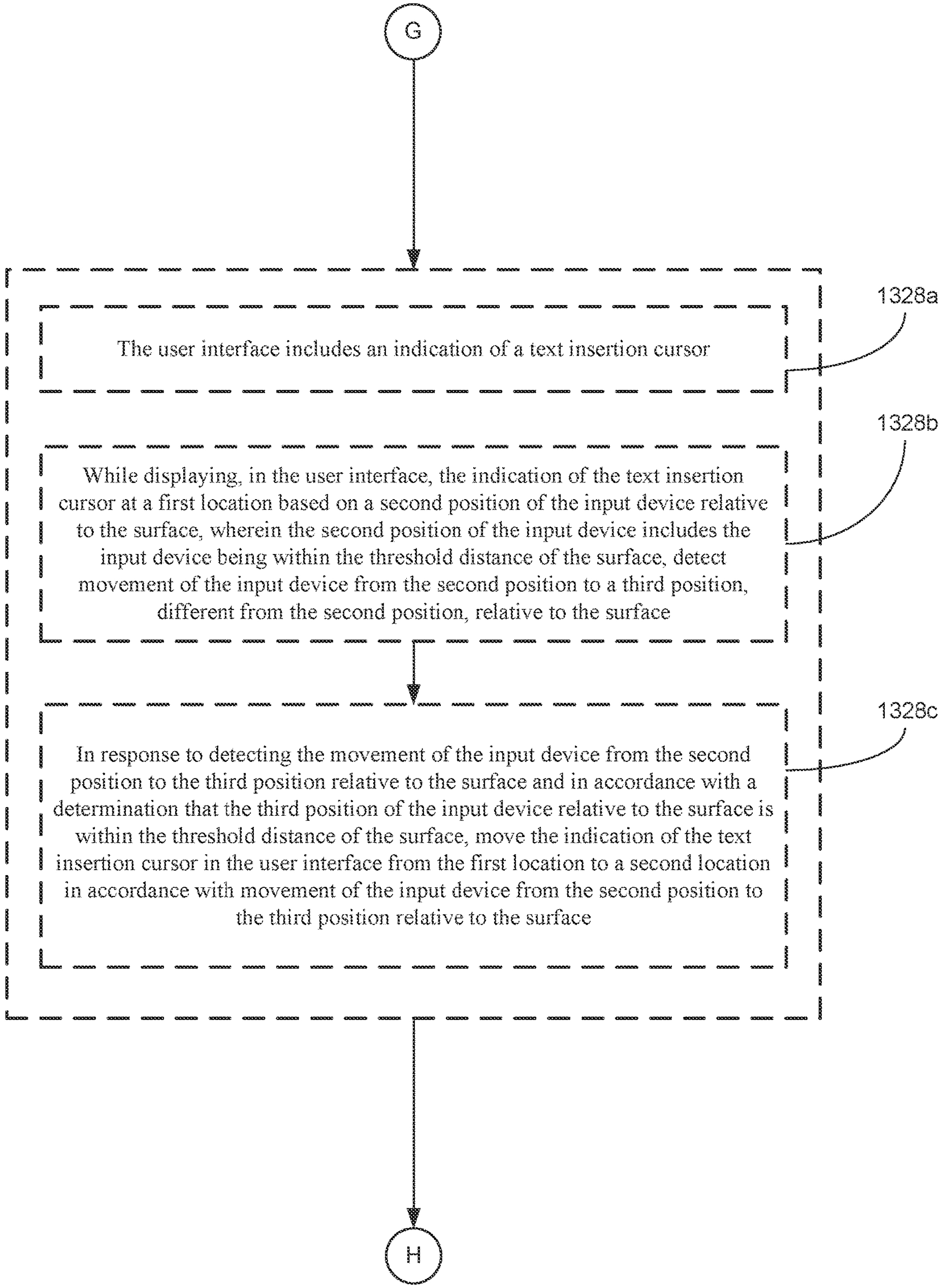
Figure 13I:
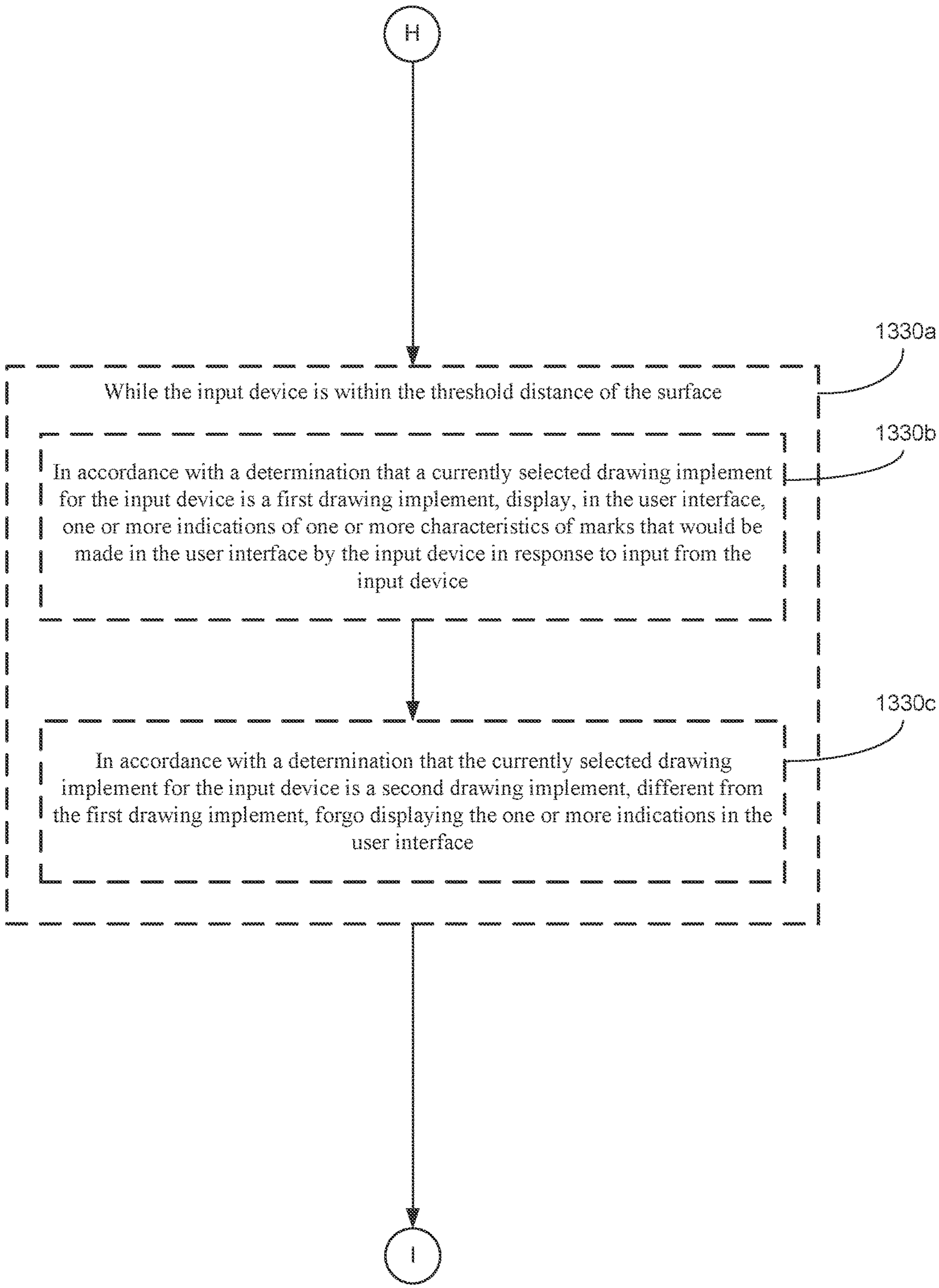
Figure 13J:
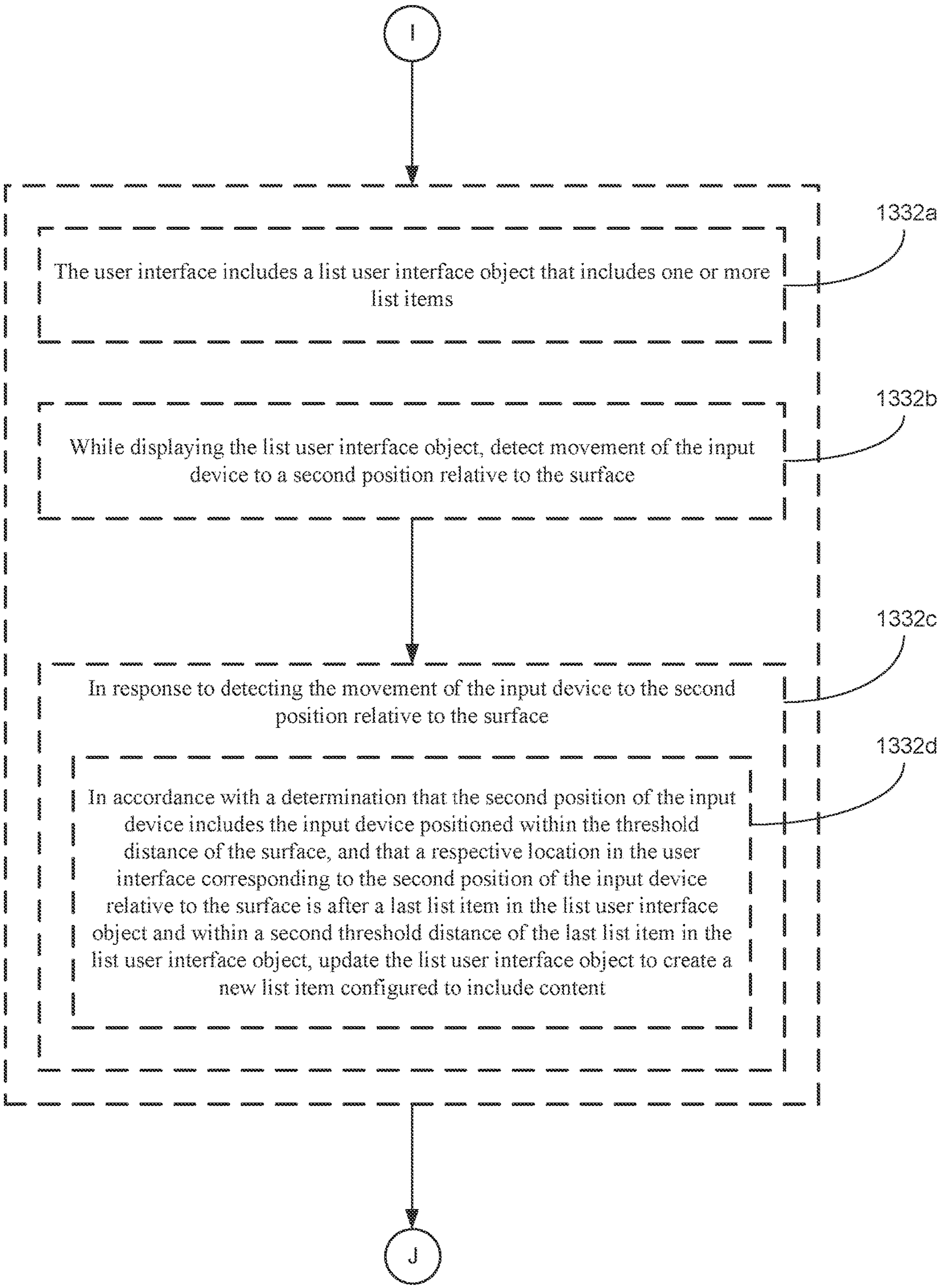
Figure 13K:
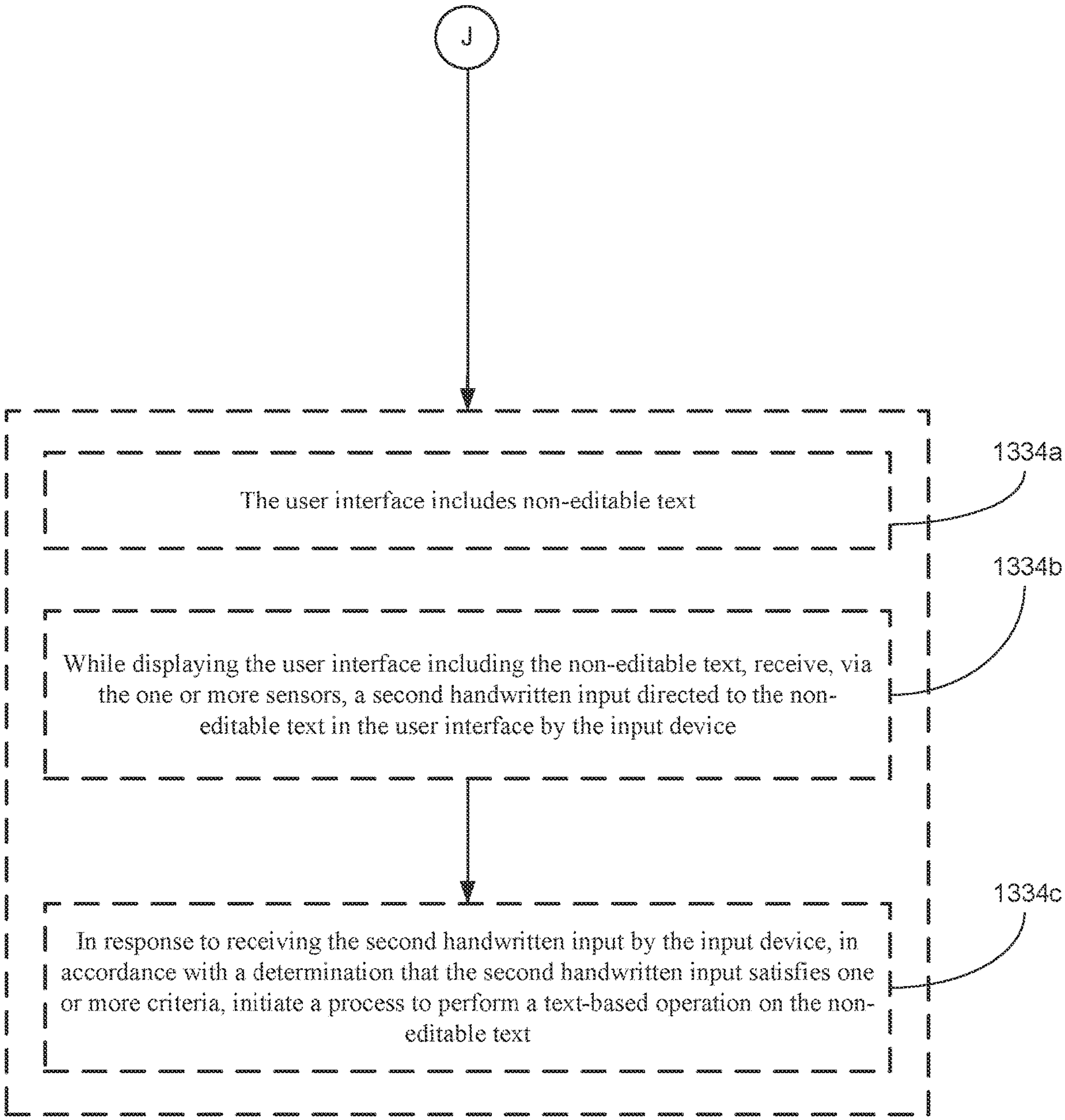

In FIG. 12X, the device 500 detects a request to invoke a search operation as indicated by input device 1200 selecting virtual object 1222 corresponding to a search button. In response to the selection of virtual object 1222, the device displays search input field 1224 in user interface 1202, as shown in FIG. 12X. In FIG. 12Y, the device 500 detects movement of the input device 1200 to a location within a lateral threshold distance of the search input field 1224 (e.g., 0.1, 0.3, 0.5, 1, 3, 5 or 10 cm) while hovering over touch screen 504 within threshold 1204 of touch screen 504. As shown in FIG. 12Z, in response to detecting input device 1200 hovering within threshold 1204 of touch screen 504 at a location within the lateral threshold distance of the search input field 1224, the device 500 expands the size of the search input field 1224 to create additional space in the search input field 1224 for receiving handwritten input from input device 1200 as shown in FIG. 12AA. Device 500 further removes the placeholder text "Search" that was displayed in search field 1224 in FIG. 12Y.

In FIG. 12AA, device 500 has detected handwritten input from input device 1200 in the expanded search field 1224, and is displaying a representation of that handwritten input in the expanded search field 1224. In FIG. 12AB, device 500 detects and end of the handwritten input and that the input device 1200 has moved beyond the lateral threshold distance of the search input field 1224; in response, the device 500 reverts the search input field 1224 back to its original size and converts the handwritten input to font-based text in search field 1224.

In FIG. 12AC, the device 500 detects a request to display a list user interface object in user interface 1202, as indicated by input device 1200 selecting the button 1226 associated with creating a list user interface object in user interface 1202. FIG. 12AD illustrates a list object 1228 with two list items in user interface 1202. In FIG. 12AD, input device 1200 is not within threshold 1204 of touch screen 504 and is not within a lateral threshold distance of list object 1228. In response to the device 500 detecting that the input device 1200 is positioned within the lateral threshold distance from the list object 1228 (e.g., 0.1, 0.3, 0.5, 1, 3, 5 or 10 cm) and within threshold distance 1204 of touch screen 504, as shown in FIG. 12 AE, the device 500 displays an indication of a new list item entry field under the last item on the list 1228 as shown in FIG. 12AE (e.g., displays a new bullet point in the list object 1228 under the previous last item in the list "matcha", and displays the shadow text insertion cursor at the location of the new bullet point in the list object 1228).

FIG. 12AF illustrates the device 500 receiving handwritten input from input device 1200 in the area of the new list item entry field, and device 500 displays the representation of the handwritten input as shown in FIG. 12AF. In response to receiving the handwritten input, the device 500 converts the handwritten input into font-based text according to the same methods described with reference to FIGS. 12A-12C, as shown in FIG. 12AG. In some embodiments, the new list item into which the handwritten input corresponding to "bowes" was entered was optionally created in response to device 500 detecting touchdown of input device 1200 on touch screen 504 when providing the handwritten input for "bowes".

In FIG. 12AG, after converting the handwritten input for "bowes" into font-based text, the device 500 includes a new list item under the recently converted font-based text for "bowes", because input device 1200 remains within threshold distance 1204 of touch screen 504, and within the lateral threshold distance of list object 1228. In FIG. 12AH, while input device 1200 remains within the threshold distance 1204 of touch screen 504, the device 500 detects movement of the input device 1200 from a location within the lateral threshold distance from the list object 1228 to a location outside the lateral threshold distance from the list object 1228. In response to the movement of input device 1200 outside the lateral threshold distance from the list object 1228, the device 500 ceases to display the new list item entry field under the recently added list item in list object 1228, as shown in FIG. 12AH. In FIG. 12AI, the input device 1200 again moves to a location within the lateral threshold distance from the list object 1228 while being within threshold distance 1204 from touch screen 504, and in response, device 500 redisplays the new list item entry field at the end of list object 1228, as shown in FIG. 12AI.

In FIG. 12AJ, the user interface includes non-editable content 1230 corresponding to summary of a webpage. Non-editable content 1230 is optionally an image, and includes text content a part of the image. From FIGS. 12AJ to 12AK, device 500 detects an input on the surface of the touch screen 504 from input device 1200 (e.g., a horizontal stroke through at least part of the non-editable text in content 1230) corresponding to a request to select part of the content displayed in the summary of the webpage 1230. The input in FIG. 12AK includes a horizontal movement of input device 1200 on touch screen 504 as depicted in FIG. 12AK. In response to the input, the device 500 performs an operation to select the content as illustrated in FIG. 12AL, because the input meets criteria for being an input for selecting content as described in more detail with reference to method 1300. After the device 500 selects the content as illustrated in FIG. 12AL, the device 500 permits further content operations related to copying and/or cutting the selected content, such as via copy or paste operations.

FIGS. 12AM-12AT illustrate a user interface 1244 comprising a plurality of text entry fields. In some embodiments, a text entry field (e.g., text entry region) is a user interface element in which a user is able to enter text (e.g., letters, characters, and/or words). For example, a text entry field is optionally a text field on a form, the URL entry element on a browser, and/or login fields. In some embodiments, a text entry field is any user interface element in which a user is able to enter text and is able to edit, delete, copy, and/or cut such text, or perform any other text-based operations on such text. It is understood that a text entry field (e.g., text entry region) is not limited to a user interface element that only accepts text (whether handwritten or font-based), but optionally one that is also able to accept and display audio and/or visual media.

In some embodiments, as shown in FIG. 12AM, user interface 1244 is of an internet browser application that is displaying a passenger information entry user interface (e.g., for purchasing airplane tickets). It is understood that the examples shown in FIGS. 12AM-12AT are exemplary and should not be considered limiting to only the user interfaces and/or applications illustrated. In some embodiments, user interface 1244 includes text entry fields 1238 and 1240 in which a user is able to enter text to populate the respective text entry fields (e.g., information for two passengers).

In FIG. 12AM, input device 1200 is detected within the lateral threshold distance from text entry field 1238, but is not within threshold 1204 of touch screen 504. Therefore, in FIG. 12AM, device 500 has not expanded text entry field 1238 nor removed placeholder text "First" from text entry field 1238. In FIG. 12AN, input device 1200 has moved within threshold 1204 of touch screen 504, and in response, the device 500 expands the text entry field 1238 to create additional space in the text input field 1238 for receiving handwritten input, and has ceased display of the "First" placeholder text in text entry field 1238. In FIG. 12AO, device 500 detects handwritten input from input device 1200 and displays representation 1242 of that input in text entry field 1238. FIG. 12AP illustrates that when the device 500 detects that the input device 1200 moves beyond the lateral threshold distance of the text input field 1238, the device 500 reverts the text entry field 1238 back to its original size and converts the handwritten input to font-based text within text entry field 1238.

Further, in FIG. 12AP, the device 500 detects that the input device 1200 is within the lateral threshold distance from text entry field 1242. In response to detecting that the input device 1200 is within the lateral threshold distance from text entry field 1242 and that input device 1200 is within threshold 1204 of touch screen 504, the device 500 expands text entry field 1242, as shown in FIG. 12AP and cease display of the "City" placeholder text that was displayed in that text entry field in FIG. 12AO.

In FIG. 12AQ, the device 500 detects movement of the input device 1200 from a location within the lateral threshold distance from text entry field 1242 to a location within the lateral threshold distance from text entry field 1240 while input device 1200 is within threshold 1204 of touch screen 504. In response, the device 500 removes the "Last" placeholder text from text entry field 1242 and expands text entry field 1242, as shown in FIG. 12AQ. In FIG. 12AR, the device 500 detects handwritten input from input device 1200 in text entry field 1240 and displays the representation of that handwritten input in text entry field 1240, and after detecting the end of the handwritten input in FIG. 12AS converts the handwritten input to font-based text in text entry field 1240 as described in more detail with reference to FIGS. 12A-12C, and also contracts text entry field 1240 back down to its original size. In FIG. 12AT, device 500 detects input device 1200 move to a position corresponding to text entry field 1238 while input device 1200 is within threshold 1204 of touch screen 504, and re-expands text entry field 1238 while maintaining the non-placeholder text "Bear" in text entry field 1238. Additional handwritten input directed to text entry field 1238 would optionally be converted to font-based text and added or appended to "Bear" in text entry field 1238.

FIGS. 13A-13K are flow diagrams illustrating a method 1300 of providing for handwritten input for conversion into font-based text using an input device. The method 1300 is optionally performed at an electronic device such as device 100, device 300, and device 500 as described above with reference to FIGS. 1A-1B, 2-3, 4A-4B and 5A-5I. Some operations in method 1300 are, optionally combined and/or order of some operations is, optionally, changed.

As described below, the method 1300 provides for handwritten input for conversion into font-based text using an input device. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 1300 is performed at an electronic device in communication with a display generation component, one or more sensors (e.g., a touch-sensitive surface) and an input device. For example, the electronic device is a mobile device (e.g., a tablet, a smartphone, a media player, or a wearable device) including a touch screen and wireless communication circuitry, or a computer including one or more of a keyboard, mouse, trackpad, and touch screen and wireless communication circuitry and optionally has one or more of the characteristics of the electronic device of methods 700, 900 and/or 1100. In some embodiments, the display generation component has one or more characteristics of the display generation component in methods 700, 900 and/or 1100. In some embodiments, the input device has one or more characteristics of the one or more input devices in methods 700, 900 and/or 1100. In some embodiments, the one or more sensors optionally include one or more sensors of FIG. 1A.

In some embodiments, the electronic device displays (1302*a*), via the display generation component, a user interface, such as user interface 1202 in FIG. 12A. For example, a user interface of an application installed and/or running on the electronic device, or a user interface of the operating system of the electronic device. In some embodiments, the user interface is a home screen user interface of the electronic device, or a user interface of an application accessible by the operating system of the electronic device, such as a word processing application, a note taking application, an image management application, a digital content management application, a drawing application, a presentation application, a word processing application, a spreadsheet application, a messaging application, a web browsing application, and/or an email application. In some embodiments, the user interface concurrently includes multiple user interfaces of one or more applications and/or the operating system of the electronic device. In some embodiments, the user interface has one or more characteristics of the user interfaces of methods 700, 900 and/or 1100.

In some embodiments, while displaying the user interface via the display generation component, the electronic device receives (1302*b*), via the one or more sensors, a handwritten input directed to the user interface by the input device, such as the handwritten input from input device 1200 in FIG. 12A. For example, receiving a handwritten input on or near a text and/or handwritten input enabled field or area of the user interface. In some embodiments, the handwritten input is received from the input device (e.g., stylus) in contact (e.g., physical or virtual) with the surface, and includes one or more lines, strokes, curves and/or dots.

In some embodiments, in response to receiving the handwritten input by the input device, the electronic device displays (1302*c*), via the display generation component, a representation of (visually similar to) the handwritten input in the user interface, such as the representation 1216 in FIG. 12A. For example, displaying a rendering of the handwritten input on the display as the input is received. For example, as the user "draws" in a physical environment and/or on the surface using the stylus, the display generation component displays the user's handwritten input at the location(s) where the input was received. In some embodiments, displaying the representation of the handwritten input occurs after receipt of the letters, words, or sentences included in the handwritten input.

In some embodiments, while displaying the representation of the handwritten input in the user interface, the electronic device detects (1302*d*) an end of the handwritten input and movement of the input device to a first position relative to a surface (e.g., the touch-sensitive surface, a physical surface on which the user interface is projected, or a virtual surface corresponding to at least a portion of the user interface), such as liftoff of input device 1200 in FIG. 12B or 12J. For example, detecting the input device lifting off the surface (or the input device being positioned beyond a threshold distance (e.g., 0.2, 0.5, 0.8, 1, 3, 5, 10, 20, 40, 100, 200, or 500 cm) from the surface) and moving (the tip of the input device) to a particular location and/or distance and/or pose relative to the surface.

In some embodiments, in response to detecting the movement of the input device to the first position relative to the surface (1302*e*), in accordance with a determination that the first position of the input device relative to the surface is within a threshold distance (e.g., 0, 0.01, 0.05, 0.1, 0.2, 0.5, 0.8, 1, 3, 5, 10, 30, 50 or 100 cm) of the surface, such as the position of input device 1200 in FIG. 12J, the electronic device converts (13020 at least a portion of the representation of the handwritten input into font-based text corresponding to the at least the portion of the representation of the handwritten input in the user interface, such as shown in FIG. 12K (For example, the electronic device determines the letters and/or words of the handwritten input from the input device and converts them into computerized font-based text. In some embodiments, converting the handwritten input includes removing (e.g., ceasing display of) the displayed representation of the handwritten input that is being converted. In some embodiments, handwritten input that has not been converted is not removed from display and is maintained "as drawn." In some embodiments, as a result of the converting, the computerized font-based text is provided to a text entry field as a text input), wherein there is a first delay (e.g., 0.1 seconds, 0.3 seconds, 0.5 seconds, 1 second, 2 seconds, 3 seconds, 5 seconds, 10 seconds, 20 seconds, 30 second or 60 seconds) between detecting the end of the handwritten input and converting the at least the portion of the representation of the handwritten input into the font-based text corresponding to the at least the portion of the representation of the handwritten input in the user interface, such as the delay corresponding to threshold 1214 in FIG. 12J. In some embodiments, different lengths of time are used to convert handwritten inputs to computerized font-based text depending on if the input device is within or beyond the threshold distance from the surface after detecting the end of the handwritten input.

In some embodiments, in accordance with a determination that the first position of the input device relative to the surface is beyond the threshold distance of the surface, such as the position of input device 1200 in FIG. 12B, the electronic device converts (1302*g*) the at least the portion of the representation of the handwritten input into font-based text corresponding to the at least the portion of the representation of the handwritten input in the user interface (e.g., as described above), such as the conversion in FIG. 12C, wherein there is a second delay (e.g., 0.01 seconds, 0.05 seconds, 0.1 seconds, 0.2 seconds, 0.3 seconds, 0.5 seconds, 1 second, 2 seconds, 3 seconds, 5 seconds, 10 seconds, 20 seconds, 30 second, 60 seconds or 120 seconds), different from the first delay, between detecting the end of the handwritten input and converting the at least the portion of the representation of the handwritten input into the font-based text corresponding to the at least the portion of the representation of the handwritten input in the user interface, such as the delay corresponding to threshold 1212 in FIG. 12C. For example, in some embodiments, conversion is initiated immediately (or more quickly) and/or performed substantially simultaneously with receipt of the end of the handwritten input when the input device is moved to beyond the threshold distance from the surface after detecting the end of the handwritten input. Converting handwritten input into font-based text at a more appropriate time based on the position of the input device with respect to the surface converts text at a time that is less intrusive to the user and/or allows for additional handwritten input prior to conversion while balancing the desire to more quickly convert the handwritten input when appropriate, and reduces inputs needed to correct errors in handwriting conversion, thus reducing power usage.

In some embodiments, detecting the end of the handwritten input includes ceasing receiving, via the one or more sensors, the handwritten input directed to the user interface by the input device (1304*a*), such as contact between input device 1200 and touch screen 504 ending in FIG. 12B. For example, in some embodiments, conversion is initiated after the handwritten input ceases for a time threshold, such as 0.1 seconds, 0.3 seconds, 0.5 seconds, 1 second, 2 seconds, 3 seconds, 5 seconds, 10 seconds, 20 seconds, 30 second or 60 seconds. In some embodiments, conversion is initiated after determining the input device in contact with the surface has ceased (e.g., detecting stylus liftoff from the surface, or after liftoff without subsequent contact for longer than a time threshold, such as 1 second, 2 seconds, 3 seconds, 5 seconds, 10 seconds, 20 seconds, 30 second or 60 seconds). Converting handwritten input into font-based text at a time based on when the user stops writing provides the user a more intuitive user interface experience and avoid premature conversion of a portion of the handwritten input that might change with subsequent handwritten input, and reduces inputs needed to correct errors in handwriting conversion, thus reducing power usage.

In some embodiments, displaying the representation of the handwritten input in the user interface includes one or more lines having characteristics corresponding to one or more movement components of the handwritten input (1306*a*), such as with representation 1216 in FIG. 12A. For example, the representation of the handwritten input includes one or more lines or strokes or dots generated based on movement of the point of contact between the input device and the surface. In some embodiments, the movement of the point of contact includes one or more movement components, such as a vertical movement component, a horizontal movement component, or a diagonal movement component. Providing the user with handwriting feedback of the strokes, lines, or dots the user is writing allows the user to verify the conversion of the handwritten input into font-based text, thus enhancing operability of the input device and reducing inputs needed to correct errors in handwriting conversion, which additionally reduces power usage.

In some embodiments, the user interface includes a text entry user interface element (1308*a*), such as search field 1224 in FIG. 12X (e.g., the text entry user interface element is a user interface element for receiving text input from the input device, such as a text entry field configured to receive handwritten input from the input device). In some embodiments, while displaying the user interface including the text entry user interface element, the electronic device detects (1308*b*) movement of the input device to a second position relative to the surface, such as the movement of input device 1200 from FIG. 12X to FIG. 12Y. For example, the second position of the input device relative to the surface is within the threshold distance of the surface.

In some embodiments, in response to detecting the movement of the input device to the second position relative to the surface (1308*c*), in accordance with a determination that the second position of the input device includes the input device positioned at a location within a second threshold distance (e.g., 0.01, 0.03, 0.05, 0.1, 0.2, 0.3, 1, 3, or 5 cm) from the text entry user interface element, such as the position of input device 1200 in FIG. 12Y relative to search field 1224 (For example, the second position of the input device within the second threshold distance from the text entry user interface element is optionally considered to be an intent to engage within (e.g., enter text into) the text entry user interface element. In some embodiments, the electronic device detects the second position of the input device at a location of the surface that corresponds to a respective location in the user interface within the second threshold distance from the text entry user interface element. In some embodiments, the location of the input device is determined based on the location of the tip of the input device relative to the surface), the electronic device expands (1308*d*) a size of the text entry user interface element from a first size to a second size to create additional space in the text entry user interface element for receiving handwritten input, such as shown with search field 1224 from FIG. 12Y to FIG. 12Z. In some embodiments, the electronic device expands the size of the text entry user interface element by expanding one or more boundaries of the text entry user interface element to provide more room for receiving handwritten input. For example, the first size of the text entry user interface element is an original size smaller than the expanded, second size of the text entry user interface element. Providing more room for receiving handwritten input in a text entry user interface element initially configured to receive smaller font-based text simplifies the interaction between the user and the electronic device and enhances the operability of the electronic device and/or the input device, and also indicates to the user an ability to enter handwritten input in the text entry user interface element more quickly and efficiently.

In some embodiments, while displaying the expanded text entry user interface element at the second size, the electronic device detects (1310*a*) movement of the input device from the second position to a third position, different from the second position, relative to the surface, such as the movement of input device 1200 from FIG. 12AA to FIG. 12AB. For example, the third position of the input device relative to the surface is within the threshold distance of the surface.

In some embodiments, in response to detecting movement of the input device from the second position to the third position relative to the surface and in accordance with a determination that the third position of the input device includes the input device positioned at a location outside the second threshold distance from the text entry user interface element, such as the position of input device 1200 in FIG. 12AB (For example, the third position of the input device outside the second threshold distance from the text entry user interface element is optionally considered to be an intent to cease engagement with (e.g., stop entering text into) the text entry user interface element. In some embodiments, the electronic device detects the third position of the input device at a location of the surface that corresponds to a respective location in the user interface outside the second threshold distance from the text entry user interface element.), the electronic device contracts (1310*b*) the size of the text entry user interface element to a third size, smaller than the second size, such as shown with the contraction of search field 1224 in FIG. 12AB. In some embodiments, the electronic device will contract the text entry user interface element back to its original, first size. Contracting the text entry user interface element back to its original size indicates that further input from the input device will not be directed to the text entry user interface element, thereby reducing errors in interaction with the electronic device.

In some embodiments, while displaying the user interface, wherein the user interface includes a first number of lines that are configured to include content, such as in FIG. 12D, the electronic device detects (1312*a*), via the one or more sensors, a tap input on the surface by the input device, such as the tap of input device 1200 on touch screen 504 in FIG. 12E. In some embodiments, the first number of lines are existing lines in the user interface that are capable of receiving and/or displaying handwritten input and/or font-based text. In some embodiments, the user interface includes visual indications of the first number of lines; in some embodiments, the user interface does not include visual indications of the first number of lines.

In some embodiments, in response to detecting the tap input on the surface by the input device and in accordance with a determination that first one or more new line criteria are satisfied, including a criterion that is satisfied when the tap input is part of an input that does not include a plurality of taps (For example, the tap input does not include a plurality of taps, but includes only one tap), the electronic device updates (1312*b*) the user interface to create a new line (e.g., a single line) that is configured to include content (e.g., capable of receiving and/or displaying handwritten input and/or font-based text), such as the creation of the new line in FIG. 12F in response to the tap of input device 1200 on touch screen 504 in FIG. 12E. The new line is optionally configured to receive additional input for inserting additional content in the new line in the user interface. In some embodiments, the user interface includes visual indications of the new line; in some embodiments, the user interface does not include visual indications of the new line. Providing a new line when the user taps on the surface simplifies the interaction between the user and the electronic device and enhances the operability of the electronic device and/or the input device, and indicates to the user an ability to enter handwritten input and/or font-based text in the new line more quickly and efficiently.

In some embodiments, the first one or more new line criteria include a criterion that is satisfied when a respective position of the input device relative to the surface before the tap input was detected is within the threshold distance of the surface for longer than a time threshold (1314*a*) (e.g., 0.01, 0.05, 0.1, 0.3, 0.5, 1, 2, 3, 5, 10, 20, 30, or 60 seconds), such as indicated by threshold 1232 in FIGS. 12D-12E. In some embodiments, if the input device relative to the surface is detected for less than the time threshold, the electronic device forgoes updating the user interface to include the new line. Requiring that the input device be positioned within the threshold distance of the surface and for longer than a time threshold avoids accidental or intentional new line creation inputs, which reduces power usage and improves battery life of the electronic device.

In some embodiments, after detecting the tap input on the surface by the input device, the electronic device detects (1316*a*), via the one or more sensors, a second tap input on the surface by the input device, such as taps as part of the multiple taps of input device 1200 on touch screen 504 shown in FIG. 12G. For example, the electronic device is optionally able to detect a tap or a series of taps of the input device on the surface.

In some embodiments, in response to detecting the second tap input on the surface by the input device and in accordance with a determination that second one or more new line criteria are satisfied, including a criterion that is satisfied when the tap input and the second tap input are part of a sequence of taps that includes a plurality of taps (e.g., the tap input and the second tap input are detected in succession within a predefined period of time (e.g., within 0.1, 0.2, 0.5, 0.7, 1, 3, 5 or 10 seconds) of one another), such as the sequence of three taps of input device 1200 on touch screen 504 shown in FIG. 12G, the electronic device updates (1316*b*) the user interface to create a number of new lines that are configured to include content (e.g., capable of receiving and/or displaying handwritten input and/or font-based text), wherein the number of new lines is based on a number of taps included in the sequence of taps, such as the three new lines created in FIG. 12H. In some embodiments, if the first one or more new line criteria are satisfied, the second one or more new line criteria are not satisfied, and vice versa. In some embodiments, the number of new lines corresponds to the number of taps included in the sequence of taps (e.g., two taps cause two new lines to be created, and three taps cause three new lines to be created). Providing multiple new lines when the user performs a plurality of taps on the surface simplifies adding new lines to the user interface, the interaction between the user and the electronic device and enhances the operability of the electronic device and/or the input device, and indicates to the user an ability to enter handwritten input and/or font-based text in the multiple new lines more quickly and efficiently.

In some embodiments, in response to detecting the tap input on the surface by the input device and in accordance with a determination that second one or more new line criteria are satisfied, wherein the second one or more new line criteria include a criterion that is satisfied when a position of the tap input (e.g., the position on the surface where the tip of the input device made contact with the surface) is beyond a second threshold distance (e.g., 0.01, 0.03, 0.05, 0.1, 0.2, 0.3, 1, 3, or 5 cm) of an end of a last line configured to include content in the user interface, such as beyond distance 1234 in FIG. 12V (In some embodiments, the electronic device detects the position of the tap input by the input device at a location of the surface that corresponds to a respective location in the user interface beyond the second threshold distance from the end of the last line.), the electronic device updates (1318*a*) the user interface to create a plurality of new lines configured to include content, such as shown with the creation of multiple new lines in FIG. 12W. In some embodiments, the second threshold distance is a vertical (e.g., downward) distance from the vertical position of the last line configured to include content in the user interface. In some embodiments, the greater the distance between the position of the tap input and the end of the last line, the greater the number of lines inserted. In some embodiments, when the electronic device detects a smaller distance between the position of the tap input and the end of the last line, the electronic device inserts fewer lines. Providing multiple new lines when the position of the input device is beyond a threshold distance of last line simplifies adding new lines to the user interface, the interaction between the user and the electronic device and enhances the operability of the electronic device and/or the input device, and indicates to the user an ability to enter handwritten input and/or font-based text in the multiple new lines more quickly and efficiently.

In some embodiments, updating the user interface to create the new line includes displaying a text insertion cursor at a location in the user interface corresponding to a location of the new line in the user interface (1320*a*), such as display of text insertion cursor 1218 in the newly created line in FIG. 12F. The text insertion cursor or other marker optionally acts as a location marker to indicate the position of the new line where content including hand-written input and/or font-based text will appear. In some embodiments, font-based text corresponding to converted handwritten input will be displayed at the location of the text insertion cursor in the new line; in some embodiments, text input from input detected at a keyboard (e.g., virtual or physical) will be displayed at the location of the text insertion cursor in the new line. Providing a text insertion cursor indicates to the user the location where content will be located, which simplifies the interaction between the user and the electronic device and enhances the operability of the electronic device and/or the input device, and indicates to the user an ability to enter handwritten input and/or font-based text more quickly and efficiently.

In some embodiments, while displaying the user interface, wherein the user interface includes the first number of lines that are configured to include content, including a respective line that is positioned at an end of the first number of lines (e.g., the respective line is the last line in the user interface), such as the line that includes text insertion cursor 1218 in FIG. 12I, the electronic device receives (1322*a*), via the one or more sensors, a second handwritten input directed to the user interface by the input device (e.g., before detecting the above-described tap of the input device on the surface in step(s) 1312), such as the input from input device 1200 in FIG. 12I.

In some embodiments, in response to receiving the second handwritten input by the input device, the electronic device displays (1322*b*), via the display generation component, a representation of the second handwritten input in the user interface (e.g., similar to the display of the representation of the handwritten input described with reference to step(s) 1302), such as representation 1220 in FIG. 12I.

In some embodiments, after displaying the representation of the second handwritten input in the user interface, the electronic device converts (1322*c*) at least a portion of the representation of the second handwritten input into second font-based text corresponding to the at least the portion of the representation of the second handwritten input, such as the conversion of representation 1220 from FIG. 12J to 12K, wherein the second font-based text is displayed at an end of the respective line (e.g., similar to the conversion of the representation of the handwritten input described with reference to step(s) 1302), such as the display of font-based text 1220 in FIG. 12K. In some embodiments, if the end of the respective line includes font-based text, the electronic device automatically inserts a space before inserting the second font-based text. In some embodiments, after inserting the second font-based text, the electronic device displays the text insertion cursor at the end of the inserted second font-based text in the respective line. Continuing to display the converted text at the end of the respective line provides a continuous line of text when input for multiple lines of text is not received, which simplifies the interaction between the user and the electronic device and enhances the operability of the electronic device and/or the input device, and avoids erroneously creating new lines in the user interface.

In some embodiments, the user interface includes a text entry user interface element that includes placeholder content associated with a functionality of the text entry user interface element (1324*a*), such as search field 1224 in FIG. 12X including the "Search" placeholder text. For example, the text entry user interface element is a content field that is optionally populated with default placeholder content that can be removed by the electronic device. The default placeholder content optionally indicates to the user the functionality of the text entry user interface element and/or the expected type of input from the input device (e.g., "search", "search or enter website", or "iMessage").

In some embodiments, while displaying the user interface including the text entry user interface element that includes the placeholder content, the electronic device detects (1324*b*) movement of the input device to a second position relative to the surface, such as the movement of input device 1200 from FIG. 12X to FIG. 12Y. For example, the second position of the input device relative to the surface is within the threshold distance of the surface.

In some embodiments, in response to detecting the movement of the input device to the second position relative to the surface (1324*c*), in accordance with a determination that the second position of the input device includes the input device positioned at a location within a second threshold distance (e.g., 0.01, 0.03, 0.05, 0.1, 0.2, 0.3, 1, 3, or 5 cm) from the text entry user interface element (e.g., similar to as described with reference to step(s) 1308), the electronic device ceases (1324*d*) display of the placeholder content in the text entry user interface element, such as the "Search" placeholder content no longer being displayed in search field 1224 FIG. 12Z. In some embodiments, the electronic device detects the second position of the input device at a location of the surface that corresponds to a respective location in the user interface within the second threshold distance from the text entry user interface element. In some embodiments, the location of the input device is determined based on the location of the tip of the input device relative to the surface. In some embodiments, in accordance with a determination that the second position includes the input device positioned at a location outside of the second threshold distance from the text entry user interface element, the electronic device maintains display of the placeholder content in the text entry user interface element. Ceasing to display or removing the placeholder content allows the input device to enter handwritten input and/or font-based text more quickly and efficiently, and indicates that input from the input device will be directed to the text entry user interface element.

In some embodiments, while displaying the font-based text, the electronic device detects (1326*a*) movement of the input device to a second position, different from the first position, relative to the surface, such as the position of input device 800 in FIG. 8X. In some embodiments, in response to detecting the movement of the input device from the first position to the second position relative to the surface and in accordance with a determination that the second position of the input device relative to the surface is within the threshold distance of the surface (1326*b*), in accordance with a determination that the second position of the input device relative to the surface corresponds to a location of the font-based text in the user interface, the electronic device displays (1326*c*), in the user interface, an indication of a text insertion cursor at a location in the user interface that is based on a structure of the font-based text and the second position of the input device relative to the surface, such as the display of the text insertion cursor indication 832*b* in FIGS. 8X-8Y. For example, the second position of the input device relative to the surface is optionally considered to be an intent to engage with the font-based text and as such, the electronic device displays the text insertion cursor at the beginning or end of the font-based text (e.g., depending on whether the tip of the input device is closer to the beginning or the end of the font-based text, respectively), at the beginning or end of a word in the font-based text (e.g., depending on whether the tip of the input device is closer to the beginning or the end of word in the font-based text, respectively), within a first line or a second line in the font-based text (e.g., depending on whether the tip of the input device is closer to the beginning or the end of word in the font-based text, respectively), or at a location of the new line or lines following the font-based text in the user interface. In some embodiments, text (converted or otherwise, such as text input from a keyboard) will be displayed at the location of the text insertion cursor in response to the electronic device receiving corresponding input. In some embodiments, touchdown of the tip of the input device on the surface is required to place the text insertion cursor at its currently-displayed location in the user interface, after which text (converted or otherwise, such as text input from a keyboard) will be displayed at the location of the text insertion cursor in response to the electronic device receiving corresponding input.

In some embodiments, in accordance with a determination that the second position of the input device relative to the surface does not correspond to the location of the font-based text in the user interface, the electronic device forgoes (1326*d*) displaying the indication of the text insertion cursor at the location in the user interface that is based on the structure of the font-based text, such as not displaying the indication of the text insertion cursor in FIG. 8W. In some embodiments, the text insertion cursor is located at a location based on the location of the input device relative to the surface, such as at the location corresponding to the location of the tip of the input device relative to the surface. Providing a text insertion cursor indicates to the user the location where content will be inserted, which simplifies the interaction between the user and the electronic device and enhances the operability of the electronic device and/or the input device, and indicates to the user an ability to enter handwritten input and/or font-based text more quickly and efficiently.

In some embodiments, the user interface includes an indication of a text insertion cursor (1328*a*), such as indication 1236 in FIG. 12J. The indication of the text insertion cursor is optionally displayed with a particular visual appearance (e.g., grey to indicate a tentative location of the text insertion cursor), different from the visual appearance of the text insertion cursor in the user interface, if one is displayed. The text insertion cursor—as opposed to the indication of the text insertion cursor—is optionally not displayed in the user interface or is optionally displayed at a location other than the location of the indication of the text insertion cursor. In some embodiments, text (converted or otherwise, such as text input from a keyboard) will be displayed at the location of the text insertion cursor—as opposed to the location of the indication of the text insertion cursor—in response to the electronic device receiving corresponding input.

In some embodiments, while displaying, in the user interface, the indication of the text insertion cursor at a first location based on a second position of the input device relative to the surface, wherein the second position of the input device includes the input device being within the threshold distance of the surface (e.g., the indication of the text insertion cursor is displayed at a location in the user interface corresponding to a location of the tip of the input device relative to the surface), such as the position of input device 1200 in FIG. 12J, the electronic device detects (1328*b*) movement of the input device from the second position to a third position, different from the second position, relative to the surface, such as movement of input device 1200 away from its position in FIG. 12J.

In some embodiments, in response to detecting the movement of the input device from the second position to the third position relative to the surface and in accordance with a determination that the third position of the input device relative to the surface is within the threshold distance of the surface, the electronic device moves (1328*c*) the indication of the text insertion cursor in the user interface from the first location to a second location in accordance with movement of the input device from the second position to the third position relative to the surface, such as if indication 1236 were to move along with movement of the tip of input device 1200 from FIG. 12J. For example, the electronic device will move the indication of the text insertion cursor in the user interface in accordance with movement of the tip of the input device relative to the surface. In some embodiments, touchdown of the tip of the input device on the surface is required to place the text insertion cursor at the location of the indication of the text insertion cursor. Displaying the indication of the text insertion cursor based on a change in location of the input device provides an indication of the location of the input device and where the text insertion cursor will be placed in response to subsequent input from the input device, thereby reducing errors in the interaction between the input device and/or the surface (e.g., avoiding accidental marks made by the input device in the user interface) and reducing inputs needed to correct such errors.

In some embodiments, while the input device is within the threshold distance of the surface (1330*a*), in accordance with a determination that a currently selected drawing implement for the input device is a first drawing implement, the electronic device displays (1330*b*), in the user interface, one or more indications of one or more characteristics of marks that would be made in the user interface by the input device in response to input from the input device, such as indication 832*b* in FIG. 8Q. For example, the one or more characteristics of marks include color and/or size of the currently selected drawing implement. When the first drawing implement is currently selected (e.g., a highlighter tool is currently selected, a pen drawing tool is currently selected, or any tool that does not cause corresponding handwritten input to be converted to font-based text is currently selected), the electronic device optionally displays the one or more indication (e.g., in the form of a color, shape and/or size of the tip of a virtual shadow, such as described in more detail with reference to method 900).

In some embodiments, in accordance with a determination that the currently selected drawing implement for the input device is a second drawing implement (e.g., a tool that does cause handwritten input provided using that tool to be converted to font-based text by the electronic device, such as a tool used to provide the handwritten input described with reference to step(s) 1302), different from the first drawing implement, the electronic device forgoes (1330*c*) displaying the one or more indications in the user interface, such as not displaying an indication of the text entry tool 820 as part of virtual shadow 832 in FIG. 8W. The second drawing implement is optionally a conversion tool for converting handwritten input to typed text (e.g., font-based text), and when that tool is currently selected, the electronic device optionally does not display an indication or, or an option to set, color and/or size of the handwritten input in the user interface. Not displaying one or more indications of one or more characteristics of marks provides an indication that such settings and/or characteristics of the virtual drawing implement are not applicable to the conversion tool, thereby reducing errors in the interaction between the input device and/or the surface (e.g., avoiding accidental marks made by the input device in the user interface) and reducing inputs needed to correct such errors.

In some embodiments, the user interface includes a list user interface object that includes one or more list items (1332*a*) (e.g., a to-do list or other bulleted or delineated list object that includes one or more list items corresponding to the different items in the list object), such as the list object including items "juice" and "matcha" in FIG. 12AD. In some embodiments, while displaying the list user interface object, the electronic device detects (1332*b*) movement of the input device to a second position relative to the surface, such as the movement of input device 1200 from FIG. 12AD to FIG. 12AE. In some embodiments, in response to detecting the movement of the input device to the second position relative to the surface (1332*c*), in accordance with a determination that the second position of the input device includes the input device positioned within the threshold distance of the surface, and that a respective location in the user interface corresponding to the second position of the input device relative to the surface is after (e.g., below) a last list item in the list user interface object and within a second threshold distance (e.g., 0.01, 0.03, 0.05, 0.1, 0.2, 0.3, 1, 3, or 5 cm) of the last list item in the list user interface object, such as with respect to the position of input device 1200 in FIG. 12AE relative to the "matcha" list item, the electronic device updates (1332*d*) the list user interface object to create a new list item configured to include content (e.g., capable of receiving and/or displaying handwritten input and/or font-based text), such as shown in FIG. 12AE. For example, the electronic device optionally adds a new item to a list at the same level of the last item on the list. In some embodiments, if the last item on the list is nested inside another item, the electronic device optionally adds a new item to the nested list (e.g., at the same level of the last item in the nested list). In some embodiments, the electronic device displays a visual indication of the new list item (e.g., displays an indication of a new bullet point in the list under the last bullet point in the list) while the input device is hovering over the surface at the second position, but does not create the new list item until the input device subsequently makes contact with the surface. After the new list item is created (e.g., whether in response to hovering without contact with the surface, or in response to hovering plus contact with the surface), subsequent handwritten input from the input device is directed to the last list item. In some embodiments, in accordance with a determination that the second position of the input device includes the input device positioned outside the threshold distance of the surface, and/or that the respective location in the user interface corresponding to the second position of the input device relative to the surface is before (e.g., above) the last list item in the list user interface object and/or outside of the second threshold distance (e.g., 0.01, 0.03, 0.05, 0.1, 0.2, 0.3, 1, 3, or 5 cm) of the last list item in the list user interface object, the electronic device forgoes updating the list user interface object to create a new list item configured to include content and/or maintains the list user interface object as including the one or more list items. Creating a new list item when the input device is within a second threshold distance of the last item in the list simplifies the creation of a new list item in the list, the interaction between the user and the electronic device and enhances the operability of the electronic device and/or the input device, and indicates to the user an ability to enter handwritten input and/or font-based text in the list more quickly and efficiently.

In some embodiments, the user interface includes non-editable text (1334*a*) (e.g., text that is part of an image, and/or not text that was converted from handwritten input and/or not text that was displayed in response input from a keyboard, such as also described with reference to method 700), such as text that is part of element 1230 in FIG. 12AJ. In some embodiments, while displaying the user interface including the non-editable text, the electronic device receives (1334*b*), via the one or more sensors, a second handwritten input directed to the non-editable text in the user interface by the input device, such as the input from input device 1200 in FIG. 12AK.

In some embodiments, in response to receiving the second handwritten input by the input device, in accordance with a determination that the second handwritten input satisfies one or more criteria, the electronic device initiates (1334*c*) a process to perform a text-based operation on the non-editable text, such as the selection operation performed on the text in element 1230 in FIG. 12AL. In some embodiments, if the second handwritten input includes a horizontal movement component that moves across the non-editable text, the second handwritten input corresponds to a request to select the non-editable text and the electronic device displays the non-editable text with a selection and/or highlighting indicator (e.g., for further operations, such as copying, pasting or cutting). For example, if the handwritten input crosses out or passes through the non-editable text in the longitudinal direction (e.g., across the text in a left/right direction), then the input is interpreted as a selection input. In some embodiments, selecting a respective portion of the non-editable text includes highlighting the respective portion of the text. In some embodiments, a text edit menu or popup is displayed when (e.g., in response to) the respective portion of the non-editable text is highlighted. In some embodiments, the respective portion of the non-editable text is the portion through which the handwritten input passed. In some embodiments, the respective portion of the non-editable text does not include other portions of the non-editable text through which the handwritten input has not passed. In some embodiments, if the handwritten input includes both longitudinal and transverse components, then only the portion of the text through which the handwritten input included longitudinal components is selected. In some embodiments, if the handwritten input began with longitudinal components and later included transverse components, then all of the text is selected (e.g., even the text through which the transverse components passed). In some embodiments, if the handwritten input includes both longitudinal and transverse components, then the input is interpreted based on which component comprises the majority of the input (e.g., if the input is mostly longitudinal, then the input is interpreted as a selection input). In some embodiments, the handwritten input is interpreted as a request to select text if the handwritten input underlines the text. In other words, in some embodiments, if a horizontal (or substantially horizontal) handwritten input passes underneath the text, then the handwritten input is interpreted as a request to select the underlined text. In some embodiments, the handwritten input is interpreted as a request to select text if the input comprises two tap inputs in quick succession (e.g., within 0.05, 0.1, 0.2, 0.5, 0.7, 1, 2, 3, 5 or 10 seconds of one another) on a respective word. In some embodiments, double tapping a word causes selection of the entire word (e.g., as opposed to only certain letters of the word). In some embodiments, the handwritten input is interpreted as a request to select text if the input comprises a gesture encircling a word. In some embodiments, if the gesture encircles only a subset of the letters of a word, the entire word is selected. In some embodiments, if the gesture encircles only a subset of the letters of a word, only the letters that are captured by the encircling are selected. Providing enhanced interactions to perform text-based operations on non-editable text reduces the amount of time needed by a user to perform said operations, and thus reduces the power usage of the electronic device and increases battery life of the electronic device.

It should be understood that the particular order in which the operations in FIGS. 13A-13K have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, and 1100) are also applicable in an analogous manner to method 1300 described above with respect to FIGS. 13A-13K. For example, the interactions between the input device and the surface, the response(s) of the electronic device, the virtual shadow of the input device, and/or the inputs detected by the electronic device and/or detected by the input device optionally have one or more of the characteristics of the interactions between the input device and the surface, the response(s) of the electronic device, the virtual shadow of the input device, and/or the inputs detected by the electronic device and/or detected by the input device described herein with reference to other methods described herein (e.g., methods 700, 900, and 1100). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5I) or application specific chips. Further, the operations described above with reference to FIGS. 13A-13K are, optionally, implemented by components depicted in FIGS. 1A-1B. For example, displaying operations 1302*a* and 1302*c*, receiving and detecting operations 1302*b* and 1302*d*, and converting operations 1302*f* and 1302*g* are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology potentially involves the gathering and use of data available from specific and legitimate sources to facilitate the analysis and identification of handwritten inputs or other interactions with the electronic device. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information, usage history, and/or handwriting styles.

The present disclosure recognizes that the use of such personal information data, in the present technology, can be used to the benefit of users. For example, the personal information data can be used to automatically perform operations with respect to interacting with the electronic device using a stylus (e.g., recognition of handwriting as text). Accordingly, use of such personal information data enables users to enter fewer inputs to perform an action with respect to handwriting inputs. Further, other uses for personal information data that benefit the user are also contemplated by the present disclosure. For instance, handwriting styles may be used to identify valid characters within handwritten content.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows an electronic device to access certain of the user's handwriting entry history when analyzing handwritten content.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, handwriting can be recognized based on aggregated non-personal information data or a bare minimum amount of personal information, such as the handwriting being handled only on the user's device or other non-personal information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a display generation component and one or more sensors:

displaying, via the display generation component, a user interface including a first user interface object;

while displaying, via the display generation component, the user interface including the first user interface object, detecting, via the one or more sensors, a respective object in proximity to, but not in contact with, a surface associated with the user interface; and in response to detecting the respective object in proximity to, but not in contact with, the surface:

in accordance with a determination that the respective object in proximity to the surface is an input device in communication with the electronic device, and that a position of the input device corresponds to the first user interface object, displaying, in the user interface, a first selectable option that is selectable to perform a first operation associated with the first user interface object; and in accordance with a determination that the respective object in proximity to the surface is not an input device in communication with the electronic device, forgoing the displaying, in the user interface, of the first selectable option that is selectable to perform the first operation associated with the first user interface object.

2. The method of claim 1, further comprising:

in response to detecting the respective object in proximity to, but not in contact with, the surface, in accordance with the determination that the respective object in proximity to the surface is the input device in communication with the electronic device, and that the position of the input device corresponds to the first user interface object, modifying a visual characteristic of the first user interface object to indicate that the first user interface object is selectable.

3. The method of claim 1, wherein the first user interface object is associated with a selection of a first region of the user interface and not a second region of the user interface, different from the first region of the user interface, and the first user interface object is interactable to modify a region of the user interface that is selected by the first user interface object, the method further comprising:

in response to detecting the respective object in proximity to, but not in contact with, the surface, in accordance with the determination that the respective object in proximity to the surface is the input device in communication with the electronic device, and that the position of the input device corresponds to the first user interface object, displaying, via the display generation component, a visual indication associated with one or more directions of the modification of the region of the user interface that is selected by the first user interface object.

4. The method of claim 1, wherein the first user interface object corresponds to a first portion of the user interface, and the first selectable option is associated with ceasing display of the first portion of the user interface, the method further comprising:

while displaying the first selectable option in accordance with the determination that the respective object in proximity to the surface is the input device in communication with the electronic device, and that the position of the input device corresponds to the first user interface object, receiving, via the one or more sensors, one or more inputs corresponding to a selection of the first selectable option; and in response to receiving the one or more inputs corresponding to the selection of the first selectable option, ceasing display of the first portion of the user interface.

5. The method of claim 1, wherein the first user interface object includes a content entry region that includes content, and the first selectable option is associated with ceasing display of the content in the content entry region, the method further comprising:

while displaying the first selectable option in accordance with the determination that the respective object in proximity to the surface is the input device in communication with the electronic device, and that the position of the input device corresponds to the first user interface object, receiving, via the one or more sensors, one or more inputs corresponding to a selection of the first selectable option; and in response to receiving the one or more inputs corresponding to the selection of the first selectable option, ceasing display of the content within the content entry region.

6. The method of claim 1, wherein the first user interface object is associated with presenting media content, and the first selectable option is associated with modifying playback of the media content, the method further comprising:

while displaying the first selectable option in accordance with the determination that the respective object in proximity to the surface is the input device in communication with the electronic device, and that the position of the input device corresponds to the first user interface object, receiving, via the one or more sensors, one or more inputs corresponding to a selection of the first selectable option; and in response to receiving the one or more inputs corresponding to the selection of the first selectable option, modifying playback of the media content.

7. The method of claim 1, further comprising:

in response to detecting the respective object in proximity to, but not in contact with, the surface, in accordance with the determination that the respective object in proximity to the surface is the input device in communication with the electronic device, and that the position of the input device corresponds to the first user interface object:

in accordance with a determination that the position of the input device satisfies one or more criteria, including a criterion that is satisfied when the position of the input device corresponds to the first user interface object for longer than a threshold amount of time, displaying, via the display generation component, information associated with the first user interface object.

8. The method of claim 1, wherein the first user interface object includes a content entry region, the method further comprising:

in response to detecting the respective object in proximity to, but not in contact with, the surface, in accordance with the determination that the respective object in proximity to the surface is the input device in communication with the electronic device, and that the position of the input device corresponds to the first user interface object, displaying, via the display generation component, a visual indication of a content insertion cursor in the content entry region at a location corresponding to the input device;

while displaying the visual indication, receiving, via the one or more sensors, one or more inputs corresponding to a selection of the visual indication; and in response to receiving the one or more inputs corresponding to the selection of the visual indication, displaying, via the display generation component, the content insertion cursor at the location corresponding to the input device in the content entry region.

9. The method of claim 1, wherein the first user interface object includes content, the method further comprising:

in response to detecting the respective object in proximity to, but not in contact with, the surface, in accordance with the determination that the respective object in proximity to the surface is the input device in communication with the electronic device, and that the position of the input device corresponds to the content:

in accordance with a determination that the content is non-editable content, displaying, via the display generation component, a visual indication of a content selection cursor in the content at a location corresponding to the input device.

10. The method of claim 9, further comprising:

in response to detecting the respective object in proximity to, but not in contact with, the surface, in accordance with the determination that the respective object in proximity to the surface is the input device in communication with the electronic device, and that the position of the input device corresponds to the content:

in accordance with a determination that the content is editable content, forgoing displaying, via the display generation component, the visual indication of the content selection cursor in the content at the location corresponding to the input device.

11. The method of claim 1, wherein before detecting the respective object in proximity to, but not in contact with, the surface, the first user interface object is displayed with a first amount of separation from a backplane, the method further comprising:

in response to detecting the respective object in proximity to, but not in contact with, the surface, in accordance with the determination that the respective object in proximity to the surface is the input device in communication with the electronic device, and that the position of the input device corresponds to the first user interface object, displaying the first user interface object with a second amount of separation, greater than the first amount of separation, from the backplane.

12. The method of claim 1, further comprising:

while displaying, via the display generation component, the user interface including the first user interface object, wherein the first user interface object has a first visual appearance in which a first visual characteristic has a first value, detecting, via a cursor control input device, a first input corresponding to movement of a cursor from a location away from the first user interface object to the first user interface object; and in response to detecting the first input, moving the cursor to the first user interface object, and displaying the first user interface object with a second visual appearance in which the first visual characteristic has a second value, different from the first value, wherein while the position of the input device corresponds to the first user interface object, the first user interface object is displayed with a third visual appearance in which the first visual characteristic has the second value.

13. The method of claim 12, further comprising:

in response to detecting the first input, displaying the first user interface object with a parallax effect based on movement of the cursor while the cursor is located at the first user interface object, wherein displaying the first user interface object with the third visual appearance in accordance with the determination that the position of the input device corresponds to the first user interface object does not include displaying the first user interface object with the parallax effect based on movement of the input device while the position of the input device corresponds to the first user interface object.

14. The method of claim 12, further comprising:

in response to detecting the first input, displaying the first user interface object with a lighting effect based on movement of the cursor while the cursor is located at the first user interface object, wherein displaying the first user interface object with the third visual appearance in accordance with the determination that the position of the input device corresponds to the first user interface object does not include displaying the first user interface object with the lighting effect based on movement of the input device while the position of the input device corresponds to the first user interface object.

15. The method of claim 1, wherein the first user interface object corresponds to a link to content, the method further comprising:

in response to detecting the respective object in proximity to, but not in contact with, the surface, in accordance with the determination that the respective object in proximity to the surface is the input device in communication with the electronic device, and that the position of the input device corresponds to the first user interface object, modifying a visual appearance of the first user interface object.

16. An electronic device, comprising:

one or more processors;

memory; and one or more programs, wherein the one or more programs are stored in the memory and configured to be executed by the one or more processors, the one or more programs including instructions for:

displaying, via a display generation component, a user interface including a first user interface object;

while displaying, via the display generation component, the user interface including the first user interface object, detecting, via one or more sensors, a respective object in proximity to, but not in contact with, a surface associated with the user interface; and in response to detecting the respective object in proximity to, but not in contact with, the surface:

in accordance with a determination that the respective object in proximity to the surface is an input device in communication with the electronic device, and that a position of the input device corresponds to the first user interface object, displaying, in the user interface, a first selectable option that is selectable to perform a first operation associated with the first user interface object; and in accordance with a determination that the respective object in proximity to the surface is not an input device in communication with the electronic device, forgoing the displaying, in the user interface, of the first selectable option that is selectable to perform the first operation associated with the first user interface object.

17. The electronic device of claim 16, wherein the one or more programs further include instructions for:

in response to detecting the respective object in proximity to, but not in contact with, the surface, in accordance with the determination that the respective object in proximity to the surface is the input device in communication with the electronic device, and that the position of the input device corresponds to the first user interface object, modifying a visual characteristic of the first user interface object to indicate that the first user interface object is selectable.

18. The electronic device of claim 16, wherein the first user interface object is associated with a selection of a first region of the user interface and not a second region of the user interface, different from the first region of the user interface, and the first user interface object is interactable to modify a region of the user interface that is selected by the first user interface object, wherein the one or more programs further include instructions for:

in response to detecting the respective object in proximity to, but not in contact with, the surface, in accordance with the determination that the respective object in proximity to the surface is the input device in communication with the electronic device, and that the position of the input device corresponds to the first user interface object, displaying, via the display generation component, a visual indication associated with one or more directions of the modification of the region of the user interface that is selected by the first user interface object.

19. The electronic device of claim 16, wherein the first user interface object corresponds to a first portion of the user interface, and the first selectable option is associated with ceasing display of the first portion of the user interface, wherein the one or more programs further include instructions for:

while displaying the first selectable option in accordance with the determination that the respective object in proximity to the surface is the input device in communication with the electronic device, and that the position of the input device corresponds to the first user interface object, receiving, via the one or more sensors, one or more inputs corresponding to a selection of the first selectable option; and in response to receiving the one or more inputs corresponding to the selection of the first selectable option, ceasing display of the first portion of the user interface.

20. The electronic device of claim 16, wherein the first user interface object includes a content entry region that includes content, and the first selectable option is associated with ceasing display of the content in the content entry region, wherein the one or more programs further include instructions for:

while displaying the first selectable option in accordance with the determination that the respective object in proximity to the surface is the input device in communication with the electronic device, and that the position of the input device corresponds to the first user interface object, receiving, via the one or more sensors, one or more inputs corresponding to a selection of the first selectable option; and in response to receiving the one or more inputs corresponding to the selection of the first selectable option, ceasing display of the content within the content entry region.

21. The electronic device of claim 16, wherein the first user interface object is associated with presenting media content, and the first selectable option is associated with modifying playback of the media content, wherein the one or more programs further include instructions for:

while displaying the first selectable option in accordance with the determination that the respective object in proximity to the surface is the input device in communication with the electronic device, and that the position of the input device corresponds to the first user interface object, receiving, via the one or more sensors, one or more inputs corresponding to a selection of the first selectable option; and in response to receiving the one or more inputs corresponding to the selection of the first selectable option, modifying playback of the media content.

22. The electronic device of claim 16, wherein the one or more programs further include instructions for:

in response to detecting the respective object in proximity to, but not in contact with, the surface, in accordance with the determination that the respective object in proximity to the surface is the input device in communication with the electronic device, and that the position of the input device corresponds to the first user interface object:

in accordance with a determination that the position of the input device satisfies one or more criteria, including a criterion that is satisfied when the position of the input device corresponds to the first user interface object for longer than a threshold amount of time, displaying, via the display generation component, information associated with the first user interface object.

23. The electronic device of claim 16, wherein the first user interface object includes a content entry region, wherein the one or more programs further include instructions for:

in response to detecting the respective object in proximity to, but not in contact with, the surface, in accordance with the determination that the respective object in proximity to the surface is the input device in communication with the electronic device, and that the position of the input device corresponds to the first user interface object, displaying, via the display generation component, a visual indication of a content insertion cursor in the content entry region at a location corresponding to the input device;

while displaying the visual indication, receiving, via the one or more sensors, one or more inputs corresponding to a selection of the visual indication; and in response to receiving the one or more inputs corresponding to the selection of the visual indication, displaying, via the display generation component, the content insertion cursor at the location corresponding to the input device in the content entry region.

24. The electronic device of claim 16, wherein the first user interface object includes content, wherein the one or more programs further include instructions for:

in response to detecting the respective object in proximity to, but not in contact with, the surface, in accordance with the determination that the respective object in proximity to the surface is the input device in communication with the electronic device, and that the position of the input device corresponds to the content:

in accordance with a determination that the content is non-editable content, displaying, via the display generation component, a visual indication of a content selection cursor in the content at a location corresponding to the input device.

25. The electronic device of claim 24, wherein the one or more programs further include instructions for:

in response to detecting the respective object in proximity to, but not in contact with, the surface, in accordance with the determination that the respective object in proximity to the surface is the input device in communication with the electronic device, and that the position of the input device corresponds to the content:

in accordance with a determination that the content is editable content, forgoing displaying, via the display generation component, the visual indication of the content selection cursor in the content at the location corresponding to the input device.

26. The electronic device of claim 16, wherein before detecting the respective object in proximity to, but not in contact with, the surface, the first user interface object is displayed with a first amount of separation from a backplane, wherein the one or more programs further include instructions for:

in response to detecting the respective object in proximity to, but not in contact with, the surface, in accordance with the determination that the respective object in proximity to the surface is the input device in communication with the electronic device, and that the position of the input device corresponds to the first user interface object, displaying the first user interface object with a second amount of separation, greater than the first amount of separation, from the backplane.

27. The electronic device of claim 16, wherein the one or more programs further include instructions for:

while displaying, via the display generation component, the user interface including the first user interface object, wherein the first user interface object has a first visual appearance in which a first visual characteristic has a first value, detecting, via a cursor control input device, a first input corresponding to movement of a cursor from a location away from the first user interface object to the first user interface object; and in response to detecting the first input, moving the cursor to the first user interface object, and displaying the first user interface object with a second visual appearance in which the first visual characteristic has a second value, different from the first value, wherein while the position of the input device corresponds to the first user interface object, the first user interface object is displayed with a third visual appearance in which the first visual characteristic has the second value.

28. The electronic device of claim 27, wherein the one or more programs further include instructions for:

in response to detecting the first input, displaying the first user interface object with a parallax effect based on movement of the cursor while the cursor is located at the first user interface object, wherein displaying the first user interface object with the third visual appearance in accordance with the determination that the position of the input device corresponds to the first user interface object does not include displaying the first user interface object with the parallax effect based on movement of the input device while the position of the input device corresponds to the first user interface object.

29. The electronic device of claim 27, wherein the one or more programs further include instructions for:

in response to detecting the first input, displaying the first user interface object with a lighting effect based on movement of the cursor while the cursor is located at the first user interface object, wherein displaying the first user interface object with the third visual appearance in accordance with the determination that the position of the input device corresponds to the first user interface object does not include displaying the first user interface object with the lighting effect based on movement of the input device while the position of the input device corresponds to the first user interface object.

30. The electronic device of claim 16, wherein the first user interface object corresponds to a link to content, wherein the one or more programs further include instructions for:

in response to detecting the respective object in proximity to, but not in contact with, the surface, in accordance with the determination that the respective object in proximity to the surface is the input device in communication with the electronic device, and that the position of the input device corresponds to the first user interface object, modifying a visual appearance of the first user interface object.

31. A non-transitory computer readable storage medium storing one or more programs, the one or more programs comprising instructions, which when executed by one or more processors of an electronic device, cause the electronic device to perform a method comprising:

displaying, via a display generation component, a user interface including a first user interface object;

while displaying, via the display generation component, the user interface including the first user interface object, detecting, via one or more sensors, a respective object in proximity to, but not in contact with, a surface associated with the user interface; and in response to detecting the respective object in proximity to, but not in contact with, the surface:

in accordance with a determination that the respective object in proximity to the surface is an input device in communication with the electronic device, and that a position of the input device corresponds to the first user interface object, displaying, in the user interface, a first selectable option that is selectable to perform a first operation associated with the first user interface object; and in accordance with a determination that the respective object in proximity to the surface is not an input device in communication with the electronic device, forgoing the displaying, in the user interface, of the first selectable option that is selectable to perform the first operation associated with the first user interface object.

32. The non-transitory computer readable storage medium of claim 31, wherein the method further comprises:

in response to detecting the respective object in proximity to, but not in contact with, the surface, in accordance with the determination that the respective object in proximity to the surface is the input device in communication with the electronic device, and that the position of the input device corresponds to the first user interface object, modifying a visual characteristic of the first user interface object to indicate that the first user interface object is selectable.

33. The non-transitory computer readable storage medium of claim 31, wherein the first user interface object is associated with a selection of a first region of the user interface and not a second region of the user interface, different from the first region of the user interface, and the first user interface object is interactable to modify a region of the user interface that is selected by the first user interface object, wherein the method further comprises:

in response to detecting the respective object in proximity to, but not in contact with, the surface, in accordance with the determination that the respective object in proximity to the surface is the input device in communication with the electronic device, and that the position of the input device corresponds to the first user interface object, displaying, via the display generation component, a visual indication associated with one or more directions of the modification of the region of the user interface that is selected by the first user interface object.

34. The non-transitory computer readable storage medium of claim 31, wherein the first user interface object corresponds to a first portion of the user interface, and the first selectable option is associated with ceasing display of the first portion of the user interface, wherein the method further comprises:

while displaying the first selectable option in accordance with the determination that the respective object in proximity to the surface is the input device in communication with the electronic device, and that the position of the input device corresponds to the first user interface object, receiving, via the one or more sensors, one or more inputs corresponding to a selection of the first selectable option; and in response to receiving the one or more inputs corresponding to the selection of the first selectable option, ceasing display of the first portion of the user interface.

35. The non-transitory computer readable storage medium of claim 31, wherein the first user interface object includes a content entry region that includes content, and the first selectable option is associated with ceasing display of the content in the content entry region, wherein the method further comprises:

while displaying the first selectable option in accordance with the determination that the respective object in proximity to the surface is the input device in communication with the electronic device, and that the position of the input device corresponds to the first user interface object, receiving, via the one or more sensors, one or more inputs corresponding to a selection of the first selectable option; and in response to receiving the one or more inputs corresponding to the selection of the first selectable option, ceasing display of the content within the content entry region.

36. The non-transitory computer readable storage medium of claim 31, wherein the first user interface object is associated with presenting media content, and the first selectable option is associated with modifying playback of the media content, wherein the method further comprises:

while displaying the first selectable option in accordance with the determination that the respective object in proximity to the surface is the input device in communication with the electronic device, and that the position of the input device corresponds to the first user interface object, receiving, via the one or more sensors, one or more inputs corresponding to a selection of the first selectable option; and in response to receiving the one or more inputs corresponding to the selection of the first selectable option, modifying playback of the media content.

37. The non-transitory computer readable storage medium of claim 31, wherein the method further comprises:

in response to detecting the respective object in proximity to, but not in contact with, the surface, in accordance with the determination that the respective object in proximity to the surface is the input device in communication with the electronic device, and that the position of the input device corresponds to the first user interface object:

in accordance with a determination that the position of the input device satisfies one or more criteria, including a criterion that is satisfied when the position of the input device corresponds to the first user interface object for longer than a threshold amount of time, displaying, via the display generation component, information associated with the first user interface object.

38. The non-transitory computer readable storage medium of claim 31, wherein the first user interface object includes a content entry region, wherein the method further comprises:

in response to detecting the respective object in proximity to, but not in contact with, the surface, in accordance with the determination that the respective object in proximity to the surface is the input device in communication with the electronic device, and that the position of the input device corresponds to the first user interface object, displaying, via the display generation component, a visual indication of a content insertion cursor in the content entry region at a location corresponding to the input device;

while displaying the visual indication, receiving, via the one or more sensors, one or more inputs corresponding to a selection of the visual indication; and in response to receiving the one or more inputs corresponding to the selection of the visual indication, displaying, via the display generation component, the content insertion cursor at the location corresponding to the input device in the content entry region.

39. The non-transitory computer readable storage medium of claim 31, wherein the first user interface object includes content, wherein the method further comprises:

in response to detecting the respective object in proximity to, but not in contact with, the surface, in accordance with the determination that the respective object in proximity to the surface is the input device in communication with the electronic device, and that the position of the input device corresponds to the content:

in accordance with a determination that the content is non-editable content, displaying, via the display generation component, a visual indication of a content selection cursor in the content at a location corresponding to the input device.

40. The non-transitory computer readable storage medium of claim 39, wherein the method further comprises:

in response to detecting the respective object in proximity to, but not in contact with, the surface, in accordance with the determination that the respective object in proximity to the surface is the input device in communication with the electronic device, and that the position of the input device corresponds to the content:

in accordance with a determination that the content is editable content, forgoing displaying, via the display generation component, the visual indication of the content selection cursor in the content at the location corresponding to the input device.

41. The non-transitory computer readable storage medium of claim 31, wherein before detecting the respective object in proximity to, but not in contact with, the surface, the first user interface object is displayed with a first amount of separation from a backplane, wherein the method further comprises:

in response to detecting the respective object in proximity to, but not in contact with, the surface, in accordance with the determination that the respective object in proximity to the surface is the input device in communication with the electronic device, and that the position of the input device corresponds to the first user interface object, displaying the first user interface object with a second amount of separation, greater than the first amount of separation, from the backplane.

42. The non-transitory computer readable storage medium of claim 31, wherein the method further comprises:

while displaying, via the display generation component, the user interface including the first user interface object, wherein the first user interface object has a first visual appearance in which a first visual characteristic has a first value, detecting, via a cursor control input device, a first input corresponding to movement of a cursor from a location away from the first user interface object to the first user interface object; and in response to detecting the first input, moving the cursor to the first user interface object, and displaying the first user interface object with a second visual appearance in which the first visual characteristic has a second value, different from the first value, wherein while the position of the input device corresponds to the first user interface object, the first user interface object is displayed with a third visual appearance in which the first visual characteristic has the second value.

43. The non-transitory computer readable storage medium of claim 42, wherein the method further comprises:

in response to detecting the first input, displaying the first user interface object with a parallax effect based on movement of the cursor while the cursor is located at the first user interface object, wherein displaying the first user interface object with the third visual appearance in accordance with the determination that the position of the input device corresponds to the first user interface object does not include displaying the first user interface object with the parallax effect based on movement of the input device while the position of the input device corresponds to the first user interface object.

44. The non-transitory computer readable storage medium of claim 42, wherein the method further comprises:

in response to detecting the first input, displaying the first user interface object with a lighting effect based on movement of the cursor while the cursor is located at the first user interface object, wherein displaying the first user interface object with the third visual appearance in accordance with the determination that the position of the input device corresponds to the first user interface object does not include displaying the first user interface object with the lighting effect based on movement of the input device while the position of the input device corresponds to the first user interface object.

45. The non-transitory computer readable storage medium of claim 31, wherein the first user interface object corresponds to a link to content, wherein the method further comprises:

in response to detecting the respective object in proximity to, but not in contact with, the surface, in accordance with the determination that the respective object in proximity to the surface is the input device in communication with the electronic device, and that the position of the input device corresponds to the first user interface object, modifying a visual appearance of the first user interface object.

* * * * *